US009883312B2

(12) United States Patent
Peters et al.

(10) Patent No.: US 9,883,312 B2
(45) Date of Patent: Jan. 30, 2018

(54) TRANSFORMED HIGHER ORDER AMBISONICS AUDIO DATA

(71) Applicant: QUALCOMM Incorporated, San Diego, CA (US)

(72) Inventors: Nils Günther Peters, San Diego, CA (US); Dipanjan Sen, San Diego, CA (US); Martin James Morrell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 14/289,549

(22) Filed: May 28, 2014

(65) Prior Publication Data

US 2014/0355770 A1 Dec. 4, 2014

Related U.S. Application Data

(60) Provisional application No. 61/828,445, filed on May 29, 2013, provisional application No. 61/829,791, (Continued)

(51) Int. Cl.
*H04R 5/00* (2006.01)
*H04S 5/00* (2006.01)
(Continued)

(52) U.S. Cl.
CPC .............. *H04S 5/005* (2013.01); *G06F 17/16* (2013.01); *G10L 19/002* (2013.01); (Continued)

(58) Field of Classification Search
CPC ..... G10L 19/008; G10L 19/032; G06F 17/16; H04R 29/00; H04R 5/00; H04S 3/00; (Continued)

(56) References Cited

U.S. PATENT DOCUMENTS 4,709,340 A 11/1987 Capizzi et al.
4,972,344 A 11/1990 Stoddard et al.
(Continued)

FOREIGN PATENT DOCUMENTS

CN 102547549 A 7/2012
CN 102823277 A 12/2012
(Continued)

OTHER PUBLICATIONS

Nelson et al., "Spherical Harmonics, Singular-Value Decomposition and the Head-Related Transfer Function," Aug. 29, 2000, ISVR University of South Hampton, pp. 607-637.
(Continued)

*Primary Examiner* — Md S Elahee
*Assistant Examiner* — Sabrina Diaz
(74) *Attorney, Agent, or Firm* — Shumaker & Sieffert, P.A.

(57) ABSTRACT

In general, techniques are described for obtaining one or more first vectors describing distinct components of a soundfield and one or more second vectors describing background components of the soundfield, both the one or more first vectors and the one or more second vectors generated at least by performing a transformation with respect to a plurality of spherical harmonic coefficients.

30 Claims, 134 Drawing Sheets

Related U.S. Application Data filed on May 31, 2013, provisional application No. 61/899,034, filed on Nov. 1, 2013, provisional application No. 61/899,041, filed on Nov. 1, 2013, provisional application No. 61/829,182, filed on May 30, 2013, provisional application No. 61/829,174, filed on May 30, 2013, provisional application No. 61/829,155, filed on May 30, 2013, provisional application No. 61/933,706, filed on Jan. 30, 2014, provisional application No. 61/829,846, filed on May 31, 2013, provisional application No. 61/886,605, filed on Oct. 3, 2013, provisional application No. 61/886,617, filed on Oct. 3, 2013, provisional application No. 61/925,158, filed on Jan. 8, 2014, provisional application No. 61/933,721, filed on Jan. 30, 2014, provisional application No. 61/925,074, filed on Jan. 8, 2014, provisional application No. 61/925,112, filed on Jan. 8, 2014, provisional application No. 61/925,126, filed on Jan. 8, 2014, provisional application No. 62/003,515, filed on May 27, 2014, provisional application No. 61/828,615, filed on May 29, 2013.

(51) Int. Cl.

| | |
|---|---|
| ***G10L 19/008*** | (2013.01) |
| ***G06F 17/16*** | (2006.01) |
| ***G10L 19/06*** | (2013.01) |
| ***G10L 25/18*** | (2013.01) |
| ***H04S 7/00*** | (2006.01) |
| ***G10L 19/002*** | (2013.01) |
| ***G10L 19/038*** | (2013.01) |
| ***G10L 19/02*** | (2013.01) |
| ***G10L 19/16*** | (2013.01) |
| ***G10L 19/20*** | (2013.01) |
| *G10L 19/00* | (2013.01) |

(52) U.S. Cl.

CPC ........ *G10L 19/008* (2013.01); *G10L 19/0204* (2013.01); *G10L 19/038* (2013.01); *G10L 19/06* (2013.01); *G10L 19/167* (2013.01); *G10L 19/20* (2013.01); *G10L 25/18* (2013.01); *H04S 7/30* (2013.01); *H04S 7/304* (2013.01); *H04S 7/40* (2013.01); *G10L 2019/0001* (2013.01); *G10L 2019/0005* (2013.01); *H04R 2205/021* (2013.01); *H04S 2400/01* (2013.01); *H04S 2400/15* (2013.01); *H04S 2420/01* (2013.01); *H04S 2420/03* (2013.01); *H04S 2420/11* (2013.01)

(58) Field of Classification Search

CPC ... H04S 3/008; H04S 3/02; H04S 5/00; H04S 7/00; H04S 7/40

USPC ................................ 381/23, 20, 300, 1, 307

See application file for complete search history.

(56) References Cited

U.S. PATENT DOCUMENTS

| | | | | |
|---|---|---|---|---|
| 5,012,518 | A | 4/1991 | Liu et al. | |
| 5,363,050 | A | 11/1994 | Guo et al. | |
| 5,633,981 | A | 5/1997 | Davis | |
| 5,757,927 | A | 5/1998 | Gerzon et al. | |
| 5,790,759 | A | 8/1998 | Chen | |
| 5,819,215 | A | 10/1998 | Dobson et al. | |
| 5,821,887 | A | 10/1998 | Zhu | |
| 5,970,443 | A | 10/1999 | Fujii | |
| 6,167,375 | A | 12/2000 | Miseki et al. | |
| 6,263,312 | B1 | 7/2001 | Kolesnik et al. | |
| 6,370,502 | B1 | 4/2002 | Wu et al. | |
| 6,493,664 | B1 | 12/2002 | Udaya et al. | |
| 6,904,152 | B1 | 6/2005 | Moorer | |
| 7,271,747 | B2 | 9/2007 | Baraniuk et al. | |
| 7,447,317 | B2 | 11/2008 | Herre et al. | |
| 7,630,902 | B2 | 12/2009 | You | |
| 7,660,424 | B2 | 2/2010 | Davis et al. | |
| 7,822,601 | B2 | 10/2010 | Mehrotra et al. | |
| 7,920,709 | B1 | 4/2011 | Hickling | |
| 8,160,269 | B2 | 4/2012 | Mao | |
| 8,374,358 | B2 | 2/2013 | Buck et al. | |
| 8,379,868 | B2 * | 2/2013 | Goodwin | G10L 19/008 381/17 |
| 8,391,500 | B2 | 3/2013 | Hannemann et al. | |
| 8,452,587 | B2 | 5/2013 | Liu et al. | |
| 8,570,291 | B2 | 10/2013 | Motomura et al. | |
| 8,781,197 | B2 | 7/2014 | Wang et al. | |
| 8,817,991 | B2 | 8/2014 | Jaillet et al. | |
| 8,908,873 | B2 | 12/2014 | Herre et al. | |
| 8,958,582 | B2 | 2/2015 | Yoo et al. | |
| 9,015,051 | B2 | 4/2015 | Pulkki | |
| 9,053,697 | B2 | 6/2015 | Park et al. | |
| 9,084,049 | B2 | 7/2015 | Fielder et al. | |
| 9,100,768 | B2 | 8/2015 | Batke et al. | |
| 9,129,597 | B2 | 9/2015 | Bayer et al. | |
| 9,230,558 | B2 | 1/2016 | Disch et al. | |
| 9,338,574 | B2 | 5/2016 | Jax et al. | |
| 9,397,771 | B2 | 7/2016 | Jax et al. | |
| 9,454,971 | B2 | 9/2016 | Kruger et al. | |
| 9,626,974 | B2 | 4/2017 | Thiergart et al. | |
| 2001/0036286 | A1 | 11/2001 | Layton et al. | |
| 2002/0044605 | A1 | 4/2002 | Nakamura | |
| 2002/0049586 | A1 | 4/2002 | Nishio et al. | |
| 2002/0169735 | A1 | 11/2002 | Kil et al. | |
| 2003/0147539 | A1 | 8/2003 | Elko et al. | |
| 2003/0179197 | A1 | 9/2003 | Sloan et al. | |
| 2003/0200063 | A1 | 10/2003 | Niu et al. | |
| 2004/0068399 | A1 | 4/2004 | Ding | |
| 2004/0131196 | A1 | 7/2004 | Malham | |
| 2004/0158461 | A1 | 8/2004 | Ramabadran et al. | |
| 2004/0247134 | A1 | 12/2004 | Miller et al. | |
| 2005/0053130 | A1 | 3/2005 | Jabri et al. | |
| 2005/0074135 | A1 | 4/2005 | Kushibe | |
| 2006/0031038 | A1 | 2/2006 | Simola et al. | |
| 2006/0045275 | A1 | 3/2006 | Daniel | |
| 2006/0045291 | A1 | 3/2006 | Smith | |
| 2006/0126852 | A1 | 6/2006 | Bruno et al. | |
| 2006/0282874 | A1 | 12/2006 | Ito et al. | |
| 2007/0009115 | A1 | 1/2007 | Reining et al. | |
| 2007/0094019 | A1 | 4/2007 | Nurminen | |
| 2007/0172071 | A1 | 7/2007 | Mehrotra et al. | |
| 2007/0269063 | A1 * | 11/2007 | Goodwin | G10L 19/008 381/310 |
| 2008/0004729 | A1 | 1/2008 | Hiipakka | |
| 2008/0137870 | A1 | 6/2008 | Nicol et al. | |
| 2008/0143719 | A1 | 6/2008 | Zhou et al. | |
| 2008/0205676 | A1 | 8/2008 | Merimaa et al. | |
| 2008/0298597 | A1 | 12/2008 | Turku et al. | |
| 2008/0306720 | A1 | 12/2008 | Nicol et al. | |
| 2009/0006103 | A1 | 1/2009 | Koishida et al. | |
| 2009/0092259 | A1 | 4/2009 | Jot et al. | |
| 2009/0248425 | A1 | 10/2009 | Vetterli et al. | |
| 2009/0265164 | A1 | 10/2009 | Yoon et al. | |
| 2009/0290156 | A1 | 11/2009 | Popescu et al. | |
| 2010/0085247 | A1 | 4/2010 | Venkatraman et al. | |
| 2010/0092014 | A1 | 4/2010 | Strauss et al. | |
| 2010/0169102 | A1 | 7/2010 | Samsudin | |
| 2010/0198585 | A1 | 8/2010 | Mouhssine et al. | |
| 2010/0228552 | A1 | 9/2010 | Suzuki et al. | |
| 2010/0329466 | A1 | 12/2010 | Berge | |
| 2011/0164466 | A1 | 7/2011 | Hald et al. | |
| 2011/0224975 | A1 | 9/2011 | Li et al. | |
| 2011/0224995 | A1 | 9/2011 | Kovesi et al. | |
| 2011/0249738 | A1 | 10/2011 | Suzuki et al. | |
| 2011/0249821 | A1 | 10/2011 | Jaillet et al. | |
| 2011/0249822 | A1 | 10/2011 | Jaillet et al. | |
| 2011/0261973 | A1 | 10/2011 | Nelson et al. | |
| 2011/0305344 | A1 | 12/2011 | Sole et al. | |
| 2012/0014527 | A1 | 1/2012 | Furse | |
| 2012/0093323 | A1 | 4/2012 | Lee et al. | |

(56) References Cited

U.S. PATENT DOCUMENTS

| | | | |
|---|---|---|---|
| 2012/0093344 A1 | 4/2012 | Sun et al. | |
| 2012/0128160 A1 | 5/2012 | Kim et al. | |
| 2012/0141003 A1 | 6/2012 | Wang et al. | |
| 2012/0155653 A1 | 6/2012 | Jax et al. | |
| 2012/0163622 A1 | 6/2012 | Karthik et al. | |
| 2012/0174737 A1 | 7/2012 | Risan | |
| 2012/0177234 A1 | 7/2012 | Rank et al. | |
| 2012/0221344 A1 | 8/2012 | Yamanashi et al. | |
| 2012/0232910 A1 | 9/2012 | Dressler et al. | |
| 2012/0243692 A1 | 9/2012 | Ramamoorthy | |
| 2012/0257579 A1 | 10/2012 | Li et al. | |
| 2012/0259442 A1 | 10/2012 | Jin et al. | |
| 2012/0271629 A1 | 10/2012 | Sung et al. | |
| 2012/0314878 A1 | 12/2012 | Daniel et al. | |
| 2013/0028427 A1 | 1/2013 | Yamamoto et al. | |
| 2013/0041658 A1 | 2/2013 | Bradley et al. | |
| 2013/0064375 A1 | 3/2013 | Atkins et al. | |
| 2013/0148812 A1* | 6/2013 | Corteel | H04S 7/30 381/17 |
| 2013/0216070 A1 | 8/2013 | Keiler et al. | |
| 2013/0223658 A1 | 8/2013 | Betlehem et al. | |
| 2013/0320804 A1 | 12/2013 | Symko et al. | |
| 2014/0016784 A1 | 1/2014 | Sen et al. | |
| 2014/0016786 A1 | 1/2014 | Sen | |
| 2014/0016802 A1 | 1/2014 | Sen et al. | |
| 2014/0023197 A1 | 1/2014 | Xiang et al. | |
| 2014/0025386 A1 | 1/2014 | Xiang et al. | |
| 2014/0029758 A1 | 1/2014 | Nakadai et al. | |
| 2014/0133660 A1 | 5/2014 | Jax et al. | |
| 2014/0219455 A1 | 8/2014 | Peters et al. | |
| 2014/0226823 A1 | 8/2014 | Sen et al. | |
| 2014/0233762 A1 | 8/2014 | Vilkamo et al. | |
| 2014/0233917 A1 | 8/2014 | Xiang | |
| 2014/0247946 A1 | 9/2014 | Sen et al. | |
| 2014/0270245 A1 | 9/2014 | Elko et al. | |
| 2014/0286493 A1 | 9/2014 | Kordon et al. | |
| 2014/0307894 A1 | 10/2014 | Kordon et al. | |
| 2014/0355766 A1 | 12/2014 | Morrell et al. | |
| 2014/0355769 A1 | 12/2014 | Peters et al. | |
| 2014/0355771 A1 | 12/2014 | Peters et al. | |
| 2014/0358266 A1 | 12/2014 | Peters et al. | |
| 2014/0358557 A1 | 12/2014 | Sen et al. | |
| 2014/0358558 A1 | 12/2014 | Sen et al. | |
| 2014/0358559 A1 | 12/2014 | Sen et al. | |
| 2014/0358560 A1 | 12/2014 | Sen et al. | |
| 2014/0358561 A1 | 12/2014 | Sen et al. | |
| 2014/0358562 A1 | 12/2014 | Sen et al. | |
| 2014/0358563 A1 | 12/2014 | Sen et al. | |
| 2014/0358564 A1 | 12/2014 | Sen et al. | |
| 2014/0358565 A1 | 12/2014 | Peters et al. | |
| 2014/0358567 A1 | 12/2014 | Koppens et al. | |
| 2015/0098572 A1 | 4/2015 | Krueger et al. | |
| 2015/0127354 A1 | 5/2015 | Peters et al. | |
| 2015/0154965 A1 | 6/2015 | Wuebbolt et al. | |
| 2015/0154971 A1 | 6/2015 | Boehm et al. | |
| 2015/0163615 A1 | 6/2015 | Boehm et al. | |
| 2015/0213802 A1 | 7/2015 | Bae et al. | |
| 2015/0213803 A1 | 7/2015 | Peters et al. | |
| 2015/0213805 A1 | 7/2015 | Peters et al. | |
| 2015/0213809 A1 | 7/2015 | Peters et al. | |
| 2015/0264483 A1 | 9/2015 | Morrell et al. | |
| 2015/0264484 A1 | 9/2015 | Peters et al. | |
| 2015/0287418 A1 | 10/2015 | Vasilache et al. | |
| 2015/0332679 A1 | 11/2015 | Kruger et al. | |
| 2015/0332690 A1 | 11/2015 | Kim et al. | |
| 2015/0332691 A1 | 11/2015 | Kim et al. | |
| 2015/0332692 A1 | 11/2015 | Kim et al. | |
| 2015/0341736 A1 | 11/2015 | Peters et al. | |
| 2015/0358631 A1 | 12/2015 | Zhang et al. | |
| 2015/0371633 A1 | 12/2015 | Chelba | |
| 2015/0380002 A1 | 12/2015 | Uhle et al. | |
| 2016/0088415 A1 | 3/2016 | Krueger et al. | |
| 2016/0093308 A1 | 3/2016 | Kim | |
| 2016/0093311 A1 | 3/2016 | Kim | |
| 2016/0155448 A1 | 6/2016 | Purnhagen et al. | |
| 2016/0174008 A1 | 6/2016 | Boehm | |
| 2017/0032798 A1 | 2/2017 | Peters | |

FOREIGN PATENT DOCUMENTS

| | | | |
|---|---|---|---|
| CN | 104285390 | A | 1/2015 |
| EP | 2094032 | A1 | 8/2009 |
| EP | 2234104 | A1 | 9/2010 |
| EP | 2450880 | A1 | 5/2012 |
| EP | 2469741 | A1 | 6/2012 |
| EP | 2469742 | A2 | 6/2012 |
| EP | 2665208 | A1 | 11/2013 |
| EP | 2765791 | A1 | 8/2014 |
| EP | 2954700 | A1 | 12/2015 |
| JP | 2012133366 | A | 7/2012 |
| JP | 2014041362 | A | 3/2014 |
| KR | 20120070521 | A | 6/2012 |
| KR | 20130102015 | A | 9/2013 |
| KR | 20140000240 | A | 1/2014 |
| TW | 201514455 | A | 4/2015 |
| WO | 2009046223 | A2 | 4/2009 |
| WO | 2009144953 | A1 | 12/2009 |
| WO | 2011117399 | A1 | 9/2011 |
| WO | 2012059385 | A1 | 5/2012 |
| WO | 2012061149 | A1 | 5/2012 |
| WO | 2013000740 | A1 | 1/2013 |
| WO | 2013171083 | A1 | 11/2013 |
| WO | 2014013070 | A1 | 1/2014 |
| WO | 2014090660 | A1 | 6/2014 |
| WO | 2014122287 | A1 | 8/2014 |
| WO | 2014177455 | A1 | 11/2014 |
| WO | 2014194099 | A1 | 12/2014 |
| WO | 2014195190 | A1 | 12/2014 |
| WO | 2015007889 | A2 | 1/2015 |

OTHER PUBLICATIONS

Masgrau, et al., "Predictive SVD-Transform Coding of Speech with Adaptive Vector Quantization," Apr. 1991, IEEE, pp. 3681-3684.

Audio-Subgroup, "WD1-HOA Text of MPEG-H 3D Audio," MPEG Meeting; Jan. 13, 2014-Jan. 17, 2014; San Jose; (Motion Picture Expert Group or ISO/IEC JTC1/SC29/WG11), No. N14264, XP030021001, 84 pp.

Boehm, et al., "Scalable Decoding Mode for MPEG-H 3D Audio HOA," MPEG Meeting; Mar. 31, 2014-Apr. 4, 2014; Valencia; (Motion Picture Expert Group or ISO/IEC JTC1/SC29/WG11), No. m33195, XP030061647, 12 pp.

Boehm, et al., "HOA Decoder—changes and proposed modification," Technicolor, MPEG Meeting; Mar. 31, 2014-Apr. 4, 2014; Valencia; (Motion Picture Expert Group or ISO/IEC JTC1/SC29/WG11), No. m33196, XP030061648, p. 2, paragraph 2.3 New Vector Coding Modes, 16 pp.

Daniel, et al., "Spatial Auditory Blurring and Applications to Multichannel Audio Coding", Jun. 23, 2011, XP055104301, Retrieved from the Internet: URL:http://tel.archives-ouvertes.fr/tel-00623670/en/Chapter 5. "Multichannel audio coding based on spatial blurring", 167 pp.

Erik, et al., "Lossless Compression of Spherical Microphone Array Recordings," AES Convention 126, May 2009, AES, 60 East 42nd Street, Room 2520 New York 10165-2520, USA, XP040508950, Section 2, Higher Order Ambisonics; 9 pp.

Hellerud, et al., "Spatial redundancy in Higher Order Ambisonics and its use for lowdelay lossless compression", Acoustics, Speech and Signal Processing, 2009, ICASSP 2009, IEEE International Conference on, IEEE, Piscataway, NJ, USA, Apr. 19, 2009, XP031459218, pp. 269-272.

International Search Report and Written Opinion from International Application No. PCT/US2014/040008, dated Oct. 6, 2014, 12 pp.

Sen et al., "RM1-HOA Working Draft Text", MPEG Meeting; Jan. 13, 2014-Jan. 17, 2014; San Jose; (Motion Picture Expert Group or ISO/IEC JTC1/SC29/WG11), No. m31827, XP030060280, 83 pp.

Wabnitz, et al., "A frequency-domain algorithm to upscale ambisonic sound scenes", 2012 IEEE International Conference on Acoustics, Speech and Signal Processing (ICASSP 2012) : Kyoto,

(56) References Cited

OTHER PUBLICATIONS

Japan, Mar. 25-30, 2012; [Proceedings], IEEE, Piscataway, NJ, XP032227141, DOI: 10.1109/ICASSP.2012.6287897, Section 2 "Frequency domain HOA Upscaling algorithm"; pp. 385-388.
Wabnitz, et al., "Time domain reconstruction of spatial sound fields using compressed sensing", Acoustics, Speech and Signal Processing (ICASSP), 2011 IEEE International Conference on, IEEE, May 22, 2011, XP032000775, 4 pp.
Wabnitz, et al., "Upscaling Ambisonic sound scenes using compressed sensing techniques", Applications of Signal Processing to Audio and Acoustics (WASPAA), 2011 IEEE Workshop on, IEEE, Oct. 16, 2011, XP032011510, section 2. "HOA Upscaling method"; 4 pp.
Audio, "Call for Proposals for 3D Audio," International Organisation for Standardisation Organisation Internationale DE Normalisation ISO/IEC JTC1/SC29/WG11 Coding of Moving Pictures and Audio, ISO/IEC JTC1/SC29/WG11/N13411, Geneva, Jan. 2013, pp. 1-20.
Hellerud, et al., "Encoding higher order ambisonics with AAC," Audio Engineering Society—124th Audio Engineering Society Convention 2008, XP040508582, May 2008, 8 pp.
Menzies, "Nearfield synthesis of complex sources with high-order ambisonics, and binaural rendering," Proceedings of the 13th International Conference on Auditory Display, Montréeal, Canada, Jun. 26-29, 2007, 8 pp.
Poletti, "Three-Dimensional Surround Sound Systems Based on Spherical Harmonics," The Journal of the Audio Engineering Society, Nov. 2005, vol. 53 (11), pp. 1004-1025.
Zotter, et al., "Comparison of energy-preserving and all-round Ambisonic decoders," Mar. 18-21, 2013, 4 pp.
Boehm, et al., "Detailed Technical Description of 3D Audio Phase 2 Reference Model 0 for HOA technologies", MPEG Meeting; Oct. 2014; Strasbourg; (Motion Picture Expert Group or ISO/IEC JTC1/SC29/WG11), No. m35057, XP030063429, 130 pp.
Daniel, et al. "Ambisonics Encoding of Other Audio Formats for Multiple Listening Conditions," Audio Engineering Society Convention 105, Sep. 1998, San Francisco, CA, Paper No. 4795.
Davis, et al., "A Simple and Efficient Method for Real-Time Computation and Transformation of Spherical Harmonic-Based Sound Fields", Proceedings of the AES 133rd Convention, Oct. 26-29, 2012, 10 pp.
DVB Organization: "ISO-IEC_23008-3_(E)_(DIS of 3DA).docx", DVB, Digital Video Broadcasting, C/0 EBU-17A Ancienne Route-CH-1218 Grand Saconnex, Geneva-Switzerland, Aug. 8, 2014 (Aug. 8, 2014), pp. 1-431, XP017845569.
Gauthier, et al., "Beamforming Regularization,Scaling Matrices and Inverse Problems for Sound Field Extrapolation and Characterization: Part I Theory," Oct. 20-23, 2011, in Audio Engineering Society 131st convention, New York, USA, 32 pp.
Gauthier, et al., "Derivation of Ambisonics Signals and Plane Wave Description of Measured Sound Field Using Irregular Microphone Arrays and Inverse Problem Theory," In Ambisonics Symposium 2011, Lexington, USA, Jun. 2-3, 2011, 17 pp.
Gerzon, "Ambisonics in Multichannel Broadcasting and Video", Journal of the Audio Engineering Society, Nov. 1985, vol. 33(11), pp. 859-871.
Hagai, et al., "Acoustic centering of sources measured by surrounding spherical microphone arrays", Jul. 2011, In the Journal of the Acoustical Society of America, vol. 130, No. 4, pp. 2003-2015.
Herre, et al., "MPEG-H 3D Audio—The New Standard for Coding of Immersive Spatial Audio," IEEE Journal of Selected Topics in Signal Processing, vol. 9, No. 5, Aug. 2015, 10 pp.
"Information technology—High efficiency coding and media delivery in heterogeneous environments—Part 3: 3D Audio," ISO/IEC JTC 1/SC 29, Apr. 4, 2014, 337 pp.
"Information technology—High efficiency coding and media delivery in heterogeneous environments—Part 3: 3D Audio," ISO/IEC JTC 1/SC 29, Jul. 25, 2014, 311 pp.
"Information technology—High efficiency coding and media delivery in heterogeneous environments—Part 3: Part 3: 3D Audio, Amendment 3: MPEG-H 3D Audio Phase 2," ISO/IEC JTC 1/SC 29, Jul. 25, 2015, 208 pp.
Information technology—MPEG audio technologies—Part 3: Unified speech and audio coding, ISO/IEC JTC 1/SC 29/WG 11, Sep. 20, 2011, 291 pp.
Malham, "Higher order ambisonic systems for the spatialization of sound", Proceedings of the International Computer Music Conference, Oct. 1999, Beijing, China, pp. 484-487.
Mathews, et al., "Multiplication-Free Vector Quantization Using L1 Distortion Measure and Its Variants", Multidimensional Signal Processing, Audio and Electroacoustics, Glasgow, May 23-26, 1989, [International Conference on Acoustics, Speech & Signal Processing, ICASSP], IEEE, US, vol. 3, pp. 1747-1750, XP000089211.
Moreau, et al., "3D Sound Field Recording with Higher Order Ambisonics—Objective Measurements and Validation of Spherical Microphone", May 20-23, 2006, Audio Engineering Society Convention Paper 6857, 24 pp.
Painter, et al., Perceptual Coding of Digital Audio, Proceedings of the IEEE, vol. 88, No. 4, Apr. 2000, pp. 451-513.
Poletti M., "Unified Description of Ambisonics Using Real and Complex Spherical Harmonics," Ambisonics Symposium Jun. 25-27, 2009, 10 Pages.
Pulkki V., "Spatial Sound Reproduction with Directional Audio Coding," Journal of the Audio Engineering Society, Jun. 2007, vol. 55 (6), pp. 503-516.
Rafaely, "Spatial alignment of acoustic sources based on spherical harmonics radiation analysis," 2010, in communications, Control and Signal Processing (ISCCSP), 2010 4th International Symposium, Mar. 3-5, 2010, 5 pp.
Sayood, et al., "Application to Image Compression—JPEG," Introduction to Data Compression, Third Edition, Dec. 15, 2005, Chapter 13.6, pp. 410-416.
Sen D., et al., "Differences and Similarities in Formats for Scene Based Audio," ISO/IEC JTC1/SC29/WG11 MPEG2012/M26704, Oct. 2012, Shanghai, China, 7 Pages.
U.S. Appl. No. 14/729,486, filed Jun. 3, 2015, by Zhang et al.
Response to Written Opinion dated Oct. 6, 2014, from International Application No. PCT/US2014/040008, filed Mar. 27, 2015, 7 pp.
Second Written Opinion from International Application No. PCT/US2014/040008, dated May 22, 2015, 8 pp.
Rockway, et al., "Interpolating Spherical Harmonics for Computing Antenna Patterns," Systems Center Pacific, Technical Report 1999, Jul. 2011, 40 pp.
Conlin, "Interpolation of data points on a sphere: spherical harmonics as basis functions," Feb. 28, 2012, 6 pp.
Stohl, et al., "An intercomparison of results from three trajectory models," Meteorol. Appl. 8, Jun. 2001, pp. 127-135.
Ruffini, et al. "Spherical Harmonics Interpolation, Computation of Laplacians and Gauge Theory," Starlab Research Knowledge, Oct. 25, 2001, 16 pp.
Response to Written Opinion dated May 22, 2015 from International Applicaiton No. PCT/US2014/040008, filed Jul. 22, 2015, 8 pp.
International Preliminary Report on Patentability from International Application No. PCT/US2014/040008, dated Oct. 28, 2015, 11 pp.
Daniel, et al., "Multichannel Audio Coding Based on Minimum Audible Angles", Proceedings of AES 40TH International Conference: Spatial Audio: Sense the Sound of Space, Oct. 8-10, 2010, XP055009518, 10 pp.
Nishimura., "Audio Information Hiding Based on Spatial Masking", Intelligent Information Hidinga ND Multimedia Signal Processing (IIH-MSP), 2010 Sixth International Conference on, IEEE, Piscataway, NJ, USA, Oct. 15, 2010, pp. 522-525, XP031801765.
Solvang, et al., "Quantization of 2D Higher Order Ambisoncs Wave Fields," In the 124th AES Conv, May 17-20, 2008, 9 pp.
Bosi et al, "ISO/IEC MPEG-2 Advanced Audio Coding," 1996, In 101st AES Convention, Los Angeles, Nov. 1996, 43 pp.
Geiser, et al., "Steganographic Packet Loss Concealment for Wireless VoIP," ITG Conference on Voice Communication (SprachKommunikation), Oct. 8, 2008, 4 pp.

(56) References Cited

OTHER PUBLICATIONS

Huang, et al., "Interpolation of head-related transfer functions using spherical Fourier expansion," Journal of Electronics (China), Jul. 2009, vol. 26, Issue 4, pp. 571-576.
ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014, XP055206371, 337 pp.
Johnston et al, "AT&T perceptual Audio Coding (PAC)," 1996, In Collected Papers on Digital Audio Bit-Rate Reduction pp. 73-82, Feb. 13, 1996.
Lincoln: "An experimental high fidelity perceptual audio coder," In Project in MUS420 Win97, Mar. 1998, 19 pp.
"Information technology—High efficiency coding and media delivery in heterogeneous environments—Part 3: 3D Audio," ISO/IEC JTC 1/SC 29, Jul. 25, 2014, 433 pp.
U.S. Appl. No. 15/247,244, filed by Nils Gunther Peters, on Aug. 25, 2016.
U.S. Appl. No. 15/247,364, filed by Nils Gunther Peters, on Aug. 25, 2016.
U.S. Appl. No. 15/290,181, filed by Nils Gunther Peters, on Oct. 11, 2016.
U.S. Appl. No. 15/290,206, filed by Nils Gunther Peters, on Oct. 11, 2016.
U.S. Appl. No. 15/290,214, filed by Nils Gunther Peters, on Oct. 11, 2016.
Noistering, et al., "A 3D Real Time Rendering Engine for Binaural Sound Reproduction," Proceedings of the 2003 International Conference on Auditory Display, Boston, MA, USA, Jul. 6-9, 2003, pp. 107-110.
Zotter, et al., "Energy-Preserving Ambisonic Decoding," ACTA ACUSTICA United With ACUSTICA, European Acoustics Association, Stuttgart : Hirzel, vol. 98, No. 1, Jan. 2012, pp. 37-47.
Epain N., et al., "Blind Source Separation Using Independent Component Analysis in the Spherical Harmonic Domain." Proceedings of the 2nd International Symposium on Ambisonics and Spherical Acoustics, Paris, May 6-7, 2010, 6 pp.
Epain N., et al., "Objective Evaluation Of A Three-Dimensional Sound Field Reproduction System", Proceedings of the 20th International Congress on Acoustics, Sydney, Australia, Aug. 23-27, 2010, pp. 1-7.
Hollerweger, "An Introduction to Higher Order Ambisonic," Oct. 2008, Accessed online [Jul. 8, 2013], 13 pp.
Malham D.G, "Higher Order Ambisonic Systems for the Spatialisation of Sound," Proceedings of the International Computer Music Conference, Dec. 31, 1999, pp. 484-487.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 1, 2012 (Apr. 1, 2012), pp. I-VI, 1-126, XP002712145, paragraph A.7-A.9 paragraph [OA.4], 132 pp.
Neuendorf M., et al., "Contribution to MPEG-H 3D Audio Version 1 ," ISO/IEC JTC1/SC29/WG11 MPEG2013/M31360, Oct. 2013, 34 pp.
Paila T., et al., "Flute—File Delivery over Unidirectional Transport; rfc6726.txt," Internet Engineering Task Force, IETF; Standard, Internet Society (ISOC) 4, Rue Des Falaises CH—1205 Geneva, Switzerland, Nov. 6, 2012 (Nov. 6, 2012), pp. 1-46, XP015086468, [retrieved on Nov. 6, 2012].
Pomberger H., et al., "Ambisonic Panning With Constant Energy Constraint," 8th German Annual Conference on Acoustics, in: DAGA 2012, pp. 1-2.
Taiwan Search Report issued in TW application No. 104103380 from the TIPO on Feb. 13, 2017, 1 p.
Wuebbolt O., et al., "Thoughts on MPEG-H 3D Audio Integration," Research & Innovation Hannover, Technicolor, Feb. 3, 2014, 9 pp.

* cited by examiner

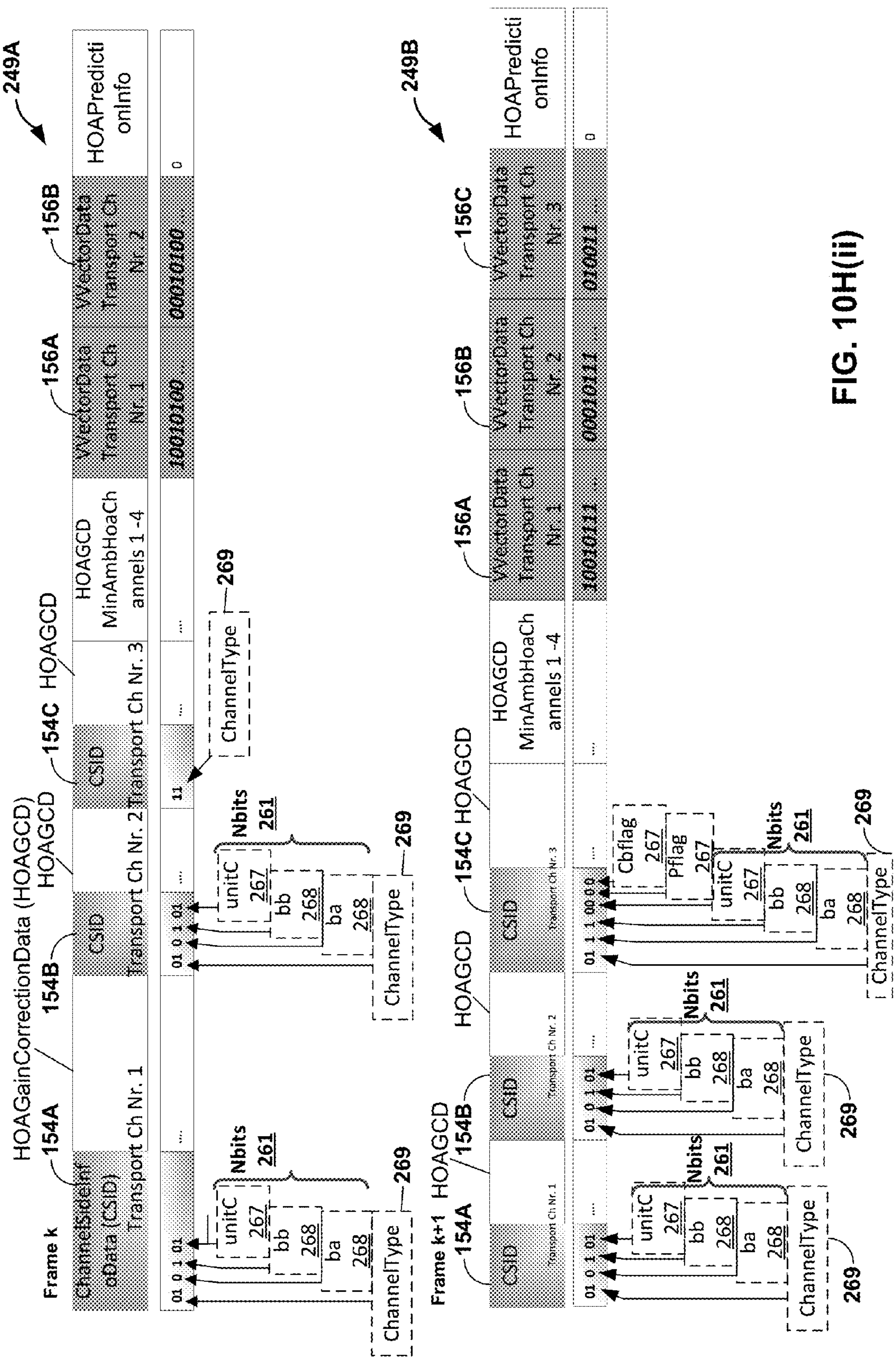
FIG. 10H(ii)

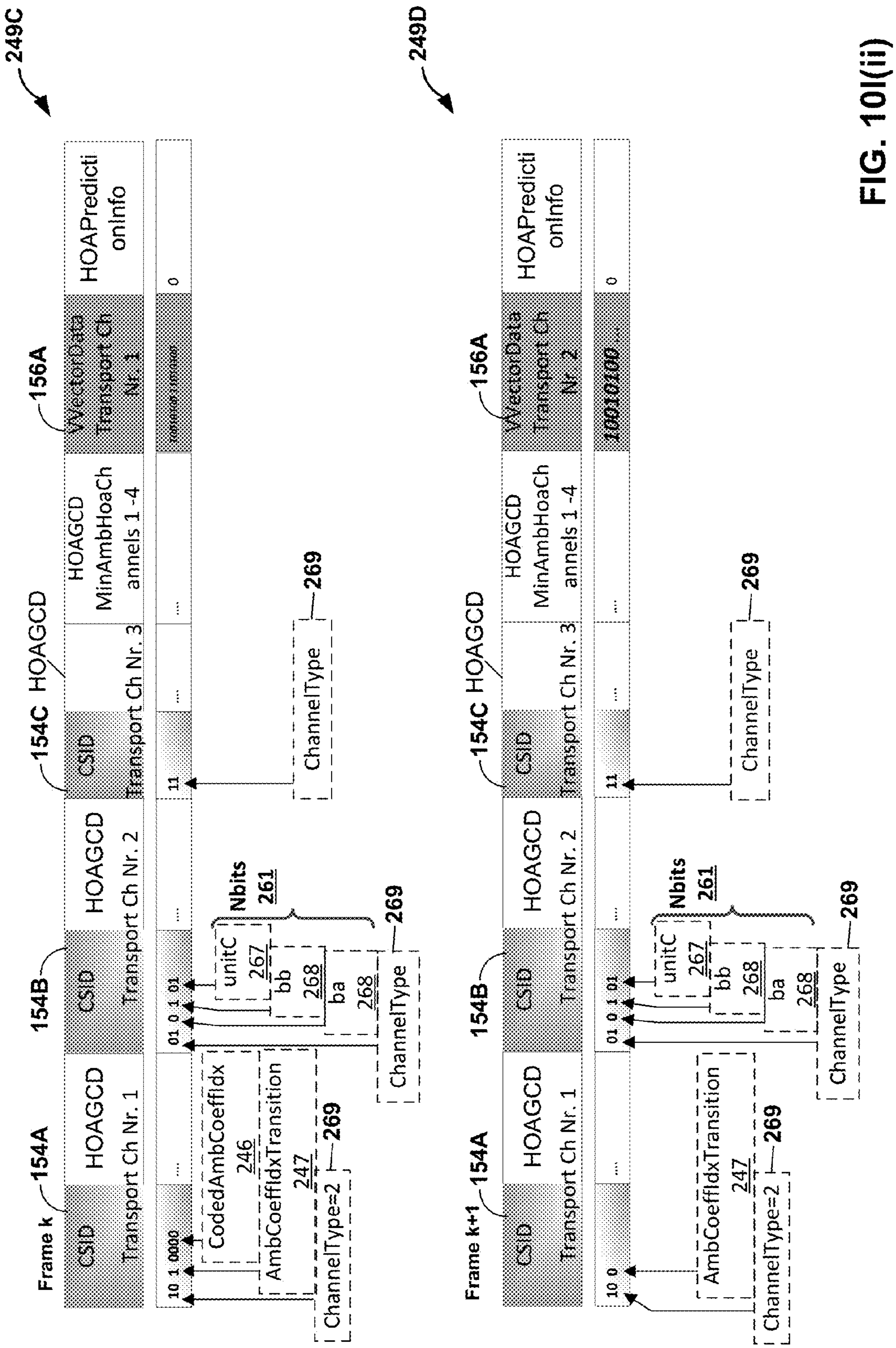
FIG. 10I(ii)

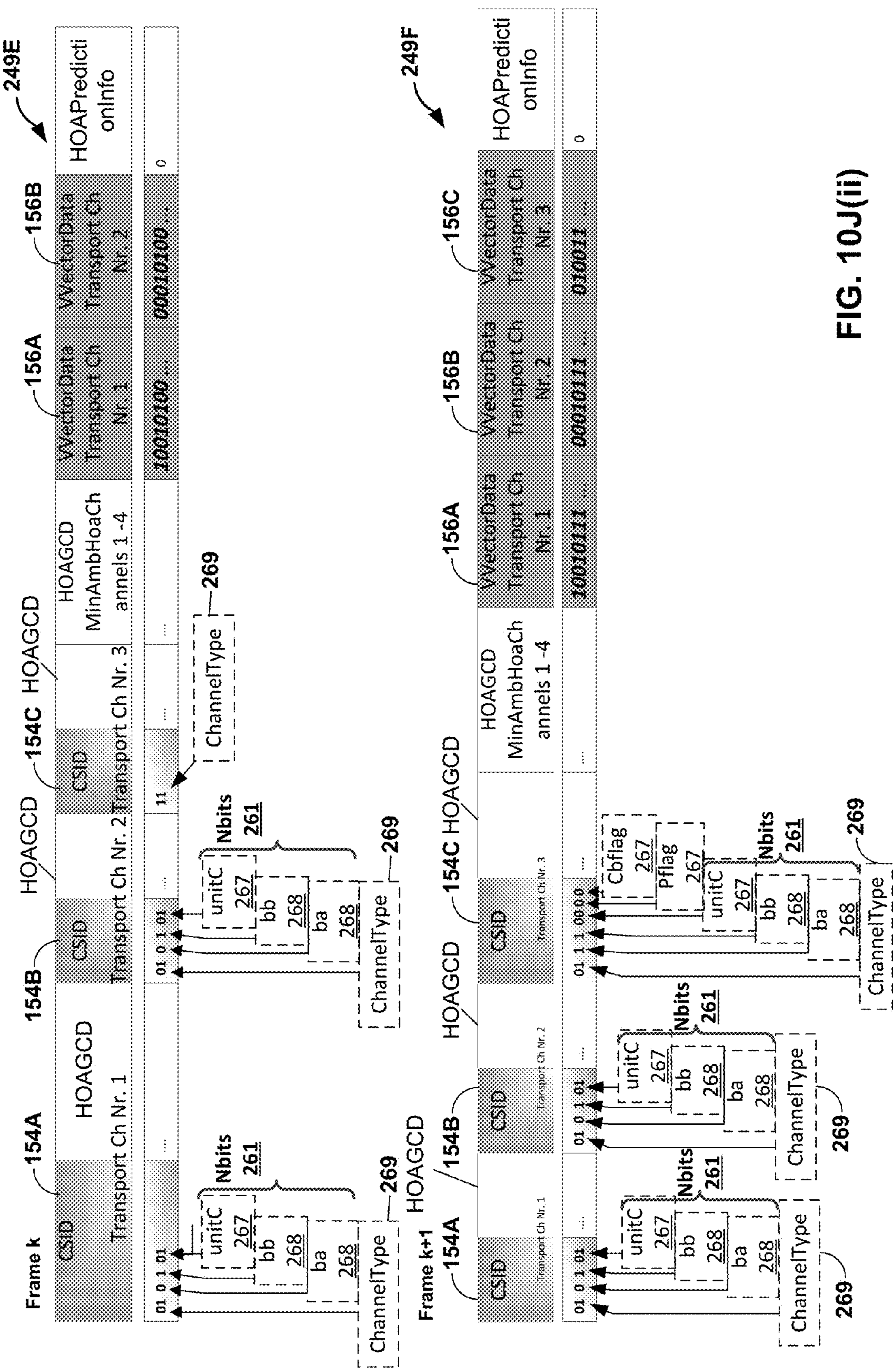
FIG. 10J(ii)

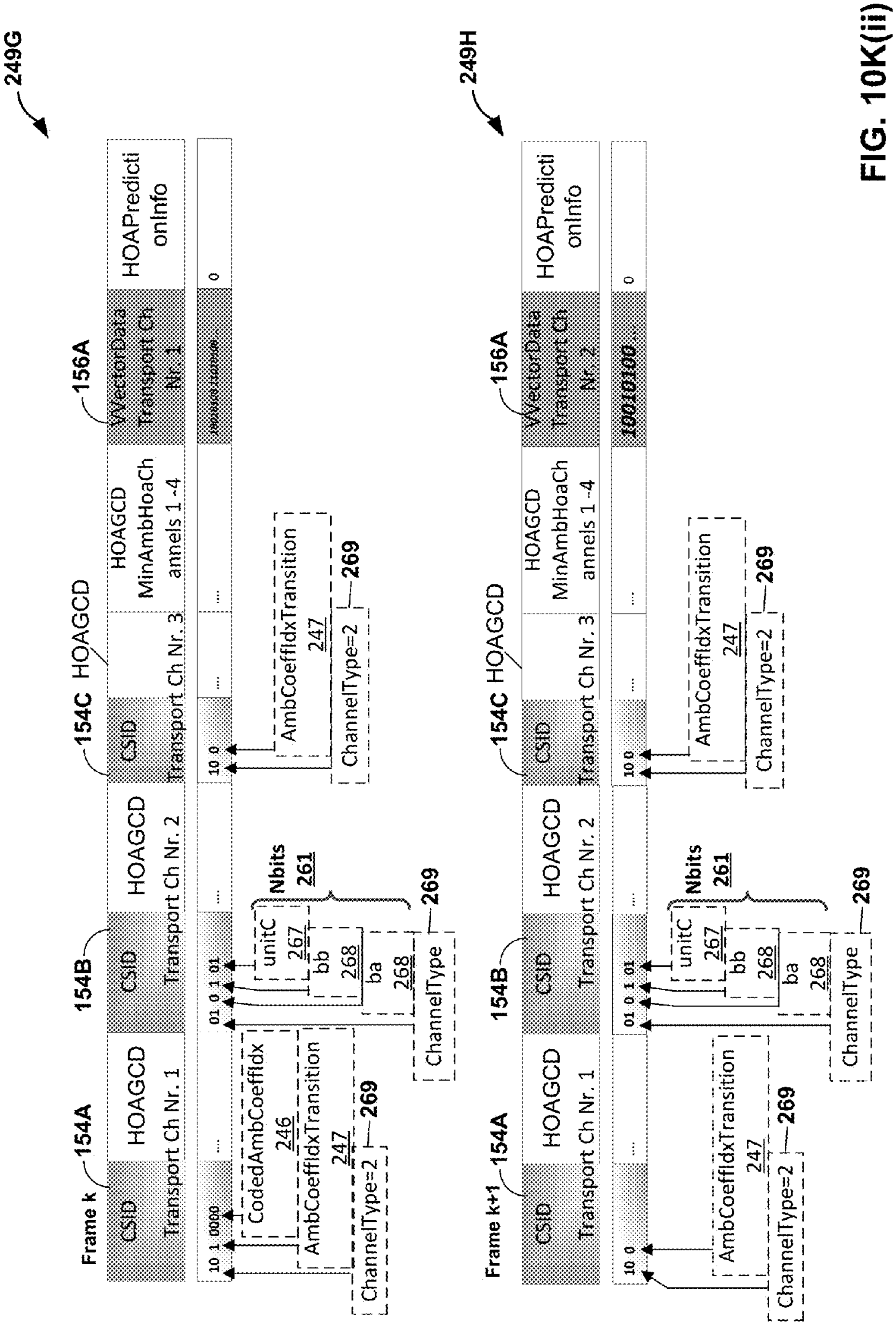
FIG. 10K(ii)

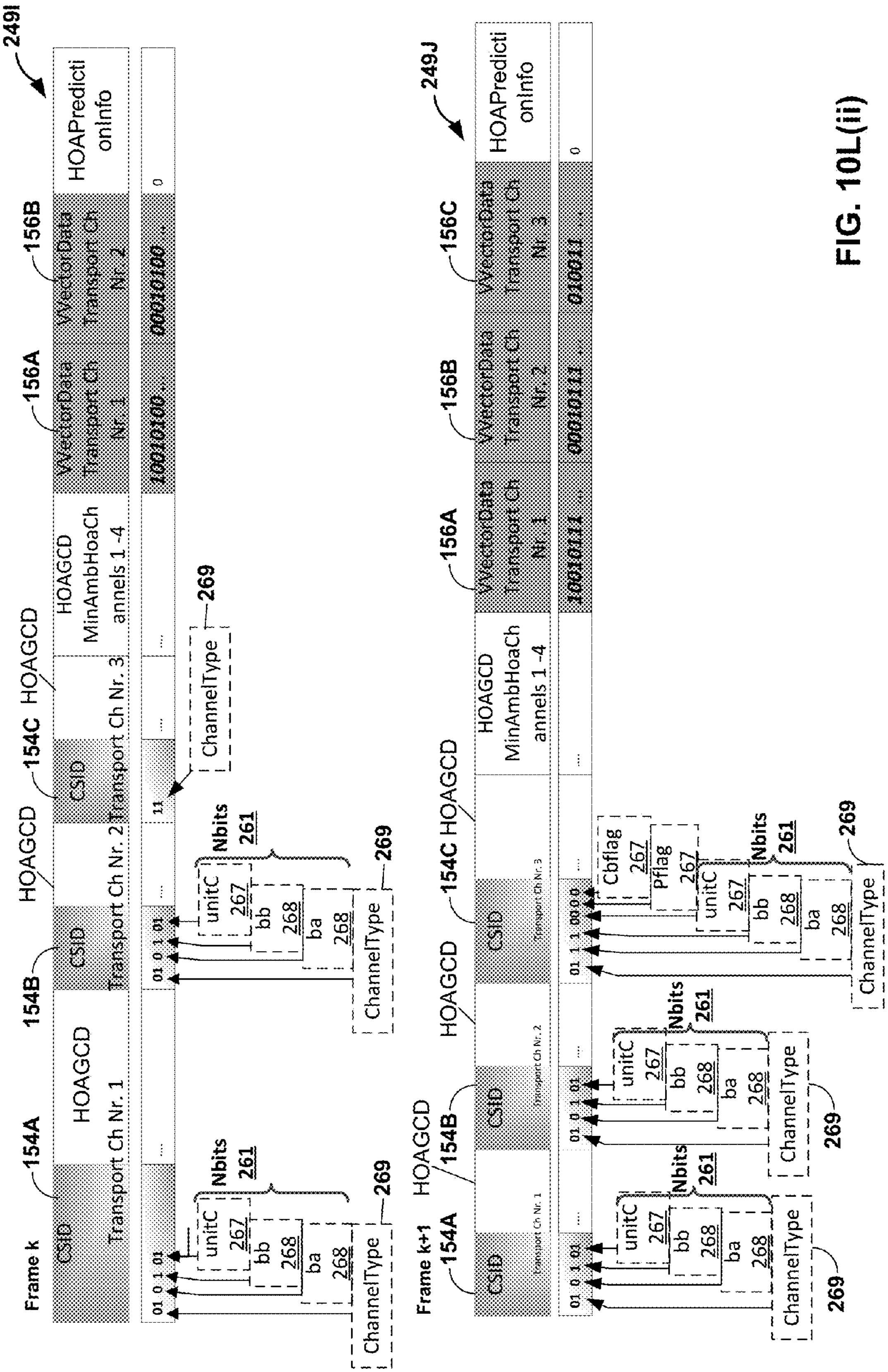
FIG. 10L(ii)

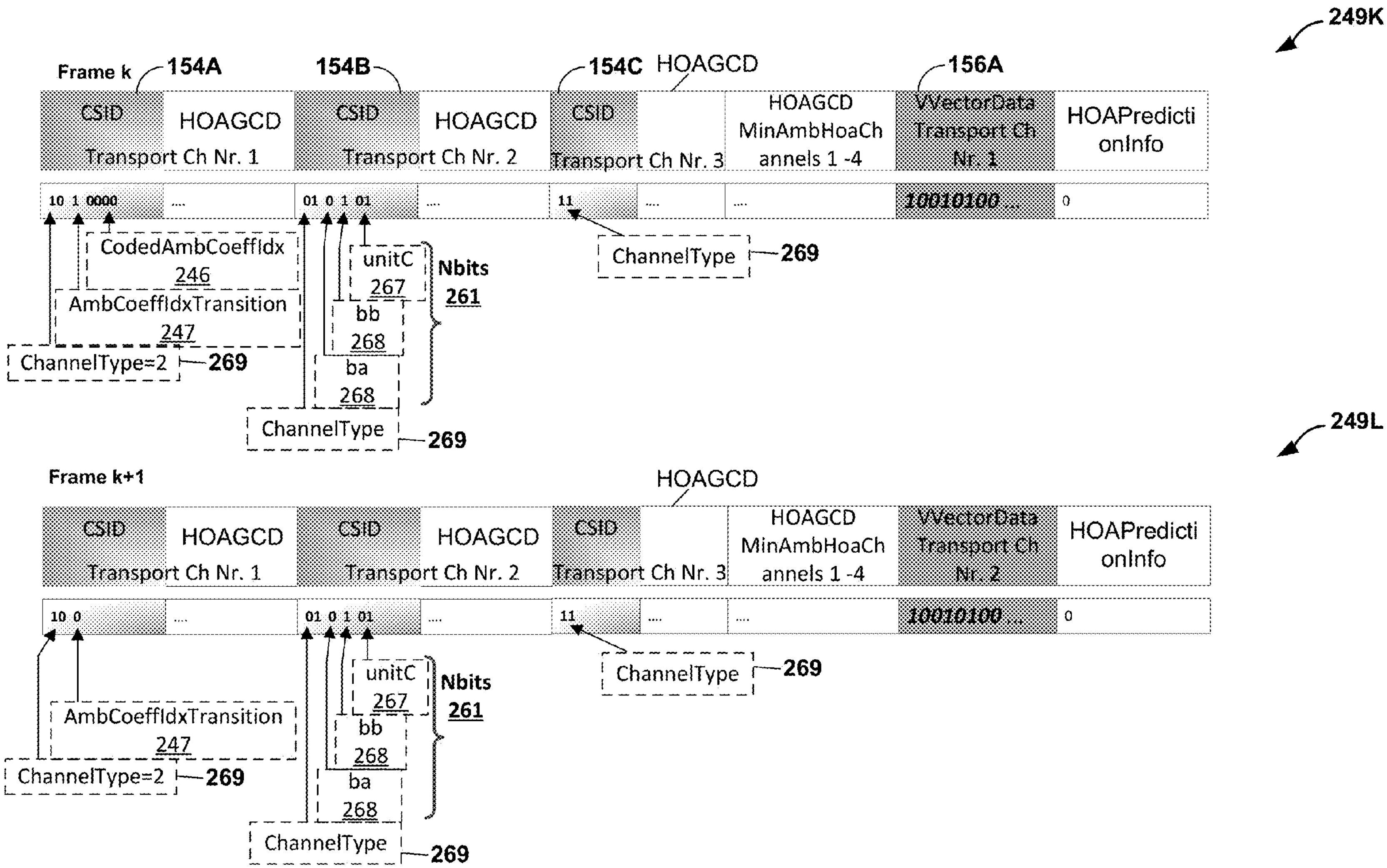
FIG. 10M(ii)

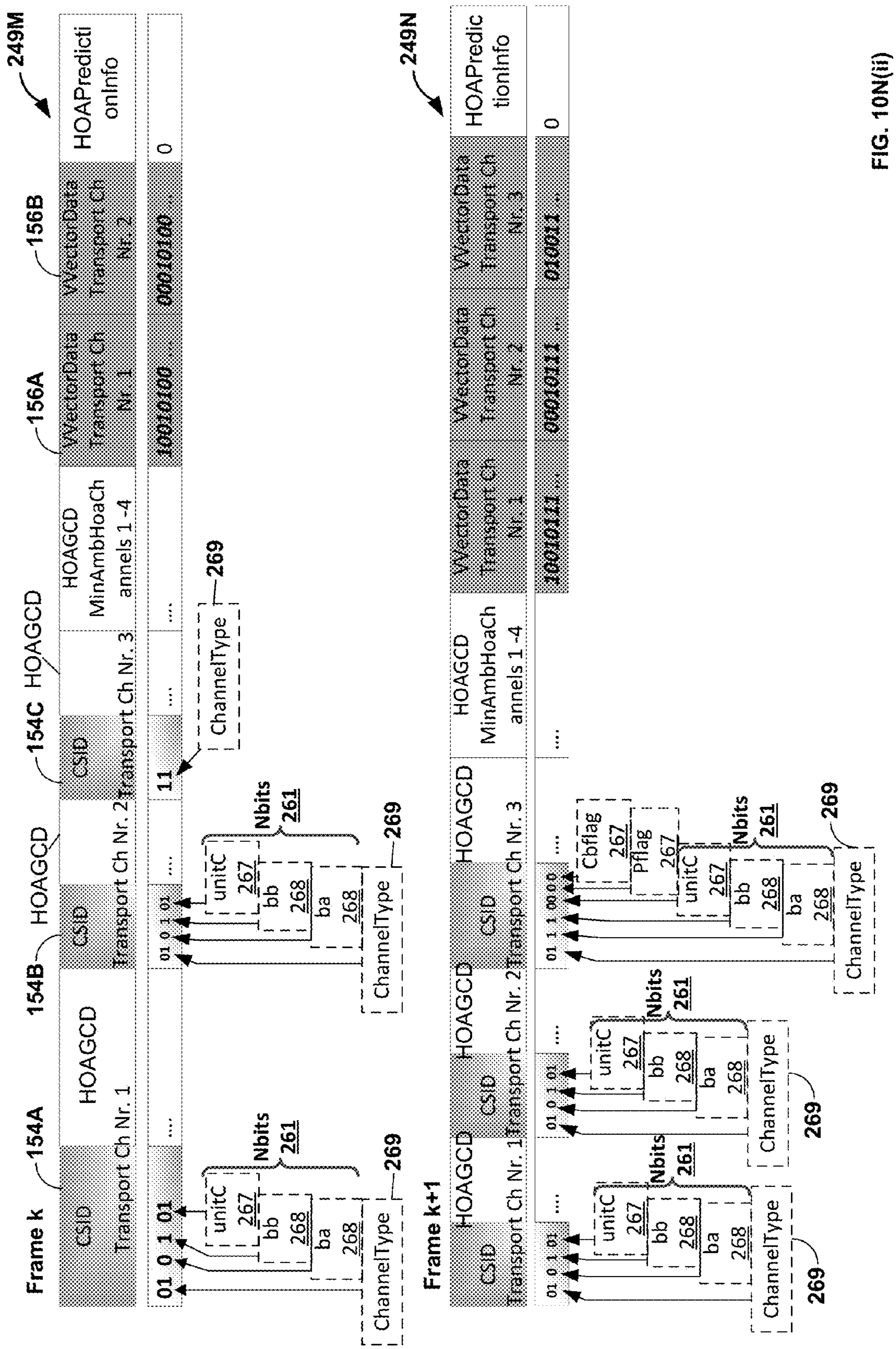
FIG. 10N(ii)

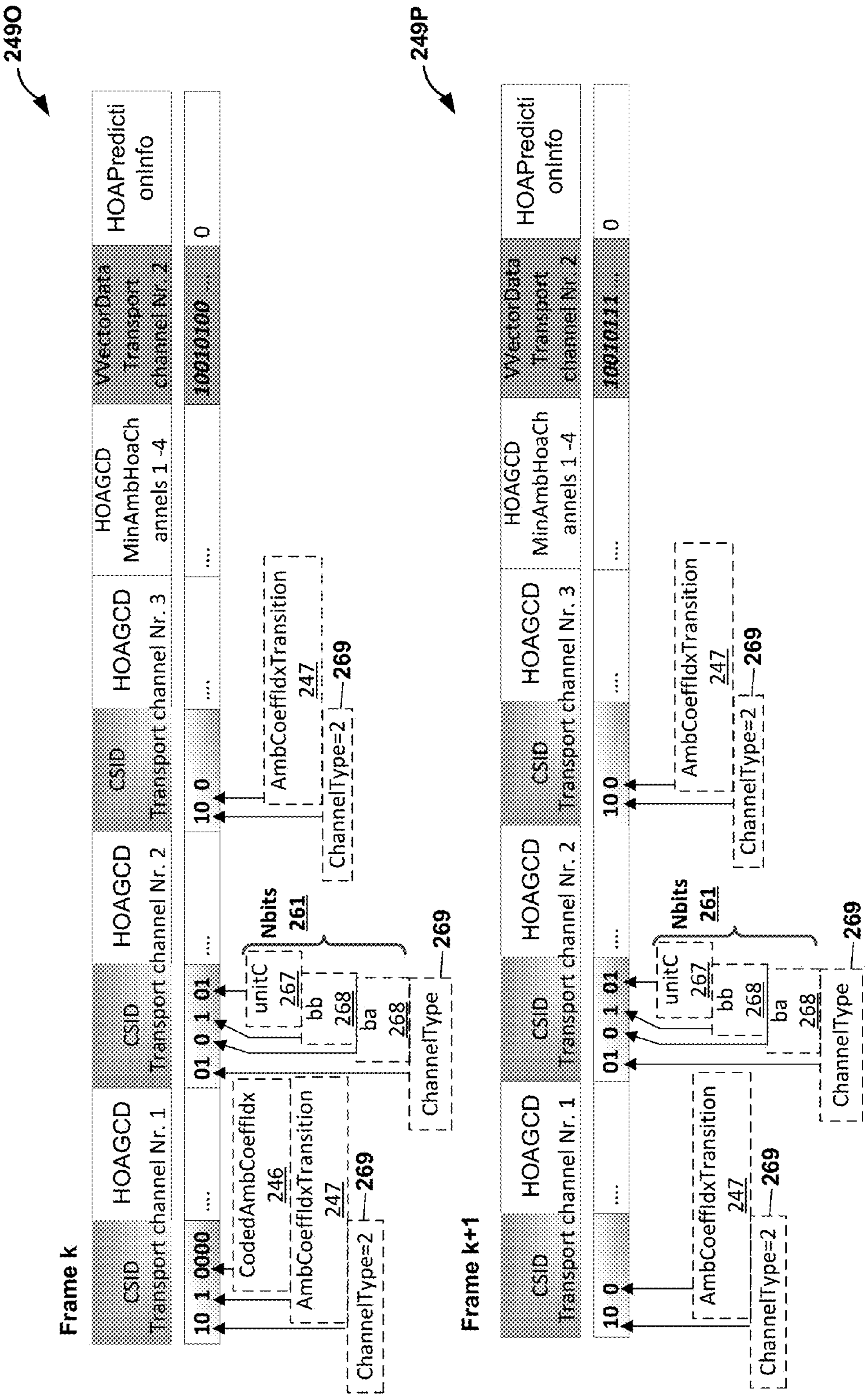
FIG. 10O(ii)

9.1 with full height

Bee sound comes from azimuth=0° and elevation=45°.

Helicopter sound comes from the sky.

Modern electronic music comes from two different directions.

People are shouting in a stadium.

$$V_x = \frac{d_2}{d_1 + d_2} V_1 + \frac{d_1}{d_1 + d_2} V_2$$

560C

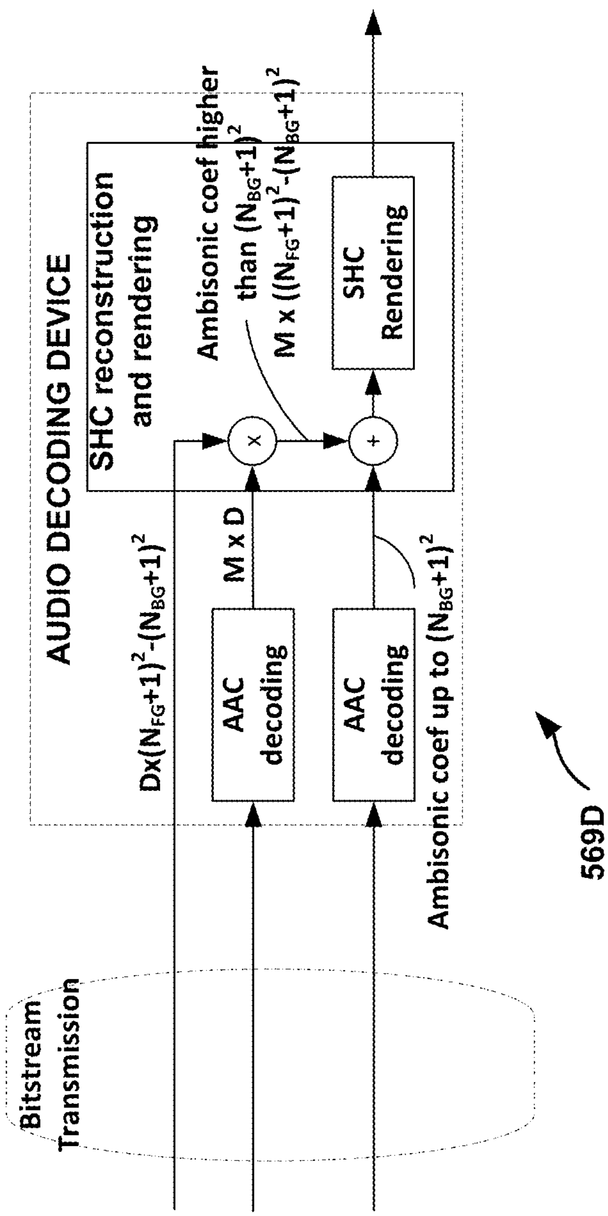
FIG. 49D(ii)

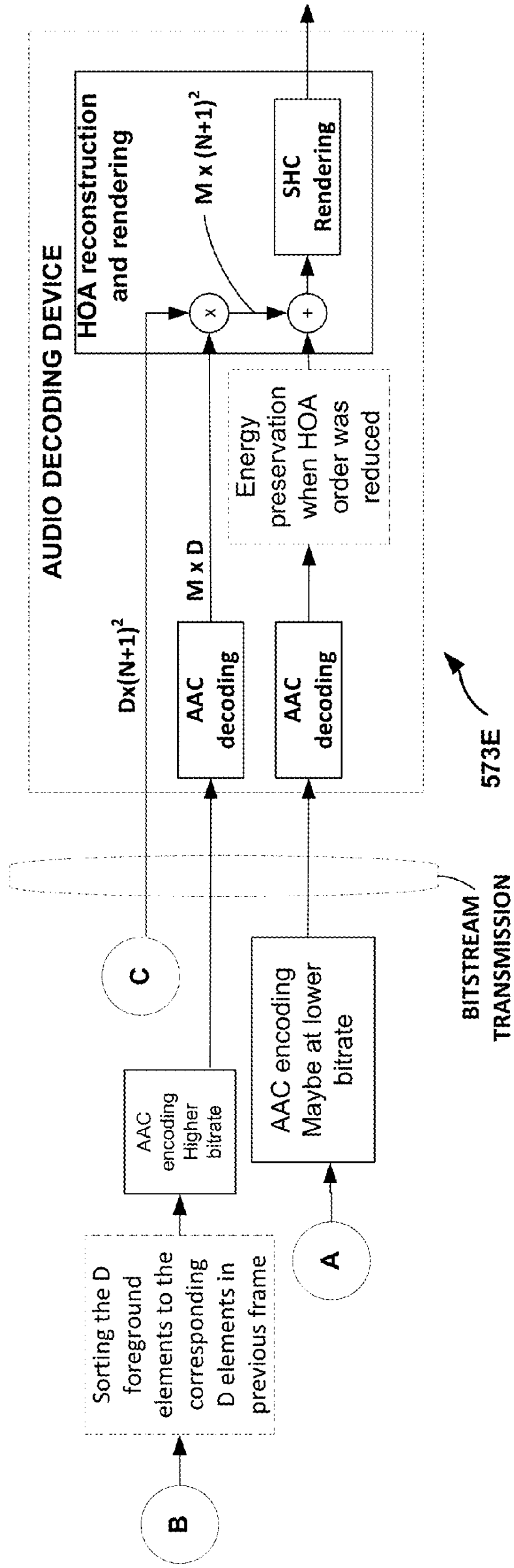
FIG. 49E(ii)

TRANSFORMED HIGHER ORDER AMBISONICS AUDIO DATA

This application claims the benefit of U.S. Provisional Application No. 61/828,445 filed 29 May 2013, U.S. Provisional Application No. 61/829,791 filed 31 May 2013, U.S. Provisional Application No. 61/899,034 filed 1 Nov. 2013, U.S. Provisional Application No. 61/899,041 filed 1 Nov. 2013, U.S. Provisional Application No. 61/829,182 filed 30 May 2013. U.S. Provisional Application No. 61/829, 174 filed 30 May 2013. U.S. Provisional Application No. 61/829,155 filed 30 May 2013, U.S. Provisional Application No. 61/933,706 filed 30 Jan. 2014, U.S. Provisional Application No. 61/829,846 filed 31 May 2013, U.S. Provisional Application No. 61/886,605 filed 3 Oct. 2013, U.S. Provisional Application No. 61/886,617 filed 3 Oct. 2013, U.S. Provisional Application No. 61/925,158 filed 8 Jan. 2014, U.S. Provisional Application No. 61/933,721 filed 30 Jan. 2014, U.S. Provisional Application No. 61/925,074 filed 8 Jan. 2014, U.S. Provisional Application No. 61/925,112 filed 8 Jan. 2014, U.S. Provisional Application No. 61/925,126 filed 8 Jan. 2014, U.S. Provisional Application No. 62/003, 515 filed 27 May 2014, and U.S. Provisional Application No. 61/828,615 filed 29 May 2013 the entire content of each which are incorporated herein by reference.

TECHNICAL FIELD

This disclosure relate to audio data and, more specifically, compression of audio data.

BACKGROUND

A higher order ambisonics (HOA) signal (often represented by a plurality of spherical harmonic coefficients (SHC) or other hierarchical elements) is a three-dimensional representation of a soundfield. This HOA or SHC representation may represent this soundfield in a manner that is independent of the local speaker geometry used to playback a multi-channel audio signal rendered from this SHC signal. This SHC signal may also facilitate backwards compatibility as this SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

SUMMARY

In general, techniques are described for compression and decompression of higher order ambisonic audio data.

In one aspect, a method comprises obtaining one or more first vectors describing distinct components of a soundfield and one or more second vectors describing background components of the soundfield, both the one or more first vectors and the one or more second vectors generated at least by performing a transformation with respect to a plurality of spherical harmonic coefficients.

In another aspect, a device comprises one or more processors configured to determine one or more first vectors describing distinct components of a soundfield and one or more second vectors describing background components of the soundfield, both the one or more first vectors and the one or more second vectors generated at least by performing a transformation with respect to a plurality of spherical harmonic coefficients.

In another aspect, a device comprises means for obtaining one or more first vectors describing distinct components of a soundfield and one or more second vectors describing background components of the soundfield, both the one or more first vectors and the one or more second vectors generated at least by performing a transformation with respect to a plurality of spherical harmonic coefficients, and means for storing the one or more first vectors.

In another aspect, a non-transitory computer-readable storage medium has stored thereon instructions that, when executed, cause one or more processors to obtain one or more first vectors describing distinct components of a soundfield and one or more second vectors describing background components of the soundfield, both the one or more first vectors and the one or more second vectors generated at least by performing a transformation with respect to a plurality of spherical harmonic coefficients.

In another aspect, a method comprises selecting one of a plurality of decompression schemes based on the indication of whether an compressed version of spherical harmonic coefficients representative of a sound field are generated from a synthetic audio object, and decompressing the compressed version of the spherical harmonic coefficients using the selected one of the plurality of decompression schemes.

In another aspect, a device comprises one or more processors configured to select one of a plurality of decompression schemes based on the indication of whether an compressed version of spherical harmonic coefficients representative of a sound field are generated from a synthetic audio object, and decompress the compressed version of the spherical harmonic coefficients using the selected one of the plurality of decompression schemes.

In another aspect, a device comprises means for selecting one of a plurality of decompression schemes based on the indication of whether an compressed version of spherical harmonic coefficients representative of a sound field are generated from a synthetic audio object, and means for decompressing the compressed version of the spherical harmonic coefficients using the selected one of the plurality of decompression schemes.

In another aspect, a non-transitory computer-readable storage medium has stored thereon instructions that, when executed, cause one or more processors of an integrated decoding device to select one of a plurality of decompression schemes based on the indication of whether an compressed version of spherical harmonic coefficients representative of a sound field are generated from a synthetic audio object, and decompress the compressed version of the spherical harmonic coefficients using the selected one of the plurality of decompression schemes.

In another aspect, a method comprises obtaining an indication of whether spherical harmonic coefficients representative of a sound field are generated from a synthetic audio object.

In another aspect, a device comprises one or more processors configured to obtain an indication of whether spherical harmonic coefficients representative of a sound field are generated from a synthetic audio object.

In another aspect, a device comprises means for storing spherical harmonic coefficients representative of a sound field, and means for obtaining an indication of whether the spherical harmonic coefficients are generated from a synthetic audio object.

In another aspect, anon-transitory computer-readable storage medium has stored thereon instructions that, when executed, cause one or more processors to obtain an indication of whether spherical harmonic coefficients representative of a sound field are generated from a synthetic audio object.

In another aspect, a method comprises quantizing one or more first vectors representative of one or more components of a sound field, and compensating for error introduced due to the quantization of the one or more first vectors in one or more second vectors that are also representative of the same one or more components of the sound field.

In another aspect, a device comprises one or more processors configured to quantize one or more first vectors representative of one or more components of a sound field, and compensate for error introduced due to the quantization of the one or more first vectors in one or more second vectors that are also representative of the same one or more components of the sound field.

In another aspect, a device comprises means for quantizing one or more first vectors representative of one or more components of a sound field, and means for compensating for error introduced due to the quantization of the one or more first vectors in one or more second vectors that are also representative of the same one or more components of the sound field.

In another aspect, a non-transitory computer-readable storage medium has stored thereon instructions that, when executed, cause one or more processors to quantize one or more first vectors representative of one or more components of a sound field, and compensate for error introduced due to the quantization of the one or more first vectors in one or more second vectors that are also representative of the same one or more components of the sound field.

In another aspect, a method comprises performing, based on a target bitrate, order reduction with respect to a plurality of spherical harmonic coefficients or decompositions thereof to generate reduced spherical harmonic coefficients or the reduced decompositions thereof, wherein the plurality of spherical harmonic coefficients represent a sound field.

In another aspect, a device comprises one or more processors configured to perform, based on a target bitrate, order reduction with respect to a plurality of spherical harmonic coefficients or decompositions thereof to generate reduced spherical harmonic coefficients or the reduced decompositions thereof, wherein the plurality of spherical harmonic coefficients represent a sound field.

In another aspect, a device comprises means for storing a plurality of spherical harmonic coefficients or decompositions thereof, and means for performing, based on a target bitrate, order reduction with respect to the plurality of spherical harmonic coefficients or decompositions thereof to generate reduced spherical harmonic coefficients or the reduced decompositions thereof, wherein the plurality of spherical harmonic coefficients represent a sound field.

In another aspect, a non-transitory computer-readable storage medium has stored thereon instructions that, when executed, cause one or more processors to perform, based on a target bitrate, order reduction with respect to a plurality of spherical harmonic coefficients or decompositions thereof to generate reduced spherical harmonic coefficients or the reduced decompositions thereof, wherein the plurality of spherical harmonic coefficients represent a sound field.

In another aspect, a method comprises obtaining a first non-zero set of coefficients of a vector that represent a distinct component of the sound field, the vector having been decomposed from a plurality of spherical harmonic coefficients that describe a sound field.

In another aspect, a device comprises one or more processors configured to obtain a first non-zero set of coefficients of a vector that represent a distinct component of a sound field, the vector having been decomposed from a plurality of spherical harmonic coefficients that describe the sound field.

In another aspect, a device comprises means for obtaining a first non-zero set of coefficients of a vector that represent a distinct component of a sound field, the vector having been decomposed from a plurality of spherical harmonic coefficients that describe the sound field, and means for storing the first non-zero set of coefficients.

In another aspect, a non-transitory computer-readable storage medium has stored thereon instructions that, when executed, cause one or more processors to determine a first non-zero set of coefficients of a vector that represent a distinct component of a sound field, the vector having been decomposed from a plurality of spherical harmonic coefficients that describe the sound field.

In another aspect, a method comprises obtaining, from a bitstream, at least one of one or more vectors decomposed from spherical harmonic coefficients that were recombined with background spherical harmonic coefficients, wherein the spherical harmonic coefficients describe a sound field, and wherein the background spherical harmonic coefficients described one or more background components of the same sound field.

In another aspect, a device comprises one or more processors configured to determine, from a bitstream, at least one of one or more vectors decomposed from spherical harmonic coefficients that were recombined with background spherical harmonic coefficients, wherein the spherical harmonic coefficients describe a sound field, and wherein the background spherical harmonic coefficients described one or more background components of the same sound field.

In another aspect, a device comprises means for obtaining, from a bitstream, at least one of one or more vectors decomposed from spherical harmonic coefficients that were recombined with background spherical harmonic coefficients, wherein the spherical harmonic coefficients describe a sound field, and wherein the background spherical harmonic coefficients described one or more background components of the same sound field.

In another aspect, a non-transitory computer-readable storage medium has stored thereon instructions that, when executed, cause one or more processors to obtain, from a bitstream, at least one of one or more vectors decomposed from spherical harmonic coefficients that were recombined with background spherical harmonic coefficients, wherein the spherical harmonic coefficients describe a sound field, and wherein the background spherical harmonic coefficients described one or more background components of the same sound field.

In another aspect, a method comprises identifying one or more distinct audio objects from one or more spherical harmonic coefficients (SHC) associated with the audio objects based on a directionality determined for one or more of the audio objects.

In another aspect, a device comprises one or more processors configured to identify one or more distinct audio objects from one or more spherical harmonic coefficients (SHC) associated with the audio objects based on a directionality determined for one or more of the audio objects.

In another aspect, a device comprises means for storing one or more spherical harmonic coefficients (SHC), and means for identifying one or more distinct audio objects from the one or more spherical harmonic coefficients (SHC)

associated with the audio objects based on a directionality determined for one or more of the audio objects.

In another aspect, a non-transitory computer-readable storage medium has stored thereon instructions that, when executed, cause one or more processors to identify one or more distinct audio objects from one or more spherical harmonic coefficients (SHC) associated with the audio objects based on a directionality determined for one or more of the audio objects.

In another aspect, a method comprises performing a vector-based synthesis with respect to a plurality of spherical harmonic coefficients to generate decomposed representations of the plurality of spherical harmonic coefficients representative of one or more audio objects and corresponding directional information, wherein the spherical harmonic coefficients are associated with an order and describe a sound field, determining distinct and background directional information from the directional information, reducing an order of the directional information associated with the background audio objects to generate transformed background directional information, applying compensation to increase values of the transformed directional information to preserve an overall energy of the sound field.

In another aspect, a device comprises one or more processors configured to perform a vector-based synthesis with respect to a plurality of spherical harmonic coefficients to generate decomposed representations of the plurality of spherical harmonic coefficients representative of one or more audio objects and corresponding directional information, wherein the spherical harmonic coefficients are associated with an order and describe a sound field, determine distinct and background directional information from the directional information, reduce an order of the directional information associated with the background audio objects to generate transformed background directional information, apply compensation to increase values of the transformed directional information to preserve an overall energy of the sound field.

In another aspect, a device comprises means for performing a vector-based synthesis with respect to a plurality of spherical harmonic coefficients to generate decomposed representations of the plurality of spherical harmonic coefficients representative of one or more audio objects and corresponding directional information, wherein the spherical harmonic coefficients are associated with an order and describe a sound field, means for determining distinct and background directional information from the directional information, means for reducing an order of the directional information associated with the background audio objects to generate transformed background directional information, and means for applying compensation to increase values of the transformed directional information to preserve an overall energy of the sound field.

In another aspect, a non-transitory computer-readable storage medium has stored thereon instructions that, when executed, cause one or more processors to perform a vector-based synthesis with respect to a plurality of spherical harmonic coefficients to generate decomposed representations of the plurality of spherical harmonic coefficients representative of one or more audio objects and corresponding directional information, wherein the spherical harmonic coefficients are associated with an order and describe a sound field, determine distinct and background directional information from the directional information, reduce an order of the directional information associated with the background audio objects to generate transformed background directional information, and apply compensation to increase values of the transformed directional information to preserve an overall energy of the sound field.

In another aspect, a method comprises obtaining decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients.

In another aspect, a device comprises one or more processors configured to obtain decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients.

In another aspect, a device comprises means for storing a first plurality of spherical harmonic coefficients and a second plurality of spherical harmonic coefficients, and means for obtain decomposed interpolated spherical harmonic coefficients for a time segment by, at least in part, performing an interpolation with respect to a first decomposition of the first plurality of spherical harmonic coefficients and the second decomposition of a second plurality of spherical harmonic coefficients.

In another aspect, a non-transitory computer-readable storage medium has stored thereon instructions that, when executed, cause one or more processors to obtain decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients.

In another aspect, a method comprises obtaining a bitstream comprising a compressed version of a spatial component of a sound field, the spatial component generated by performing a vector based synthesis with respect to a plurality of spherical harmonic coefficients.

In another aspect, a device comprises one or more processors configured to obtain a bitstream comprising a compressed version of a spatial component of a sound field, the spatial component generated by performing a vector based synthesis with respect to a plurality of spherical harmonic coefficients.

In another aspect, a device comprises means for obtaining a bitstream comprising a compressed version of a spatial component of a sound field, the spatial component generated by performing a vector based synthesis with respect to a plurality of spherical harmonic coefficients, and means for storing the bitstream.

In another aspect, a non-transitory computer-readable storage medium has stored thereon instructions that when executed cause one or more processors to obtain a bitstream comprising a compressed version of a spatial component of a sound field, the spatial component generated by performing a vector based synthesis with respect to a plurality of spherical harmonic coefficients.

In another aspect, a method comprises generating a bitstream comprising a compressed version of a spatial component of a sound field, the spatial component generated by performing a vector based synthesis with respect to a plurality of spherical harmonic coefficients.

In another aspect, a device comprises one or more processors configured to generate a bitstream comprising a compressed version of a spatial component of a sound field, the spatial component generated by performing a vector based synthesis with respect to a plurality of spherical harmonic coefficients.

In another aspect, a device comprises means for generating a bitstream comprising a compressed version of a spatial component of a sound field, the spatial component generated by performing a vector based synthesis with respect to a plurality of spherical harmonic coefficients, and means for storing the bitstream.

In another aspect, a non-transitory computer-readable storage medium has instructions that when executed cause one or more processors to generate a bitstream comprising a compressed version of a spatial component of a sound field, the spatial component generated by performing a vector based synthesis with respect to a plurality of spherical harmonic coefficients.

In another aspect, a method comprises identifying a Huffman codebook to use when decompressing a compressed version of a spatial component of a plurality of compressed spatial components based on an order of the compressed version of the spatial component relative to remaining ones of the plurality of compressed spatial components, the spatial component generated by performing a vector based synthesis with respect to a plurality of spherical harmonic coefficients.

In another aspect, a device comprises one or more processors configured to identify a Huffman codebook to use when decompressing a compressed version of a spatial component of a plurality of compressed spatial components based on an order of the compressed version of the spatial component relative to remaining ones of the plurality of compressed spatial components, the spatial component generated by performing a vector based synthesis with respect to a plurality of spherical harmonic coefficients.

In another aspect, a device comprises means for identifying a Huffman codebook to use when decompressing a compressed version of a spatial component of a plurality of compressed spatial components based on an order of the compressed version of the spatial component relative to remaining ones of the plurality of compressed spatial components, the spatial component generated by performing a vector based synthesis with respect to a plurality of spherical harmonic coefficients, and means for string the plurality of compressed spatial components.

In another aspect, a non-transitory computer-readable storage medium has stored thereon instructions that when executed cause one or more processors to identify a Huffman codebook to use when decompressing a spatial component of a plurality of spatial components based on an order of the spatial component relative to remaining ones of the plurality of spatial components, the spatial component generated by performing a vector based synthesis with respect to a plurality of spherical harmonic coefficients.

In another aspect, a method comprises identifying a Huffman codebook to use when compressing a spatial component of a plurality of spatial components based on an order of the spatial component relative to remaining ones of the plurality of spatial components, the spatial component generated by performing a vector based synthesis with respect to a plurality of spherical harmonic coefficients.

In another aspect, a device comprises one or more processors configured to identify a Huffman codebook to use when compressing a spatial component of a plurality of spatial components based on an order of the spatial component relative to remaining ones of the plurality of spatial components, the spatial component generated by performing a vector based synthesis with respect to a plurality of spherical harmonic coefficients.

In another aspect, a device comprises means for storing a Huffman codebook, and means for identifying the Huffman codebook to use when compressing a spatial component of a plurality of spatial components based on an order of the spatial component relative to remaining ones of the plurality of spatial components, the spatial component generated by performing a vector based synthesis with respect to a plurality of spherical harmonic coefficients.

In another aspect, a non-transitory computer-readable storage medium has stored thereon instructions that, when executed, cause one or more processors to identify a Huffman codebook to use when compressing a spatial component of a plurality of spatial components based on an order of the spatial component relative to remaining ones of the plurality of spatial components, the spatial component generated by performing a vector based synthesis with respect to a plurality of spherical harmonic coefficients.

In another aspect, a method comprises determining a quantization step size to be used when compressing a spatial component of a sound field, the spatial component generated by performing a vector based synthesis with respect to a plurality of spherical harmonic coefficients.

In another aspect, a device comprises one or more processors configured to determine a quantization step size to be used when compressing a spatial component of a sound field, the spatial component generated by performing a vector based synthesis with respect to a plurality of spherical harmonic coefficients.

In another aspect, a device comprises means for determining a quantization step size to be used when compressing a spatial component of a sound field, the spatial component generated by performing a vector based synthesis with respect to a plurality of spherical harmonic coefficients, and means for storing the quantization step size.

In another aspect, a non-transitory computer-readable storage medium has stored thereon instructions that when executed cause one or more processors to determine a quantization step size to be used when compressing a spatial component of a sound field, the spatial component generated by performing a vector based synthesis with respect to a plurality of spherical harmonic coefficients.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
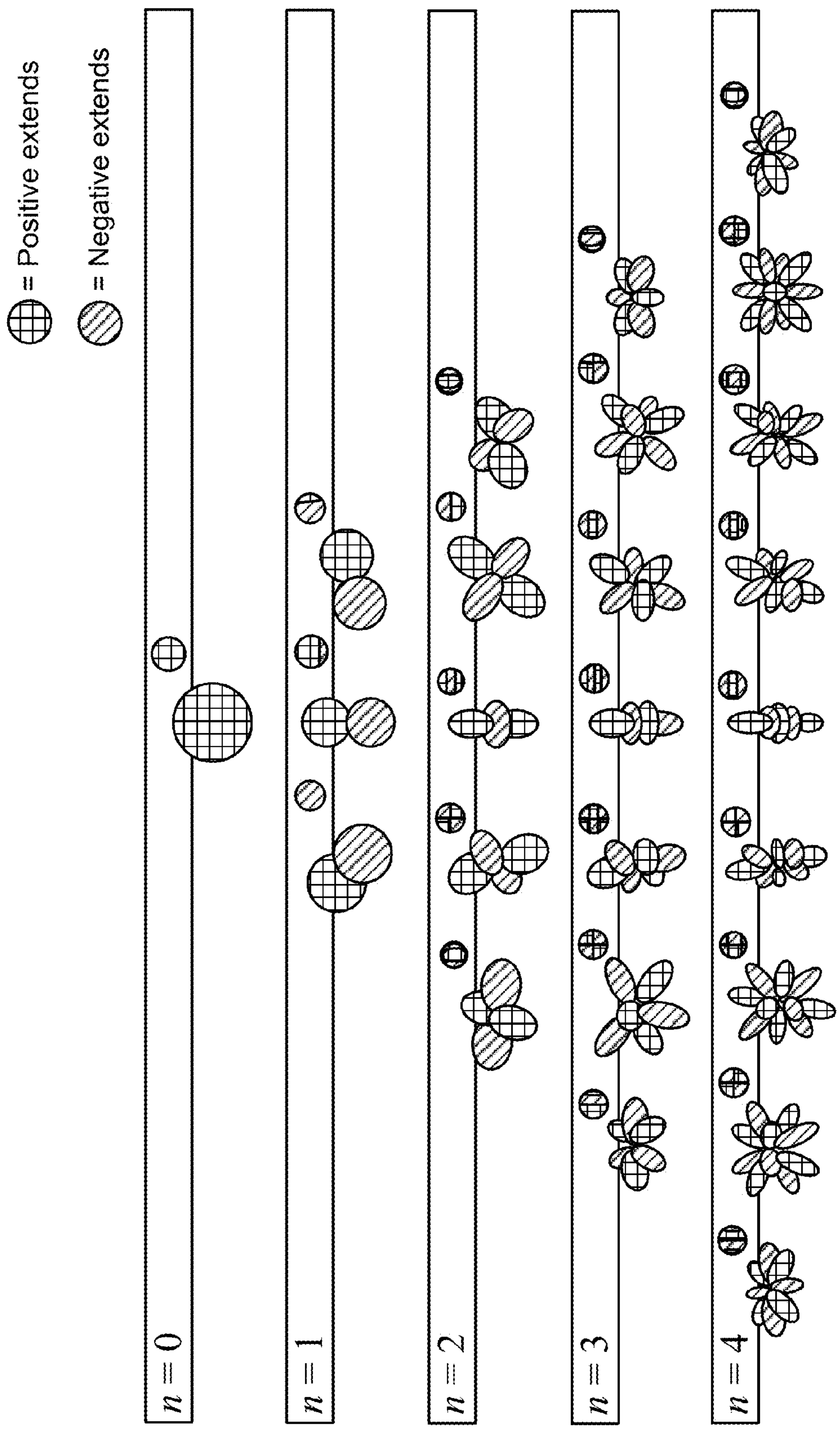
FIGS. 1 and 2 are diagrams illustrating spherical harmonic basis functions of various orders and sub-orders.

The evolution of surround sound has made available many output formats for entertainment nowadays. Examples of such consumer surround sound formats are mostly [channel] based in that they implicitly specify feeds to loudspeakers in certain geometrical coordinates. These include the popular 5.1 format (which includes the following six channels: front left (FL), front right (FR), center or front center, back left or surround left, back right or surround right, and low frequency effects (LFE)), the growing 7.1 format, various formats that includes height speakers such as the 7.1.4 format and the 22.2 format (e.g., for use with the Ultra High Definition Television standard). Non-consumer formats can span any number of speakers (in symmetric and non-symmetric geometries) often termed [surround arrays]. One example of such an array includes 32 loudspeakers positioned on co-ordinates on the corners of a truncated icosohedron.

The input to a future MPEG encoder is optionally one of three possible formats: (i) traditional channel-based audio (as discussed above), which is meant to be played through loudspeakers at pre-specified positions: (ii) object-based audio, which involves discrete pulse-code-modulation (PCM) data for single audio objects with associated metadata containing their location coordinates (amongst other information); and (iii) scene-based audio, which involves representing the soundfield using coefficients of spherical harmonic basis functions (also called "spherical harmonic coefficients" or SHC, "Higher Order Ambisonics" or HOA, and "HOA coefficients"). This future MPEG encoder may be described in more detail in a document entitled "Call for Proposals for 3D Audio," by the International Organization for Standardization/International Electrotechnical Commission (ISO)/(IEC) JTCI/SC29/WG11/N13411, released January 2013 in Geneva, Switzerland, and available at http:///mpeg.qchiariglione.org/sites/default/files/fils/standards/parts/docs/w13411.zip.

There are various [surround-sound] channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend the efforts to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a soundfield. The hierarchical set of elements may refer to a set of elements in which the elements are ordered such that a basic set of lower-ordered elements provides a full representation of the modeled soundfield. As the set is extended to include higher-order elements, the representation becomes more detailed, increasing resolution.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

This expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

Figure 2:
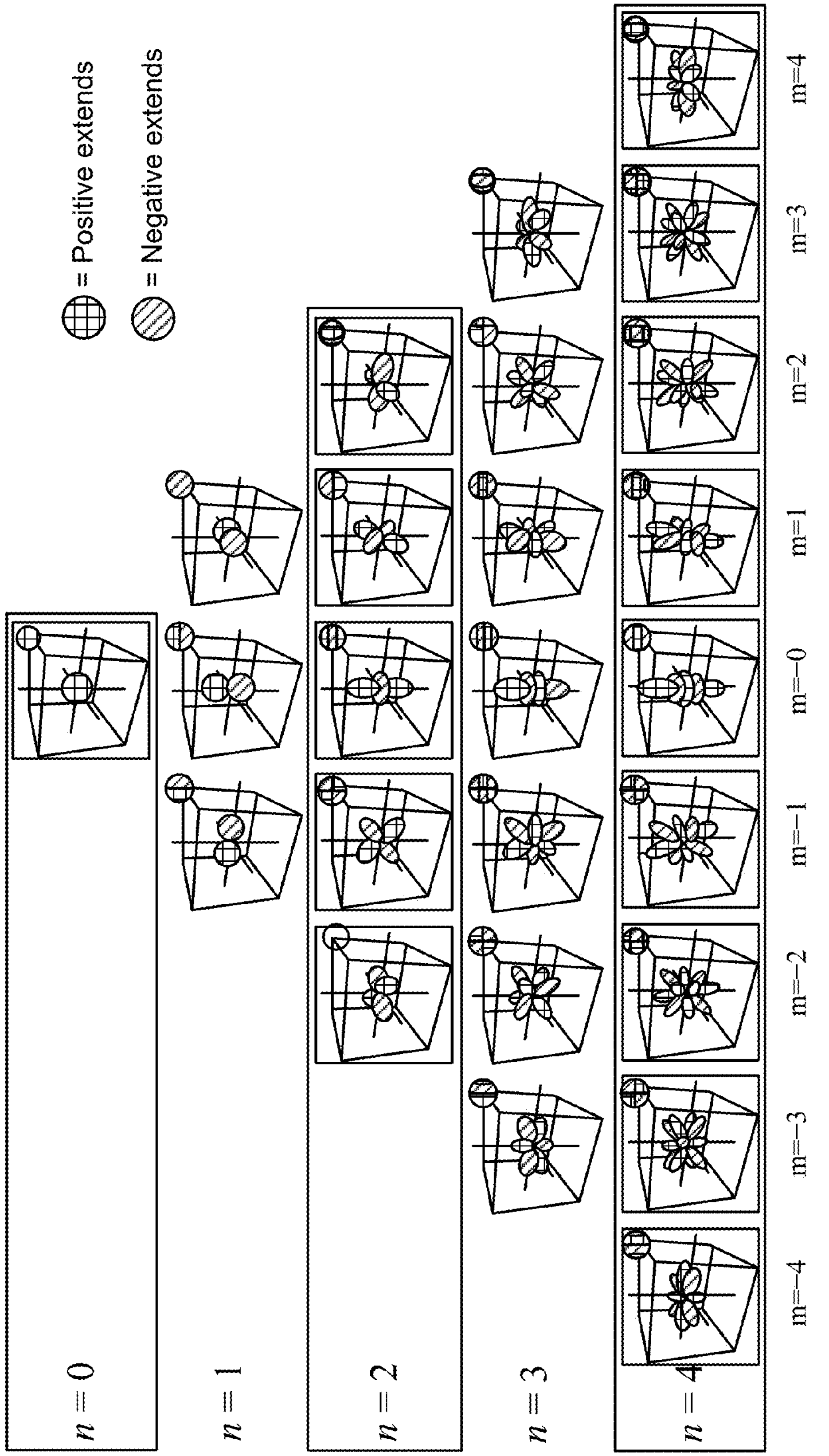

FIG. 2 is another diagram illustrating spherical harmonic basis functions from the zero order (n=0) to the fourth order (n=4). In FIG. 2, the spherical harmonic basis functions are shown in three-dimensional coordinate space with both the order and the suborder shown.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone. Various examples of how SHC may be derived from microphone arrays are described in Poletti, M., "Three-Dimensional Surround Sound Systems Based on Spherical Harmonics," J. Audio Eng. Soc., Vol. 53, No. 1, 2005 November, pp. 1004-1025.

To illustrate how these SHCs may be derived from an object-based description, consider the following equation. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and its location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, these coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of object-based and SHC-based audio coding.

Figure 3:
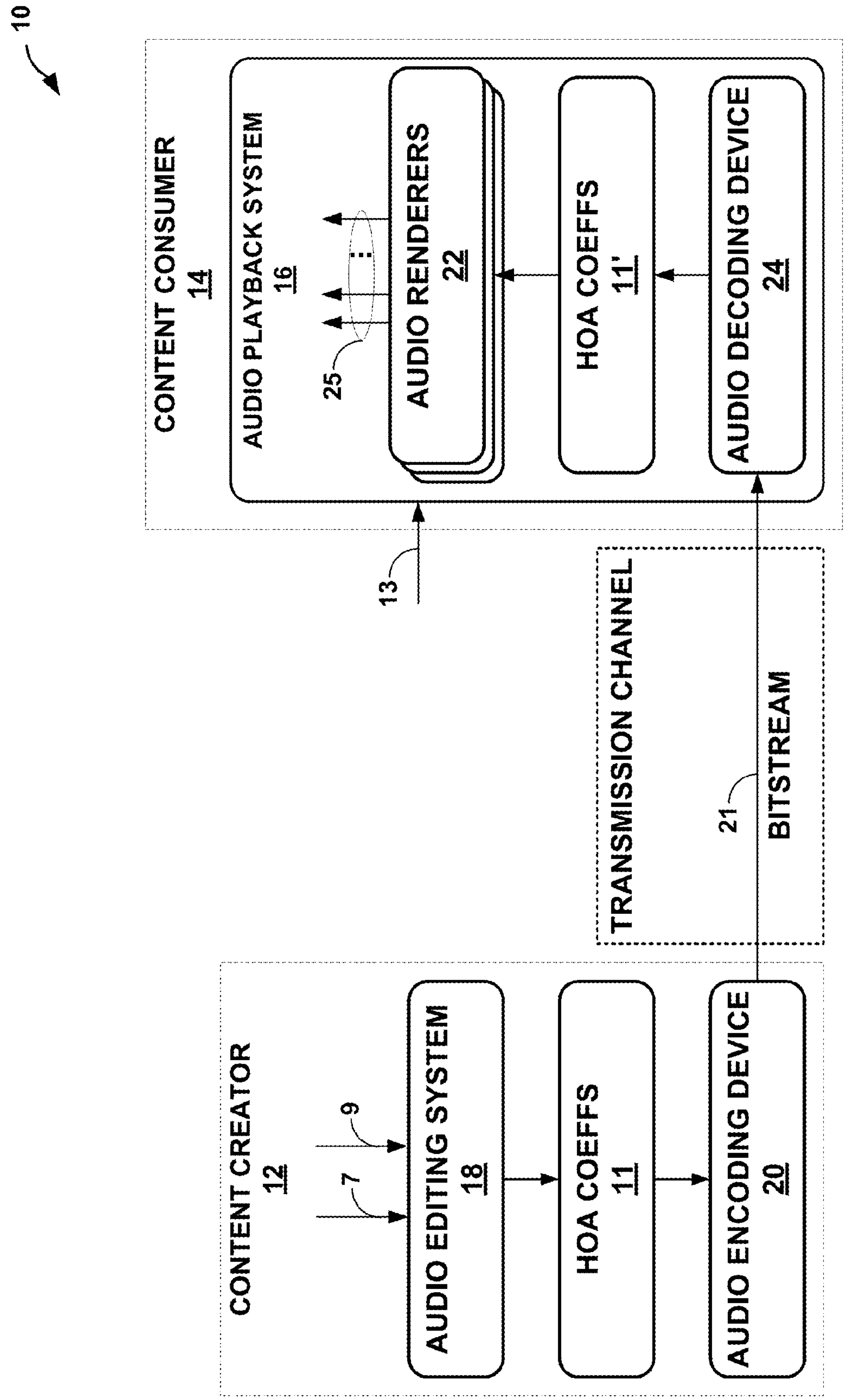
FIG. 3 is a diagram illustrating a system that may perform various aspects of the techniques described in this disclosure.

FIG. 3 is a diagram illustrating a system 10 that may perform various aspects of the techniques described in this disclosure. As shown in the example of FIG. 3, the system 10 includes a content creator 12 and a content consumer 14. While described in the context of the content creator 12 and the content consumer 14, the techniques may be implemented in any context in which SHCs (which may also be referred to as HOA coefficients) or any other hierarchical representation of a soundfield are encoded to form a bitstream representative of the audio data. Moreover, the content creator 12 may represent any form of computing device capable of implementing the techniques described in this disclosure, including a handset (or cellular phone), a tablet computer, a smart phone, or a desktop computer to provide a few examples. Likewise, the content consumer 14 may represent any form of computing device capable of implementing the techniques described in this disclosure, including a handset (or cellular phone), a tablet computer, a smart phone, a set-top box, or a desktop computer to provide a few examples.

The content creator 12 may represent a movie studio or other entity that may generate multi-channel audio content for consumption by content consumers, such as the content consumer 14. In some examples, the content creator 12 may represent an individual user who would like to compress HOA coefficients 11. Often, this content creator generates audio content in conjunction with video content. The content consumer 14 represents an individual that owns or has access to an audio playback system, which may refer to any form of audio playback system capable of rendering SHC for play back as multi-channel audio content. In the example of FIG. 3, the content consumer 14 includes an audio playback system 16.

The content creator 12 includes an audio editing system 18. The content creator 12 obtain live recordings 7 in various formats (including directly as HOA coefficients) and audio objects 9, which the content creator 12 may edit using audio editing system 18. The content creator may, during the editing process, render HOA coefficients 11 from audio objects 9, listening to the rendered speaker feeds in an attempt to identify various aspects of the soundfield that require further editing. The content creator 12 may then edit HOA coefficients 11 (potentially indirectly through manipulation of different ones of the audio objects 9 from which the source HOA coefficients may be derived in the manner described above). The content creator 12 may employ the audio editing system 18 to generate the HOA coefficients 11. The audio editing system 18 represents any system capable of editing audio data and outputting this audio data as one or more source spherical harmonic coefficients.

When the editing process is complete, the content creator 12 may generate a bitstream 21 based on the HOA coefficients 11. That is, the content creator 12 includes an audio encoding device 20 that represents a device configured to encode or otherwise compress HOA coefficients 11 in accordance with various aspects of the techniques described in this disclosure to generate the bitstream 21. The audio encoding device 20 may generate the bitstream 21 for transmission, as one example, across a transmission channel, which may be a wired or wireless channel, a data storage device, or the like. The bitstream 21 may represent an encoded version of the HOA coefficients 11 and may include a primary bitstream and another side bitstream, which may be referred to as side channel information.

Although described in more detail below, the audio encoding device 20 may be configured to encode the HOA coefficients 11 based on a vector-based synthesis or a directional-based synthesis. To determine whether to perform the vector-based synthesis methodology or a directional-based synthesis methodology, the audio encoding device 20 may determine, based at least in part on the HOA coefficients 11, whether the HOA coefficients 11 were generated via a natural recording of a soundfield (e.g., live recording 7) or produced artificially (i.e., synthetically) from, as one example, audio objects 9, such as a PCM object. When the HOA coefficients 11 were generated form the audio objects 9, the audio encoding device 20 may encode the HOA coefficients 11 using the directional-based synthesis methodology. When the HOA coefficients 11 were captured live using, for example, an eigenmike, the audio encoding device 20 may encode the HOA coefficients 11 based on the vector-based synthesis methodology. The above distinction represents one example of where vector-based or directional-based synthesis methodology may be deployed. There may be other cases where either or both may be useful for natural recordings, artificially generated content or a mixture of the two (hybrid content). Furthermore, it is also possible to use both methodologies simultaneously for coding a single time-frame of HOA coefficients.

Assuming for purposes of illustration that the audio encoding device 20 determines that the HOA coefficients 11 were captured live or otherwise represent live recordings, such as the live recording 7, the audio encoding device 20 may be configured to encode the HOA coefficients 11 using a vector-based synthesis methodology involving application of a linear invertible transform (LIT). One example of the linear invertible transform is referred to as a "singular value decomposition" (or "SVD"). In this example, the audio encoding device 20 may apply SVD to the HOA coefficients 11 to determine a decomposed version of the HOA coefficients 11. The audio encoding device 20 may then analyze the decomposed version of the HOA coefficients 11 to identify various parameters, which may facilitate reordering of the decomposed version of the HOA coefficients 11. The audio encoding device 20 may then reorder the decomposed version of the HOA coefficients 11 based on the identified parameters, where such reordering, as described in further detail below, may improve coding efficiency given that the transformation may reorder the HOA coefficients across frames of the HOA coefficients (where a frame commonly includes M samples of the HOA coefficients 11 and M is, in some examples, set to 1024). After reordering the decomposed version of the HOA coefficients 11, the audio encoding device 20 may select those of the decomposed version of the HOA coefficients 11 representative of foreground (or, in other words, distinct, predominant or salient) components of the soundfield. The audio encoding device 20 may specify the decomposed version of the HOA coefficients 11 representative of the foreground components as an audio object and associated directional information.

The audio encoding device 20 may also perform a soundfield analysis with respect to the HOA coefficients 11 in order, at least in part, to identify those of the HOA coefficients 11 representative of one or more background (or, in other words, ambient) components of the soundfield. The audio encoding device 20 may perform energy compensation with respect to the background components given that, in some examples, the background components may only include a subset of any given sample of the HOA coefficients 11 (e.g., such as those corresponding to zero and first order spherical basis functions and not those corresponding to second or higher order spherical basis functions). When order-reduction is performed, in other words, the audio encoding device 20 may augment (e.g., add/subtract energy to/from) the remaining background HOA coefficients of the HOA coefficients 11 to compensate for the change in overall energy that results from performing the order reduction.

The audio encoding device 20 may next perform a form of psychoacoustic encoding (such as MPEG surround, MPEG-AAC, MPEG-USAC or other known forms of psychoacoustic encoding) with respect to each of the HOA coefficients 11 representative of background components and each of the foreground audio objects. The audio encoding device 20 may perform a form of interpolation with respect to the foreground directional information and then perform an order reduction with respect to the interpolated foreground directional information to generate order reduced foreground directional information. The audio encoding device 20 may further perform, in some examples, a quantization with respect to the order reduced foreground directional information, outputting coded foreground directional information. In some instances, this quantization may comprise a scalar/entropy quantization. The audio encoding device 20 may then form the bitstream 21 to include the encoded background components, the encoded foreground audio objects, and the quantized directional information. The audio encoding device 20 may then transmit or otherwise output the bitstream 21 to the content consumer 14.

While shown in FIG. 3 as being directly transmitted to the content consumer 14, the content creator 12 may output the bitstream 21 to an intermediate device positioned between the content creator 12 and the content consumer 14. This intermediate device may store the bitstream 21 for later delivery to the content consumer 14, which may request this bitstream. The intermediate device may comprise a file server, a web server, a desktop computer, a laptop computer, a tablet computer, a mobile phone, a smart phone, or any other device capable of storing the bitstream 21 for later retrieval by an audio decoder. This intermediate device may reside in a content delivery network capable of streaming the bitstream 21 (and possibly in conjunction with transmitting a corresponding video data bitstream) to subscribers, such as the content consumer 14, requesting the bitstream 21.

Alternatively, the content creator 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 3.

As further shown in the example of FIG. 3, the content consumer 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode HOA coefficients 11' from the bitstream 21, where the HOA coefficients 11' may be similar to the HOA coefficients 11 but differ due to lossy operations (e.g., quantization) and/or transmission via the transmission channel. That is, the audio decoding device 24 may dequantize the foreground directional information specified in the bitstream 21, while also performing psychoacoustic decoding with respect to the foreground audio objects specified in the bitstream 21 and the encoded HOA coefficients representative of background components. The audio decoding device 24 may further perform interpolation with respect to the decoded foreground directional information and then determine the HOA coefficients representative of the foreground components based on the decoded foreground audio objects and the interpolated foreground directional information. The audio decoding device 24 may then determine the HOA coefficients 11' based on the determined HOA coefficients representative of the foreground components and the decoded HOA coefficients representative of the background components.

The audio playback system 16 may, after decoding the bitstream 21 to obtain the HOA coefficients 11' and render the HOA coefficients 11' to output loudspeaker feeds 25. The loudspeaker feeds 25 may drive one or more loudspeakers (which are not shown in the example of FIG. 3 for ease of illustration purposes).

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances or in conjunction with the dynamic determination of the loudspeaker information 13, the audio playback system 16 may prompt a user to interface with the audio playback system 16 and input the loudspeaker information 16.

The audio playback system 16 may then select one of the audio renderers 22 based on the loudspeaker information 13. In some instances, the audio playback system 16 may, when none of the audio renderers 22 are within some threshold similarity measure (loudspeaker geometry wise) to that specified in the loudspeaker information 13, the audio playback system 16 may generate the one of audio renderers 22 based on the loudspeaker information 13. The audio playback system 16 may, in some instances, generate the one of audio renderers 22 based on the loudspeaker information 13 without first attempting to select an existing one of the audio renderers 22.

Figure 4:
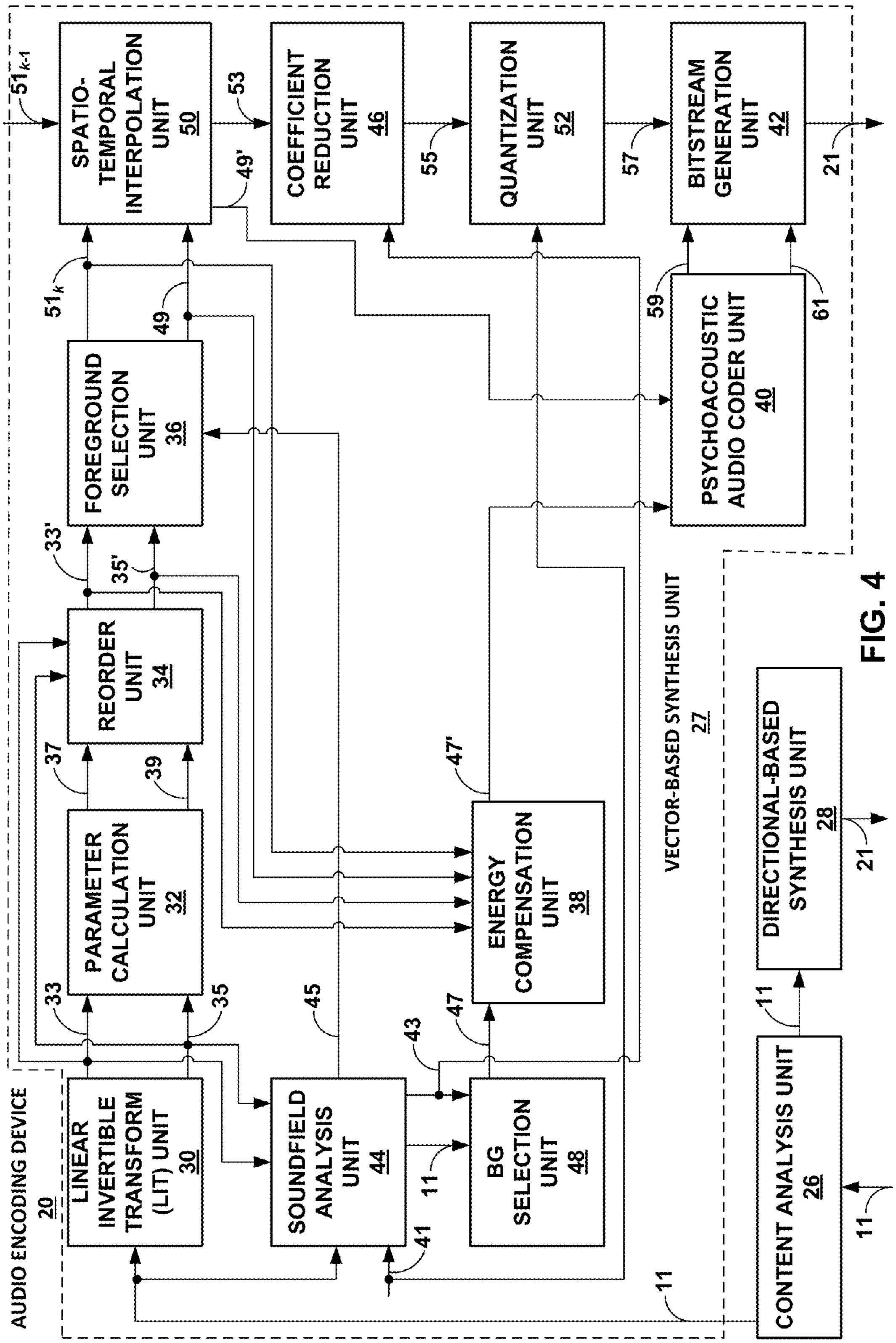
FIG. 4 is a block diagram illustrating, in more detail, one example of the audio encoding device shown in the example of FIG. 3 that may perform various aspects of the techniques described in this disclosure.

FIG. 4 is a block diagram illustrating, in more detail, one example of the audio encoding device 20 shown in the example of FIG. 3 that may perform various aspects of the techniques described in this disclosure. The audio encoding device 20 includes a content analysis unit 26, a vector-based synthesis methodology unit 27 and a directional-based synthesis methodology unit 28.

The content analysis unit 26 represents a unit configured to analyze the content of the HOA coefficients 11 to identify whether the HOA coefficients 11 represent content generated from a live recording or an audio object. The content analysis unit 26 may determine whether the HOA coefficients 11 were generated from a recording of an actual soundfield or from an artificial audio object. The content analysis unit 26 may make this determination in various ways. For example, the content analysis unit 26 may code $(N+1)^2-1$ channels and predict the last remaining channel (which may be represented as a vector). The content analysis unit 26 may apply scalars to at least some of the $(N+1)^2-1$ channels and add the resulting values to determine the last remaining channel. Furthermore, in this example, the content analysis unit 26 may determine an accuracy of the predicted channel. In this example, if the accuracy of the predicted channel is relatively high (e.g., the accuracy exceeds a particular threshold), the HOA coefficients 11 are likely to be generated from a synthetic audio object. In contrast, if the accuracy of the predicted channel is relatively low (e.g., the accuracy is below the particular threshold), the HOA coefficients 11 are more likely to represent a recorded soundfield. For instance, in this example, if a signal-to-noise ratio (SNR) of the predicted channel is over 100 decibels (dbs), the HOA coefficients 11 are more likely to represent a soundfield generated from a synthetic audio object. In contrast, the SNR of a soundfield recorded using an eigen microphone may be 5 to 20 dbs. Thus, there may be an apparent demarcation in SNR ratios between soundfield represented by the HOA coefficients 11 generated from an actual direct recording and from a synthetic audio object.

More specifically, the content analysis unit 26 may, when determining whether the HOA coefficients 11 representative of a soundfield are generated from a synthetic audio object, obtain a framed of HOA coefficients, which may be of size 25 by 1024 for a fourth order representation (i.e. N=4). After obtaining the framed HOA coefficients (which may also be denoted herein as a framed SHC matrix 11 and subsequent framed SHC matrices may be denoted as framed SHC matrices 27B, 27C, etc.). The content analysis unit 26 may then exclude the first vector of the framed HOA coefficients 11 to generate a reduced framed HOA coefficients. In some examples, this first vector excluded from the framed HOA coefficients 11 may correspond to those of the HOA coefficients 11 associated with the zero-order, zero-sub-order spherical harmonic basis function.

The content analysis unit 26 may then predicted the first non-zero vector of the reduced framed HOA coefficients from remaining vectors of the reduced framed HOA coefficients. The first non-zero vector may refer to a first vector going from the first-order (and considering each of the order-dependent sub-orders) to the fourth-order (and considering each of the order-dependent sub-orders) that has values other than zero. In some examples, the first non-zero vector of the reduced framed HOA coefficients refers to those of HOA coefficients 11 associated with the first order, zero-sub-order spherical harmonic basis function. While described with respect to the first non-zero vector, the techniques may predict other vectors of the reduced framed HOA coefficients from the remaining vectors of the reduced framed HOA coefficients. For example, the content analysis unit 26 may predict those of the reduced framed HOA coefficients associated with a first-order, first-sub-order spherical harmonic basis function or a first-order, negative-first-order spherical harmonic basis function. As yet other examples, the content analysis unit 26 may predict those of the reduced framed HOA coefficients associated with a second-order, zero-order spherical harmonic basis function.

To predict the first non-zero vector, the content analysis unit 26 may operate in accordance with the following equation:

$$\sum_i (\alpha_i v_i),$$

where i is from 1 to $(N+1)^2-2$, which is 23 for a fourth order representation, a denotes some constant for the i-th vector, and $v_i$ refers to the i-th vector. After predicting the first non-zero vector, the content analysis unit 26 may obtain an error based on the predicted first non-zero vector and the actual non-zero vector. In some examples, the content analysis unit 26 subtracts the predicted first non-zero vector from the actual first non-zero vector to derive the error. The content analysis unit 26 may compute the error as a sum of the absolute value of the differences between each entry in the predicted first non-zero vector and the actual first non-zero vector.

Once the error is obtained, the content analysis unit 26 may compute a ratio based on an energy of the actual first non-zero vector and the error. The content analysis unit 26 may determine this energy by squaring each entry of the first non-zero vector and adding the squared entries to one another. The content analysis unit 26 may then compare this ratio to a threshold. When the ratio does not exceed the threshold, the content analysis unit 26 may determine that the framed HOA coefficients 11 is generated from a recording and indicate in the bitstream that the corresponding coded representation of the HOA coefficients 11 was generated from a recording. When the ratio exceeds the threshold, the content analysis unit 26 may determine that the framed HOA coefficients 11 is generated from a synthetic audio object and indicate in the bitstream that the corresponding coded representation of the framed HOA coefficients 11 was generated from a synthetic audio object.

The indication of whether the framed HOA coefficients 11 was generated from a recording or a synthetic audio object may comprise a single bit for each frame. The single bit may indicate that different encodings were used for each frame effectively toggling between different ways by which to encode the corresponding frame. In some instances, when the framed HOA coefficients 11 were generated from a recording, the content analysis unit 26 passes the HOA coefficients 11 to the vector-based synthesis unit 27. In some instances, when the framed HOA coefficients 11 were generated from a synthetic audio object, the content analysis unit 26 passes the HOA coefficients 11 to the directional-based synthesis unit 28. The directional-based synthesis unit 28 may represent a unit configured to perform a directional-based synthesis of the HOA coefficients 11 to generate a directional-based bitstream 21.

In other words, the techniques are based on coding the HOA coefficients using a front-end classifier. The classifier may work as follows:

Start with a framed SH matrix (say 4th order, frame size of 1024, which may also be referred to as framed HOA coefficients or as HOA coefficients)—where a matrix of size 25×1024 is obtained.

Exclude the 1st vector (0th order SH)—so there is a matrix of size 24×1024.

Predict the first non-zero vector in the matrix (a 1×1024 size vector)—from the rest of the of the vectors in the matrix (23 vectors of size 1×1024).

The prediction is as follows: predicted vector=sum-over-i [alpha-i×vector-I] (where the sum over I is done over 23 indices, i=1 . . . 23)

Then check the error: actual vector−predicted vector=error.

If the ratio of the energy of the vector/error is large (I.e. The error is small), then the underlying soundfield (at that frame) is sparse/synthetic. Else, the underlying soundfield is a recorded (using say a mic array) soundfield.

Depending on the recorded vs. synthetic decision, carry out encoding/decoding (which may refer to bandwidth compression) in different ways. The decision is a 1 bit decision, that is sent over the bitstream for each frame.

As shown in the example of FIG. 4, the vector-based synthesis unit 27 may include a linear invertible transform (LIT) unit 30, a parameter calculation unit 32, a reorder unit 34, a foreground selection unit 36, an energy compensation unit 38, a psychoacoustic audio coder unit 40, a bitstream generation unit 42, a soundfield analysis unit 44, a coefficient reduction unit 46, a background (BG) selection unit 48, a spatio-temporal interpolation unit 50, and a quantization unit 52.

The linear invertible transform (LIT) unit 30 receives the HOA coefficients 11 in the form of HOA channels, each channel representative of a block or frame of a coefficient associated with a given order, sub-order of the spherical basis functions (which may be denoted as HOA[k], where k may denote the current frame or block of samples). The matrix of HOA coefficients 11 may have dimensions D: $M\times(N+1)^2$.

That is, the LIT unit 30 may represent a unit configured to perform a form of analysis referred to as singular value decomposition. While described with respect to SVD, the techniques described in this disclosure may be performed with respect to any similar transformation or decomposition that provides for sets of linearly uncorrelated, energy compacted output. Also, reference to "sets" in this disclosure is generally intended to refer to non-zero sets unless specifically stated to the contrary and is not intended to refer to the classical mathematical definition of sets that includes the so-called "empty set."

An alternative transformation may comprise a principal component analysis, which is often referred to as "PCA." PCA refers to a mathematical procedure that employs an orthogonal transformation to convert a set of observations of possibly correlated variables into a set of linearly uncorrelated variables referred to as principal components. Linearly uncorrelated variables represent variables that do not have a linear statistical relationship (or dependence) to one another. These principal components may be described as having a small degree of statistical correlation to one another. In any event, the number of so-called principal components is less than or equal to the number of original variables. In some examples, the transformation is defined in such a way that the first principal component has the largest possible variance (or, in other words, accounts for as much of the variability in the data as possible), and each succeeding component in turn has the highest variance possible under the constraint that this successive component be orthogonal to (which may be restated as uncorrelated with) the preceding components. PCA may perform a form of order-reduction, which in terms of the HOA coefficients 11 may result in the compression of the HOA coefficients 11. Depending on the context, PCA may be referred to by a number of different names, such as discrete Karhunen-Loeve transform, the Hotelling transform, proper orthogonal decomposition (POD), and eigenvalue decomposition (EVD) to name a few examples. Properties of such operations that are conducive to the underlying goal of compressing audio data are 'energy compaction' and 'decorrelation' of the multichannel audio data.

In any event, the LIT unit 30 performs a singular value decomposition (which, again, may be referred to as "SVD") to transform the HOA coefficients 11 into two or more sets of transformed HOA coefficients. These "sets" of transformed HOA coefficients may include vectors of transformed HOA coefficients. In the example of FIG. 4, the LIT unit 30 may perform the SVD with respect to the HOA coefficients 11 to generate a so-called V matrix, an S matrix, and a U matrix. SVD, in linear algebra, may represent a factorization of a y-by-z real or complex matrix X (where X may represent multi-channel audio data, such as the HOA coefficients 11) in the following form:

$$X=USV^*$$

U may represent an y-by-y real or complex unitary matrix, where the y columns of U are commonly known as the left-singular vectors of the multi-channel audio data. S may represent an y-by-z rectangular diagonal matrix with non-negative real numbers on the diagonal, where the diagonal values of S are commonly known as the singular values of the multi-channel audio data. V* (which may denote a conjugate transpose of V) may represent an z-by-z real or complex unitary matrix, where the z columns of V* are commonly known as the right-singular vectors of the multi-channel audio data.

While described in this disclosure as being applied to multi-channel audio data comprising HOA coefficients 11, the techniques may be applied to any form of multi-channel audio data. In this way, the audio encoding device 20 may perform a singular value decomposition with respect to multi-channel audio data representative of at least a portion of soundfield to generate a U matrix representative of left-singular vectors of the multi-channel audio data, an S matrix representative of singular values of the multi-channel audio data and a V matrix representative of right-singular vectors of the multi-channel audio data, and representing the multi-channel audio data as a function of at least a portion of one or more of the U matrix, the S matrix and the V matrix.

In some examples, the V* matrix in the SVD mathematical expression referenced above is denoted as the conjugate transpose of the V matrix to reflect that SVD may be applied to matrices comprising complex numbers. When applied to matrices comprising only real-numbers, the complex conjugate of the V matrix (or, in other words, the V* matrix) may be considered to be the transpose of the V matrix. Below it is assumed, for ease of illustration purposes, that the HOA coefficients 11 comprise real-numbers with the result that the V matrix is output through SVD rather than the V* matrix. Moreover, while denoted as the V matrix in this disclosure, reference to the V matrix should be understood to refer to the transpose of the V matrix where appropriate. While assumed to be the V matrix, the techniques may be applied in a similar fashion to HOA coefficients 11 having complex coefficients, where the output of the SVD is the V* matrix. Accordingly, the techniques should not be limited in this respect to only provide for application of SVD to generate a V matrix, but may include application of SVD to HOA coefficients 11 having complex components to generate a V* matrix.

In any event, the LIT unit 30 may perform a block-wise form of SVD with respect to each block (which may refer to a frame) of higher-order ambisonics (HOA) audio data (where this ambisonics audio data includes blocks or samples of the HOA coefficients 11 or any other form of multi-channel audio data). As noted above, a variable M may be used to denote the length of an audio frame in samples. For example, when an audio frame includes 1024 audio samples, M equals 1024. Although described with respect to this typical value for M, the techniques of this disclosure should not be limited to this typical value for M. The LIT unit 30 may therefore perform a block-wise SVD with respect to a block the HOA coefficients 11 having M-by-$(N+1)^2$ HOA coefficients, where N, again, denotes the order of the HOA audio data. The LIT unit 30 may generate, through performing this SVD, a V matrix, an S matrix, and a U matrix, where each of matrixes may represent the respective V, S and U matrixes described above. In this way, the linear invertible transform unit 30 may perform SVD with respect to the HOA coefficients 11 to output US[k] vectors 33 (which may represent a combined version of the S vectors and the U vectors) having dimensions D: $M\times(N+1)^2$, and V[k] vectors 35 having dimensions D: $(N+1)^2\times(N+1)^2$. Individual vector elements in the US[k] matrix may also be termed $X_{PS}(k)$ while individual vectors of the V[k] matrix may also be termed v(k).

An analysis of the U, S and V matrices may reveal that these matrices carry or represent spatial and temporal characteristics of the underlying soundfield represented above by X. Each of the N vectors in U (of length M samples) may represent normalized separated audio signals as a function of time (for the time period represented by M samples), that are orthogonal to each other and that have been decoupled from any spatial characteristics (which may also be referred to as directional information). The spatial characteristics, representing spatial shape and position (r, theta, phi) width may instead be represented by individual $i^{th}$ vectors, $v^{(i)}(k)$, in the V matrix (each of length $(N+1)^2$). Both the vectors in the U matrix and the V matrix are normalized such that their root-mean-square energies are equal to unity. The energy of the audio signals in U are thus represented by the diagonal elements in S. Multiplying U and S to form US[k](with individual vector elements $X_{PS}(k)$), thus represent the audio signal with true energies. The ability of the SVD decomposition to decouple the audio time-signals (in U), their energies (in S) and their spatial characteristics (in V) may support various aspects of the techniques described in this disclosure. Further, this model of synthesizing the underlying HOA[k] coefficients, X, by a vector multiplication of US[k] and V[k] gives rise the term "vector based synthesis methodology," which is used throughout this document.

Although described as being performed directly with respect to the HOA coefficients 11, the LIT unit 30 may apply the linear invertible transform to derivatives of the HOA coefficients 11. For example, the LIT unit 30 may apply SVD with respect to a power spectral density matrix derived from the HOA coefficients 11. The power spectral density matrix may be denoted as PSD and obtained through matrix multiplication of the transpose of the hoaFrame to the hoaFrame, as outlined in the pseudo-code that follows below. The hoaFrame notation refers to a frame of the HOA coefficients 11.

The LIT unit 30 may, after applying the SVD (svd) to the PSD, may obtain an $S[k]^2$ matrix (S_squared) and a V[k] matrix. The $S[k]^2$ matrix may denote a squared S[k] matrix, whereupon the LIT unit 30 may apply a square root operation to the $S[k]^2$ matrix to obtain the S[k] matrix. The LIT unit 30 may, in some instances, perform quantization with respect to the V[k] matrix to obtain a quantized V[k] matrix (which may be denoted as V[k]' matrix). The LIT unit 30 may obtain the U[k] matrix by first multiplying the S[k] matrix by the quantized V[k]' matrix to obtain an SV[k]' matrix. The LIT unit 30 may next obtain the pseudo-inverse (pinv) of the SV[k]' matrix and then multiply the HOA coefficients 11 by the pseudo-inverse of the SV[k]' matrix to obtain the U[k] matrix. The foregoing may be represented by the following pseud-code:

```
PSD = hoaFrame'*hoaFrame;
[V, S_squared] = svd(PSD,'econ');
S = sqrt(S_squared);
U = hoaFrame * pinv(S*V');
```

By performing SVD with respect to the power spectral density (PSD) of the HOA coefficients rather than the coefficients themselves, the LIT unit 30 may potentially reduce the computational complexity of performing the SVD in terms of one or more of processor cycles and storage space, while achieving the same source audio encoding efficiency as if the SVD were applied directly to the HOA coefficients. That is, the above described PSD-type SVD may be potentially less computational demanding because the SVD is done on an F*F matrix (with F the number of HOA coefficients). Compared to a M*F matrix with M is the framelength, i.e. 1024 or more samples. The complexity of an SVD may now, through application to the PSD rather than the HOA coefficients 11, be around O(L^3) compared to O(M*L^2) when applied to the HOA coefficients 11 (where O(*) denotes the big-O notation of computation complexity common to the computer-science arts).

The parameter calculation unit 32 represents unit configured to calculate various parameters, such as a correlation parameter (R), directional properties parameters (θ, φ, r), and an energy property (e). Each of these parameters for the current frame may be denoted as R[k], θ[k], φ[k], r[k] and e[k]. The parameter calculation unit 32 may perform an energy analysis and/or correlation (or so-called cross-correlation) with respect to the US[k] vectors 33 to identify these parameters. The parameter calculation unit 32 may also determine these parameters for the previous frame, where the previous frame parameters may be denoted R[k−1], θ[k−1], φ[k−1], r[k−1] and e[k−1], based on the previous frame of US[k−1] vector and V[k−1] vectors. The parameter calculation unit 32 may output the current parameters 37 and the previous parameters 39 to reorder unit 34.

That is, the parameter calculation unit 32 may perform an energy analysis with respect to each of the L first US[k] vectors 33 corresponding to a first time and each of the second US[k−1] vectors 33 corresponding to a second time, computing a root mean squared energy for at least a portion of (but often the entire) first audio frame and a portion of (but often the entire) second audio frame and thereby generate 2 L energies, one for each of the L first US[k] vectors 33 of the first audio frame and one for each of the second US[k−1] vectors 33 of the second audio frame.

In other examples, the parameter calculation unit 32 may perform a cross-correlation between some portion of (if not the entire) set of samples for each of the first US[k] vectors 33 and each of the second US[k−1] vectors 33. Cross-correlation may refer to cross-correlation as understood in the signal processing arts. In other words, cross-correlation may refer to a measure of similarity between two waveforms (which in this case is defined as a discrete set of M samples) as a function of a time-lag applied to one of them. In some examples, to perform cross-correlation, the parameter calculation unit 32 compares the last L samples of each the first US[k] vectors 27, turn-wise, to the first L samples of each of the remaining ones of the second US[k−1] vectors 33 to determine a correlation parameter. As used herein, a "turn-wise" operation refers to an element by element operation made with respect to a first set of elements and a second set of elements, where the operation draws one element from each of the first and second sets of elements "in-turn" according to an ordering of the sets.

The parameter calculation unit 32 may also analyze the V[k] and/or V[k−1] vectors 35 to determine directional property parameters. These directional property parameters may provide an indication of movement and location of the audio object represented by the corresponding US[k] and/or US[k−1] vectors 33. The parameter calculation unit 32 may provide any combination of the foregoing current parameters 37 (determined with respect to the US[k] vectors 33 and/or the V[k] vectors 35) and any combination of the previous parameters 39 (determined with respect to the US[k−1] vectors 33 and/or the V[k−1] vectors 35) to the reorder unit 34.

The SVD decomposition does not guarantee that the audio signal/object represented by the p-th vector in US[k−1] vectors 33, which may be denoted as the US[k−1][p] vector (or, alternatively, as $X_{PS}^{(p)}(k-1)$), will be the same audio signal/object (progressed in time) represented by the p-th vector in the US[k] vectors 33, which may also be denoted as US[k][p] vectors 33 (or, alternatively as $X_{PS}^{(p)}(k)$). The parameters calculated by the parameter calculation unit 32 may be used by the reorder unit 34 to re-order the audio objects to represent their natural evaluation or continuity over time.

That is, the reorder unit 34 may then compare each of the parameters 37 from the first US[k] vectors 33 turn-wise against each of the parameters 39 for the second US[k−1] vectors 33. The reorder unit 34 may reorder (using, as one example, a Hungarian algorithm) the various vectors within the US[k] matrix 33 and the V[k] matrix 35 based on the current parameters 37 and the previous parameters 39 to output a reordered US[k] matrix 33' (which may be denoted mathematically as $\overline{US}[k]$) and a reordered V[k] matrix 35' (which may be denoted mathematically as $\overline{V}[k]$) to a foreground sound (or predominant sound—PS) selection unit 36 ("foreground selection unit 36") and an energy compensation unit 38.

In other words, the reorder unit 34 may represent a unit configured to reorder the vectors within the US[k] matrix 33 to generate reordered US[k] matrix 33'. The reorder unit 34 may reorder the US[k] matrix 33 because the order of the US[k] vectors 33 (where, again, each vector of the US[k] vectors 33, which again may alternatively be denoted as $X_{PS}^{(p)}(k)$, may represent one or more distinct (or, in other words, predominant) mono-audio object present in the soundfield) may vary from portions of the audio data. That is, given that the audio encoding device 12, in some examples, operates on these portions of the audio data generally referred to as audio frames, the position of vectors corresponding to these distinct mono-audio objects as represented in the US[k] matrix 33 as derived, may vary from audio frame-to-audio frame due to application of SVD to the frames and the varying saliency of each audio object form frame-to-frame.

Passing vectors within the US[k] matrix 33 directly to the psychoacoustic audio coder unit 40 without reordering the vectors within the US[k] matrix 33 from audio frame-to audio frame may reduce the extent of the compression achievable for some compression schemes, such as legacy compression schemes that perform better when mono-audio objects are continuous (channel-wise, which is defined in this example by the positional order of the vectors within the US[k] matrix 33 relative to one another) across audio frames. Moreover, when not reordered, the encoding of the vectors within the US[k] matrix 33 may reduce the quality of the audio data when decoded. For example, AAC encoders, which may be represented in the example of FIG. 3 by the psychoacoustic audio coder unit 40, may more efficiently compress the reordered one or more vectors within the US[k] matrix 33' from frame-to-frame in comparison to the compression achieved when directly encoding the vectors within the US[k] matrix 33 from frame-to-frame. While described above with respect to AAC encoders, the techniques may be performed with respect to any encoder that provides better compression when mono-audio objects are specified across frames in a specific order or position (channel-wise).

Various aspects of the techniques may, in this way, enable audio encoding device 12 to reorder one or more vectors (e.g., the vectors within the US[k] matrix 33 to generate reordered one or more vectors within the reordered US[k] matrix 33' and thereby facilitate compression of the vectors within the US[k] matrix 33 by a legacy audio encoder, such as the psychoacoustic audio coder unit 40).

For example, the reorder unit 34 may reorder one or more vectors within the US[k] matrix 33 from a first audio frame subsequent in time to the second frame to which one or more second vectors within the US[k−1] matrix 33 correspond based on the current parameters 37 and previous parameters 39. While described in the context of a first audio frame being subsequent in time to the second audio frame, the first audio frame may precede in time the second audio frame. Accordingly, the techniques should not be limited to the example described in this disclosure.

To illustrate consider the following Table 1 where each of the p vectors within the US[k] matrix 33 is denoted as US[k][p], where k denotes whether the corresponding vector is from the k-th frame or the previous (k−1)-th frame and p denotes the row of the vector relative to vectors of the same audio frame (where the US[k] matrix has $(N+-1)^2$ such vectors). As noted above, assuming N is determined to be one, p may denote vectors one (1) through (4).

TABLE 1

| Energy Under Consideration | Compared To |
|---|---|
| US[k − 1][1] | US[k][1], US[k][2], US[k][3], US[k][4] |
| US[k − 1][2] | US[k][1], US[k][2], US[k][3], US[k][4] |
| US[k − 1][3] | US[k][1], US[k][2], US[k][3], US[k][4] |
| US[k − 1][4] | US[k][1], US[k][2], US[k][3], US[k][4] |

In the above Table 1, the reorder unit 34 compares the energy computed for US[k−1][1] to the energy computed for each of US[k][1], US[k][2], US[k][3], US[k][4], the energy computed for US[k−1][2] to the energy computed for each of US[k][1], US[k][2], US[k][3]. US[k][4], etc. The reorder unit 34 may then discard one or more of the second US[k−1] vectors 33 of the second preceding audio frame (time-wise). To illustrate, consider the following Table 2 showing the remaining second US[k−1] vectors 33:

TABLE 2

| Vector Under Consideration | Remaining Under Consideration |
|---|---|
| US[k − 1][1] | US[k][1], US[k][2] |
| US[k − 1][2] | US[k][1], US[k][2] |
| US[k − 1][3] | US[k][3], US[k][4] |
| US[k − 1][4] | US[k][3], US[k][4] |

In the above Table 2, the reorder unit 34 may determine, based on the energy comparison that the energy computed for US[k−1][1] is similar to the energy computed for each of US[k][1] and US[k][2], the energy computed for US[k−1][2] is similar to the energy computed for each of US[k][1] and US[k][2], the energy computed for US[k−1][3] is similar to the energy computed for each of US[k][3] and US[k][4], and the energy computed for US[k−1][4] is similar to the energy computed for each of US[k][3] and US[k][4]. In some examples, the reorder unit 34 may perform further energy analysis to identify a similarity between each of the first vectors of the US[k] matrix 33 and each of the second vectors of the US[k−1] matrix 33.

In other examples, the reorder unit 32 may reorder the vectors based on the current parameters 37 and the previous parameters 39 relating to cross-correlation. In these examples, referring back to Table 2 above, the reorder unit 34 may determine the following exemplary correlation expressed in Table 3 based on these cross-correlation parameters:

TABLE 3

| Vector Under Consideration | Correlates To |
|---|---|
| US[k − 1][1] | US[k][2] |
| US[k − 1][2] | US[k][1] |
| US[k − 1][3] | US[k][3] |
| US[k − 1][4] | US[k][4] |

From the above Table 3, the reorder unit 34 determines, as one example, that US[k−1][1] vector correlates to the differently positioned US[k][2] vector, the US[k−1][2] vector correlates to the differently positioned US[k][1] vector, the US[k−1][3] vector correlates to the similarly positioned US[k][3] vector, and the US[k−1][4] vector correlates to the similarly positioned US[k][4] vector. In other words, the reorder unit 34 determines what may be referred to as reorder information describing how to reorder the first vectors of the US[k] matrix 33 such that the US[k][2] vector is repositioned in the first row of the first vectors of the US[k] matrix 33 and the US[k][1] vector is repositioned in the second row of the first US[k] vectors 33. The reorder unit 34 may then reorder the first vectors of the US[k] matrix 33 based on this reorder information to generate the reordered US[k] matrix 33'.

Figure 5:
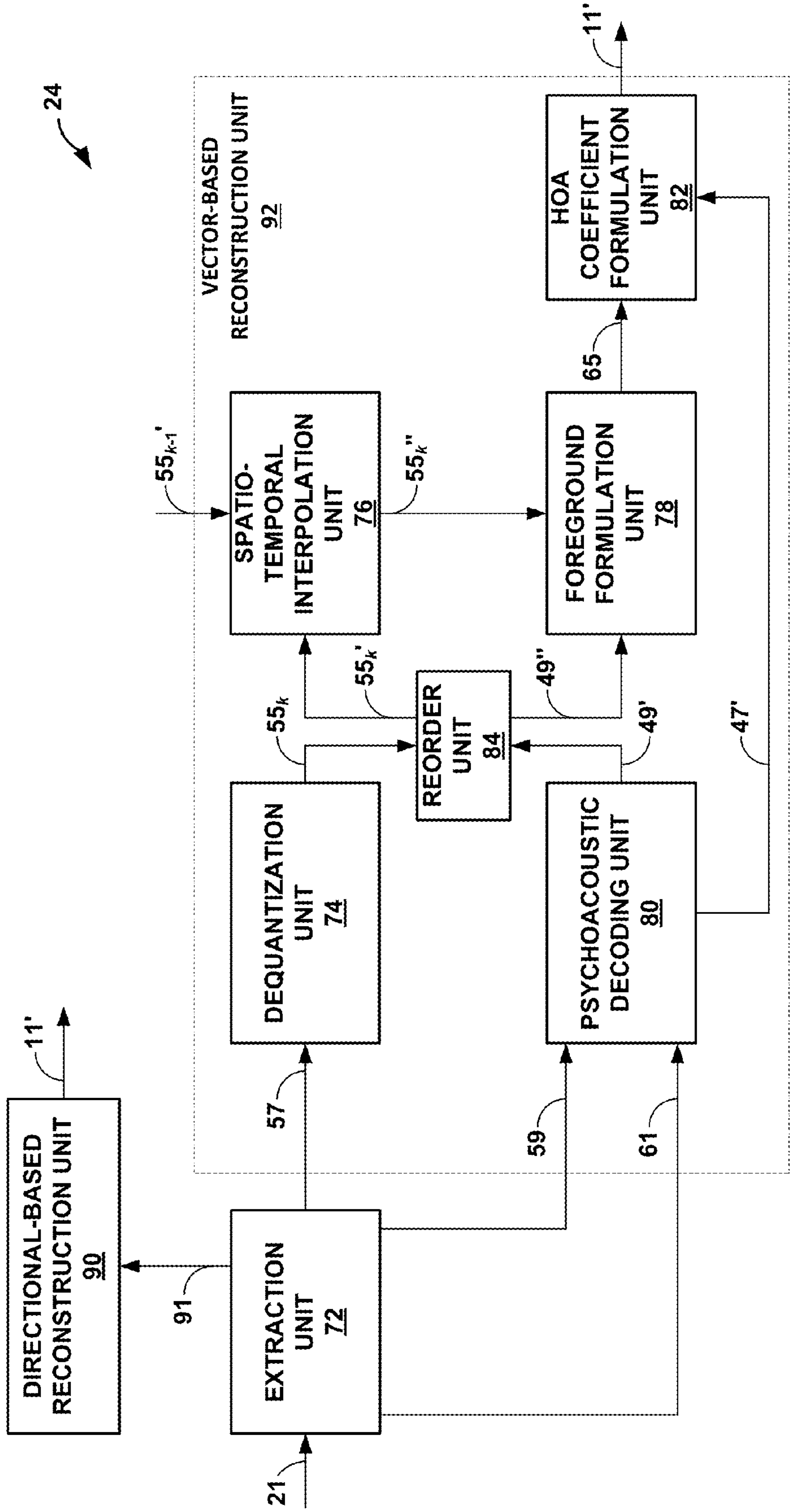
FIG. 5 is a block diagram illustrating the audio decoding device of FIG. 3 in more detail.

Additionally, the reorder unit 34 may, although not shown in the example of FIG. 4, provide this reorder information to the bitstream generation device 42, which may generate the bitstream 21 to include this reorder information so that the audio decoding device, such as the audio decoding device 24 shown in the example of FIGS. 3 and 5, may determine how to reorder the reordered vectors of the US[k] matrix 33' so as to recover the vectors of the US[k] matrix 33.

While described above as performing a two-step process involving an analysis based first an energy-specific parameters and then cross-correlation parameters, the reorder unit 32 may only perform this analysis only with respect to energy parameters to determine the reorder information, perform this analysis only with respect to cross-correlation parameters to determine the reorder information, or perform the analysis with respect to both the energy parameters and the cross-correlation parameters in the manner described above. Additionally, the techniques may employ other types of processes for determining correlation that do not involve performing one or both of an energy comparison and/or a cross-correlation. Accordingly, the techniques should not be limited in this respect to the examples set forth above. Moreover, other parameters obtained from the parameter calculation unit 32 (such as the spatial position parameters derived from the V vectors or correlation of the vectors in the V[k] and V[k−1]) can also be used (either concurrently/jointly or sequentially) with energy and cross-correlation parameters obtained from US[k] and US[k−1] to determine the correct ordering of the vectors in US.

As one example of using correlation of the vectors in the V matrix, the parameter calculation unit 34 may determine that the vectors of the V[k] matrix 35 are correlated as specified in the following Table 4:

TABLE 4

| Vector Under Consideration | Correlates To |
|---|---|
| V[k − 1][1] | V[k][2] |
| V[k − 1][2] | V[k][1] |
| V[k − 1][3] | V[k][3] |
| V[k − 1][4] | V[k][4] |

From the above Table 4, the reorder unit 34 determines, as one example, that V[k−1][1] vector correlates to the differently positioned V[k][2] vector, the V[k−1][2] vector correlates to the differently positioned V[k][1] vector, the V[k−1][3] vector correlates to the similarly positioned V[k][3] vector, and the V[k−1][4] vector correlates to the similarly positioned V[k][4] vector. The reorder unit 34 may output the reordered version of the vectors of the V[k] matrix 35 as a reordered V[k] matrix 35'.

In some examples, the same re-ordering that is applied to the vectors in the US matrix is also applied to the vectors in the V matrix. In other words, any analysis used in reordering the V vectors may be used in conjunction with any analysis used to reorder the US vectors. To illustrate an example in which the reorder information is not solely determined with respect to the energy parameters and/or the cross-correlation parameters with respect to the US[k] vectors 35, the reorder unit 34 may also perform this analysis with respect to the V[k] vectors 35 based on the cross-correlation parameters and the energy parameters in a manner similar to that described above with respect to the V[k] vectors 35. Moreover, while the US[k] vectors 33 do not have any directional properties, the V[k] vectors 35 may provide information relating to the directionality of the corresponding US[k] vectors 33. In this sense, the reorder unit 34 may identify correlations between V[k] vectors 35 and V[k−1] vectors 35 based on an analysis of corresponding directional properties parameters. That is, in some examples, audio object move within a soundfield in a continuous manner when moving or that stays in a relatively stable location. As such, the reorder unit 34 may identify those vectors of the V[k] matrix 35 and the V[k−1] matrix 35 that exhibit some known physically realistic motion or that stay stationary within the soundfield as correlated, reordering the US[k] vectors 33 and the V[k] vectors 35 based on this directional properties correlation. In any event, the reorder unit 34 may output the reordered US[k] vectors 33' and the reordered V[k] vectors 35' to the foreground selection unit 36.

Additionally, the techniques may employ other types of processes for determining correct order that do not involve performing one or both of an energy comparison and/or a cross-correlation. Accordingly, the techniques should not be limited in this respect to the examples set forth above.

Although described above as reordering the vectors of the V matrix to mirror the reordering of the vectors of the US matrix, in certain instances, the V vectors may be reordered differently than the US vectors, where separate syntax elements may be generated to indicate the reordering of the US vectors and the reordering of the V vectors. In some instances, the V vectors may not be reordered and only the US vectors may be reordered given that the V vectors may not be psychoacoustically encoded.

An embodiment where the re-ordering of the vectors of the V matrix and the vectors of US matrix are different are when the intention is to swap audio objects in space—i.e. move them away from the original recorded position (when the underlying soundfield was a natural recording) or the artistically intended position (when the underlying soundfield is an artificial mix of objects). As an example, suppose that there are two audio sources A and B, A may be the sound of a cat "meow" emanating from the "left" part of soundfield and B may be the sound of a dog "woof" emanating from the "right" part of the soundfield. When the re-ordering of the V and US are different, the position of the two sound sources is swapped. After swapping A (the "meow") emanates from the right part of the soundfield, and B ("the woof") emanates from the left part of the soundfield.

The soundfield analysis unit 44 may represent a unit configured to perform a soundfield analysis with respect to the HOA coefficients 11 so as to potentially achieve a target bitrate 41. The soundfield analysis unit 44 may, based on this analysis and/or on a received target bitrate 41, determine the total number of psychoacoustic coder instantiations (which may be a function of the total number of ambient or background channels ($BG_{TOT}$) and the number of foreground channels or, in other words, predominant channels. The total number of psychoacoustic coder instantiations can be denoted as numHOATransportChannels. The soundfield analysis unit 44 may also determine, again to potentially achieve the target bitrate 41, the total number of foreground channels (nFG) 45, the minimum order of the background (or, in other words, ambient) soundfield ($N_{BG}$ or, alternatively, MinAmbHoaOrder), the corresponding number of actual channels representative of the minimum order of background soundfield (nBGa=(MinAmbHoaOrder+1)$^2$), and indices (i) of additional BG HOA channels to send (which may collectively be denoted as background channel information 43 in the example of FIG. 4). The background channel information 42 may also be referred to as ambient channel information 43. Each of the channels that remains from numHOATransportChannels−nBGa, may either be an "additional background/ambient channel", an "active vector based predominant channel", an "active directional based predominant signal" or "completely inactive". In one embodiment, these channel types may be indicated (as a "ChannelType") syntax element by two bits (e.g. 00:additional background channel; 01:vector based predominant signal; 10: inactive signal; 11: directional based signal). The total number of background or ambient signals, nBGa, may be given by (MinAmbHoaOrder+1)$^2$+the number of times the index 00 (in the above example) appears as a channel type in the bitstream for that frame.

In any event, the soundfield analysis unit 44 may select the number of background (or, in other words, ambient) channels and the number of foreground (or, in other words, predominant) channels based on the target bitrate 41, selecting more background and/or foreground channels when the target bitrate 41 is relatively higher (e.g., when the target bitrate 41 equals or is greater than 512 Kbps). In one embodiment, the numHOATransportChannels may be set to 8 while the MinAmbHoaOrder may be set to 1 in the header section of the bitstream (which is described in more detail with respect to FIGS. 10-10O(ii)). In this scenario, at every frame, four channels may be dedicated to represent the background or ambient portion of the soundfield while the other 4 channels can, on a frame-by-frame basis vary on the type of channel—e.g., either used as an additional background/ambient channel or a foreground/predominant channel. The foreground/predominant signals can be one of either vector based or directional based signals, as described above.

In some instances, the total number of vector based predominant signals for a frame, may be given by the number of times the ChannelType index is 01, in the bitstream of that frame, in the above example. In the above embodiment, for every additional background/ambient channel (e.g., corresponding to a ChannelType of 00), a corresponding information of which of the possible HOA coefficients (beyond the first four) may be represented in that channel. This information, for fourth order HOA content, may be an index to indicate between 5-25 (the first four 1-4 may be sent all the time when minAmbHoaOrder is set to 1, hence only need to indicate one between 5-25). This information could thus be sent using a 5 bits syntax element (for $4^{th}$ order content), which may be denoted as "CodedAmbCoeffIdx."

In a second embodiment, all of the foreground/predominant signals are vector based signals. In this second embodiment, the total number of foreground/predominant signals may be given by nFG=numHOATransportChannels−[(MinAmbHoaOrder+1)$^2$+the number of times the index 00].

The soundfield analysis unit 44 outputs the background channel information 43 and the HOA coefficients 11 to the background (BG) selection unit 46, the background channel information 43 to coefficient reduction unit 46 and the bitstream generation unit 42, and the nFG 45 to a foreground selection unit 36.

In some examples, the soundfield analysis unit 44 may select, based on an analysis of the vectors of the US[k] matrix 33 and the target bitrate 41, a variable nFG number of these components having the greatest value. In other words, the soundfield analysis unit 44 may determine a value for a variable A (which may be similar or substantially similar to $N_{BG}$), which separates two subspaces, by analyzing the slope of the curve created by the descending diagonal values of the vectors of the S[k] matrix 33, where the large singular values represent foreground or distinct sounds and the low singular values represent background components of the soundfield. That is, the variable A may segment the overall soundfield into a foreground subspace and a background subspace.

In some examples, the soundfield analysis unit 44 may use a first and a second derivative of the singular value curve. The soundfield analysis unit 44 may also limit the value for the variable A to be between one and five. As another example, the soundfield analysis unit 44 may limit the value of the variable A to be between one and $(N+1)^2$. Alternatively, the soundfield analysis unit 44 may pre-define the value for the variable A, such as to a value of four. In any event, based on the value of A, the soundfield analysis unit 44 determines the total number of foreground channels (nFG) 45, the order of the background soundfield ($N_{BG}$) and the number (nBGa) and the indices (i) of additional BG HOA channels to send.

Furthermore, the soundfield analysis unit 44 may determine the energy of the vectors in the V[k] matrix 35 on a per vector basis. The soundfield analysis unit 44 may determine the energy for each of the vectors in the V[k] matrix 35 and identify those having a high energy as foreground components.

Moreover, the soundfield analysis unit 44 may perform various other analyses with respect to the HOA coefficients 11, including a spatial energy analysis, a spatial masking analysis, a diffusion analysis or other forms of auditory analyses. The soundfield analysis unit 44 may perform the spatial energy analysis through transformation of the HOA coefficients 11 into the spatial domain and identifying areas of high energy representative of directional components of the soundfield that should be preserved. The soundfield analysis unit 44 may perform the perceptual spatial masking analysis in a manner similar to that of the spatial energy analysis, except that the soundfield analysis unit 44 may identify spatial areas that are masked by spatially proximate higher energy sounds. The soundfield analysis unit 44 may then, based on perceptually masked areas, identify fewer foreground components in some instances. The soundfield analysis unit 44 may further perform a diffusion analysis with respect to the HOA coefficients 11 to identify areas of diffuse energy that may represent background components of the soundfield.

The soundfield analysis unit 44 may also represent a unit configured to determine saliency, distinctness or predominance of audio data representing a soundfield, using directionality-based information associated with the audio data. While energy-based determinations may improve rendering of a soundfield decomposed by SVD to identify distinct audio components of the soundfield, energy-based determinations may also cause a device to erroneously identify background audio components as distinct audio components, in cases where the background audio components exhibit a high energy level. That is, a solely energy-based separation of distinct and background audio components may not be robust, as energetic (e.g., louder) background audio components may be incorrectly identified as being distinct audio components. To more robustly distinguish between distinct and background audio components of the soundfield, various aspects of the techniques described in this disclosure may enable the soundfield analysis unit 44 to perform a directionality-based analysis of the HOA coefficients 11 to separate foreground and ambient audio components from decomposed versions of the HOA coefficients 11.

In this respect, the soundfield analysis unit 44 may represent a unit configured or otherwise operable to identify distinct (or foreground) elements from background elements included in one or more of the vectors in the US[k] matrix 33 and the vectors in the V[k] matrix 35. According to some SVD-based techniques, the most energetic components (e.g., the first few vectors of one or more of the US[k] matrix 33 and the V[k] matrix 35 or vectors derived therefrom) may be treated as distinct components. However, the most energetic components (which are represented by vectors) of one or more of the vectors in the US[k] matrix 33 and the vectors in the V[k] matrix 35 may not, in all scenarios, represent the components/signals that are the most directional.

The soundfield analysis unit 44 may implement one or more aspects of the techniques described herein to identify foreground/direct/predominant elements based on the directionality of the vectors of one or more of the vectors in the US[k] matrix 33 and the vectors in the V[k] matrix 35 or vectors derived therefrom. In some examples, the soundfield analysis unit 44 may identify or select as distinct audio components (where the components may also be referred to as "objects"), one or more vectors based on both energy and directionality of the vectors. For instance, the soundfield analysis unit 44 may identify those vectors of one or more of the vectors in the US[k] matrix 33 and the vectors in the V[k] matrix 35 (or vectors derived therefrom) that display both high energy and high directionality (e.g., represented as a directionality quotient) as distinct audio components. As a result, if the soundfield analysis unit 44 determines that a particular vector is relatively less directional when compared to other vectors of one or more of the vectors in the US[k] matrix 33 and the vectors in the V[k] matrix 35 (or vectors derived therefrom), then regardless of the energy level associated with the particular vector, the soundfield analysis unit 44 may determine that the particular vector represents background (or ambient) audio components of the soundfield represented by the HOA coefficients 11.

In some examples, the soundfield analysis unit 44 may identify distinct audio objects (which, as noted above, may also be referred to as "components") based on directionality, by performing the following operations. The soundfield analysis unit 44 may multiply (e.g., using one or more matrix multiplication processes) vectors in the S[k] matrix (which may be derived from the US[k] vectors 33 or, although not shown in the example of FIG. 4 separately output by the LIT unit 30) by the vectors in the V[k] matrix 35. By multiplying the V[k] matrix 35 and the S[k] vectors, the soundfield analysis unit 44 may obtain VS[k] matrix. Additionally, the soundfield analysis unit 44 may square (i.e., exponentiate by a power of two) at least some of the entries of each of the vectors in the VS[k] matrix. In some instances, the soundfield analysis unit 44 may sum those squared entries of each vector that are associated with an order greater than 1.

As one example, if each vector of the VS[k] matrix, which includes 25 entries, the soundfield analysis unit 44 may, with respect to each vector, square the entries of each vector beginning at the fifth entry and ending at the twenty-fifth entry, summing the squared entries to determine a directionality quotient (or a directionality indicator). Each summing operation may result in a directionality quotient for a corresponding vector. In this example, the soundfield analysis unit 44 may determine that those entries of each row that are associated with an order less than or equal to 1, namely, the first through fourth entries, are more generally directed to the amount of energy and less to the directionality of those entries. That is, the lower order ambisonics associated with an order of zero or one correspond to spherical basis functions that, as illustrated in FIG. 1 and FIG. 2, do not provide much in terms of the direction of the pressure wave, but rather provide some volume (which is representative of energy).

The operations described in the example above may also be expressed according to the following pseudo-code. The pseudo-code below includes annotations, in the form of comment statements that are included within consecutive instances of the character strings "/*" and "*/" (without quotes).

```
[U,S,V] = svd(audioframe,'ecom');
VS = V*S;
```

/* The next line is directed to analyzing each row independently, and summing the values in the first (as one example) row from the fifth entry to the twenty-fifth entry to determine a directionality quotient or directionality metric for a corresponding vector. Square the entries before summing. The entries in each row that are associated with an order greater than 1 are associated with higher order ambisonics, and are thus more likely to be directional. */

```
sumVS=sum(VS(5:end,:).^2,1);
```

/* The next line is directed to sorting the sum of squares for the generated VS matrix, and selecting a set of the largest values (e.g., three or four of the largest values) */

```
[~,idxVS] = sort(sumVS,'descend');
U = U(:,idxVS);
V = V(:,idxVS);
S = S(idxVS,idxVS);
```

In other words, according to the above pseudo-code, the soundfield analysis unit 44 may select entries of each vector of the VS[k] matrix decomposed from those of the HOA coefficients 11 corresponding to a spherical basis function having an order greater than one. The soundfield analysis unit 44 may then square these entries for each vector of the VS[k] matrix, summing the squared entries to identify, compute or otherwise determine a directionality metric or quotient for each vector of the VS[k] matrix. Next, the soundfield analysis unit 44 may sort the vectors of the VS[k] matrix based on the respective directionality metrics of each of the vectors. The soundfield analysis unit 44 may sort these vectors in a descending order of directionality metrics, such that those vectors with the highest corresponding directionality are first and those vectors with the lowest corresponding directionality are last. The soundfield analysis unit 44 may then select the a non-zero subset of the vectors having the highest relative directionality metric.

The soundfield analysis unit 44 may perform any combination of the foregoing analyses to determine the total number of psychoacoustic coder instantiations (which may be a function of the total number of ambient or background channels ($BG_{TOT}$) and the number of foreground channels. The soundfield analysis unit 44 may, based on any combination of the foregoing analyses, determine the total number of foreground channels (nFG) 45, the order of the background soundfield ($N_{BG}$) and the number (nBGa) and indices (i) of additional BG HOA channels to send (which may collectively be denoted as background channel information 43 in the example of FIG. 4).

In some examples, the soundfield analysis unit 44 may perform this analysis every M-samples, which may be restated as on a frame-by-frame basis. In this respect, the value for A may vary from frame to frame. An instance of a bitstream where the decision is made every M-samples is shown in FIGS. 10-10O(ii). In other examples, the soundfield analysis unit 44 may perform this analysis more than once per frame, analyzing two or more portions of the frame. Accordingly, the techniques should not be limited in this respect to the examples described in this disclosure.

The background selection unit 48 may represent a unit configured to determine background or ambient HOA coefficients 47 based on the background channel information (e.g., the background soundfield ($N_{BG}$) and the number (nBGa) and the indices (i) of additional BG HOA channels to send). For example, when $N_{BG}$ equals one, the background selection unit 48 may select the HOA coefficients 11 for each sample of the audio frame having an order equal to or less than one. The background selection unit 48 may, in this example, then select the HOA coefficients 11 having an index identified by one of the indices (i) as additional BG HOA coefficients, where the nBGa is provided to the bitstream generation unit 42 to be specified in the bitstream 21 so as to enable the audio decoding device, such as the audio decoding device 24 shown in the example of FIG. 3, to parse the BG HOA coefficients 47 from the bitstream 21. The background selection unit 48 may then output the ambient HOA coefficients 47 to the energy compensation unit 38. The ambient HOA coefficients 47 may have dimensions D: $M\times[(N_{BG}+1)^2+nBGa]$.

The foreground selection unit 36 may represent a unit configured to select those of the reordered US[k] matrix 33' and the reordered V[k] matrix 35' that represent foreground or distinct components of the soundfield based on nFG 45 (which may represent a one or more indices identifying these foreground vectors). The foreground selection unit 36 may output nFG signals 49 (which may be denoted as a reordered $US[k]_{1, \ldots, nFG}$ 49, $FG_{1, \ldots, nfG}[k]$ 49, or $X_{PS}^{(1 \ldots nFG)}(k)$ 49) to the psychoacoustic audio coder unit 40, where the nFG signals 49 may have dimensions D: M×nFG and each represent mono-audio objects. The foreground selection unit 36 may also output the reordered V[k] matrix 35' (or $v^{(1 \ldots nFG)}(k)$ 35') corresponding to foreground components of the soundfield to the spatio-temporal interpolation unit 50, where those of the reordered V[k] matrix 35' corresponding to the foreground components may be denoted as foreground V[k] matrix $51_k$ (which may be mathematically denoted as $\bar{V}_{1 \ldots nFG}[k]$) having dimensions D: $(N+1)^2 \times nFG$.

The energy compensation unit 38 may represent a unit configured to perform energy compensation with respect to the ambient HOA coefficients 47 to compensate for energy loss due to removal of various ones of the HOA channels by the background selection unit 48. The energy compensation unit 38 may perform an energy analysis with respect to one or more of the reordered US[k] matrix 33', the reordered V[k] matrix 35', the nFG signals 49, the foreground V[k] vectors $\mathbf{51}_k$ and the ambient HOA coefficients 47 and then perform energy compensation based on this energy analysis to generate energy compensated ambient HOA coefficients 47'. The energy compensation unit 38 may output the energy compensated ambient HOA coefficients 47' to the psychoacoustic audio coder unit 40.

Effectively, the energy compensation unit 38 may be used to compensate for possible reductions in the overall energy of the background sound components of the soundfield caused by reducing the order of the ambient components of the soundfield described by the HOA coefficients 11 to generate the order-reduced ambient HOA coefficients 47 (which, in some examples, have an order less than N in terms of only included coefficients corresponding to spherical basis functions having the following orders/sub-orders: $[(N_{BG}+1)^2+nBGa]$). In some examples, the energy compensation unit 38 compensates for this loss of energy by determining a compensation gain in the form of amplification values to apply to each of the $[(N_{BG}+1)^2+nBGa]$ columns of the ambient HOA coefficients 47 in order to increase the root mean-squared (RMS) energy of the ambient HOA coefficients 47 to equal or at least more nearly approximate the RMS of the HOA coefficients 11 (as determined through aggregate energy analysis of one or more of the reordered US[k] matrix 33', the reordered V[k] matrix 35', the nFG signals 49, the foreground V[k] vectors $\mathbf{51}_k$ and the order-reduced ambient HOA coefficients 47), prior to outputting ambient HOA coefficients 47 to the psychoacoustic audio coder unit 40.

In some instances, the energy compensation unit 38 may identify the RMS for each row and/or column of on one or more of the reordered US[k] matrix 33' and the reordered V[k] matrix 35'. The energy compensation unit 38 may also identify the RMS for each row and/or column of one or more of the selected foreground channels, which may include the nFG signals 49 and the foreground V[k] vectors $\mathbf{51}_k$, and the order-reduced ambient HOA coefficients 47. The RMS for each row and/or column of the one or more of the reordered US[k] matrix 33' and the reordered V[k] matrix 35' may be stored to a vector denoted $RMS_{FULL}$, while the RMS for each row and/or column of one or more of the nFG signals 49, the foreground V[k] vectors $\mathbf{51}_k$, and the order-reduced ambient HOA coefficients 47 may be stored to a vector denoted $RMS_{REDUCED}$. The energy compensation unit 38 may then compute an amplification value vector Z, in accordance with the following equation: $Z=RMS_{FULL}/RMS_{REDUCED}$. The energy compensation unit 38 may then apply this amplification value vector Z or various portions thereof to one or more of the nFG signals 49, the foreground V[k] vectors $\mathbf{51}_k$, and the order-reduced ambient HOA coefficients 47. In some instances, the amplification value vector Z is applied to only the order-reduced ambient HOA coefficients 47 per the following equation $HOA_{BG\text{-}RED}'=HOA_{BG\text{-}RED}Z^T$, where $HOA_{BG\text{-}RED}$ denotes the order-reduced ambient HOA coefficients 47, $HOA_{BG\text{-}RED}'$ denotes the energy compensated, reduced ambient HOA coefficients 47' and $Z^T$ denotes the transpose of the Z vector.

In some examples, to determine each RMS of respective rows and/or columns of one or more of the reordered US[k] matrix 33', the reordered V[k] matrix 35', the nFG signals 49, the foreground V[k] vectors $\mathbf{51}_k$, and the order-reduced ambient HOA coefficients 47, the energy compensation unit 38 may first apply a reference spherical harmonics coefficients (SHC) renderer to the columns. Application of the reference SHC renderer by the energy compensation unit 38 allows for determination of RMS in the SHC domain to determine the energy of the overall soundfield described by each row and/or column of the frame represented by rows and/or columns of one or more of the reordered US[k] matrix 33', the reordered V[k] matrix 35', the nFG signals 49, the foreground V[k] vectors $\mathbf{51}_k$, and the order-reduced ambient HOA coefficients 47, as described in more detail below.

The spatio-temporal interpolation unit 50 may represent a unit configured to receive the foreground V[k] vectors $\mathbf{51}_k$ for the k'th frame and the foreground V[k−1] vectors $\mathbf{51}_{k-1}$ for the previous frame (hence the k−1 notation) and perform spatio-temporal interpolation to generate interpolated foreground V[k] vectors. The spatio-temporal interpolation unit 50 may recombine the nFG signals 49 with the foreground V[k] vectors $\mathbf{51}_k$ to recover reordered foreground HOA coefficients. The spatio-temporal interpolation unit 50 may then divide the reordered foreground HOA coefficients by the interpolated V[k] vectors to generate interpolated nFG signals 49'. The spatio-temporal interpolation unit 50 may also output those of the foreground V[k] vectors $\mathbf{51}_k$ that were used to generate the interpolated foreground V[k] vectors so that an audio decoding device, such as the audio decoding device 24, may generate the interpolated foreground V[k] vectors and thereby recover the foreground V[k] vectors $\mathbf{51}_k$. Those of the foreground V[k] vectors $\mathbf{51}_k$ used to generate the interpolated foreground V[k] vectors are denoted as the remaining foreground V[k] vectors 53. In order to ensure that the same V[k] and V[k−1] are used at the encoder and decoder (to create the interpolated vectors V[k]) quantized/dequantized versions of these may be used at the encoder and decoder.

In this respect, the spatio-temporal interpolation unit 50 may represent a unit that interpolates a first portion of a first audio frame from some other portions of the first audio frame and a second temporally subsequent or preceding audio frame. In some examples, the portions may be denoted as sub-frames, where interpolation as performed with respect to sub-frames is described in more detail below with respect to FIGS. 45-46E. In other examples, the spatio-temporal interpolation unit 50 may operate with respect to some last number of samples of the previous frame and some first number of samples of the subsequent frame, as described in more detail with respect to FIGS. 37-39. The spatio-temporal interpolation unit 50 may, in performing this interpolation, reduce the number of samples of the foreground V[k] vectors $\mathbf{51}_k$ that are required to be specified in the bitstream 21, as only those of the foreground V[k] vectors $\mathbf{51}_k$ that are used to generate the interpolated V[k] vectors represent a subset of the foreground V[k] vectors $\mathbf{51}_k$. That is, in order to potentially make compression of the HOA coefficients 11 more efficient (by reducing the number of the foreground V[k] vectors $\mathbf{51}_k$ that are specified in the bitstream 21), various aspects of the techniques described in this disclosure may provide for interpolation of one or more portions of the first audio frame, where each of the portions may represent decomposed versions of the HOA coefficients 11.

The spatio-temporal interpolation may result in a number of benefits. First, the nFG signals 49 may not be continuous from frame to frame due to the block-wise nature in which the SVD or other LIT is performed. In other words, given that the LIT unit 30 applies the SVD on a frame-by-frame basis, certain discontinuities may exist in the resulting transformed HOA coefficients as evidence for example by the unordered nature of the US[k] matrix 33 and V[k] matrix 35. By performing this interpolation, the discontinuity may be reduced given that interpolation may have a smoothing effect that potentially reduces any artifacts introduced due to frame boundaries (or, in other words, segmentation of the HOA coefficients 11 into frames). Using the foreground V[k] vectors $\mathbf{51}_k$ to perform this interpolation and then generating the interpolated nFG signals 49' based on the interpolated foreground V[k] vectors $\mathbf{51}_k$ from the recovered reordered HOA coefficients may smooth at least some effects due to the frame-by-frame operation as well as due to reordering the nFG signals 49.

In operation, the spatio-temporal interpolation unit 50 may interpolate one or more sub-frames of a first audio frame from a first decomposition, e.g., foreground V[k] vectors $\mathbf{51}_k$, of a portion of a first plurality of the HOA coefficients 11 included in the first frame and a second decomposition, e.g., foreground V[k] vectors $\mathbf{51}_{k-1}$, of a portion of a second plurality of the HOA coefficients 11 included in a second frame to generate decomposed interpolated spherical harmonic coefficients for the one or more sub-frames.

In some examples, the first decomposition comprises the first foreground V[k] vectors $\mathbf{51}_k$ representative of right-singular vectors of the portion of the HOA coefficients 11. Likewise, in some examples, the second decomposition comprises the second foreground V[k] vectors $\mathbf{51}_k$ representative of right-singular vectors of the portion of the HOA coefficients 11.

In other words, spherical harmonics-based 3D audio may be a parametric representation of the 3D pressure field in terms of orthogonal basis functions on a sphere. The higher the order N of the representation, the potentially higher the spatial resolution, and often the larger the number of spherical harmonics (SH) coefficients (for a total of $(N+1)^2$ coefficients). For many applications, a bandwidth compression of the coefficients may be required for being able to transmit and store the coefficients efficiently. This techniques directed in this disclosure may provide a frame-based, dimensionality reduction process using Singular Value Decomposition (SVD). The SVD analysis may decompose each frame of coefficients into three matrices U, S and V. In some examples, the techniques may handle some of the vectors in US[k] matrix as foreground components of the underlying soundfield. However, when handled in this manner, these vectors (in U S[k] matrix) are discontinuous from frame to frame—even though they represent the same distinct audio component. These discontinuities may lead to significant artifacts when the components are fed through transform-audio-coders.

The techniques described in this disclosure may address this discontinuity. That is, the techniques may be based on the observation that the V matrix can be interpreted as orthogonal spatial axes in the Spherical Harmonics domain. The U[k] matrix may represent a projection of the Spherical Harmonics (HOA) data in terms of those basis functions, where the discontinuity can be attributed to orthogonal spatial axis (V[k]) that change every frame—and are therefore discontinuous themselves. This is unlike similar decomposition, such as the Fourier Transform, where the basis functions are, in some examples, constant from frame to frame. In these terms, the SVD may be considered of as a matching pursuit algorithm. The techniques described in this disclosure may enable the spatio-temporal interpolation unit 50 to maintain the continuity between the basis functions (V[k]) from frame to frame—by interpolating between them.

As noted above, the interpolation may be performed with respect to samples. This case is generalized in the above description when the subframes comprise a single set of samples. In both the case of interpolation over samples and over subframes, the interpolation operation may take the form of the following equation:

$$\overline{v(l)}=w(l)v(k)+(1-w(l))v(k-1).$$

In this above equation, the interpolation may be performed with respect to the single V-vector v(k) from the single V-vector v(k−1), which in one embodiment could represent V-vectors from adjacent frames k and k−1. In the above equation, l, represents the resolution over which the interpolation is being carried out, where l may indicate a integer sample and l=1 . . . , T (where T is the length of samples over which the interpolation is being carried out and over which the output interpolated vectors, $\overline{v(l)}$ are required and also indicates that the output of this process produces l of these vectors). Alternatively, l could indicate subframes consisting of multiple samples. When, for example, a frame is divided into four subframes, l may comprise values of 1, 2, 3 and 4, for each one of the subframes. The value of l may be signaled as a field termed "CodedSpatialInterpolationTime" through a bitstream—so that the interpolation operation may be replicated in the decoder. The w(l) may comprise values of the interpolation weights. When the interpolation is linear, w(l) may vary linearly and monotonically between 0 and 1, as a function of l. In other instances, w(l) may vary between 0 and 1 in a non-linear but monotonic fashion (such as a quarter cycle of a raised cosine) as a function of l. The function, w(l), may be indexed between a few different possibilities of functions and signaled in the bitstream as a field termed "SpatialInterpolationMethod" such that the identical interpolation operation may be replicated by the decoder. When w(l) is a value close to 0, the output, v(l) may be highly weighted or influenced by v(k−1). Whereas when w(l) is a value close to 1, it ensures that the output, $\overline{v(l)}$, is highly weighted or influenced by v(k−1).

The coefficient reduction unit 46 may represent a unit configured to perform coefficient reduction with respect to the remaining foreground V[k] vectors 53 based on the background channel information 43 to output reduced foreground V[k] vectors 55 to the quantization unit 52. The reduced foreground V[k] vectors 55 may have dimensions $D:[(N+1)^2-(N_{BG}+1)^2-nBGa]\times nFG$.

The coefficient reduction unit 46 may, in this respect, represent a unit configured to reduce the number of coefficients of the remaining foreground V[k] vectors 53. In other words, coefficient reduction unit 46 may represent a unit configured to eliminate those coefficients of the foreground V[k] vectors (that form the remaining foreground V[k] vectors 53) having little to no directional information. As described above, in some examples, those coefficients of the distinct or, in other words, foreground V[k] vectors corresponding to a first and zero order basis functions (which may be denoted as $N_{BG}$) provide little directional information and therefore can be removed from the foreground V vectors (through a process that may be referred to as "coefficient reduction"). In this example, greater flexibility may be provided to not only identify these coefficients that correspond $N_{BG}$ but to identify additional HOA channels (which may be denoted by the variable TotalOfAddAmbHOAChan) from the set of $[(N_{BG}+1)^2+1, (N+1)^2]$. The soundfield analysis unit 44 may analyze the HOA coefficients 11 to determine $BG_{TOT}$, which may identify not only the $(N_{BG}+1)^2$ but the TotalOfAddAmbHOAChan, which may collectively be referred to as the background channel information 43. The coefficient reduction unit 46 may then remove those coefficients corresponding to the $(N_{BG}+1)^2$ and the TotalOfAddAmbHOAChan from the remaining foreground V[k] vectors 53 to generate a smaller dimensional V[k] matrix 55 of size $((N+1)^2 \ldots (BG_{TOT})\times nFG$, which may also be referred to as the reduced foreground V[k] vectors 55.

The quantization unit 52 may represent a unit configured to perform any form of quantization to compress the reduced foreground V[k] vectors 55 to generate coded foreground V[k] vectors 57, outputting these coded foreground V[k] vectors 57 to the bitstream generation unit 42. In operation, the quantization unit 52 may represent a unit configured to compress a spatial component of the soundfield, i.e., one or more of the reduced foreground V[k] vectors 55 in this example. For purposes of example, the reduced foreground V[k] vectors 55 are assumed to include two row vectors having, as a result of the coefficient reduction, less than 25 elements each (which implies a fourth order HOA representation of the soundfield). Although described with respect to two row vectors, any number of vectors may be included in the reduced foreground V[k] vectors 55 up to $(n+1)^2$, where n denotes the order of the HOA representation of the soundfield. Moreover, although described below as performing a scalar and/or entropy quantization, the quantization unit 52 may perform any form of quantization that results in compression of the reduced foreground V[k] vectors 55.

The quantization unit 52 may receive the reduced foreground V[k] vectors 55 and perform a compression scheme to generate coded foreground V[k] vectors 57. This compression scheme may involve any conceivable compression scheme for compressing elements of a vector or data generally, and should not be limited to the example described below in more detail. The quantization unit 52 may perform, as an example, a compression scheme that includes one or more of transforming floating point representations of each element of the reduced foreground V[k] vectors 55 to integer representations of each element of the reduced foreground V[k] vectors 55, uniform quantization of the integer representations of the reduced foreground V[k] vectors 55 and categorization and coding of the quantized integer representations of the remaining foreground V[k] vectors 55.

In some examples, various of the one or more processes of this compression scheme may be dynamically controlled by parameters to achieve or nearly achieve, as one example, a target bitrate for the resulting bitstream 21. Given that each of the reduced foreground V[k] vectors 55 are orthonormal to one another, each of the reduced foreground V[k] vectors 55 may be coded independently. In some examples, as described in more detail below, each element of each reduced foreground V[k] vectors 55 may be coded using the same coding mode (defined by various sub-modes).

In any event, as noted above, this coding scheme may first involve transforming the floating point representations of each element (which is, in some examples, a 32-bit floating point number) of each of the reduced foreground V[k] vectors 55 to a 16-bit integer representation. The quantization unit 52 may perform this floating-point-to-integer-transformation by multiplying each element of a given one of the reduced foreground V[k] vectors 55 by $2^{15}$, which is, in some examples, performed by a right shift by 15.

The quantization unit 52 may then perform uniform quantization with respect to all of the elements of the given one of the reduced foreground V[k] vectors 55. The quantization unit 52 may identify a quantization step size based on a value, which may be denoted as an nbits parameter. The quantization unit 52 may dynamically determine this nbits parameter based on the target bitrate 41. The quantization unit 52 may determining the quantization step size as a function of this nbits parameter. As one example, the quantization unit 52 may determine the quantization step size (denoted as "delta" or "Δ" in this disclosure) as equal to $2^{16-nbits}$. In this example, if nbits equals six, delta equals $2^{10}$ and there are $2^6$ quantization levels. In this respect, for a vector element v, the quantized vector element $v_q$ equals $[v/\Delta]$ and $-2^{nbits-1}<v_q<2^{nbits-1}$.

The quantization unit 52 may then perform categorization and residual coding of the quantized vector elements. As one example, the quantization unit 52 may, for a given quantized vector element $v_q$ identify a category (by determining a category identifier cid) to which this element corresponds using the following equation:

$$\text{cid} = \begin{cases} 0, & \text{if } v_q = 0 \\ \lfloor \log_2 |v_q| \rfloor + 1, & \text{if } v_q \neq 0 \end{cases}$$

The quantization unit 52 may then Huffman code this category index cid, while also identifying a sign bit that indicates whether $v_q$ is a positive value or a negative value. The quantization unit 52 may next identify a residual in this category. As one example, the quantization unit 52 may determine this residual in accordance with the following equation:

$$\text{residual}=|v_q|-2^{cid-1}$$

The quantization unit 52 may then block code this residual with cid-1 bits.

The following example illustrates a simplified example of this categorization and residual coding process. First, assume nbits equals six so that $v_q \in [-31,31]$. Next, assume the following:

| cid | vq | Huffman Code for cid |
|---|---|---|
| 0 | 0 | '1' |
| 1 | −1, 1 | '01' |
| 2 | −3, −2, 2, 3 | '000' |
| 3 | −7, −6, −5, −4, 4, 5, 6, 7 | '0010' |
| 4 | −15, −14, . . . , −8, 8, . . . , 14, 15 | '00110' |
| 5 | −31, −30, . . . , −16, 16, . . . , 30, 31 | '00111' |

Also, assume the following:

| cid | Block Code for Residual |
|---|---|
| 0 | N/A |
| 1 | 0, 1 |
| 2 | 01, 00, 10, 11 |
| 3 | 011, 010, 001, 000, 100, 101, 110, 111 |
| 4 | 0111, 0110 . . . , 0000, 1000, . . . , 1110, 1111 |
| 5 | 01111, . . . , 00000, 10000, . . . , 11111 |

Thus, for a $v_q$=[6, −17, 0, 0, 3], the following may be determined:

cid=3,5,0,0,2 sign=1,0,x,x,1 residual=2,1,x,x,1

Bits for 6='0010'+'1'+'10'

Bits for −17='00111'+'0'+'0001'

Bits for 0='0'

Bits for 0='0'

Bits for 3='000'+'1'+'1'

Total bits=7+10+1+1+5=24

Average bits=24/5=4.8

While not shown in the foregoing simplified example, the quantization unit 52 may select different Huffman code books for different values of nbits when coding the cid. In some examples, the quantization unit 52 may provide a different Huffman coding table for nbits values 6, . . . , 15. Moreover, the quantization unit 52 may include five different Huffman code books for each of the different nbits values ranging from 6, . . . , 15 for a total of 50 Huffman code books. In this respect, the quantization unit 52 may include a plurality of different Huffman code books to accommodate coding of the cid in a number of different statistical contexts.

To illustrate, the quantization unit 52 may, for each of the nbits values, include a first Huffman code book for coding vector elements one through four, a second Huffman code book for coding vector elements five through nine, a third Huffman code book for coding vector elements nine and above. These first three Huffman code books may be used when the one of the reduced foreground V[k] vectors 55 to be compressed is not predicted from a temporally subsequent corresponding one of the reduced foreground V[k] vectors 55 and is not representative of spatial information of a synthetic audio object (one defined, for example, originally by a pulse code modulated (PCM) audio object). The quantization unit 52 may additionally include, for each of the nbits values, a fourth Huffman code book for coding the one of the reduced foreground V[k] vectors 55 when this one of the reduced foreground V[k] vectors 55 is predicted from a temporally subsequent corresponding one of the reduced foreground V[k] vectors 55. The quantization unit 52 may also include, for each of the nbits values, a fifth Huffman code book for coding the one of the reduced foreground V[k] vectors 55 when this one of the reduced foreground V[k] vectors 55 is representative of a synthetic audio object. The various Huffman code books may be developed for each of these different statistical contexts, i.e., the non-predicted and non-synthetic context, the predicted context and the synthetic context in this example.

The following table illustrates the Huffman table selection and the bits to be specified in the bitstream to enable the decompression unit to select the appropriate Huffman table:

| Pred mode | HT info | HT table |
|---|---|---|
| 0 | 0 | HT5 |
| 0 | 1 | HT{1, 2, 3} |
| 1 | 0 | HT4 |
| 1 | 1 | HT5 |

In the foregoing table, the prediction mode ("Pred mode") indicates whether prediction was performed for the current vector, while the Huffman Table ("HT info") indicates additional Huffman code book (or table) information used to select one of Huffman tables one through five.

The following table further illustrates this Huffman table selection process given various statistical contexts or scenarios.

| | Recording | Synthetic |
|---|---|---|
| W/O Pred | HT{1, 2, 3} | HT5 |
| With Pred | HT4 | HT5 |

In the foregoing table, the "Recording" column indicates the coding context when the vector is representative of an audio object that was recorded while the "Synthetic" column indicates a coding context for when the vector is representative of a synthetic audio object. The "W/O Pred" row indicates the coding context when prediction is not performed with respect to the vector elements, while the "With Pred" row indicates the coding context when prediction is performed with respect to the vector elements. As shown in this table, the quantization unit 52 selects HT{1, 2, 3} when the vector is representative of a recorded audio object and prediction is not performed with respect to the vector elements. The quantization unit 52 selects HT5 when the audio object is representative of a synthetic audio object and prediction is not performed with respect to the vector elements. The quantization unit 52 selects HT4 when the vector is representative of a recorded audio object and prediction is performed with respect to the vector elements. The quantization unit 52 selects HT5 when the audio object is representative of a synthetic audio object and prediction is performed with respect to the vector elements.

In this respect, the quantization unit 52 may perform the above noted scalar quantization and/or Huffman encoding to compress the reduced foreground V[k] vectors 55, outputting the coded foreground V[k] vectors 57, which may be referred to as side channel information 57. This side channel information 57 may include syntax elements used to code the remaining foreground V[k] vectors 55. The quantization unit 52 may output the side channel information 57 in a manner similar to that shown in the example of one of FIGS. 10B and 10C.

As noted above, the quantization unit 52 may generate syntax elements for the side channel information 57. For example, the quantization unit 52 may specify a syntax element in a header of an access unit (which may include one or more frames) denoting which of the plurality of configuration modes was selected. Although described as being specified on a per access unit basis, quantization unit 52 may specify this syntax element on a per frame basis or any other periodic basis or non-periodic basis (such as once for the entire bitstream). In any event, this syntax element may comprise two bits indicating which of the four configuration modes were selected for specifying the non-zero set of coefficients of the reduced foreground V[k] vectors 55 to represent the directional aspects of this distinct component. The syntax element may be denoted as "codedVVecLength." In this manner, the quantization unit 52 may signal or otherwise specify in the bitstream which of the four configuration modes were used to specify the coded foreground V[k] vectors 57 in the bitstream. Although described with respect to four configuration modes, the techniques should not be limited to four configuration modes but to any number of configuration modes, including a single configuration mode or a plurality of configuration modes. The scalar/entropy quantization unit 53 may also specify the flag 63 as another syntax element in the side channel information 57.

The psychoacoustic audio coder unit 40 included within the audio encoding device 20 may represent multiple instances of a psychoacoustic audio coder, each of which is used to encode a different audio object or HOA channel of each of the energy compensated ambient HOA coefficients 47' and the interpolated nFG signals 49' to generate encoded ambient HOA coefficients 59 and encoded nFG signals 61. The psychoacoustic audio coder unit 40 may output the encoded ambient HOA coefficients 59 and the encoded nFG signals 61 to the bitstream generation unit 42.

In some instances, this psychoacoustic audio coder unit 40 may represent one or more instances of an advanced audio coding (AAC) encoding unit. The psychoacoustic audio coder unit 40 may encode each column or row of the energy compensated ambient HOA coefficients 47' and the interpolated nFG signals 49'. Often, the psychoacoustic audio coder unit 40 may invoke an instance of an AAC encoding unit for each of the order/sub-order combinations remaining in the energy compensated ambient HOA coefficients 47' and the interpolated nFG signals 49'. More information regarding how the background spherical harmonic coefficients 31 may be encoded using an AAC encoding unit can be found in a convention paper by Eric Hellerud, et al., entitled "Encoding Higher Order Ambisonics with AAC," presented at the 124' Convention, 2008 May 17-20 and available at: http://ro.uow.edu.au/cgi/viewcontent.cgi?article=8025&context=engpapers. In some instances, the audio encoding unit 14 may audio encode the energy compensated ambient HOA coefficients 47' using a lower target bitrate than that used to encode the interpolated nFG signals 49', thereby potentially compressing the energy compensated ambient HOA coefficients 47' more in comparison to the interpolated nFG signals 49'.

The bitstream generation unit 42 included within the audio encoding device 20 represents a unit that formats data to conform to a known format (which may refer to a format known by a decoding device), thereby generating the vector-based bitstream 21. The bitstream generation unit 42 may represent a multiplexer in some examples, which may receive the coded foreground V[k] vectors 57, the encoded ambient HOA coefficients 59, the encoded nFG signals 61 and the background channel information 43. The bitstream generation unit 42 may then generate a bitstream 21 based on the coded foreground V[k] vectors 57, the encoded ambient HOA coefficients 59, the encoded nFG signals 61 and the background channel information 43. The bitstream 21 may include a primary or main bitstream and one or more side channel bitstreams.

Although not shown in the example of FIG. 4, the audio encoding device 20 may also include a bitstream output unit that switches the bitstream output from the audio encoding device 20 (e.g., between the directional-based bitstream 21 and the vector-based bitstream 21) based on whether a current frame is to be encoded using the directional-based synthesis or the vector-based synthesis. This bitstream output unit may perform this switch based on the syntax element output by the content analysis unit 26 indicating whether a directional-based synthesis was performed (as a result of detecting that the HOA coefficients 11 were generated from a synthetic audio object) or a vector-based synthesis was performed (as a result of detecting that the HOA coefficients were recorded). The bitstream output unit may specify the correct header syntax to indicate this switch or current encoding used for the current frame along with the respective one of the bitstreams 21.

In some instances, various aspects of the techniques may also enable the audio encoding device 20 to determine whether HOA coefficients 11 are generated from a synthetic audio object. These aspects of the techniques may enable the audio encoding device 20 to be configured to obtain an indication of whether spherical harmonic coefficients representative of a sound field are generated from a synthetic audio object.

In these and other instances, the audio encoding device 20 is further configured to determine whether the spherical harmonic coefficients are generated from the synthetic audio object.

In these and other instances, the audio encoding device 20 is configured to exclude a first vector from a framed spherical harmonic coefficient matrix storing at least a portion of the spherical harmonic coefficients representative of the sound field to obtain a reduced framed spherical harmonic coefficient matrix.

In these and other instances, the audio encoding device 20 is configured to exclude a first vector from a framed spherical harmonic coefficient matrix storing at least a portion of the spherical harmonic coefficients representative of the sound field to obtain a reduced framed spherical harmonic coefficient matrix, and predict a vector of the reduced framed spherical harmonic coefficient matrix based on remaining vectors of the reduced framed spherical harmonic coefficient matrix.

In these and other instances, the audio encoding device 20 is configured to exclude a first vector from a framed spherical harmonic coefficient matrix storing at least a portion of the spherical harmonic coefficients representative of the sound field to obtain a reduced framed spherical harmonic coefficient matrix, and predict a vector of the reduced framed spherical harmonic coefficient matrix based, at least in part, on a sum of remaining vectors of the reduced framed spherical harmonic coefficient matrix.

In these and other instances, the audio encoding device 20 is configured to predict a vector of a framed spherical harmonic coefficient matrix storing at least a portion of the spherical harmonic coefficients based, at least in part, on a sum of remaining vectors of the framed spherical harmonic coefficient matrix.

In these and other instances, the audio encoding device 20 is configured to further configured to predict a vector of a framed spherical harmonic coefficient matrix storing at least a portion of the spherical harmonic coefficients based, at least in part, on a sum of remaining vectors of the framed spherical harmonic coefficient matrix, and compute an error based on the predicted vector.

In these and other instances, the audio encoding device 20 is configured to configured to predict a vector of a framed spherical harmonic coefficient matrix storing at least a portion of the spherical harmonic coefficients based, at least in part, on a sum of remaining vectors of the framed spherical harmonic coefficient matrix, and compute an error based on the predicted vector and the corresponding vector of the framed spherical harmonic coefficient matrix.

In these and other instances, the audio encoding device 20 is configured to configured to predict a vector of a framed spherical harmonic coefficient matrix storing at least a portion of the spherical harmonic coefficients based, at least in part, on a sum of remaining vectors of the framed spherical harmonic coefficient matrix, and compute an error as a sum of the absolute value of the difference of the predicted vector and the corresponding vector of the framed spherical harmonic coefficient matrix.

In these and other instances, the audio encoding device 20 is configured to configured to predict a vector of a framed spherical harmonic coefficient matrix storing at least a portion of the spherical harmonic coefficients based, at least in part, on a sum of remaining vectors of the framed spherical harmonic coefficient matrix, compute an error based on the predicted vector and the corresponding vector of the framed spherical harmonic coefficient matrix, compute a ratio based on an energy of the corresponding vector of the framed spherical harmonic coefficient matrix and the error, and compare the ratio to a threshold to determine whether the spherical harmonic coefficients representative of the sound field are generated from the synthetic audio object.

In these and other instances, the audio encoding device 20 is configured to configured to specify the indication in a bitstream 21 that stores a compressed version of the spherical harmonic coefficients.

In some instances, the various techniques may enable the audio encoding device 20 to perform a transformation with respect to the HOA coefficients 11. In these and other instances, the audio encoding device 20 may be configured to obtain one or more first vectors describing distinct components of the soundfield and one or more second vectors describing background components of the soundfield, both the one or more first vectors and the one or more second vectors generated at least by performing a transformation with respect to the plurality of spherical harmonic coefficients 11.

In these and other instances, the audio encoding device 20, wherein the transformation comprises a singular value decomposition that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients 11.

In these and other instances, the audio encoding device 20, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and wherein the U matrix and the S matrix are generated at least by performing the singular value decomposition with respect to the plurality of spherical harmonic coefficients.

In these and other instances, the audio encoding device 20, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, and wherein the U matrix and the S matrix and the V matrix are generated at least by performing the singular value decomposition with respect to the plurality of spherical harmonic coefficients 11.

In these and other instances, the audio encoding device 20, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the audio encoding device 20 is further configured to obtain a value D indicating the number of vectors to be extracted from a bitstream to form the one or more $U_{DIST}*S_{DIST}$ vectors and the one or more $V^T_{DIST}$ vectors.

In these and other instances, the audio encoding device 20, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the audio encoding device 20 is further configured to obtain a value D on an audio-frame-by-audio-frame basis that indicates the number of vectors to be extracted from a bitstream to form the one or more $U_{DIST}*S_{DIST}$ vectors and the one or more $V^T_{DIST}$ vectors.

In these and other instances, the audio encoding device 20, wherein the transformation comprises a principal component analysis to identify the distinct components of the soundfield and the background components of the soundfield.

Various aspects of the techniques described in this disclosure may provide for the audio encoding device 20 configured to compensate for quantization error.

In some instances, the audio encoding device 20 may be configured to quantize one or more first vectors representative of one or more components of a sound field, and compensate for error introduced due to the quantization of the one or more first vectors in one or more second vectors that are also representative of the same one or more components of the sound field.

In these and other instances, the audio encoding device is configured to quantize one or more vectors from a transpose of a V matrix generated at least in part by performing a singular value decomposition with respect to a plurality of spherical harmonic coefficients that describe the sound field.

In these and other instances, the audio encoding device is further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and configured to quantize one or more vectors from a transpose of the V matrix.

In these and other instances, the audio encoding device is further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, configured to quantize one or more vectors from a transpose of the V matrix, and configured to compensate for the error introduced due to the quantization in one or more U*S vectors computed by multiplying one or more U vectors of the U matrix by one or more S vectors of the S matrix.

In these and other instances, the audio encoding device is further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $U_{DIST}$ vectors of the U matrix, each of which corresponds to a distinct component of the sound field, determine one or more $S_{DIST}$ vectors of the S matrix, each of which corresponds to the same distinct component of the sound field, and determine one or more $V^T_{DIST}$ vectors of a transpose of the V matrix, each of which corresponds to the same distinct component of the sound field, configured to quantize the one or more $V^T_{DIST}$ vectors to generate one or more $V^T_{Q\_DIST}$ vectors, and configured to compensate for the error introduced due to the quantization in one or more $U_{DIST}*S_{DIST}$ vectors computed by multiplying the one or more $U_{DIST}$ vectors of the U matrix by one or more $S_{DIST}$ vectors of the S matrix so as to generate one or more error compensated $U_{DIST}*S_{DIST}$ vectors.

In these and other instances, the audio encoding device is configured to determine distinct spherical harmonic coefficients based on the one or more $U_{DIST}$ vectors, the one or more $S_{DIST}$ vectors and the one or more $V^T_{DIST}$ vectors, and perform a pseudo inverse with respect to the $V^T_{Q\_DIST}$ vectors to divide the distinct spherical harmonic coefficients by the one or more $V^T_{Q\_DIST}$ vectors and thereby generate error compensated one or more $U_{C\_DIST}*S_{C\_DIST}$ vectors that compensate at least in part for the error introduced through the quantization of the $V^T_{DIST}$ vectors.

In these and other instances, the audio encoding device is further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $U_{BG}$ vectors of the U matrix that describe one or more background components of the sound field and one or more $U_{DIST}$ vectors of the U matrix that describe one or more distinct components of the sound field, determine one or more $S_{BG}$ vectors of the S matrix that describe the one or more background components of the sound field and one or more $S_{DIST}$ vectors of the S matrix that describe the one or more distinct components of the sound field, and determine one or more $V^T_{DIST}$ vectors and one or more $V^T_{BG}$ vectors of a transpose of the V matrix, wherein the $V^T_{DIST}$ vectors describe the one or more distinct components of the sound field and the $V^T_{BG}$ describe the one or more background components of the sound field, configured to quantize the one or more $V^T_{DIST}$ vectors to generate one or more $V^T_{Q\_DIST}$ vectors, and configured to compensate for the error introduced due to the quantization in background spherical harmonic coefficients formed by multiplying the one or more $U_{BG}$ vectors by the one or more $S_{BG}$ vectors and then by the one or more $V^T_{BG}$ vectors so as to generate error compensated background spherical harmonic coefficients.

In these and other instances, the audio encoding device is configured to determine the error based on the $V^T_{DIST}$ vectors and one or more $U_{DIST}*S_{DIST}$ vectors formed by multiplying the $U_{DIST}$ vectors by the $S_{DIST}$ vectors, and add the determined error to the background spherical harmonic coefficients to generate the error compensated background spherical harmonic coefficients.

In these and other instances, the audio encoding device is configured to compensate for the error introduced due to the quantization of the one or more first vectors in one or more second vectors that are also representative of the same one or more components of the sound field to generate one or more error compensated second vectors, and further configured to generate a bitstream to include the one or more error compensated second vectors and the quantized one or more first vectors.

In these and other instances, the audio encoding device is configured to compensate for the error introduced due to the quantization of the one or more first vectors in one or more second vectors that are also representative of the same one or more components of the sound field to generate one or more error compensated second vectors, and further configured to audio encode the one or more error compensated second vectors, and generate a bitstream to include the audio encoded one or more error compensated second vectors and the quantized one or more first vectors.

The various aspects of the techniques may further enable the audio encoding device 20 to generate reduced spherical harmonic coefficients or decompositions thereof. In some instances, the audio encoding device 20 may be configured to perform, based on a target bitrate, order reduction with respect to a plurality of spherical harmonic coefficients or decompositions thereof to generate reduced spherical harmonic coefficients or the reduced decompositions thereof, wherein the plurality of spherical harmonic coefficients represent a sound field.

In these and other instances, the audio encoding device 20 is further configured to, prior to performing the order reduction, perform a singular value decomposition with respect to the plurality of spherical harmonic coefficients to identify one or more first vectors that describe distinct components of the sound field and one or more second vectors that identify background components of the sound field, and configured to perform the order reduction with respect to the one or more first vectors, the one or more second vectors or both the one or more first vectors and the one or more second vectors.

In these and other instances, the audio encoding device 20 is further configured to performing a content analysis with respect to the plurality of spherical harmonic coefficients or the decompositions thereof, and configured to perform, based on the target bitrate and the content analysis, the order reduction with respect to the plurality of spherical harmonic coefficients or the decompositions thereof to generate the reduced spherical harmonic coefficients or the reduced decompositions thereof.

In these and other instances, the audio encoding device 20 is configured to perform a spatial analysis with respect to the plurality of spherical harmonic coefficients or the decompositions thereof.

In these and other instances, the audio encoding device 20 is configured to perform a diffusion analysis with respect to the plurality of spherical harmonic coefficients or the decompositions thereof.

In these and other instances, the audio encoding device 20 is the one or more processors are configured to perform a spatial analysis and a diffusion analysis with respect to the plurality of spherical harmonic coefficients or the decompositions thereof.

In these and other instances, the audio encoding device 20 is further configured to specify one or more orders and/or one or more sub-orders of spherical basis functions to which those of the reduced spherical harmonic coefficients or the reduced decompositions thereof correspond in a bitstream that includes the reduced spherical harmonic coefficients or the reduced decompositions thereof.

In these and other instances, the reduced spherical harmonic coefficients or the reduced decompositions thereof have less values than the plurality of spherical harmonic coefficients or the decompositions thereof.

In these and other instances, the audio encoding device 20 is configured to remove those of the plurality of spherical harmonic coefficients or vectors of the decompositions thereof having a specified order and/or sub-order to generate the reduced spherical harmonic coefficients or the reduced decompositions thereof.

In these and other instances, the audio encoding device 20 is configured to zero out those of the plurality of spherical harmonic coefficients or those vectors of the decomposition thereof having a specified order and/or sub-order to generate the reduced spherical harmonic coefficients or the reduced decompositions thereof.

Various aspects of the techniques may also allow for the audio encoding device 20 to be configured to represent distinct components of the soundfield. In these and other instances, the audio encoding device 20 is configured to obtain a first non-zero set of coefficients of a vector to be used to represent a distinct component of a sound field, wherein the vector is decomposed from a plurality of spherical harmonic coefficients describing the sound field.

In these and other instances, the audio encoding device 20 is configured to determine the first non-zero set of the coefficients of the vector to include all of the coefficients.

In these and other instances, the audio encoding device 20 is configured to determine the first non-zero set of coefficients as those of the coefficients corresponding to an order greater than an order of a basis function to which one or more of the plurality of spherical harmonic coefficients correspond.

In these and other instances, the audio encoding device 20 is configured to determine the first non-zero set of coefficients to include those of the coefficients corresponding to an order greater than an order of a basis function to which one or more of the plurality of spherical harmonic coefficients correspond and excluding at least one of the coefficients corresponding to an order greater than the order of the basis function to which the one or more of the plurality of spherical harmonic coefficients correspond.

In these and other instances, the audio encoding device 20 is configured to determine the first non-zero set of coefficients to include all of the coefficients except for at least one of the coefficients corresponding to an order greater than an order of a basis function to which one or more of the plurality of spherical harmonic coefficients correspond.

In these and other instances, the audio encoding device 20 is further configured to specify the first non-zero set of the coefficients of the vector in side channel information.

In these and other instances, the audio encoding device 20 is further configured to specify the first non-zero set of the coefficients of the vector in side channel information without audio encoding the first non-zero set of the coefficients of the vector.

In these and other instances, the vector comprises a vector decomposed from the plurality of spherical harmonic coefficients using vector based synthesis.

In these and other instances, the vector based synthesis comprises a singular value decomposition.

In these and other instances, the vector comprises a V vector decomposed from the plurality of spherical harmonic coefficients using singular value decomposition.

In these and other instances, the audio encoding device 20 is further configured to select one of a plurality of configuration modes by which to specify the non-zero set of coefficients of the vector, and specify the non-zero set of the coefficients of the vector based on the selected one of the plurality of configuration modes.

In these and other instances, the one of the plurality of configuration modes indicates that the non-zero set of the coefficients includes all of the coefficients.

In these and other instances, the one of the plurality of configuration modes indicates that the non-zero set of coefficients include those of the coefficients corresponding to an order greater than an order of a basis function to which one or more of the plurality of spherical harmonic coefficients correspond.

In these and other instances, the one of the plurality of configuration modes indicates that the non-zero set of the coefficients include those of the coefficients corresponding to an order greater than an order of a basis function to which one or more of the plurality of spherical harmonic coefficients correspond and exclude at least one of the coefficients corresponding to an order greater than the order of the basis function to which the one or more of the plurality of spherical harmonic coefficients correspond, In these and other instances, the one of the plurality of configuration modes indicates that the non-zero set of coefficients include all of the coefficients except for at least one of the coefficients.

In these and other instances, the audio encoding device 20 is further configured to specify the selected one of the plurality of configuration modes in a bitstream.

Various aspects of the techniques described in this disclosure may also allow for the audio encoding device 20 to be configured to represent that distinct component of the soundfield in various way. In these and other instances, the audio encoding device 20 is configured to obtain a first non-zero set of coefficients of a vector that represent a distinct component of a sound field, the vector having been decomposed from a plurality of spherical harmonic coefficients that describe the sound field.

In these and other instances, the first non-zero set of the coefficients includes all of the coefficients of the vector.

In these and other instances, the first non-zero set of coefficients include those of the coefficients corresponding to an order greater than an order of a basis function to which one or more of the plurality of spherical harmonic coefficients correspond.

In these and other instances, the first non-zero set of the coefficients include those of the coefficients corresponding to an order greater than an order of a basis function to which one or more of the plurality of spherical harmonic coefficients correspond and exclude at least one of the coefficients corresponding to an order greater than the order of the basis function to which the one or more of the plurality of spherical harmonic coefficients correspond.

In these and other instances, the first non-zero set of coefficients include all of the coefficients except for at least one of the coefficients identified as not have sufficient directional information.

In these and other instances, the audio encoding device 20 is further configured to extract the first non-zero set of the coefficients as a first portion of the vector.

In these and other instances, the audio encoding device 20 is further configured to extract the first non-zero set of the vector from side channel information, and obtain a recomposed version of the plurality of spherical harmonic coefficients based on the first non-zero set of the coefficients of the vector.

In these and other instances, the vector comprises a vector decomposed from the plurality of spherical harmonic coefficients using vector based synthesis.

In these and other instances, the vector based synthesis comprises singular value decomposition.

In these and other instances, the audio encoding device 20 is further configured to determine one of a plurality of configuration modes by which to extract the non-zero set of coefficients of the vector in accordance with the one of the plurality of configuration modes, and extract the non-zero set of the coefficients of the vector based on the obtained one of the plurality of configuration modes.

In these and other instances, the one of the plurality of configuration modes indicates that the non-zero set of the coefficients includes all of the coefficients.

In these and other instances, the one of the plurality of configuration modes indicates that the non-zero set of coefficients include those of the coefficients corresponding to an order greater than an order of a basis function to which one or more of the plurality of spherical harmonic coefficients correspond.

In these and other instances, the one of the plurality of configuration modes indicates that the non-zero set of the coefficients include those of the coefficients corresponding to an order greater than an order of a basis function to which one or more of the plurality of spherical harmonic coefficients correspond and exclude at least one of the coefficients corresponding to an order greater than the order of the basis function to which the one or more of the plurality of spherical harmonic coefficients correspond, In these and other instances, the one of the plurality of configuration modes indicates that the non-zero set of coefficients include all of the coefficients except for at least one of the coefficients.

In these and other instances, the audio encoding device 20 is configured to determine the one of the plurality of configuration modes based on a value signaled in a bitstream.

Various aspects of the techniques may also, in some instances, enable the audio encoding device 20 to identify one or more distinct audio objects (or, in other words, predominant audio objects). In some instances, the audio encoding device 20 may be configured to identify one or more distinct audio objects from one or more spherical harmonic coefficients (SHC) associated with the audio objects based on a directionality determined for one or more of the audio objects.

In these and other instances, the audio encoding device 20 is further configured to determine the directionality of the one or more audio objects based on the spherical harmonic coefficients associated with the audio objects.

In these and other instances, the audio encoding device 20 is further configured to perform a singular value decomposition with respect to the spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and represent the plurality of spherical harmonic coefficients as a function of at least a portion of one or more of the U matrix, the S matrix and the V matrix, wherein the audio encoding device 20 is configured to determine the respective directionality of the one or more audio objects is based at least in part on the V matrix.

In these and other instances, the audio encoding device 20 is further configured to reorder one or more vectors of the V matrix such that vectors having a greater directionality quotient are positioned above vectors having a lesser directionality quotient in the reordered V matrix.

In these and other instances, the audio encoding device 20 is further configured to determine that the vectors having the greater directionality quotient include greater directional information than the vectors having the lesser directionality quotient.

In these and other instances, the audio encoding device 20 is further configured to multiply the V matrix by the S matrix to generate a VS matrix, the VS matrix including one or more vectors.

In these and other instances, the audio encoding device 20 is further configured to select entries of each row of the VS matrix that are associated with an order greater than 14, square each of the selected entries to form corresponding squared entries, and for each row of the VS matrix, sum all of the squared entries to determine a directionality quotient for a corresponding vector.

In these and other instances, the audio encoding device 20 is configured to select the entries of each row of the VS matrix associated with the order greater than 14 comprises selecting all entries beginning at a 18th entry of each row of the VS matrix and ending at a 38th entry of each row of the VS matrix.

In these and other instances, the audio encoding device 20 is further configured to select a subset of the vectors of the VS matrix to represent the distinct audio objects. In these and other instances, the audio encoding device 20 is configured to select four vectors of the VS matrix, and wherein the selected four vectors have the four greatest directionality quotients of all of the vectors of the VS matrix.

In these and other instances, the audio encoding device 20 is configured to determine that the selected subset of the vectors represent the distinct audio objects is based on both the directionality and an energy of each vector.

In these and other instances, the audio encoding device 20 is further configured to perform an energy comparison between one or more first vectors and one or more second vectors representative of the distinct audio objects to determine reordered one or more first vectors, wherein the one or more first vectors describe the distinct audio objects a first portion of audio data and the one or more second vectors describe the distinct audio objects in a second portion of the audio data.

In these and other instances, the audio encoding device 20 is further configured to perform a cross-correlation between one or more first vectors and one or more second vectors representative of the distinct audio objects to determine reordered one or more first vectors, wherein the one or more first vectors describe the distinct audio objects a first portion of audio data and the one or more second vectors describe the distinct audio objects in a second portion of the audio data.

Various aspects of the techniques may also, in some instances, enable the audio encoding device 20 to be configured to perform energy compensation with respect to decompositions of the HOA coefficients 11. In these and other instances, the audio encoding device 20 may be configured to perform a vector-based synthesis with respect to a plurality of spherical harmonic coefficients to generate decomposed representations of the plurality of spherical harmonic coefficients representative of one or more audio objects and corresponding directional information, wherein the spherical harmonic coefficients are associated with an order and describe a sound field, determine distinct and background directional information from the directional information, reduce an order of the directional information associated with the background audio objects to generate transformed background directional information, apply compensation to increase values of the transformed directional information to preserve an overall energy of the sound field.

In these and other instances, the audio encoding device 20 may be configured to perform a singular value decomposition with respect to a plurality of spherical harmonic coefficients to generate a U matrix and an S matrix representative of the audio objects and a V matrix representative of the directional information, determine distinct column vectors of the V matrix and background column vectors of the V matrix, reduce an order of the background column vectors of the V matrix to generate transformed background column vectors of the V matrix, and apply the compensation to increase values of the transformed background column vectors of the V matrix to preserve an overall energy of the sound field.

In these and other instances, the audio encoding device 20 is further configured to determine a number of salient singular values of the S matrix, wherein a number of the distinct column vectors of the V matrix is the number of salient singular values of the S matrix.

In these and other instances, the audio encoding device 20 is configured to determine a reduced order for the spherical harmonics coefficients, and zero values for rows of the background column vectors of the V matrix associated with an order that is greater than the reduced order.

In these and other instances, the audio encoding device 20 is further configured to combine background columns of the U matrix, background columns of the S matrix, and a transpose of the transformed background columns of the V matrix to generate modified spherical harmonic coefficients.

In these and other instances, the modified spherical harmonic coefficients describe one or more background components of the sound field.

In these and other instances, the audio encoding device 20 is configured to determine a first energy of a vector of the background column vectors of the V matrix and a second energy of a vector of the transformed background column vectors of the V matrix, and apply an amplification value to each element of the vector of the transformed background column vectors of the V matrix, wherein the amplification value comprises a ratio of the first energy to the second energy.

In these and other instances, the audio encoding device 20 is configured to determine a first root mean-squared energy of a vector of the background column vectors of the V matrix and a second root mean-squared energy of a vector of the transformed background column vectors of the V matrix, and apply an amplification value to each element of the vector of the transformed background column vectors of the V matrix, wherein the amplification value comprises a ratio of the first energy to the second energy.

Various aspects of the techniques described in this disclosure may also enable the audio encoding device 20 to perform interpolation with respect to decomposed versions of the HOA coefficients 11. In some instances, the audio encoding device 20 may be configured to obtain decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients.

In these and other instances, the first decomposition comprises a first V matrix representative of right-singular vectors of the first plurality of spherical harmonic coefficients.

In these and other examples, the second decomposition comprises a second V matrix representative of right-singular vectors of the second plurality of spherical harmonic coefficients.

In these and other instances, the first decomposition comprises a first V matrix representative of right-singular vectors of the first plurality of spherical harmonic coefficients, and the second decomposition comprises a second V matrix representative of right-singular vectors of the second plurality of spherical harmonic coefficients.

In these and other instances, the time segment comprises a sub-frame of an audio frame.

In these and other instances, the time segment comprises a time sample of an audio frame.

In these and other instances, the audio encoding device 20 is configured to obtain an interpolated decomposition of the first decomposition and the second decomposition for a spherical harmonic coefficient of the first plurality of spherical harmonic coefficients.

In these and other instances, the audio encoding device 20 is configured to obtain interpolated decompositions of the first decomposition for a first portion of the first plurality of spherical harmonic coefficients included in the first frame and the second decomposition for a second portion of the second plurality of spherical harmonic coefficients included in the second frame, and the audio encoding device 20 is further configured to apply the interpolated decompositions to a first time component of the first portion of the first plurality of spherical harmonic coefficients included in the first frame to generate a first artificial time component of the first plurality of spherical harmonic coefficients, and apply the respective interpolated decompositions to a second time component of the second portion of the second plurality of spherical harmonic coefficients included in the second frame to generate a second artificial time component of the second plurality of spherical harmonic coefficients included.

In these and other instances, the first time component is generated by performing a vector-based synthesis with respect to the first plurality of spherical harmonic coefficients.

In these and other instances, the second time component is generated by performing a vector-based synthesis with respect to the second plurality of spherical harmonic coefficients.

In these and other instances, the audio encoding device 20 is further configured to receive the first artificial time component and the second artificial time component, compute interpolated decompositions of the first decomposition for the first portion of the first plurality of spherical harmonic coefficients and the second decomposition for the second portion of the second plurality of spherical harmonic coefficients, and apply inverses of the interpolated decompositions to the first artificial time component to recover the first time component and to the second artificial time component to recover the second time component.

In these and other instances, the audio encoding device 20 is configured to interpolate a first spatial component of the first plurality of spherical harmonic coefficients and the second spatial component of the second plurality of spherical harmonic coefficients.

In these and other instances, the first spatial component comprises a first U matrix representative of left-singular vectors of the first plurality of spherical harmonic coefficients.

In these and other instances, the second spatial component comprises a second U matrix representative of left-singular vectors of the second plurality of spherical harmonic coefficients.

In these and other instances, the first spatial component is representative of M time segments of spherical harmonic coefficients for the first plurality of spherical harmonic coefficients and the second spatial component is representative of M time segments of spherical harmonic coefficients for the second plurality of spherical harmonic coefficients.

In these and other instances, the first spatial component is representative of M time segments of spherical harmonic coefficients for the first plurality of spherical harmonic coefficients and the second spatial component is representative of M time segments of spherical harmonic coefficients for the second plurality of spherical harmonic coefficients, and the audio encoding device 20 is configured to interpolate the last N elements of the first spatial component and the first N elements of the second spatial component.

In these and other instances, the second plurality of spherical harmonic coefficients are subsequent to the first plurality of spherical harmonic coefficients in the time domain.

In these and other instances, the audio encoding device 20 is further configured to decompose the first plurality of spherical harmonic coefficients to generate the first decomposition of the first plurality of spherical harmonic coefficients.

In these and other instances, the audio encoding device 20 is further configured to decompose the second plurality of spherical harmonic coefficients to generate the second decomposition of the second plurality of spherical harmonic coefficients.

In these and other instances, the audio encoding device 20 is further configured to perform a singular value decomposition with respect to the first plurality of spherical harmonic coefficients to generate a U matrix representative of left-singular vectors of the first plurality of spherical harmonic coefficients, an S matrix representative of singular values of the first plurality of spherical harmonic coefficients and a V matrix representative of right-singular vectors of the first plurality of spherical harmonic coefficients.

In these and other instances, the audio encoding device 20 is further configured to perform a singular value decomposition with respect to the second plurality of spherical harmonic coefficients to generate a U matrix representative of left-singular vectors of the second plurality of spherical harmonic coefficients, an S matrix representative of singular values of the second plurality of spherical harmonic coefficients and a V matrix representative of right-singular vectors of the second plurality of spherical harmonic coefficients.

In these and other instances, the first and second plurality of spherical harmonic coefficients each represent a planar wave representation of the sound field.

In these and other instances, the first and second plurality of spherical harmonic coefficients each represent one or more mono-audio objects mixed together.

In these and other instances, the first and second plurality of spherical harmonic coefficients each comprise respective first and second spherical harmonic coefficients that represent a three dimensional sound field.

In these and other instances, the first and second plurality of spherical harmonic coefficients are each associated with at least one spherical basis function having an order greater than one.

In these and other instances, the first and second plurality of spherical harmonic coefficients are each associated with at least one spherical basis function having an order equal to four.

In these and other instances, the interpolation is a weighted interpolation of the first decomposition and second decomposition, wherein weights of the weighted interpolation applied to the first decomposition are inversely proportional to a time represented by vectors of the first and second decomposition and wherein weights of the weighted interpolation applied to the second decomposition are proportional to a time represented by vectors of the first and second decomposition.

In these and other instances, the decomposed interpolated spherical harmonic coefficients smooth at least one of spatial components and time components of the first plurality of spherical harmonic coefficients and the second plurality of spherical harmonic coefficients.

In these and other instances, the audio encoding device 20 is configured to compute Us[n]=HOA(n)*(V_vec[n])−1 to obtain a scalar.

In these and other instances, the interpolation comprises a linear interpolation. In these and other instances, the interpolation comprises a non-linear interpolation. In these and other instances, the interpolation comprises a cosine interpolation. In these and other instances, the interpolation comprises a weighted cosine interpolation. In these and other instances, the interpolation comprises a cubic interpolation. In these and other instances, the interpolation comprises an Adaptive Spline Interpolation. In these and other instances, the interpolation comprises a minimal curvature interpolation.

In these and other instances, the audio encoding device 20 is further configured to generate a bitstream that includes a representation of the decomposed interpolated spherical harmonic coefficients for the time segment, and an indication of a type of the interpolation.

In these and other instances, the indication comprises one or more bits that map to the type of interpolation.

In this way, various aspects of the techniques described in this disclosure may enable the audio encoding device 20 to be configured to obtain a bitstream that includes a representation of the decomposed interpolated spherical harmonic coefficients for the time segment, and an indication of a type of the interpolation.

In these and other instances, the indication comprises one or more bits that map to the type of interpolation.

In this respect, the audio encoding device 20 may represent one embodiment of the techniques in that the audio encoding device 20 may, in some instances, be configured to generate a bitstream comprising a compressed version of a spatial component of a sound field, the spatial component generated by performing a vector based synthesis with respect to a plurality of spherical harmonic coefficients.

In these and other instances, the audio encoding device 20 is further configured to generate the bitstream to include a field specifying a prediction mode used when compressing the spatial component.

In these and other instances, the audio encoding device 20 is configured to generate the bitstream to include Huffman table information specifying a Huffman table used when compressing the spatial component.

In these and other instances, the audio encoding device 20 is configured to generate the bitstream to include a field indicating a value that expresses a quantization step size or a variable thereof used when compressing the spatial component.

In these and other instances, the value comprises an nbits value.

In these and other instances, the audio encoding device 20 is configured to generate the bitstream to include a compressed version of a plurality of spatial components of the sound field of which the compressed version of the spatial component is included, where the value expresses the quantization step size or a variable thereof used when compressing the plurality of spatial components.

In these and other instances, the audio encoding device 20 is further configured to generate the bitstream to include a Huffman code to represent a category identifier that identifies a compression category to which the spatial component corresponds.

In these and other instances, the audio encoding device 20 is configured to generate the bitstream to include a sign bit identifying whether the spatial component is a positive value or a negative value.

In these and other instances, the audio encoding device 20 is configured to generate the bitstream to include a Huffman code to represent a residual value of the spatial component.

In these and other instances, the vector based synthesis comprises a singular value decomposition.

In this respect, the audio encoding device 20 may further implement various aspects of the techniques in that the audio encoding device 20 may, in some instances, be configured to identify a Huffman codebook to use when compressing a spatial component of a plurality of spatial components based on an order of the spatial component relative to remaining ones of the plurality of spatial components, the spatial component generated by performing a vector based synthesis with respect to a plurality of spherical harmonic coefficients.

In these and other instances, the audio encoding device 20 is configured to identify the Huffman codebook based on a prediction mode used when compressing the spatial component.

In these and other instances, a compressed version of the spatial component is represented in a bitstream using, at least in part, Huffman table information identifying the Huffman codebook.

In these and other instances, a compressed version of the spatial component is represented in a bitstream using, at least in part, a field indicating a value that expresses a quantization step size or a variable thereof used when compressing the spatial component.

In these and other instances, the value comprises an nbits value.

In these and other instances, the bitstream comprises a compressed version of a plurality of spatial components of the sound field of which the compressed version of the spatial component is included, and the value expresses the quantization step size or a variable thereof used when compressing the plurality of spatial components.

In these and other instances, a compressed version of the spatial component is represented in a bitstream using, at least in part, a Huffman code selected form the identified Huffman codebook to represent a category identifier that identifies a compression category to which the spatial component corresponds.

In these and other instances, a compressed version of the spatial component is represented in a bitstream using, at least in part, a sign bit identifying whether the spatial component is a positive value or a negative value.

In these and other instances, a compressed version of the spatial component is represented in a bitstream using, at least in part, a Huffman code selected form the identified Huffman codebook to represent a residual value of the spatial component.

In these and other instances, the audio encoding device 20 is further configured to compress the spatial component based on the identified Huffman codebook to generate a compressed version of the spatial component, and generate the bitstream to include the compressed version of the spatial component.

Moreover, the audio encoding device 20 may, in some instances, implement various aspects of the techniques in that the audio encoding device 20 may be configured to determine a quantization step size to be used when compressing a spatial component of a sound field, the spatial component generated by performing a vector based synthesis with respect to a plurality of spherical harmonic coefficients.

In these and other instances, the audio encoding device 20 is further configured to determine the quantization step size based on a target bit rate.

In these and other instances, the audio encoding device 20 is configured to determine an estimate of a number of bits used to represent the spatial component, and determine the quantization step size based on a difference between the estimate and a target bit rate.

In these and other instances, the audio encoding device 20 is configured to determine an estimate of a number of bits used to represent the spatial component, determine a difference between the estimate and a target bit rate, and determine the quantization step size by adding the difference to the target bit rate.

In these and other instances, the audio encoding device 20 is configured to calculate the estimated of the number of bits that are to be generated for the spatial component given a code book corresponding to the target bit rate.

In these and other instances, the audio encoding device 20 is configured to calculate the estimated of the number of bits that are to be generated for the spatial component given a coding mode used when compressing the spatial component.

In these and other instances, the audio encoding device 20 is configured to calculate a first estimate of the number of bits that are to be generated for the spatial component given a first coding mode to be used when compressing the spatial component, calculate a second estimate of the number of bits that are to be generated for the spatial component given a second coding mode to be used when compressing the spatial component, select the one of the first estimate and the second estimate having a least number of bits to be used as the determined estimate of the number of bits.

In these and other instances, the audio encoding device 20 is configured to identify a category identifier identifying a category to which the spatial component corresponds, identify a bit length of a residual value for the spatial component that would result when compressing the spatial component corresponding to the category, and determine the estimate of the number of bits by, at least in part, adding a number of bits used to represent the category identifier to the bit length of the residual value.

In these and other instances, the audio encoding device 20 is further configured to select one of a plurality of code books to be used when compressing the spatial component.

In these and other instances, the audio encoding device 20 is further configured to determine an estimate of a number of bits used to represent the spatial component using each of the plurality of code books, and select the one of the plurality of code books that resulted in the determined estimate having the least number of bits.

In these and other instances, the audio encoding device 20 is further configured to determine an estimate of a number of bits used to represent the spatial component using one or more of the plurality of code books, the one or more of the plurality of code books selected based on an order of elements of the spatial component to be compressed relative to other elements of the spatial component.

In these and other instances, the audio encoding device 20 is further configured to determine an estimate of a number of bits used to represent the spatial component using one of the plurality of code books designed to be used when the spatial component is not predicted from a subsequent spatial component.

In these and other instances, the audio encoding device 20 is further configured to determine an estimate of a number of bits used to represent the spatial component using one of the plurality of code books designed to be used when the spatial component is predicted from a subsequent spatial component.

In these and other instances, the audio encoding device 20 is further configured to determine an estimate of a number of bits used to represent the spatial component using one of the plurality of code books designed to be used when the spatial component is representative of a synthetic audio object in the sound field.

In these and other instances, the synthetic audio object comprises a pulse code modulated (PCM) audio object.

In these and other instances, the audio encoding device 20 is further configured to determine an estimate of a number of bits used to represent the spatial component using one of the plurality of code books designed to be used when the spatial component is representative of a recorded audio object in the sound field.

In each of the various instances described above, it should be understood that the audio encoding device 20 may perform a method or otherwise comprise means to perform each step of the method for which the audio encoding device 20 is configured to perform. In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

FIG. 5 is a block diagram illustrating the audio decoding device 24 of FIG. 3 in more detail. As shown in the example of FIG. 5, the audio decoding device 24 may include an extraction unit 72, a directionality-based reconstruction unit 90 and a vector-based reconstruction unit 92.

The extraction unit 72 may represent a unit configured to receive the bitstream 21 and extract the various encoded versions (e.g., a directional-based encoded version or a vector-based encoded version) of the HOA coefficients 11. The extraction unit 72 may determine from the above noted syntax element (e.g., the ChannelType syntax element shown in the examples of FIGS. 10E and 10H(i)-10O(ii)) whether the HOA coefficients 11 were encoded via the various versions. When a directional-based encoding was performed, the extraction unit 72 may extract the directional-based version of the HOA coefficients 11 and the syntax elements associated with this encoded version (which is denoted as directional-based information 91 in the example of FIG. 5), passing this directional based information 91 to the directional-based reconstruction unit 90. This directional-based reconstruction unit 90 may represent a unit configured to reconstruct the HOA coefficients in the form of HOA coefficients 11' based on the directional-based information 91. The bitstream and the arrangement of syntax elements within the bitstream is described below in more detail with respect to the example of FIGS. 10-10O(ii) and 11.

When the syntax element indicates that the HOA coefficients 11 were encoded using a vector-based synthesis, the extraction unit 72 may extract the coded foreground V[k] vectors 57, the encoded ambient HOA coefficients 59 and the encoded nFG signals 59. The extraction unit 72 may pass the coded foreground V[k] vectors 57 to the quantization unit 74 and the encoded ambient HOA coefficients 59 along with the encoded nFG signals 61 to the psychoacoustic decoding unit 80.

To extract the coded foreground V[k] vectors 57, the encoded ambient HOA coefficients 59 and the encoded nFG signals 59, the extraction unit 72 may obtain the side channel information 57, which includes the syntax element denoted codedVVecLength. The extraction unit 72 may parse the codedVVecLength from the side channel information 57. The extraction unit 72 may be configured to operate in any one of the above described configuration modes based on the codedVVecLength syntax element.

The extraction unit 72 then operates in accordance with any one of configuration modes to parse a compressed form of the reduced foreground V[k] vectors $55_k$ from the side channel information 57. The extraction unit 72 may operate in accordance with the switch statement presented in the following pseudo-code with the syntax presented in the following syntax table for VVectorData:

```
switch CodedVVecLength{
    case 0:
        VVecLength = NumOfHoaCoeffs;
        for (m=0; m<VVecLength; ++m){
            VVecCoeffId[m] = m;
        }
        break;
    case 1:
        VVecLength = NumOfHoaCoeffs − MinNumOfCoeffsForAmbHOA −
    NumOfContAddHoaChans;
    n = 0;
    for(m=MinNumOfCoeffsForAmbHOA; m<NumOfHoaCoeffs; ++m){
            CoeffIdx = m+1;
```

-continued

```
            if(CoeffIdx isNotMemberOf ContAddHoaCoeff){
                    VVecCoeffId[n] = CoeffIdx−1;
                    n++;
            }
      }
            break;
case 2:
            VVecLength = NumOfHoaCoeffs − MinNumOfCoeffsForAmbHOA;
            for (m=0; m< VVecLength; ++m){
                    VVecCoeffId[m] = m + MinNumOfCoeffsForAmbHOA;
            }
      break;
      case 3:
      VVecLength = NumOfHoaCoeffs − NumOfContAddHoaChans;
      n = 0;
      for(m=0; m<NumOfHoaCoeffs; ++m){
                    c = m+1;
            if(c isNotMemberOf ContAddHoaCoeff){
                    VVecCoeffId[n] = c−1;
                    n++;
            }
      }
}
```

| Syntax | No. of bits | Mnemonic |
|---|---|---|
| VVectorData(i) | | |
| { | | |
| if (NbitsQ(k)[i] == 5){ | | |
| for (m=0; m< VVecLength; ++m){ | | |
| VVec[i][VVecCoeffId[m]](k) = (VecVal / 128.0) - 1.0; | 8 | uimsbf |
| } | | |
| elseif(NbitsQ(k)[i] >= 6){ | | |
| for (m=0; m< VVecLength; ++m){ | | |
| huffIdx = huffSelect(VVecCoeffId[m], PFlag[i], CbFlag[i]); | | |
| cid = huffDecode(NbitsQ[i], huffIdx, huffVal); | dynamic | huffDecode |
| aVal[i][m] = 0.0; | | |
| if ( cid > 0 ) { | | |
| aVal[i][m] = sgn = (sgnVal * 2) - 1; | 1 | bslbf |
| if (cid > 1) { | | |
| aVal[i][m] = sgn * (2.0^(cid -1 ) + intAddVal); | cid-1 | uimsbf |
| } | | |
| } | | |
| VVec[i][VVecCoeffId[m]](k) = aVal[i][m] *(2^(16 - NbitsQ(k)[i])*aVal[i][m])2^15; | | |
| if (PFlag(k)[i] == 1) { | | |
| VVec[i][VVecCoeffId[m]](k)+= VVec[i][VVecCoeffId[m]](k-1) | | |
| } | | |
| } | | |
| } | | |

In the foregoing syntax table, the first switch statement with the four cases (case 0-3) provides for a way by which to determine the $V^T_{DIST}$ vector length in terms of the number (VVecLength) and indices of coefficients (VVecCoeffId). The first case, case 0, indicates that all of the coefficients for the $V^T_{DIST}$ vectors (NumOfHoaCoeffs) are specified. The second case, case 1, indicates that only those coefficients of the $V^T_{DIST}$ vector corresponding to the number greater than a MinNumOfCoeffsForAmbHOA are specified, which may denote what is referred to as $(N_{DIST}+1)^2-(N_{BG}+1)^2$ above. Further those NumOfContAddAmbHoaChan coefficients identified in ContAddAmbHoaChan are subtracted. The list ContAddAmbHoaChan specifies additional channels (where "channels" refer to a particular coefficient corresponding to a certain order, sub-order combination) corresponding to an order that exceeds the order MinAmbHoaOrder. The third case, case 2, indicates that those coefficients of the $V^T_{DIST}$ vector corresponding to the number greater than a MinNumOfCoeffsForAmbHOA are specified, which may denote what is referred to as $(N_{DIST}+1)^2-(N_{BG}+1)^2$ above. The fourth case, case 3, indicates that those coefficients of the $V^T_{DIST}$ vector left after removing coefficients identified by NumOfContAddAmbHoaChan are specified. Both the VVecLength as well as the VVecCoeffId list is valid for all VVectors within on HOAFrame.

After this switch statement, the decision of whether to perform uniform dequantization may be controlled by NbitsQ (or, as denoted above, nbits), which if equals 5, a uniform 8 bit scalar dequantization is performed. In contrast, an NbitsQ value of greater or equals 6 may result in application of Huffman decoding. The cid value referred to above may be equal to the two least significant bits of the NbitsQ value. The prediction mode discussed above is denoted as the PFlag in the above syntax table, while the HT info bit is denoted as the CbFlag in the above syntax table. The remaining syntax specifies how the decoding occurs in a manner substantially similar to that described above. Various examples of the bitstream 21 that conforms to each of the various cases noted above are described in more detail below with respect to FIGS. 10H(i)-10O(ii).

The vector-based reconstruction unit 92 represents a unit configured to perform operations reciprocal to those described above with respect to the vector-based synthesis unit 27 so as to reconstruct the HOA coefficients 11'. The vector based reconstruction unit 92 may include a quantization unit 74, a spatio-temporal interpolation unit 76, a foreground formulation unit 78, a psychoacoustic decoding unit 80, a HOA coefficient formulation unit 82 and a reorder unit 84.

The quantization unit 74 may represent a unit configured to operate in a manner reciprocal to the quantization unit 52 shown in the example of FIG. 4 so as to dequantize the coded foreground V[k] vectors 57 and thereby generate reduced foreground V[k] vectors $55_k$. The dequantization unit 74 may, in some examples, perform a form of entropy decoding and scalar dequantization in a manner reciprocal to that described above with respect to the quantization unit 52.

The dequantization unit 74 may forward the reduced foreground V[k] vectors $55_k$ to the reorder unit 84.

The psychoacoustic decoding unit 80 may operate in a manner reciprocal to the psychoacoustic audio coding unit 40 shown in the example of FIG. 4 so as to decode the encoded ambient HOA coefficients 59 and the encoded nFG signals 61 and thereby generate energy compensated ambient HOA coefficients 47' and the interpolated nFG signals 49' (which may also be referred to as interpolated nFG audio objects 49'). The psychoacoustic decoding unit 80 may pass the energy compensated ambient HOA coefficients 47' to HOA coefficient formulation unit 82 and the nFG signals 49' to the reorder 84.

The reorder unit 84 may represent a unit configured to operate in a manner similar reciprocal to that described above with respect to the reorder unit 34. The reorder unit 84 may receive syntax elements indicative of the original order of the foreground components of the HOA coefficients 11. The reorder unit 84 may, based on these reorder syntax elements, reorder the interpolated nFG signals 49' and the reduced foreground V[k] vectors $55_k$ to generate reordered nFG signals 49" and reordered foreground V[k] vectors $55_k'$. The reorder unit 84 may output the reordered nFG signals 49" to the foreground formulation unit 78 and the reordered foreground V[k] vectors $55_k'$ to the spatio-temporal interpolation unit 76.

The spatio-temporal interpolation unit 76 may operate in a manner similar to that described above with respect to the spatio-temporal interpolation unit 50. The spatio-temporal interpolation unit 76 may receive the reordered foreground V[k] vectors $55_k'$ and perform the spatio-temporal interpolation with respect to the reordered foreground V[k] vectors $55_k'$ and reordered foreground V[k−1] vectors $55_{k-1}'$ to generate interpolated foreground V[k] vectors $55_k''$. The spatio-temporal interpolation unit 76 may forward the interpolated foreground V[k] vectors $55_k''$ to the foreground formulation unit 78.

The foreground formulation unit 78 may represent a unit configured to perform matrix multiplication with respect to the interpolated foreground V[k] vectors $55_k''$ and the reordered nFG signals 49" to generate the foreground HOA coefficients 65. The foreground formulation unit 78 may perform a matrix multiplication of the reordered nFG signals 49" by the interpolated foreground V[k] vectors $55_k''$.

The HOA coefficient formulation unit 82 may represent a unit configured to add the foreground HOA coefficients 65 to the ambient HOA channels 47' so as to obtain the HOA coefficients 11', where the prime notation reflects that these HOA coefficients 11' may be similar to but not the same as the HOA coefficients 11. The differences between the HOA coefficients 11 and 11' may result from loss due to transmission over a lossy transmission medium, quantization or other lossy operations.

In this way, the techniques may enable an audio decoding device, such as the audio decoding device 24, to determine, from a bitstream, quantized directional information, an encoded foreground audio object, and encoded ambient higher order ambisonic (HOA) coefficients, wherein the quantized directional information and the encoded foreground audio object represent foreground HOA coefficients describing a foreground component of a soundfield, and wherein the encoded ambient HOA coefficients describe an ambient component of the soundfield, dequantize the quantized directional information to generate directional information, perform spatio-temporal interpolation with respect to the directional information to generate interpolated directional information, audio decode the encoded foreground audio object to generate a foreground audio object and the encoded ambient HOA coefficients to generate ambient HOA coefficients, determine the foreground HOA coefficients as a function of the interpolated directional information and the foreground audio object, and determine HOA coefficients as a function of the foreground HOA coefficients and the ambient HOA coefficients.

In this way, various aspects of the techniques may enable a unified audio decoding device 24 to switch between two different decompression schemes. In some instances, the audio decoding device 24 may be configured to select one of a plurality of decompression schemes based on the indication of whether an compressed version of spherical harmonic coefficients representative of a sound field are generated from a synthetic audio object, and decompress the compressed version of the spherical harmonic coefficients using the selected one of the plurality of decompression schemes. In these and other instances, the audio decoding device 24 comprises an integrated decoder.

In some instances, the audio decoding device 24 may be configured to obtain an indication of whether spherical harmonic coefficients representative of a sound field are generated from a synthetic audio object.

In these and other instances, the audio decoding device 24 is configured to obtain the indication from a bitstream that stores a compressed version of the spherical harmonic coefficients.

In this way, various aspects of the techniques may enable the audio decoding device 24 to obtain vectors describing distinct and background components of the soundfield. In some instances, the audio decoding device 24 may be configured to determine one or more first vectors describing distinct components of the soundfield and one or more second vectors describing background components of the soundfield, both the one or more first vectors and the one or more second vectors generated at least by performing a transformation with respect to the plurality of spherical harmonic coefficients.

In these and other instances, the audio decoding device 24, wherein the transformation comprises a singular value decomposition that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients.

In these and other instances, the audio decoding device 24, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and wherein the U matrix and the S matrix are generated at least by performing the singular value decomposition with respect to the plurality of spherical harmonic coefficients.

In these and other instances, the audio decoding device 24 is further configured to audio decode the one or more audio encoded $U_{DIST}*S_{DIST}$ vectors to generate an audio decoded version of the one or more audio encoded $U_{DIST}*S_{DIST}$ vectors.

In these and other instances, the audio decoding device 24, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, and wherein the U matrix and the S matrix and the V matrix are generated at least by performing the singular value decomposition with respect to the plurality of spherical harmonic coefficients.

In these and other instances, the audio decoding device 24 is further configured to audio decode the one or more audio encoded $U_{DIST}*S_{DIST}$ vectors to generate an audio decoded version of the one or more audio encoded $U_{DIST}*S_{DIST}$ vectors.

In these and other instances, the audio decoding device 24 further configured to multiply the $U_{DIST}*S_{DIST}$ vectors by the $V^T_{DIST}$ vectors to recover those of the plurality of spherical harmonics representative of the distinct components of the soundfield.

In these and other instances, the audio decoding device 24, wherein the one or more second vectors comprise one or more audio encoded $U_{BG}*S_{BG}*V^T_{BG}$ vectors that, prior to audio encoding, were generating by multiplying $U_{BG}$ vectors included within a U matrix by $S_{BG}$ vectors included within an S matrix and then by $V^T_{BG}$ vectors included within a transpose of a V matrix, and wherein the S matrix, the U matrix and the V matrix were each generated at least by performing the singular value decomposition with respect to the plurality of spherical harmonic coefficients.

In these and other instances, the audio decoding device 24, wherein the one or more second vectors comprise one or more audio encoded $U_{BG}*S_{BG}*V^T_{BG}$ vectors that, prior to audio encoding, were generating by multiplying $U_{BG}$ vectors included within a U matrix by $S_{BG}$ vectors included within an S matrix and then by $V^T_{BG}$ vectors included within a transpose of a V matrix, wherein the S matrix, the U matrix and the V matrix were generated at least by performing the singular value decomposition with respect to the plurality of spherical harmonic coefficients, and wherein the audio decoding device 24 is further configured to audio decode the one or more audio encoded $U_{BG}*S_{BG}*V^T_{BG}$ vectors to generate one or more audio decoded $U_{BG}*S_{BG}*T_{BG}$ vectors.

In these and other instances, the audio decoding device 24, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the audio decoding device 24 is further configured to audio decode the one or more audio encoded $U_{DIST}*S_{DIST}$ vectors to generate the one or more $U_{DIST}*S_{DIST}$ vectors, and multiply the $U_{DIST}*S_{DIST}$ vectors by the $V^T_{DIST}$ vectors to recover those of the plurality of spherical harmonic coefficients that describe the distinct components of the soundfield, wherein the one or more second vectors comprise one or more audio encoded $U_{BG}*S_{BG}*V^T_{BG}$ vectors that, prior to audio encoding, were generating by multiplying $U_{BG}$ vectors included within the U matrix by $S_{BG}$ vectors included within the S matrix and then by $V^T_{BG}$ vectors included within the transpose of the V matrix, and wherein the audio decoding device 24 is further configured to audio decode the one or more audio encoded $U_{BG}*S_{BG}*V^T_{BG}$ vectors to recover at least a portion of the plurality of the spherical harmonic coefficients that describe background components of the soundfield, and add the plurality of spherical harmonic coefficients that describe the distinct components of the soundfield to the at least portion of the plurality of the spherical harmonic coefficients that describe background components of the soundfield to generate a reconstructed version of the plurality of spherical harmonic coefficients.

In these and other instances, the audio decoding device 24, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ is vectors of a transpose of a V matrix, wherein the U matrix, the S matrix and the V matrix were generated at least by performing the singular value decomposition with respect to the plurality of spherical harmonic coefficients, and wherein the audio decoding device 20 is further configured to obtain a value D indicating the number of vectors to be extracted from a bitstream to form the one or more $U_{DIST}*S_{DIST}$ vectors and the one or more $V^T_{DIST}$ vectors.

In these and other instances, the audio decoding device 24, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the audio decoding device 24 is further configured to obtain a value D on an audio-frame-by-audio-frame basis that indicates the number of vectors to be extracted from a bitstream to form the one or more $U_{DIST}*S_{DIST}$ vectors and the one or more $V^T_{DIST}$ vectors.

In these and other instances, the audio decoding device 24, wherein the transformation comprises a principal component analysis to identify the distinct components of the soundfield and the background components of the soundfield.

Various aspects of the techniques described in this disclosure may also enable the audio encoding device 24 to perform interpolation with respect to decomposed versions of the HOA coefficients. In some instances, the audio decoding device 24 may be configured to obtain decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients.

In these and other instances, the first decomposition comprises a first V matrix representative of right-singular vectors of the first plurality of spherical harmonic coefficients.

In these and other examples, the second decomposition comprises a second V matrix representative of right-singular vectors of the second plurality of spherical harmonic coefficients.

In these and other instances, the first decomposition comprises a first V matrix representative of right-singular vectors of the first plurality of spherical harmonic coefficients, and the second decomposition comprises a second V matrix representative of right-singular vectors of the second plurality of spherical harmonic coefficients.

In these and other instances, the time segment comprises a sub-frame of an audio frame.

In these and other instances, the time segment comprises a time sample of an audio frame.

In these and other instances, the audio decoding device 24 is configured to obtain an interpolated decomposition of the first decomposition and the second decomposition for a spherical harmonic coefficient of the first plurality of spherical harmonic coefficients.

In these and other instances, the audio decoding device 24 is configured to obtain interpolated decompositions of the first decomposition for a first portion of the first plurality of spherical harmonic coefficients included in the first frame and the second decomposition for a second portion of the second plurality of spherical harmonic coefficients included in the second frame, and the audio decoding device 24 is further configured to apply the interpolated decompositions to a first time component of the first portion of the first plurality of spherical harmonic coefficients included in the first frame to generate a first artificial time component of the first plurality of spherical harmonic coefficients, and apply the respective interpolated decompositions to a second time component of the second portion of the second plurality of spherical harmonic coefficients included in the second frame to generate a second artificial time component of the second plurality of spherical harmonic coefficients included.

In these and other instances, the first time component is generated by performing a vector-based synthesis with respect to the first plurality of spherical harmonic coefficients.

In these and other instances, the second time component is generated by performing a vector-based synthesis with respect to the second plurality of spherical harmonic coefficients.

In these and other instances, the audio decoding device 24 is further configured to receive the first artificial time component and the second artificial time component, compute interpolated decompositions of the first decomposition for the first portion of the first plurality of spherical harmonic coefficients and the second decomposition for the second portion of the second plurality of spherical harmonic coefficients, and apply inverses of the interpolated decompositions to the first artificial time component to recover the first time component and to the second artificial time component to recover the second time component.

In these and other instances, the audio decoding device 24 is configured to interpolate a first spatial component of the first plurality of spherical harmonic coefficients and the second spatial component of the second plurality of spherical harmonic coefficients.

In these and other instances, the first spatial component comprises a first U matrix representative of left-singular vectors of the first plurality of spherical harmonic coefficients.

In these and other instances, the second spatial component comprises a second U matrix representative of left-singular vectors of the second plurality of spherical harmonic coefficients.

In these and other instances, the first spatial component is representative of M time segments of spherical harmonic coefficients for the first plurality of spherical harmonic coefficients and the second spatial component is representative of M time segments of spherical harmonic coefficients for the second plurality of spherical harmonic coefficients.

In these and other instances, the first spatial component is representative of M time segments of spherical harmonic coefficients for the first plurality of spherical harmonic coefficients and the second spatial component is representative of M time segments of spherical harmonic coefficients for the second plurality of spherical harmonic coefficients, and the audio decoding device 24 is configured to interpolate the last N elements of the first spatial component and the first N elements of the second spatial component.

In these and other instances, the second plurality of spherical harmonic coefficients are subsequent to the first plurality of spherical harmonic coefficients in the time domain.

In these and other instances, the audio decoding device 24 is further configured to decompose the first plurality of spherical harmonic coefficients to generate the first decomposition of the first plurality of spherical harmonic coefficients.

In these and other instances, the audio decoding device 24 is further configured to decompose the second plurality of spherical harmonic coefficients to generate the second decomposition of the second plurality of spherical harmonic coefficients.

In these and other instances, the audio decoding device 24 is further configured to perform a singular value decomposition with respect to the first plurality of spherical harmonic coefficients to generate a U matrix representative of left-singular vectors of the first plurality of spherical harmonic coefficients, an S matrix representative of singular values of the first plurality of spherical harmonic coefficients and a V matrix representative of right-singular vectors of the first plurality of spherical harmonic coefficients.

In these and other instances, the audio decoding device 24 is further configured to perform a singular value decomposition with respect to the second plurality of spherical harmonic coefficients to generate a U matrix representative of left-singular vectors of the second plurality of spherical harmonic coefficients, an S matrix representative of singular values of the second plurality of spherical harmonic coefficients and a V matrix representative of right-singular vectors of the second plurality of spherical harmonic coefficients.

In these and other instances, the first and second plurality of spherical harmonic coefficients each represent a planar wave representation of the sound field.

In these and other instances, the first and second plurality of spherical harmonic coefficients each represent one or more mono-audio objects mixed together.

In these and other instances, the first and second plurality of spherical harmonic coefficients each comprise respective first and second spherical harmonic coefficients that represent a three dimensional sound field.

In these and other instances, the first and second plurality of spherical harmonic coefficients are each associated with at least one spherical basis function having an order greater than one.

In these and other instances, the first and second plurality of spherical harmonic coefficients are each associated with at least one spherical basis function having an order equal to four.

In these and other instances, the interpolation is a weighted interpolation of the first decomposition and second decomposition, wherein weights of the weighted interpolation applied to the first decomposition are inversely proportional to a time represented by vectors of the first and second decomposition and wherein weights of the weighted interpolation applied to the second decomposition are proportional to a time represented by vectors of the first and second decomposition.

In these and other instances, the decomposed interpolated spherical harmonic coefficients smooth at least one of spatial components and time components of the first plurality of spherical harmonic coefficients and the second plurality of spherical harmonic coefficients.

In these and other instances, the audio decoding device 24 is configured to compute Us[n]=HOA(n)*(V_vec[n])−1 to obtain a scalar.

In these and other instances, the interpolation comprises a linear interpolation. In these and other instances, the interpolation comprises a non-linear interpolation. In these and other instances, the interpolation comprises a cosine interpolation. In these and other instances, the interpolation comprises a weighted cosine interpolation. In these and other instances, the interpolation comprises a cubic interpolation. In these and other instances, the interpolation comprises an Adaptive Spline Interpolation. In these and other instances, the interpolation comprises a minimal curvature interpolation.

In these and other instances, the audio decoding device 24 is further configured to generate a bitstream that includes a representation of the decomposed interpolated spherical harmonic coefficients for the time segment, and an indication of a type of the interpolation.

In these and other instances, the indication comprises one or more bits that map to the type of interpolation.

In these and other instances, the audio decoding device 24 is further configured to obtain a bitstream that includes a representation of the decomposed interpolated spherical harmonic coefficients for the time segment, and an indication of a type of the interpolation.

In these and other instances, the indication comprises one or more bits that map to the type of interpolation.

Various aspects of the techniques may, in some instances, further enable the audio decoding device 24 to be configured to obtain a bitstream comprising a compressed version of a spatial component of a sound field, the spatial component generated by performing a vector based synthesis with respect to a plurality of spherical harmonic coefficients.

In these and other instances, the compressed version of the spatial component is represented in the bitstream using, at least in part, a field specifying a prediction mode used when compressing the spatial component.

In these and other instances, the compressed version of the spatial component is represented in the bitstream using, at least in part, Huffman table information specifying a Huffman table used when compressing the spatial component.

In these and other instances, the compressed version of the spatial component is represented in the bitstream using, at least in part, a field indicating a value that expresses a quantization step size or a variable thereof used when compressing the spatial component.

In these and other instances, the value comprises an nbits value.

In these and other instances, the bitstream comprises a compressed version of a plurality of spatial components of the sound field of which the compressed version of the spatial component is included, and the value expresses the quantization step size or a variable thereof used when compressing the plurality of spatial components.

In these and other instances, the compressed version of the spatial component is represented in the bitstream using, at least in part, a Huffman code to represent a category identifier that identifies a compression category to which the spatial component corresponds.

In these and other instances, the compressed version of the spatial component is represented in the bitstream using, at least in part, a sign bit identifying whether the spatial component is a positive value or a negative value.

In these and other instances, the compressed version of the spatial component is represented in the bitstream using, at least in part, a Huffman code to represent a residual value of the spatial component.

In these and other instances, the device comprises an audio decoding device.

Various aspects of the techniques may also enable the audio decoding device 24 to identify a Huffman codebook to use when decompressing a compressed version of a spatial component of a plurality of compressed spatial components based on an order of the compressed version of the spatial component relative to remaining ones of the plurality of compressed spatial components, the spatial component generated by performing a vector based synthesis with respect to a plurality of spherical harmonic coefficients.

In these and other instances, the audio decoding device 24 is configured to obtain a bitstream comprising the compressed version of a spatial component of a sound field, and decompress the compressed version of the spatial component using, at least in part, the identified Huffman codebook to obtain the spatial component.

In these and other instances, the compressed version of the spatial component is represented in the bitstream using, at least in part, a field specifying a prediction mode used when compressing the spatial component, and the audio decoding device 24 is configured to decompress the compressed version of the spatial component based, at least in part, on the prediction mode to obtain the spatial component.

In these and other instances, the compressed version of the spatial component is represented in the bitstream using, at least in part, Huffman table information specifying a Huffman table used when compressing the spatial component, and the audio decoding device 24 is configured to decompress the compressed version of the spatial component based, at least in part, on the Huffman table information.

In these and other instances, the compressed version of the spatial component is represented in the bitstream using, at least in part, a field indicating a value that expresses a quantization step size or a variable thereof used when compressing the spatial component, and the audio decoding device 24 is configured to decompress the compressed version of the spatial component based, at least in part, on the value.

In these and other instances, the value comprises an nbits value.

In these and other instances, the bitstream comprises a compressed version of a plurality of spatial components of the sound field of which the compressed version of the spatial component is included, the value expresses the quantization step size or a variable thereof used when compressing the plurality of spatial components and the audio decoding device 24 is configured to decompress the plurality of compressed version of the spatial component based, at least in part, on the value.

In these and other instances, the compressed version of the spatial component is represented in the bitstream using, at least in part, a Huffman code to represent a category identifier that identifies a compression category to which the spatial component corresponds and the audio decoding device 24 is configured to decompress the compressed version of the spatial component based, at least in part, on the Huffman code.

In these and other instances, the compressed version of the spatial component is represented in the bitstream using, at least in part, a sign bit identifying whether the spatial component is a positive value or a negative value, and the audio decoding device 24 is configured to decompress the compressed version of the spatial component based, at least in part, on the sign bit.

In these and other instances, the compressed version of the spatial component is represented in the bitstream using, at least in part, a Huffman code to represent a residual value of the spatial component and the audio decoding device 24 is configured to decompress the compressed version of the spatial component based, at least in part, on the Huffman code included in the identified Huffman codebook.

In each of the various instances described above, it should be understood that the audio decoding device 24 may perform a method or otherwise comprise means to perform each step of the method for which the audio decoding device 24 is configured to perform. In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 24 has been configured to perform.

Figure 6:
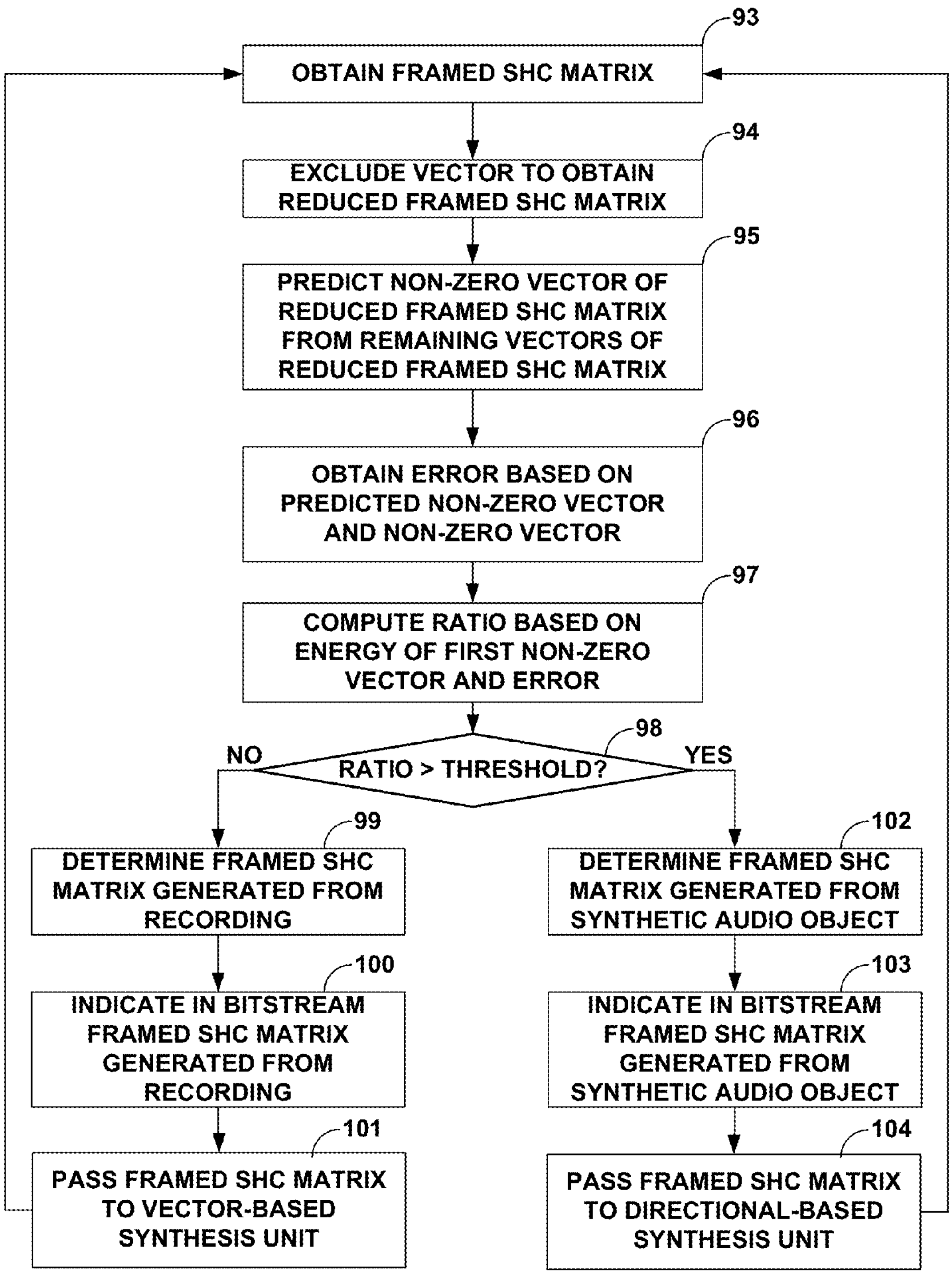
FIG. 6 is a flowchart illustrating exemplary operation of a content analysis unit of an audio encoding device in performing various aspects of the techniques described in this disclosure.

FIG. 6 is a flowchart illustrating exemplary operation of a content analysis unit of an audio encoding device, such as the content analysis unit 26 shown in the example of FIG. 4, in performing various aspects of the techniques described in this disclosure.

The content analysis unit 26 may, when determining whether the HOA coefficients 11 representative of a soundfield are generated from a synthetic audio object, obtain a framed of HOA coefficients (93), which may be of size 25 by 1024 for a fourth order representation (i.e., N=4). After obtaining the framed HOA coefficients (which may also be denoted herein as a framed SHC matrix 11 and subsequent framed SHC matrices may be denoted as framed SHC matrices 27B, 27C, etc.), the content analysis unit 26 may then exclude the first vector of the framed HOA coefficients 11 to generate a reduced framed HOA coefficients (94).

The content analysis unit 26 may then predicted the first non-zero vector of the reduced framed HOA coefficients from remaining vectors of the reduced framed HOA coefficients (95). After predicting the first non-zero vector, the content analysis unit 26 may obtain an error based on the predicted first non-zero vector and the actual non-zero vector (96). Once the error is obtained, the content analysis unit 26 may compute a ratio based on an energy of the actual first non-zero vector and the error (97). The content analysis unit 26 may then compare this ratio to a threshold (98). When the ratio does not exceed the threshold ("NO" 98), the content analysis unit 26 may determine that the framed SHC matrix 11 is generated from a recording and indicate in the bitstream that the corresponding coded representation of the SHC matrix 11 was generated from a recording (100, 101). When the ratio exceeds the threshold ("YES" 98), the content analysis unit 26 may determine that the framed SHC matrix 11 is generated from a synthetic audio object and indicate in the bitstream that the corresponding coded representation of the SHC matrix 11 was generated from a synthetic audio object (102, 103). In some instances, when the framed SHC matrix 11 were generated from a recording, the content analysis unit 26 passes the framed SHC matrix 11 to the vector-based synthesis unit 27 (101). In some instances, when the framed SHC matrix 11 were generated from a synthetic audio object, the content analysis unit 26 passes the framed SHC matrix 11 to the directional-based synthesis unit 28 (104).

Figure 7:
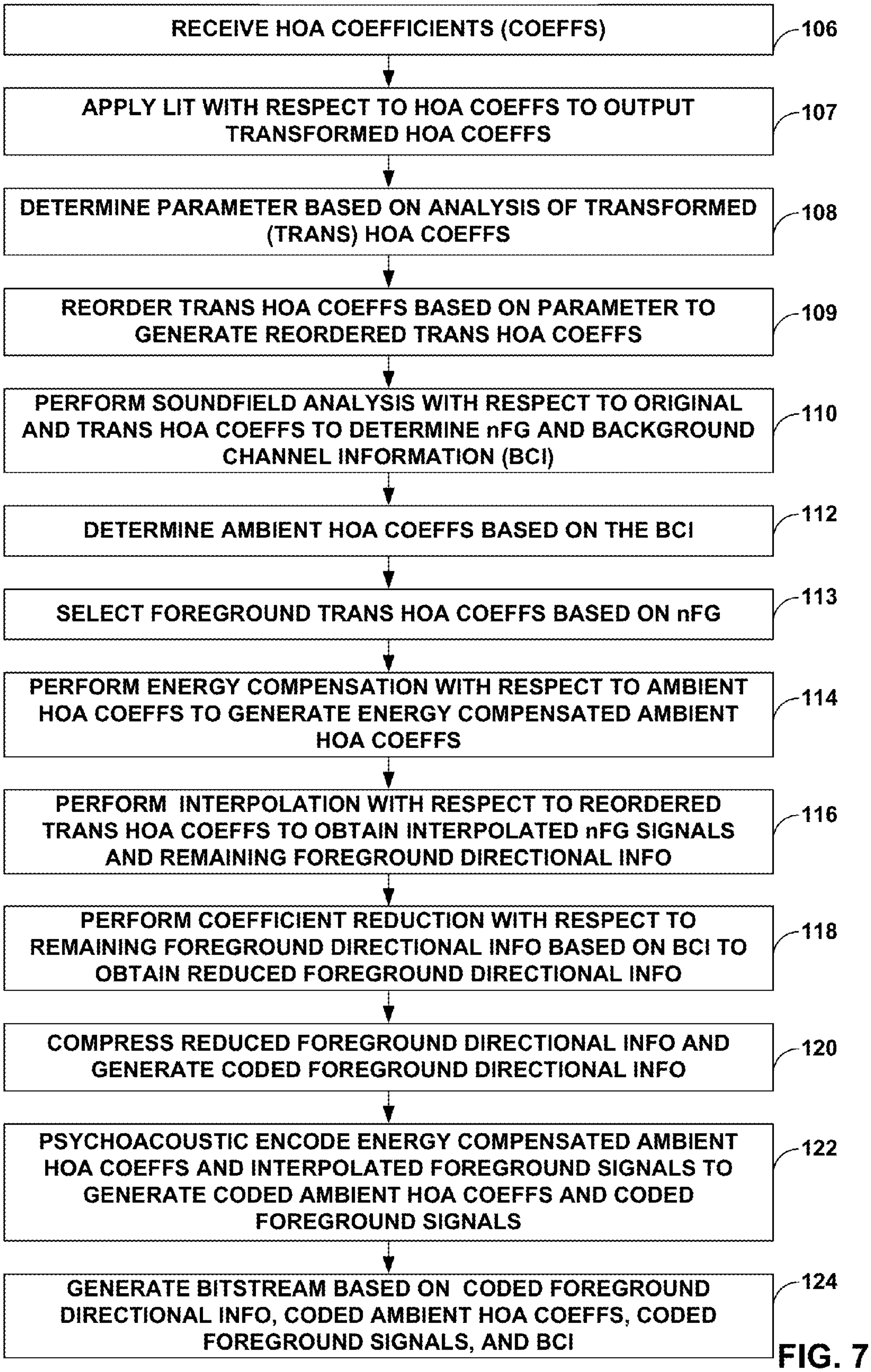
FIG. 7 is a flowchart illustrating exemplary operation of an audio encoding device in performing various aspects of the vector-based synthesis techniques described in this disclosure.

FIG. 7 is a flowchart illustrating exemplary operation of an audio encoding device, such as the audio encoding device 20 shown in the example of FIG. 4, in performing various aspects of the vector-based synthesis techniques described in this disclosure. Initially, the audio encoding device 20 receives the HOA coefficients 11 (106). The audio encoding device 20 may invoke the LIT unit 30, which may apply a LIT with respect to the HOA coefficients to output transformed HOA coefficients (e.g., in the case of SVD, the transformed HOA coefficients may comprise the US[k] vectors 33 and the V[k] vectors 35) (107).

The audio encoding device 20 may next invoke the parameter calculation unit 32 to perform the above described analysis with respect to any combination of the US[k] vectors 33, US[k−1] vectors 33, the V[k] and/or V[k−1] vectors 35 to identify various parameters in the manner described above. That is, the parameter calculation unit 32 may determine at least one parameter based on an analysis of the transformed HOA coefficients 33/35 (108).

The audio encoding device 20 may then invoke the reorder unit 34, which may reorder the transformed HOA coefficients (which, again in the context of SVD, may refer to the US[k] vectors 33 and the V[k] vectors 35) based on the parameter to generate reordered transformed HOA coefficients 33'/35' (or, in other words, the US[k] vectors 33' and the V[k] vectors 35'), as described above (109). The audio encoding device 20 may, during any of the foregoing operations or subsequent operations, also invoke the soundfield analysis unit 44. The soundfield analysis unit 44 may, as described above, perform a soundfield analysis with respect to the HOA coefficients 11 and/or the transformed HOA coefficients 33/35 to determine the total number of foreground channels (nFG) 45, the order of the background soundfield (Nc) and the number (nBGa) and indices (i) of additional BG HOA channels to send (which may collectively be denoted as background channel information 43 in the example of FIG. 4) (110).

The audio encoding device 20 may also invoke the background selection unit 48. The background selection unit 48 may determine background or ambient HOA coefficients 47 based on the background channel information 43 (112). The audio encoding device 20 may further invoke the foreground selection unit 36, which may select those of the reordered US[k] vectors 33' and the reordered V[k] vectors 35' that represent foreground or distinct components of the soundfield based on nFG 45 (which may represent a one or more indices identifying these foreground vectors) (113).

The audio encoding device 20 may invoke the energy compensation unit 38. The energy compensation unit 38 may perform energy compensation with respect to the ambient HOA coefficients 47 to compensate for energy loss due to removal of various ones of the HOA channels by the background selection unit 48 (114) and thereby generate energy compensated ambient HOA coefficients 47'.

The audio encoding device 20 also then invoke the spatio-temporal interpolation unit 50. The spatio-temporal interpolation unit 50 may perform spatio-temporal interpolation with respect to the reordered transformed HOA coefficients 33'/35' to obtain the interpolated foreground signals 49' (which may also be referred to as the "interpolated nFG signals 49'") and the remaining foreground directional information 53 (which may also be referred to as the "V[k] vectors 53") (116). The audio encoding device 20 may then invoke the coefficient reduction unit 46. The coefficient reduction unit 46 may perform coefficient reduction with respect to the remaining foreground V[k] vectors 53 based on the background channel information 43 to obtain reduced foreground directional information 55 (which may also be referred to as the reduced foreground V[k] vectors 55) (118).

The audio encoding device 20 may then invoke the quantization unit 52 to compress, in the manner described above, the reduced foreground V[k] vectors 55 and generate coded foreground V[k] vectors 57 (120).

The audio encoding device 20 may also invoke the psychoacoustic audio coder unit 40. The psychoacoustic audio coder unit 40 may psychoacoustic code each vector of the energy compensated ambient HOA coefficients 47' and the interpolated nFG signals 49' to generate encoded ambient HOA coefficients 59 and encoded nFG signals 61. The audio encoding device may then invoke the bitstream generation unit 42. The bitstream generation unit 42 may generate the bitstream 21 based on the coded foreground directional information 57, the coded ambient HOA coefficients 59, the coded nFG signals 61 and the background channel information 43.

Figure 8:
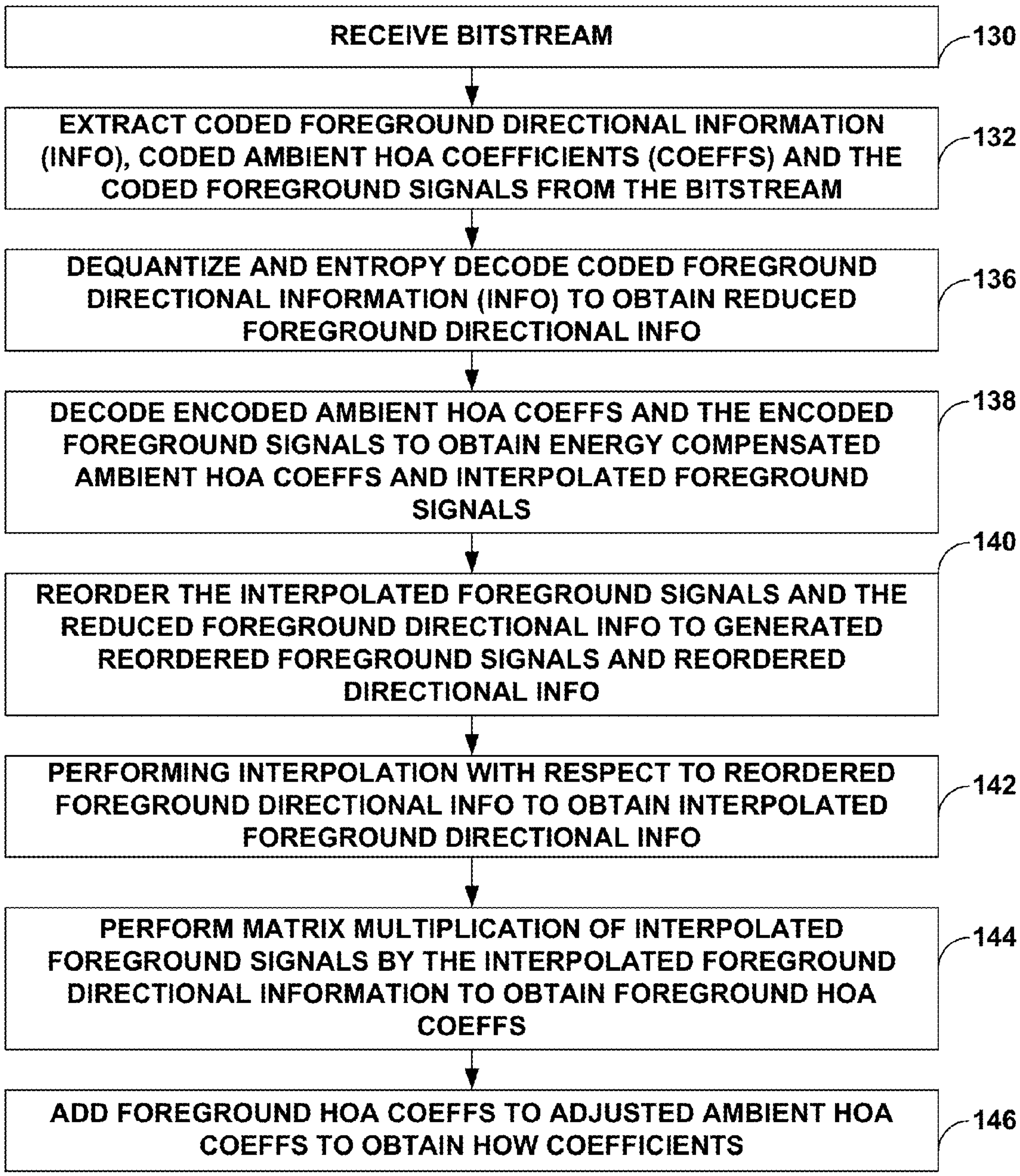
FIG. 8 is a flow chart illustrating exemplary operation of an audio decoding device in performing various aspects of the techniques described in this disclosure.

FIG. 8 is a flow chart illustrating exemplary operation of an audio decoding device, such as the audio decoding device 24 shown in FIG. 5, in performing various aspects of the techniques described in this disclosure. Initially, the audio decoding device 24 may receive the bitstream 21 (130). Upon receiving the bitstream, the audio decoding device 24 may invoke the extraction unit 72. Assuming for purposes of discussion that the bitstream 21 indicates that vector-based reconstruction is to be performed, the extraction device 72 may parse this bitstream to retrieve the above noted information, passing this information to the vector-based reconstruction unit 92.

In other words, the extraction unit 72 may extract the coded foreground directional information 57 (which, again, may also be referred to as the coded foreground V[k] vectors 57), the coded ambient HOA coefficients 59 and the coded foreground signals (which may also be referred to as the coded foreground nFG signals 59 or the coded foreground audio objects 59) from the bitstream 21 in the manner described above (132).

The audio decoding device 24 may further invoke the quantization unit 74. The quantization unit 74 may entropy decode and dequantize the coded foreground directional information 57 to obtain reduced foreground directional information $55_k$ (136). The audio decoding device 24 may also invoke the psychoacoustic decoding unit 80. The psychoacoustic audio coding unit 80 may decode the encoded ambient HOA coefficients 59 and the encoded foreground signals 61 to obtain energy compensated ambient HOA coefficients 47' and the interpolated foreground signals 49' (138). The psychoacoustic decoding unit 80 may pass the energy compensated ambient HOA coefficients 47' to HOA coefficient formulation unit 82 and the nFG signals 49' to the reorder unit 84.

The reorder unit 84 may receive syntax elements indicative of the original order of the foreground components of the HOA coefficients 11. The reorder unit 84 may, based on these reorder syntax elements, reorder the interpolated nFG signals 49' and the reduced foreground V[k] vectors $55_k$ to generate reordered nFG signals 49" and reordered foreground V[k] vectors $55_k'$ (140). The reorder unit 84 may output the reordered nFG signals 49" to the foreground formulation unit 78 and the reordered foreground V[k] vectors $55_k'$ to the spatio-temporal interpolation unit 76.

The audio decoding device 24 may next invoke the spatio-temporal interpolation unit 76. The spatio-temporal interpolation unit 76 may receive the reordered foreground directional information $55_k'$ and perform the spatio-temporal interpolation with respect to the reduced foreground directional information $55_k/55_{k-1}$ to generate the interpolated foreground directional information $55_k''$ (142). The spatio-temporal interpolation unit 76 may forward the interpolated foreground V[k] vectors $55_k''$ to the foreground formulation unit 718.

The audio decoding device 24 may invoke the foreground formulation unit 78. The foreground formulation unit 78 may perform matrix multiplication the interpolated foreground signals 49" by the interpolated foreground directional information $55_k''$ to obtain the foreground HOA coefficients 65 (144). The audio decoding device 24 may also invoke the HOA coefficient formulation unit 82. The HOA coefficient formulation unit 82 may add the foreground HOA coefficients 65 to ambient HOA channels 47' so as to obtain the HOA coefficients 11' (146).

Figure 9A:
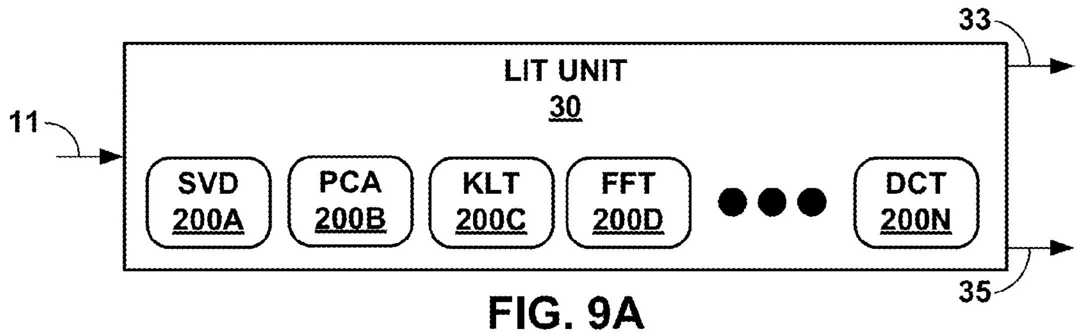
FIGS. 9A-9L are block diagrams illustrating various aspects of the audio encoding device of the example of FIG. 4 in more detail.

FIGS. 9A-9L are block diagrams illustrating various aspects of the audio encoding device 20 of the example of FIG. 4 in more detail. FIG. 9A is a block diagram illustrating the LIT unit 30 of the audio encoding device 20 in more detail. As shown in the example of FIG. 9A, the LIT unit 30 may include multiple different linear invertible transforms 200-200N. The LIT unit 30 may include, to provide a few examples, a singular value decomposition (SVD) transform 200A ("SVD 200A"), a principle component analysis (PCA) transform 200B ("PCA 200B"), a Karhunen-Loeve transform (KLT) 200C ("KLT 200C"), a fast Fourier transform (FFT) 200D ("FFT 200D") and a discrete cosine transform (DCT) 200N ("DCT 200N"). The LIT unit 30 may invoke any one of these linear invertible transforms 200 to apply the respective transform with respect to the HOA coefficients 11 and generate respective transformed HOA coefficients 33/35.

Although described as being performed directly with respect to the HOA coefficients 11, the LIT unit 30 may apply the linear invertible transforms 200 to derivatives of the HOA coefficients 11. For example, the LIT unit 30 may apply the SVD 200 with respect to a power spectral density matrix derived from the HOA coefficients 11. The power spectral density matrix may be denoted as PSD and obtained through matrix multiplication of the transpose of the hoaFrame to the hoaFrame, as outlined in the pseudo-code that follows below. The hoaFrame notation refers to a frame of the HOA coefficients 11.

The LIT unit 30 may, after applying the SVD 200 (svd) to the PSD, may obtain an $S[k]^2$ matrix (S_squared) and a V[k] matrix. The $S[k]^2$ matrix may denote a squared S[k] matrix, whereupon the LIT unit 30 (or, alternatively, the SVD unit 200 as one example) may apply a square root operation to the $S[k]^2$ matrix to obtain the S[k] matrix. The SVD unit 200 may, in some instances, perform quantization with respect to the V[k] matrix to obtain a quantized V[k] matrix (which may be denoted as V[k]' matrix). The LIT unit 30 may obtain the U[k] matrix by first multiplying the S[k] matrix by the quantized V[k]' matrix to obtain an SV[k]' matrix. The LIT unit 30 may next obtain the pseudo-inverse (pinv) of the SV[k]' matrix and then multiply the HOA coefficients 11 by the pseudo-inverse of the SV[k]' matrix to obtain the U[k] matrix. The foregoing may be represented by the following pseud-code:

```
PSD = hoaFrame'*hoaFrame;
[V, S_squared] = svd(PSD,'econ');
```

-continued

```
S = sqrt(S_squared);
U = hoaFrame * pinv(S*V');
```

By performing SVD with respect to the power spectral density (PSD) of the HOA coefficients rather than the coefficients themselves, the LIT unit 30 may potentially reduce the computational complexity of performing the SVD in terms of one or more of processor cycles and storage space, while achieving the same source audio encoding efficiency as if the SVD were applied directly to the HOA coefficients. That is, the above described PSD-type SVD may be potentially less computational demanding because the SVD is done on an F*F matrix (with F the number of HOA coefficients). Compared to a M*F matrix with M is the framelength, i.e., 1024 or more samples. The complexity of an SVD may now, through application to the PSD rather than the HOA coefficients 11, be around O(L^3) compared to O(M*L^2) when applied to the HOA coefficients 11 (where O(*) denotes the big-O notation of computation complexity common to the computer-science arts).

Figure 9B:
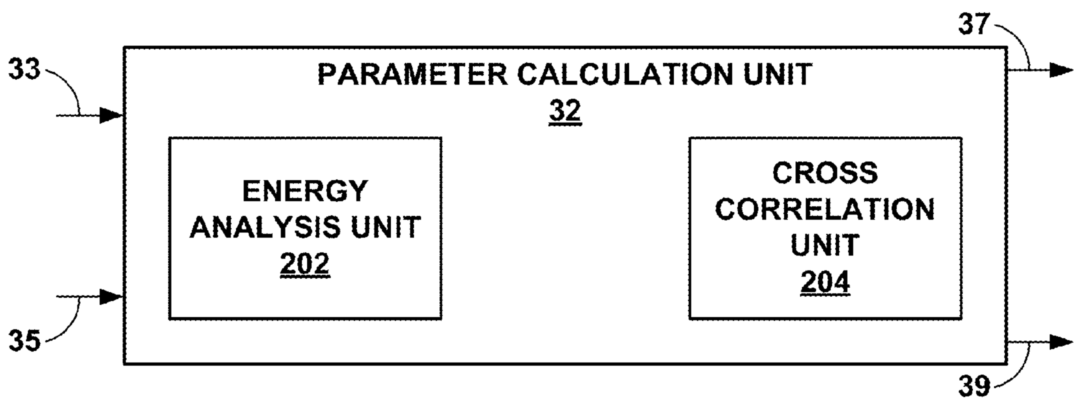

FIG. 9B is a block diagram illustrating the parameter calculation unit 32 of the audio encoding device 20 in more detail. The parameter calculation unit 32 may include an energy analysis unit 202 and a cross-correlation unit 204. The energy analysis unit 202 may perform the above described energy analysis with respect to one or more of the US[k] vectors 33 and the V[k] vectors 35 to generate one or more of the correlation parameter (R), the directional properties parameters (θ, φ, r), and the energy property (e) for one or more of the current frame (k) or the previous frame (k−1). Likewise, the cross-correlation unit 204 may perform the above described cross-correlation with respect to one or more of the US[k] vectors 33 and the V[k] vectors 35 to generate one or more of the correlation parameter (R), the directional properties parameters (θ, φ, r), and the energy property (e) for one or more of the current frame (k) or the previous frame (k−1). The parameter calculation unit 32 may output the current frame parameters 37 and the previous frame parameters 39.

Figure 9C:
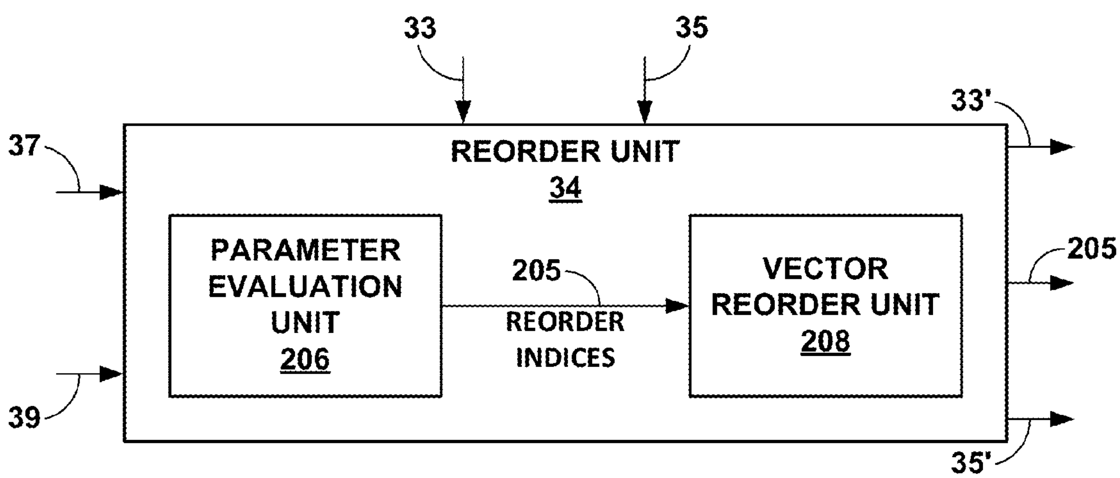

FIG. 9C is a block diagram illustrating the reorder unit 34 of the audio encoding device 20 in more detail. The reorder unit 34 includes a parameter evaluation unit 206 and a vector reorder unit 208. The parameter evaluation unit 206 represents a unit configured to evaluate the previous frame parameters 39 and the current frame parameters 37 in the manner described above to generate reorder indices 205. The reorder indices 205 include indices identifying how the vectors of US[k] vectors 33 and the vectors of the V[k] vectors 35 are to be reordered (e.g., by index pairs with the first index of the pair identifying the index of the current vector location and the second index of the pair identifying the reordered location of the vector). The vector reorder unit 208 represents a unit configured to reorder the US[k] vectors 33 and the V[k] vectors 35 in accordance with the reorder indices 205. The reorder unit 34 may output the reordered US[k] vectors 33' and the reordered V[k] vectors 35', while also passing the reorder indices 205 as one or more syntax elements to the bitstream generation unit 42.

Figure 9D:
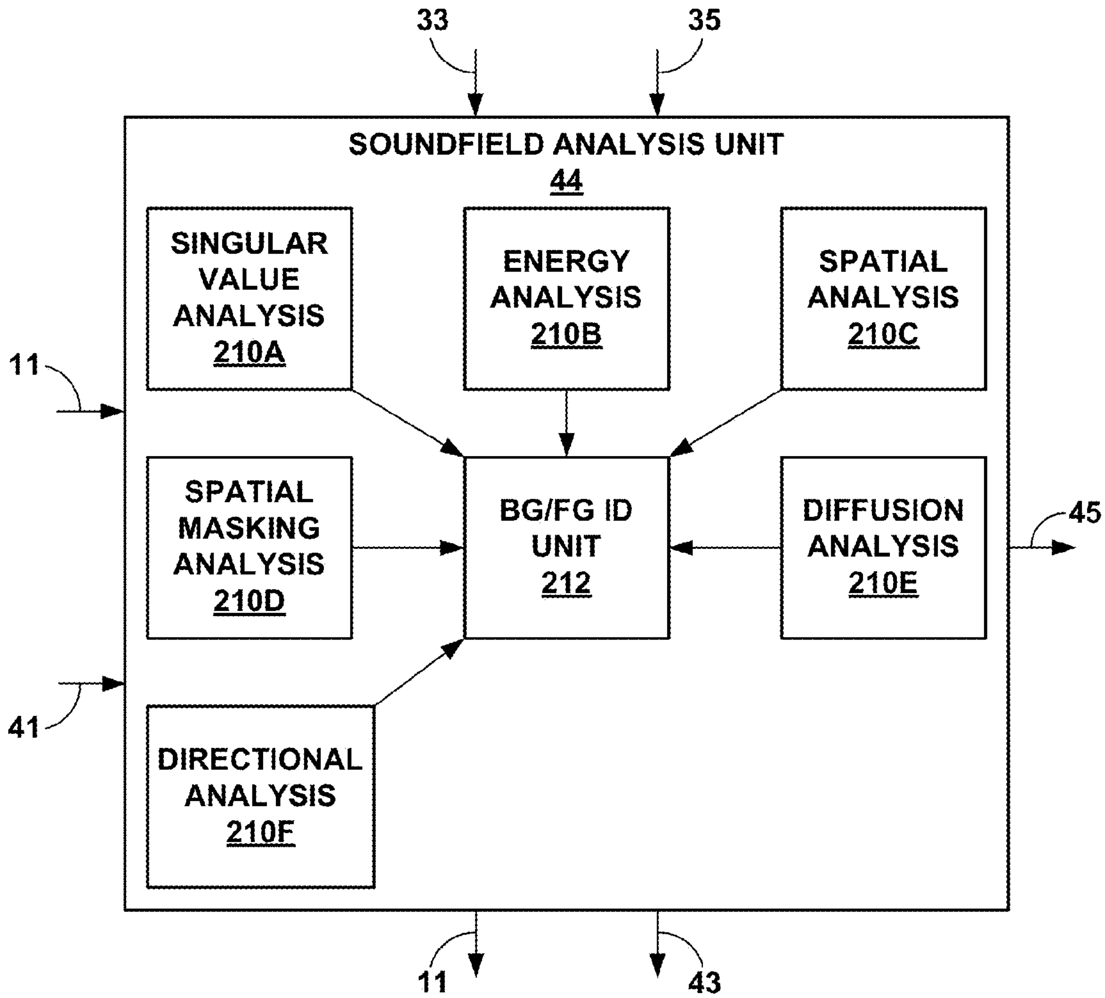

FIG. 9D is a block diagram illustrating the soundfield analysis unit 44 of the audio encoding device 20 in more detail. As shown in the example of FIG. 9D, the soundfield analysis unit 44 may include a singular value analysis unit 210A, an energy analysis unit 210B, a spatial analysis unit 210C, a spatial masking analysis unit 210D, a diffusion analysis unit 210E and a directional analysis unit 210F. The singular value analysis unit 210A may represent a unit configured to analyze the slope of the curve created by the descending diagonal values of S vectors (forming part of the US[k] vectors 33), where the large singular values represent foreground or distinct sounds and the low singular values represent background components of the soundfield, as described above. The energy analysis unit 210B may represent a unit configured to determine the energy of the V[k] vectors 35 on a per vector basis.

The spatial analysis unit 210C may represent a unit configured to perform the spatial energy analysis described above through transformation of the HOA coefficients 11 into the spatial domain and identifying areas of high energy representative of directional components of the soundfield that should be preserved. The spatial masking analysis unit 210D may represent a unit configured to perform the spatial masking analysis in a manner similar to that of the spatial energy analysis, except that the spatial masking analysis unit 210D may identify spatial areas that are masked by spatially proximate higher energy sounds. The diffusion analysis unit 210E may represent a unit configured to perform the above described diffusion analysis with respect to the HOA coefficients 11 to identify areas of diffuse energy that may represent background components of the soundfield. The directional analysis unit 210F may represent a unit configured to perform the directional analysis noted above that involves computing the VS[k] vectors, and squaring and summing each entry of each of these VS[k] vectors to identify a directionality quotient. The directional analysis unit 210F may provide this directionality quotient for each of the VS[k] vectors to the background/foreground (BG/FG) identification (ID) unit 212.

The soundfield analysis unit 44 may also include the BG/FG ID unit 212, which may represent a unit configured to determine the total number of foreground channels (nFG) 45, the order of the background soundfield ($N_{BG}$) and the number (nBGa) and indices (i) of additional BG HOA channels to send (which may collectively be denoted as background channel information 43 in the example of FIG. 4) based on any combination of the analysis output by any combination of analysis units 210-210F. The BG/FG ID unit 212 may determine the nFG 45 and the background channel information 43 so as to achieve the target bitrate 41.

Figure 9E:
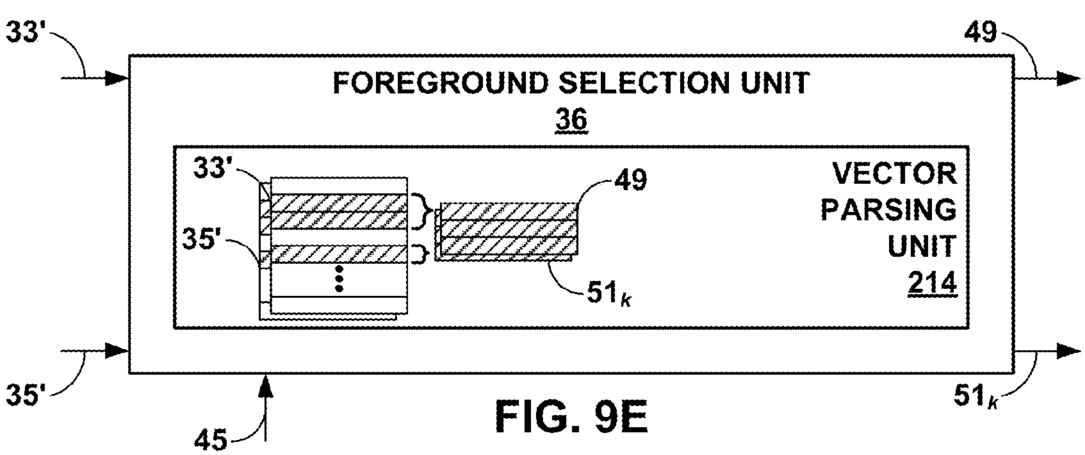

FIG. 9E is a block diagram illustrating the foreground selection unit 36 of the audio encoding device 20 in more detail. The foreground selection unit 36 includes a vector parsing unit 214 that may parse or otherwise extract the foreground US[k] vectors 49 and the foreground V[k] vectors 51$_k$ identified by the nFG syntax element 45 from the reordered US[k] vectors 33' and the reordered V[k] vectors 35'. The vector parsing unit 214 may parse the various vectors representative of the foreground components of the soundfield identified by the soundfield analysis unit 44 and specified by the nFG syntax element 45 (which may also be referred to as foreground channel information 45). As shown in the example of FIG. 9E, the vector parsing unit 214 may select, in some instances, non-consecutive vectors within the foreground US[k] vectors 49 and the foreground V[k] vectors 51$_k$ to represent the foreground components of the soundfield. Moreover, the vector parsing unit 214 may select, in some instances, the same vectors (position-wise) of the foreground US[k] vectors 49 and the foreground V[k] vectors 51$_k$ to represent the foreground components of the soundfield.

Figure 9F:
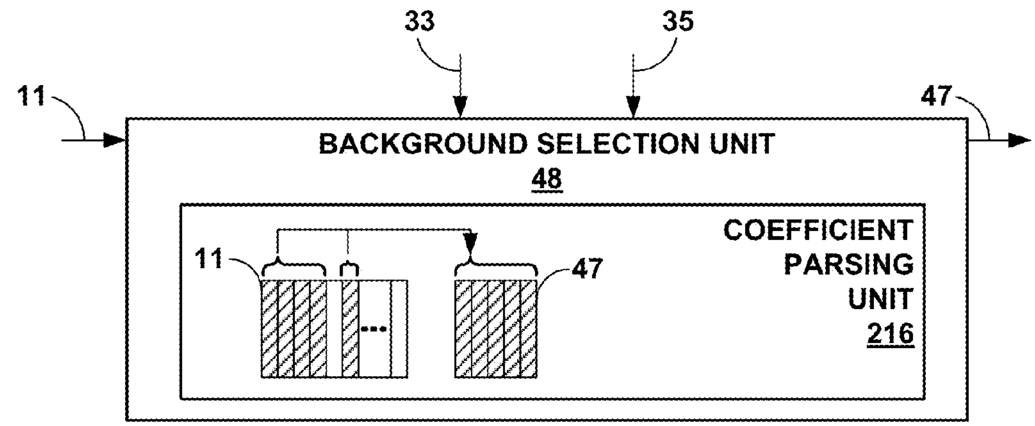

FIG. 9F is a block diagram illustrating the background selection unit 48 of the audio encoding device 20 in more detail. The background selection unit 48 may determine background or ambient HOA coefficients 47 based on the background channel information (e.g., the background soundfield ($N_{BG}$) and the number (nBGa) and the indices (i) of additional BG HOA channels to send). For example, when $N_{BG}$ equals one, the background selection unit 48 may select the HOA coefficients 11 for each sample of the audio frame having an order equal to or less than one. The background selection unit 48 may, in this example, then select the HOA coefficients 11 having an index identified by one of the indices (i) as additional BG HOA coefficients, where the nBGa is provided to the bitstream generation unit 42 to be specified in the bitstream 21 so as to enable the audio decoding device, such as the audio decoding device 24 shown in the example of FIG. 5, to parse the BG HOA coefficients 47 from the bitstream 21. The background selection unit 48 may then output the ambient HOA coefficients 47 to the energy compensation unit 38. The ambient HOA coefficients 47 may have dimensions D: $M\times[(N_{BG}+1)^2+nBGa]$.

Figure 9G:
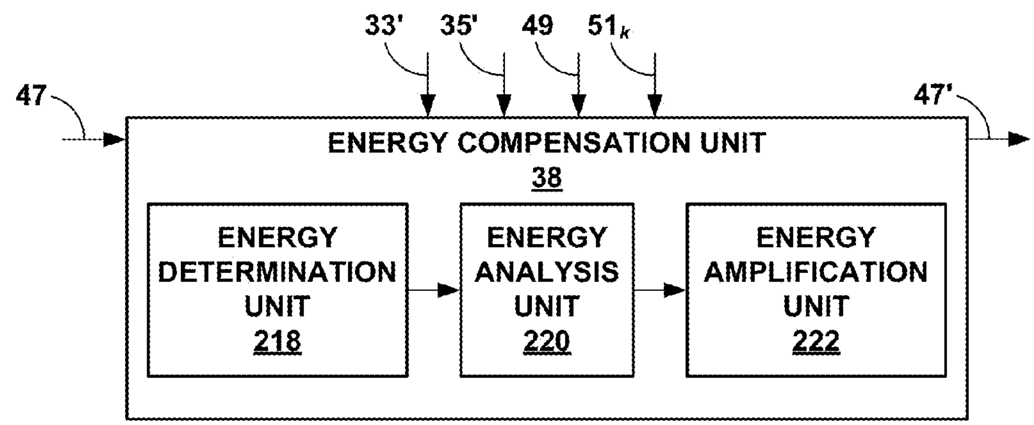

FIG. 9G is a block diagram illustrating the energy compensation unit 38 of the audio encoding device 20 in more detail. The energy compensation unit 38 may represent a unit configured to perform energy compensation with respect to the ambient HOA coefficients 47 to compensate for energy loss due to removal of various ones of the HOA channels by the background selection unit 48. The energy compensation unit 38 may include an energy determination unit 218, an energy analysis unit 220 and an energy amplification unit 222.

The energy determination unit 218 may represent a unit configured to identify the RMS for each row and/or column of on one or more of the reordered US[k] matrix 33' and the reordered V[k] matrix 35'. The energy determination unit 38 may also identify the RMS for each row and/or column of one or more of the selected foreground channels, which may include the nFG signals 49 and the foreground V[k] vectors $\mathbf{51}_k$, and the order-reduced ambient HOA coefficients 47. The RMS for each row and/or column of the one or more of the reordered US[k] matrix 33' and the reordered V[k] matrix 35' may be stored to a vector denoted $RMS_{FULL}$, while the RMS for each row and/or column of one or more of the nFG signals 49, the foreground V[k] vectors $\mathbf{51}_k$, and the order-reduced ambient HOA coefficients 47 may be stored to a vector denoted $RMS_{REDUCED}$.

In some examples, to determine each RMS of respective rows and/or columns of one or more of the reordered US[k] matrix 33', the reordered V[k] matrix 35', the nFG signals 49, the foreground V[k] vectors $\mathbf{51}_k$, and the order-reduced ambient HOA coefficients 47, the energy determination unit 218 may first apply a reference spherical harmonics coefficients (SHC) renderer to the columns. Application of the reference SHC renderer by the energy determination unit 218 allows for determination of RMS in the SHC domain to determine the energy of the overall soundfield described by each row and/or column of the frame represented by rows and/or columns of one or more of the reordered US[k] matrix 33', the reordered V[k] matrix 35', the nFG signals 49, the foreground V[k] vectors $\mathbf{51}_k$, and the order-reduced ambient HOA coefficients 47. The energy determination unit 38 may pass this $RMS_{FULL}$ and $RMS_{REDUCED}$ vectors to the energy analysis unit 220.

The energy analysis unit 220 may represent a unit configured to compute an amplification value vector Z, in accordance with the following equation: $Z=RMS_{FULL}/RMS_{REDUCED}$. The energy analysis unit 220 may then pass this amplification value vector Z to the energy amplification unit 222. The energy amplification unit 222 may represent a unit configured to apply this amplification value vector Z or various portions thereof to one or more of the nFG signals 49, the foreground V[k] vectors $\mathbf{51}_k$, and the order-reduced ambient HOA coefficients 47. In some instances, the amplification value vector Z is applied to only the order-reduced ambient HOA coefficients 47 per the following equation $HOA_{BG-RED}'=HOA_{BG-RED}Z^T$, where $HOA_{BG-RED}$ denotes the order-reduced ambient HOA coefficients 47, $HOA_{BG-RED}'$ denotes the energy compensated, reduced ambient HOA coefficients 47' and $Z^T$ denotes the transpose of the Z vector.

Figure 9H:
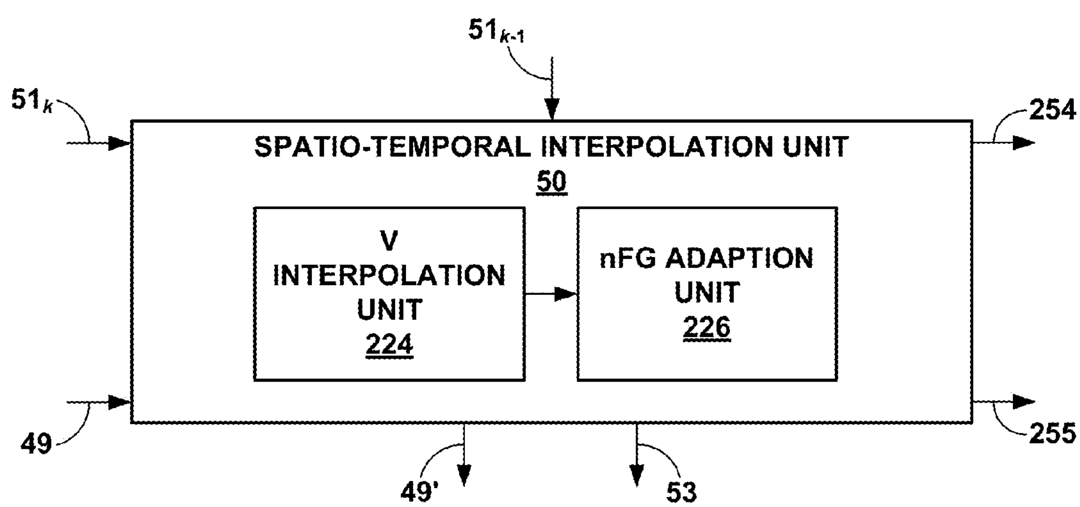

FIG. 9H is a block diagram illustrating, in more detail, the spatio-temporal interpolation unit 50 of the audio encoding device 20 shown in the example of FIG. 4. The spatio-temporal interpolation unit 50 may represent a unit configured to receive the foreground V[k] vectors $\mathbf{51}_k$ for the k'th frame and the foreground V[k−1] vectors $\mathbf{51}_{k-1}$ for the previous frame (hence the k−1 notation) and perform spatio-temporal interpolation to generate interpolated foreground V[k] vectors. The spatio-temporal interpolation unit 50 may include a V interpolation unit 224 and a foreground adaptation unit 226.

The V interpolation unit 224 may select a portion of the current foreground V[k] vectors 51 to interpolate based on the remaining portions of the current foreground V[k] vectors $\mathbf{51}_k$ and the previous foreground V[k−1] vectors $\mathbf{51}_{k-1}$. The V interpolation unit 224 may select the portion to be one or more of the above noted sub-frames or only a single undefined portion that may vary on a frame-by-frame basis. The V interpolation unit 224 may, in some instances, select a single 128 sample portion of the 1024 samples of the current foreground V[k] vectors $\mathbf{51}_k$ to interpolate. The V interpolation unit 224 may then convert each of the vectors in the current foreground V[k] vectors $\mathbf{51}_k$ and the previous foreground V[k−1] vectors $\mathbf{51}_{k-1}$ to separate spatial maps by projecting the vectors onto a sphere (using a projection matrix such as a T-design matrix). The V interpolation unit 224 may then interpret the vectors in V as shapes on a sphere. To interpolate the V matrices for the 256 sample portion, the V interpolation unit 224 may then interpolate these spatial shapes—and then transform them back to the spherical harmonic domain vectors via the inverse of the projection matrix. The techniques of this disclosure may, in this manner, provide a smooth transition between V matrices. The V interpolation unit 224 may then generate the remaining V[k] vectors 53, which represent the foreground V[k] vectors $\mathbf{51}_k$ after being modified to remove the interpolated portion of the foreground V[k] vectors $\mathbf{51}_k$. The V interpolation unit 224 may then pass the interpolated foreground V[k] vectors 51' to the nFG adaptation unit 226.

When selecting a single portion to interpolation, the V interpolation unit 224 may generate a syntax element denoted CodedSpatialInterpolationTime 254, which identifies the duration or, in other words, time of the interpolation (e.g., in terms of a number of samples). When selecting a single portion of perform the sub-frame interpolation, the V interpolation unit 224 may also generate another syntax element denoted SpatialInterpolationMethod 255, which may identify a type of interpolation performed (or, in some instances, whether interpolation was or was not performed). The spatio-temporal interpolation unit 50 may output these syntax elements 254 and 255 to the bitstream generation unit 42.

The nFG adaptation unit 226 may represent a unit configured to generated the adapted nFG signals 49'. The nFG adaptation unit 226 may generate the adapted nFG signals 49' by first obtaining the foreground HOA coefficients through multiplication of the nFG signals 49 by the foreground V[k] vectors $\mathbf{51}_k$. After obtaining the foreground HOA coefficients, the nFG adaptation unit 226 may divide the foreground HOA coefficients by the interpolated foreground V[k] vectors 53 to obtain the adapted nFG signals 49' (which may be referred to as the interpolated nFG signals 49' given that these signals are derived from the interpolated foreground V[k] vectors $\mathbf{51}_k$').

Figure 9I:
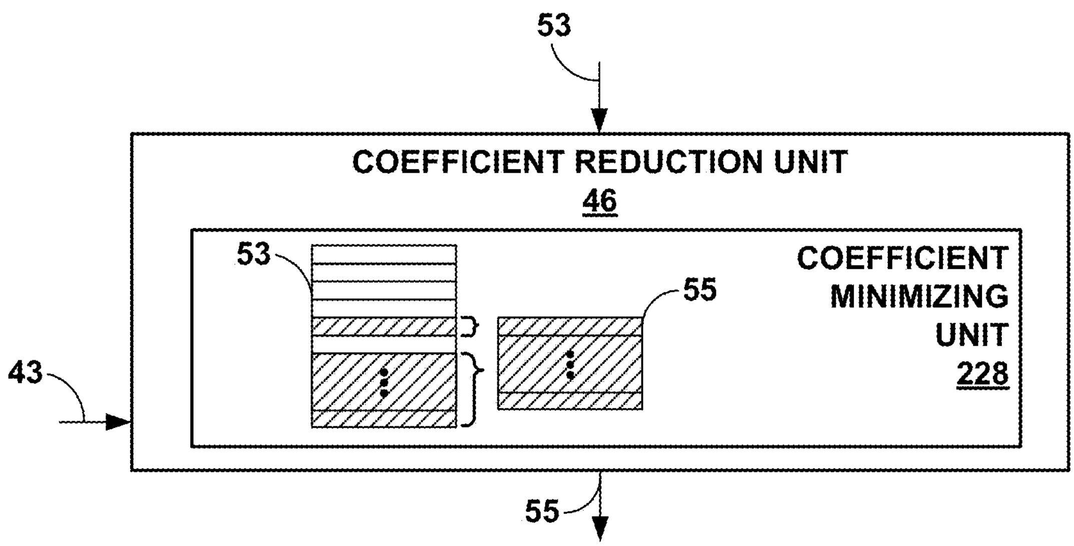

FIG. 9I is a block diagram illustrating, in more detail, the coefficient reduction unit 46 of the audio encoding device 20 shown in the example of FIG. 4. The coefficient reduction unit 46 may represent a unit configured to perform coefficient reduction with respect to the remaining foreground V[k] vectors 53 based on the background channel information 43 to output reduced foreground V[k] vectors 55 to the quantization unit 52. The reduced foreground V[k] vectors 55 may have dimensions D: $[(N+1)^2-(N_{BG}+1)^2-nBGa]\times nFG$.

The coefficient reduction unit 46 may include a coefficient minimizing unit 228, which may represent a unit configured to reduce or otherwise minimize the size of each of the remaining foreground V[k] vectors 53 by removing any coefficients that are accounted for in the background HOA coefficients 47 (as identified by the background channel information 43). The coefficient minimizing unit 228 may remove those coefficients identified by the background channel information 43 to obtain the reduced foreground V[k] vectors 55.

Figure 9J:
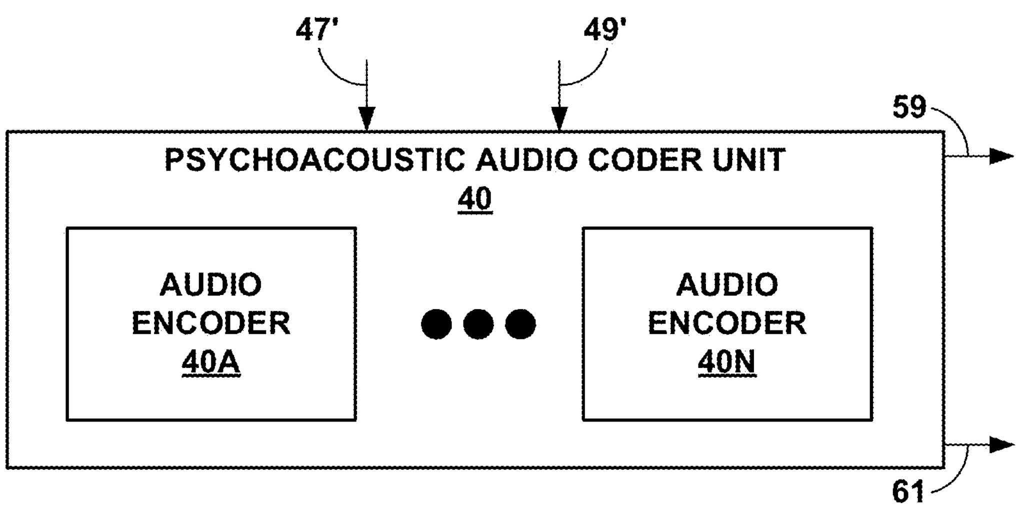

FIG. 9J is a block diagram illustrating, in more detail, the psychoacoustic audio coder unit 40 of the audio encoding device 20 shown in the example of FIG. 4. The psychoacoustic audio coder unit 40 may represent a unit configured to perform psychoacoustic encoding with respect to the energy compensated background HOA coefficients 47' and the interpolated nFG signals 49'. As shown in the example of FIG. 9H, the psychoacoustic audio coder unit 40 may invoke multiple instances of a psychoacoustic audio encoders 40A-40N to audio encode each of the channels of the energy compensated background HOA coefficients 47' (where a channel in this context refers to coefficients for all of the samples in the frame corresponding to a particular order/sub-order spherical basis function) and each signal of the interpolated nFG signals 49'. In some examples, the psychoacoustic audio coder unit 40 instantiates or otherwise includes (when implemented in hardware) audio encoders 40A-40N of sufficient number to separately encode each channel of the energy compensated background HOA coefficients 47' (or nBGa plus the total number of indices (i)) and each signal of the interpolated nFG signals 49' (or nFG) for a total of nBGa plus the total number of indices (i) of additional ambient HOA channels plus nFG. The audio encoders 40A-40N may output the encoded background HOA coefficients 59 and the encoded nFG signals 61.

Figure 9K:
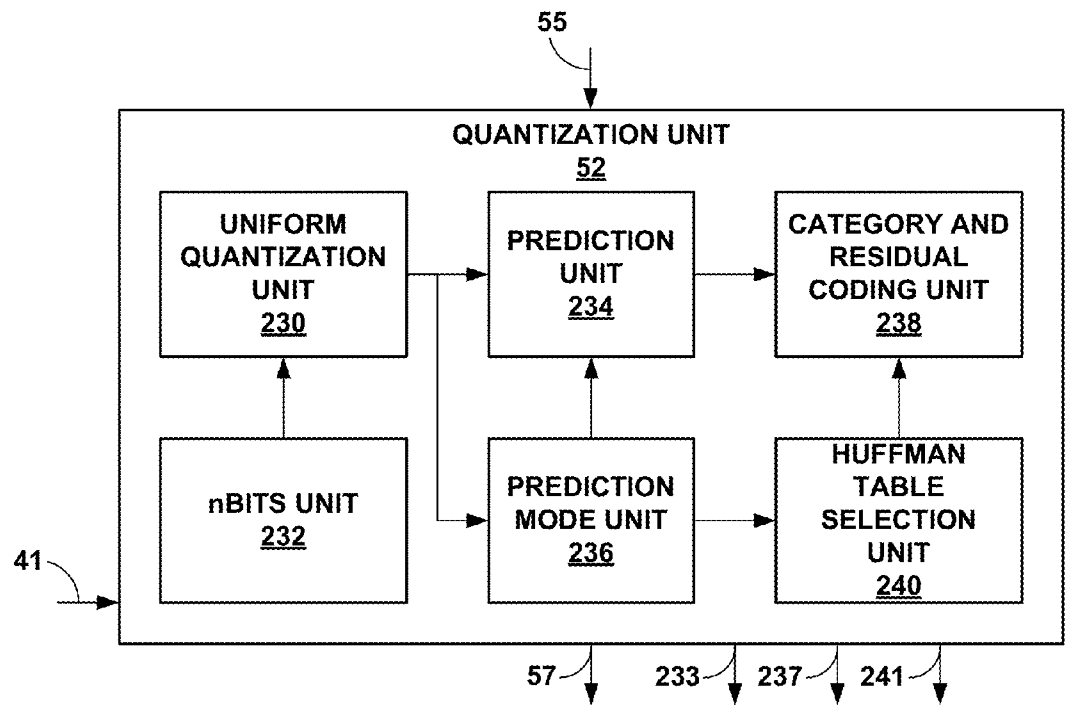

FIG. 9K is a block diagram illustrating, in more detail, the quantization unit 52 of the audio encoding device 20 shown in the example of FIG. 4. In the example of FIG. 9K, the quantization unit 52 includes a uniform quantization unit 230, a nbits unit 232, a prediction unit 234, a prediction mode unit 236 ("Pred Mode Unit 236"), a category and residual coding unit 238, and a Huffman table selection unit 240. The uniform quantization unit 230 represents a unit configured to perform the uniform quantization described above with respect to one of the spatial components (which may represent any one of the reduced foreground V[k] vectors 55). The nbits unit 232 represents a unit configured to determine the nbits parameter or value.

The prediction unit 234 represents a unit configured to perform prediction with respect to the quantized spatial component. The prediction unit 234 may perform prediction by performing an element-wise subtraction of the current one of the reduced foreground V[k] vectors 55 by a temporally subsequent corresponding one of the reduced foreground V[k] vectors 55 (which may be denoted as reduced foreground V[k−1] vectors 55). The result of this prediction may be referred to as a predicted spatial component.

The prediction mode unit 236 may represent a unit configured to select the prediction mode. The Huffman table selection unit 240 may represent a unit configured to select an appropriate Huffman table for coding of the cid. The prediction mode unit 236 and the Huffman table selection unit 240 may operate, as one example, in accordance with the following pseudo-code:

```
For a given nbits, retrieve all the Huffman Tables having nbits
B00 = 0; B01 = 0; B10 = 0; B11 = 0; // initialize to compute
expected bits per coding mode
for m = 1:(# elements in the vector)
   // calculate expected number of bits for a vector element v(m)
   // without prediction and using Huffman Table 5
   B00 = B00 + calculate_bits(v(m), HT5);
   // without prediction and using Huffman Table {1,2,3}
   B01 = B01 + calculate_bits(v(m), HTq); q in {1,2,3}
   // calculate expected number of bits for prediction residual e(m)
   e(m) = v(m) − vp(m); // vp(m); previous frame vector element
   // with prediction and using Huffman Table 4
   B10 = B10 + calculate_bits(e(m), HT4);
   // with prediction and using Huffman Table 5
   B11 = B11 + calculate_bits(e(m), HT5);
end
// find a best prediction mode and Huffman table that yield minimum
// bits best prediction mode and Huffman table are flagged by pflag
and Htflag, respectively
[Be, id] = min( [B00 B01 B10 B11] );
Switch id
   case 1: pflag = 0; HTflag = 0;
   case 2: pflag = 0; HTflag = 1;
   case 3: pflag = 1; HTflag = 0;
   case 4: pflag = 1; HTflag = 1;
end
```

Category and residual coding unit 238 may represent a unit configured to perform the categorization and residual coding of a predicted spatial component or the quantized spatial component (when prediction is disabled) in the manner described in more detail above.

As shown in the example of FIG. 9K, the quantization unit 52 may output various parameters or values for inclusion either in the bitstream 21 or side information (which may itself be a bitstream separate from the bitstream 21). Assuming the information is specified in the side channel information, the scalar/entropy quantization unit 50 may output the nbits value as nbits value 233, the prediction mode as prediction mode 237 and the Huffman table information as Huffman table information 241 to bitstream generation unit 42 along with the compressed version of the spatial component (shown as coded foreground V[k] vectors 57 in the example of FIG. 4), which in this example may refer to the Huffman code selected to encode the cid, the sign bit, and the block coded residual. The nbits value may be specified once in the side channel information for all of the coded foreground V[k] vectors 57, while the prediction mode and the Huffman table information may be specified for each one of the coded foreground V[k] vectors 57. The portion of the bitstream that specifies the compressed version of the spatial component is shown in more in the example of FIGS. 10B and/or 10C.

Figure 9L:
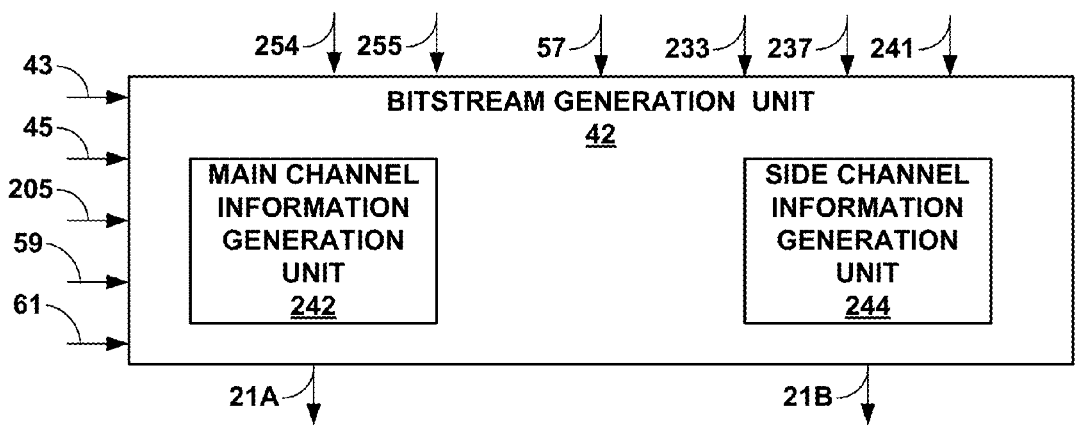

FIG. 9L is a block diagram illustrating, in more detail, the bitstream generation unit 42 of the audio encoding device 20 shown in the example of FIG. 4. The bitstream generation unit 42 may include a main channel information generation unit 242 and a side channel information generation unit 244. The main channel information generation unit 242 may generate a main bitstream 21 that includes one or more, if not all, of reorder indices 205, the CodedSpatialInterpolationTime syntax element 254, the SpatialInterpolationMethod syntax element 255 the encoded background HOA coefficients 59, and the encoded nFG signals 61. The side channel information generation unit 244 may represent a unit configured to generate a side channel bitstream 21B that may include one or more, if not all, of the nbits value 233, the prediction mode 237, the Huffman table information 241 and the coded foreground V[k] vectors 57. The bitstreams 21 and 21B may be collectively referred to as the bitstream 21. In some contexts, the bitstream 21 may only refer to the main channel bitstream 21, while the bitstream 21B may be referred to as side channel information 21B.

Figure 10A:
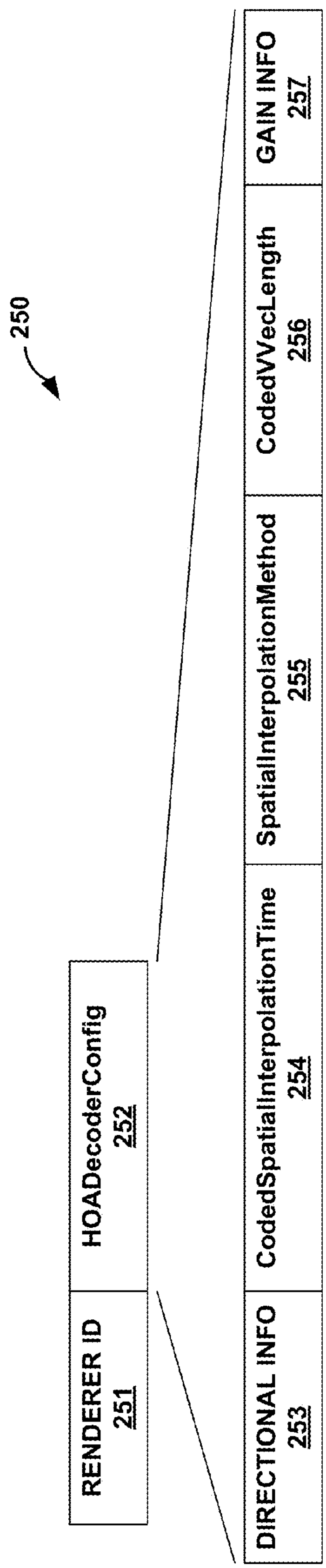
FIGS. 10A-10O(ii) are diagrams illustrating a portion of the bitstream or side channel information that may specify the compressed spatial components in more detail.
Figure 10B:
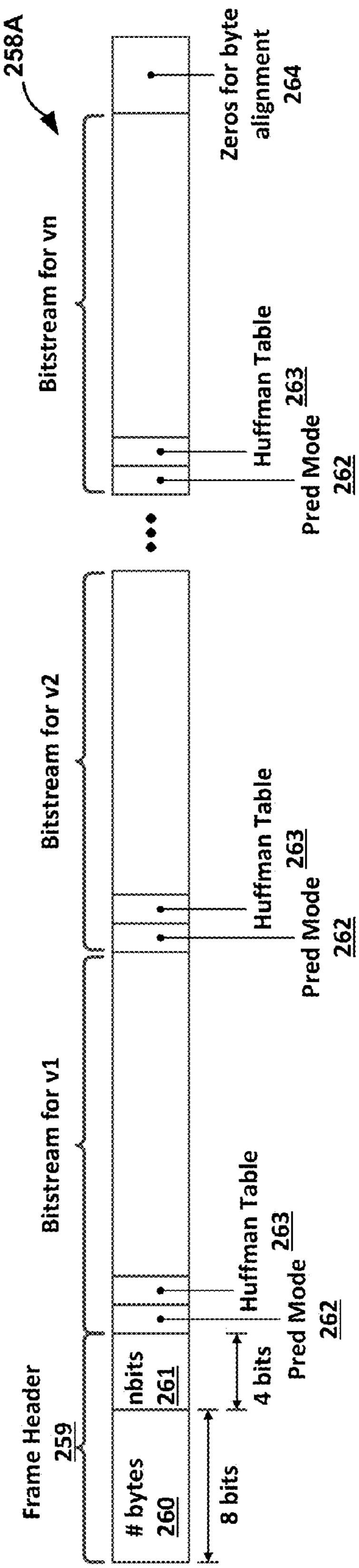
Figure 10C:
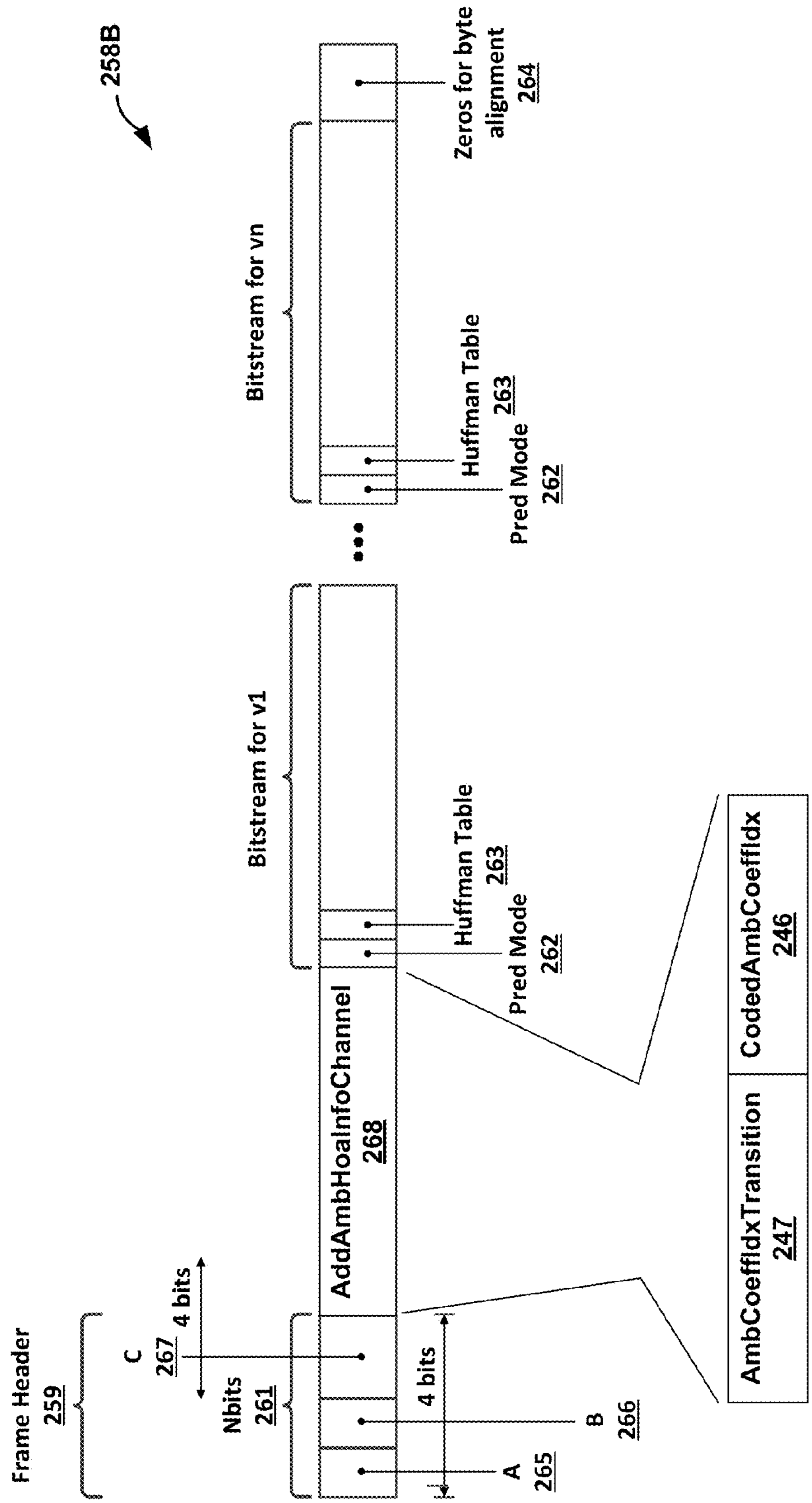
Figure 10C:
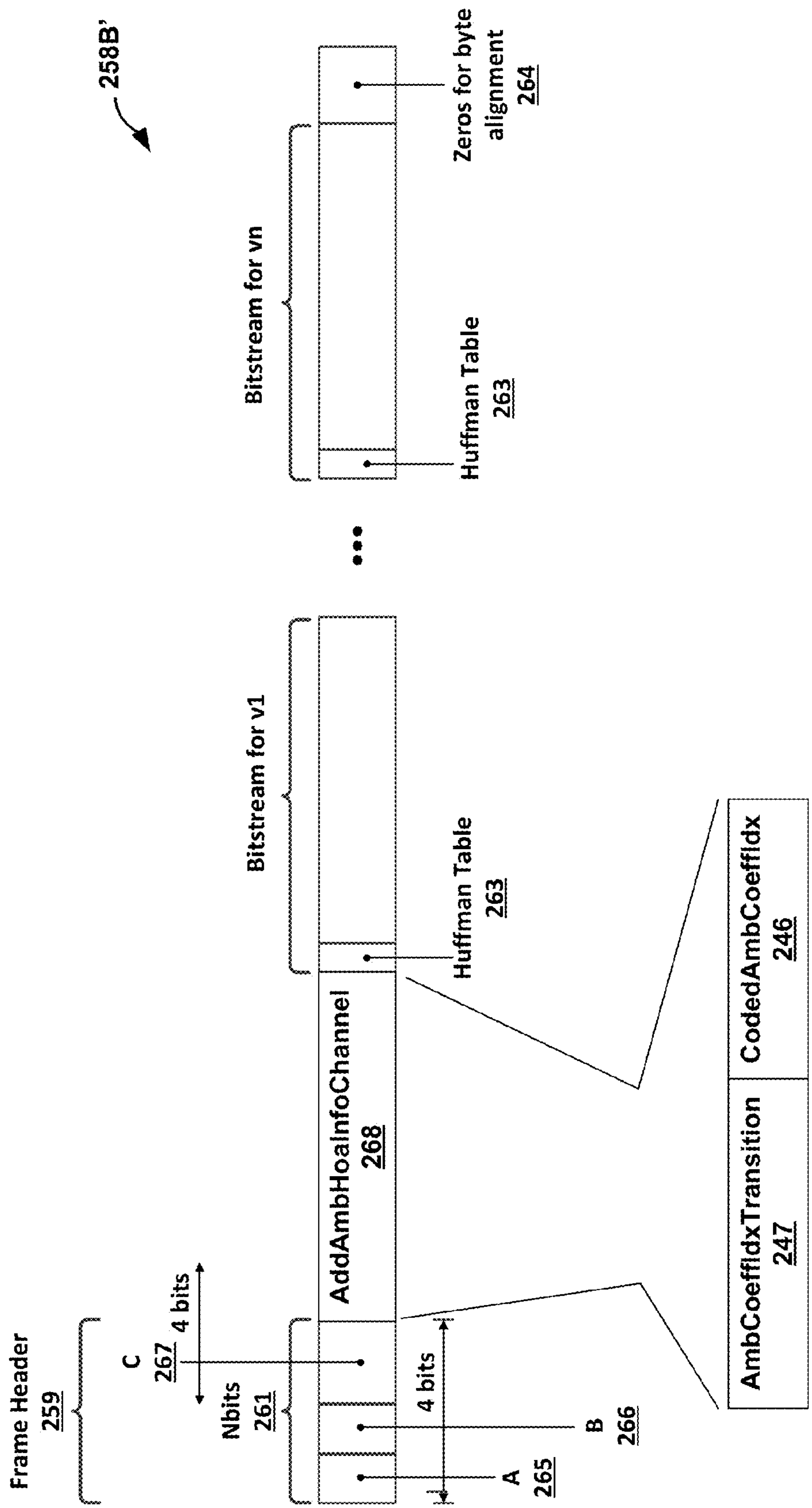
Figure 10D:
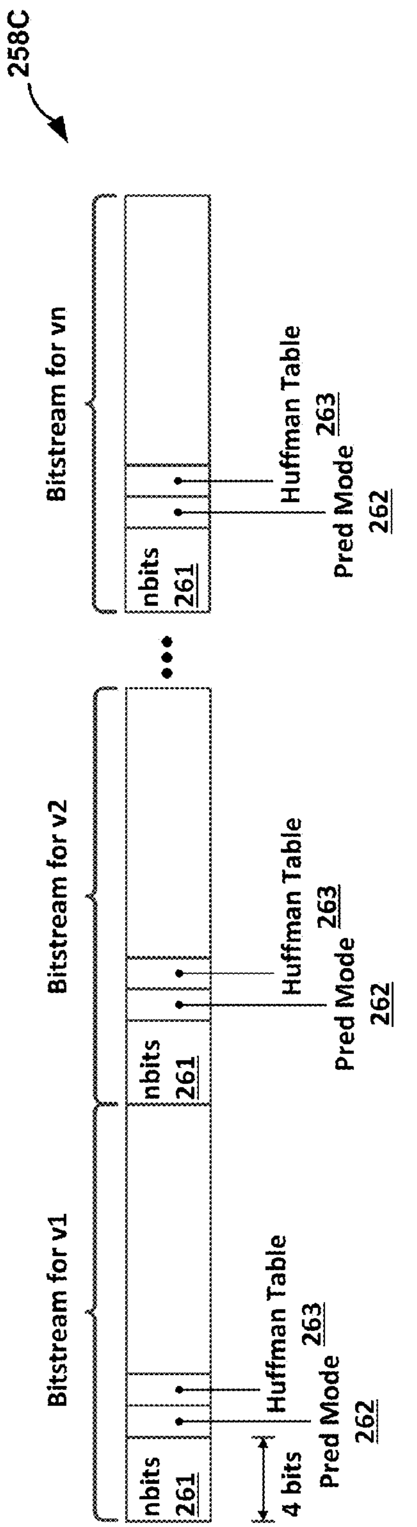
Figure 10D:
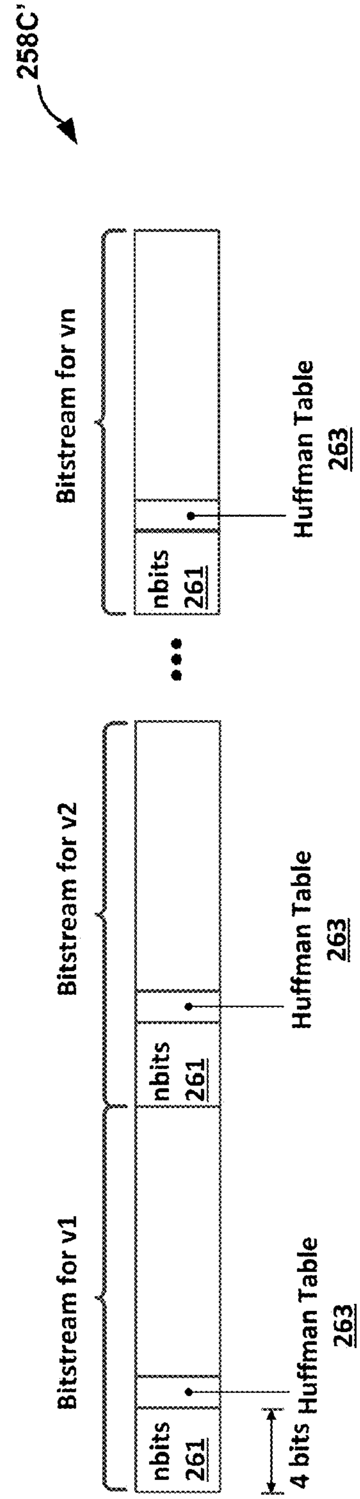
Figure 10E:
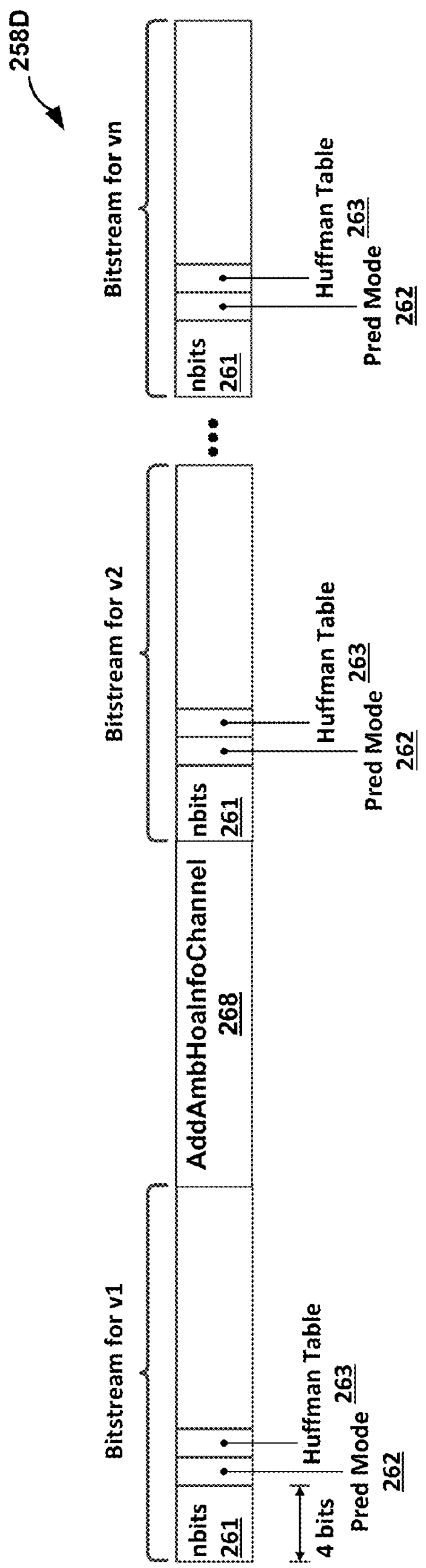
Figure 10E:
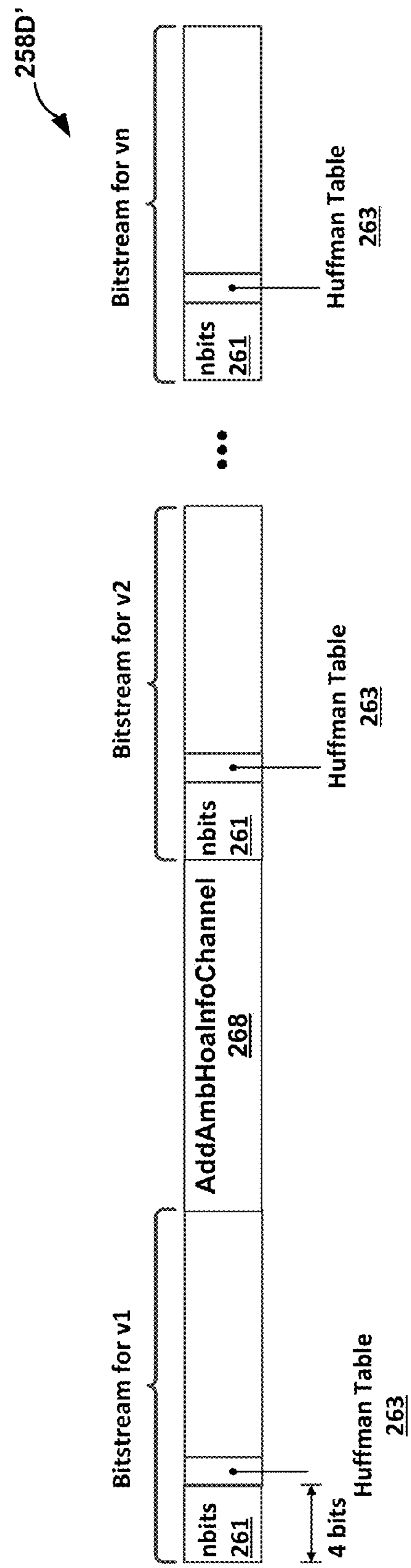
Figure 10F:
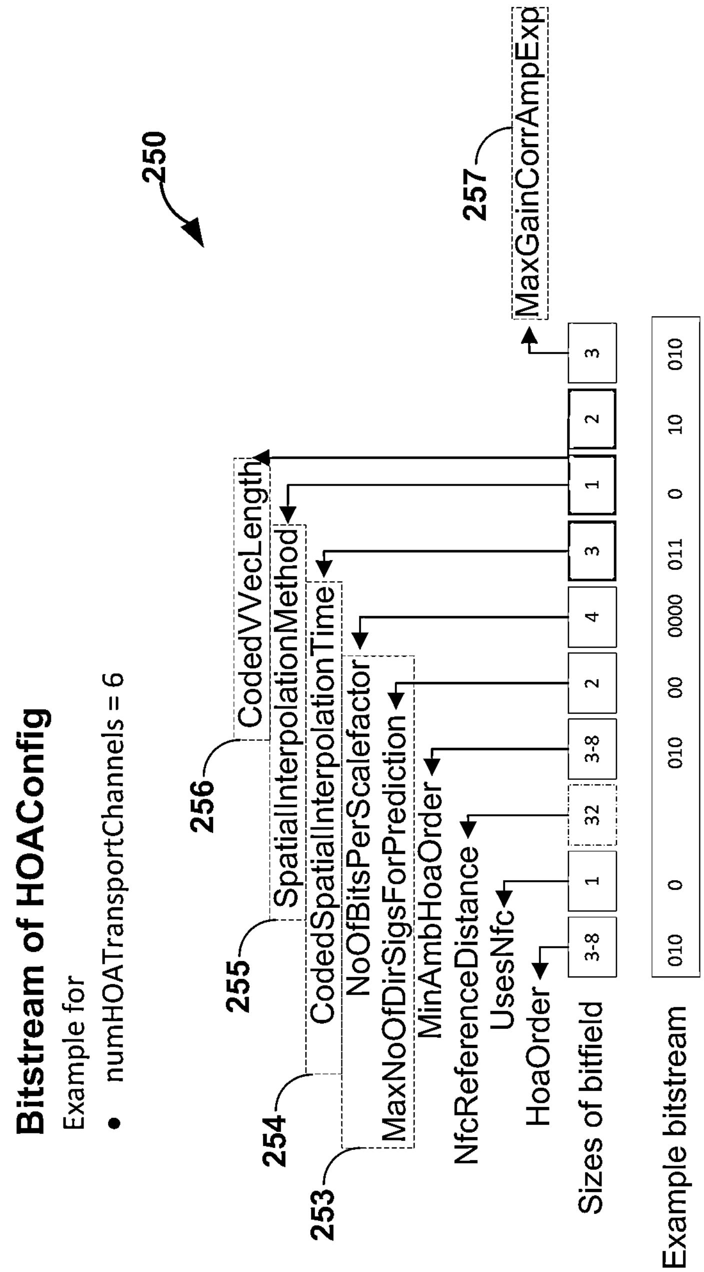
Figure 10G:
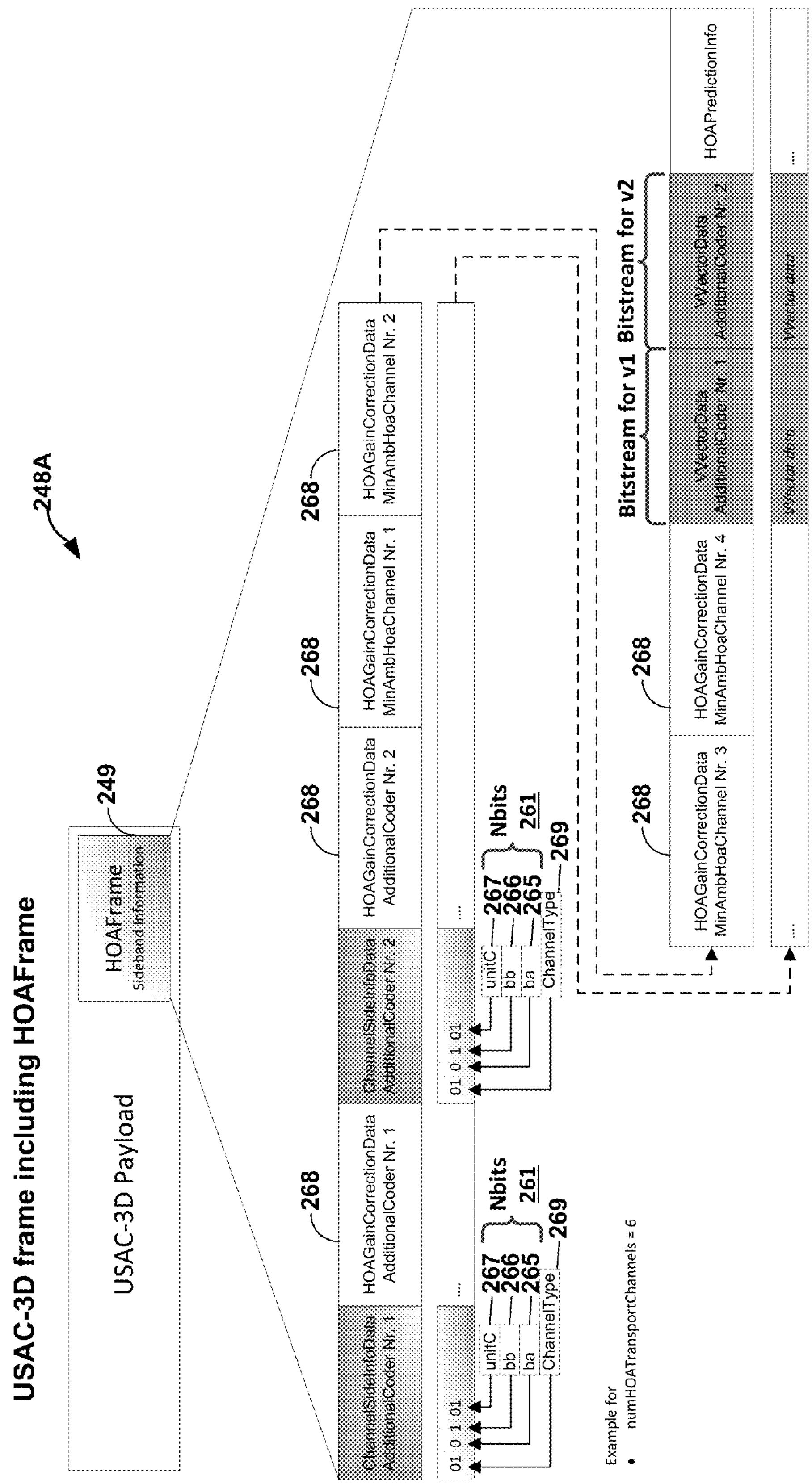
Figure 10H:
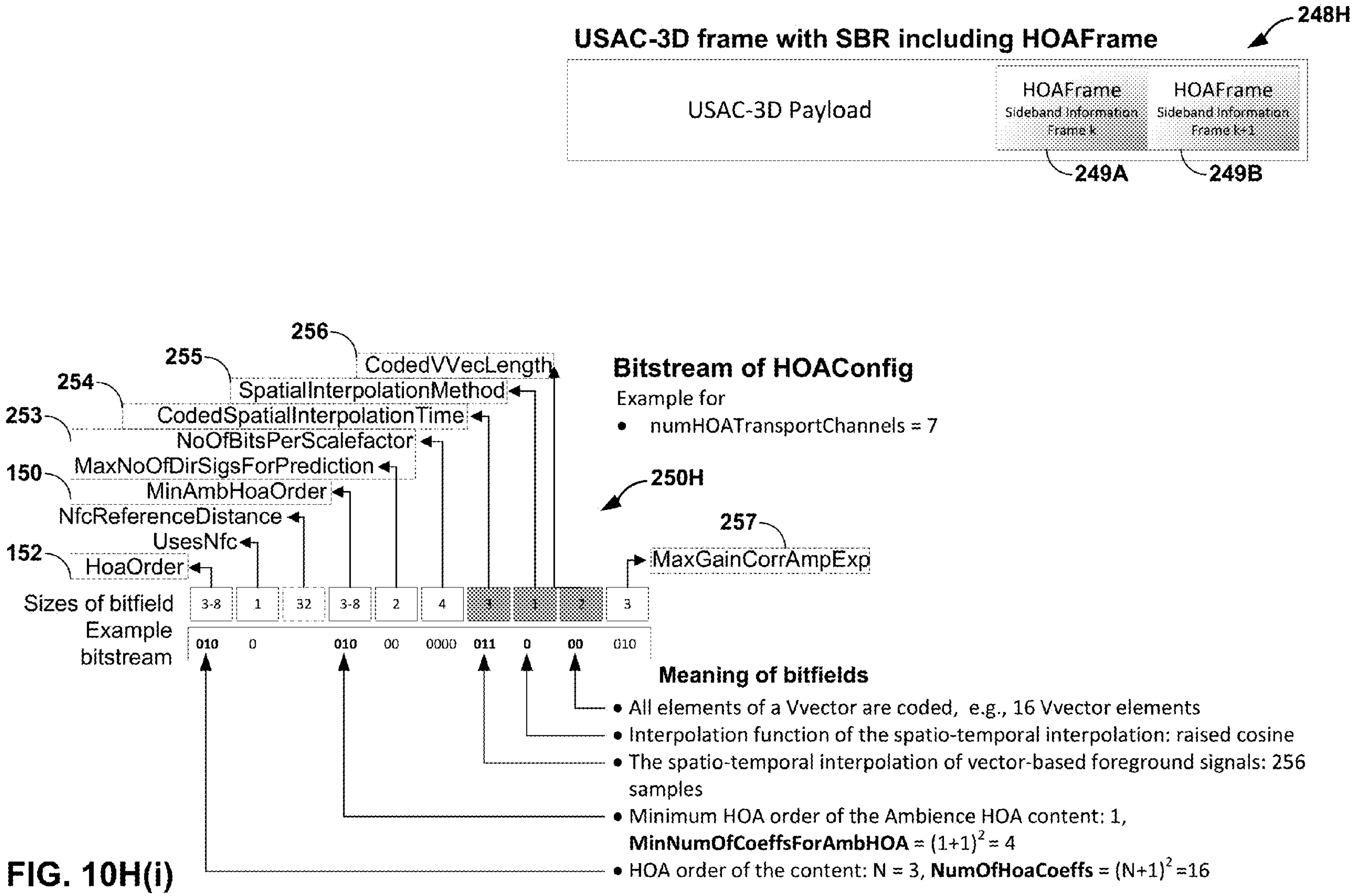
Figure 10I:
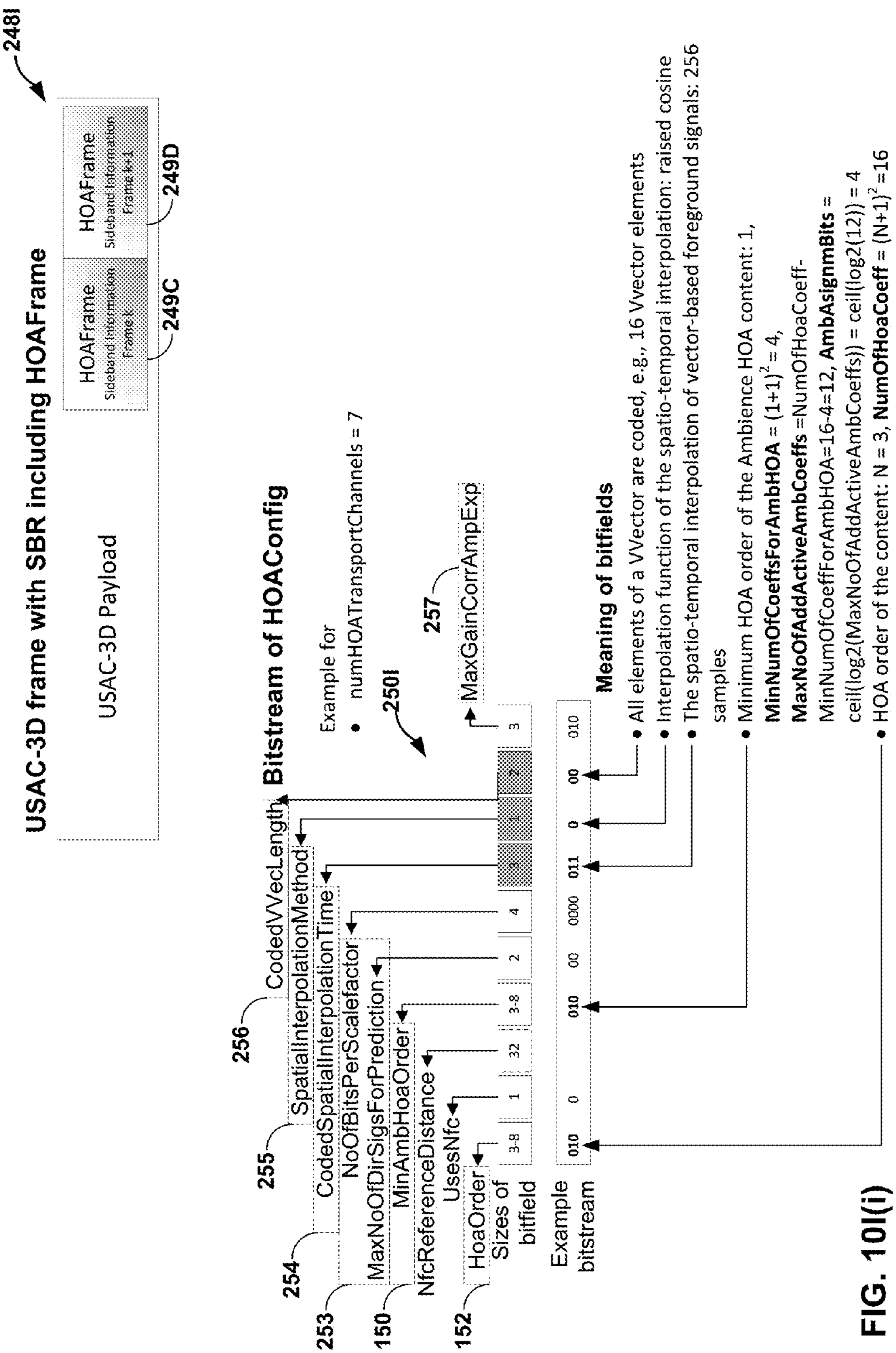
Figure 10J:
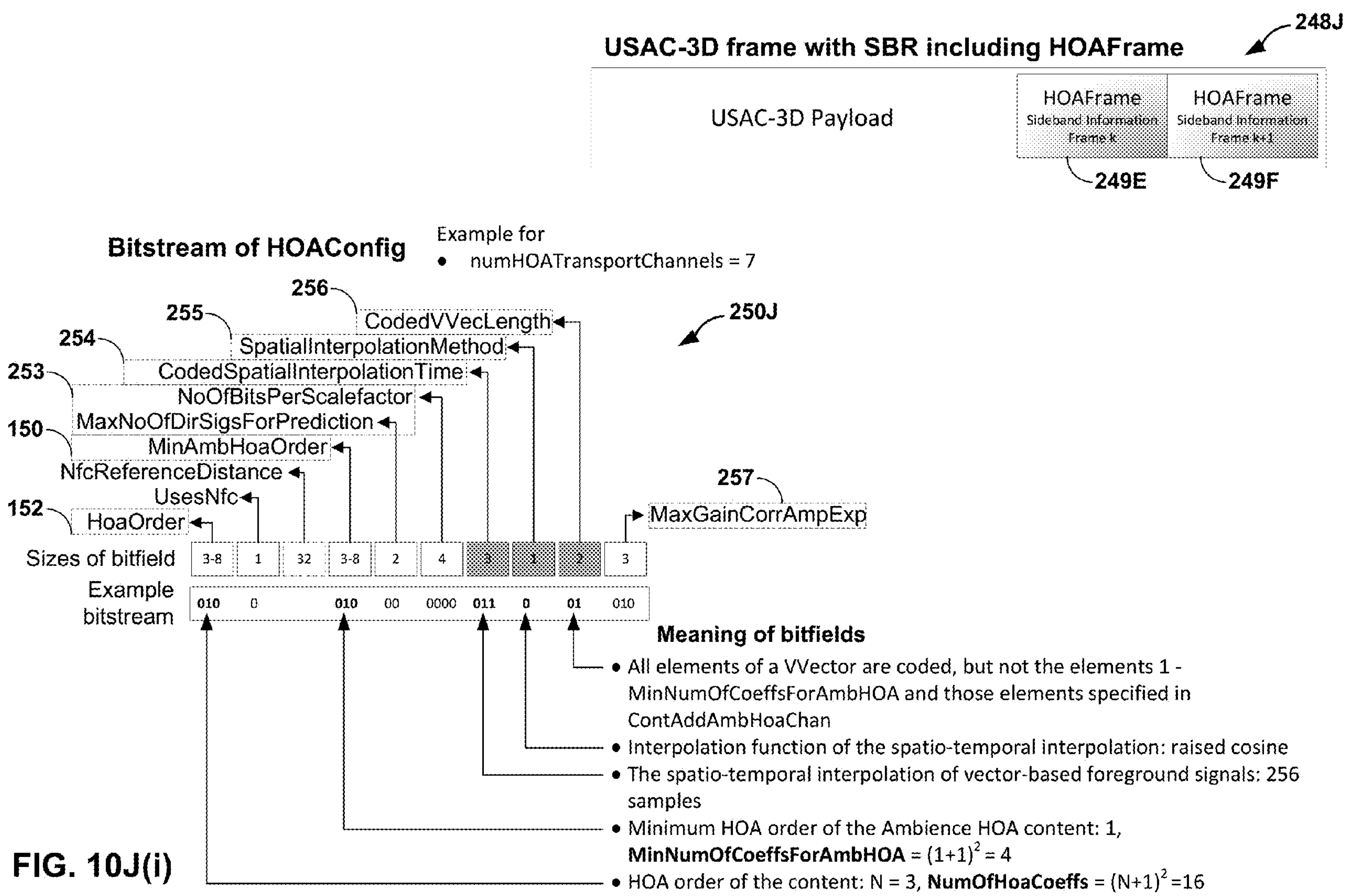
Figure 10K:
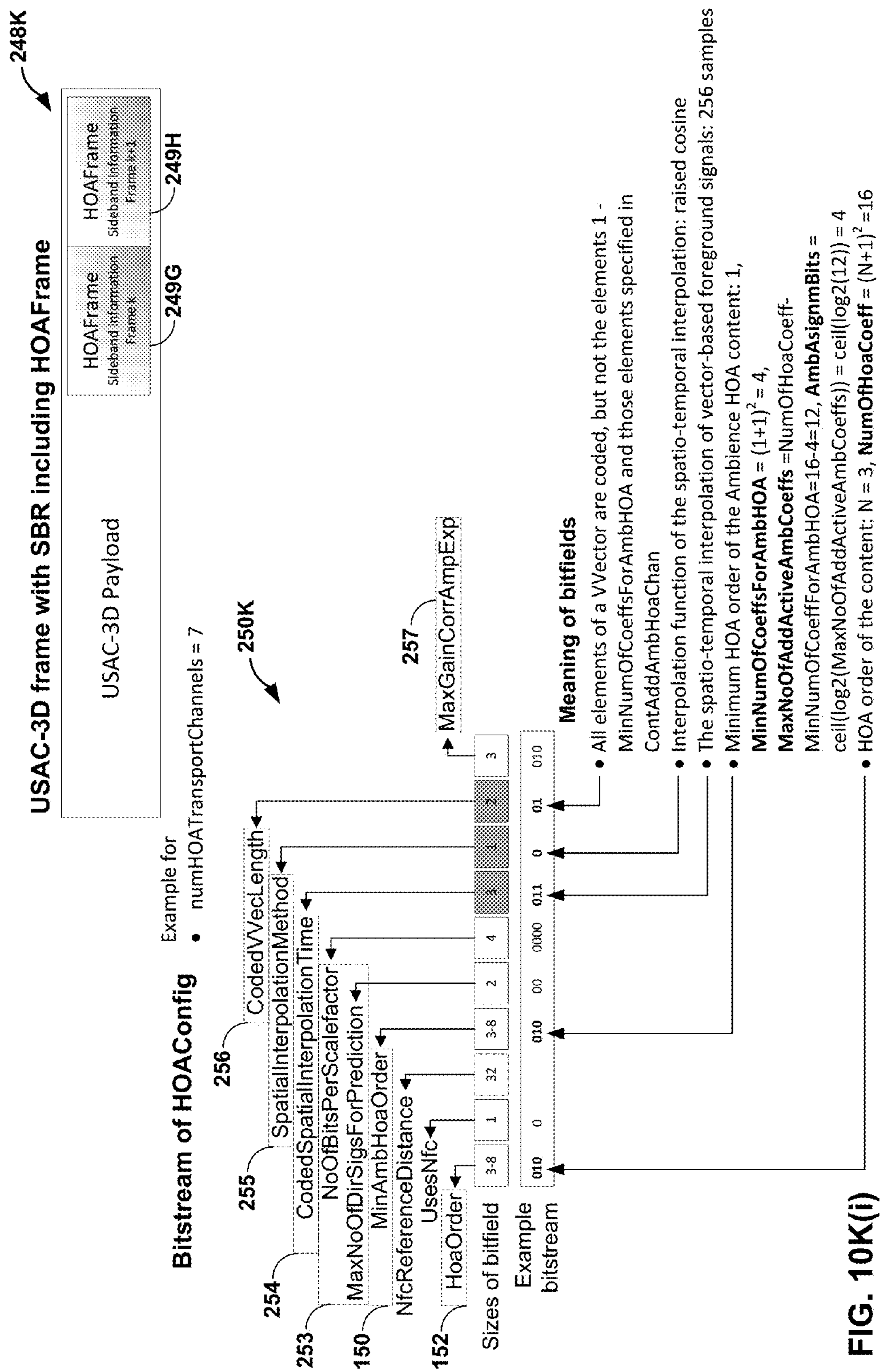
Figure 10L:
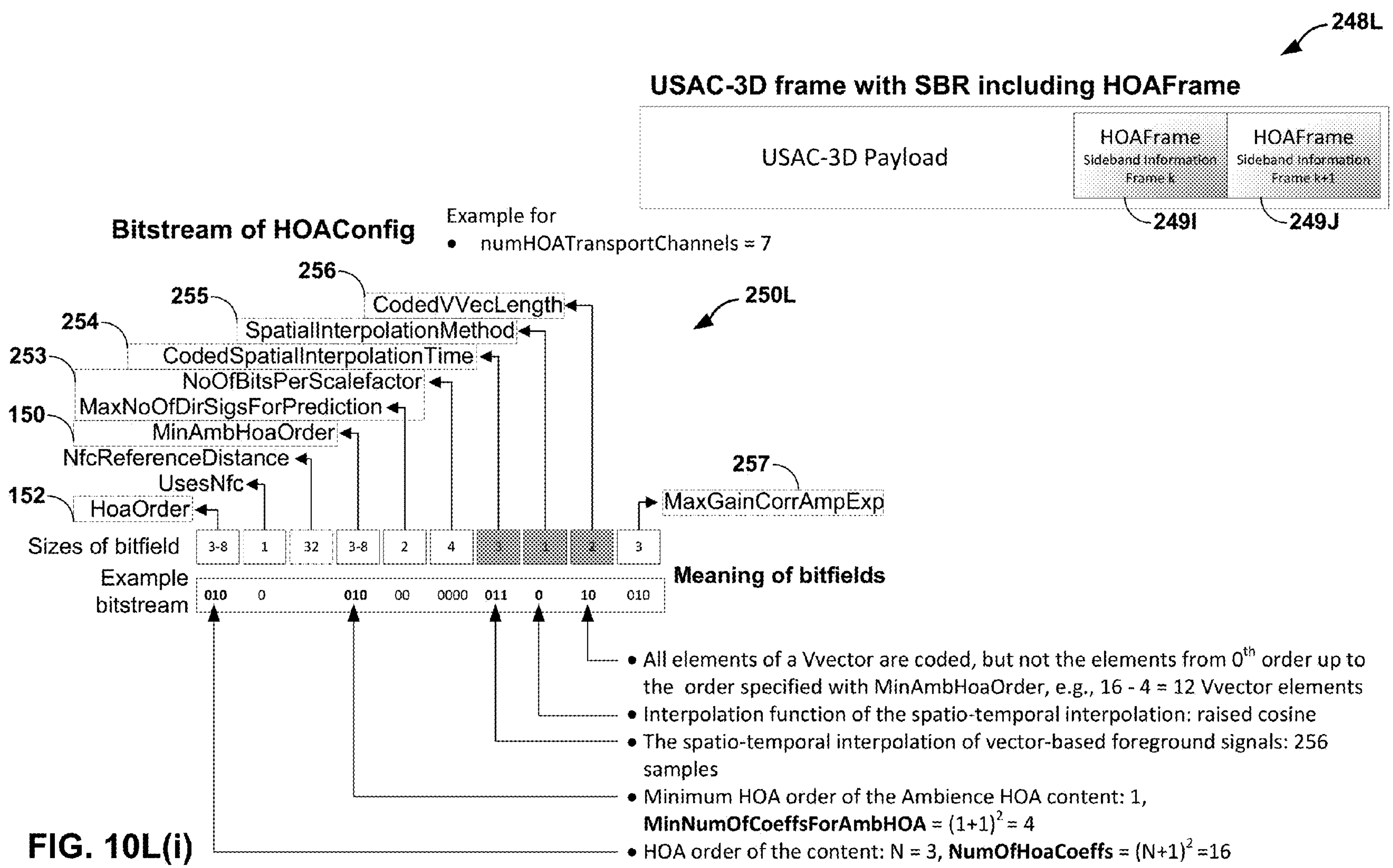
Figure 10M:
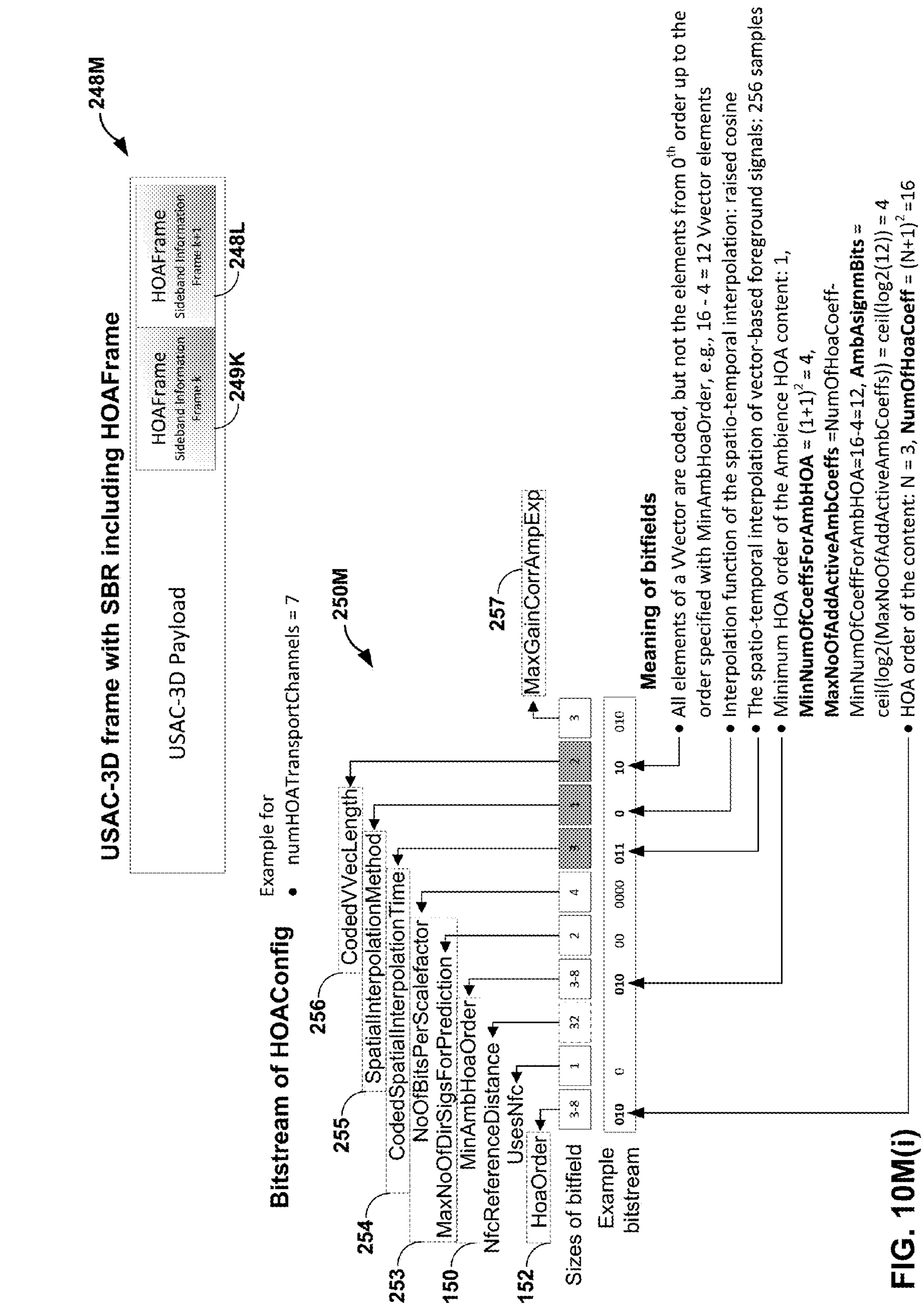
Figure 10N:
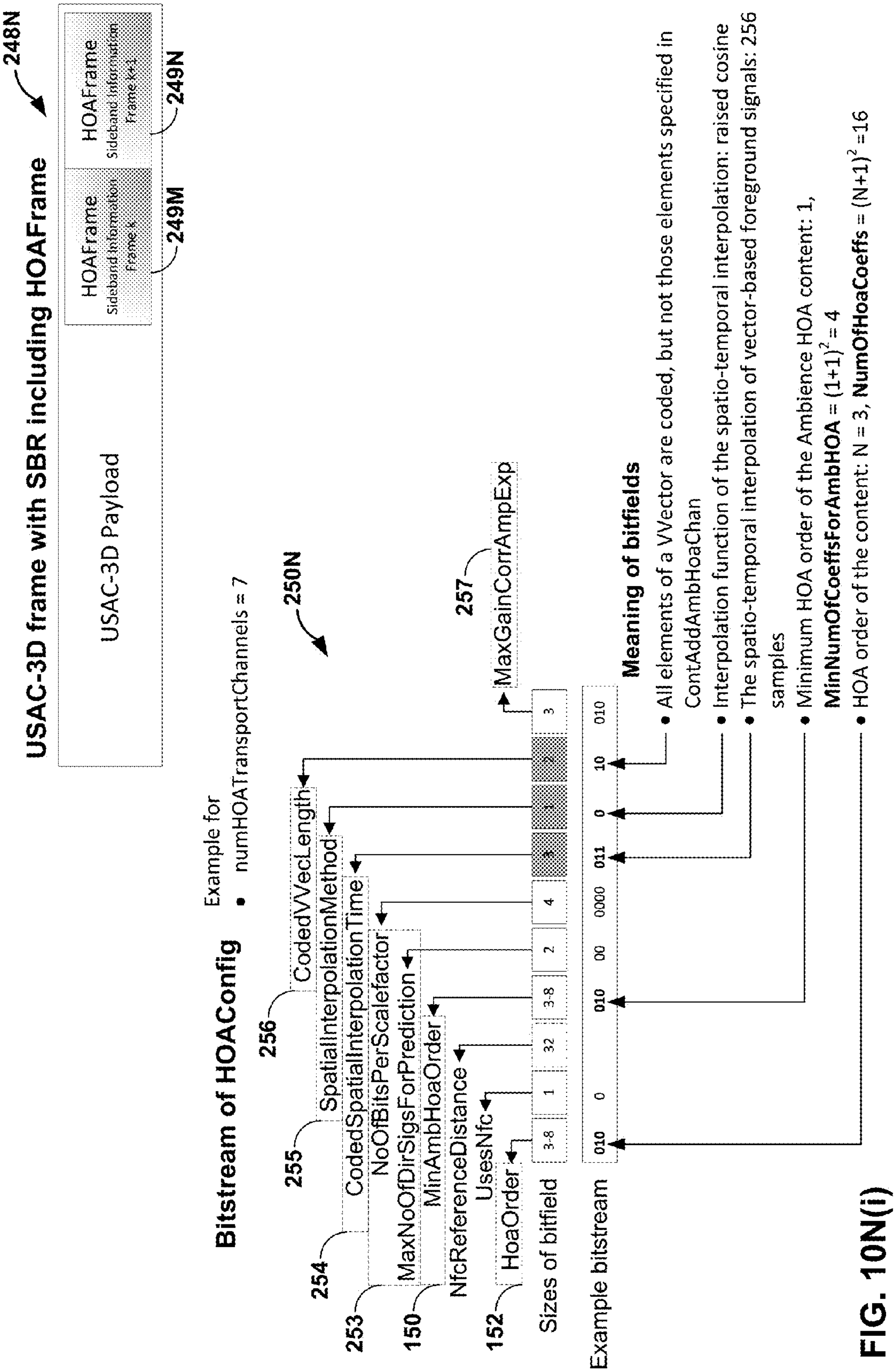
Figure 10O:
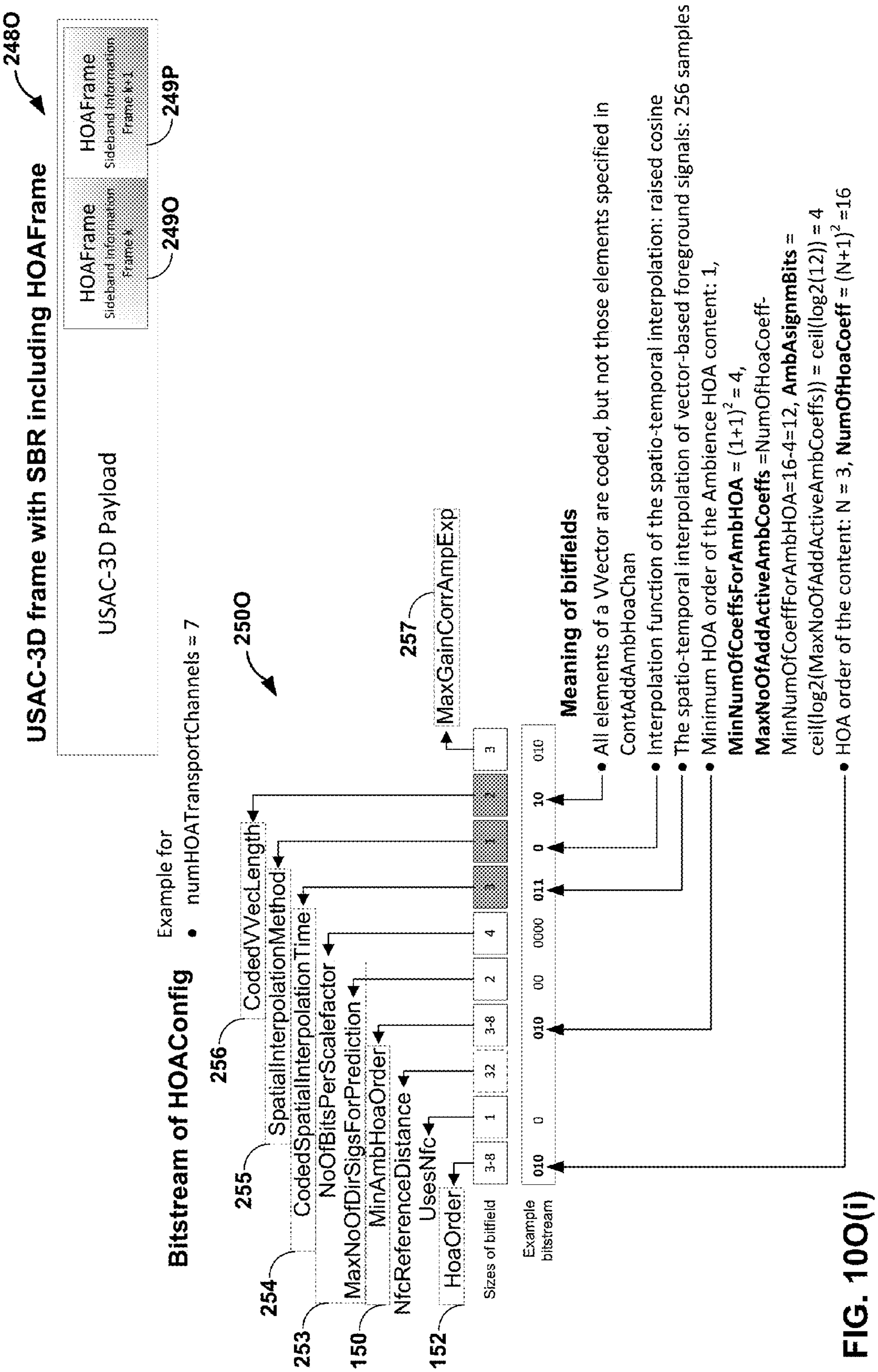

FIGS. 10A-10O(ii) are diagrams illustrating portions of the bitstream or side channel information that may specify the compressed spatial components in more detail. In the example of FIG. 10A, a portion 250 includes a renderer identifier ("renderer ID") field 251 and a HOADecoderConfig field 252. The renderer ID field 251 may represent a field that stores an ID of the renderer that has been used for the mixing of the HOA content. The HOADecoderConfig field 252 may represent a field configured to store information to initialize the HOA spatial decoder.

The HOADecoderConfig field 252 further includes a directional information ("direction info") field 253, a CodedSpatialInterpolationTime field 254, a SpatialInterpolationMethod field 255, a CodedVVecLength field 256 and a gain info field 257. The directional information field 253 may represent a field that stores information for configuring the directional-based synthesis decoder. The CodedSpatialInterpolationTime field 254 may represent a field that stores a time of the spatio-temporal interpolation of the vector-based signals. The SpatialInterpolationMethod field 255 may represent a field that stores an indication of the interpolation type applied during the spatio-temporal interpolation of the vector-based signals. The CodedVVecLength field 256 may represent a field that stores a length of the transmitted data vector used to synthesize the vector-based signals. The gain info field 257 represents a field that stores information indicative of a gain correction applied to the signals.

In the example of FIG. 10B, the portion 258A represents a portion of the side-information channel, where the portion 258A includes a frame header 259 that includes a number of bytes field 260 and an nbits field 261. The number of bytes field 260 may represent a field to express the number of bytes included in the frame for specifying spatial components v1 through vn including the zeros for byte alignment field 264. The nbits field 261 represents a field that may specify the nbits value identified for use in decompressing the spatial components v1-vn.

As further shown in the example of FIG. 10B, the portion 258A may include sub-bitstreams for v1-vn, each of which includes a prediction mode field 262, a Huffman Table information field 263 and a corresponding one of the compressed spatial components v1-vn. The prediction mode field 262 may represent a field to store an indication of whether prediction was performed with respect to the corresponding one of the compressed spatial components v1-vn. The Huffman table information field 263 represents a field to indicate, at least in part, which Huffman table is to be used to decode various aspects of the corresponding one of the compressed spatial components v1-vn.

In this respect, the techniques may enable audio encoding device 20 to obtain a bitstream comprising a compressed version of a spatial component of a soundfield, the spatial component generated by performing a vector based synthesis with respect to a plurality of spherical harmonic coefficients.

FIG. 10C is a diagram illustrating an alternative example of a portion 258B of the side channel information that may specify the compressed spatial components in more detail. In the example of FIG. 10C, the portion 258B includes a frame header 259 that includes an Nbits field 261. The Nbits field 261 represents a field that may specify an nbits value identified for use in decompressing the spatial components v1-vn.

As further shown in the example of FIG. 10C, the portion 258B may include sub-bitstreams for v1-vn, each of which includes a prediction mode field 262, a Huffman Table information field 263 and a corresponding one of the compressed spatial components v1-vn. The prediction mode field 262 may represent a field to store an indication of whether prediction was performed with respect to the corresponding one of the compressed spatial components v1-vn. The Huffman table information field 263 represents a field to indicate, at least in part, which Huffman table is to be used to decode various aspects of the corresponding one of the compressed spatial components v1-vn.

Nbits field 261 in the illustrated example includes subfields A 265, B 266, and C 267. In this example, A 265 and B 266 are each 1 bit sub-fields, while C 267 is a 2 bit sub-field. Other examples may include differently-sized sub-fields 265, 266, and 267. The A field 265 and the B field 266 may represent fields that store first and second most significant bits of the Nbits field 261, while the C field 267 may represent a field that stores the least significant bits of the Nbits field 261.

The portion 258B may also include an AddAmbHoaInfoChannel field 268. The AddAmbHoaInfoChannel field 268 may represent a field that stores information for the additional ambient HOA coefficients. As shown in the example of FIG. 10C, the AddAmbHoaInfoChannel 268 includes a CodedAmbCoeffIdx field 246, an AmbCoeffIdxTransition field 247. The CodedAmbCoeffIdx field 246 may represent a field that stores an index of an additional ambient HOA coefficient. The AmbCoeffIdxTransition field 247 may represent a field configured to store data indicative whether, in this frame, an additional ambient HOA coefficient is either being faded in or faded out.

FIG. 10C(i) is a diagram illustrating an alternative example of a portion 258B' of the side channel information that may specify the compressed spatial components in more detail. In the example of FIG. 10C(i), the portion 258B' includes a frame header 259 that includes an Nbits field 261. The Nbits field 261 represents a field that may specify an nbits value identified for use in decompressing the spatial components v1-vn.

As further shown in the example of FIG. 10C(i), the portion 258B' may include sub-bitstreams for v1-vn, each of which includes a Huffman Table information field 263 and a corresponding one of the compressed directional components v1-vn without including the prediction mode field 262. In all other respects, the portion 258B' may be similar to the portion 258B.

FIG. 10D is a diagram illustrating a portion 258C of the bitstream 21 in more detail. The portion 258C is similar to the portion 258, except that the frame header 259 and the zero byte alignment 264 have been removed, while the Nbits 261 field has been added before each of the bitstreams for v1-vn, as shown in the example of FIG. 10D.

FIG. 10D(i) is a diagram illustrating a portion 258C' of the bitstream 21 in more detail. The portion 258C' is similar to the portion 258C except that the portion 258C' does not include the prediction mode field 262 for each of the V vectors v1-vn.

FIG. 10E is a diagram illustrating a portion 258D of the bitstream 21 in more detail. The portion 258D is similar to the portion 258B, except that the frame header 259 and the zero byte alignment 264 have been removed, while the Nbits 261 field has been added before each of the bitstreams for v1-vn, as shown in the example of FIG. 10E.

FIG. 10E(i) is a diagram illustrating a portion 258D' of the bitstream 21 in more detail. The portion 258D' is similar to the portion 258D except that the portion 258D' does not include the prediction mode field 262 for each of the V vectors v1-vn. In this respect, the audio encoding device 20 may generate a bitstream 21 that does not include the prediction mode field 262 for each compressed V vector, as demonstrated with respect to the examples of FIGS. 10C(i), 10D(i) and 10E(i).

FIG. 10F is a diagram illustrating, in a different manner, the portion 250 of the bitstream 21 shown in the example of FIG. 10A. The portion 250 shown in the example of FIG. 10D, includes an HOAOrder field (which was not shown in the example of FIG. 10F for ease of illustration purposes), a MinAmbHoaOrder field (which again was not shown in the example of FIG. 10 for ease of illustration purposes), the direction info field 253, the CodedSpatialInterpolationTime field 254, the SpatialInterpolationMethod field 255, the CodedVVecLength field 256 and the gain info field 257. As shown in the example of FIG. 10F, the CodedSpatialInterpolationTime field 254 may comprise a three bit field, the SpatialInterpolationMethod field 255 may comprise a one bit field, and the CodedVVecLength field 256 may comprise two bit field.

FIG. 10G is a diagram illustrating a portion 248 of the bitstream 21 in more detail. The portion 248 represents a unified speech/audio coder (USAC) three-dimensional (3D) payload including an HOAframe field 249 (which may also be denoted as the sideband information, side channel information, or side channel bitstream). As shown in the example of FIG. 10E, the expanded view of the HOAFrame field 249 may be similar to the portion 258B of the bitstream 21 shown in the example of FIG. 10C. The "ChannelSideInfoData" includes a ChannelType field 269, which was not shown in the example of FIG. 10C for ease of illustration purposes, the A field 265 denoted as "ba" in the example of FIG. 10E, the B field 266 denoted as "bb" in the example of FIG. 10E and the C field 267 denoted as "unitC" in the example of FIG. 10E. The ChannelType field indicates whether the channel is a direction-based signal, a vector-based signal or an additional ambient HOA coefficient. Between different ChannelSideInfoData there is AddAmbHoaInfoChannel fields 268 with the different V vector bitstreams denoted in grey (e.g., "bitstream for v1" and "bitstream for v2").

FIGS. 10H-10O(ii) are diagrams illustrating another various example portions 248H-248O of the bitstream 21 along with accompanying HOAconfig portions 250H-250O in more detail. FIGS. 10H(i) and 10H(ii) illustrate a first example bitstream 248H and accompanying HOA config portion 250H having been generated to correspond with case 0 in the above pseudo-code. In the example of FIG. 10H(i), the HOAconfig portion 250H includes a CodedVVecLength syntax element 256 set to indicate that all elements of a V vector are coded, e.g., all 16 V vector elements. The HOAconfig portion 250H also includes a SpatialInterpolationMethod syntax element 255 set to indicate that the interpolation function of the spatio-temporal interpolation is a raised cosine. The HOAconfig portion 250H moreover includes a CodedSpatialInterpolationTime 254 set to indicate an interpolated sample duration of 256. The HOAconfig portion 250H further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The HOAconfig portion 250H includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10H(i), the portion 248H includes a unified speech and audio coding (USAC) three-dimensional (USAC-3D) audio frame in which two HOA frames 249A and 249B are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10H(ii) illustrates the frames 249A and 249B in more detail. As shown in the example of FIG. 10H(ii), frame 249A includes ChannelSideInfoData (CSID) fields 154-154C, an HOAGainCorrectionData (HOAGCD) fields, VVectorData fields 156 and 156B and HOAPredictionInfo fields. The CSID field 154 includes the unitC 267, bb 266 and ba265 along with the ChannelType 269, each of which are set to the corresponding values 01, 1, 0 and 01 shown in the example of FIG. 10H(i). The CSID field 154B includes the unitC 267, bb 266 and ba265 along with the ChannelType 269, each of which are set to the corresponding values 01, 1, 0 and 01 shown in the example of FIG. 10H(ii). The CSID field 154C includes the ChannelType field 269 having a value of 3. Each of the CSID fields 154-154C correspond to the respective one of the transport channels 1, 2 and 3. In effect, each CSID field 154-154C indicates whether the corresponding payload 156 and 156B are direction-based signals (when the corresponding ChannelType is equal to zero), vector-based signals (when the corresponding ChannelType is equal to one), an additional Ambient HOA coefficient (when the corresponding ChannelType is equal to two), or empty (when the ChannelType is equal to three).

In the example of FIG. 10H(ii), the frame 249A includes two vector-based signals (given the ChannelType 269 equal to 1 in the CSID fields 154 and 154B) and an empty (given the ChannelType 269 equal to 3 in the CSID fields 154C). Given the forgoing HOAconfig portion 250H, the audio decoding device 24 may determine that all 16 V vector elements are encoded. Hence, the VVectorData 156 and 156B each includes all 16 vector elements, each of them uniformly quantized with 8 bits. As noted by the footnote 1, the number and indices of coded VVectorData elements are specified by the parameter CodedVVecLength=0. Moreover, as noted by the single asterisk (*), the coding scheme is signaled by NbitsQ=5 in the CSID field for the corresponding transport channel.

In the frame 249B, the CSID field 154 and 154B are the same as that in frame 249, while the CSID field 154C of the frame 249B switched to a ChannelType of one. The CSID field 154C of the frame 249B therefore includes the Cbflag 267, the Pflag 267 (indicating Huffman encoding) and Nbits 261 (equal to twelve). As a result, the frame 249B includes a third VVectorData field 156C that includes 16 V vector elements, each of them uniformly quantized with 12 bits and Huffman coded. As noted above, the number and indices of the coded VVectorData elements are specified by the parameter CodedVVecLength=0, while the Huffman coding scheme is signaled by the NbitsQ=12, CbFlag=0 and Pflag=0 in the CSID field 154C for this particular transport channel (e.g. transport channel no. 3).

The example of FIGS. 10I(i) and 10I(ii) illustrate a second example bitstream 248I and accompanying HOA config portion 250I having been generated to correspond with case 0 in the above in the above pseudo-code. In the example of FIG. 10I(i), the HOAconfig portion 250I includes a CodedVVecLength syntax element 256 set to indicate that all elements of a V vector are coded, e.g., all 16 V vector elements. The HOAconfig portion 250I also includes a SpatialInterpolationMethod syntax element 255 set to indicate that the interpolation function of the spatio-temporal interpolation is a raised cosine. The HOAconfig portion 250I moreover includes a CodedSpatialInterpolationTime 254 set to indicate an interpolated sample duration of 256.

The HOAconfig portion 250I further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The audio decoding device 24 may also derive a MaxNoofAddActiveAmbCoeffs syntax element as set to a difference between the NumOfHoaCoeff syntax element and the MinNumOfCoeffsForAmbHOA, which is assumed in this example to equal 16-4 or 12. The audio decoding device 24 may also derive a AmbAsignmBits syntax element as set to ceil(log 2(MaxNoOfAddActiveAmbCoeffs))=ceil(log 2(12))=4. The HOAconfig portion 250H includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10I(i), the portion 248H includes a USAC-3D audio frame in which two HOA frames 249C and 249D are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10I(ii) illustrates the frames 249C and 249D in more detail. As shown in the example of FIG. 10I(ii), the frame 249C includes CSID fields 154-154C and VVectorData fields 156. The CSID field 154 includes the CodedAmbCoeffIdx 246, the AmbCoeffIdxTransition 247 (where the double asterisk () indicates that, for flexible transport channel Nr. 1, the decoder's internal state is here assumed to be AmbCoeffIdxTransitionState=2, which results in the CodedAmbCoeffIdx bitfield is signaled or otherwise specified in the bitstream), and the ChannelType 269 (which is equal to two, signaling that the corresponding payload is an additional ambient HOA coefficient). The audio decoding device 24 may derive the AmbCoeffIdx as equal to the CodedAmbCoeffIdx+1+MinNumOfCoeffsForAmbHOA or 5 in this example. The CSID field 154B includes unitC 267, bb 266 and ba265 along with the ChannelType 269, each of which are set to the corresponding values 01, 1, 0 and 01 shown in the example of FIG. 10I(ii). The CSID field 154C includes the ChannelType field 269** having a value of 3.

In the example of FIG. 10I(ii), the frame 249C includes a single vector-based signal (given the ChannelType 269 equal to 1 in the CSID fields 154B) and an empty (given the ChannelType 269 equal to 3 in the CSID fields 154C). Given the forgoing HOAconfig portion 250I, the audio decoding device 24 may determine that all 16 V vector elements are encoded. Hence, the VVectorData 156 includes all 16 vector elements, each of them uniformly quantized with 8 bits. As noted by the footnote 1, the number and indices of coded VVectorData elements are specified by the parameter CodedVVecLength=0. Moreover, as noted by the footnote 2, the coding scheme is signaled by NbitsQ=5 in the CSID field for the corresponding transport channel.

In the frame 249D, the CSID field 154 includes an AmbCoeffIdxTransition 247 indicating that no transition has occurred and therefore the CodedAmbCoeffIdx 246 may be implied from the previous frame and need not be signaled or otherwise specified again. The CSID field 154B and 154C of the frame 249D are the same as that for the frame 249C and thus, like the frame 249C, the frame 249D includes a single VVectorData field 156, which includes all 16 vector elements, each of them uniformly quantized with 8 bits.

FIGS. 10J(i) and 10J(ii) illustrate a first example bitstream 248J and accompanying HOA config portion 250J having been generated to correspond with case 1 in the above pseudo-code. In the example of FIG. 10J(i), the HOAconfig portion 250J includes a CodedVVecLength syntax element 256 set to indicate that all elements of a V vector are coded, except for the elements 1 through a MinNumOftoeffsForAmbHOA syntax elements and those elements specified in a ContAddAmbHoaChan syntax element (assumed to be zero in this example). The HOAconfig portion 250J also includes a SpatialInterpolationMethod syntax element 255 set to indicate that the interpolation function of the spatio-temporal interpolation is a raised cosine. The HOAconfig portion 250J moreover includes a CodedSpatialInterpolationTime 254 set to indicate an interpolated sample duration of 256. The HOAconfig portion 250J further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The HOAconfig portion 250J includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10J(i), the portion 248J includes a USAC-3D audio frame in which two HOA frames 249E and 249F are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10J(ii) illustrates the frames 249E and 249F in more detail. As shown in the example of FIG. 10J(ii), frame 249E includes CSID fields 154-154C and VVectorData fields 156 and 156B. The CSID field 154 includes the unitC 267, bb 266 and ba265 along with the ChannelType 269, each of which are set to the corresponding values 01, 1, 0 and 01 shown in the example of FIG. 10J(i). The CSID field 154B includes the unitC 267, bb 266 and ba265 along with the ChannelType 269, each of which are set to the corresponding values 01, 1, 0 and 01 shown in the example of FIG. 10J(ii). The CSID field 154C includes the ChannelType field 269 having a value of 3. Each of the CSID fields 154-154C correspond to the respective one of the transport channels 1, 2 and 3.

In the example of FIG. 10J(ii), the frame 249E includes two vector-based signals (given the ChannelType 269 equal to 1 in the CSID fields 154 and 154B) and an empty (given the ChannelType 269 equal to 3 in the CSID fields 154C). Given the forgoing HOAconfig portion 250H, the audio decoding device 24 may determine that all 12 V vector elements are encoded (where 12 is derived as (HOAOrder+1)$^2$−(MinNumOfCoeffsForAmbHOA)−(ContAddAmbHoaChan)=16−4−0=12). Hence, the VVectorData 156 and 156B each includes all 12 vector elements, each of them uniformly quantized with 8 bits. As noted by the footnote 1, the number and indices of coded VVectorData elements are specified by the parameter CodedVVecLength=0. Moreover, as noted by the single asterisk (*), the coding scheme is signaled by NbitsQ=5 in the CSID field for the corresponding transport channel.

In the frame 249F, the CSID field 154 and 154B are the same as that in frame 249E, while the CSID field 154C of the frame 249F switched to a ChannelType of one. The CSID field 154C of the frame 249B therefore includes the Cbflag 267, the Pflag 267 (indicating Huffman encoding) and Nbits 261 (equal to twelve). As a result, the frame 249F includes a third VVectorData field 156C that includes 12 V vector elements, each of them uniformly quantized with 12 bits and Huffman coded. As noted above, the number and indices of the coded VVectorData elements are specified by the parameter CodedVVecLength=0, while the Huffman coding scheme is signaled by the NbitsQ=12, CbFlag=0 and Pflag=0 in the CSID field 154C for this particular transport channel (e.g. transport channel no. 3).

The example of FIGS. 10K(i) and 10K(ii) illustrate a second example bitstream 248K and accompanying HOA config portion 250K having been generated to correspond with case 1 in the above pseudo-code. In the example of FIG. 10K(i), the HOAconfig portions 250K includes a CodedVVecLength syntax element 256 set to indicate that all elements of a V vector are coded, except for the elements 1 through a MinNumOfCoeffsForAmbHOA syntax elements and those elements specified in a ContAddAmbHoaChan syntax element (assumed to be one in this example). The HOAconfig portion 250K also includes a SpatialInterpolationMethod syntax element 255 set to indicate that the interpolation function of the spatio-temporal interpolation is a raised cosine. The HOAconfig portion 250K moreover includes a CodedSpatialInterpolationTime 254 set to indicate an interpolated sample duration of 256.

The HOAconfig portion 250K further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to (1+1)$^2$ or four. The audio decoding device 24 may also derive a MaxNoOfAddActiveAmbCoeffs syntax element as set to a difference between the NumOfHoaCoeff syntax element and the MinNumOfCoeffsForAmbHOA, which is assumed in this example to equal 16−4 or 12. The audio decoding device 24 may also derive a AmbAsignmBits syntax element as set to ceil(log 2(MaxNoOfAddActiveAmbCoeffs))=ceil(log 2(12))=4. The HOAconfig portion 250K includes an HoaOrder syntax element 152 set to indicate the HOA order of the content to be equal to three (or, in other words, N=3), where the audio decoding device 24 may derive a NumOfHoaCoeffs to be equal to (N+1)$^2$ or 16.

As further shown in the example of FIG. 10K(i), the portion 248K includes a USAC-3D audio frame in which two HOA frames 249G and 249H are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10K(ii) illustrates the frames 249G and 249H in more detail. As shown in the example of FIG. 10K(ii), the frame 249G includes CSID fields 154-154C and VVectorData fields 156. The CSID field 154 includes the CodedAmbCoeffIdx 246, the AmbCoeffIdxTransition 247 (where the double asterisk () indicates that, for flexible transport channel Nr. 1, the decoder's internal state is here assumed to be AmbCoeffIdxTransitionState=2, which results in the CodedAmbCoeffIdx bitfield is signaled or otherwise specified in the bitstream), and the ChannelType 269 (which is equal to two, signaling that the corresponding payload is an additional ambient HOA coefficient). The audio decoding device 24 may derive the AmbCoeffIdx as equal to the CodedAmbCoeffIdx+1+MinNumOfCoeffsForAmbHOA or 5 in this example. The CSID field 154B includes unitC 267, bb 266 and ba265 along with the ChannelType 269, each of which are set to the corresponding values 01, 1, 0 and 01 shown in the example of FIG. 10K(ii). The CSID field 154C includes the ChannelType field 269** having a value of 3.

In the example of FIG. 10K(ii), the frame 249G includes a single vector-based signal (given the ChannelType 269 equal to 1 in the CSID fields 154B) and an empty (given the ChannelType 269 equal to 3 in the CSID fields 154C). Given the forgoing HOAconfig portion 250K, the audio decoding device 24 may determine that 11 V vector elements are encoded (where 12 is derived as (HOAOrder+1)$^2$−(MinNumOfCoeffsForAmbHOA)−(ContAddAmbHoaChan)=16−4−1=11). Hence, the VVectorData 156 includes all 11 vector elements, each of them uniformly quantized with 8 bits. As noted by the footnote 1, the number and indices of coded VVectorData elements are specified by the parameter CodedVVecLength=0. Moreover, as noted by the footnote 2, the coding scheme is signaled by NbitsQ=5 in the CSID field for the corresponding transport channel.

In the frame 249H, the CSID field 154 includes an AmbCoeffIdxTransition 247 indicating that no transition has occurred and therefore the CodedAmbCoeffIdx 246 may be implied from the previous frame and need not be signaled or otherwise specified again. The CSID field 154B and 154C of the frame 249H are the same as that for the frame 249G and thus, like the frame 249G, the frame 249H includes a single VVectorData field 156, which includes 11 vector elements, each of them uniformly quantized with 8 bits.

FIGS. 10L(i) and 10L(ii) illustrate a first example bitstream 248L and accompanying HOA config portion 250L having been generated to correspond with case 2 in the above pseudo-code. In the example of FIG. 10L(i), the HOAconfig portion 250L includes a CodedVVecLength syntax element 256 set to indicate that all elements of a V vector are coded, except for the elements from the zeroth order up to the order specified by MinAmbHoaOrder syntax element 150 (which is equal to $(\text{HoaOrder}+1)^2-(\text{MinAmbHoaOrder}+1)^2=16-4=12$ in this example). The HOAconfig portion 250L also includes a SpatialInterpolationMethod syntax element 255 set to indicate that the interpolation function of the spatio-temporal interpolation is a raised cosine. The HOAconfig portion 250L moreover includes a CodedSpatialInterpolationTime 254 set to indicate an interpolated sample duration of 256. The HOAconfig portion 250L further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The HOAconfig portion 250L includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10L(i), the portion 248L includes a USAC-3D audio frame in which two HOA frames 249I and 249J are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10L(ii) illustrates the frames 249I and 249J in more detail. As shown in the example of FIG. 10L(ii), frame 249I includes CSID fields 154-154C and VVectorData fields 156 and 156B. The CSID field 154 includes the unitC 267, bb 266 and ba265 along with the ChannelType 269, each of which are set to the corresponding values 01, 1, 0 and 01 shown in the example of FIG. 10J(i). The CSID field 154B includes the unitC 267, bb 266 and ba265 along with the ChannelType 269, each of which are set to the corresponding values 01, 1, 0 and 01 shown in the example of FIG. 10L(ii). The CSID field 154C includes the ChannelType field 269 having a value of 3. Each of the CSID fields 154-154C correspond to the respective one of the transport channels 1, 2 and 3.

In the example of FIG. 10L(ii), the frame 249I includes two vector-based signals (given the ChannelType 269 equal to 1 in the CSID fields 154 and 154B) and an empty (given the ChannelType 269 equal to 3 in the CSID fields 154C). Given the forgoing HOAconfig portion 250H, the audio decoding device 24 may determine that 12 V vector elements are encoded. Hence, the VVectorData 156 and 156B each includes 12 vector elements, each of them uniformly quantized with 8 bits. As noted by the footnote 1, the number and indices of coded VVectorData elements are specified by the parameter CodedVVecLength=0. Moreover, as noted by the single asterisk (*), the coding scheme is signaled by NbitsQ=5 in the CSID field for the corresponding transport channel.

In the frame 249J, the CSID field 154 and 154B are the same as that in frame 249I, while the CSID field 154C of the frame 249F switched to a ChannelType of one. The CSID field 154C of the frame 249B therefore includes the Cbflag 267, the Pflag 267 (indicating Huffman encoding) and Nbits 261 (equal to twelve). As a result, the frame 249F includes a third VVectorData field 156C that includes 12 V vector elements, each of them uniformly quantized with 12 bits and Huffman coded. As noted above, the number and indices of the coded VVectorData elements are specified by the parameter CodedVVecLength=0, while the Huffman coding scheme is signaled by the NbitsQ=12, CbFlag=0 and Pflag=0 in the CSID field 154C for this particular transport channel (e.g., transport channel no. 3).

The example of FIGS. 10M(i) and 10M(ii) illustrate a second example bitstream 248M and accompanying HOA config portion 250M having been generated to correspond with case 2 in the above pseudo-code. In the example of FIG. 10M(i), the HOAconfig portion 250M includes a CodedVVecLength syntax element 256 set to indicate that all elements of a V vector are coded, except for the elements from the zeroth order up to the order specified by MinAmbHoaOrder syntax element 150 (which is equal to $(\text{HoaOrder}+1)^2-(\text{MinAmbHoaOrder}+1)^2=16-4=12$ in this example). The HOAconfig portion 250M also includes a SpatialInterpolationMethod syntax element 255 set to indicate that the interpolation function of the spatio-temporal interpolation is a raised cosine. The HOAconfig portion 250M moreover includes a CodedSpatialInterpolationTime 254 set to indicate an interpolated sample duration of 256.

The HOAconfig portion 250M further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The audio decoding device 24 may also derive a MaxNoOfAddActiveAmbCoeffs syntax element as set to a difference between the NumOfHoaCoeff syntax element and the MinNumOfCoeffsForAmbHOA, which is assumed in this example to equal 16−4 or 12. The audio decoding device 24 may also derive a AmbAsignmBits syntax element as set to ceil(log 2(MaxNoOfAddActiveAmbCoeffs))=ceil(log 2(12))=4. The HOAconfig portion 250M includes an HoaOrder syntax element 152 set to indicate the HOA order of the content to be equal to three (or, in other words, N=3), where the audio decoding device 24 may derive a NumOf-loaCoeffs to be equal to $(N+1)^2$ or 16.

As further shown in the example of FIG. 10M(i), the portion 248M includes a USAC-3D audio frame in which two HOA frames 249K and 249L are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10M(ii) illustrates the frames 249K and 249L in more detail. As shown in the example of FIG. 10M(ii), the frame 249K includes CSID fields 154-154C and a VVectorData field 156. The CSID field 154 includes the CodedAmbCoeffIdx 246, the AmbCoeffIdxTransition 247 (where the double asterisk () indicates that, for flexible transport channel Nr. 1, the decoder's internal state is here assumed to be AmbCoeffIdxTransitionState=2, which results in the CodedAmbCoeffIdx bitfield is signaled or otherwise specified in the bitstream), and the ChannelType 269 (which is equal to two, signaling that the corresponding payload is an additional ambient HOA coefficient). The audio decoding device 24 may derive the AmbCoeffIdx as equal to the CodedAmbCoeffIdx+1+MinNumOfCoeffsForAmbHOA or 5 in this example. The CSID field 154B includes unitC 267, bb 266 and ba265 along with the ChannelType 269, each of which are set to the corresponding values 01, 1, 0 and 01 shown in the example of FIG. 10M(ii). The CSID field 154C includes the ChannelType field 269** having a value of 3.

In the example of FIG. 10M(ii), the frame 249K includes a single vector-based signal (given the ChannelType 269 equal to 1 in the CSID fields 154B) and an empty (given the ChannelType 269 equal to 3 in the CSID fields 154C). Given the forgoing HOAconfig portion 250M, the audio decoding device 24 may determine that 12 V vector elements are encoded. Hence, the VVectorData 156 includes 12 vector elements, each of them uniformly quantized with 8 bits. As noted by the footnote 1, the number and indices of coded VVectorData elements are specified by the parameter CodedVVecLength=0. Moreover, as noted by the footnote 2, the coding scheme is signaled by NbitsQ=5 in the CSID field for the corresponding transport channel.

In the frame 249L, the CSID field 154 includes an AmbCoeffIdxTransition 247 indicating that no transition has occurred and therefore the CodedAmbCoeffIdx 246 may be implied from the previous frame and need not be signaled or otherwise specified again. The CSID field 154B and 154C of the frame 249L are the same as that for the frame 249K and thus, like the frame 249K, the frame 249L includes a single VVectorData field 156, which includes 12 vector elements, each of them uniformly quantized with 8 bits.

FIGS. 10N(i) and 10N(ii) illustrate a first example bitstream 248N and accompanying HOA config portion 250N having been generated to correspond with case 3 in the above pseudo-code. In the example of FIG. 10N(i), the HOAconfig portion 250N includes a CodedVVecLength syntax element 256 set to indicate that all elements of a V vector are coded, except for those elements specified in a ContAddAmbHoaChan syntax element (which is assumed to be zero in this example). The HOAconfig portion 250N also includes a SpatialInterpolationMethod syntax element 255 set to indicate that the interpolation function of the spatio-temporal interpolation is a raised cosine. The HOAconfig portion 250N moreover includes a CodedSpatialInterpolationTime 254 set to indicate an interpolated sample duration of 256. The HOAconfig portion 250N further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The HOAconfig portion 250N includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10N(i), the portion 248N includes a USAC-3D audio frame in which two HOA frames 249M and 249N are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10N(ii) illustrates the frames 249M and 249N in more detail. As shown in the example of FIG. 10N(ii), frame 249M includes CSID fields 154-154C and VVectorData fields 156 and 156B. The CSID field 154 includes the unitC 267, bb 266 and ba265 along with the ChannelType 269, each of which are set to the corresponding values 01, 1, 0 and 01 shown in the example of FIG. 10J(i). The CSID field 154B includes the unitC 267, bb 266 and ba265 along with the ChannelType 269, each of which are set to the corresponding values 01, 1, 0 and 01 shown in the example of FIG. 10N(ii). The CSID field 154C includes the ChannelType field 269 having a value of 3. Each of the CSID fields 154-154C correspond to the respective one of the transport channels 1, 2 and 3.

In the example of FIG. 10N(ii), the frame 249M includes two vector-based signals (given the ChannelType 269 equal to 1 in the CSID fields 154 and 154B) and an empty (given the ChannelType 269 equal to 3 in the CSID fields 154C). Given the forgoing HOAconfig portion 250M, the audio decoding device 24 may determine that 16 V vector elements are encoded. Hence, the VVectorData 156 and 156B each includes 16 vector elements, each of them uniformly quantized with 8 bits. As noted by the footnote 1, the number and indices of coded VVectorData elements are specified by the parameter CodedVVecLength=0. Moreover, as noted by the single asterisk (*), the coding scheme is signaled by NbitsQ=5 in the CSID field for the corresponding transport channel.

In the frame 249N, the CSID field 154 and 154B are the same as that in frame 249M, while the CSID field 154C of the frame 249F switched to a ChannelType of one. The CSID field 154C of the frame 249B therefore includes the Cbflag 267, the Pflag 267 (indicating Huffman encoding) and Nbits 261 (equal to twelve). As a result, the frame 249F includes a third VVectorData field 156C that includes 16 V vector elements, each of them uniformly quantized with 12 bits and Huffman coded. As noted above, the number and indices of the coded VVectorData elements are specified by the parameter CodedVVecLength=0, while the Huffman coding scheme is signaled by the NbitsQ=12, CbFlag=0 and Pflag=0 in the CSID field 154C for this particular transport channel (e.g., transport channel no. 3).

The example of FIGS. 10O(i) and 10O(ii) illustrate a second example bitstream 248O and accompanying HOA config portion 250O having been generated to correspond with case 3 in the above pseudo-code. In the example of FIG. 10O(i), the HOAconfig portion 250O includes a CodedVVecLength syntax element 256 set to indicate that all elements of a V vector are coded, except for those elements specified in a ContAddAmbHoaChan syntax element (which is assumed to be one in this example). The HOAconfig portion 250O also includes a SpatialInterpolationMethod syntax element 255 set to indicate that the interpolation function of the spatio-temporal interpolation is a raised cosine. The HOAconfig portion 250O moreover includes a CodedSpatialInterpolationTime 254 set to indicate an interpolated sample duration of 256.

The HOAconfig portion 250O further includes a MinAmbHoaOrder syntax element 150 set to indicate that the MinimumHOA order of the ambient HOA content is one, where the audio decoding device 24 may derive a MinNumofCoeffsForAmbHOA syntax element to be equal to $(1+1)^2$ or four. The audio decoding device 24 may also derive a MaxNoOfAddActiveAmbCoeffs syntax element as set to a difference between the NumOfHoaCoeff syntax element and the MinNumOfCoeffsForAmbHOA, which is assumed in this example to equal 16−4 or 12. The audio decoding device 24 may also derive a AmbAsignmBits syntax element as set to ceil(log 2(MaxNoOfAddActiveAmbCoeffs))=ceil(log 2(12))=4. The HOAconfig portion 250O includes an HoaOrder syntax element 152 set to indicate the HOA order of the content to be equal to three (or, in other words, N=3), where the audio decoding device 24 may derive a NumOfHoaCoeffs to be equal to $(N+1)^2$ or 16.

As further shown in the example of FIG. 10O(i), the portion 248O includes a USAC-3D audio frame in which two HOA frames 249O and 249P are stored in a USAC extension payload given that two audio frames are stored within one USAC-3D frame when spectral band replication (SBR) is enabled. The audio decoding device 24 may derive a number of flexible transport channels as a function of a numHOATransportChannels syntax element and a MinNumOfCoeffsForAmbHOA syntax element. In the following examples, it is assumed that the numHOATransportChannels syntax element is equal to 7 and the MinNumOfCoeffsForAmbHOA syntax element is equal to four, where number of flexible transport channels is equal to the numHOATransportChannels syntax element minus the MinNumOfCoeffsForAmbHOA syntax element (or three).

FIG. 10O(ii) illustrates the frames 249O and 249P in more detail. As shown in the example of FIG. 10O(ii), the frame 249O includes CSID fields 154-154C and a VVectorData field 156. The CSID field 154 includes the CodedAmbCoeffIdx 246, the AmbCoeffIdxTransition 247 (where the double asterisk () indicates that, for flexible transport channel Nr. 1, the decoder's internal state is here assumed to be AmbCoeffIdxTransitionState=2, which results in the CodedAmbCoeffIdx bitfield is signaled or otherwise specified in the bitstream), and the ChannelType 269 (which is equal to two, signaling that the corresponding payload is an additional ambient HOA coefficient). The audio decoding device 24 may derive the AmbCoeffIdx as equal to the CodedAmbCoeffIdx+1+MinNumOfCoeffsForAmbHOA or 5 in this example. The CSID field 154B includes unitC 267, bb 266 and ba265 along with the ChannelType 269, each of which are set to the corresponding values 01, 1, 0 and 01 shown in the example of FIG. 10O(ii). The CSID field 154C includes the ChannelType field 269** having a value of 3.

In the example of FIG. 10O(ii), the frame 249O includes a single vector-based signal (given the ChannelType 269 equal to 1 in the CSID fields 154B) and an empty (given the ChannelType 269 equal to 3 in the CSID fields 154C). Given the forgoing HOAconfig portion 250O, the audio decoding device 24 may determine that 16 minus the one specified by the ContAddAmbHoaChan syntax element (e.g., where the vector element associated with an index of 6 is specified as the ContAddAmbHoaChan syntax element) or 15 V vector elements are encoded. Hence, the VVectorData 156 includes 15 vector elements, each of them uniformly quantized with 8 bits. As noted by the footnote 1, the number and indices of coded VVectorData elements are specified by the parameter CodedVVecLength=0. Moreover, as noted by the footnote 2, the coding scheme is signaled by NbitsQ=5 in the CSID field for the corresponding transport channel.

In the frame 249P, the CSID field 154 includes an AmbCoeffIdxTransition 247 indicating that no transition has occurred and therefore the CodedAmbCoeffIdx 246 may be implied from the previous frame and need not be signaled or otherwise specified again. The CSID field 154B and 154C of the frame 249P are the same as that for the frame 249O and thus, like the frame 249O, the frame 249P includes a single VVectorData field 156, which includes 15 vector elements, each of them uniformly quantized with 8 bits.

Figure 11A:
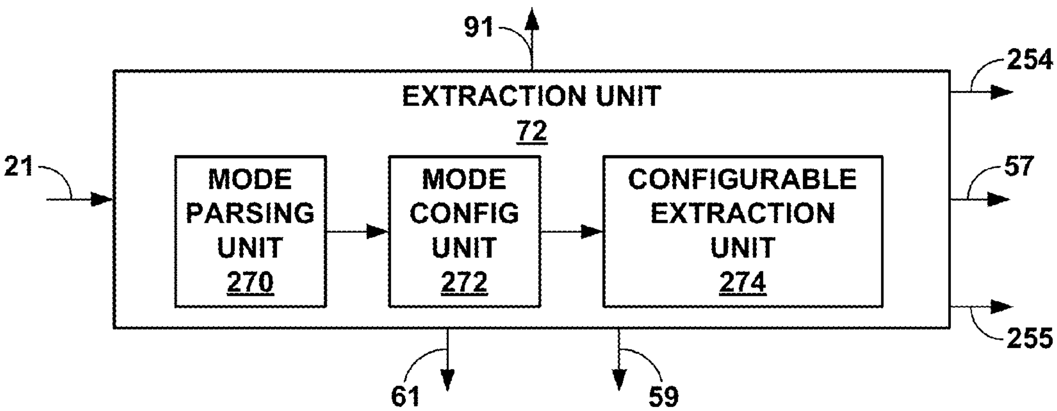
FIGS. 11A-11G are block diagrams illustrating, in more detail, various units of the audio decoding device shown in the example of FIG. 5.

FIGS. 11A-11G are block diagrams illustrating, in more detail, various units of the audio decoding device 24 shown in the example of FIG. 5. FIG. 11A is a block diagram illustrating, in more detail, the extraction unit 72 of the audio decoding device 24. As shown in the example of FIG. 11A, the extraction unit 72 may include a mode parsing unit 270, a mode configuration unit 272 ("mode config unit 272"), and a configurable extraction unit 274.

The mode parsing unit 270 may represent a unit configured to parse the above noted syntax element indicative of a coding mode (e.g., the ChannelType syntax element shown in the example of FIG. 10E) used to encode the HOA coefficients 11 so as to form bitstream 21. The mode parsing unit 270 may pass the determine syntax element to the mode configuration unit 272. The mode configuration unit 272 may represent a unit configured to configure the configurable extraction unit 274 based on the parsed syntax element. The mode configuration unit 272 may configure the configurable extraction unit 274 to extract a direction-based coded representation of the HOA coefficients 11 from the bitstream 21 or extract a vector-based coded representation of the HOA coefficients 11 from the bitstream 21 based on the parsed syntax element.

When a directional-based encoding was performed, the configurable extraction unit 274 may extract the directional-based version of the HOA coefficients 11 and the syntax elements associated with this encoded version (which is denoted as direction-based information 91 in the example of FIG. 11A). This direction-based information 91 may include the directional info 253 shown in the example of FIG. 10D and direction-based SideChannelInfoData shown in the example of FIG. 10E as defined by a ChannelType equal to zero.

When the syntax element indicates that the HOA coefficients 11 were encoded using a vector-based synthesis (e.g., when the ChannelType syntax element is equal to one), the configurable extraction unit 274 may extract the coded foreground V[k] vectors 57, the encoded ambient HOA coefficients 59 and the encoded nFG signals 59. The configurable extraction unit 274 may also, upon determining that the syntax element indicates that the HOA coefficients 11 were encoded using a vector-based synthesis, extract the CodedSpatialInterpolationTime syntax element 254 and the SpatialInterpolationMethod syntax element 255 from the bitstream 21, passing these syntax elements 254 and 255 to the spatio-temporal interpolation unit 76.

Figure 11B:
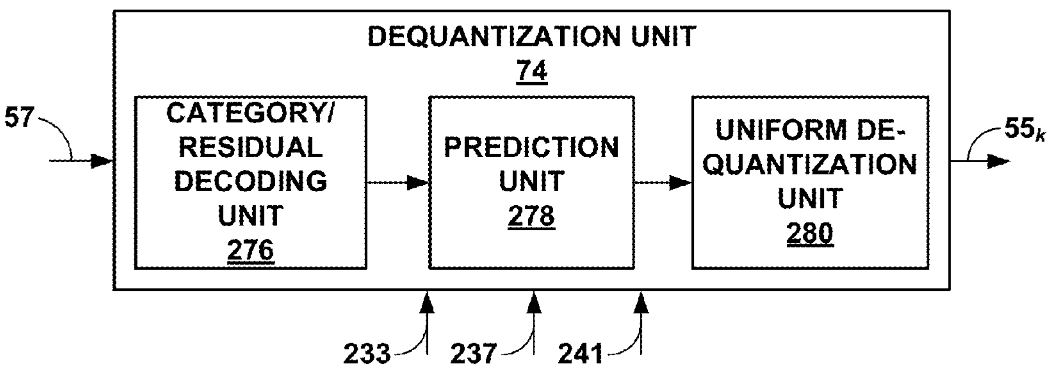

FIG. 11B is a block diagram illustrating, in more detail, the quantization unit 74 of the audio decoding device 24 shown in the example of FIG. 5. The quantization unit 74 may represent a unit configured to operate in a manner reciprocal to the quantization unit 52 shown in the example of FIG. 4 so as to entropy decode and dequantize the coded foreground V[k] vectors 57 and thereby generate reduced foreground V[k] vectors $\mathbf{55}_k$. The scalar/entropy dequantization unit 984 may include a category/residual decoding unit 276, a prediction unit 278 and a uniform dequantization unit 280.

The category/residual decoding unit 276 may represent a unit configured to perform Huffman decoding with respect to the coded foreground V[k] vectors 57 using the Huffman table identified by the Huffman table information 241 (which is, as noted above, expressed as a syntax element in the bitstream 21). The category/residual decoding unit 276 may output quantized foreground V[k] vectors to the prediction unit 278. The prediction unit 278 may represent a unit configured to perform prediction with respect to the quantized foreground V[k] vectors based on the prediction mode 237, outputting augmented quantized foreground V[k] vectors to the uniform dequantization unit 280. The uniform dequantization unit 280 may represent a unit configured to perform dequantization with respect to the augmented quantized foreground V[k] vectors based on the nbits value 233, outputting the reduced foreground V[k] vectors $\mathbf{55}_k$.

Figure 11C:
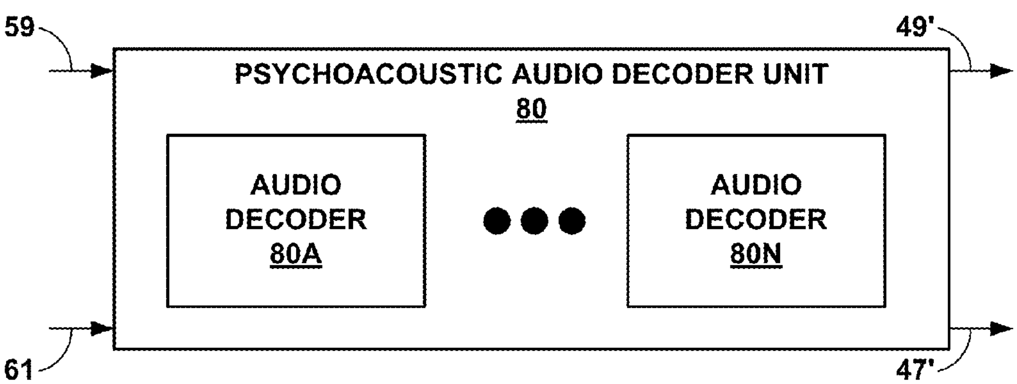

FIG. 11C is a block diagram illustrating, in more detail, the psychoacoustic decoding unit 80 of the audio decoding device 24 shown in the example of FIG. 5. As noted above, the psychoacoustic decoding unit 80 may operate in a manner reciprocal to the psychoacoustic audio coding unit 40 shown in the example of FIG. 4 so as to decode the encoded ambient HOA coefficients 59 and the encoded nFG signals 61 and thereby generate energy compensated ambient HOA coefficients 47' and the interpolated nFG signals 49' (which may also be referred to as interpolated nFG audio objects 49'). The psychoacoustic decoding unit 80 may pass the energy compensated ambient HOA coefficients 47' to HOA coefficient formulation unit 82 and the nFG signals 49' to the reorder 84. The psychoacoustic decoding unit 80 may include a plurality of audio decoders 80-80N similar to the psychoacoustic audio coding unit 40. The audio decoders 80-80N may be instantiated by or otherwise included within the psychoacoustic audio coding unit 40 in sufficient quantity to support, as noted above, concurrent decoding of each channel of the background HOA coefficients 47' and each signal of the nFG signals 49'.

Figure 11D:
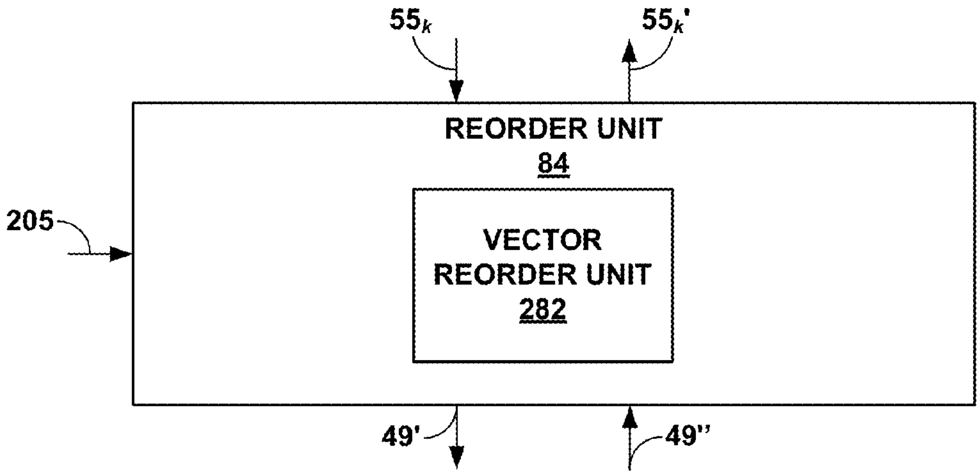

FIG. 11D is a block diagram illustrating, in more detail, the reorder unit 84 of the audio decoding device 24 shown in the example of FIG. 5. The reorder unit 84 may represent a unit configured to operate in a manner similar reciprocal to that described above with respect to the reorder unit 34. The reorder unit 84 may include a vector reorder unit 282, which may represent a unit configured to receive syntax elements 205 indicative of the original order of the foreground components of the HOA coefficients 11. The extraction unit 72 may parse these syntax elements 205 from the bitstream 21 and pass the syntax element 205 to the reorder unit 84. The vector reorder unit 282 may, based on these reorder syntax elements 205, reorder the interpolated nFG signals 49' and the reduced foreground V[k] vectors $\mathbf{55}_k$ to generate reordered nFG signals 49'' and reordered foreground V[k] vectors $\mathbf{55}_k'$. The reorder unit 84 may output the reordered nFG signals 49'' to the foreground formulation unit 78 and the reordered foreground V[k] vectors $\mathbf{55}_k'$ to the spatio-temporal interpolation unit 76.

Figure 11E:
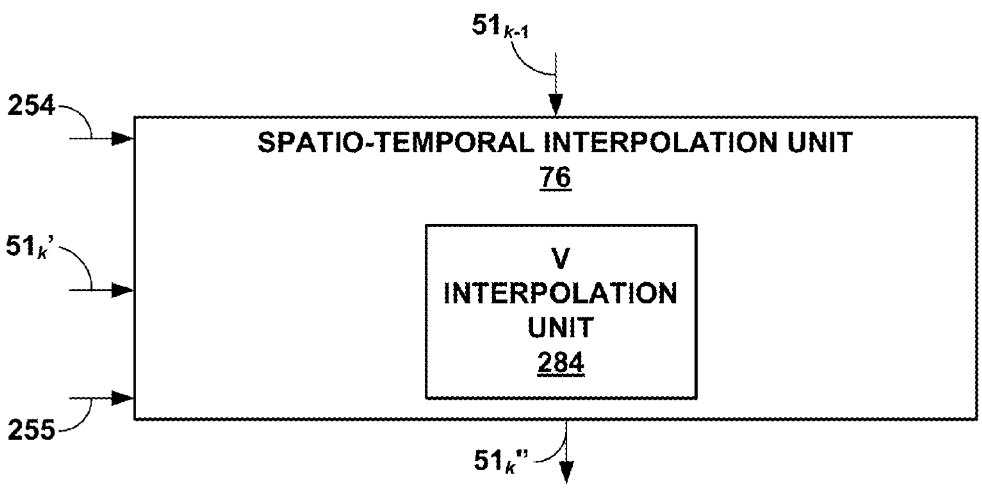

FIG. 11E is a block diagram illustrating, in more detail, the spatio-temporal interpolation unit 76 of the audio decoding device 24 shown in the example of FIG. 5. The spatio-temporal interpolation unit 76 may operate in a manner similar to that described above with respect to the spatio-temporal interpolation unit 50. The spatio-temporal interpolation unit 76 may include a V interpolation unit 284, which may represent a unit configured to receive the reordered foreground V[k] vectors $\mathbf{55}_k'$ and perform the spatio-temporal interpolation with respect to the reordered foreground V[k] vectors $\mathbf{55}_k'$ and reordered foreground V[k−1] vectors $\mathbf{55}_{k-1}'$ to generate interpolated foreground V[k] vectors $\mathbf{55}_k''$. The V interpolation unit 284 may perform interpolation based on the CodedSpatialInterpolationTime syntax element 254 and the SpatialInterpolationMethod syntax element 255. In some examples, the V interpolation unit 285 may interpolate the V vectors over the duration specified by the CodedSpatialInterpolationTime syntax element 254 using the type of interpolation identified by the SpatialInterpolationMethod syntax element 255. The spatio-temporal interpolation unit 76 may forward the interpolated foreground V[k] vectors $\mathbf{55}_k''$ to the foreground formulation unit 78.

Figure 11F:
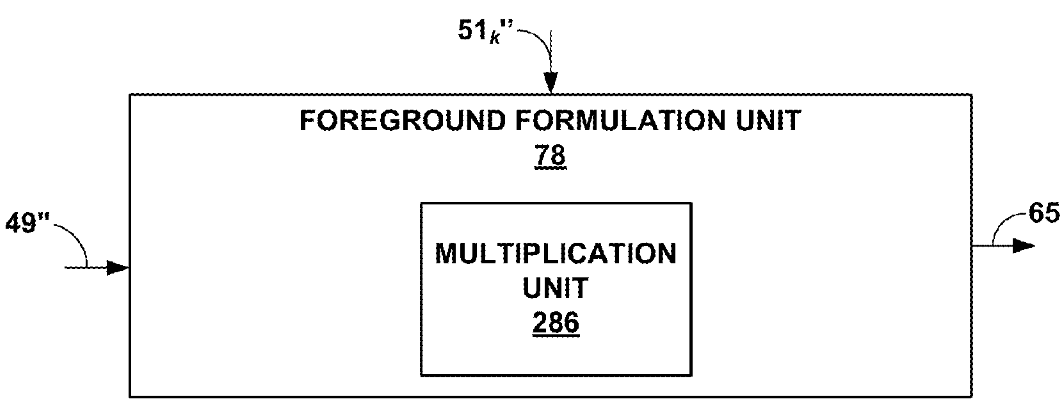

FIG. 11F is a block diagram illustrating, in more detail, the foreground formulation unit 78 of the audio decoding device 24 shown in the example of FIG. 5. The foreground formulation unit 78 may include a multiplication unit 286, which may represent a unit configured to perform matrix multiplication with respect to the interpolated foreground V[k] vectors 55'' and the reordered nFG signals 49'' to generate the foreground HOA coefficients 65.

Figure 11G:
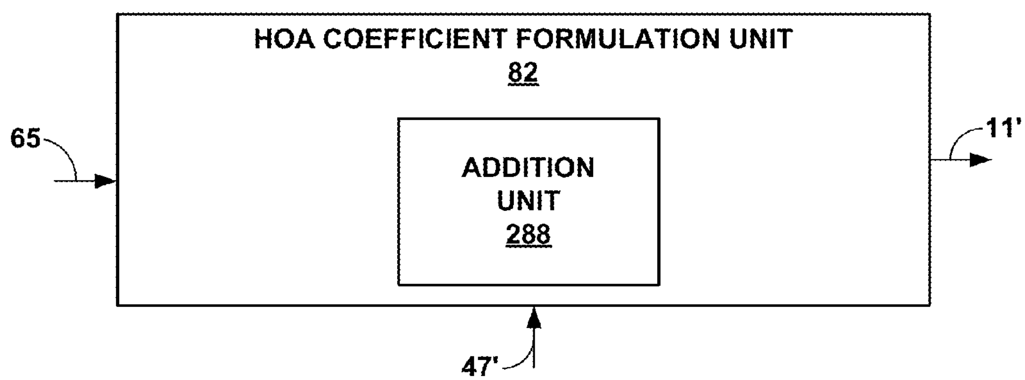

FIG. 11G is a block diagram illustrating, in more detail, the HOA coefficient formulation unit 82 of the audio decoding device 24 shown in the example of FIG. 5. The HOA coefficient formulation unit 82 may include an addition unit 288, which may represent a unit configured to add the foreground HOA coefficients 65 to the ambient HOA channels 47' so as to obtain the HOA coefficients 11'.

Figure 12:
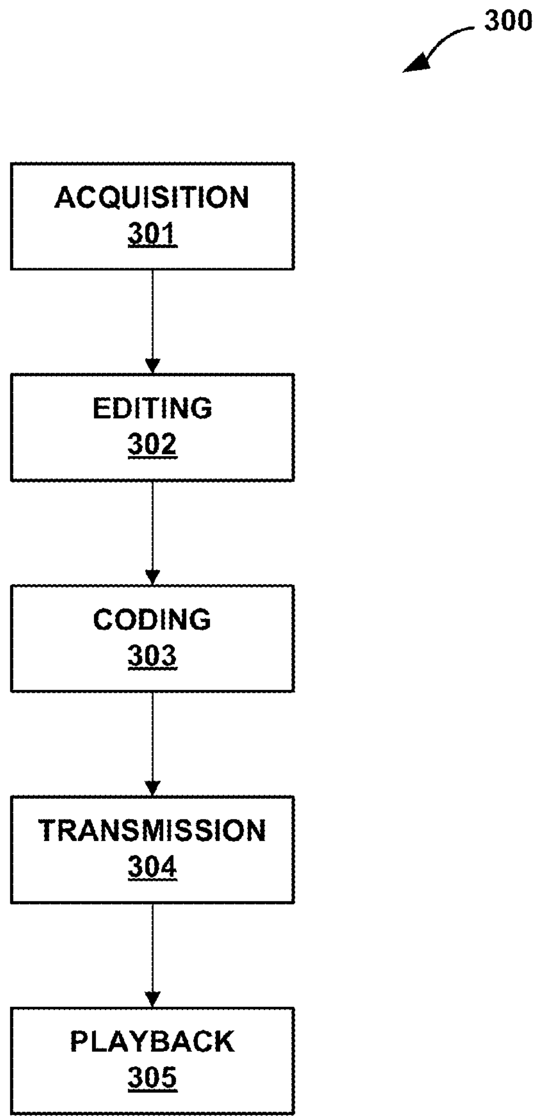
FIG. 12 is a diagram illustrating an example audio ecosystem that may perform various aspects of the techniques described in this disclosure.

FIG. 12 is a diagram illustrating an example audio ecosystem that may perform various aspects of the techniques described in this disclosure. As illustrated in FIG. 12, audio ecosystem 300 may include acquisition 301, editing 302, coding, 303, transmission 304, and playback 305.

Acquisition 301 may represent the techniques of audio ecosystem 300 where audio content is acquired. Examples of acquisition 301 include, but are not limited to recording sound (e.g., live sound), audio generation (e.g., audio objects, foley production, sound synthesis, simulations), and the like. In some examples, sound may be recorded at concerts, sporting events, and when conducting surveillance. In some examples, audio may be generated when performing simulations, and authored/mixing (e.g., moves, games). Audio objects may be as used in Hollywood (e.g., IMAX studios). In some examples, acquisition 301 may be performed by a content creator, such as content creator 12 of FIG. 3.

Figure 29:
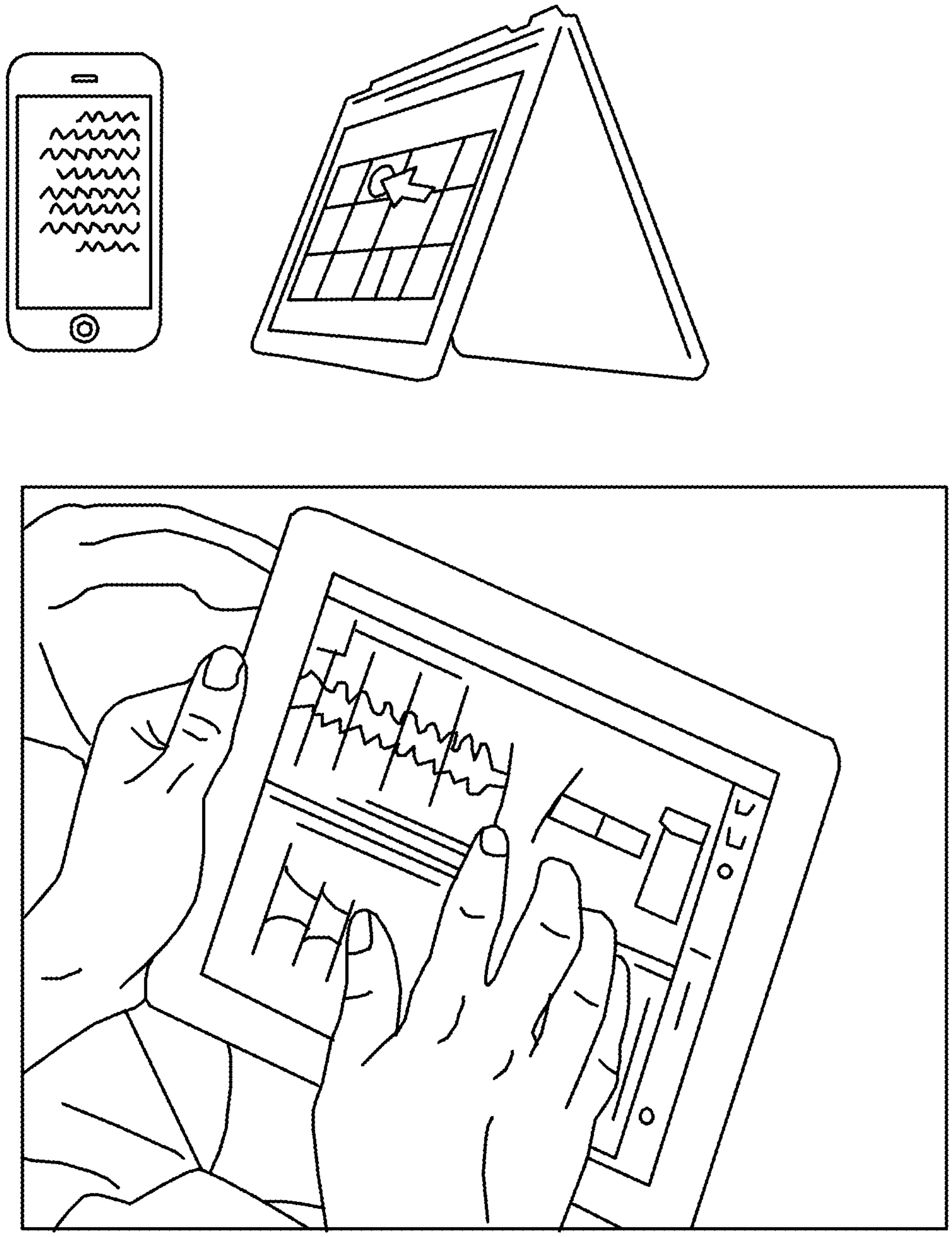
FIG. 29 is a diagram illustrating a plurality of mobile devices which may be used to acquire and/or edit a 3D soundfield in accordance with one or more techniques described in this disclosure.

Editing 302 may represent the techniques of audio ecosystem 300 where the audio content is edited and/or modified. As one example, the audio content may be edited by combining multiple units of audio content into a single unit of audio content. As another example, the audio content may be edited by adjusting the actual audio content (e.g., adjusting the levels of one or more frequency components of the audio content). In some examples, editing 302 may be performed by an audio editing system, such as audio editing system 18 of FIG. 3. In some examples, editing 302 may be performed on a mobile device, such as one or more of the mobile devices illustrated in FIG. 29.

Coding, 303 may represent the techniques of audio ecosystem 300 where the audio content is coded in to a representation of the audio content. In some examples, the representation of the audio content may be a bitstream, such as bitstream 21 of FIG. 3. In some examples, coding 302 may be performed by an audio encoding device, such as audio encoding device 20 of FIG. 3.

Transmission 304 may represent the elements of audio ecosystem 300 where the audio content is transported from a content creator to a content consumer. In some examples, the audio content may be transported in real-time or near real-time. For instance, the audio content may be streamed to the content consumer. In some examples, the audio content may be transported by coding the audio content onto a media, such as a computer-readable storage medium. For instance, the audio content may be stored on a disc, drive, and the like (e.g., a blu-ray disk, a memory card, a hard drive, etc.)

Playback 305 may represent the techniques of audio ecosystem 300 where the audio content is rendered and played back to the content consumer. In some examples, playback 305 may include rendering a 3D soundfield based on one or more aspects of a playback environment. In other words, playback 305 may be based on a local acoustic landscape.

Figure 13:
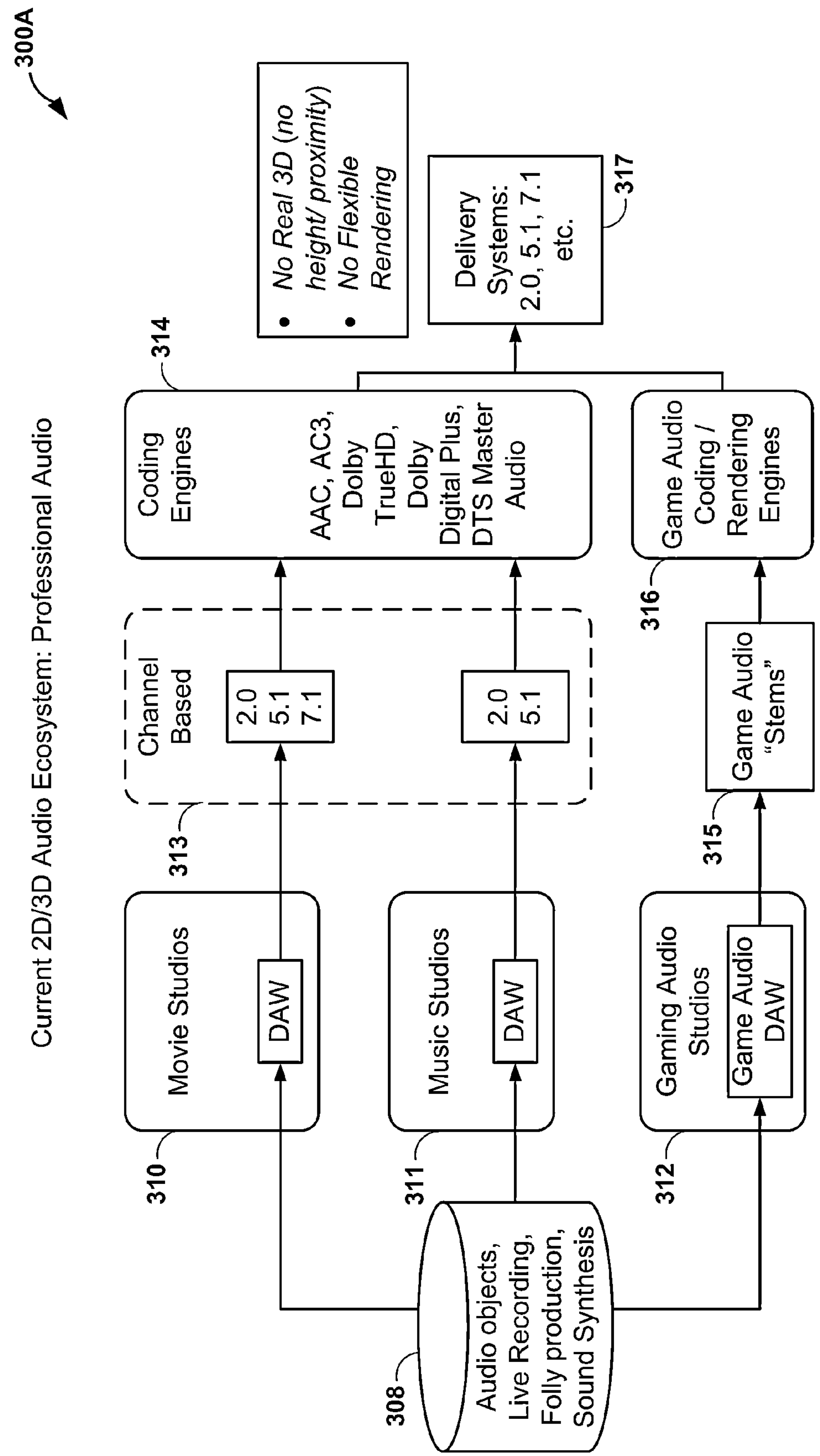
FIG. 13 is a diagram illustrating one example of the audio ecosystem of FIG. 12 in more detail.
Figure 26:
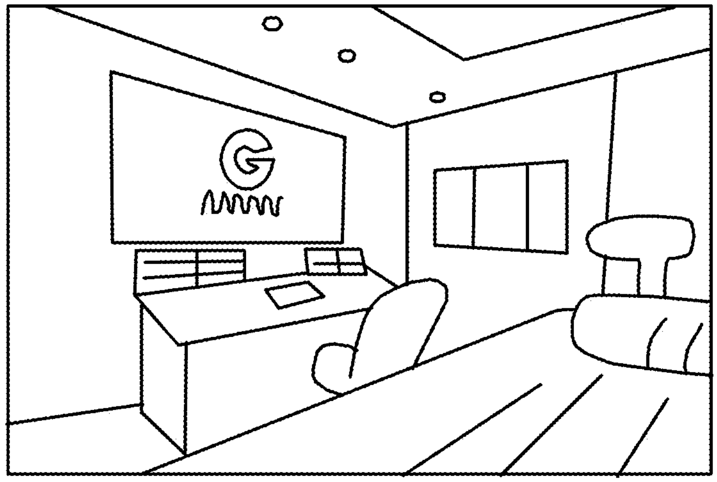
FIG. 26 is a diagram illustrating an example game studio in accordance with one or more techniques described in this disclosure.
Figure 27:
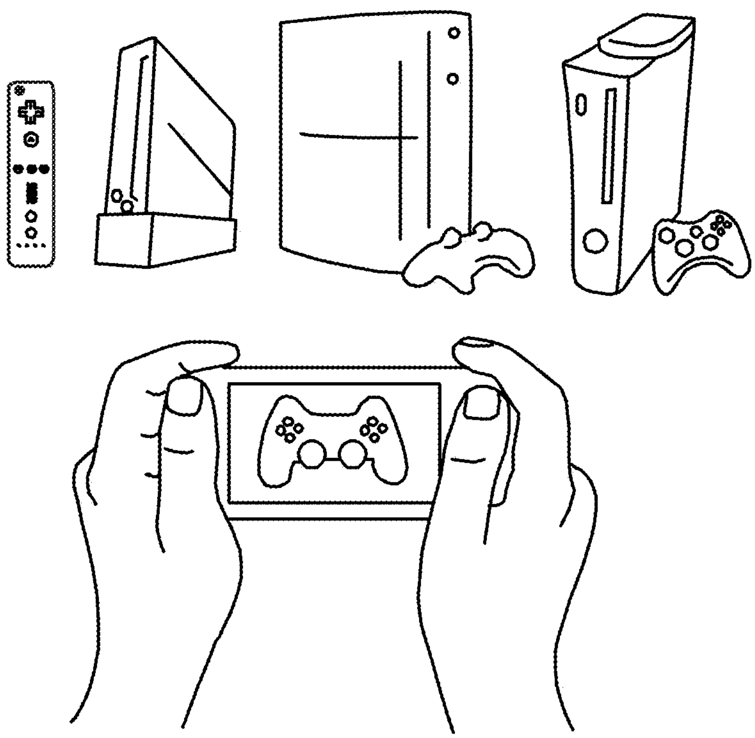
FIG. 27 is a diagram illustrating a plurality game systems which include rendering engines in accordance with one or more techniques described in this disclosure.

FIG. 13 is a diagram illustrating one example of the audio ecosystem of FIG. 12 in more detail. As illustrated in FIG. 13, audio ecosystem 300 may include audio content 308, movie studios 310, music studios 311, gaming audio studios 312, channel based audio content 313, coding engines 314, game audio stems 315, game audio coding/rendering engines 316, and delivery systems 317. An example gaming audio studio 312 is illustrated in FIG. 26. Some example game audio coding/rendering engines 316 are illustrated in FIG. 27.

As illustrated by FIG. 13, movie studios 310, music studios 311, and gaming audio studios 312 may receive audio content 308. In some example, audio content 308 may represent the output of acquisition 301 of FIG. 12. Movie studios 310 may output channel based audio content 313 (e.g., in 2.0, 5.1, and 7.1) such as by using a digital audio workstation (DAW). Music studios 310 may output channel based audio content 313 (e.g., in 2.0, and 5.1) such as by using a DAW. In either case, coding engines 314 may receive and encode the channel based audio content 313 based one or more codecs (e.g., AAC, AC3, Dolby True HD, Dolby Digital Plus, and DTS Master Audio) for output by delivery systems 317. In this way, coding engines 314 may be an example of coding 303 of FIG. 12. Gaming audio studios 312 may output one or more game audio stems 315, such as by using a DAW. Game audio coding/rendering engines 316 may code and or render the audio stems 315 into channel based audio content for output by delivery systems 317. In some examples, the output of movie studios 310, music studios 311, and gaming audio studios 312 may represent the output of editing 302 of FIG. 12. In some examples, the output of coding engines 314 and/or game audio coding/rendering engines 316 may be transported to delivery systems 317 via the techniques of transmission 304 of FIG. 12.

Figure 14:
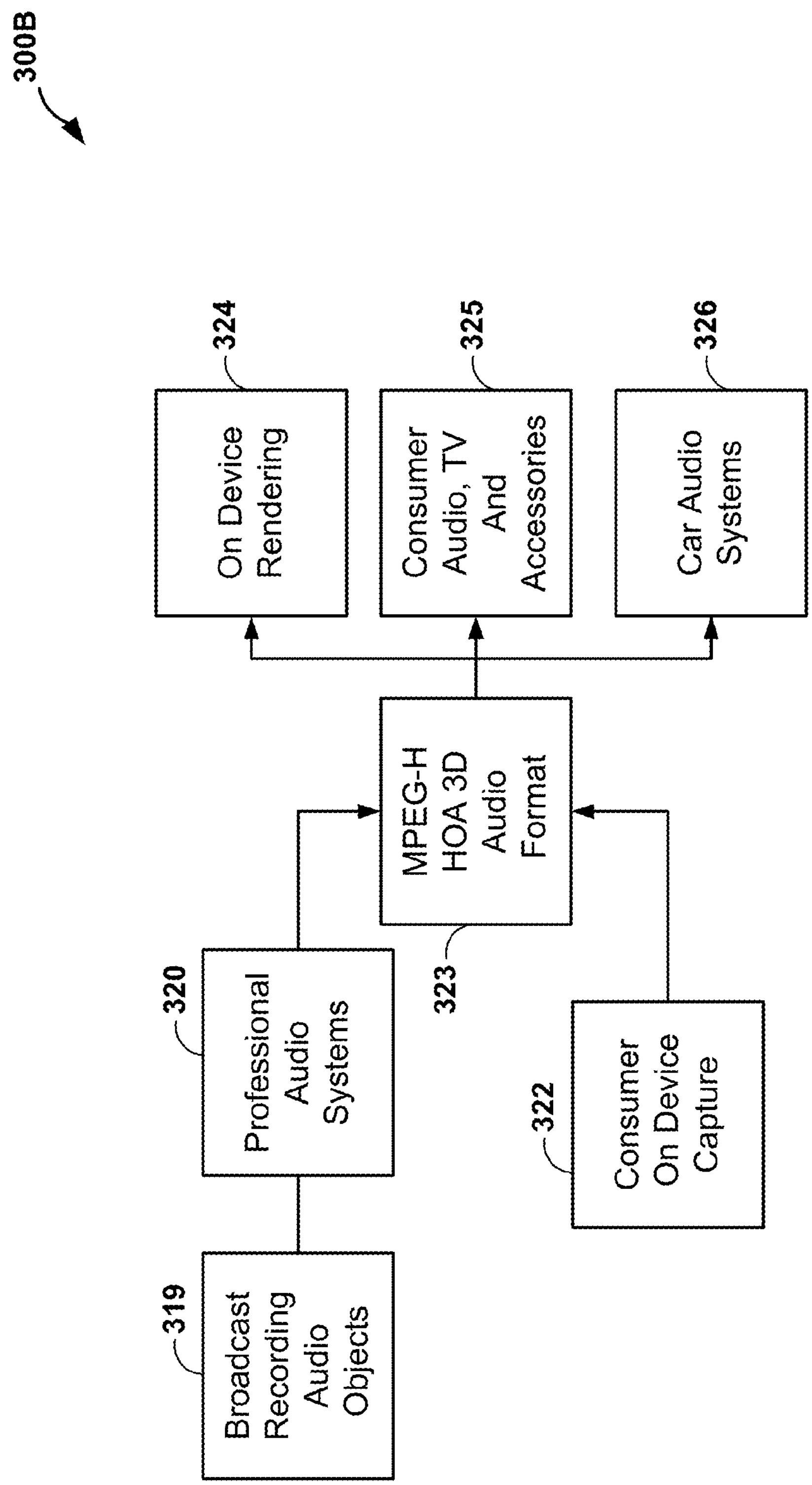
FIG. 14 is a diagram illustrating one example of the audio ecosystem of FIG. 12 in more detail.

FIG. 14 is a diagram illustrating another example of the audio ecosystem of FIG. 12 in more detail. As illustrated in FIG. 14, audio ecosystem 300B may include broadcast recording audio objects 319, professional audio systems 320, consumer on-device capture 322, HOA audio format 323, on-device rendering 324, consumer audio, TV, and accessories 325, and car audio systems 326.

As illustrated in FIG. 14, broadcast recording audio objects 319, professional audio systems 320, and consumer on-device capture 322 may all code their output using HOA audio format 323. In this way, the audio content may be coded using HOA audio format 323 into a single representation that may be played back using on-device rendering 324, consumer audio, TV, and accessories 325, and car audio systems 326. In other words, the single representation of the audio content may be played back at a generic audio playback system (i.e., as opposed to requiring a particular configuration such as 5.1, 7.1, etc.).

Figure 15A:
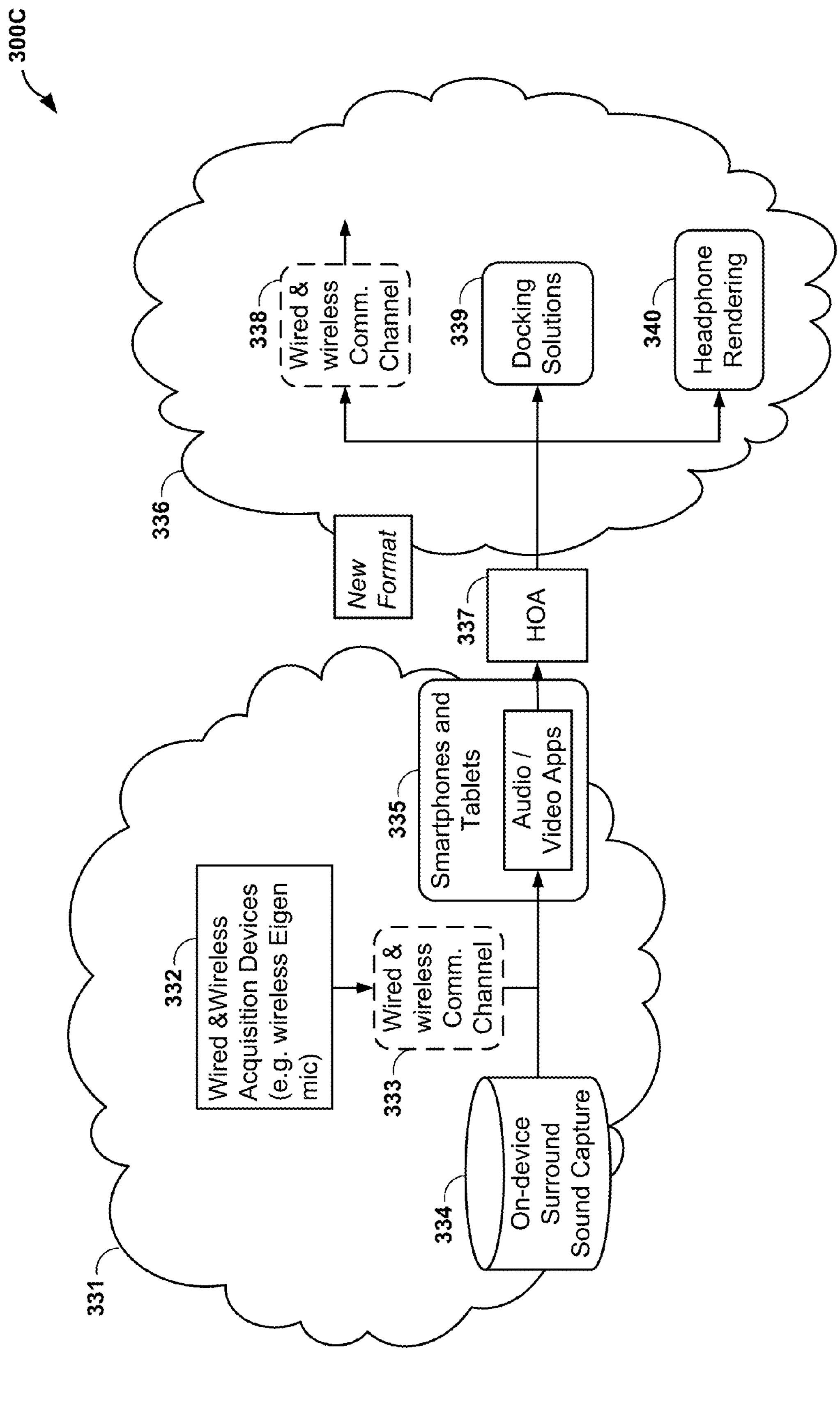
FIGS. 15A and 15B are diagrams illustrating other examples of the audio ecosystem of FIG. 12 in more detail.
Figure 15B:
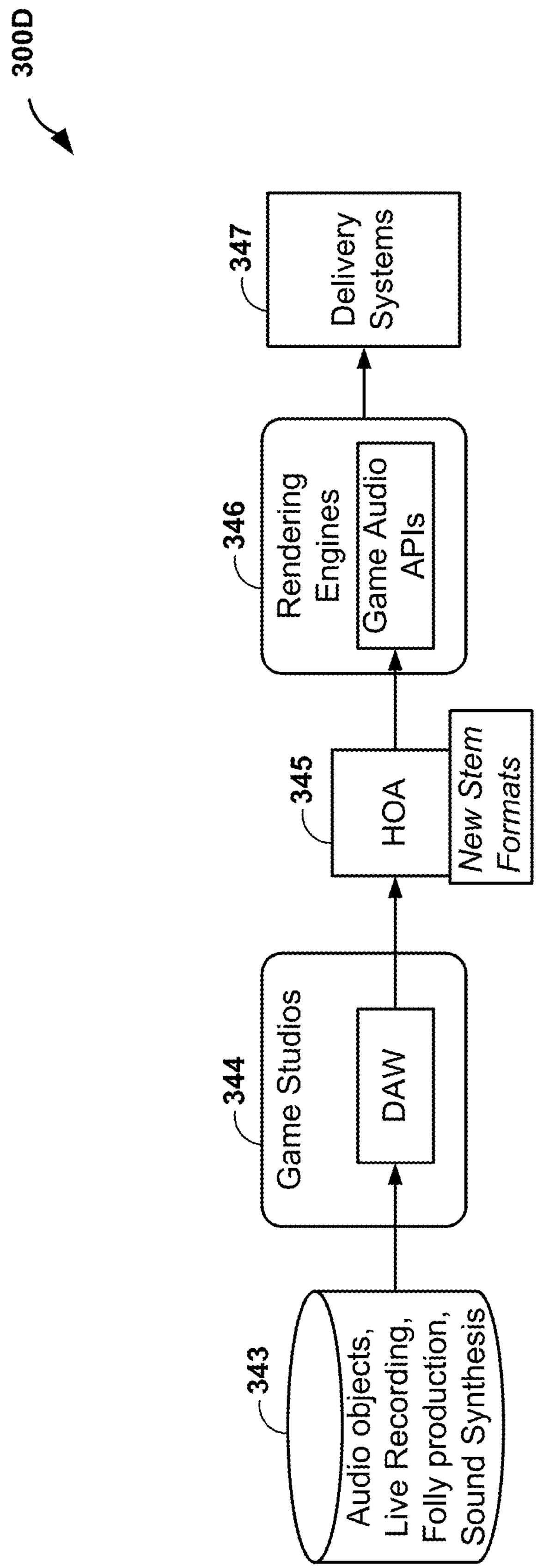

FIGS. 15A and 15B are diagrams illustrating other examples of the audio ecosystem of FIG. 12 in more detail. As illustrated in FIG. 15A, audio ecosystem 300C may include acquisition elements 331, and playback elements 336. Acquisition elements 331 may include wired and/or wireless acquisition devices 332 (e.g., Eigen microphones), on-device surround sound capture 334, and mobile devices 335 (e.g., smartphones and tablets). In some examples, wired and/or wireless acquisition devices 332 may be coupled to mobile device 335 via wired and/or wireless communication channel(s) 333.

In accordance with one or more techniques of this disclosure, mobile device 335 may be used to acquire a soundfield. For instance, mobile device 335 may acquire a soundfield via wired and/or wireless acquisition devices 332 and/or on-device surround sound capture 334 (e.g., a plurality of microphones integrated into mobile device 335). Mobile device 335 may then code the acquired soundfield into HOAs 337 for playback by one or more of playback elements 336. For instance, a user of mobile device 335 may record (acquire a soundfield of) a live event (e.g., a meeting, a conference, a play, a concert, etc.), and code the recording into HOAs.

Mobile device 335 may also utilize one or more of playback elements 336 to playback the HOA coded soundfield. For instance, mobile device 335 may decode the HOA coded soundfield and output a signal to one or more of playback elements 336 that causes the one or more of playback elements 336 to recreate the soundfield. As one example, mobile device 335 may utilize wireless and/or wireless communication channels 338 to output the signal to one or more speakers (e.g., speaker arrays, sound bars, etc.). As another example, mobile device 335 may utilize docking solutions 339 to output the signal to one or more docking stations and/or one or more docked speakers (e.g., sound systems in smart cars and/or homes). As another example, mobile device 335 may utilize headphone rendering 340 to output the signal to a set of headphones, e.g., to create realistic binaural sound.

In some examples, a particular mobile device 335 may both acquire a 3D soundfield and playback the same 3D soundfield at a later time. In some examples, mobile device 335 may acquire a 3D soundfield, encode the 3D soundfield into HOA, and transmit the encoded 3D soundfield to one or more other devices (e.g., other mobile devices and/or other non-mobile devices) for playback.

As illustrated in FIG. 15B, audio ecosystem 300D may include audio content 343, game studios 344, coded audio content 345, rendering engines 346, and delivery systems 347. In some examples, game studios 344 may include one or more DAWs which may support editing of HOA signals. For instance, the one or more DAWs may include HOA plugins and/or tools which may be configured to operate with (e.g., work with) one or more game audio systems. In some examples, game studios 344 may output new stem formats that support HOA. In any case, game studios 344 may output coded audio content 345 to rendering engines 346 which may render a soundfield for playback by delivery systems 347.

Figure 16:
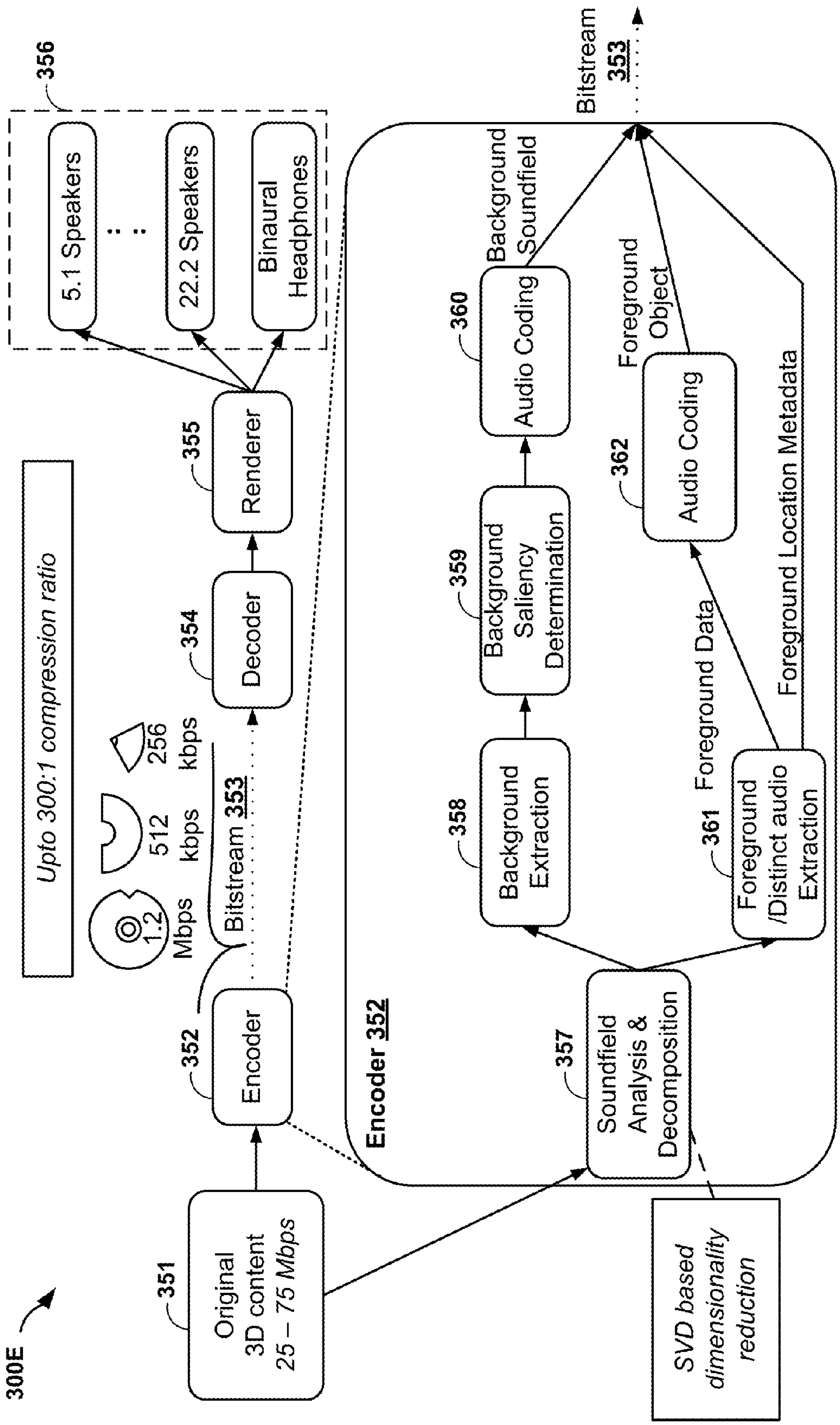
FIG. 16 is a diagram illustrating an example audio encoding device that may perform various aspects of the techniques described in this disclosure.

FIG. 16 is a diagram illustrating an example audio encoding device that may perform various aspects of the techniques described in this disclosure. As illustrated in FIG. 16, audio ecosystem 300E may include original 3D audio content 351, encoder 352, bitstream 353, decoder 354, renderer 355, and playback elements 356. As further illustrated by FIG. 16., encoder 352 may include soundfield analysis and decomposition 357, background extraction 358, background saliency determination 359, audio coding 360, foreground/distinct audio extraction 361, and audio coding 362. In some examples, encoder 352 may be configured to perform operations similar to audio encoding device 20 of FIGS. 3 and 4. In some examples, soundfield analysis and decomposition 357 may be configured to perform operations similar to soundfield analysis unit 44 of FIG. 4. In some examples, background extraction 358 and background saliency determination 359 may be configured to perform operations similar to BG selection unit 48 of FIG. 4. In some examples, audio coding 360 and audio coding 362 may be configured to perform operations similar to psychoacoustic audio coder unit 40 of FIG. 4. In some examples, foreground/distinct audio extraction 361 may be configured to perform operations similar to foreground selection unit 36 of FIG. 4.

In some examples, foreground/distinct audio extraction 361 may analyze audio content corresponding to video frame 390 of FIG. 33. For instance, foreground/distinct audio extraction 361 may determine that audio content corresponding to regions 391A-391C is foreground audio.

Figure 17:
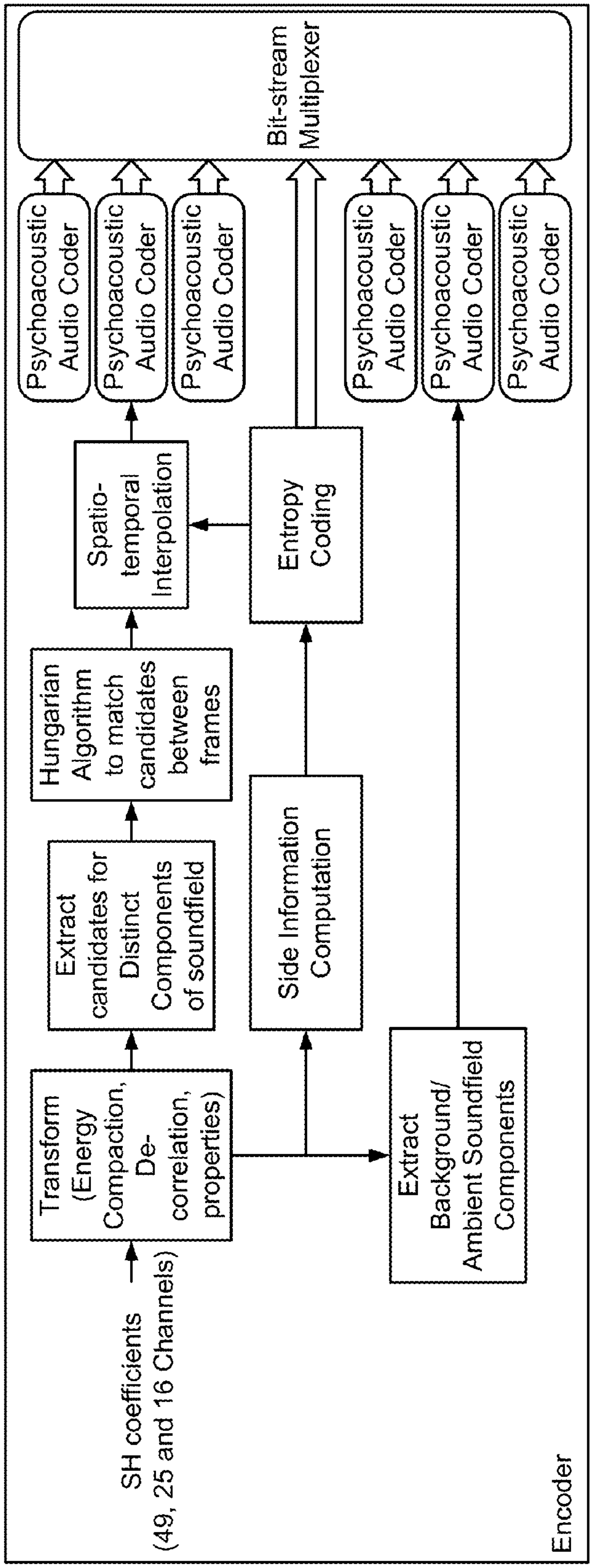
FIG. 17 is a diagram illustrating one example of the audio encoding device of FIG. 16 in more detail.

As illustrated in FIG. 16, encoder 352 may be configured to encode original content 351, which may have a bitrate of 25-75 Mbps, into bitstream 353, which may have a bitrate of 256 kbps-1.2 Mbps. FIG. 17 is a diagram illustrating one example of the audio encoding device of FIG. 16 in more detail.

Figure 18:
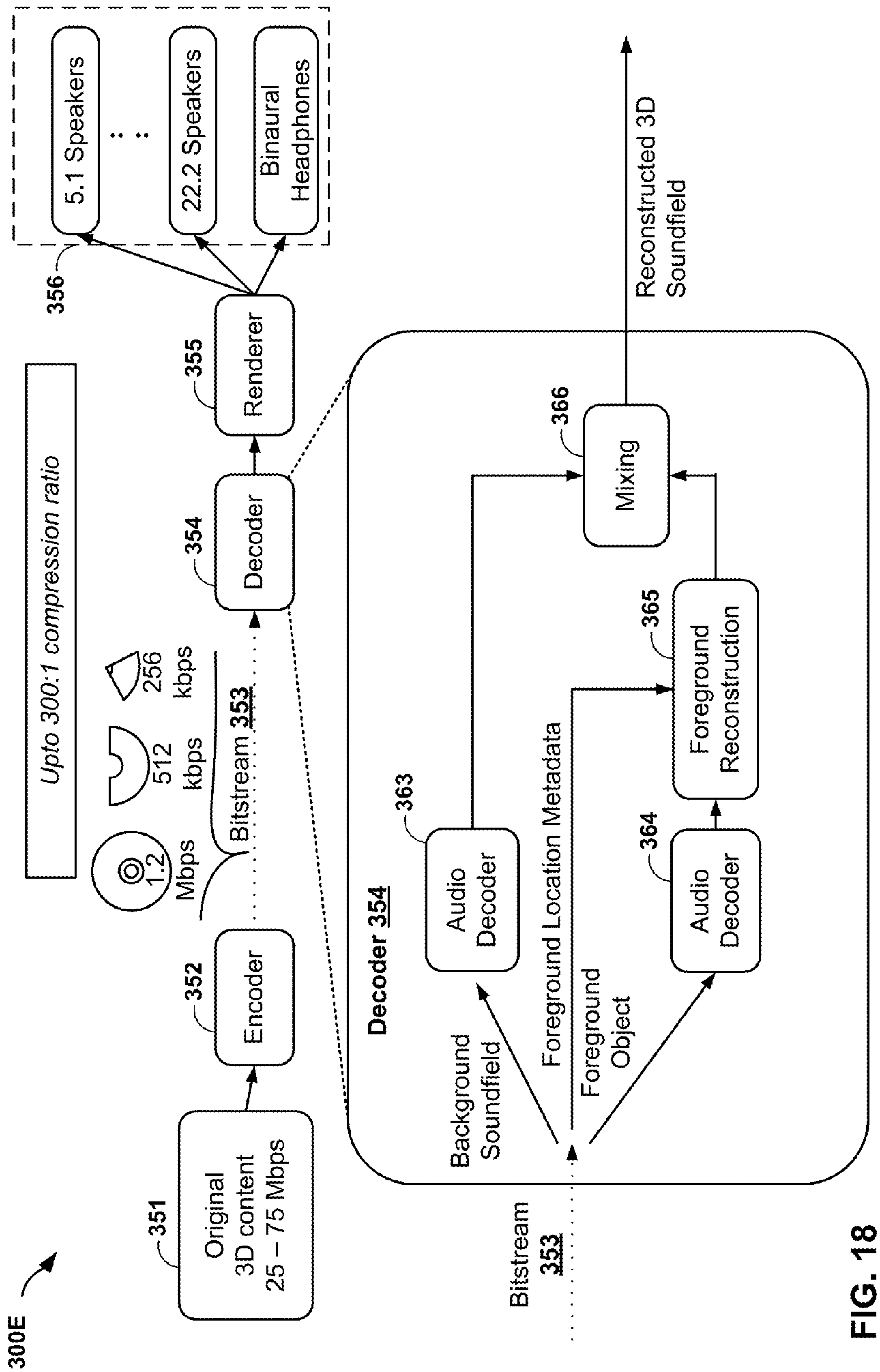
FIG. 18 is a diagram illustrating an example audio decoding device that may perform various aspects of the techniques described in this disclosure.

FIG. 18 is a diagram illustrating an example audio decoding device that may perform various aspects of the techniques described in this disclosure. As illustrated in FIG. 18, audio ecosystem 300E may include original 3D audio content 351, encoder 352, bitstream 353, decoder 354, renderer 355, and playback elements 356. As further illustrated by FIG. 16, decoder 354 may include audio decoder 363, audio decoder 364, foreground reconstruction 365, and mixing 366. In some examples, decoder 354 may be configured to perform operations similar to audio decoding device 24 of FIGS. 3 and 5. In some examples, audio decoder 363, audio decoder 364 may be configured to perform operations similar to psychoacoustic decoding unit 80 of FIG. 5. In some examples, foreground reconstruction 365 may be configured to perform operations similar to foreground formulation unit 78 of FIG. 5.

Figure 19:
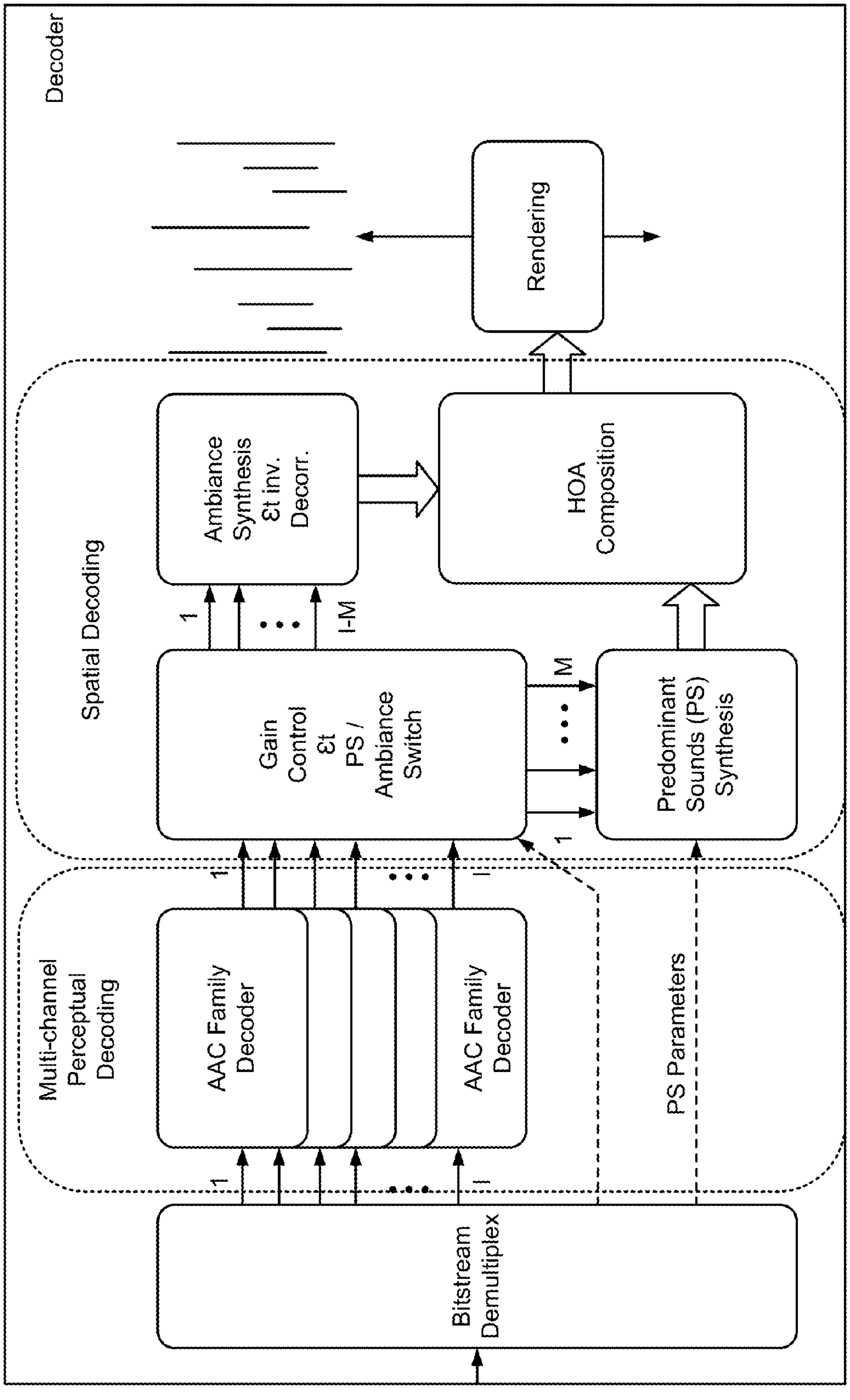
FIG. 19 is a diagram illustrating one example of the audio decoding device of FIG. 18 in more detail.

As illustrated in FIG. 16, decoder 354 may be configured to receive and decode bitstream 353 and output the resulting reconstructed 3D soundfield to renderer 355 which may then cause one or more of playback elements 356 to output a representation of original 3D content 351. FIG. 19 is a diagram illustrating one example of the audio decoding device of FIG. 18 in more detail.

Figure 20A:
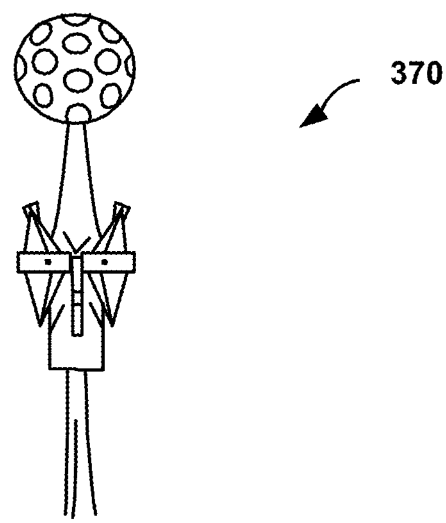
FIGS. 20A-20G are diagrams illustrating example audio acquisition devices that may perform various aspects of the techniques described in this disclosure.

FIGS. 20A-20G are diagrams illustrating example audio acquisition devices that may perform various aspects of the techniques described in this disclosure. FIG. 20A illustrates Eigen microphone 370 which may include a plurality of microphones that are collectively configured to record a 3D soundfield. In some examples, the plurality of microphones of Eigen microphone 370 may be located on the surface of a substantially spherical ball with a radius of approximately 4 cm. In some examples, the audio encoding device 20 may be integrated into the Eigen microphone so as to output a bitstream 17 directly from the microphone 370.

Figure 20B:
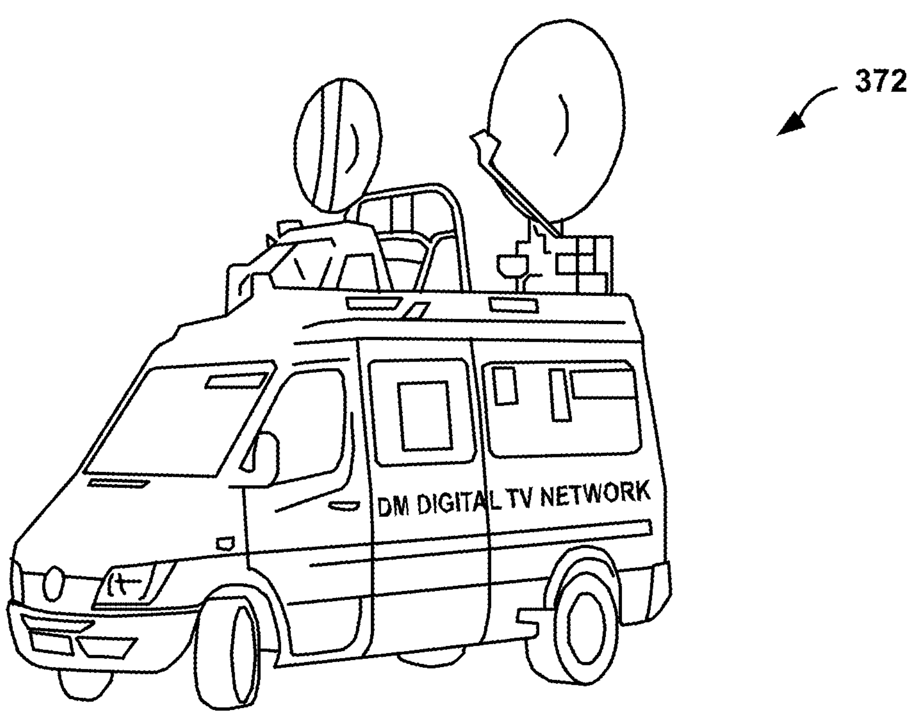

FIG. 20B illustrates production truck 372 which may be configured to receive a signal from one or more microphones, such as one or more Eigen microphones 370. Production truck 372 may also include an audio encoder, such as audio encoder 20 of FIG. 3.

Figure 20E:
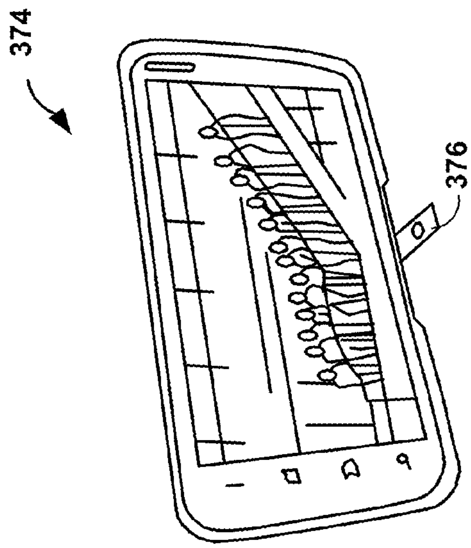
Figure 20D:
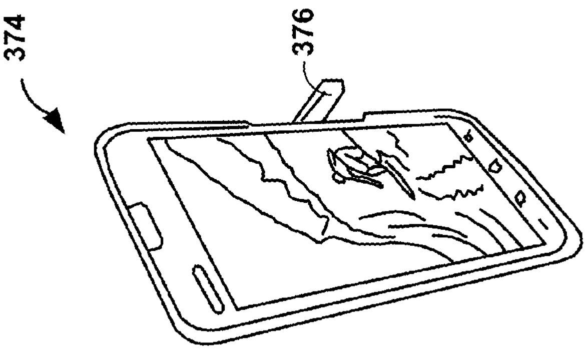
Figure 20C:
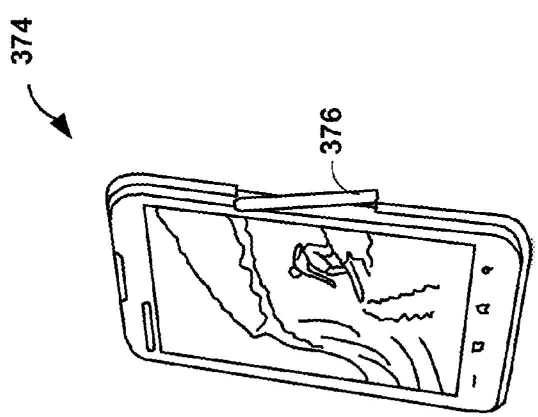

FIGS. 20C-20E illustrate mobile device 374 which may include a plurality of microphones that are collectively configured to record a 3D soundfield. In other words, the plurality of microphone may have X, Y, Z diversity. In some examples, mobile device 374 may include microphone 376 which may be rotated to provide X, Y, Z diversity with respect to one or more other microphones of mobile device 374. Mobile device 374 may also include an audio encoder, such as audio encoder 20 of FIG. 3.

Figure 20F:
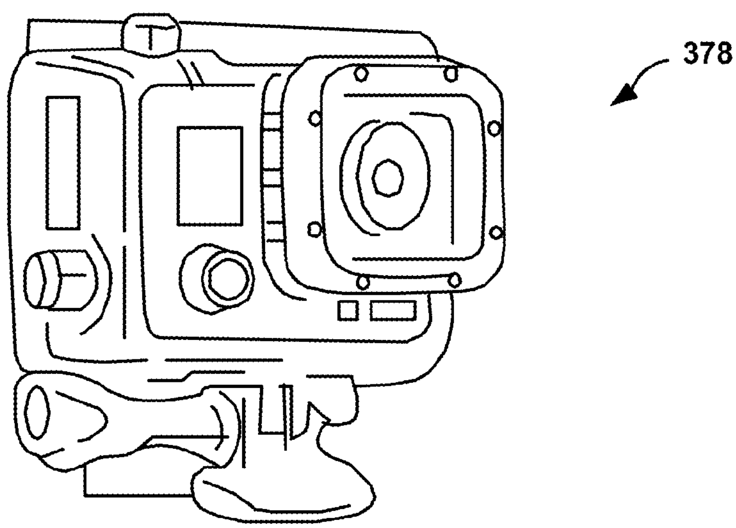

FIG. 20F illustrates a ruggedized video capture device 378 which may be configured to record a 3D soundfield. In some examples, ruggedized video capture device 378 may be attached to a helmet of a user engaged in an activity. For instance, ruggedized video capture device 378 may be attached to a helmet of a user whitewater rafting. In this way, ruggedized video capture device 378 may capture a 3D soundfield that represents the action all around the user (e.g., water crashing behind the user, another rafter speaking in-front of the user, etc. . . . ).

Figure 20G:
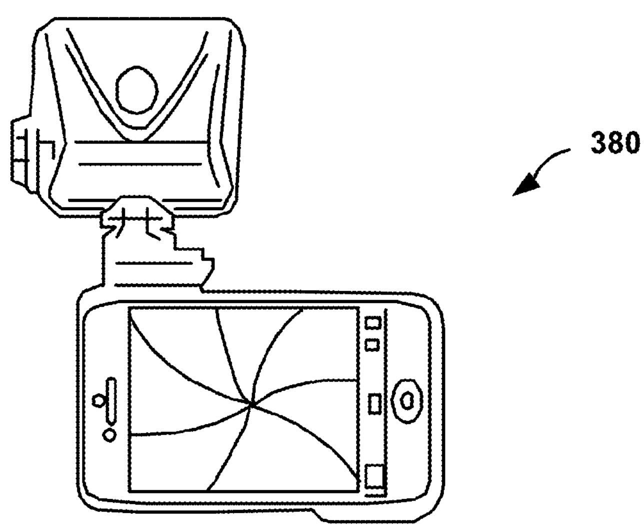

FIG. 20G illustrates accessory enhanced mobile device 380 which may be configured to record a 3D soundfield. In some examples, mobile device 380 may be similar to mobile device 335 of FIG. 15, with the addition of one or more accessories. For instance, an Eigen microphone may be attached to mobile device 335 of FIG. 15 to form accessory enhanced mobile device 380. In this way, accessory enhanced mobile device 380 may capture a higher quality version of the 3D soundfield than just using sound capture components integral to accessory enhanced mobile device 380.

Figure 21A:
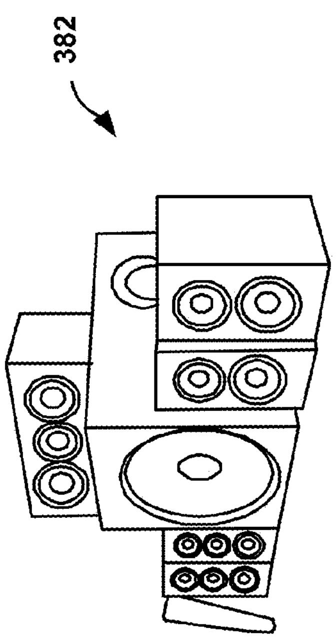
FIGS. 21A-21E are diagrams illustrating example audio playback devices that may perform various aspects of the techniques described in this disclosure.
Figure 21B:
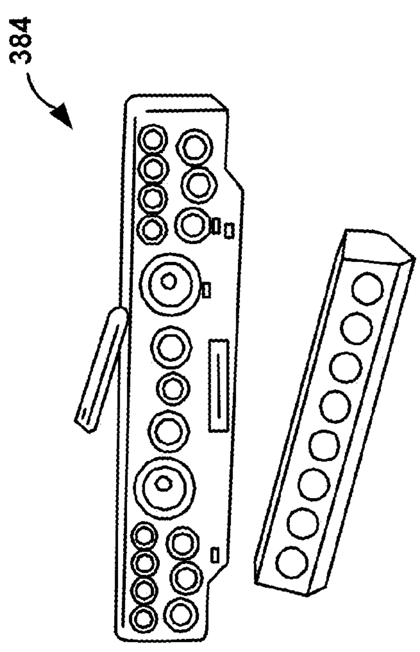
Figure 21C:
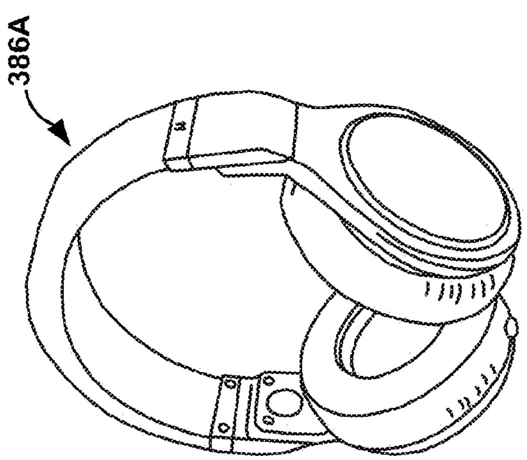
Figure 21D:
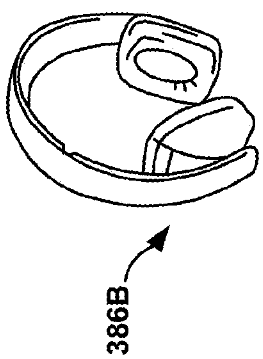
Figure 21E:
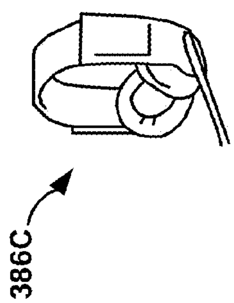

FIGS. 21A-21E are diagrams illustrating example audio playback devices that may perform various aspects of the techniques described in this disclosure. FIGS. 21A and 21B illustrates a plurality of speakers 382 and sound bars 384. In accordance with one or more techniques of this disclosure, speakers 382 and/or sound bars 384 may be arranged in any arbitrary configuration while still playing back a 3D soundfield. FIGS. 21C-21E illustrate a plurality of headphone playback devices 386-386C. Headphone playback devices 386-386C may be coupled to a decoder via either a wired or a wireless connection. In accordance with one or more techniques of this disclosure, a single generic representation of a soundfield may be utilized to render the soundfield on any combination of speakers 382, sound bars 384, and headphone playback devices 386-386C.

Figure 22A:
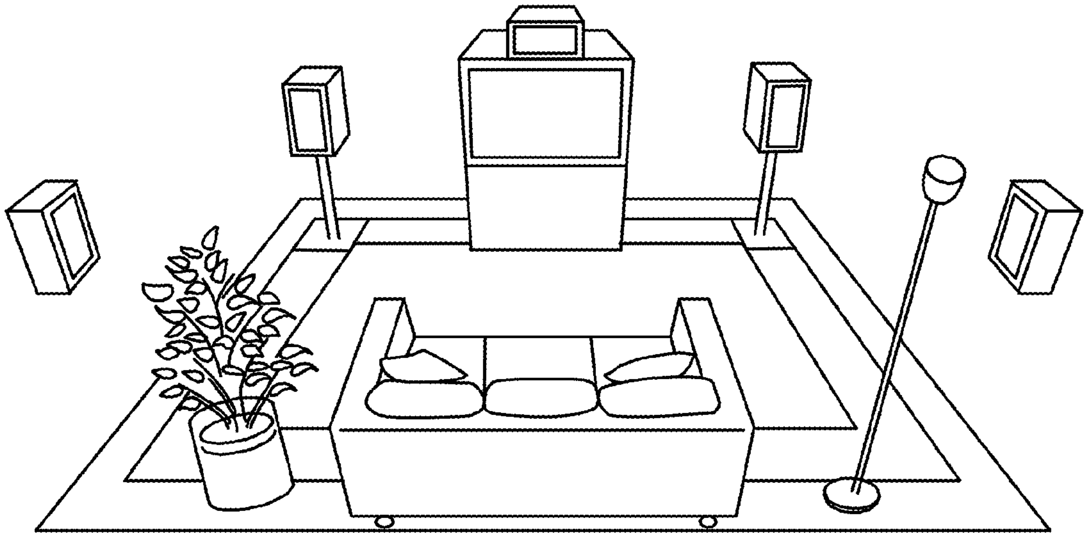
FIGS. 22A-22H are diagrams illustrating example audio playback environments in accordance with one or more techniques described in this disclosure.
Figure 22B:
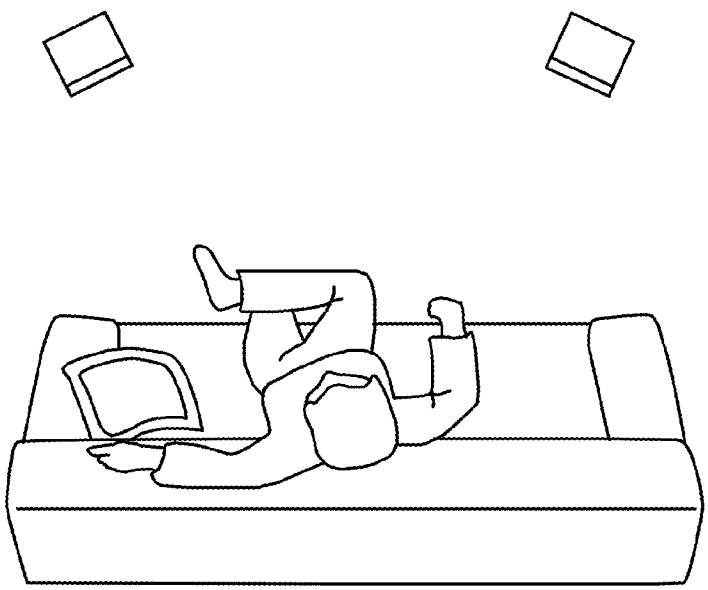
Figure 22C:
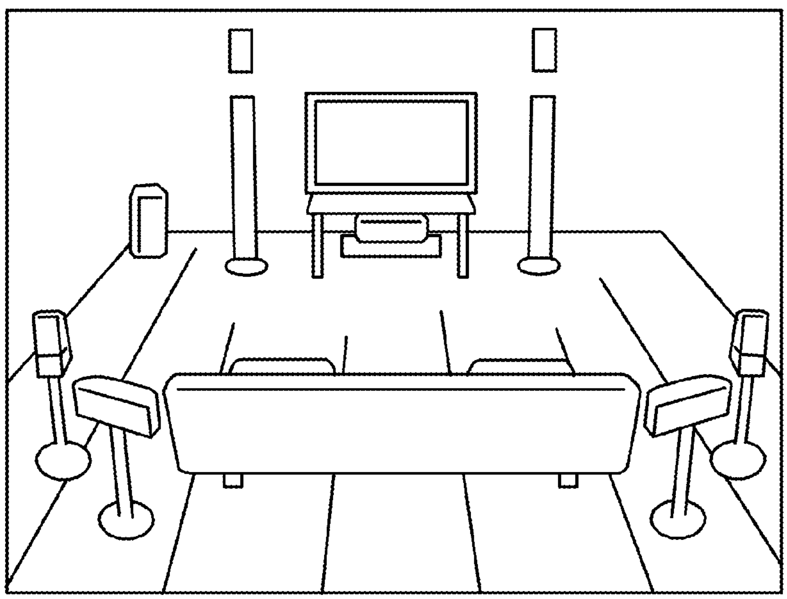
Figure 22D:
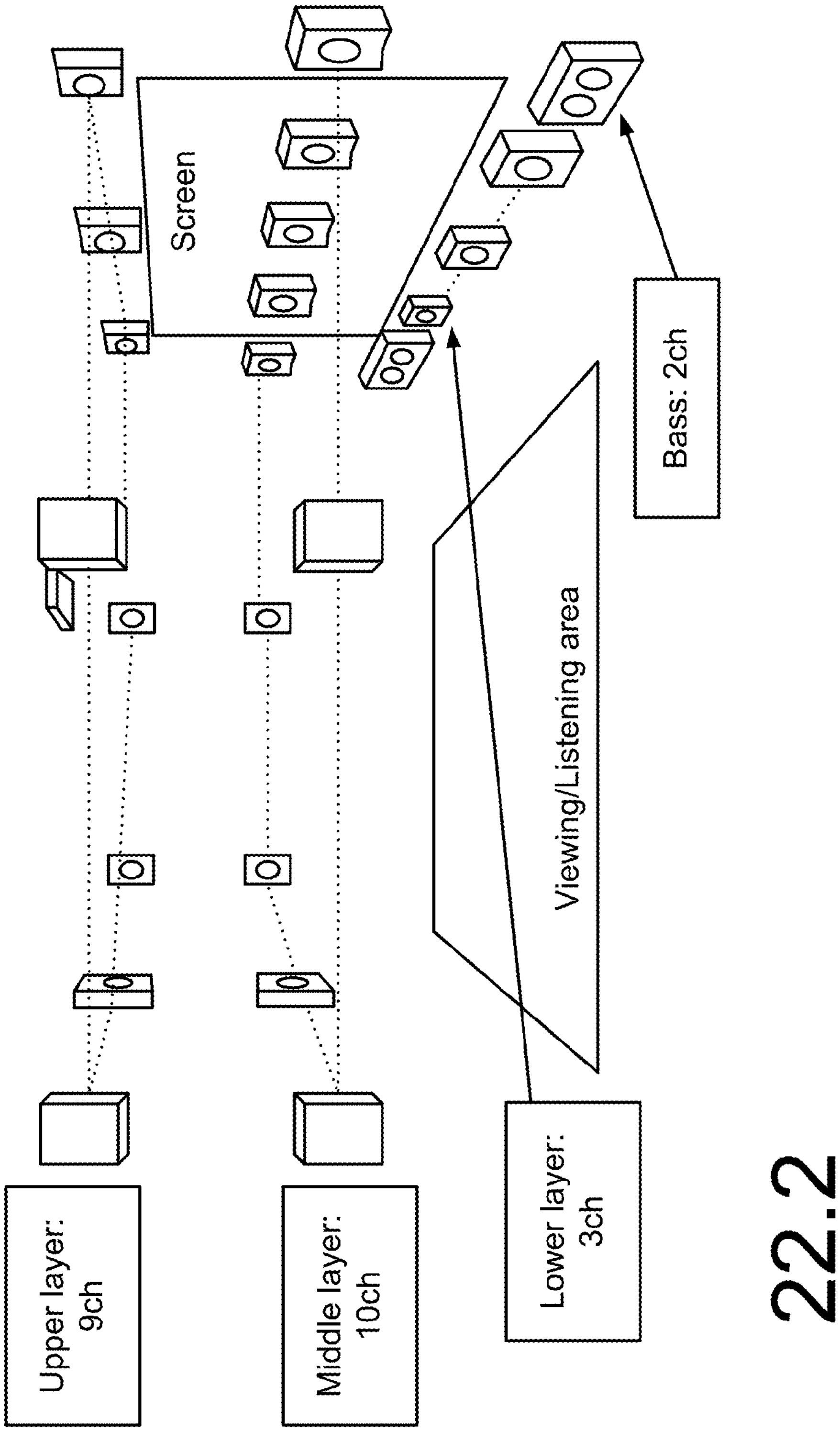
Figure 22E:
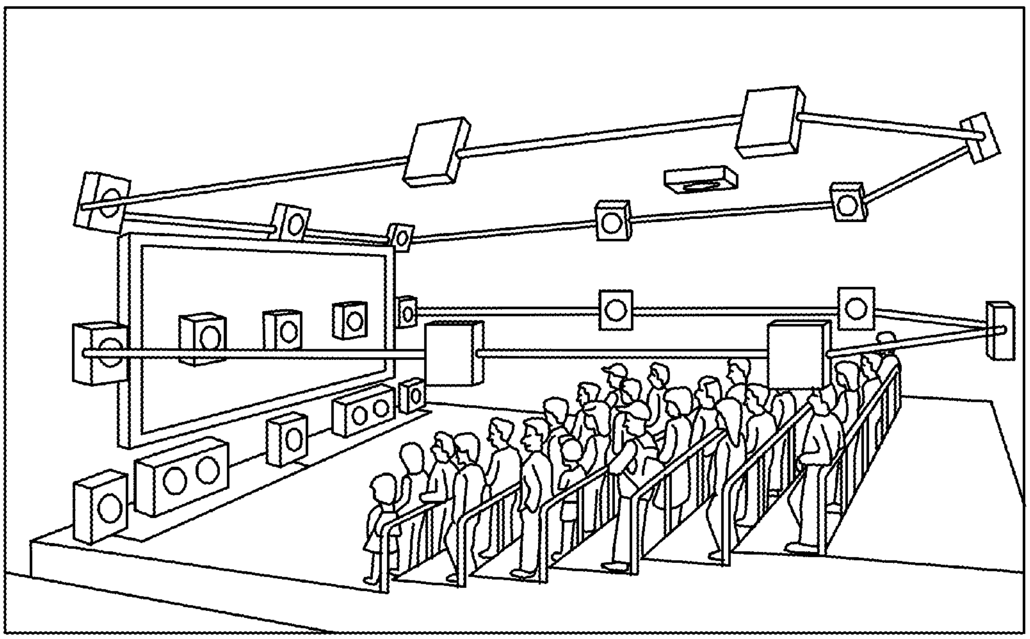
Figure 22F:
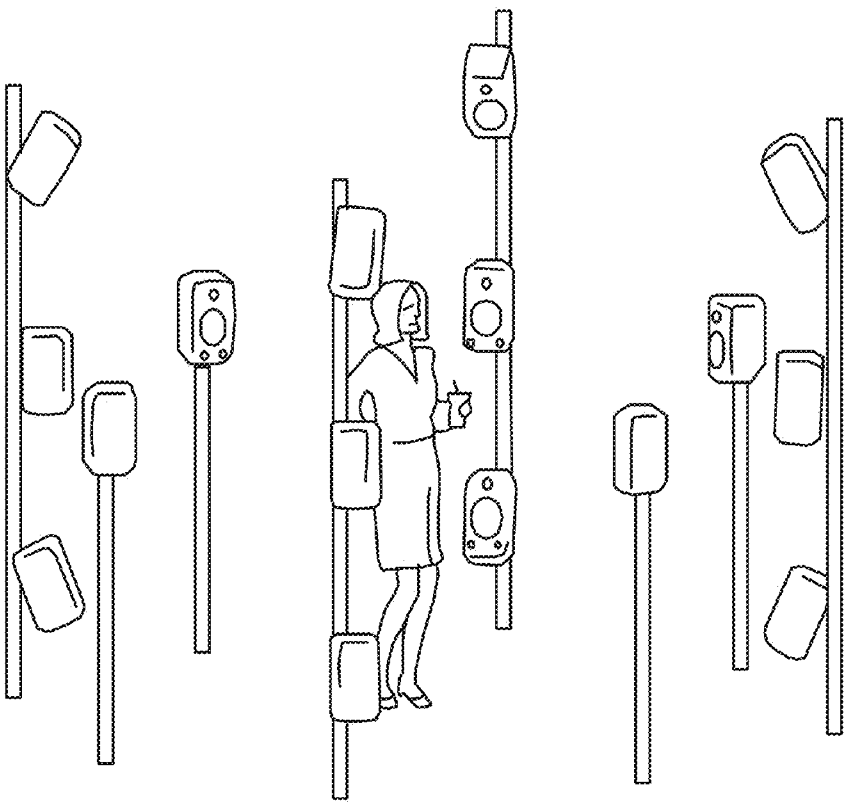
Figure 22G:
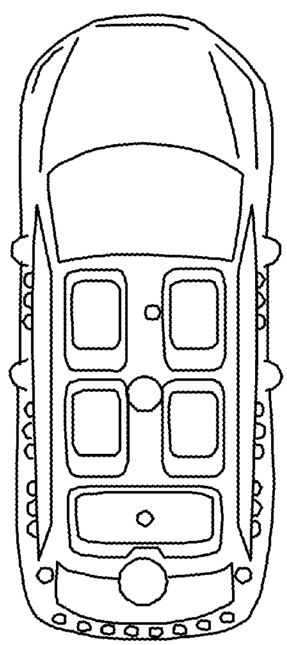
Figure 22H:
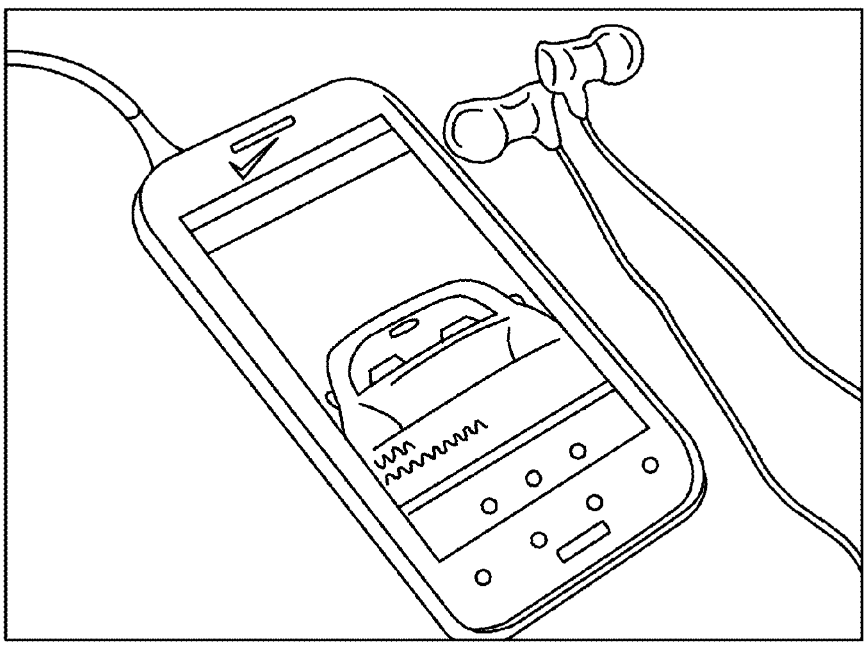

FIGS. 22A-22H are diagrams illustrating example audio playback environments in accordance with one or more techniques described in this disclosure. For instance, FIG. 22A illustrates a 5.1 speaker playback environment, FIG. 22B illustrates a 2.0 (e.g. stereo) speaker playback environment, FIG. 22C illustrates a 9.1 speaker playback environment with full height front loudspeakers, FIGS. 22D and 22E each illustrate a 22.2 speaker playback environment FIG. 22F illustrates a 16.0 speaker playback environment, FIG. 22G illustrates an automotive speaker playback environment, and FIG. 22H illustrates a mobile device with ear bud playback environment.

In accordance with one or more techniques of this disclosure, a single generic representation of a soundfield may be utilized to render the soundfield on any of the playback environments illustrated in FIGS. 22A-22H. Additionally, the techniques of this disclosure enable a rendered to render a soundfield from a generic representation for playback on playback environments other than those illustrated in FIGS. 22A-22H. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Figure 23:
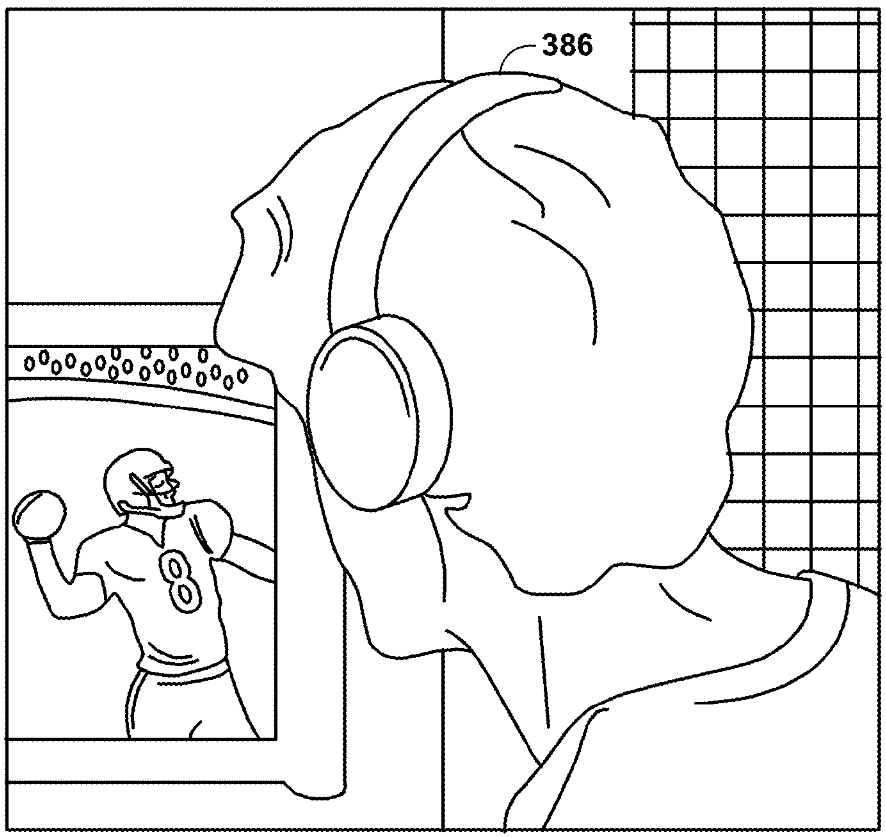
FIG. 23 is a diagram illustrating an example use case where a user may experience a 3D soundfield of a sports game while wearing headphones in accordance with one or more techniques described in this disclosure.
Figure 24:
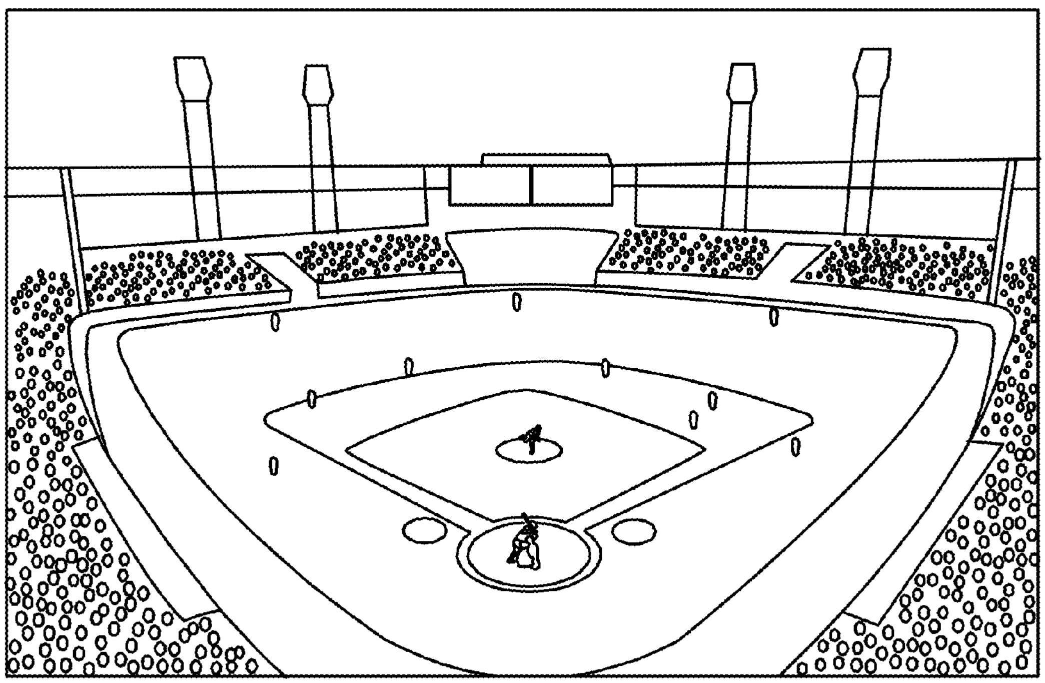
FIG. 24 is a diagram illustrating a sports stadium at which a 3D soundfield may be recorded in accordance with one or more techniques described in this disclosure.
Figure 25:
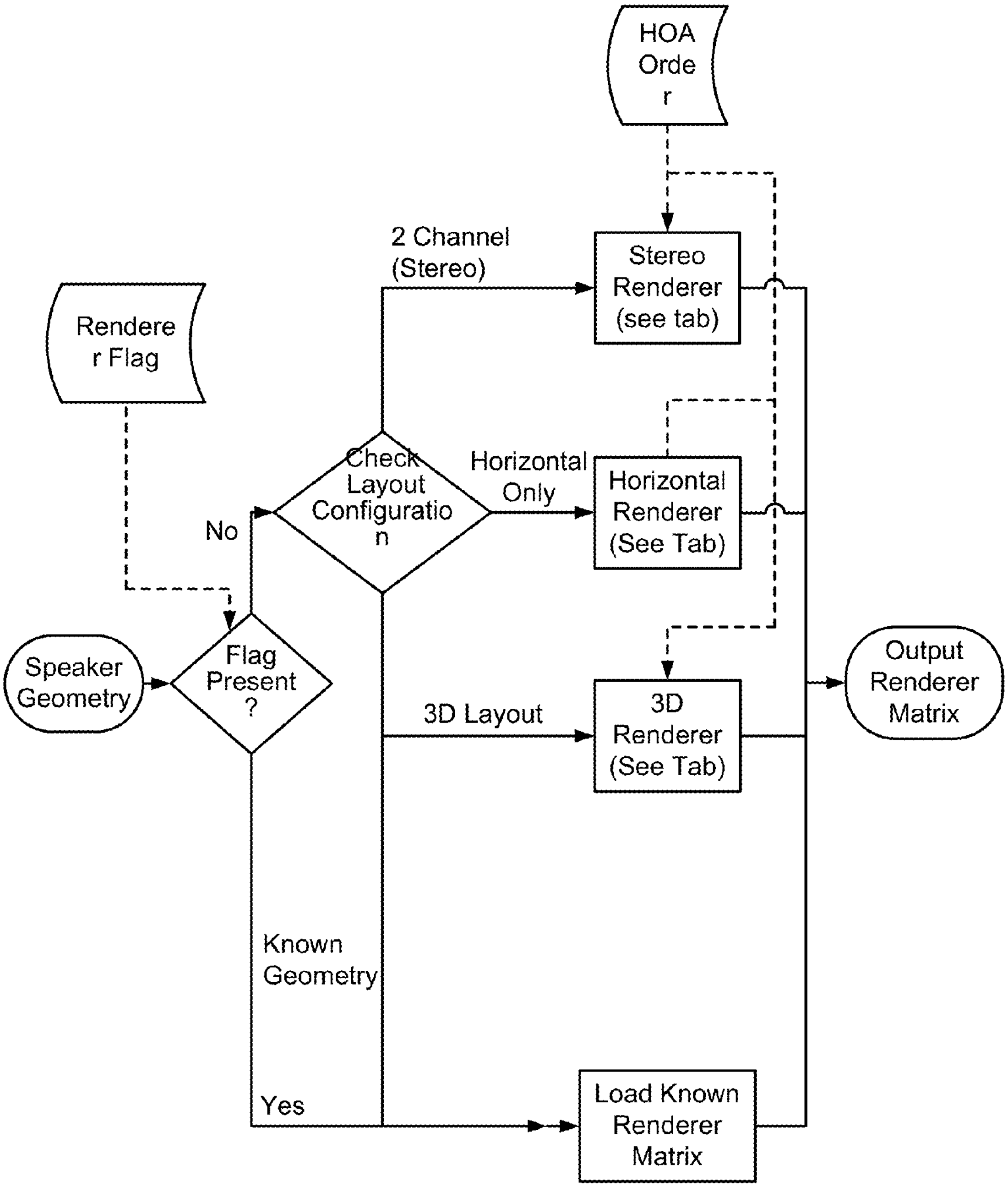
FIG. 25 is a flow diagram illustrating a technique for rendering a 3D soundfield based on a local audio landscape in accordance with one or more techniques described in this disclosure.

As illustrated in FIG. 23, a user may watch a sports game while wearing headphones 386. In accordance with one or more techniques of this disclosure, the 3D soundfield of the sports game may be acquired (e.g., one or more Eigen microphones may be placed in and/or around the baseball stadium illustrated in FIG. 24), HOA coefficients corresponding to the 3D soundfield may be obtained and transmitted to a decoder, the decoder may determine reconstruct the 3D soundfield based on the HOA coefficients and output the reconstructed the 3D soundfield to a renderer, the renderer may obtain an indication as to the type of playback environment (e.g., headphones), and render the reconstructed the 3D soundfield into signals that cause the headphones to output a representation of the 3D soundfield of the sports game. In some examples, the renderer may obtain an indication as to the type of playback environment in accordance with the techniques of FIG. 25. In this way, the renderer may to "adapt" for various speaker locations, numbers type, size, and also ideally equalize for the local environment.

Figure 28:
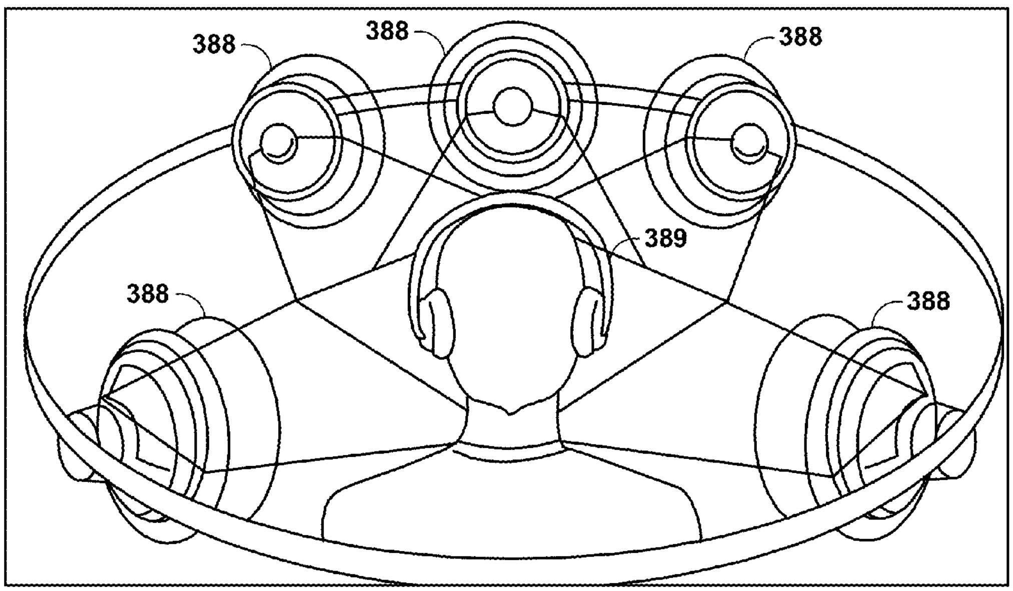
FIG. 28 is a diagram illustrating a speaker configuration that may be simulated by headphones in accordance with one or more techniques described in this disclosure.

FIG. 28 is a diagram illustrating a speaker configuration that may be simulated by headphones in accordance with one or more techniques described in this disclosure. As illustrated by FIG. 28, techniques of this disclosure may enable a user wearing headphones 389 to experience a soundfield as if the soundfield was played back by speakers 388. In this way, a user may listen to a 3D soundfield without sound being output to a large area.

Figure 30:
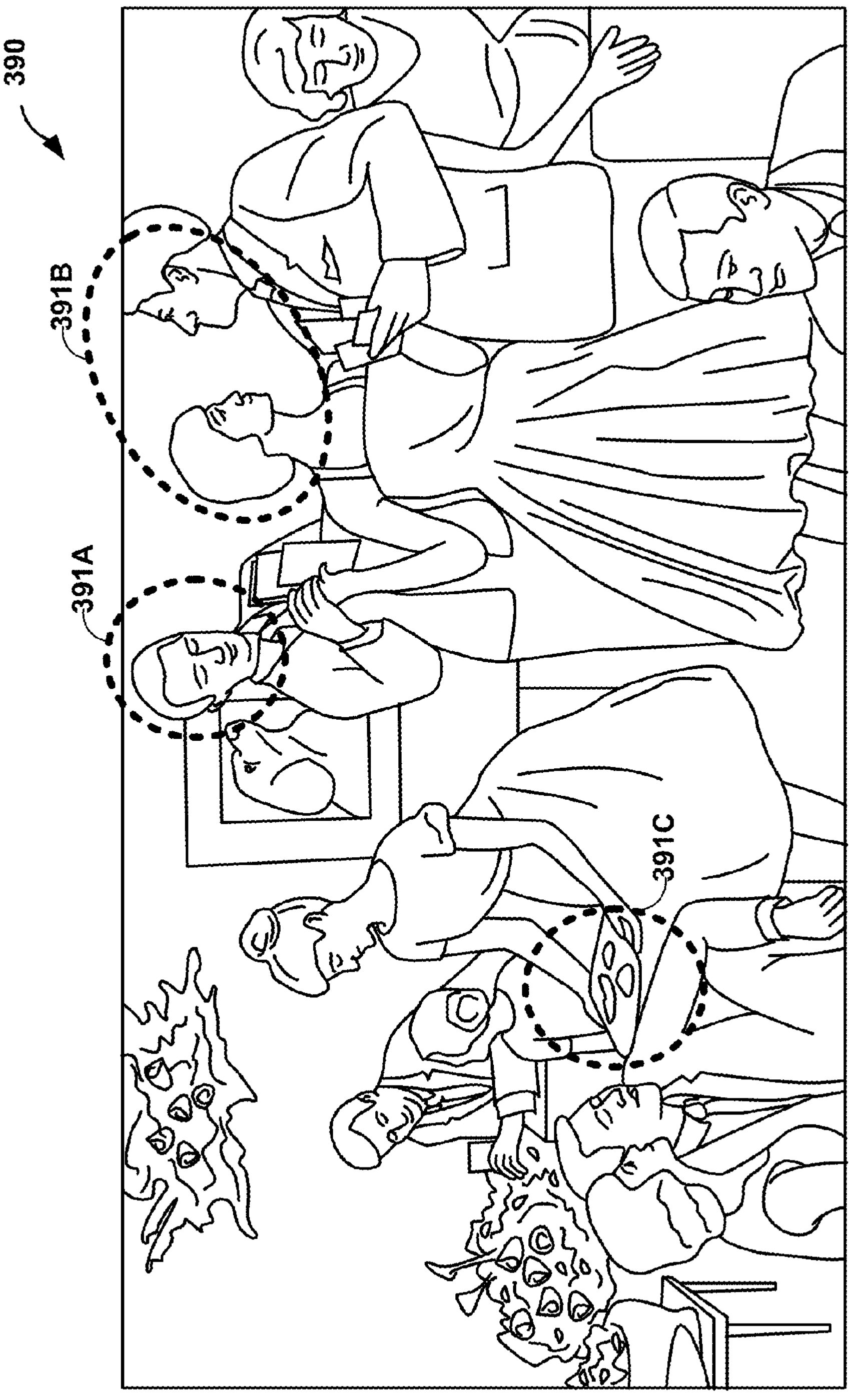
FIG. 30 is a diagram illustrating a video frame associated with a 3D soundfield which may be processed in accordance with one or more techniques described in this disclosure.

FIG. 30 is a diagram illustrating a video frame associated with a 3D soundfield which may be processed in accordance with one or more techniques described in this disclosure.

FIGS. 31A-31M are diagrams illustrating graphs 400A-400M showing various simulation results of performing synthetic or recorded categorization of the soundfield in accordance with various aspects of the techniques described in this disclosure. In the examples of FIG. 31A-31M, each of graphs 400A-400M include a threshold 402 that is denoted by a dotted line and a respective audio object 404A-404M (collectively, "the audio objects 404") denoted by a dashed line.

Figure 31A:
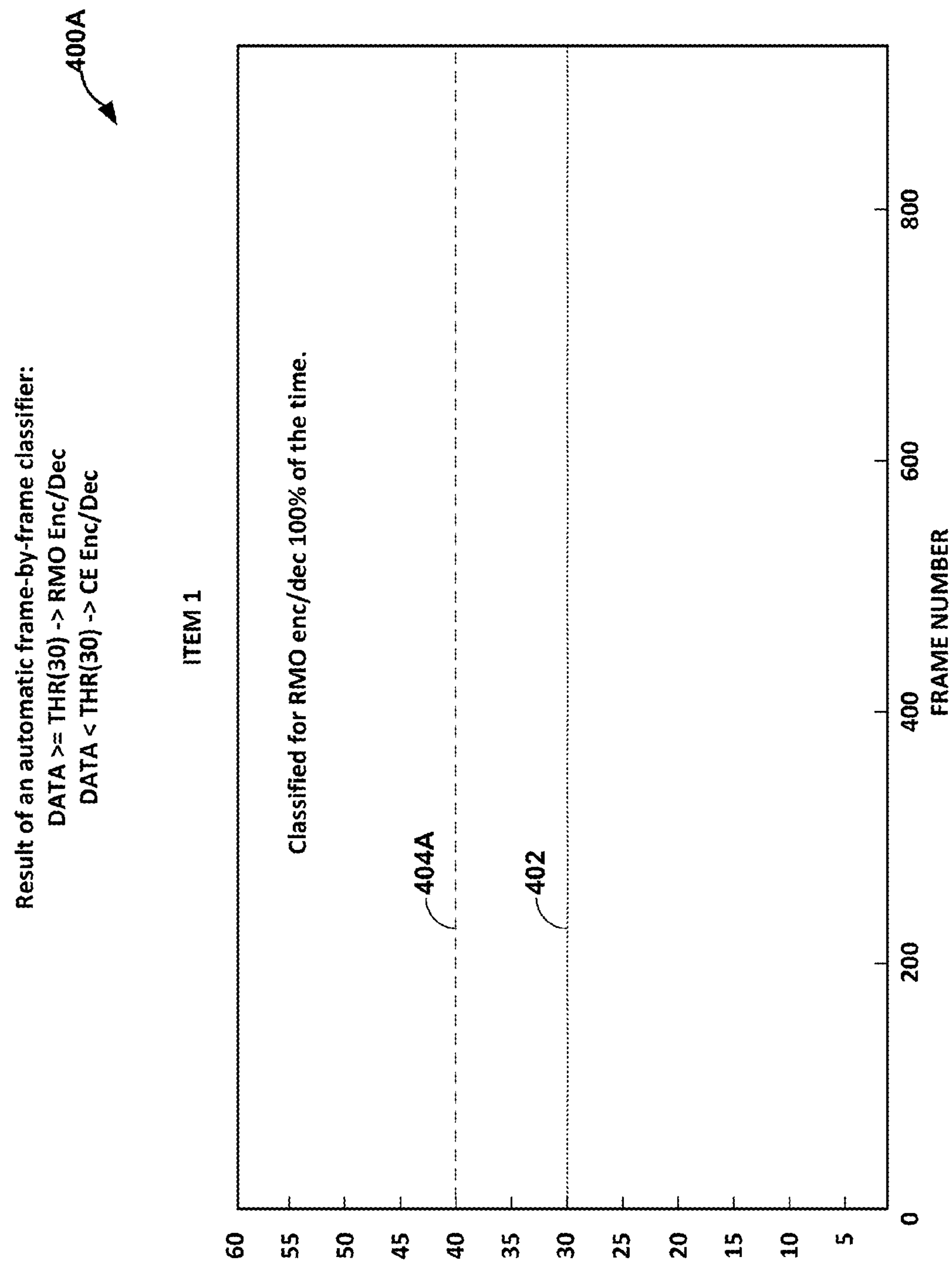
FIGS. 31A-31M are diagrams illustrating graphs showing various simulation results of performing synthetic or recorded categorization of the soundfield in accordance with various aspects of the techniques described in this disclosure.
Figure 31B:
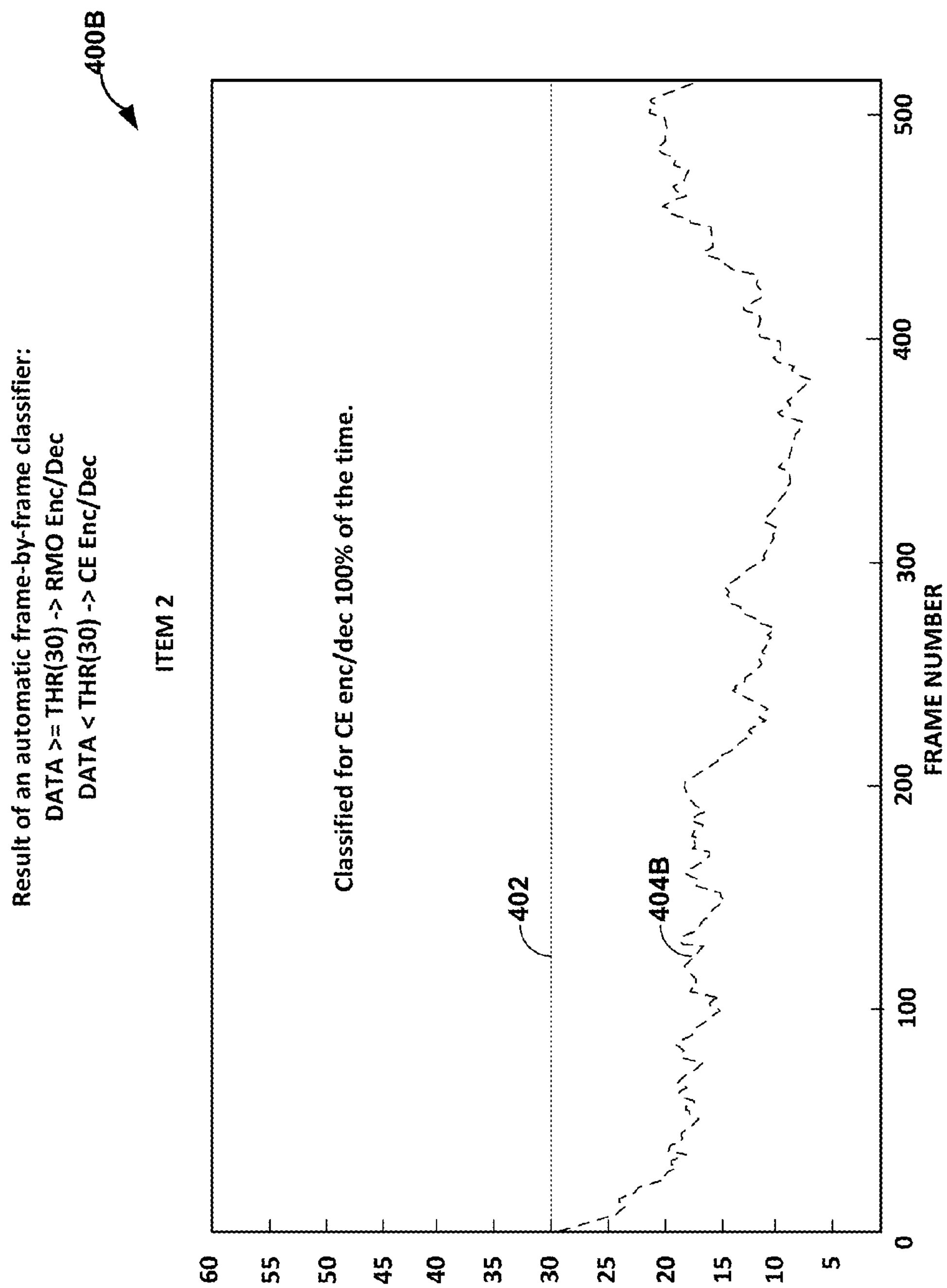
Figure 31C:
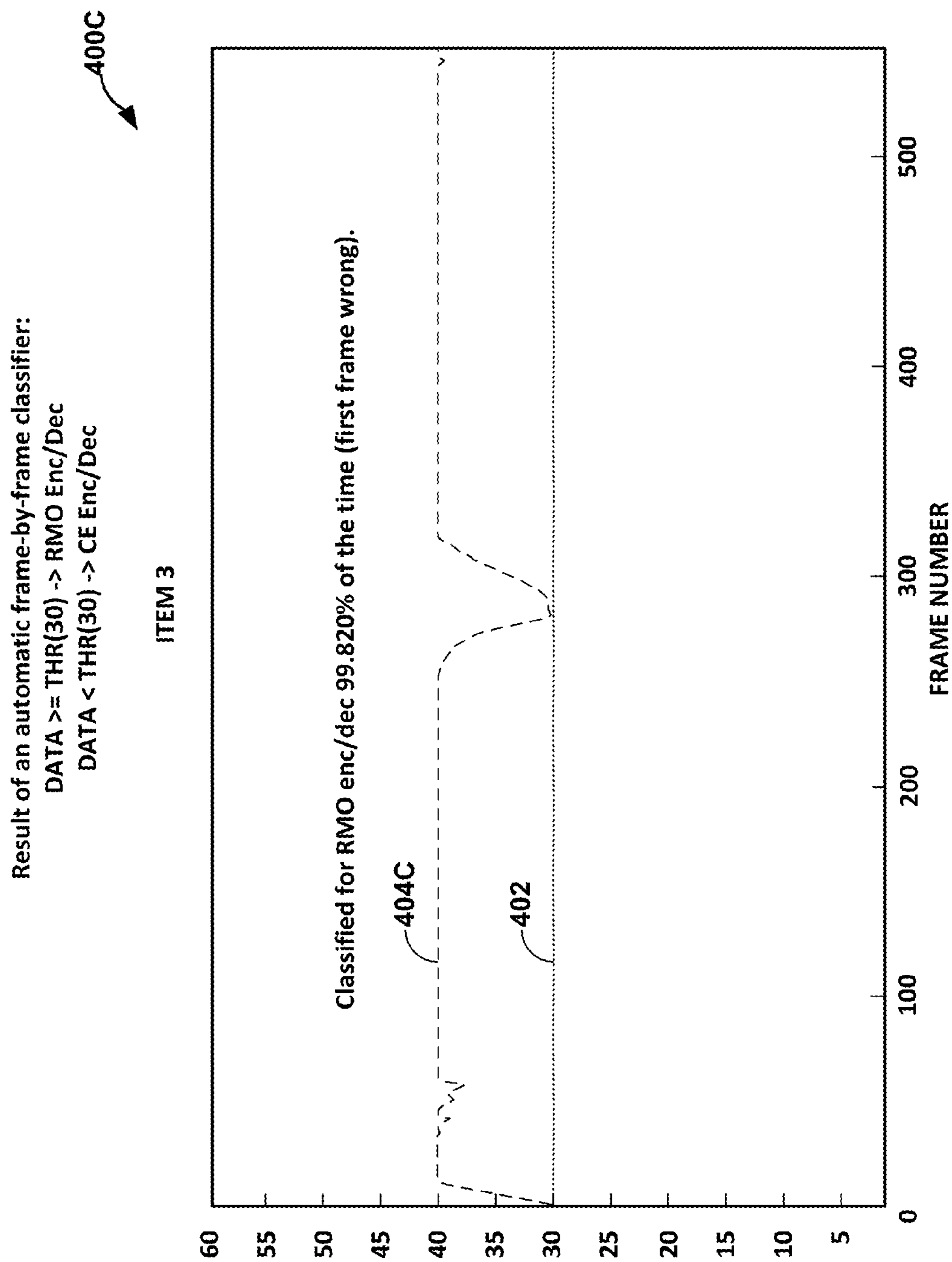
Figure 31D:
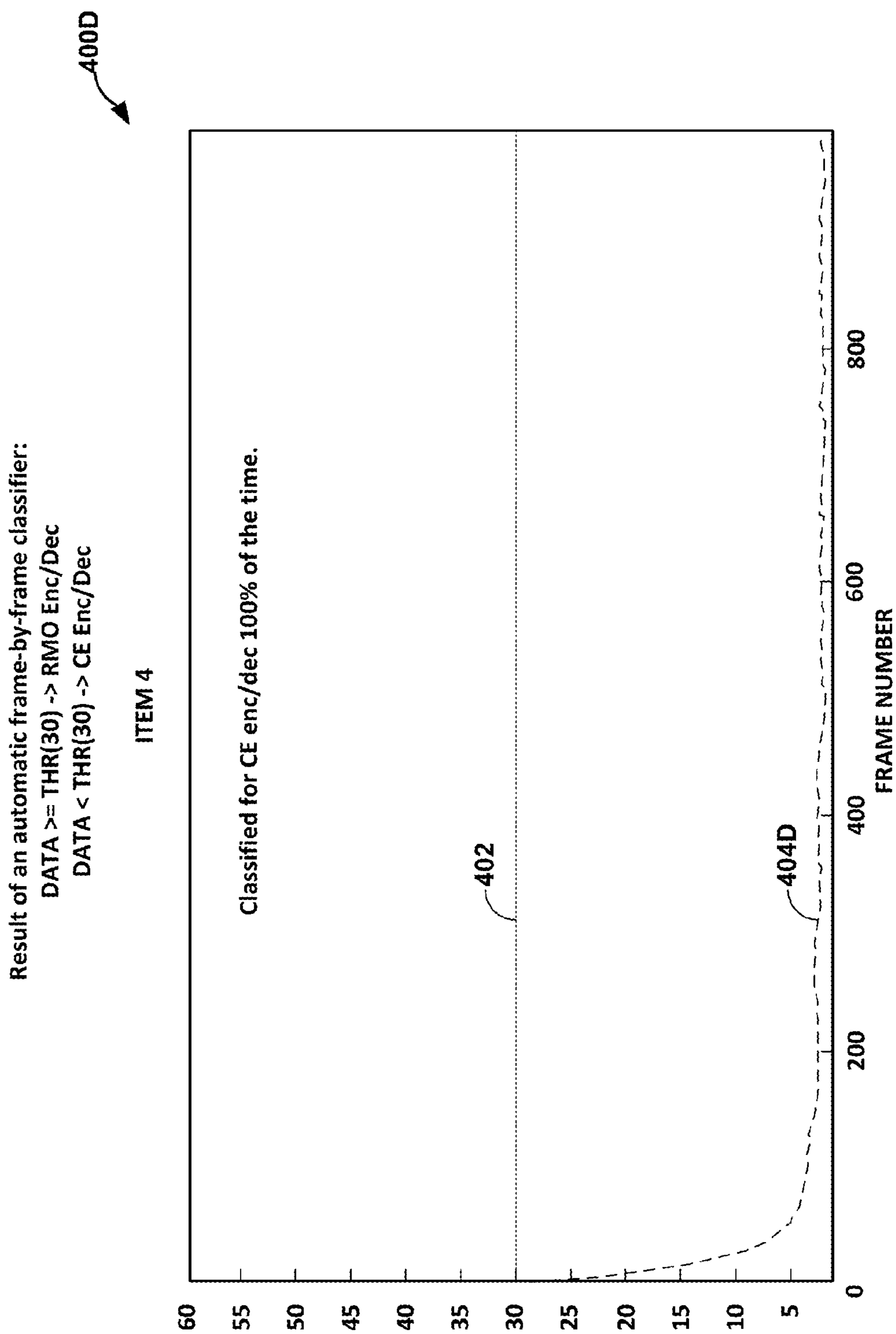
Figure 31E:
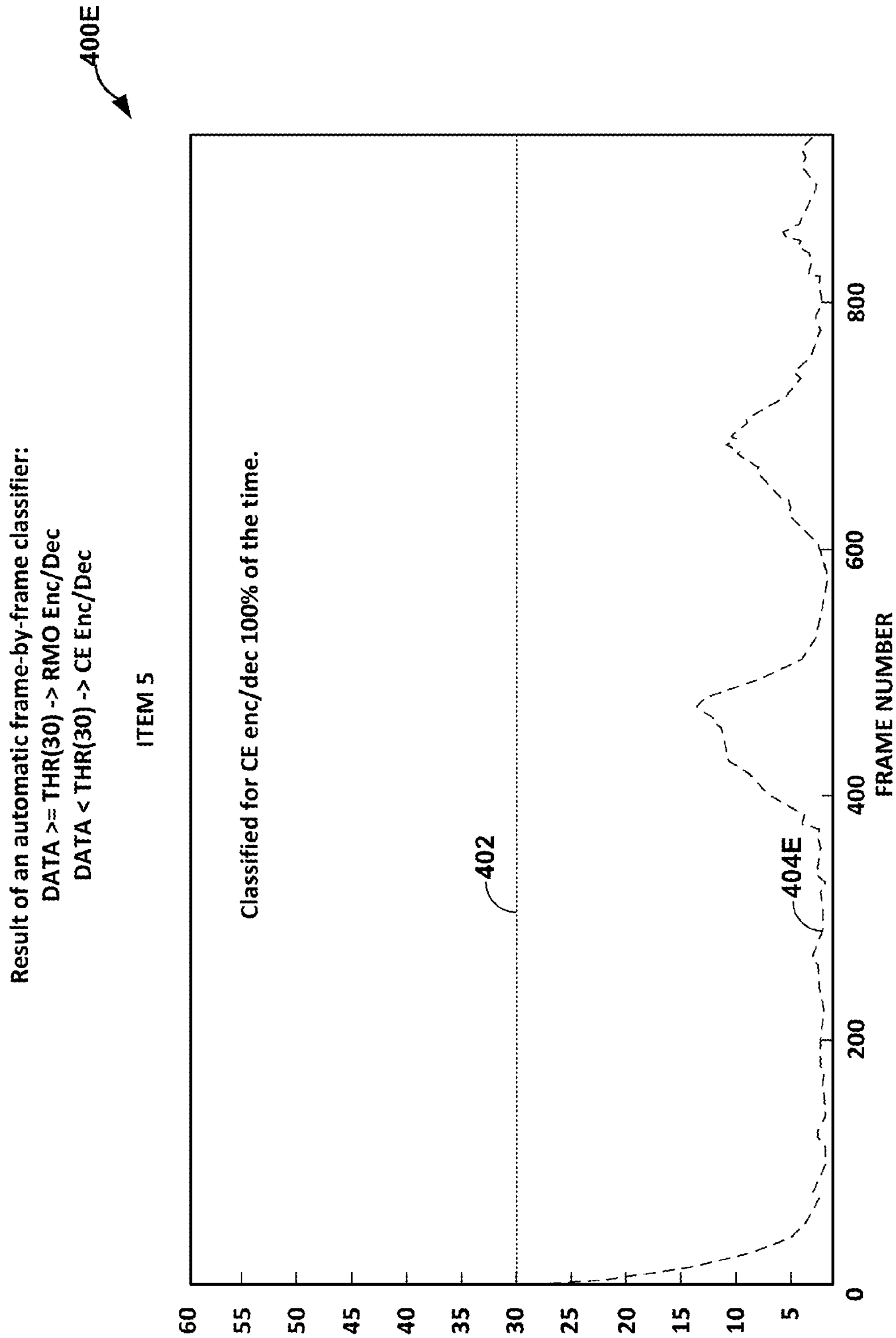
Figure 31F:
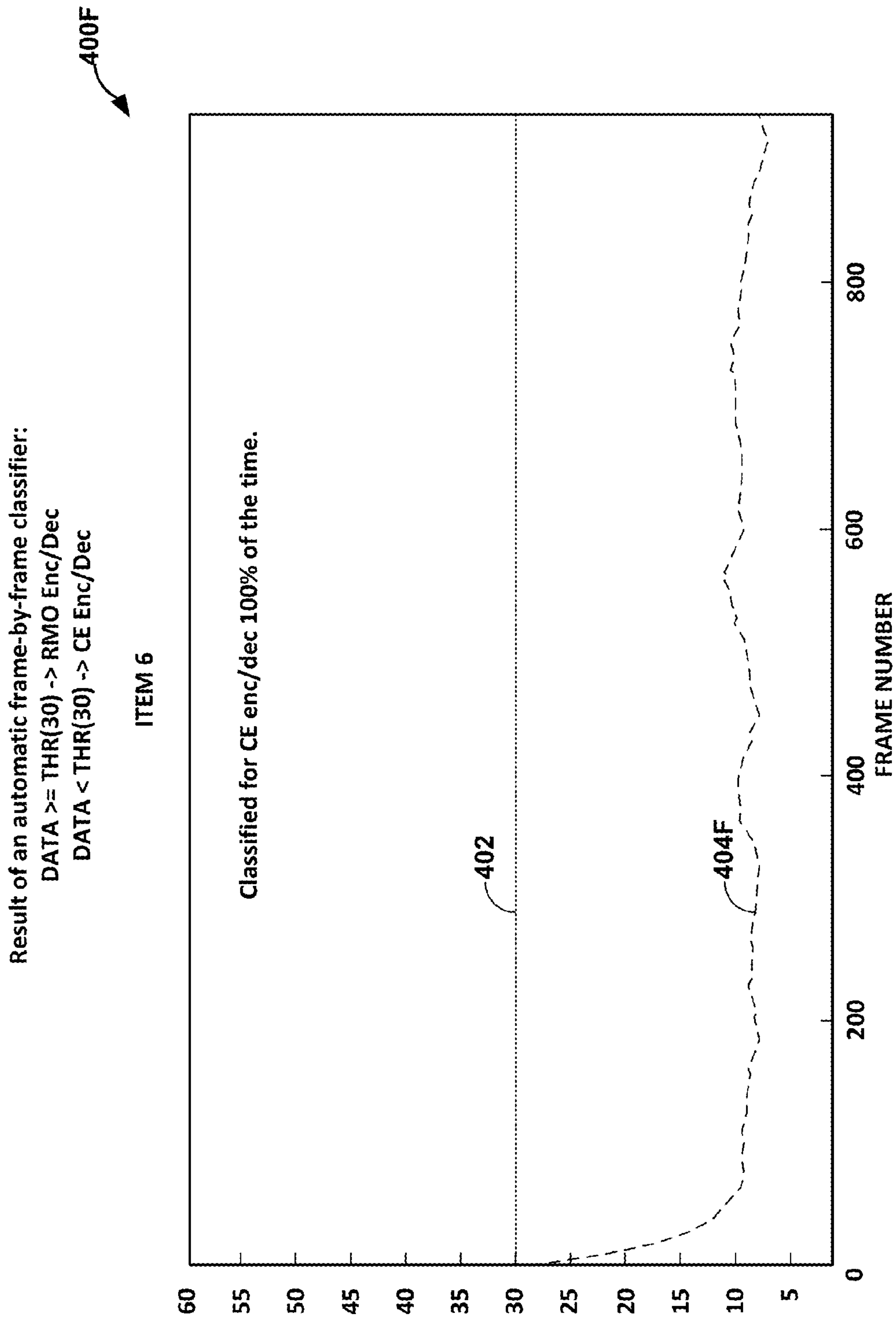
Figure 31G:
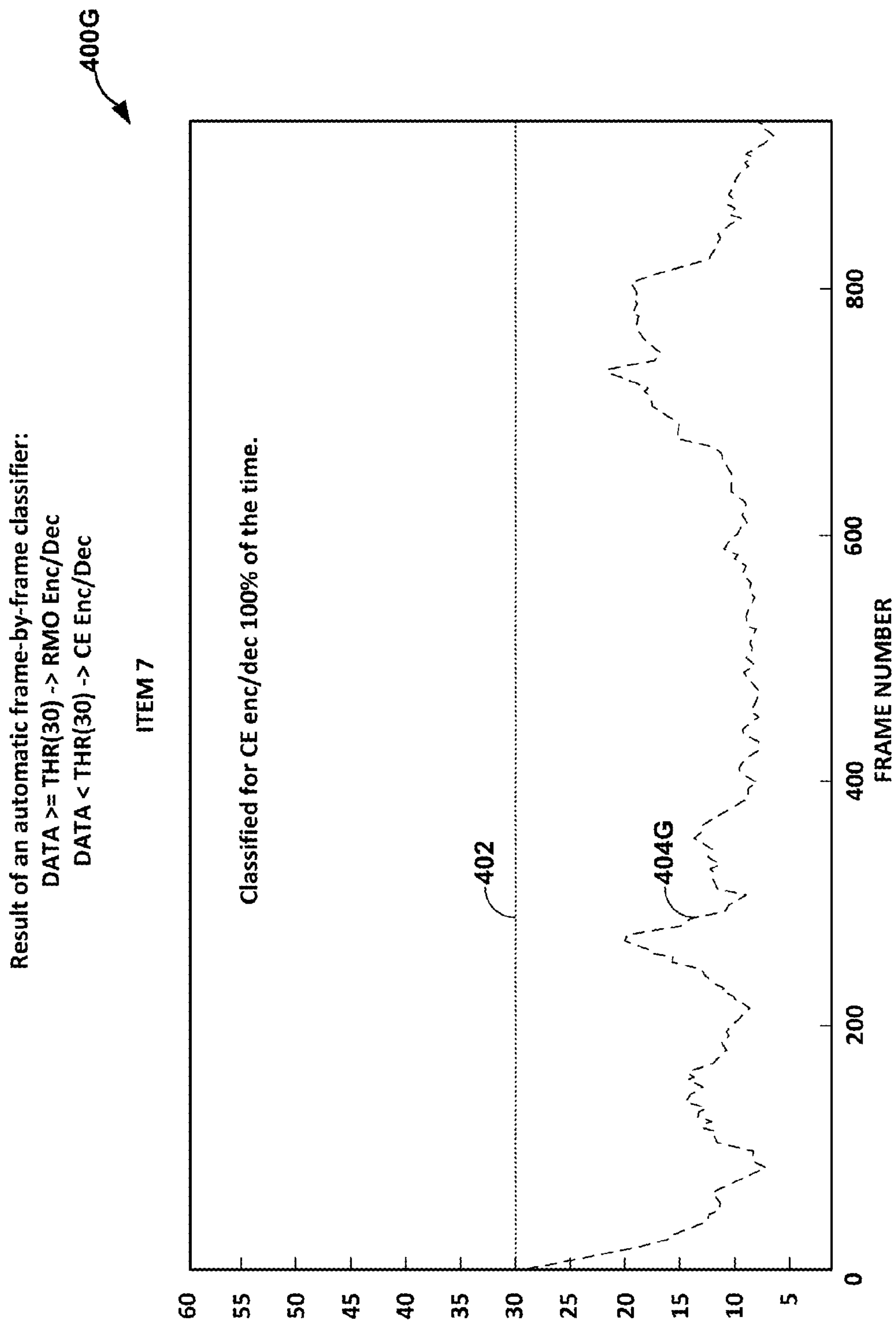
Figure 31H:
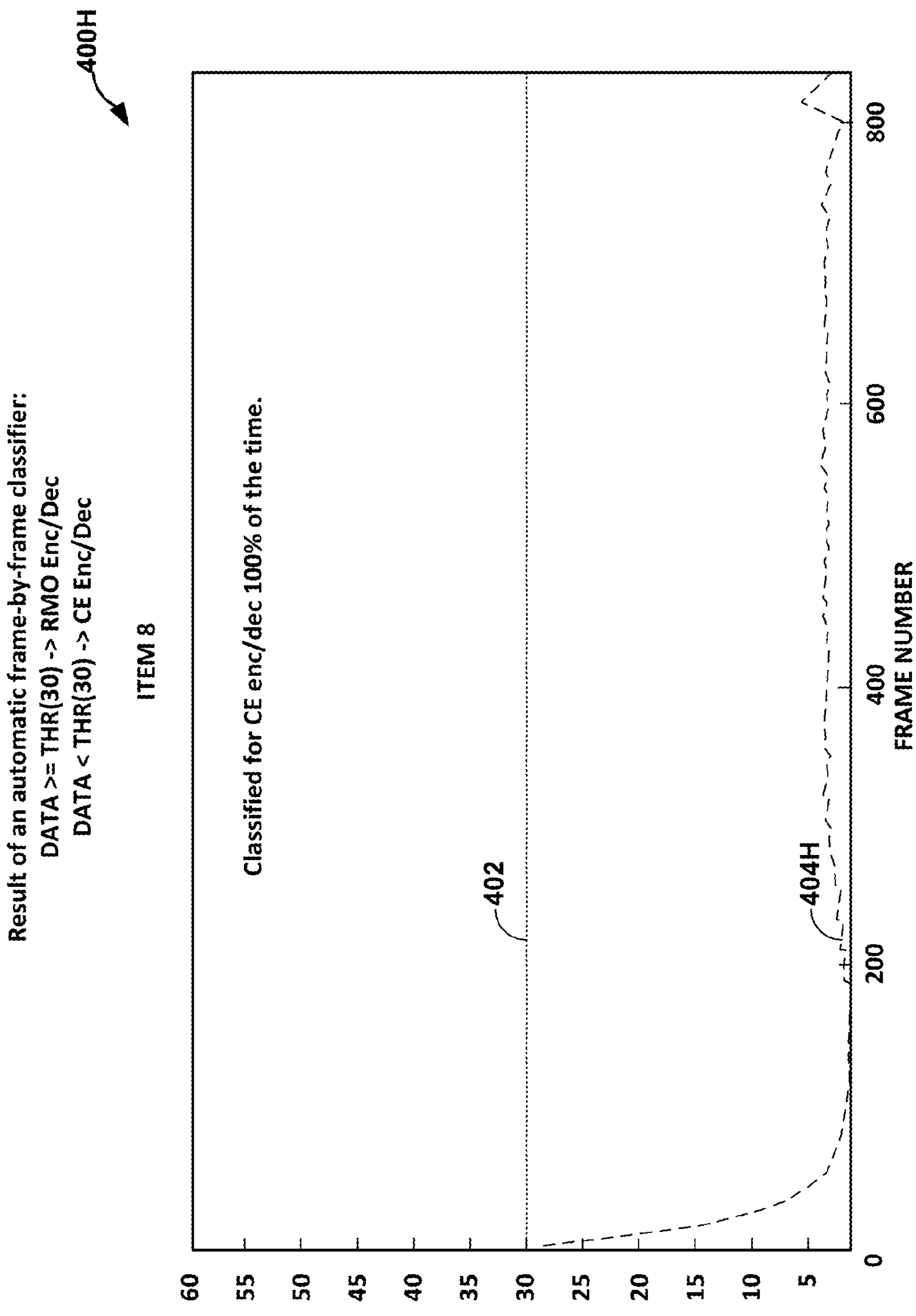
Figure 31I:
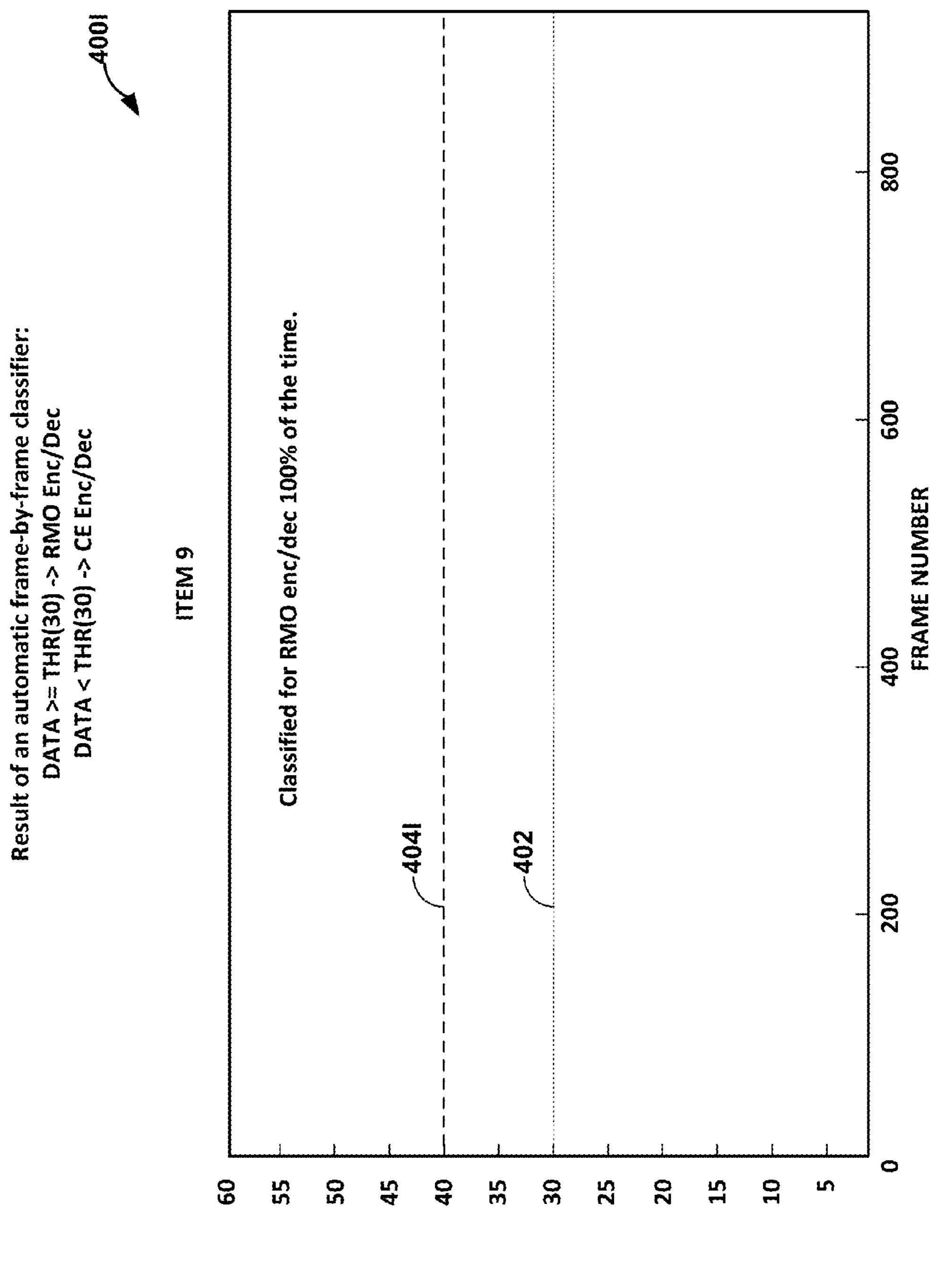
Figure 31J:
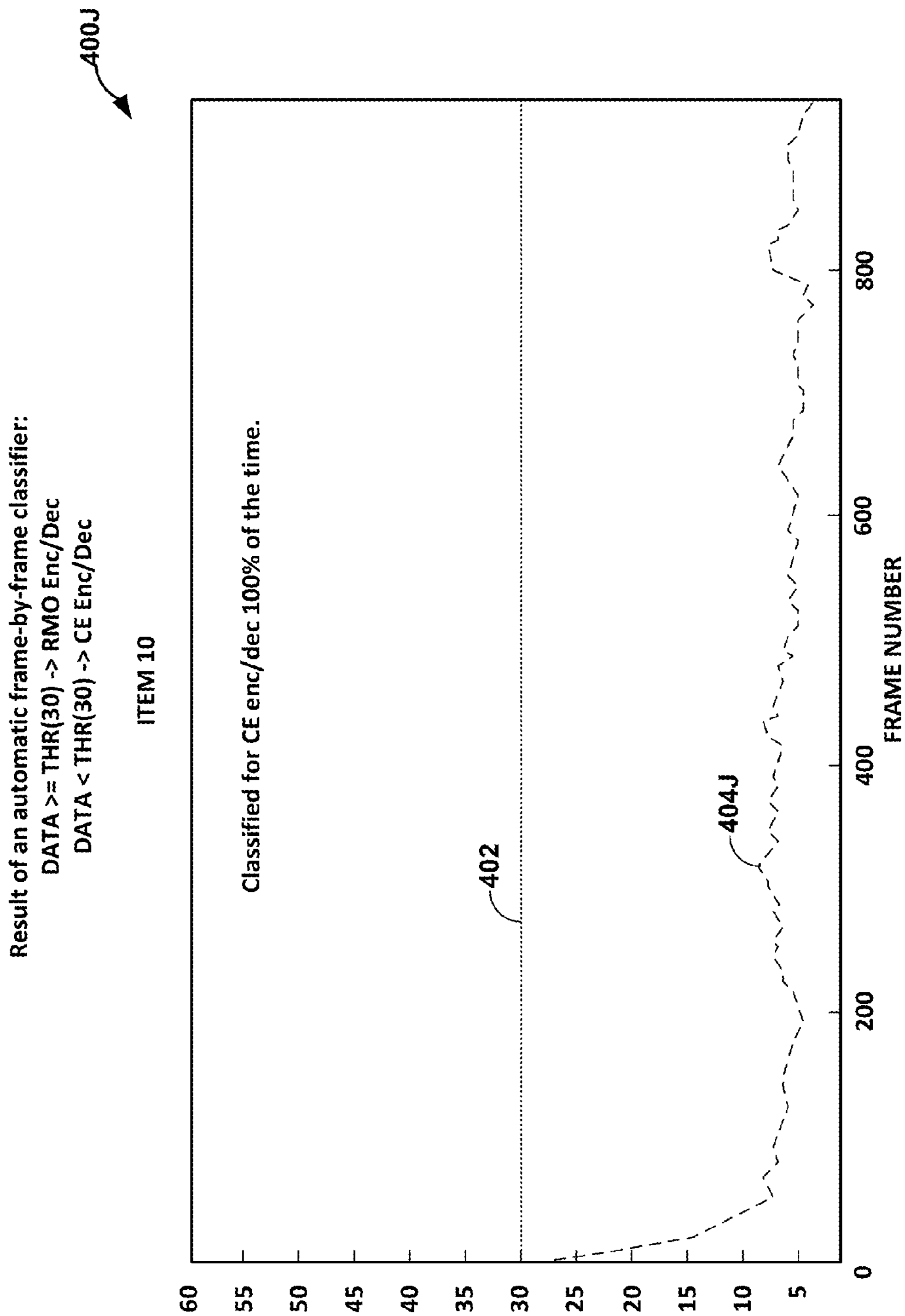
Figure 31K:
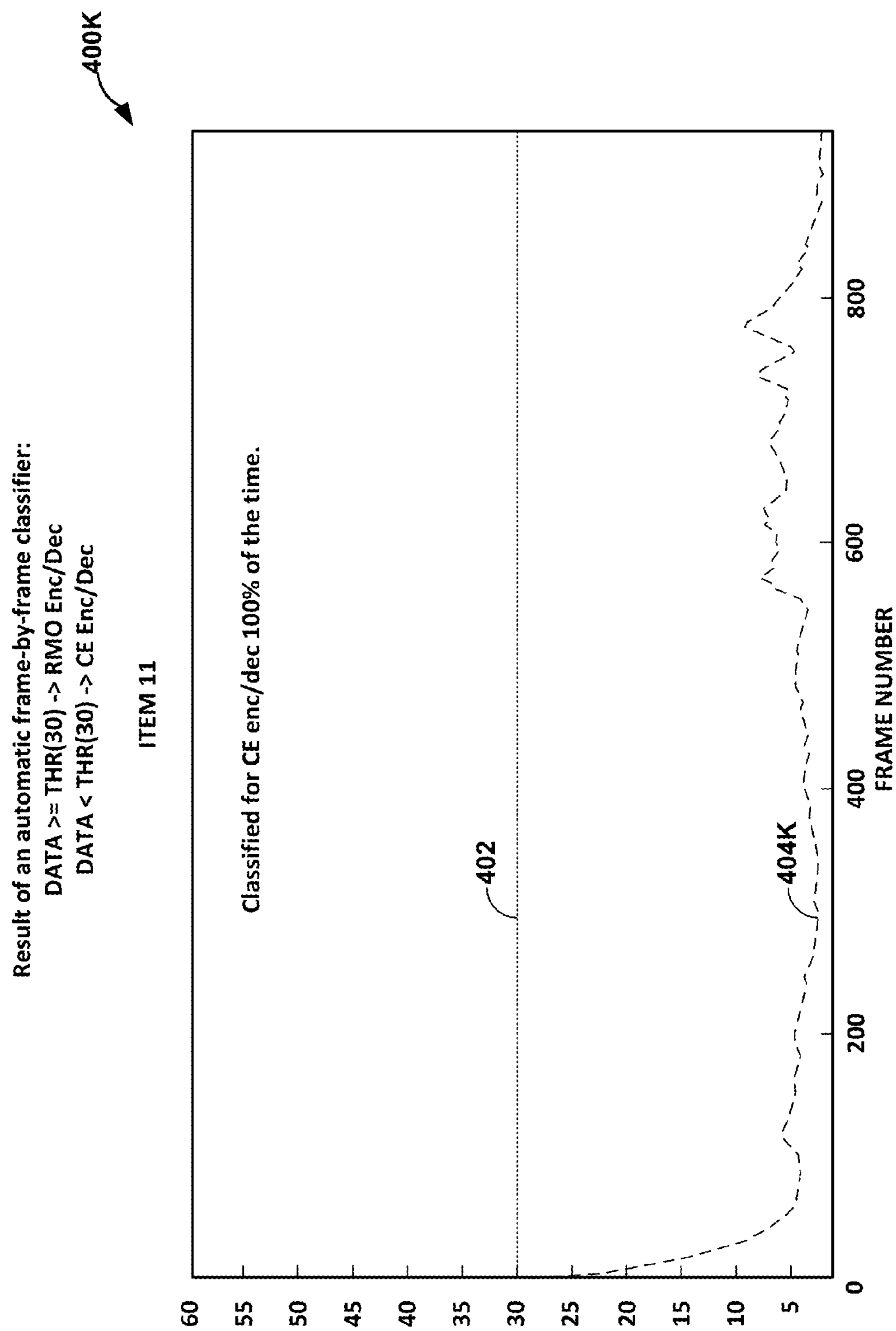
Figure 31L:
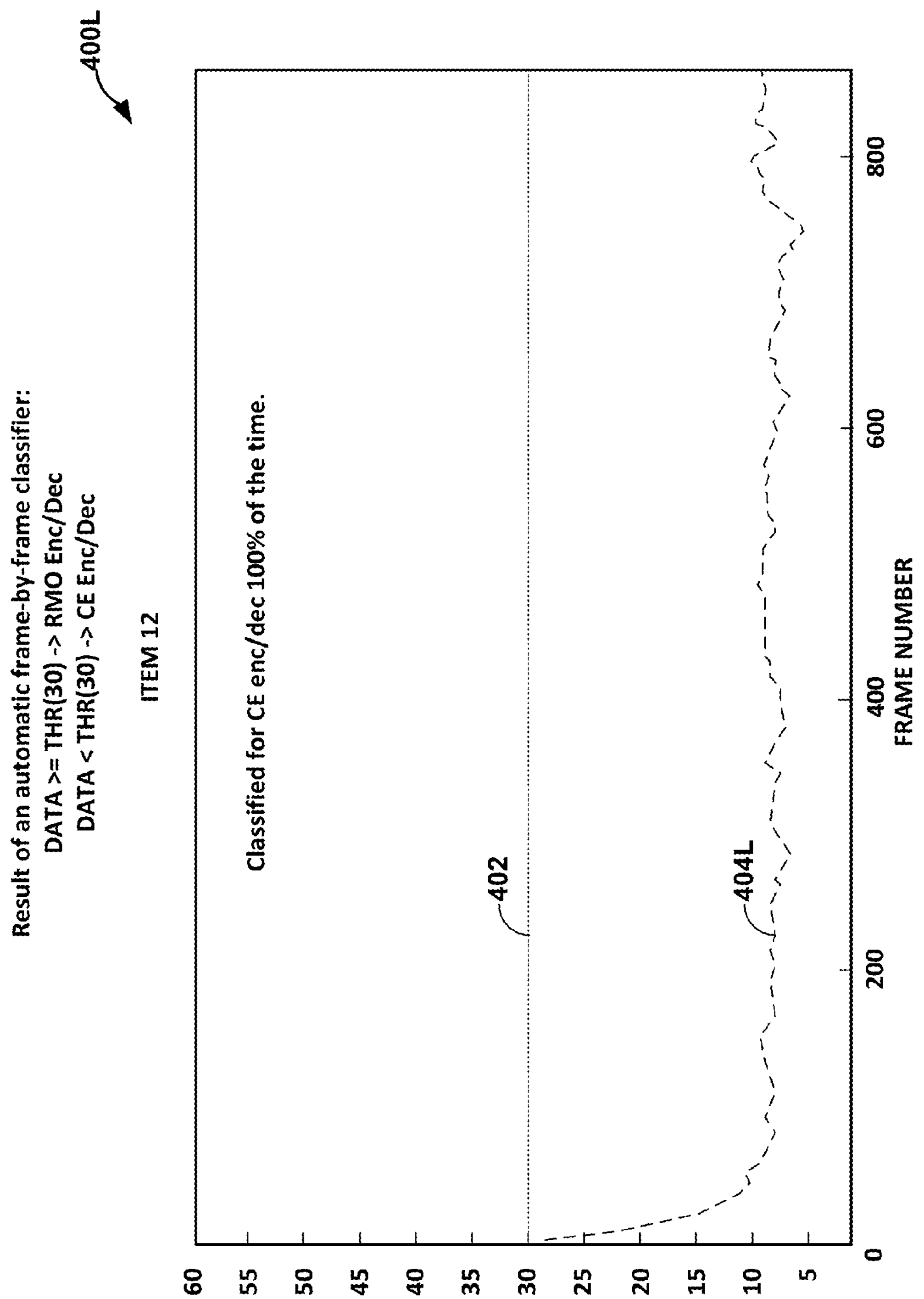

When the audio objects 404 through the analysis described above with respect to the content analysis unit 26 are determined to be under the threshold 402, the content analysis unit 26 determines that the corresponding one of the audio objects 404 represents an audio object that has been recorded. As shown in the examples of FIGS. 31B, 31D-31H and 31J-31L, the content analysis unit 26 determines that audio objects 404B, 404D-404H, 404J-404L are below the threshold 402 (at least +90% of the time and often 100% of the time) and therefore represent recorded audio objects. As shown in the examples of FIGS. 31A, 31C and 31I, the content analysis unit 26 determines that the audio objects 404A, 404C and 404I exceed the threshold 402 and therefore represent synthetic audio objects.

Figure 31M:
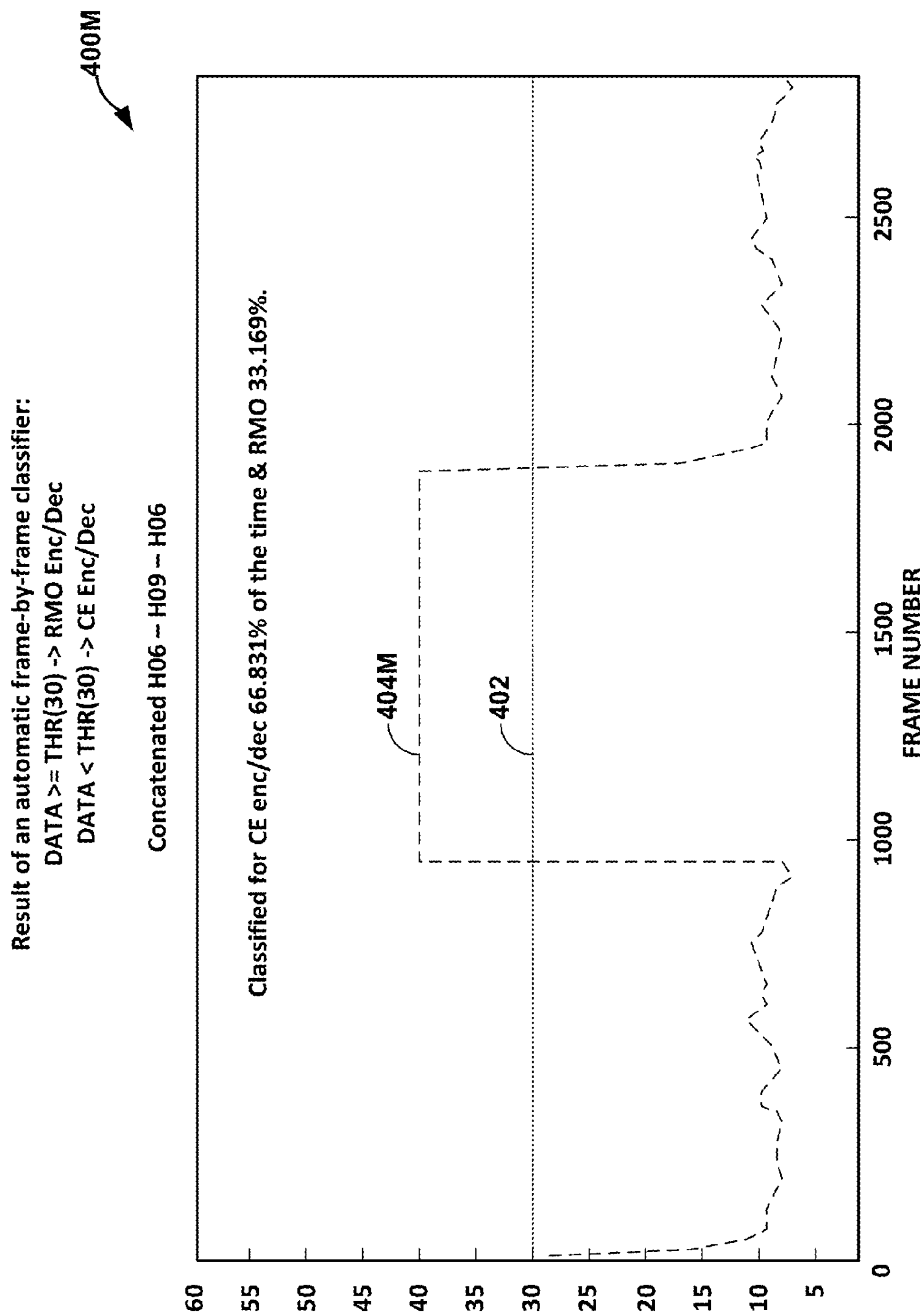

In the example of FIG. 31M, the audio object 404M represents a mixed synthetic/recorded audio object, having some synthetic portions (e.g., above the threshold 402) and some synthetic portions (e.g., below the threshold 402). The content analysis unit 26 in this instance identifies the synthetic and recorded portions of the audio object 404M with the result that the audio encoding device 20 generates the bitstream 21 to include both a directionality-based encoded audio data and a vector-based encoded audio data.

Figure 32:
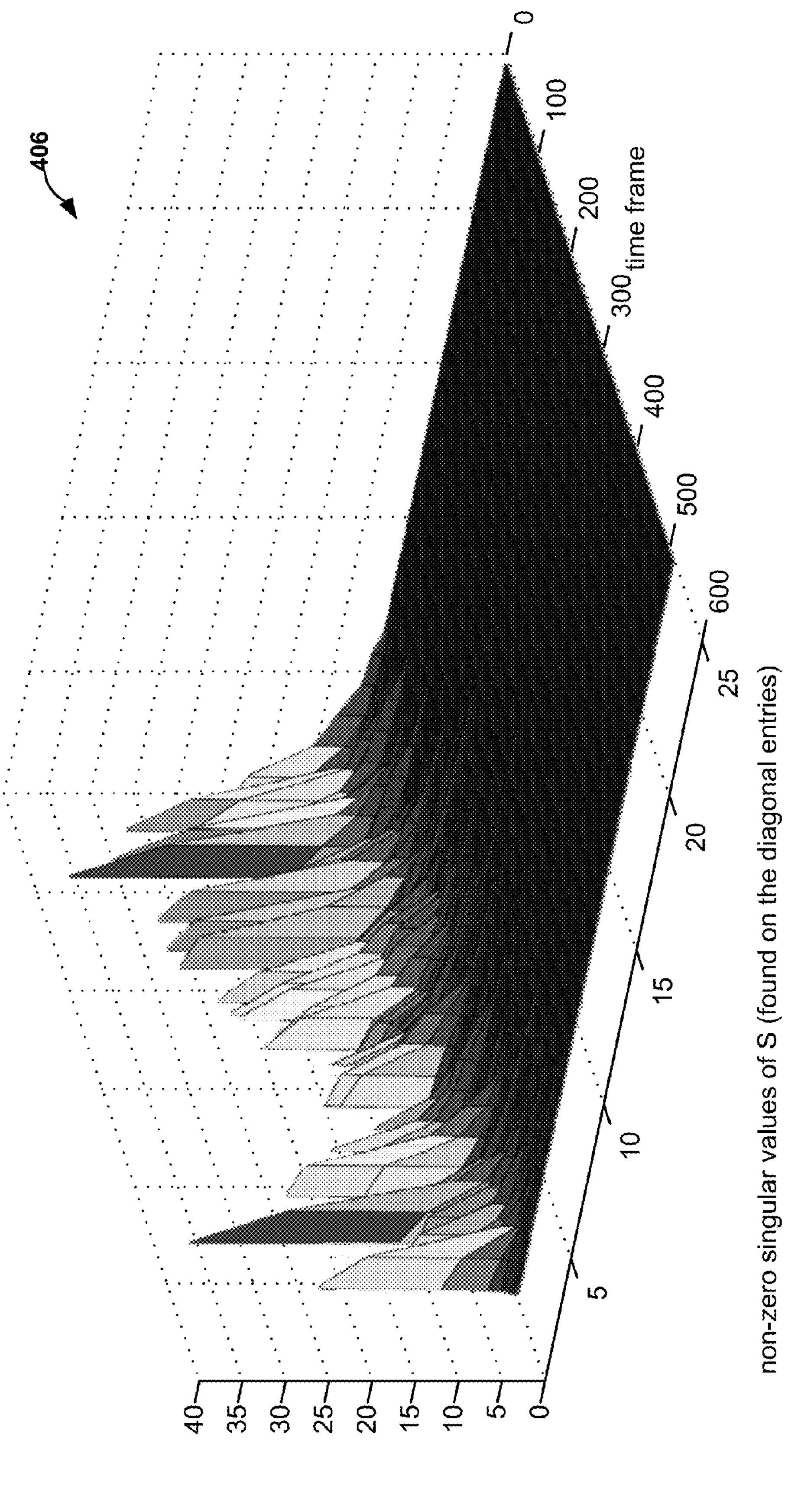
FIG. 32 is a diagram illustrating a graph of singular values from an S matrix decomposed from higher order ambisonic coefficients in accordance with the techniques described in this disclosure.

FIG. 32 is a diagram illustrating a graph 406 of singular values from an S matrix decomposed from higher order ambisonic coefficients in accordance with the techniques described in this disclosure. As shown in FIG. 32, the non-zero singular values having large values are few. The soundfield analysis unit 44 of FIG. 4 may analyze these singular values to determine the nFG foreground (or, in other words, predominant) components (often, represented by vectors) of the reordered US[k] vectors 33' and the reordered V[k] vectors 35'.

Figure 33A:
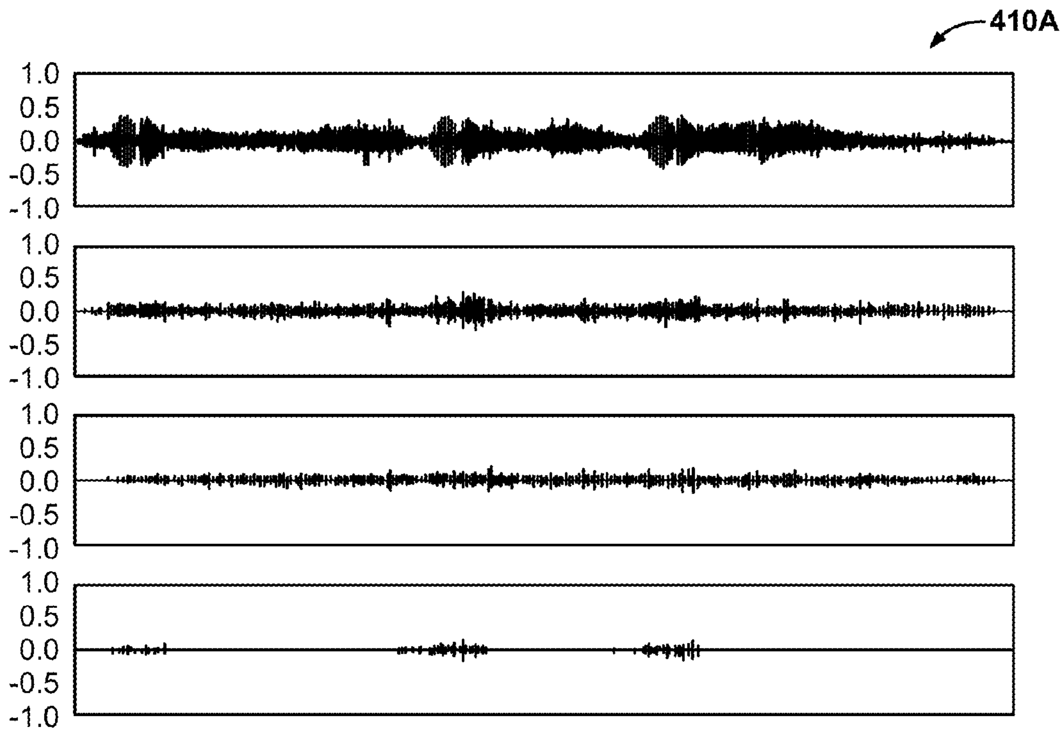
FIGS. 33A and 33B are diagrams illustrating respective graphs showing a potential impact reordering has when encoding the vectors describing foreground components of the soundfield in accordance with the techniques described in this disclosure.
Figure 33B:
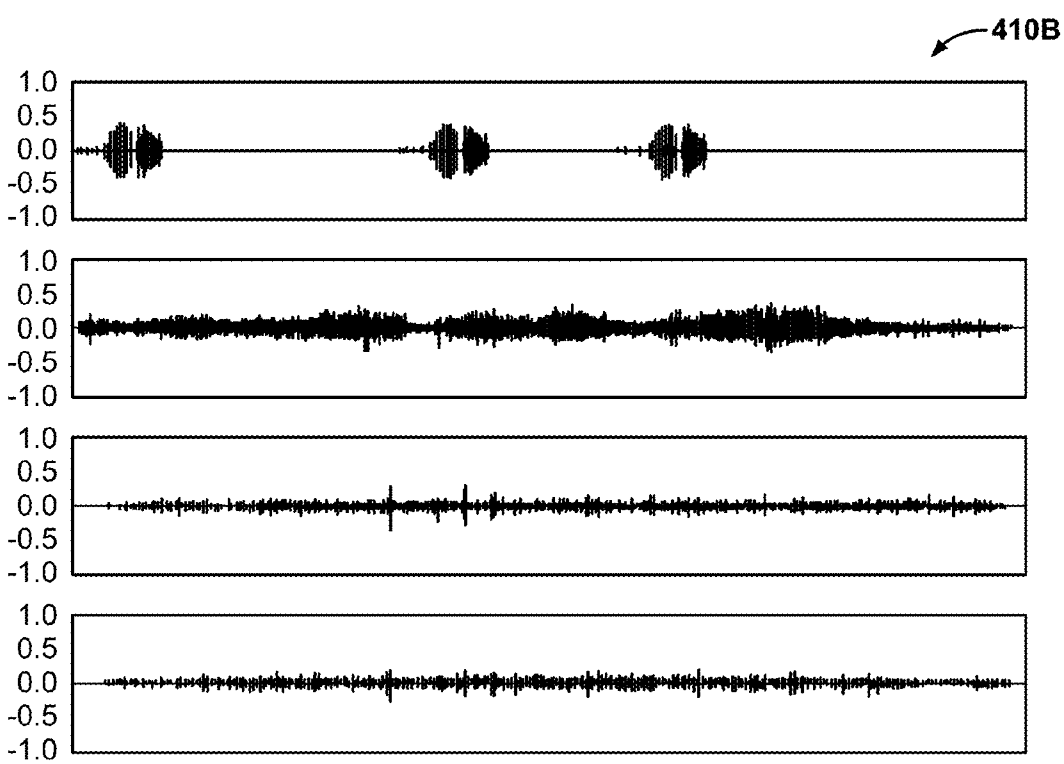

FIGS. 33A and 33B are diagrams illustrating respective graphs 410A and 410B showing a potential impact reordering has when encoding the vectors describing foreground components of the soundfield in accordance with the techniques described in this disclosure. Graph 410A shows the result of encoding at least some of the unordered (or, in other words, the original) US[k] vectors 33, while graph 410B shows the result of encoding the corresponding ones of the ordered US[k] vectors 33'. The top plot in each of graphs 410A and 410B show the error in encoding, where there is likely only noticeable error in the graph 410B at frame boundaries. Accordingly, the reordering techniques described in this disclosure may facilitate or otherwise promote coding of mono-audio objects using a legacy audio coder.

Figure 34:
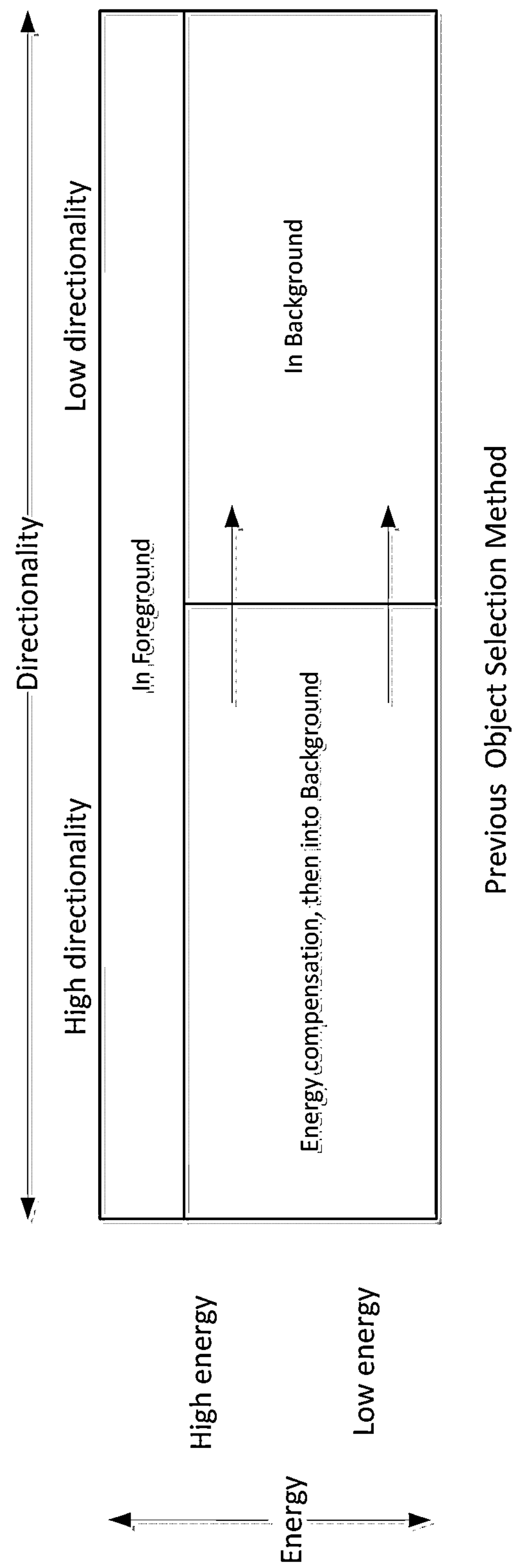
FIGS. 34 and 35 are conceptual diagrams illustrating differences between solely energy-based and directionality-based identification of distinct audio objects, in accordance with this disclosure.
Figure 35:
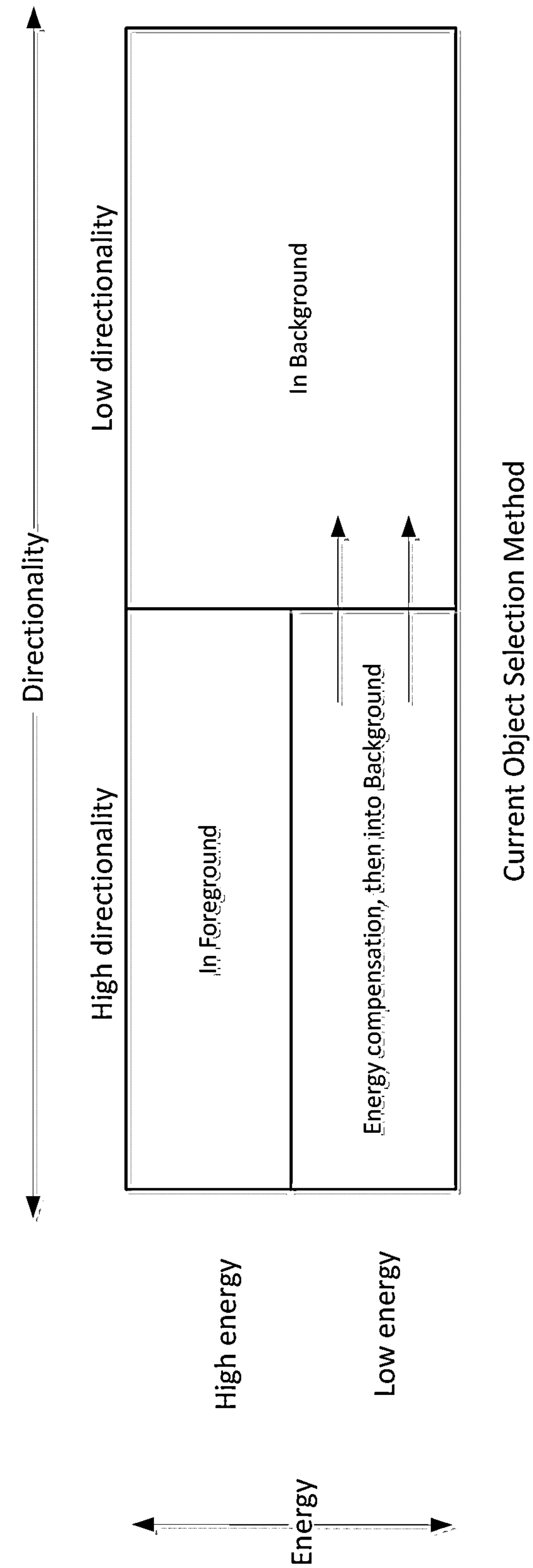

FIGS. 34 and 35 are conceptual diagrams illustrating differences between solely energy-based and directionality-based identification of distinct audio objects, in accordance with this disclosure. In the example of FIG. 34, vectors that exhibit greater energy are identified as being distinct audio objects, regardless of the directionality. As shown in FIG. 34, audio objects that are positioned according to higher energy values (plotted on a y-axis) are determined to be "in foreground," regardless of the directionality (e.g., represented by directionality quotients plotted on an x-axis).

FIG. 35 illustrates identification of distinct audio objects based on both of directionality and energy, such as in accordance with techniques implemented by the soundfield analysis unit 44 of FIG. 4. As shown in FIG. 35, greater directionality quotients are plotted towards the left of the x-axis, and greater energy levels are plotted toward the top of the y-axis. In this example, the soundfield analysis unit 44 may determine that distinct audio objects (e.g., that are "in foreground") are associated with vector data plotted relatively towards the top left of the graph. As one example, the soundfield analysis unit 44 may determine that those vectors that are plotted in the top left quadrant of the graph are associated with distinct audio objects.

Figure 36A:
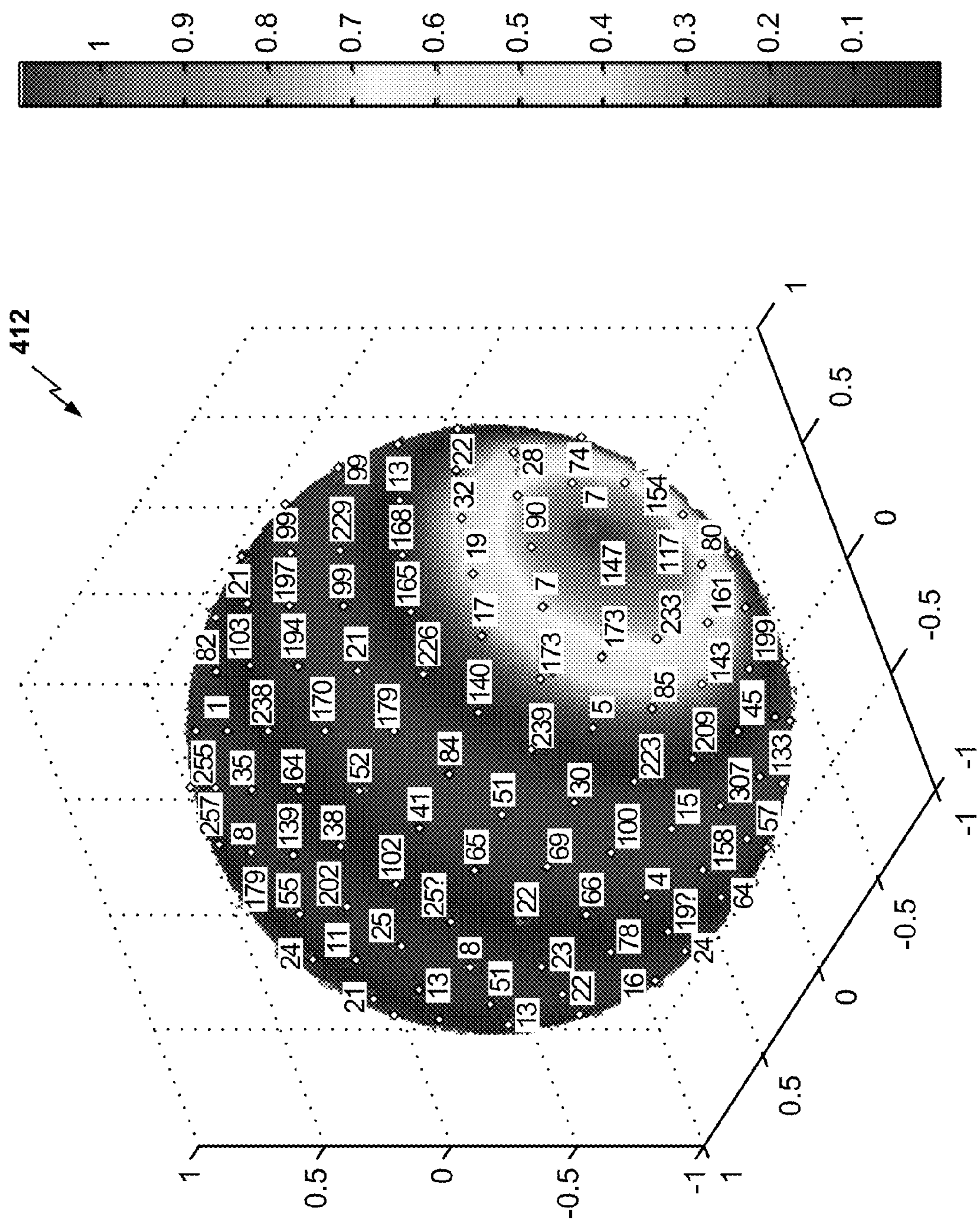
FIGS. 36A-36G are diagrams illustrating projections of at least a portion of decomposed version of spherical harmonic coefficients into the spatial domain so as to perform interpolation in accordance with various aspects of the techniques described in this disclosure.

FIGS. 36A-36F are diagrams illustrating projections of at least a portion of decomposed version of spherical harmonic coefficients into the spatial domain so as to perform interpolation in accordance with various aspects of the techniques described in this disclosure. FIG. 36A is a diagram illustrating projection of one or more of the V[k] vectors 35 onto a sphere 412. In the example of FIG. 36A, each number identifies a different spherical harmonic coefficient projected onto the sphere (possibly associated with one row and/or column of the V matrix 19'). The different colors suggest a direction of a distinct audio component, where the lighter (and progressively darker) color denotes the primary direction of the distinct component. The spatio-temporal interpolation unit 50 of the audio encoding device 20 shown in the example of FIG. 4 may perform spatio-temporal interpolation between each of the red points to generate the sphere shown in the example of FIG. 36A.

Figure 36B:
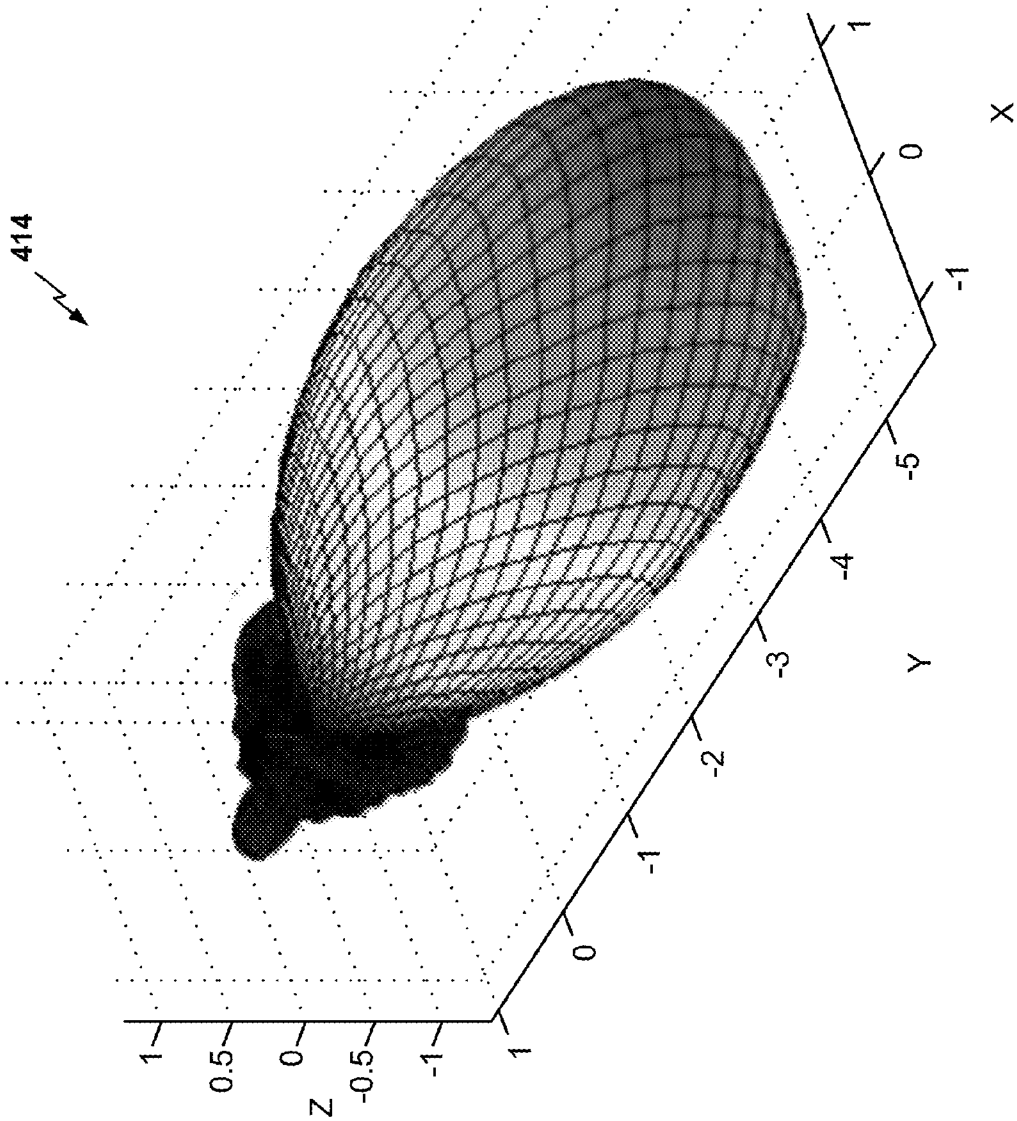

FIG. 36B is a diagram illustrating projection of one or more of the V[k] vectors 35 onto a beam. The spatio-temporal interpolation unit 50 may project one row and/or column of the V[k] vectors 35 or multiple rows and/or columns of the V[k] vectors 35 to generate the beam 414 shown in the example of FIG. 36B.

Figure 36C:
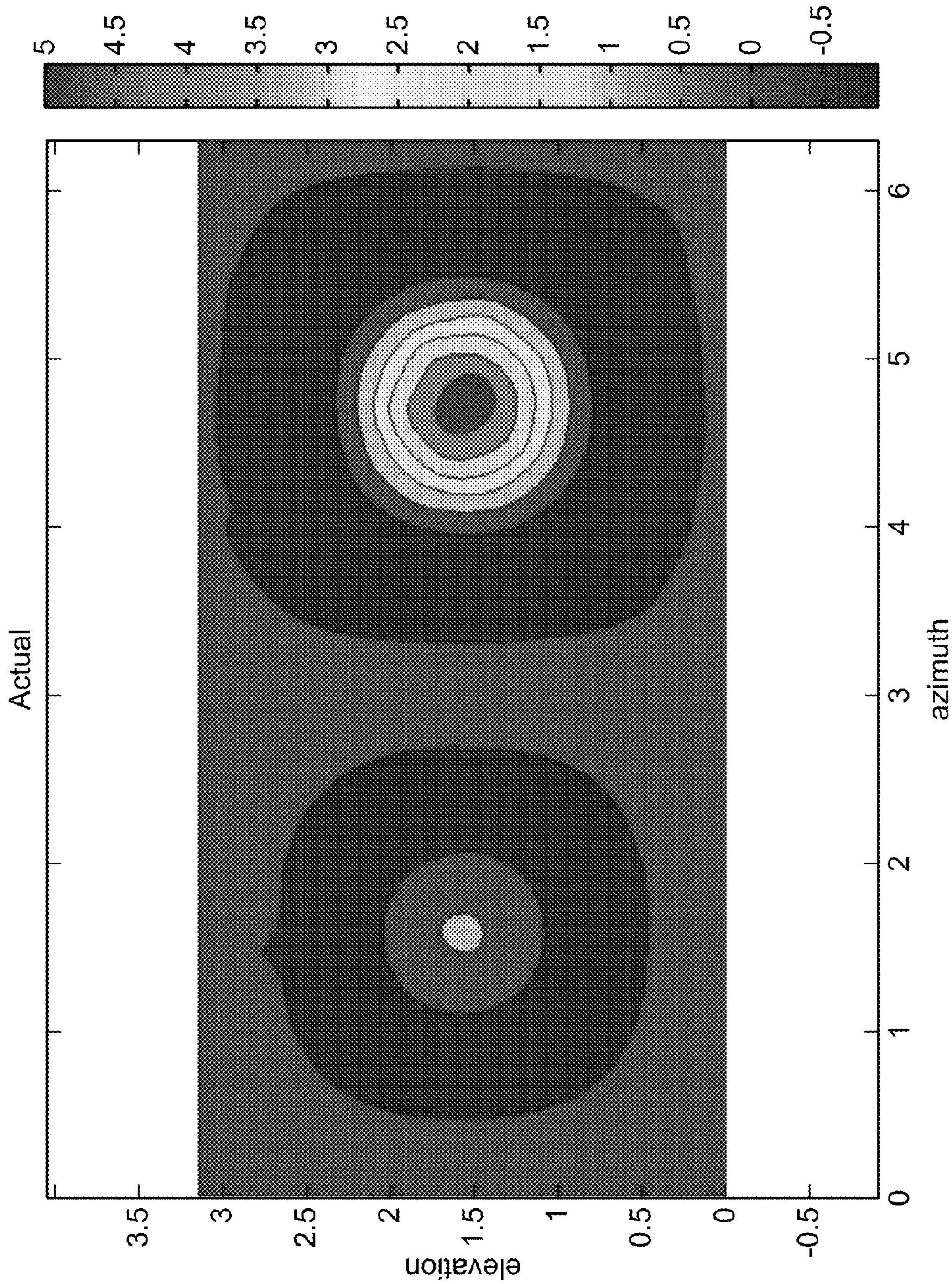
Figure 36D:
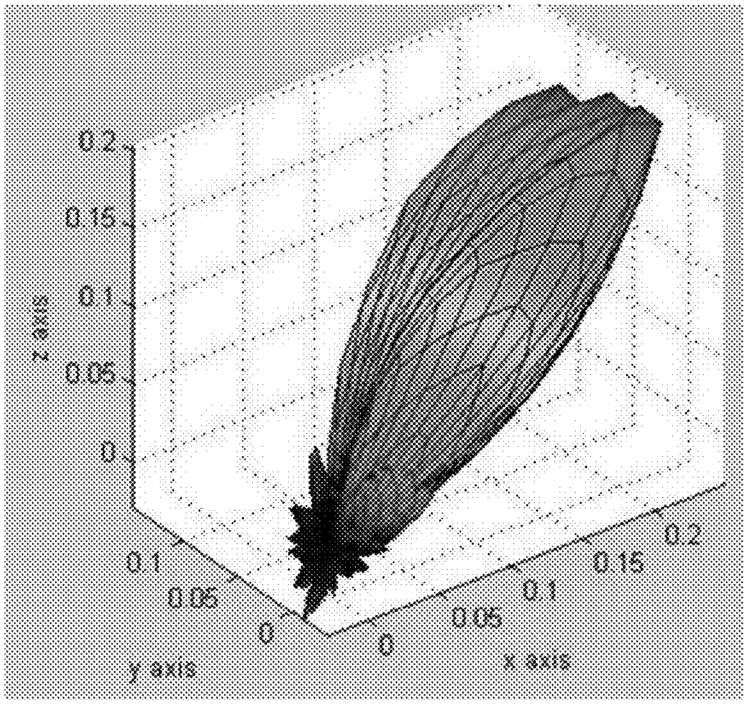
Figure 36E:
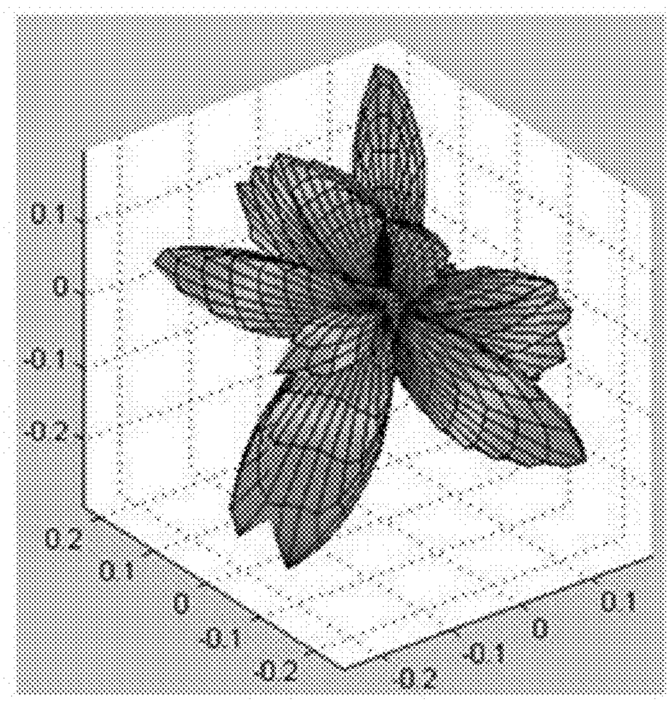
Figure 36F:
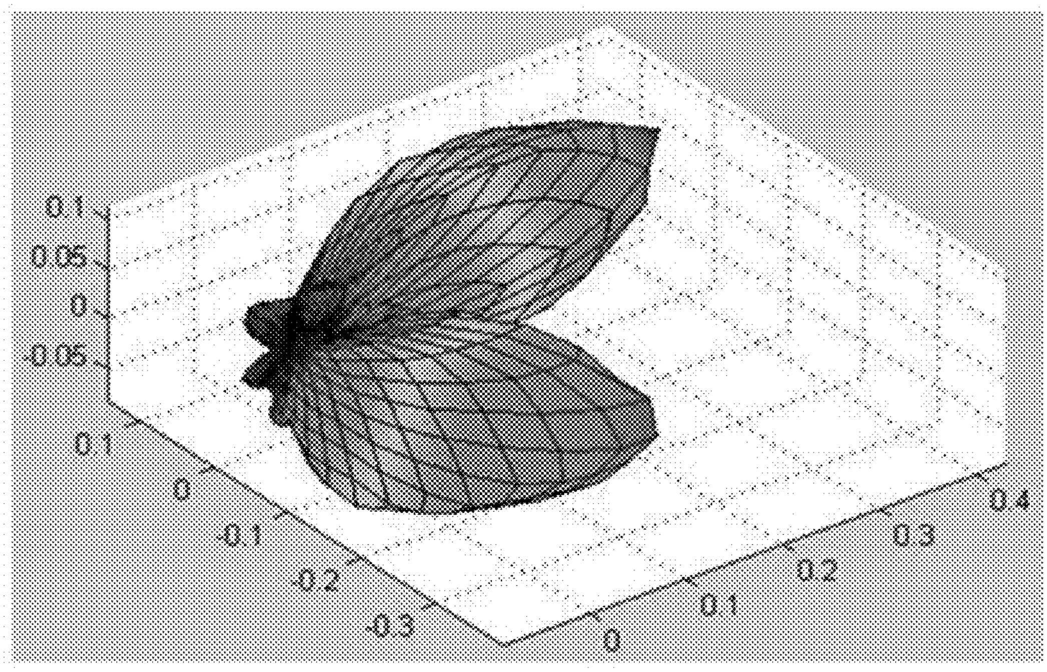
Figure 36G:
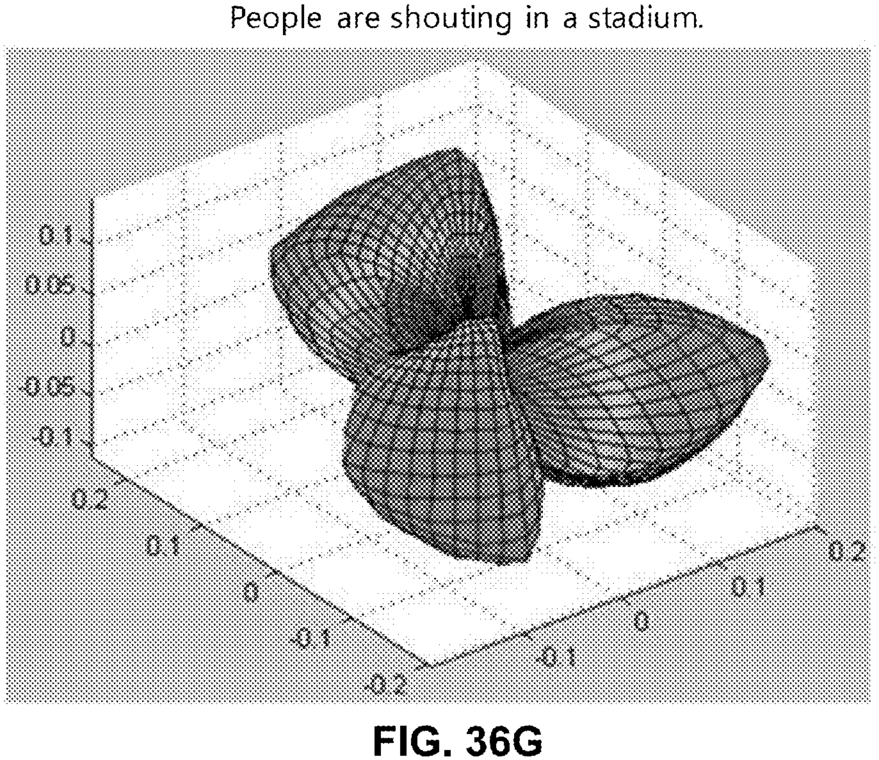

FIG. 36C is a diagram illustrating a cross section of a projection of one or more vectors of one or more of the V[k] vectors 35 onto a sphere, such as the sphere 412 shown in the example of FIG. 36.

Shown in FIGS. 36D-36G are examples of snapshots of time (over 1 frame of about 20 milliseconds) when different sound sources (bee, helicopter, electronic music, and people in a stadium) may be illustrated in a three-dimensional space.

The techniques described in this disclosure allow for the representation of these different sound sources to be identified and represented using a single US[k] vector and a single V[k] vector. The temporal variability of the sound sources are represented in the US[k] vector while the spatial distribution of each sound source is represented by the single V[k] vector. One V[k] vector may represent the width, location and size of the sound source. Moreover, the single V[k] vector may be represented as a linear combination of spherical harmonic basis functions. In the plots of FIGS. 36D-36G, the representation of the sound sources are based on transforming the single V vector into a spatial coordinate system. Similar methods of illustrating sound sources are used in FIGS. 36-36C.

Figure 37:
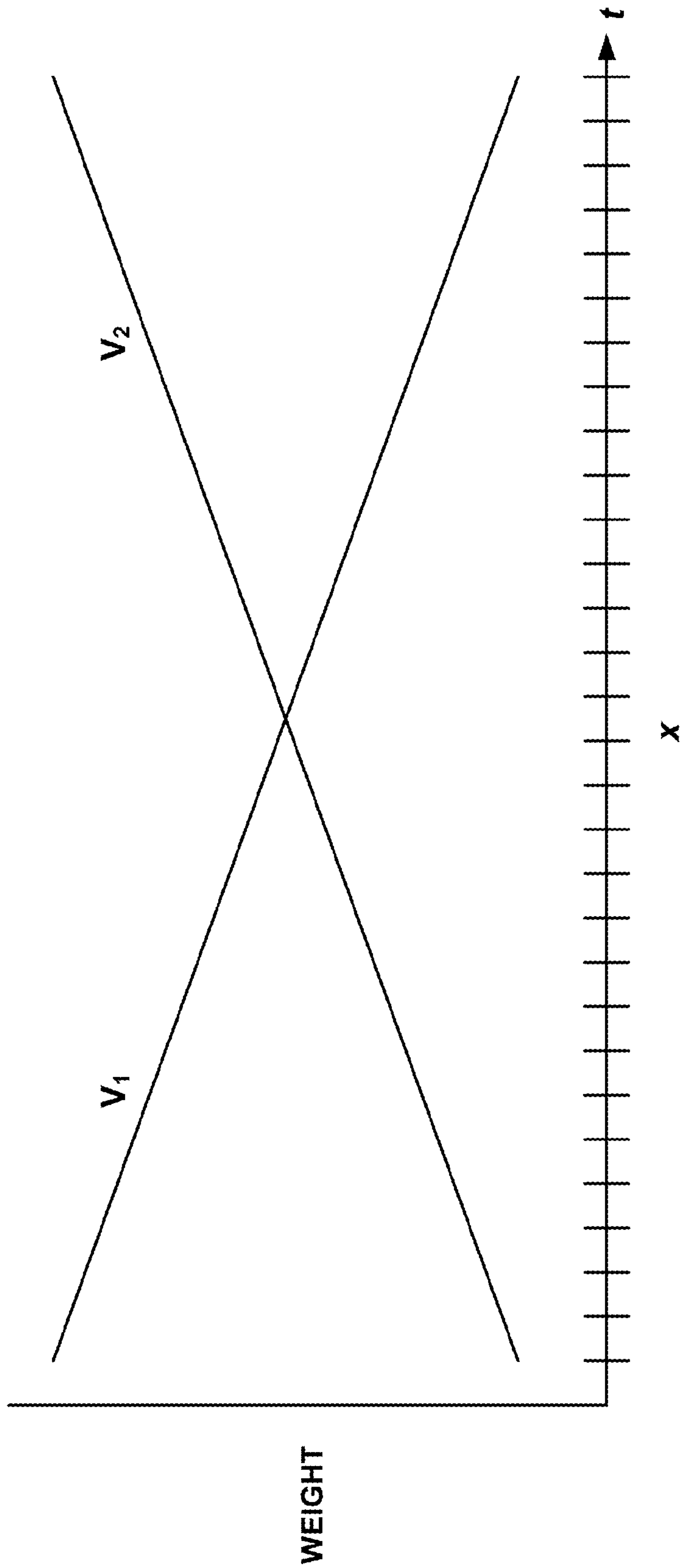
FIG. 37 illustrates a representation of techniques for obtaining a spatio-temporal interpolation as described herein.

FIG. 37 illustrates a representation of techniques for obtaining a spatio-temporal interpolation as described herein. The spatio-temporal interpolation unit 50 of the audio encoding device 20 shown in the example of FIG. 4 may perform the spatio-temporal interpolation described below in more detail. The spatio-temporal interpolation may include obtaining higher-resolution spatial components in both the spatial and time dimensions. The spatial components may be based on an orthogonal decomposition of a multi-dimensional signal comprised of higher-order ambisonic (HOA) coefficients (or, as HOA coefficients may also be referred, "spherical harmonic coefficients").

In the illustrated graph, vectors $V_1$ and $V_2$ represent corresponding vectors of two different spatial components of a multi-dimensional signal. The spatial components may be obtained by a block-wise decomposition of the multi-dimensional signal. In some examples, the spatial components result from performing a block-wise form of SVD with respect to each block (which may refer to a frame) of higher-order ambisonics (HOA) audio data (where this ambisonics audio data includes blocks, samples or any other form of multi-channel audio data). A variable M may be used to denote the length of an audio frame in samples.

Accordingly, $V_1$ and $V_2$ may represent corresponding vectors of the foreground V[k] vectors $\mathbf{51}_k$ and the foreground V[k−1] vectors $\mathbf{51}_{k-1}$ for sequential blocks of the HOA coefficients 11. $V_1$ may, for instance, represent a first vector of the foreground V[k−1] vectors $\mathbf{51}_{k-1}$ for a first frame (k−1), while $V_2$ may represent a first vector of a foreground V[k] vectors $\mathbf{51}_k$ for a second and subsequent frame (k). $V_1$ and $V_2$ may represent a spatial component for a single audio object included in the multi-dimensional signal.

Interpolated vectors $V_x$ for each x is obtained by weighting $V_1$ and $V_2$ according to a number of time segments or "time samples", x, for a temporal component of the multi-dimensional signal to which the interpolated vectors $V_x$ may be applied to smooth the temporal (and, hence, in some cases the spatial) component. Assuming an SVD composition, as described above, smoothing the nFG signals 49 may be obtained by doing a vector division of each time sample vector (e.g., a sample of the HOA coefficients 11) with the corresponding interpolated $V_x$. That is, $US[n]=HOA[n]*V_x[n]^{-1}$, where this represents a row vector multiplied by a column vector, thus producing a scalar element for US. V[n]' may be obtained as a pseudoinverse of V[n].

With respect to the weighting of $V_1$ and $V_2$, $V_1$ is weighted proportionally lower along the time dimension due to the $V_2$ occurring subsequent in time to $V_1$. That is, although the foreground V[k−1] vectors $\mathbf{51}_{k-1}$ are spatial components of the decomposition, temporally sequential foreground V[k] vectors $\mathbf{51}_k$ represent different values of the spatial component over time. Accordingly, the weight of $V_1$ diminishes while the weight of $V_2$ grows as x increases along t. Here, $d_1$ and $d_2$ represent weights.

Figure 38:
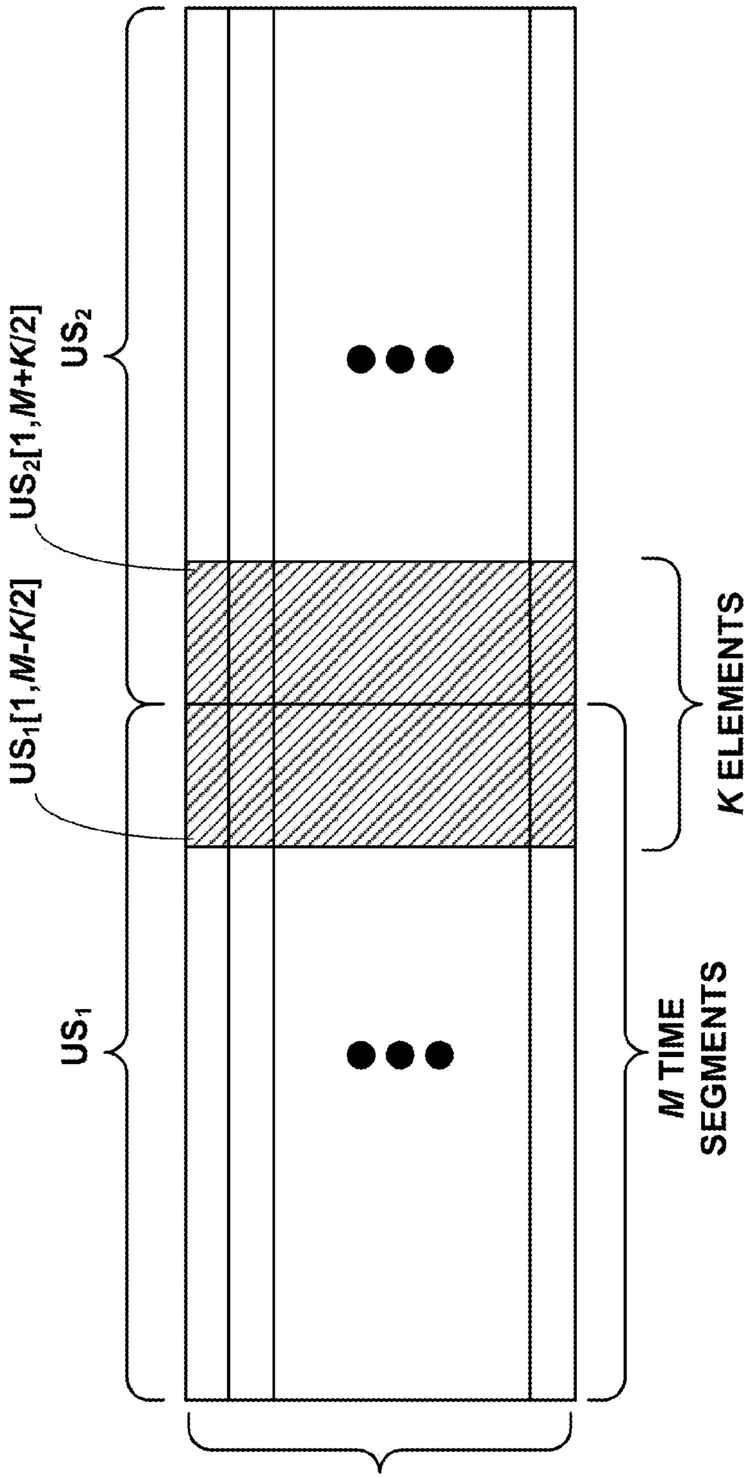
FIG. 38 is a block diagram illustrating artificial US matrices, $US_1$ and $US_2$, for sequential SVD blocks for a multi-dimensional signal according to techniques described herein.

FIG. 38 is a block diagram illustrating artificial US matrices, $US_1$ and $US_2$, for sequential SVD blocks for a multi-dimensional signal according to techniques described herein. Interpolated V-vectors may be applied to the row vectors of the artificial US matrices to recover the original multi-dimensional signal. More specifically, the spatio-temporal interpolation unit 50 may multiply the pseudo-inverse of the interpolated foreground V[k] vectors 53 to the result of multiplying nFG signals 49 by the foreground V[k] vectors $\mathbf{51}_k$ (which may be denoted as foreground HOA coefficients) to obtain K/2 interpolated samples, which may be used in place of the K/2 samples of the nFG signals as the first K/2 samples as shown in the example of FIG. 38 of the $U_2$ matrix.

Figure 39:
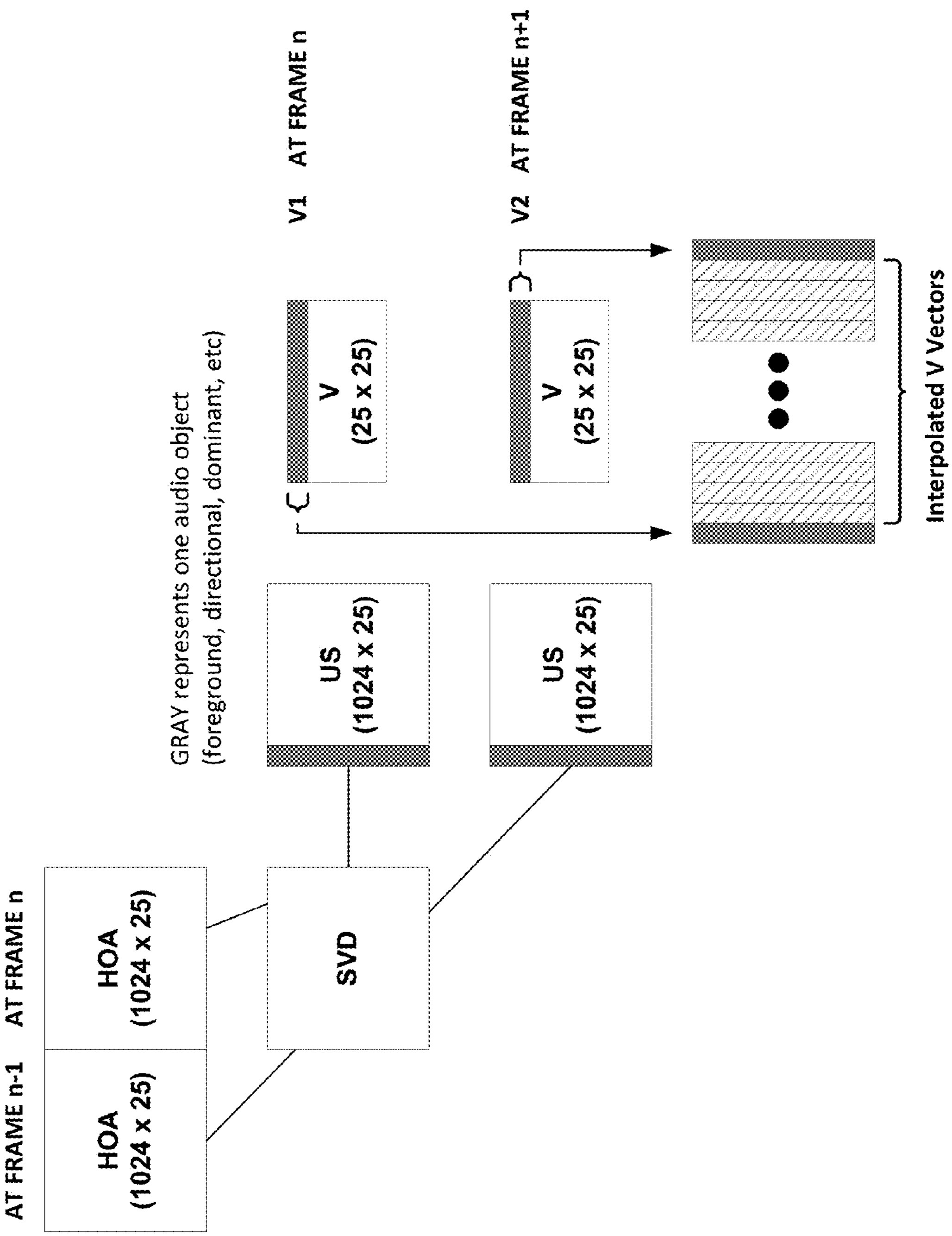
FIG. 39 is a block diagram illustrating decomposition of subsequent frames of a higher-order ambisonics (HOA) signal using Singular Value Decomposition and smoothing of the spatio-temporal components according to techniques described in this disclosure.

FIG. 39 is a block diagram illustrating decomposition of subsequent frames of a higher-order ambisonics (HOA) signal using Singular Value Decomposition and smoothing of the spatio-temporal components according to techniques described in this disclosure. Frame n−1 and frame n (which may also be denoted as frame n and frame n+1) represent subsequent frames in time, with each frame comprising 1024 time segments and having HOA order of 4, giving $(4+1)^2=25$ coefficients. US-matrices that are artificially smoothed U-matrices at frame n−1 and frame n may be obtained by application of interpolated V-vectors as illustrated. Each gray row or column vectors represents one audio object.

Compute HOA Representation of Active Vector Based Signals

The instantaneous CVECk is created by taking each of the vector based signals represented in XVECk and multiplying it with its corresponding (dequantized) spatial vector, VVECk. Each VVECk is represented in MVECk. Thus, for an order L HOA signal, and M vector based signals, there will be M vector based signals, each of which will have dimension given by the frame-length,P. These signals can thus be represented as:,XVECkmn, n=0 . . . P−1; m=0, . . . M−1. Correspondingly, there will beM spatial vectors, VVECk of dimension(L+1)2. These can be represented asMVECkml, l=0 . . . , (L+1)2−1; m=0 . . . , M−1. The HOA representation for each vector based signal, CVECkm, is a matrix vector multiplication given by:

$$CVECkm=(XVECkm(MVECkm)T)T$$

which, produces a matrix of (L+1)2 by P. The complete HOA representation is given by summing the contribution of each vector based signal as follows:

$$CVECk=m=0M-1CVECk[m]$$

Spatio-Temporal Interpolation of V-Vectors

However, in order to maintain smooth spatio-temporal continuity, the above computation is only carried out for part of the frame-length, P-B. The firstB samples of a HOA matrix, are instead carried out by using an interpolated set of MVECkml, m=0 . . . , M−1; l=0 . . . (L+1)2, derived from the current MVECkm and previous values MVECk-1m. This results in a higher time density spatial vector as we derive a vector for each time sample, p, as follows:

$$MVECkmp=pB-1MVECkm+B-1-pB-1MVECk-1m,\quad p=0, \ldots ,B-1.$$

For each time sample p, a new HOA vector of (L+1)2 dimension is computed as:

$$CVECkp=(XVECkmp)MVECkmp,\ p=0 \ldots ,B-1$$

These, firstB samples are augmented with the P−B samples of the previous section to result in the complete HOA representation,CVECkm, of the mth vector based signal.

At the decoder (e.g., the audio decoding device 24 shown in the example of FIG. 5), for certain distinct, foreground, or Vector-based-predominant sound, the V-vector from the previous frame and the V-vector from the current frame may be interpolated using linear (or non-linear) interpolation to produce a higher-resolution (in time) interpolated V-vector over a particular time segment. The spatio temporal interpolation unit 76 may perform this interpolation, where the spatio-temporal interpolation unit 76 may then multiple the US vector in the current frame with the higher-resolution interpolated V-vector to produce the HOA matrix over that particular time segment.

Alternatively, the spatio-temporal interpolation unit 76 may multiply the US vector with the V-vector of the current frame to create a first HOA matrix. The decoder may additionally multiply the US vector with the V-vector from the previous frame to create a second HOA matrix. The spatio-temporal interpolation unit 76 may then apply linear (or non-linear) interpolation to the first and second HOA matrices over a particular time segment. The output of this interpolation may match that of the multiplication of the US vector with an interpolated V-vector, provided common input matrices/vectors.

In this respect, the techniques may enable the audio encoding device 20 and/or the audio decoding device 24 to be configured to operate in accordance with the following clauses.

Clause 135054-1C. A device, such as the audio encoding device 20 or the audio decoding device 24, comprising: one or more processors configured to obtain a plurality of higher resolution spatial components in both space and time, wherein the spatial components are based on an orthogonal decomposition of a multi-dimensional signal comprised of spherical harmonic coefficients.

Clause 135054-1D. A device, such as the audio encoding device 20 or the audio decoding device 24, comprising: one or more processors configured to smooth at least one of spatial components and time components of the first plurality of spherical harmonic coefficients and the second plurality of spherical harmonic coefficients.

Clause 135054-1E. A device, such as the audio encoding device 20 or the audio decoding device 24, comprising: one or more processors configured to obtain a plurality of higher resolution spatial components in both space and time, wherein the spatial components are based on an orthogonal decomposition of a multi-dimensional signal comprised of spherical harmonic coefficients.

Clause 135054-1G. A device, such as the audio encoding device 20 or the audio decoding device 24, comprising: one or more processors configured to obtain decomposed increased resolution spherical harmonic coefficients for a time segment by, at least in part, increasing a resolution with respect to a first decomposition of a first plurality of spherical harmonic coefficients and a second decomposition of a second plurality of spherical harmonic coefficients.

Clause 135054-2G. The device of clause 135054-1G, wherein the first decomposition comprises a first V matrix representative of right-singular vectors of the first plurality of spherical harmonic coefficients.

Clause 135054-3G. The device of clause 135054-1G, wherein the second decomposition comprises a second V matrix representative of right-singular vectors of the second plurality of spherical harmonic coefficients.

Clause 135054-4G. The device of clause 135054-1G, wherein the first decomposition comprises a first V matrix representative of right-singular vectors of the first plurality of spherical harmonic coefficients, and wherein the second decomposition comprises a second V matrix representative of right-singular vectors of the second plurality of spherical harmonic coefficients.

Clause 135054-5G. The device of clause 135054-1G, wherein the time segment comprises a sub-frame of an audio frame.

Clause 135054-6G. The device of clause 135054-1G, wherein the time segment comprises a time sample of an audio frame.

Clause 135054-7G. The device of clause 135054-1G, wherein the one or more processors are configured to obtain an interpolated decomposition of the first decomposition and the second decomposition for a spherical harmonic coefficient of the first plurality of spherical harmonic coefficients.

Clause 135054-8G. The device of clause 135054-1G, wherein the one or more processors are configured to obtain interpolated decompositions of the first decomposition for a first portion of the first plurality of spherical harmonic coefficients included in the first frame and the second decomposition for a second portion of the second plurality of spherical harmonic coefficients included in the second frame, wherein the one or more processors are further configured to apply the interpolated decompositions to a first time component of the first portion of the first plurality of spherical harmonic coefficients included in the first frame to generate a first artificial time component of the first plurality of spherical harmonic coefficients, and apply the respective interpolated decompositions to a second time component of the second portion of the second plurality of spherical harmonic coefficients included in the second frame to generate a second artificial time component of the second plurality of spherical harmonic coefficients included.

Clause 135054-9G. The device of clause 135054-8G, wherein the first time component is generated by performing a vector-based synthesis with respect to the first plurality of spherical harmonic coefficients.

Clause 135054-10G. The device of clause 135054-8G, wherein the second time component is generated by performing a vector-based synthesis with respect to the second plurality of spherical harmonic coefficients.

Clause 135054-11G. The device of clause 135054-8G, wherein the one or more processors are further configured to receive the first artificial time component and the second artificial time component, compute interpolated decompositions of the first decomposition for the first portion of the first plurality of spherical harmonic coefficients and the second decomposition for the second portion of the second plurality of spherical harmonic coefficients, and apply inverses of the interpolated decompositions to the first artificial time component to recover the first time component and to the second artificial time component to recover the second time component.

Clause 135054-12G. The device of clause 135054-1G, wherein the one or more processors are configured to interpolate a first spatial component of the first plurality of spherical harmonic coefficients and the second spatial component of the second plurality of spherical harmonic coefficients.

Clause 135054-13G. The device of clause 135054-12G, wherein the first spatial component comprises a first U matrix representative of left-singular vectors of the first plurality of spherical harmonic coefficients.

Clause 135054-14G. The device of clause 135054-12G, wherein the second spatial component comprises a second U matrix representative of left-singular vectors of the second plurality of spherical harmonic coefficients.

Clause 135054-15G. The device of clause 135054-12G, wherein the first spatial component is representative of M time segments of spherical harmonic coefficients for the first plurality of spherical harmonic coefficients and the second spatial component is representative of M time segments of spherical harmonic coefficients for the second plurality of spherical harmonic coefficients.

Clause 135054-16G. The device of clause 135054-12G, wherein the first spatial component is representative of M time segments of spherical harmonic coefficients for the first plurality of spherical harmonic coefficients and the second spatial component is representative of M time segments of spherical harmonic coefficients for the second plurality of spherical harmonic coefficients, and wherein the one or more processors are configured to obtain the decomposed interpolated spherical harmonic coefficients for the time segment comprises interpolating the last N elements of the first spatial component and the first N elements of the second spatial component.

Clause 135054-17G. The device of clause 135054-1G, wherein the second plurality of spherical harmonic coefficients are subsequent to the first plurality of spherical harmonic coefficients in the time domain.

Clause 135054-18G. The device of clause 135054-1G, wherein the one or more processors are further configured to decompose the first plurality of spherical harmonic coefficients to generate the first decomposition of the first plurality of spherical harmonic coefficients.

Clause 135054-19G. The device of clause 135054-1G, wherein the one or more processors are further configured to decompose the second plurality of spherical harmonic coefficients to generate the second decomposition of the second plurality of spherical harmonic coefficients.

Clause 135054-20G. The device of clause 135054-1G, wherein the one or more processors are further configured to perform a singular value decomposition with respect to the first plurality of spherical harmonic coefficients to generate a U matrix representative of left-singular vectors of the first plurality of spherical harmonic coefficients, an S matrix representative of singular values of the first plurality of spherical harmonic coefficients and a V matrix representative of right-singular vectors of the first plurality of spherical harmonic coefficients.

Clause 135054-21G. The device of clause 135054-1G, wherein the one or more processors are further configured to perform a singular value decomposition with respect to the second plurality of spherical harmonic coefficients to generate a U matrix representative of left-singular vectors of the second plurality of spherical harmonic coefficients, an S matrix representative of singular values of the second plurality of spherical harmonic coefficients and a V matrix representative of right-singular vectors of the second plurality of spherical harmonic coefficients.

Clause 135054-22G. The device of clause 135054-1G, wherein the first and second plurality of spherical harmonic coefficients each represent a planar wave representation of the sound field.

Clause 135054-23G. The device of clause 135054-1G, wherein the first and second plurality of spherical harmonic coefficients each represent one or more mono-audio objects mixed together.

Clause 135054-24G. The device of clause 135054-1G, wherein the first and second plurality of spherical harmonic coefficients each comprise respective first and second spherical harmonic coefficients that represent a three dimensional sound field.

Clause 135054-25G. The device of clause 135054-1G, wherein the first and second plurality of spherical harmonic coefficients are each associated with at least one spherical basis function having an order greater than one.

Clause 135054-26G. The device of clause 135054-1G, wherein the first and second plurality of spherical harmonic coefficients are each associated with at least one spherical basis function having an order equal to four.

Clause 135054-27G. The device of clause 135054-1G, wherein the interpolation is a weighted interpolation of the first decomposition and second decomposition, wherein weights of the weighted interpolation applied to the first decomposition are inversely proportional to a time represented by vectors of the first and second decomposition and wherein weights of the weighted interpolation applied to the second decomposition are proportional to a time represented by vectors of the first and second decomposition.

Clause 135054-28G. The device of clause 135054-1G, wherein the decomposed interpolated spherical harmonic coefficients smooth at least one of spatial components and time components of the first plurality of spherical harmonic coefficients and the second plurality of spherical harmonic coefficients.

FIGS. 40A-40J are each a block diagram illustrating example audio encoding devices 510A-510J that may perform various aspects of the techniques described in this disclosure to compress spherical harmonic coefficients describing two or three dimensional soundfields. In each of the examples of FIGS. 40A-40J, the audio encoding devices 510A and 510B each, in some examples, represents any device capable of encoding audio data, such as a desktop computer, a laptop computer, a workstation, a tablet or slate computer, a dedicated audio recording device, a cellular phone (including so-called "smart phones"), a personal media player device, a personal gaming device, or any other type of device capable of encoding audio data.

While shown as a single device, i.e., the devices 510A-510J in the examples of FIGS. 40A-40J, the various components or units referenced below as being included within the devices 510A-510J may actually form separate devices that are external from the devices 510A-510J. In other words, while described in this disclosure as being performed by a single device, i.e., the devices 51A-510J in the examples of FIGS. 40A-40J, the techniques may be implemented or otherwise performed by a system comprising multiple devices, where each of these devices may each include one or more of the various components or units described in more detail below. Accordingly, the techniques should not be limited to the examples of FIG. 40A-40J.

In some examples, the audio encoding devices 510A-510J represent alternative audio encoding devices to that described above with respect to the examples of FIGS. 3 and 4. Throughout the below discussion of audio encoding devices 510A-510J various similarities in terms of operation are noted with respect to the various units 30-52 of the audio encoding device 20 described above with respect to FIG. 4. In many respects, the audio encoding devices 510A-510J may, as described below, operate in a manner substantially similar to the audio encoding device 20 although with slight derivations or modifications.

Figure 40A:
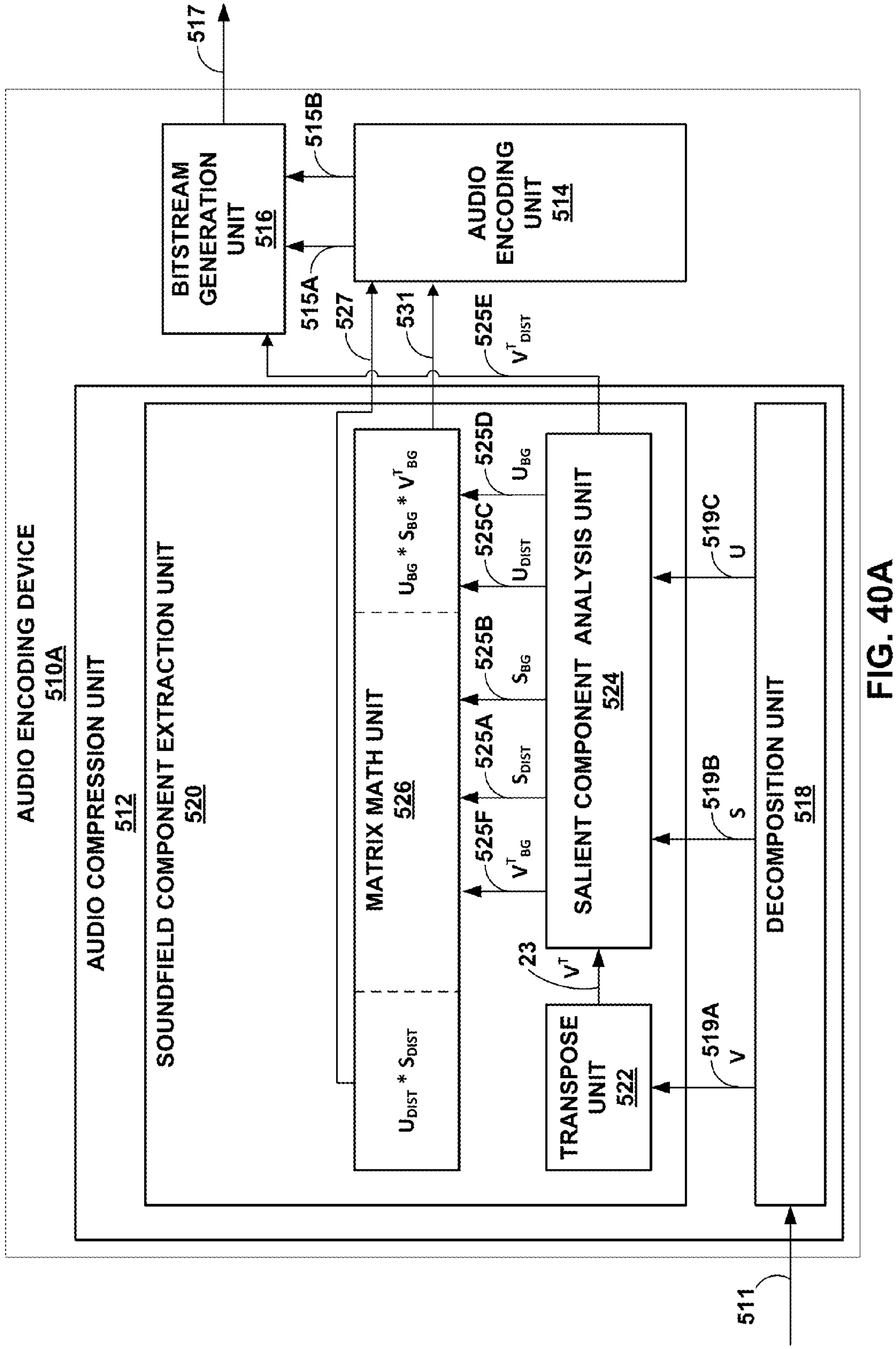
FIGS. 40A-40J are each a block diagram illustrating example audio encoding devices that may perform various aspects of the techniques described in this disclosure to compress spherical harmonic coefficients describing two or three dimensional soundfields.

As shown in the example of FIG. 40A, the audio encoding device 510A comprises an audio compression unit 512, an audio encoding unit 514 and a bitstream generation unit 516. The audio compression unit 512 may represent a unit that compresses spherical harmonic coefficients (SHC) 511 ("SHC 511"), which may also be denoted as higher-order ambisonics (HOA) coefficients 511. The audio compression unit 512 may In some instances, the audio compression unit 512 represents a unit that may losslessly compresses or perform lossy compression with respect to the SHC 511. The SHC 511 may represent a plurality of SHCs, where at least one of the plurality of SHC correspond to a spherical basis function having an order greater than one (where SHC of this variety are referred to as higher order ambisonics (HOA) so as to distinguish from lower order ambisonics of which one example is the so-called "B-format"), as described in more detail above. While the audio compression unit 512 may losslessly compress the SHC 511, in some examples, the audio compression unit 512 removes those of the SHC 511 that are not salient or relevant in describing the soundfield when reproduced (in that some may not be capable of being heard by the human auditory system). In this sense, the lossy nature of this compression may not overly impact the perceived quality of the soundfield when reproduced from the compressed version of the SHC 511.

In the example of FIG. 40A, the audio compression unit includes a decomposition unit 518 and a soundfield component extraction unit 520. The decomposition unit 518 may be similar to the linear invertible transform unit 30 of the audio encoding device 20. That is, the decomposition unit 518 may represent a unit configured to perform a form of analysis referred to as singular value decomposition. While described with respect to SVD, the techniques may be performed with respect to any similar transformation or decomposition that provides for sets of linearly uncorrelated data. Also, reference to "sets" in this disclosure is intended to refer to "non-zero" sets unless specifically stated to the contrary and is not intended to refer to the classical mathematical definition of sets that includes the so-called "empty set."

In any event, the decomposition unit 518 performs a singular value decomposition (which, again, may be denoted by its initialism "SVD") to transform the spherical harmonic coefficients 511 into two or more sets of transformed spherical harmonic coefficients. In the example of FIG. 40, the decomposition unit 518 may perform the SVD with respect to the SHC 511 to generate a so-called V matrix 519, an S matrix 519B and a U matrix 519C. In the example of FIG. 40, the decomposition unit 518 outputs each of the matrices separately rather than outputting the US[k] vectors in combined form as discussed above with respect to the linear invertible transform unit 30.

As noted above, the V* matrix in the SVD mathematical expression referenced above is denoted as the conjugate transpose of the V matrix to reflect that SVD may be applied to matrices comprising complex numbers. When applied to matrices comprising only real-numbers, the complex conjugate of the V matrix (or, in other words, the V* matrix) may be considered equal to the V matrix. Below it is assumed, for ease of illustration purposes, that the SHC 511 comprise real-numbers with the result that the V matrix is output through SVD rather than the V* matrix. While assumed to be the V matrix, the techniques may be applied in a similar fashion to SHC 511 having complex coefficients, where the output of the SVD is the V* matrix. Accordingly, the techniques should not be limited in this respect to only providing for application of SVD to generate a V matrix, but may include application of SVD to SHC 511 having complex components to generate a V* matrix.

In any event, the decomposition unit 518 may perform a block-wise form of SVD with respect to each block (which may refer to a frame) of higher-order ambisonics (HOA) audio data (where this ambisonics audio data includes blocks or samples of the SHC 511 or any other form of multi-channel audio data). A variable M may be used to denote the length of an audio frame in samples. For example, when an audio frame includes 1024 audio samples, M equals 1024. The decomposition unit 518 may therefore perform a block-wise SVD with respect to a block the SHC 511 having M-by-$(N+1)^2$ SHC, where N, again, denotes the order of the HOA audio data. The decomposition unit 518 may generate, through performing this SVD. V matrix 519, S matrix 519B and U matrix 519C, where each of matrixes 519-519C ("matrixes 519") may represent the respective V, S and U matrixes described in more detail above. The decomposition unit 518 may pass or output these matrixes 519A to soundfield component extraction unit 520. The V matrix 519A may be of size $(N+1)^2$-by-$(N+1)^2$, the S matrix 519B may be of size $(N+1)^2$-by-$(N+1)^2$ and the U matrix may be of size M-by-$(N+1)^2$, where M refers to the number of samples in an audio frame. A typical value for M is 1024, although the techniques of this disclosure should not be limited to this typical value for M.

The soundfield component extraction unit 520 may represent a unit configured to determine and then extract distinct components of the soundfield and background components of the soundfield, effectively separating the distinct components of the soundfield from the background components of the soundfield. In this respect, the soundfield component extraction unit 520 may perform many of the operations described above with respect to the soundfield analysis unit 44, the background selection unit 48 and the foreground selection unit 36 of the audio encoding device 20 shown in the example of FIG. 4. Given that distinct components of the soundfield, in some examples, require higher order (relative to background components of the soundfield) basis functions (and therefore more SHC) to accurately represent the distinct nature of these components, separating the distinct components from the background components may enable more bits to be allocated to the distinct components and less bits (relatively, speaking) to be allocated to the background components. Accordingly, through application of this transformation (in the form of SVD or any other form of transform, including PCA), the techniques described in this disclosure may facilitate the allocation of bits to various SHC, and thereby compression of the SHC 511.

Moreover, the techniques may also enable, as described in more detail below with respect to FIG. 40B, order reduction of the background components of the soundfield given that higher order basis functions are not, in some examples, required to represent these background portions of the soundfield given the diffuse or background nature of these components. The techniques may therefore enable compression of diffuse or background aspects of the soundfield while preserving the salient distinct components or aspects of the soundfield through application of SVD to the SHC 511.

As further shown in the example of FIG. 40, the soundfield component extraction unit 520 includes a transpose unit 522, a salient component analysis unit 524 and a math unit 526. The transpose unit 522 represents a unit configured to transpose the V matrix 519A to generate a transpose of the V matrix 519, which is denoted as the "$V^T$ matrix 523." The transpose unit 522 may output this $V^T$ matrix 523 to the math unit 526. The $V^T$ matrix 523 may be of size $(N+1)^2$-by-$(N+1)^2$.

The salient component analysis unit 524 represents a unit configured to perform a salience analysis with respect to the S matrix 519B. The salient component analysis unit 524 may, in this respect, perform operations similar to those described above with respect to the soundfield analysis unit 44 of the audio encoding device 20 shown in the example of FIG. 4. The salient component analysis unit 524 may analyze the diagonal values of the S matrix 519B, selecting a variable D number of these components having the greatest value. In other words, the salient component analysis unit 524 may determine the value D, which separates the two subspaces (e.g., the foreground or predominant subspace and the background or ambient subspace), by analyzing the slope of the curve created by the descending diagonal values of S, where the large singular values represent foreground or distinct sounds and the low singular values represent background components of the soundfield. In some examples, the salient component analysis unit 524 may use a first and a second derivative of the singular value curve. The salient component analysis unit 524 may also limit the number D to be between one and five. As another example, the salient component analysis unit 524 may limit the number D to be between one and $(N+1)^2$. Alternatively, the salient component analysis unit 524 may pre-define the number D, such as to a value of four. In any event, once the number D is estimated, the salient component analysis unit 24 extracts the foreground and background subspace from the matrices U, V and S.

In some examples, the salient component analysis unit 524 may perform this analysis every M-samples, which may be restated as on a frame-by-frame basis. In this respect, D may vary from frame to frame. In other examples, the salient component analysis unit 24 may perform this analysis more than once per frame, analyzing two or more portions of the frame. Accordingly, the techniques should not be limited in this respect to the examples described in this disclosure.

In effect, the salient component analysis unit 524 may analyze the singular values of the diagonal matrix, which is denoted as the S matrix 519B in the example of FIG. 40, identifying those values having a relative value greater than the other values of the diagonal S matrix 519B. The salient component analysis unit 524 may identify D values, extracting these values to generate the $S_{DIST}$ matrix 525A and the $S_{BG}$ matrix 525B. The $S_{DIST}$ matrix 525A may represent a diagonal matrix comprising D columns having $(N+1)^2$ of the original S matrix 519B. In some instances, the $S_{BG}$ matrix 525B may represent a matrix having $(N+1)^2$-D columns, each of which includes $(N+1)^2$ transformed spherical harmonic coefficients of the original S matrix 519B. While described as an $S_{DIST}$ matrix representing a matrix comprising D columns having $(N+1)^2$ values of the original S matrix 519B, the salient component analysis unit 524 may truncate this matrix to generate an $S_{DIST}$ matrix having D columns having D values of the original S matrix 519B, given that the S matrix 519B is a diagonal matrix and the $(N+1)^2$ values of the D columns after the $D^{th}$ value in each column is often a value of zero. While described with respect to a full $S_{DIST}$ matrix 525A and a full Sao matrix 525B, the techniques may be implemented with respect to truncated versions of these $S_{DIST}$ matrix 525A and a truncated version of this $S_{BG}$ matrix 525B. Accordingly, the techniques of this disclosure should not be limited in this respect.

In other words, the $S_{DIST}$ matrix 525A may be of a size D-by-$(N+1)^2$, while the $S_{BG}$ matrix 525B may be of a size $(N+1)^2$-D-by-$(N+1)^2$. The $S_{DIST}$ matrix 525A may include those principal components or, in other words, singular values that are determined to be salient in terms of being distinct (DIST) audio components of the soundfield, while the $S_{BG}$ matrix 525B may include those singular values that are determined to be background (BG) or, in other words, ambient or non-distinct-audio components of the soundfield. While shown as being separate matrixes 525A and 525B in the example of FIG. 40, the matrixes 525A and 525B may be specified as a single matrix using the variable D to denote the number of columns (from left-to-right) of this single matrix that represent the $S_{DIST}$ matrix 525. In some examples, the variable D may be set to four.

The salient component analysis unit 524 may also analyze the U matrix 519C to generate the $U_{DIST}$ matrix 525C and the $U_{BG}$ matrix 525D. Often, the salient component analysis unit 524 may analyze the S matrix 519B to identify the variable D, generating the $U_{DIST}$ matrix 525C and the $U_{BG}$ matrix 525B based on the variable D. That is, after identifying the D columns of the S matrix 519B that are salient, the salient component analysis unit 524 may split the U matrix 519C based on this determined variable D. In this instance, the salient component analysis unit 524 may generate the $U_{DIST}$ matrix 525C to include the D columns (from left-to-right) of the $(N+1)^2$ transformed spherical harmonic coefficients of the original U matrix 519C and the $U_{BG}$ matrix 525D to include the remaining $(N+1)^2$-D columns of the $(N+1)^2$ transformed spherical harmonic coefficients of the original U matrix 519C. The $U_{DIST}$ matrix 525C may be of a size of M-by-D, while the $U_{BG}$ matrix 525D may be of a size of M-by-$(N+1)^2$-D. While shown as being separate matrixes 525C and 525D in the example of FIG. 40, the matrixes 525C and 525D may be specified as a single matrix using the variable D to denote the number of columns (from left-to-right) of this single matrix that represent the $U_{DIST}$ matrix 525B.

The salient component analysis unit 524 may also analyze the $V^T$ matrix 523 to generate the $V^T_{DIST}$ matrix 525E and the $V^T_{BG}$ matrix 525F. Often, the salient component analysis unit 524 may analyze the S matrix 519B to identify the variable D, generating the $V^T_{DIST}$ matrix 525E and the $V_{BG}$ matrix 525F based on the variable D. That is, after identifying the D columns of the S matrix 519B that are salient, the salient component analysis unit 254 may split the V matrix 519A based on this determined variable D. In this instance, the salient component analysis unit 524 may generate the $V^T_{DIST}$ matrix 525E to include the $(N+1)^2$ rows (from top-to-bottom) of the D values of the original $V^T$ matrix 523 and the $V^T_{BG}$ matrix 525F to include the remaining $(N+1)^2$ rows of the $(N+1)^2$-D values of the original $V^T$ matrix 523. The $V^T_{DIST}$ matrix 525E may be of a size of $(N+1)^2$-by-D, while the $V^T_{BG}$ matrix 525D may be of a size of $(N+1)^2$-by-$(N+1)^2$–D. While shown as being separate matrixes 525E and 525F in the example of FIG. 40, the matrixes 525E and 525F may be specified as a single matrix using the variable D to denote the number of columns (from left-to-right) of this single matrix that represent the $V_{DIST}$ matrix 525E. The salient component analysis unit 524 may output the $S_{DIST}$ matrix 525, the $S_{BG}$ matrix 525B, the $U_{DIST}$ matrix 525C, the $U_{BG}$ matrix 525D and the $V^T_{BG}$ matrix 525F to the math unit 526, while also outputting the $V^T_{DIST}$ matrix 525E to the bitstream generation unit 516.

The math unit 526 may represent a unit configured to perform matrix multiplications or any other mathematical operation capable of being performed with respect to one or more matrices (or vectors). More specifically, as shown in the example of FIG. 40, the math unit 526 may represent a unit configured to perform a matrix multiplication to multiply the $U_{DIST}$ matrix 525C by the $S_{DIST}$ matrix 525A to generate a $U_{DIST}$*$S_{DIST}$ vectors 527 of size M-by-D. The matrix math unit 526 may also represent a unit configured to perform a matrix multiplication to multiply the $U_{BG}$ matrix 525D by the $S_{BG}$ matrix 525B and then by the $V^T_{BG}$ matrix 525F to generate $U_{BG}$*$S_{BG}$*$V^T_{BG}$ matrix 525F to generate background spherical harmonic coefficients 531 of size of size M-by-$(N+1)^2$ (which may represent those of spherical harmonic coefficients 511 representative of background components of the soundfield). The math unit 526 may output the $U_{DIST}$*$S_{DIST}$ vectors 527 and the background spherical harmonic coefficients 531 to the audio encoding unit 514.

The audio encoding device 510 therefore differs from the audio encoding device 20 in that the audio encoding device 510 includes this math unit 526 configured to generate the $U_{DIST}$*$S_{DIST}$ vectors 527 and the background spherical harmonic coefficients 531 through matrix multiplication at the end of the encoding process. The linear invertible transform unit 30 of the audio encoding device 20 performs the multiplication of the U and S matrices to output the US[k] vectors 33 at the relative beginning of the encoding process, which may facilitate later operations, such as reordering, not shown in the example of FIG. 40. Moreover, the audio encoding device 20, rather than recover the background SHC 531 at the end of the encoding process, selects the background HOA coefficients 47 directly from the HOA coefficients 11, thereby potentially avoiding matrix multiplications to recover the background SHC 531.

The audio encoding unit 514 may represent a unit that performs a form of encoding to further compress the $U_{DIST}$*$S_{DIST}$ vectors 527 and the background spherical harmonic coefficients 531. The audio encoding unit 514 may operate in a manner substantially similar to the psychoacoustic audio coder unit 40 of the audio encoding device 20 shown in the example of FIG. 4. In some instances, this audio encoding unit 514 may represent one or more instances of an advanced audio coding (AAC) encoding unit. The audio encoding unit 514 may encode each column or row of the $U_{DIST}$*$S_{DIST}$ vectors 527. Often, the audio encoding unit 514 may invoke an instance of an AAC encoding unit for each of the order/sub-order combinations remaining in the background spherical harmonic coefficients 531. More information regarding how the background spherical harmonic coefficients 531 may be encoded using an AAC encoding unit can be found in a convention paper by Eric Hellerud, et al., entitled "Encoding Higher Order Ambisonics with AAC," presented at the 124$^{th}$ Convention, 2008 May 17-20 and available at: http://ro.uow.edu.au/cgi/viewcontent.cgi?article=8025&context=engpapers. The audio encoding unit 14 may output an encoded version of the $L_{DIST}$*$S_{DIST}$ vectors 527 (denoted "encoded $U_{DIST}$*$_{DIST}$ vectors 515") and an encoded version of the background spherical harmonic coefficients 531 (denoted "encoded background spherical harmonic coefficients 515B") to the bitstream generation unit 516. In some instances, the audio encoding unit 514 may audio encode the background spherical harmonic coefficients 531 using a lower target bitrate than that used to encode the $U_{DIST}$*$S_{DIST}$ vectors 527, thereby potentially compressing the background spherical harmonic coefficients 531 more in comparison to the $U_{DIST}$*$S_{DIST}$ vectors 527.

The bitstream generation unit 516 represents a unit that formats data to conform to a known format (which may refer to a format known by a decoding device), thereby generating the bitstream 517. The bitstream generation unit 42 may operate in a manner substantially similar to that described above with respect to the bitstream generation unit 42 of the audio encoding device 24 shown in the example of FIG. 4. The bitstream generation unit 516 may include a multiplexer that multiplexes the encoded $U_{DIST}$*$S_{DIST}$ vectors 515, the encoded background spherical harmonic coefficients 515B and the $V^T_{DIST}$ matrix 525E.

Figure 40B:
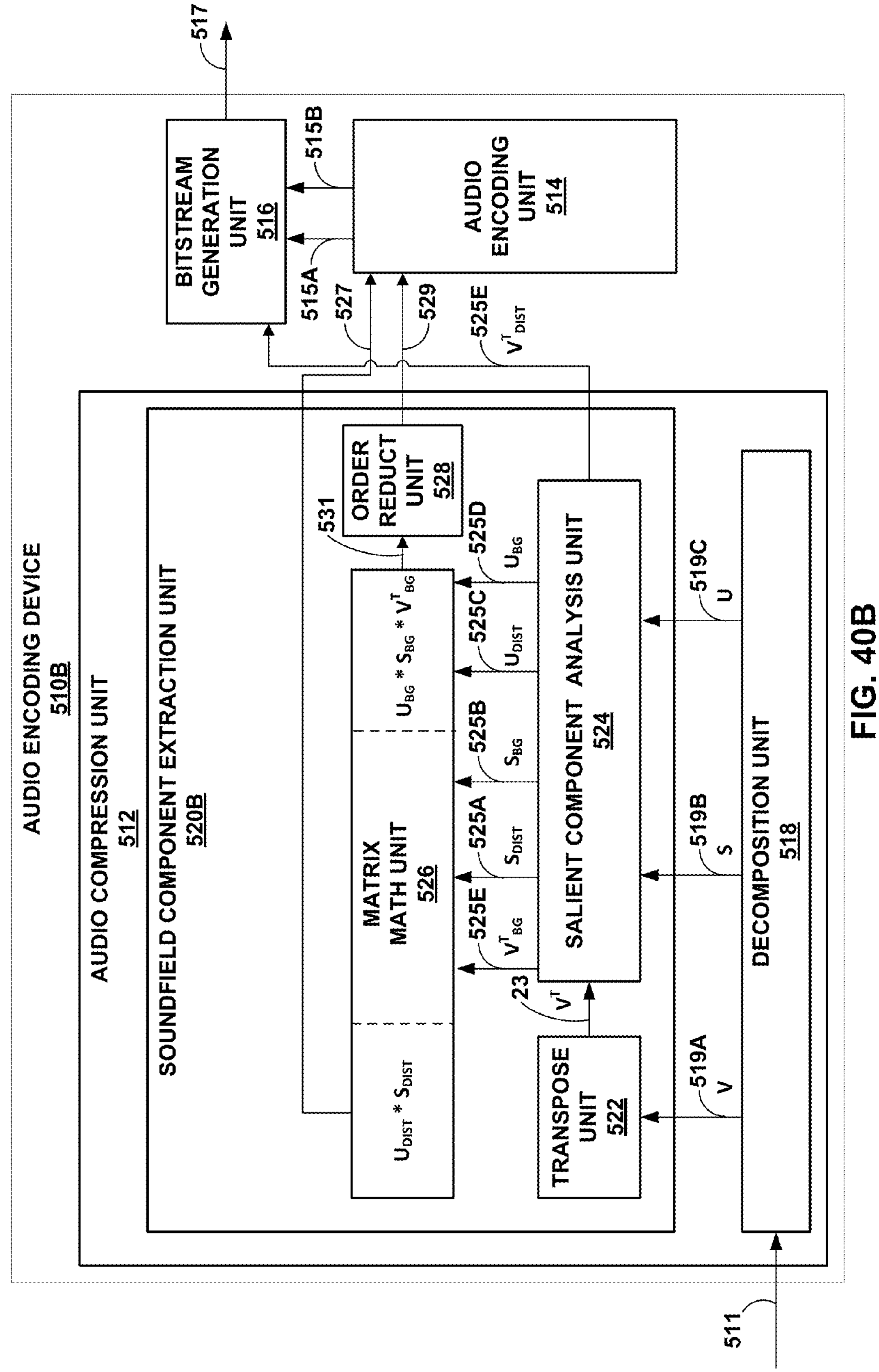

FIG. 40B is a block diagram illustrating an example audio encoding device 510B that may perform various aspects of the techniques described in this disclosure to compress spherical harmonic coefficients describing two or three dimensional soundfields. The audio encoding device 510B may be similar to audio encoding device 510 in that audio encoding device 510B includes an audio compression unit 512, an audio encoding unit 514 and a bitstream generation unit 516. Moreover, the audio compression unit 512 of the audio encoding device 510B may be similar to that of the audio encoding device 510 in that the audio compression unit 512 includes a decomposition unit 518. The audio compression unit 512 of the audio encoding device 510B may differ from the audio compression unit 512 of the audio encoding device 510 in that the soundfield component extraction unit 520 includes an additional unit, denoted as order reduction unit 528A ("order reduct unit 528"). For this reason, the soundfield component extraction unit 520 of the audio encoding device 510B is denoted as the "soundfield component extraction unit 520B."

The order reduction unit 528A represents a unit configured to perform additional order reduction of the background spherical harmonic coefficients 531. In some instances, the order reduction unit 528A may rotate the soundfield represented the background spherical harmonic coefficients 531 to reduce the number of the background spherical harmonic coefficients 531 necessary to represent the soundfield. In some instances, given that the background spherical harmonic coefficients 531 represents background components of the soundfield, the order reduction unit 528A may remove, eliminate or otherwise delete (often by zeroing out) those of the background spherical harmonic coefficients 531 corresponding to higher order spherical basis functions. In this respect, the order reduction unit 528A may perform operations similar to the background selection unit 48 of the audio encoding device 20 shown in the example of FIG. 4. The order reduction unit 528A may output a reduced version of the background spherical harmonic coefficients 531 (denoted as "reduced background spherical harmonic coefficients 529") to the audio encoding unit 514, which may perform audio encoding in the manner described above to encode the reduced background spherical harmonic coefficients 529 and thereby generate the encoded reduced background spherical harmonic coefficients 515B.

The various clauses listed below may present various aspects of the techniques described in this disclosure.

Clause 132567-1. A device, such as the audio encoding device 510 or the audio encoding device 510B, comprising: one or more processors configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and represent the plurality of spherical harmonic coefficients as a function of at least a portion of one or more of the U matrix, the S matrix and the V matrix.

Clause 132567-2. The device of clause 132567-1, wherein the one or more processors are further configured to generate a bitstream to include the representation of the plurality of spherical harmonic coefficients as one or more vectors of the U matrix, the S matrix and the V matrix including combinations thereof or derivatives thereof.

Clause 132567-3. The device of clause 132567-1, wherein the one or more processors are further configured to when represent the plurality of spherical harmonic coefficients, determine one or more $U_{DIST}$ vectors included within the U matrix that describe distinct components of the sound field.

Clause 132567-4. The device of clause 132567-1, wherein the one or more processors are further configured to, when representing the plurality of spherical harmonic coefficients, determine one or more $U_{DIST}$ vectors included within the U matrix that describe distinct components of the sound field, determine one or more $S_{DIST}$ vectors included within the S matrix that also describe the distinct components of the sound field, and multiply the one or more $U_{DIST}$ vectors and the one or more one or more $S_{DIST}$ vectors to generate $U_{DIST}*S_{DIST}$ vectors.

Clause 132567-5. The device of clause 132567-1, wherein the one or more processors are further configured to when representing the plurality of spherical harmonic coefficients, determine one or more $U_{DIST}$ vectors included within the U matrix that describe distinct components of the sound field, determine one or more $S_{DIST}$ vectors included within the S matrix that also describe the distinct components of the sound field, and multiply the one or more $U_{DIST}$ vectors and the one or more one or more $S_{DIST}$ vectors to generate one or more $U_{DIST}*S_{DIST}$ vectors, and wherein the one or more processors are further configured to audio encode the one or more $U_{DIST}*S_{DIST}$ vectors to generate an audio encoded version of the one or more $U_{DIST}*S_{DIST}$ vectors.

Clause 132567-6. The device of clause 132567-1, wherein the one or more processors are further configured to, when representing the plurality of spherical harmonic coefficients, determine one or more $U_{BG}$ vectors included within the U matrix.

Clause 132567-7. The device of clause 132567-1, wherein the one or more processors are further configured to, when representing the plurality of spherical harmonic coefficients, analyze the S matrix to identify distinct and background components of the sound field.

Clause 132567-8. The device of clause 132567-1, wherein the one or more processors are further configured to, when representing the plurality of spherical harmonic coefficients, analyze the S matrix to identify distinct and background components of the sound field, and determine, based on the analysis of the S matrix, one or more $U_{DIST}$ vectors of the U matrix that describe distinct components of the sound field and one or more $U_{BG}$ vectors of the U matrix that describe background components of the sound field.

Clause 132567-9. The device of clause 132567-1, wherein the one or more processors are further configured to, when representing the plurality of spherical harmonic coefficients, analyze the S matrix to identify distinct and background components of the sound field on an audio-frame-by-audio-frame basis, and determine, based on the audio-frame-by-audio-frame analysis of the S matrix, one or more $U_{DIST}$ vectors of the U matrix that describe distinct components of the sound field and one or more $U_{BG}$ vectors of the U matrix that describe background components of the sound field.

Clause 132567-10. The device of clause 132567-1, wherein the one or more processors are further configured to, when representing the plurality of spherical harmonic coefficients, analyze the S matrix to identify distinct and background components of the sound field, determine, based on the analysis of the S matrix, one or more $U_{DIST}$ vectors of the U matrix that describe distinct components of the sound field and one or more $U_{BG}$ vectors of the U matrix that describe background components of the sound field, determining, based on the analysis of the S matrix, one or more $S_{DIST}$ vectors and one or more $S_{BG}$ vectors of the S matrix corresponding to the one or more $U_{DIST}$ vectors and the one or more $U_{BG}$ vectors, and determine, based on the analysis of the S matrix, one or more $V^T_{DIST}$ vectors and one or more $V^T_{BG}$ vectors of a transpose of the V matrix corresponding to the one or more $U_{DIST}$ vectors and the one or more $U_{BG}$ vectors.

Clause 132567-11. The device of clause 132567-10, wherein the one or more processors are further configured to, when representing the plurality of spherical harmonic coefficients further, multiply the one or more $U_{BG}$ vectors by the one or more $S_{BG}$ vectors and then by one or more $V^T_{BG}$; vectors to generate one or more $U_{BG}*S_{BG}*V^T_{BG}$ vectors, and wherein the one or more processors are further configured to audio encode the $U_{BG}*S_{BG}*V^T_{BG}$ vectors to generate an audio encoded version of the $U_{BG}*S_{BG}*V^T_{BG}$ vectors.

Clause 132567-12. The device of clause 132567-10, wherein the one or more processors are further configured to, when representing the plurality of spherical harmonic coefficients, multiply the one or more $U_{BG}$ vectors by the one or more $S_{BG}$ vectors and then by one or more $V^T_{BG}$ vectors to generate one or more $U_{BG}*S_{BG}*V^T_{BG}$ vectors, and perform an order reduction process to eliminate those of the coefficients of the one or more $U_{BG}*S_{BG}*V^T_{BG}$ vectors associated with one or more orders of spherical harmonic basis functions and thereby generate an order-reduced version of the one or more $U_{BG}*S_{BG}*V^T_{BG}$ vectors.

Clause 132567-13. The device of clause 132567-10, wherein the one or more processors are further configured to, when representing the plurality of spherical harmonic coefficients, multiply the one or more $U_{BG}$ vectors by the one or more $S_{BG}$ vectors and then by one or more $V^T_{BG}$ vectors to generate one or more $U_{BG}*S_{BG}*V^T_{BG}$ vectors, and perform an order reduction process to eliminate those of the coefficients of the one or more $U_{BG}*S_{BG}*V^T_{BG}$ vectors associated with one or more orders of spherical harmonic basis functions and thereby generate an order-reduced version of the one or more $U_{BG}*S_{BG}*V^T_{BG}$ vectors, and wherein the one or more processors are further configured to audio encode the order-reduced version of the one or more $U_{BG}*S_{BG}*V^T_{BG}$ vectors to generate an audio encoded version of the order-reduced one or more $U_{BG}*S_{BG}*V^T_{BG}$ vectors.

Clause 132567-14. The device of clause 132567-10, wherein the one or more processors are further configured to, when representing the plurality of spherical harmonic coefficients, multiply the one or more $U_{BG}$ vectors by the one or more $S_{BG}$ vectors and then by one or more $V^T_{BG}$ vectors to generate one or more $U_{BG}*S_{BG}*V^T_{BG}$ vectors, perform an order reduction process to eliminate those of the coefficients of the one or more $U_{BG}*S_{BG}*V^T_{BG}$ vectors associated with one or more orders greater than one of spherical harmonic basis functions and thereby generate an order-reduced version of the one or more $U_{BG}*S_{BG}*V^T_{BG}$ vectors, and audio encode the order-reduced version of the one or more $U_{BG}*S_{BG}*V^T_{BG}$ vectors to generate an audio encoded version of the order-reduced one or more $U_{BG}*S_{BG}*V^T_{BG}$ vectors.

Clause 132567-15. The device of clause 132567-10, wherein the one or more processors are further configured to generate a bitstream to include the one or more $V^T_{DIST}$ vectors.

Clause 132567-16. The device of clause 132567-10, wherein the one or more processors are further configured to generate a bitstream to include the one or more $V^T_{DIST}$ vectors without audio encoding the one or more $V^T_{DIST}$ vectors.

Clause 132567-1F. A device, such as the audio encoding device 510 or 510B, comprising one or more processors to perform a singular value decomposition with respect to multi-channel audio data representative of at least a portion of the sound field to generate a U matrix representative of left-singular vectors of the multi-channel audio data, an S matrix representative of singular values of the multi-channel audio data and a V matrix representative of right-singular vectors of the multi-channel audio data, and represent the multi-channel audio data as a function of at least a portion of one or more of the U matrix, the S matrix and the V matrix.

Clause 132567-2F. The device of clause 132567-1F, wherein the multi-channel audio data comprises a plurality of spherical harmonic coefficients.

Clause 132567-3F. The device of clause 132567-2F, wherein the one or more processors are further configured to perform as recited by any combination of the clauses 132567-2 through 132567-16.

From each of the various clauses described above, it should be understood that any of the audio encoding devices 510A-510J may perform a method or otherwise comprise means to perform each step of the method for which the audio encoding device 510A-510J is configured to perform In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 510A-510J has been configured to perform.

For example, a clause 132567-17 may be derived from the foregoing clause 132567-1 to be a method comprising performing a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and representing the plurality of spherical harmonic coefficients as a function of at least a portion of one or more of the U matrix, the S matrix and the V matrix.

As another example, a clause 132567-18 may be derived from the foregoing clause 132567-1 to be a device, such as the audio encoding device 510B, comprising means for performing a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and means for representing the plurality of spherical harmonic coefficients as a function of at least a portion of one or more of the U matrix, the S matrix and the V matrix.

As yet another example, a clause 132567-18 may be derived from the foregoing clause 132567-1 to be a non-transitory computer-readable storage medium having stored thereon instructions that, when executed, cause one or more processor to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and represent the plurality of spherical harmonic coefficients as a function of at least a portion of one or more of the U matrix, the S matrix and the V matrix.

Various clauses may likewise be derived from clauses 132567-2 through 132567-16 for the various devices, methods and non-transitory computer-readable storage mediums derived as exemplified above. The same may be performed for the various other clauses listed throughout this disclosure.

Figure 40C:
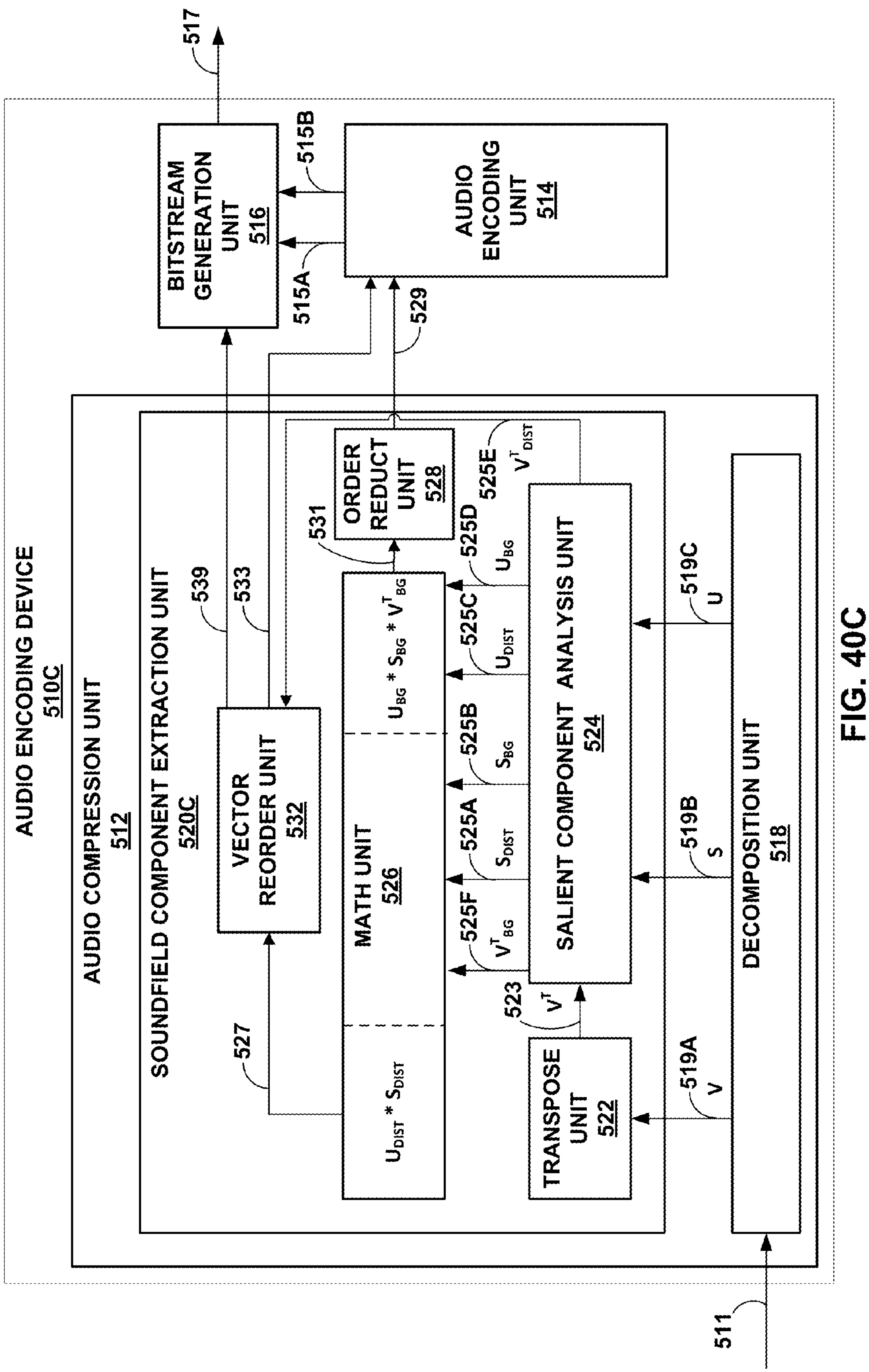

FIG. 40C is a block diagram illustrating example audio encoding devices 510C that may perform various aspects of the techniques described in this disclosure to compress spherical harmonic coefficients describing two or three dimensional soundfields. The audio encoding device 510C may be similar to audio encoding device 510B in that audio encoding device 510C includes an audio compression unit 512, an audio encoding unit 514 and a bitstream generation unit 516. Moreover, the audio compression unit 512 of the audio encoding device 510C may be similar to that of the audio encoding device 510B in that the audio compression unit 512 includes a decomposition unit 518.

The audio compression unit 512 of the audio encoding device 510C may, however, differ from the audio compression unit 512 of the audio encoding device 510B in that the soundfield component extraction unit 520 includes an additional unit, denoted as vector reorder unit 532. For this reason, the soundfield component extraction unit 520 of the audio encoding device 510C is denoted as the "soundfield component extraction unit 520C".

The vector reorder unit 532 may represent a unit configured to reorder the $U_{DIST}*S_{DIST}$ vectors 527 to generate reordered one or more $U_{DIST}*S_{DIST}$ vectors 533. In this respect, the vector reorder unit 532 may operate in a manner similar to that described above with respect to the reorder unit 34 of the audio encoding device 20 shown in the example of FIG. 4. The soundfield component extraction unit 520C may invoke the vector reorder unit 532 to reorder the $U_{DIST}*S_{DIST}$ vectors 527 because the order of the $U_{DIST}*S_{DIST}$ vectors 527 (where each vector of the $U_{DIST}*S_{DIST}$ vectors 527 may represent one or more distinct mono-audio object present in the soundfield) may vary from portions of the audio data for the reason noted above. That is, given that the audio compression unit 512, in some examples, operates on these portions of the audio data generally referred to as audio frames (which may have M samples of the spherical harmonic coefficients 511, where M is, in some examples, set to 1024), the position of vectors corresponding to these distinct mono-audio objects as represented in the U matrix 519C from which the $U_{DIST}*S_{DIST}$ vectors 527 are derived may vary from audio frame-to-audio frame.

Passing these $U_{DIST}*S_{DIST}$ vectors 527 directly to the audio encoding unit 514 without reordering these $U_{DIST}*S_{DIST}$ vectors 527 from audio frame-to audio frame may reduce the extent of the compression achievable for some compression schemes, such as legacy compression schemes that perform better when mono-audio objects correlate (channel-wise, which is defined in this example by the order of the $U_{DIST}*S_{DIST}$ vectors 527 relative to one another) across audio frames. Moreover, when not reordered, the encoding of the $U_{DIST}*S_{DIST}$ vectors 527 may reduce the quality of the audio data when recovered. For example, AAC encoders, which may be represented in the example of FIG. 40C by the audio encoding unit 514, may more efficiently compress the reordered one or more $U_{DIST}*S_{DIST}$ vectors 533 from frame-to-frame in comparison to the compression achieved when directly encoding the $U_{DIST}*S_{DIST}$ vectors 527 from frame-to-frame. While described above with respect to AAC encoders, the techniques may be performed with respect to any encoder that provides better compression when mono-audio objects are specified across frames in a specific order or position (channel-wise).

As described in more detail below, the techniques may enable audio encoding device 510C to reorder one or more vectors (i.e., the $U_{DIST}*S_{DIST}$ vectors 527 to generate reordered one or more vectors $U_{DIST}*S_{DIST}$ vectors 533 and thereby facilitate compression of $U_{DIST}*S_{DIST}$ vectors 527 by a legacy audio encoder, such as audio encoding unit 514. The audio encoding device 510C may further perform the techniques described in this disclosure to audio encode the reordered one or more $U_{DIST}*S_{DIST}$ vectors 533 using the audio encoding unit 514 to generate an encoded version 515A of the reordered one or more $U_{DIST}*S_{DIST}$ vectors 533.

For example, the soundfield component extraction unit 520C may invoke the vector reorder unit 532 to reorder one or more first $U_{DIST}*S_{DIST}$ vectors 527 from a first audio frame subsequent in time to the second frame to which one or more second $U_{DIST}*S_{DIST}$ vectors 527 correspond. While described in the context of a first audio frame being subsequent in time to the second audio frame, the first audio frame may precede in time the second audio frame. Accordingly, the techniques should not be limited to the example described in this disclosure.

The vector reorder unit 532 may first perform an energy analysis with respect to each of the first $U_{DIST}*S_{DIST}$ vectors 527 and the second $U_{DIST}*S_{DIST}$ vectors 527, computing a root mean squared energy for at least a portion of (but often the entire) first audio frame and a portion of (but often the entire) second audio frame and thereby generate (assuming D to be four) eight energies, one for each of the first $U_{DIST}*S_{DIST}$ vectors 527 of the first audio frame and one for each of the second $U_{DIST}*S_{DIST}$ vectors 527 of the second audio frame. The vector reorder unit 532 may then compare each energy from the first $U_{DIST}*S_{DIST}$ Vectors 527 turn-wise against each of the second $U_{DIST}*S_{DIST}$ vectors 527 as described above with respect to Tables 1-4.

In other words, when using frame based SVD (or related methods such as KLT & PCA) decomposition on HoA signals, the ordering of the vectors from frame to frame may not be guaranteed to be consistent. For example, if there are two objects in the underlying soundfield, the decomposition (which when properly performed may be referred to as an "ideal decomposition") may result in the separation of the two objects such that one vector would represent one object in the U matrix. However, even when the decomposition may be denoted as an "ideal decomposition," the vectors may alternate in position in the U matrix (and correspondingly in the S and V matrix) from frame-to-frame. Further, there may well be phase differences, where the vector reorder unit 532 may inverse the phase using phase inversion (by dot multiplying each element of the inverted vector by minus or negative one). In order to feed these vectors, frame-by-frame into the same "AAC/Audio Coding engine" may require the order to be identified (or, in other words, the signals to be matched), the phase to be rectified, and careful interpolation at frame boundaries to be applied. Without this, the underlying audio codec may produce extremely harsh artifacts including those known as [temporal smearing] or [pre-echo].

In accordance with various aspects of the techniques described in this disclosure, the audio encoding device 510C may apply multiple methodologies to identify/match vectors, using energy and cross-correlation at frame boundaries of the vectors. The audio encoding device 510C may also ensure that a phase change of 180 degrees—which often appears at frame boundaries—is corrected. The vector reorder unit 532 may apply a form of fade-in/fade-out interpolation window between the vectors to ensure smooth transition between the frames.

In this way, the audio encoding device 530C may reorder one or more vectors to generate reordered one or more first vectors and thereby facilitate encoding by a legacy audio encoder, wherein the one or more vectors describe represent distinct components of a soundfield, and audio encode the reordered one or more vectors using the legacy audio encoder to generate an encoded version of the reordered one or more vectors.

Various aspects of the techniques described in this disclosure may enable the audio encoding device 510C to operate in accordance with the following clauses.

Clause 133143-1A. A device, such as the audio encoding device 510C, comprising: one or more processors configured to perform an energy comparison between one or more first vectors and one or more second vectors to determine reordered one or more first vectors and facilitate extraction of the one or both of the one or more first vectors and the one or more second vectors, wherein the one or more first vectors describe distinct components of a sound field in a first portion of audio data and the one or more second vectors describe distinct components of the sound field in a second portion of the audio data.

Clause 133143-2A. The device of clause 133143-1A, wherein the one or more first vectors do not represent background components of the sound field in the first portion of the audio data, and wherein the one or more second vectors do not represent background components of the sound field in the second portion of the audio data.

Clause 133143-3A. The device of clause 133143-1A, wherein the one or more processors are further configured to, after performing the energy comparison, perform a cross-correlation between the one or more first vectors and the one or more second vectors to identify the one or more first vectors that correlated to the one or more second vectors.

Clause 133143-4A. The device of clause 133143-1A, wherein the one or more processors are further configured to discard one or more of the second vectors based on the energy comparison to generate reduced one or more second vectors having less vectors than the one or more second vectors, perform a cross-correlation between at least one of the one or more first vectors and the reduced one or more second vectors to identify one of the reduced one or more second vectors that correlates to the at least one of the one or more first vectors, and reorder at least one of the one or more first vectors based on the cross-correlation to generate the reordered one or more first vectors.

Clause 133143-5A. The device of clause 133143-1A, wherein the one or more processors are further configured to discard one or more of the second vectors based on the energy comparison to generate reduced one or more second vectors having less vectors than the one or more second vectors, perform a cross-correlation between at least one of the one or more first vectors and the reduced one or more second vectors to identify one of the reduced one or more second vectors that correlates to the at least one of the one or more first vectors, reorder at least one of the one or more first vectors based on the cross-correlation to generate the reordered one or more first vectors, and encode the reordered one or more first vectors to generate the audio encoded version of the reordered one or more first vectors.

Clause 133143-6A. The device of clause 133143-1A, wherein the one or more processors are further configured to discard one or more of the second vectors based on the energy comparison to generate reduced one or more second vectors having less vectors than the one or more second vectors, perform a cross-correlation between at least one of the one or more first vectors and the reduced one or more second vectors to identify one of the reduced one or more second vectors that correlates to the at least one of the one or more first vectors, reorder at least one of the one or more first vectors based on the cross-correlation to generate the reordered one or more first vectors, encode the reordered one or more first vectors to generate the audio encoded version of the reordered one or more first vectors, and generate a bitstream to include the encoded version of the reordered one or more first vectors.

Clause 133143-7A. The device of claims 3A-6A, wherein the first portion of the audio data comprises a first audio frame having M samples, wherein the second portion of the audio data comprises a second audio frame having the same number, M, of samples, wherein the one or more processors are further configured to, when performing the cross-correlation, perform the cross-correlation with respect to the last M-Z values of the at least one of the one or more first vectors and the first M-Z values of each of the reduced one or more second vectors to identify one of the reduced one or more second vectors that correlates to the at least one of the one or more first vectors, and wherein Z is less than M.

Clause 133143-8A. The device of claims 3A-6A, wherein the first portion of the audio data comprises a first audio frame having M samples, wherein the second portion of the audio data comprises a second audio frame having the same number, M, of samples, wherein the one or more processors are further configured to, when performing the cross-correlation, perform the cross-correlation with respect to the last M-Y values of the at least one of the one or more first vectors and the first M-Z values of each of the reduced one or more second vectors to identify one of the reduced one or more second vectors that correlates to the at least one of the one or more first vectors, and wherein both Z and Y are less than M.

Clause 133143-9A. The device of claims 3A-6A, wherein the one or more processors are further configured to, when performing the cross correlation, invert at least one of the one or more first vectors and the one or more second vectors.

Clause 133143-10A. The device of clause 133143-1A, wherein the one or more processors are further configured to perform a singular value decomposition with respect to a plurality of spherical harmonic coefficients representative of the sound field to generate the one or more first vectors and the one or more second vectors.

Clause 133143-1A. The device of clause 133143-1A, wherein the one or more processors are further configured to perform a singular value decomposition with respect to a plurality of spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and generate the one or more first vectors and the one or more second vectors as a function of one or more of the U matrix, the S matrix and the V matrix.

Clause 133143-12A. The device of clause 133143-1A, wherein the one or more processors are further configured to perform a singular value decomposition with respect to a plurality of spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, perform a saliency analysis with respect to the S matrix to identify one or more UDIST vectors of the U matrix and one or more SDIST vectors of the S matrix, and determine the one or more first vectors and the one or more second vectors by at least in part multiplying the one or more UDIST vectors by the one or more SDIST vectors.

Clause 133143-13A. The device of clause 133143-1A, wherein the first portion of the audio data occurs in time before the second portion of the audio data.

Clause 133143-14A. The device of clause 133143-1A, wherein the first portion of the audio data occurs in time after the second portion of the audio data.

Clause 133143-15A. The device of clause 133143-1A, wherein the one or more processors are further configured to when performing the energy comparison, compute a root mean squared energy for each of the one or more first vectors and the one or more second vectors, and compare the root mean squared energy computed for at least one of the one or more first vectors to the root mean squared energy computed for each of the one or more second vectors.

Clause 133143-16A. The device of clause 133143-1A, wherein the one or more processors are further configured to reorder at least one of the one or more first vectors based on the energy comparison to generate the reordered one or more first vectors, and wherein the one or more processors are further configured to, when reordering the first vectors, apply a fade-in/fade-out interpolation window between the one or more first vectors to ensure a smooth transition when generating the reordered one or more first vectors.

Clause 133143-17A. The device of clause 133143-1A, wherein the one or more processors are further configured to reorder the one or more first vectors based on at least on the energy comparison to generate the reordered one or more first vectors, generate a bitstream to include the reordered one or more first vectors or an encoded version of the reordered one or more first vectors, and specify reorder information in the bitstream describing how the one or more first vectors was reordered.

Clause 133143-18A. The device of clause 133143-1A, wherein the energy comparison facilitates extraction of the one or both of the one or more first vectors and the one or more second vectors in order to promote audio encoding of the one or both of the one or more first vectors and the one or more second vectors.

Clause 133143-1B. The device, such as the audio encoding device 510C, comprising: one or more processors configured to perform a cross correlation with respect to one or more first vectors and one or more second vectors to determine reordered one or more first vectors and facilitate extraction of one or both of the one or more first vectors and the one or more second vectors, wherein the one or more first vectors describe distinct components of a sound field in a first portion of audio data and the one or more second vectors describe distinct components of the sound field in a second portion of the audio data.

Clause 133143-2B. The device of clause 133143-1B, wherein the one or more first vectors do not represent background components of the sound field in the first portion of the audio data, and wherein the one or more second vectors do not represent background components of the sound field in the second portion of the audio data.

Clause 133143-3B. The device of clause 133143-1B, wherein the one or more processors are further configured to, prior to performing the cross correlation, perform an energy comparison between the one or more first vectors and the one or more second vectors to generate reduced one or more second vectors having less vectors than the one or more second vectors, and wherein the one or more processors are further configured to, when performing the cross correlation, perform the cross correlation between the one or more first vectors and reduced one or more second vectors to facilitate audio encoding of one or both of the one or more first vectors and the one or more second vectors.

Clause 133143-4B. The device of clause 133143-3B, wherein the one or more processors are further configured to, when performing the energy comparison, compute a root mean squared energy for each of the one or more first vectors and the one or more second vectors, and compare the root mean squared energy computed for at least one of the one or more first vectors to the root mean squared energy computed for each of the one or more second vectors.

Clause 133143-5B. The device of clause 133143-3B, wherein the one or more processors are further configured to discard one or more of the second vectors based on the energy comparison to generate reduced one or more second vectors having less vectors than the one or more second vectors, wherein the one or more processors are further configured to, when performing the cross correlation, perform the cross correlation between at least one of the one or more first vectors and the reduced one or more second vectors to identify one of the reduced one or more second vectors that correlates to the at least one of the one or more first vectors, and wherein the one or more processors are further configured to reorder at least one of the one or more first vectors based on the cross-correlation to generate the reordered one or more first vectors.

Clause 133143-6B. The device of clause 133143-3B, wherein the one or more processors are further configured to discard one or more of the second vectors based on the energy comparison to generate reduced one or more second vectors having less vectors than the one or more second vectors, wherein the one or more processors are further configured to, when performing the cross correlation, perform the cross correlation between at least one of the one or more first vectors and the reduced one or more second vectors to identify one of the reduced one or more second vectors that correlates to the at least one of the one or more first vectors, and wherein the one or more processors are further configured to reorder at least one of the one or more first vectors based on the cross-correlation to generate the reordered one or more first vectors, and encode the reordered one or more first vectors to generate the audio encoded version of the reordered one or more first vectors.

Clause 133143-7B. The device of clause 133143-3B, wherein the one or more processors are further configured to discard one or more of the second vectors based on the energy comparison to generate reduced one or more second vectors having less vectors than the one or more second vectors, wherein the one or more processors are further configured to, when performing the cross correlation, perform the cross correlation between at least one of the one or more first vectors and the reduced one or more second vectors to identify one of the reduced one or more second vectors that correlates to the at least one of the one or more first vectors, and wherein the one or more processors are further configured to reordering at least one of the one or more first vectors based on the cross-correlation to generate the reordered one or more first vectors, encode the reordered one or more first vectors to generate the audio encoded version of the reordered one or more first vectors, and generate a bitstream to include the encoded version of the reordered one or more first vectors.

Clause 133143-8B. The device of claims 3B-7B, wherein the first portion of the audio data comprises a first audio frame having M samples, wherein the second portion of the audio data comprises a second audio frame having the same number, M, of samples, wherein the one or more processors are further configured to, when performing the cross-correlation, perform the cross-correlation with respect to the last M-Z values of the at least one of the one or more first vectors and the first M-Z values of each of the reduced one or more second vectors to identify one of the reduced one or more second vectors that correlates to the at least one of the one or more first vectors, and wherein Z is less than M.

Clause 133143-9B. The device of claims 3B-7B, wherein the first portion of the audio data comprises a first audio frame having M samples, wherein the second portion of the audio data comprises a second audio frame having the same number. M, of samples, wherein the one or more processors are further configured to, when performing the cross-correlation, perform the cross-correlation with respect to the last M-Y values of the at least one of the one or more first vectors and the first M-Z values of each of the reduced one or more second vectors to identify one of the reduced one or more second vectors that correlates to the at least one of the one or more first vectors, and wherein both Z and Y are less than M.

Clause 133143-10B. The device of claims 1B, wherein the one or more processors are further configured to, when performing the cross correlation, invert at least one of the one or more first vectors and the one or more second vectors.

Clause 133143-11B. The device of clause 133143-1B, wherein the one or more processors are further configured to perform a singular value decomposition with respect to a plurality of spherical harmonic coefficients representative of the sound field to generate the one or more first vectors and the one or more second vectors.

Clause 133143-12B. The device of clause 133143-1B, wherein the one or more processors are further configured to perform a singular value decomposition with respect to a plurality of spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and generate the one or more first vectors and the one or more second vectors as a function of one or more of the U matrix, the S matrix and the V matrix.

Clause 133143-13B. The device of clause 133143-1B, wherein the one or more processors are further configured to perform a singular value decomposition with respect to a plurality of spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, perform a saliency analysis with respect to the S matrix to identify one or more $U_{DIST}$ vectors of the U matrix and one or more $S_{DIST}$ vectors of the S matrix, and determine the one or more first vectors and the one or more second vectors by at least in part multiplying the one or more $U_{DIST}$ vectors by the one or more $S_{DIST}$ vectors.

Clause 133143-14B. The device of clause 133143-1B, wherein the one or more processors are further configured to perform a singular value decomposition with respect to a plurality of spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and when determining the one or more first vectors and the one or more second vectors, perform a saliency analysis with respect to the S matrix to identify one or more VDIST vectors of the V matrix as at least one of the one or more first vectors and the one or more second vectors.

Clause 133143-15B. The device of clause 133143-1B, wherein the first portion of the audio data occurs in time before the second portion of the audio data.

Clause 133143-16B. The device of clause 133143-1B, wherein the first portion of the audio data occurs in time after the second portion of the audio data.

Clause 133143-17B. The device of clause 133143-1B, wherein the one or more processors are further configured to reorder at least one of the one or more first vectors based on the cross correlation to generate the reordered one or more first vectors, and when reordering the first vectors, apply a fade-in/fade-out interpolation window between the one or more first vectors to ensure a smooth transition when generating the reordered one or more first vectors.

Clause 133143-18B. The device of clause 133143-1B, wherein the one or more processors are further configured to reorder the one or more first vectors based on at least on the cross correlation to generate the reordered one or more first vectors, generate a bitstream to include the reordered one or more first vectors or an encoded version of the reordered one or more first vectors, and specify in the bitstream how the one or more first vectors was reordered.

Clause 133143-19B. The device of clause 133143-1B, wherein the cross correlation facilitates extraction of the one or both of the one or more first vectors and the one or more second vectors in order to promote audio encoding of the one or both of the one or more first vectors and the one or more second vectors.

Figure 40D:
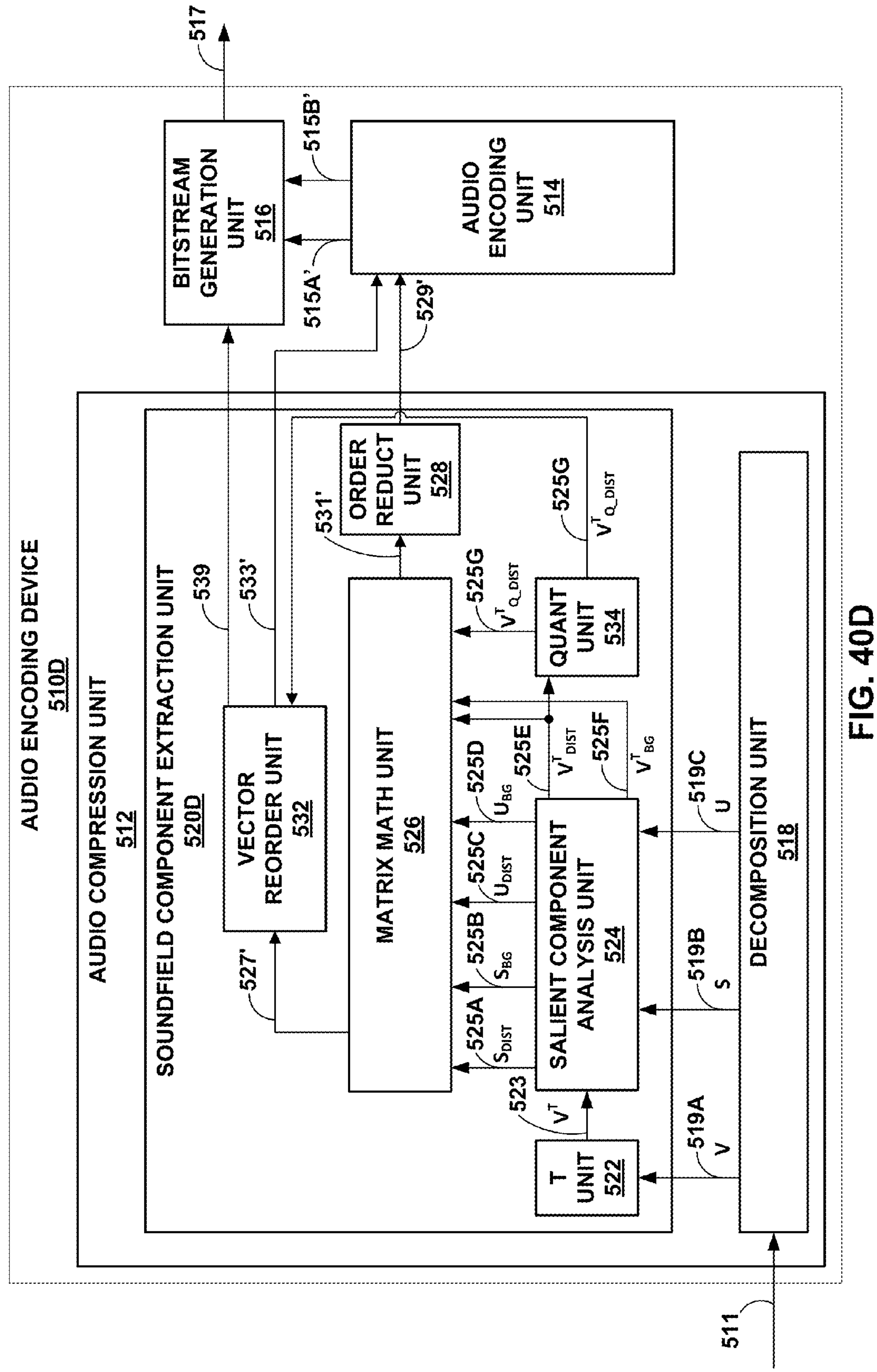

FIG. 40D is a block diagram illustrating an example audio encoding device 510D that may perform various aspects of the techniques described in this disclosure to compress spherical harmonic coefficients describing two or three dimensional soundfields. The audio encoding device 510D may be similar to audio encoding device 510C in that audio encoding device 510D includes an audio compression unit 512, an audio encoding unit 514 and a bitstream generation unit 516. Moreover, the audio compression unit 512 of the audio encoding device 510D may be similar to that of the audio encoding device 510C in that the audio compression unit 512 includes a decomposition unit 518.

The audio compression unit 512 of the audio encoding device 510D may, however, differ from the audio compression unit 512 of the audio encoding device 510C in that the soundfield component extraction unit 520 includes an additional unit, denoted as quantization unit 534 ("quant unit 534"). For this reason, the soundfield component extraction unit 520 of the audio encoding device 510D is denoted as the "soundfield component extraction unit 520D."

The quantization unit 534 represents a unit configured to quantize the one or more $V^T_{DIST}$ vectors 525E and/or the one or more $V^T_{BG}$ vectors 525F to generate corresponding one or more $V^T_{Q\_DIST}$ vectors 525G and/or one or more $V^T_{Q\_BG}$ vectors 525H. The quantization unit 534 may quantize (which is a signal processing term for mathematical rounding through elimination of bits used to represent a value) the one or more $V^T_{DIST}$ vectors 525E so as to reduce the number of bits that are used to represent the one or more $V^T_{DIST}$ vectors 525E in the bitstream 517. In some examples, the quantization unit 534 may quantize the 32-bit values of the one or more $V^T_{DIST}$ vectors 525E, replacing these 32-bit values with rounded 16-bit values to generate one or more $V^T_{Q\_DIST}$ vectors 525G. In this respect, the quantization unit 534 may operate in a manner similar to that described above with respect to quantization unit 52 of the audio encoding device 20 shown in the example of FIG. 4.

Quantization of this nature may introduce error into the representation of the soundfield that varies according to the coarseness of the quantization. In other words, the more bits used to represent the one or more $V^T_{DIST}$ vectors 525E may result in less quantization error. The quantization error due to quantization of the $V^T_{DIST}$ vectors 525E (which may be denoted "$E_{DIST}$") may be determined by subtracting the one or more $V^T_{DIST}$ vectors 525E from the one or more $V^T_{Q\_DIST}$ vectors 525G.

In accordance with the techniques described in this disclosure, the audio encoding device 510D may compensate for one or more of the $E_{DIST}$ quantization errors by projecting the $E_{DIST}$ error into or otherwise modifying one or more of the $U_{DIST}*S_{DIST}$ vectors 527 or the background spherical harmonic coefficients 531 generated by multiplying the one or more $U_{BG}$ vectors 525D by the one or more $S_{BG}$ vectors 525B and then by the one or more $V^T_{BG}$ vectors 525F. In some examples, the audio encoding device 510D may only compensate for the $E_{DIST}$ error in the $U_{DIST}*S_{DIST}$ vectors 527. In other examples, the audio encoding device 510D may only compensate for the $E_{BG}$ error in the background spherical harmonic coefficients. In yet other examples, the audio encoding device 510D may compensate for the $E_{DIST}$ error in both the $U_{DIST}*S_{DIST}$ vectors 527 and the background spherical harmonic coefficients.

In operation, the salient component analysis unit 524 may be configured to output the one or more $S_{DIST}$ vectors 525, the one or more $S_{BG}$ vectors 525B, the one or more $U_{DIST}$ vectors 525C, the one or more $U_{BG}$ vectors 525D, the one or more $V^T_{DIST}$ vectors 525E and the one or more $V^T_{BG}$ vectors 525F to the math unit 526. The salient component analysis unit 524 may also output the one or more $V^T_{DIST}$ vectors 525E to the quantization unit 534. The quantization unit 534 may quantize the one or more $V^T_{DIST}$ vectors 525E to generate one or more $V^T_{Q\_DIST}$ vectors 525G. The quantization unit 534 may provide the one or more $V^T_{Q\_DIST}$ vectors 525G to math unit 526, while also providing the one or more $V_{Q\_DIST}$ vectors 525G to the vector reordering unit 532 (as described above). The vector reorder unit 532 may operate with respect to the one or more $V^T_{Q\_DIST}$ vectors 525G in a manner similar to that described above with respect to the $V^T_{DIST}$ vectors 525E.

Upon receiving these vectors 525-525G ("vectors 525"), the math unit 526 may first determine distinct spherical harmonic coefficients that describe distinct components of the soundfield and background spherical harmonic coefficients that described background components of the soundfield. The matrix math unit 526 may be configured to determine the distinct spherical harmonic coefficients by multiplying the one or more $U_{DIST}$ 525C vectors by the one or more $S_{DIST}$ vectors 525A and then by the one or more $V^T_{DIST}$ vectors 525E. The math unit 526 may be configured to determine the background spherical harmonic coefficients by multiplying the one or more $U_{BG}$ 525D vectors by the one or more Sac; vectors 525A and then by the one or more $V^T_{BG}$ vectors 525E.

The math unit 526 may then determine one or more compensated $U_{DIST}*S_{DIST}$ vectors 527' (which may be similar to the $U_{DIST}*S_{DIST}$ vectors 527 except that these vectors include values to compensate for the $E_{DIST}$ error) by performing a pseudo inverse operation with respect to the one or more $V^T_{Q\_DIST}$ vectors 525G and then multiplying the distinct spherical harmonics by the pseudo inverse of the one or more $V^T_{Q\_DIST}$ vectors 525G. The vector reorder unit 532 may operate in the manner described above to generate reordered vectors 527', which are then audio encoded by audio encoding unit 515A to generate audio encoded reordered vectors 515', again as described above.

The math unit 526 may next project the $E_{DIST}$ error to the background spherical harmonic coefficients. The math unit 526 may, to perform this projection, determine or otherwise recover the original spherical harmonic coefficients 511 by adding the distinct spherical harmonic coefficients to the background spherical harmonic coefficients. The math unit 526 may then subtract the quantized distinct spherical harmonic coefficients (which may be generated by multiplying the $U_{DIST}$ vectors 525C by the $S_{DIST}$ vectors 525A and then by the $V^T_{Q\_DIST}$ vectors 525G) and the background spherical harmonic coefficients from the spherical harmonic coefficients 511 to determine the remaining error due to quantization of the $V^T_{DIST}$ vectors 519. The math unit 526 may then add this error to the quantized background spherical harmonic coefficients to generate compensated quantized background spherical harmonic coefficients 531'.

In any event, the order reduction unit 528A may perform as described above to reduce the compensated quantized background spherical harmonic coefficients 531' to reduced background spherical harmonic coefficients 529', which may be audio encoded by the audio encoding unit 514 in the manner described above to generate audio encoded reduced background spherical harmonic coefficients 515B'.

In this way, the techniques may enable the audio encoding device 510D to quantizing one or more first vectors, such as $V^T_{DIST}$ vectors 525E, representative of one or more components of a soundfield and compensate for error introduced due to the quantization of the one or more first vectors in one or more second vectors, such as the $U_{DIST}*S_{DIST}$ vectors 527 and/or the vectors of background spherical harmonic coefficients 531, that are also representative of the same one or more components of the soundfield.

Moreover, the techniques may provide this quantization error compensation in accordance with the following clauses.

Clause 133146-1B. A device, such as the audio encoding device 510D, comprising: one or more processors configured to quantize one or more first vectors representative of one or more distinct components of a sound field, and compensate for error introduced due to the quantization of the one or more first vectors in one or more second vectors that are also representative of the same one or more distinct components of the sound field.

Clause 133146-2B. The device of clause 133146-1B, wherein the one or more processors are configured to quantize one or more vectors from a transpose of a V matrix generated at least in part by performing a singular value decomposition with respect to a plurality of spherical harmonic coefficients that describe the sound field.

Clause 133146-3B. The device of clause 133146-1B, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and wherein the one or more processors are configured to quantize one or more vectors from a transpose of the V matrix.

Clause 133146-4B. The device of clause 133146-1B, wherein the one or more processors are configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, wherein the one or more processors are configured to quantize one or more vectors from a transpose of the V matrix, and wherein the one or more processors are configured to compensate for the error introduced due to the quantization in one or more U*S vectors computed by multiplying one or more U vectors of the U matrix by one or more S vectors of the S matrix.

Clause 133146-5B. The device of clause 133146-1B, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $U_{DIST}$ vectors of the U matrix, each of which corresponds to one of the distinct components of the sound field, determine one or more $S_{DIST}$ vectors of the S matrix, each of which corresponds to the same one of the distinct components of the sound field, and determine one or more $V^T_{DIST}$ vectors of a transpose of the V matrix, each of which corresponds to the same one of the distinct components of the sound field, wherein the one or more processors are configured to quantize the one or more $V^T_{DIST}$ vectors to generate one or more $V^T_{Q\_DIST}$ vectors, and wherein the one or more processors are configured to compensate for the error introduced due to the quantization in one or more $U_{DIST}*S_{DIST}$ vectors computed by multiplying the one or more $U_{DIST}$ vectors of the U matrix by one or more $S_{DIST}$ vectors of the S matrix so as to generate one or more error compensated $U_{DIST}*S_{DIST}$ vectors.

Clause 133146-6B. The device of clause 133146-5B, wherein the one or more processors are configured to determine distinct spherical harmonic coefficients based on the one or more $U_{DIST}$ vectors, the one or more $S_{DIST}$ vectors and the one or more $V^T_{DIST}$ vectors, and perform a pseudo inverse with respect to the $V^T_{Q\_DIST}$ vectors to divide the distinct spherical harmonic coefficients by the one or more $V^T_{Q\_DIST}$ vectors and thereby generate error compensated one or more $U_{C\_DIST}*S_{C\_DIST}$ vectors that compensate at least in part for the error introduced through the quantization of the $V^T_{DIST}$ vectors.

Clause 133146-7B. The device of clause 133146-5B, wherein the one or more processors are further configured to audio encode the one or more error compensated $U_{DIST}*S_{DIST}$ vectors.

Clause 133146-8B. The device of clause 133146-1B, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $U_{BG}$ vectors of the U matrix that describe one or more background components of the sound field and one or more $U_{DIST}$ vectors of the U matrix that describe one or more distinct components of the sound field, determine one or more $S_{BG}$ vectors of the S matrix that describe the one or more background components of the sound field and one or more $S_{DIST}$ vectors of the S matrix that describe the one or more distinct components of the sound field, and determine one or more $V^T_{DIST}$ vectors and one or more $V^T_{BG}$ vectors of a transpose of the V matrix, wherein the $V^T_{DIST}$ vectors describe the one or more distinct components of the sound field and the $V^T_{BG}$ describe the one or more background components of the sound field, wherein the one or more processors are configured to quantize the one or more $V^T_{DIST}$ vectors to generate one or more $V^T_{Q\_DIST}$ vectors, and wherein the one or more processors are further configured to compensate for at least a portion of the error introduced due to the quantization in background spherical harmonic coefficients formed by multiplying the one or more $U_{BG}$ vectors by the one or more $S_{BG}$ vectors and then by the one or more $V^T_{BG}$ vectors so as to generate error compensated background spherical harmonic coefficients.

Clause 133146-9B. The device of clause 133146-8B, wherein the one or more processors are configured to determine the error based on the $V^T_{DIST}$ vectors and one or more $U_{DIST}*S_{DIST}$ vectors formed by multiplying the $U_{DIST}$ vectors by the $S_{DIST}$ vectors, and add the determined error to the background spherical harmonic coefficients to generate the error compensated background spherical harmonic coefficients.

Clause 133146-10B. The device of clause 133146-8B, wherein the one or more processors are further configured to audio encode the error compensated background spherical harmonic coefficients.

Clause 133146-11B. The device of clause 133146-1B, wherein the one or more processors are configured to compensate for the error introduced due to the quantization of the one or more first vectors in one or more second vectors that are also representative of the same one or more components of the sound field to generate one or more error compensated second vectors, and wherein the one or more processors are further configured to generating a bitstream to include the one or more error compensated second vectors and the quantized one or more first vectors.

Clause 133146-12B. The device of clause 133146-1B, wherein the one or more processors are configured to compensate for the error introduced due to the quantization of the one or more first vectors in one or more second vectors that are also representative of the same one or more components of the sound field to generate one or more error compensated second vectors, and wherein the one or more processors are further configured to audio encode the one or more error compensated second vectors, and generate a bitstream to include the audio encoded one or more error compensated second vectors and the quantized one or more first vectors.

Clause 133146-1C. A device, such as the audio encoding device 510D, comprising: one or more processors configured to quantize one or more first vectors representative of one or more distinct components of a sound field, and compensate for error introduced due to the quantization of the one or more first vectors in one or more second vectors that are representative of one or more background components of the sound field.

Clause 133146-2C. The device of clause 133146-1C, wherein the one or more processors are configured to quantize one or more vectors from a transpose of a V matrix generated at least in part by performing a singular value decomposition with respect to a plurality of spherical harmonic coefficients that describe the sound field.

Clause 133146-3C. The device of clause 133146-1C, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and wherein the one or more processors are configured to quantize one or more vectors from a transpose of the V matrix.

Clause 133146-4C. The device of clause 133146-1C, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $U_{DIST}$ vectors of the U matrix, each of which corresponds to one of the distinct components of the sound field, determine one or more $S_{DIST}$ vectors of the S matrix, each of which corresponds to the same one of the distinct components of the sound field, and determine one or more $V^T_{DIST}$ vectors of a transpose of the V matrix, each of which corresponds to the same one of the distinct components of the sound field, wherein the one or more processors are configured to quantize the one or more $V^T_{DIST}$ vectors to generate one or more $V^T_{Q\_DIST}$ vectors, and compensate for at least a portion of the error introduced due to the quantization in one or more $U_{DIST}*S_{DIST}$ vectors computed by multiplying the one or more $U_{DIST}$ vectors of the U matrix by one or more $S_{DIST}$ vectors of the S matrix so as to generate one or more error compensated $U_{DIST}*S_{DIST}$ vectors.

Clause 133146-5C. The device of clause 133146-4C, wherein the one or more processors are configured to determine distinct spherical harmonic coefficients based on the one or more $U_{DIST}$ vectors, the one or more $S_{DIST}$ vectors and the one or more $V^T_{DIST}$ vectors, and perform a pseudo inverse with respect to the $V^T_{Q\_DIST}$ vectors to divide the distinct spherical harmonic coefficients by the one or more $V^T_{Q\_DIST}$ vectors and thereby generate one or more $U_{C\_DIST}*S_{C\_DIST}$ vectors that compensate at least in part for the error introduced through the quantization of the $V^T_{DIST}$ vectors.

Clause 133146-6C. The device of clause 133146-4C, wherein the one or more processors are further configured to audio encode the one or more error compensated $U_{DIST}*S_{DIST}$ vectors.

Clause 133146-7C. The device of clause 133146-1C, wherein the one or more processors are further configured to perform a singular value decomposition with respect to a plurality of spherical harmonic coefficients representative of a sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more UEG vectors of the U matrix that describe one or more background components of the sound field and one or more $U_{DIST}$ vectors of the U matrix that describe one or more distinct components of the sound field, determine one or more $S_{BG}$ vectors of the S matrix that describe the one or more background components of the sound field and one or more $S_{DIST}$ vectors of the S matrix that describe the one or more distinct components of the sound field, and determine one or more $V^T_{DIST}$ vectors and one or more VTR, vectors of a transpose of the V matrix, wherein the $V^T_{DIST}$ vectors describe the one or more distinct components of the sound field and the $V^T_{BG}$ describe the one or more background components of the sound field, wherein the one or more processors are configured to quantize the one or more $V^T_{BG}$ vectors to generate one or more $V^T_{Q\_DIST}$ vectors, and wherein the one or more processors are configured to compensate for the error introduced due to the quantization in background spherical harmonic coefficients formed by multiplying the one or more $U_{BG}$ vectors by the one or more $S_{BG}$ vectors and then by the one or more $V^T_{BG}$ vectors so as to generate error compensated background spherical harmonic coefficients.

Clause 133146-8C. The device of clause 133146-7C, wherein the one or more processors are configured to determine the error based on the $V^T_{DIST}$ vectors and one or more $U_{DIST}*S_{DIST}$ vectors formed by multiplying the $U_{DIST}$ vectors by the $S_{DIST}$ vectors, and add the determined error to the background spherical harmonic coefficients to generate the error compensated background spherical harmonic coefficients.

Clause 133146-9C. The device of clause 133146-7C, wherein the one or more processors are further configured to audio encode the error compensated background spherical harmonic coefficients.

Clause 133146-10C. The device of clause 133146-1C, wherein the one or more processors are further configured to compensate for the error introduced due to the quantization of the one or more first vectors in one or more second vectors that are also representative of the same one or more components of the sound field to generate one or more error compensated second vectors, and generate a bitstream to include the one or more error compensated second vectors and the quantized one or more first vectors.

Clause 133146-11C. The device of clause 133146-1C, wherein the one or more processors are further configured to compensate for the error introduced due to the quantization of the one or more first vectors in one or more second vectors that are also representative of the same one or more components of the sound field to generate one or more error compensated second vectors, audio encode the one or more error compensated second vectors, and generate a bitstream to include the audio encoded one or more error compensated second vectors and the quantized one or more first vectors.

In other words, when using frame based SVD (or related methods such as KLT & PCA) decomposition on HoA signals for the purpose of bandwidth reduction, the techniques described in this disclosure may enable the audio encoding device 10D to quantize the first few vectors of the U matrix (multiplied by the corresponding singular values of the S matrix) as well as the corresponding vectors of the V vector. This will comprise the [foreground] or [distinct] components of the soundfield. The techniques may then enable the audio encoding device 510D to code the U*S vectors using a [black-box] audio-coding engine, such as an AAC encoder. The V vector may either be scalar or vector quantized.

In addition, some of the remaining vectors in the U matrix may be multiplied with the corresponding singular values of the S matrix and V matrix and also coded using a [black-box] audio-coding engine. These will comprise the [background] components of the soundfield. A simple 16 bit scalar quantization of the V vectors may result in approximately 80 kbps overhead for 4th order (25 coefficients) and 160 kbps for 6th order (49 coefficients). More coarse quantization may result in larger quantization errors. The techniques described in this disclosure may compensate for the quantization error of the V vectors—by [projecting] the quantization error of the V vector onto the foreground and background components.

The techniques in this disclosure may include calculating a quantized version of the actual V vector. This quantized V vector may be called V' (where V'=V+e). The underlying HoA signal—for the foreground components—the techniques are attempting to recreate is given by H_f=USV, where the U, S and V only contain the foreground elements. For the purpose of this discussion, US will be replaced by a single set of vectors U. Thus, H_f=UV. Given that we have an erroneous V', the techniques are attempting to recreate H_f as closely as possible. Thus, the techniques may enable the audio encoding device 100D to find U' such that H_f=U'V'. The audio encoding device 100D may use a pseudo inverse methodology that allows U'=H_f[V']^(−1). Using the so-called [blackbox] audio-coding engine to code U', the techniques may minimize the error in H, caused by what may be referred to as the erroneous V vector.

In a similar way, the techniques may also enable the audio encoding device to project the error due to quantizing V into the background elements. The audio encoding device 510D may be configured to recreate the total HoA signal which is a combination of foreground and background HoA signals, i.e., H=H_f+H_b. This can again be modelled as H=H_f+ e+H_b, due to the quantization error in V'. In this way, instead of putting the H_b through the [black-box audio-coder], we put (e+H_b) through the audio-coder, in effect compensating for the error in V'. In practice, this compensates for the error only up-to the order determined by the audio encoding device 510D to send for the background elements.

Figure 40E:
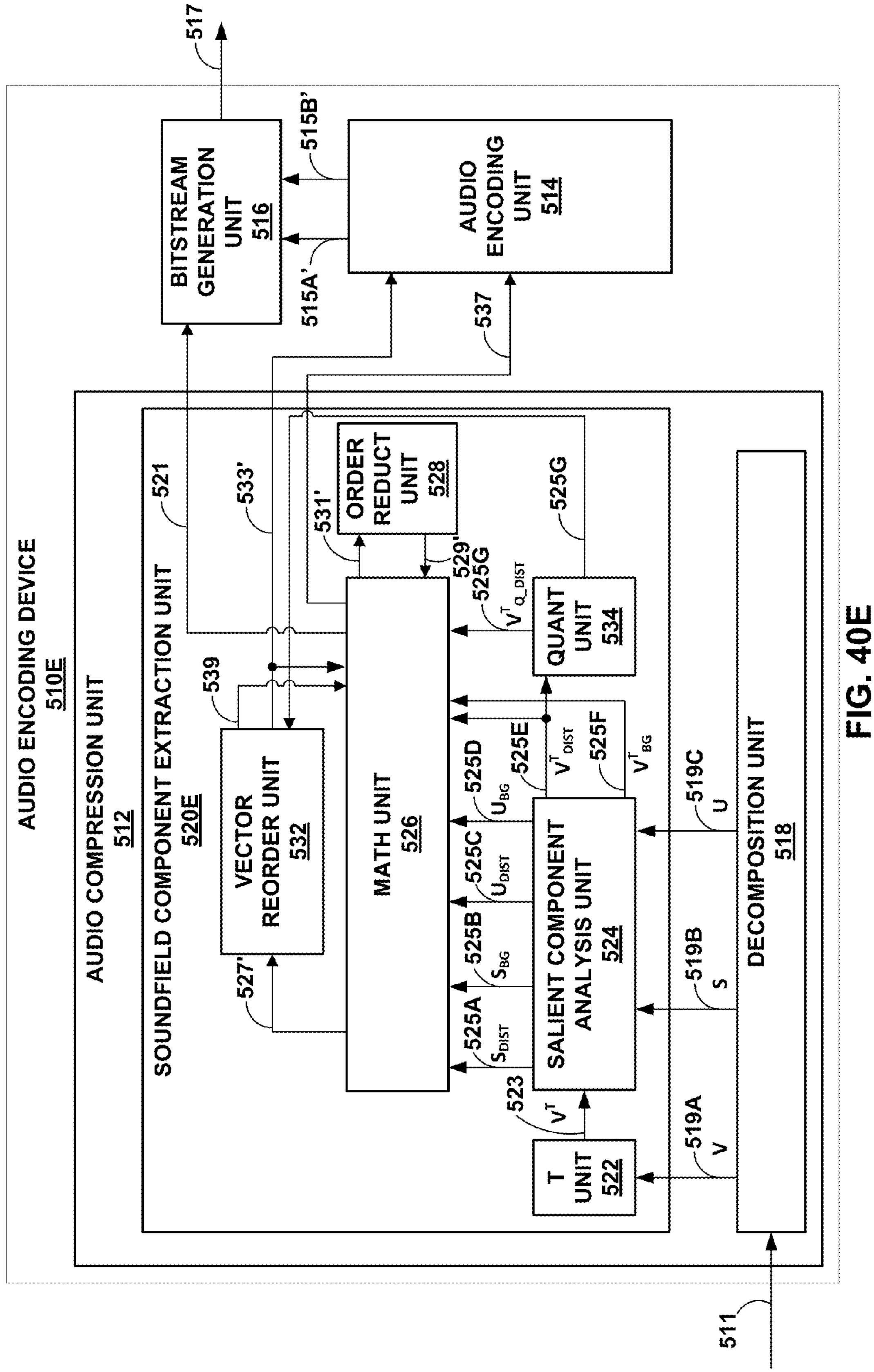

FIG. 40E is a block diagram illustrating an example audio encoding device 510E that may perform various aspects of the techniques described in this disclosure to compress spherical harmonic coefficients describing two or three dimensional soundfields. The audio encoding device 510E may be similar to audio encoding device 510D in that audio encoding device 510E includes an audio compression unit 512, an audio encoding unit 514 and a bitstream generation unit 516. Moreover, the audio compression unit 512 of the audio encoding device 510E may be similar to that of the audio encoding device 510D in that the audio compression unit 512 includes a decomposition unit 518.

The audio compression unit 512 of the audio encoding device 510E may, however, differ from the audio compression unit 512 of the audio encoding device 510D in that the math unit 526 of soundfield component extraction unit 520 performs additional aspects of the techniques described in this disclosure to further reduce the V matrix 519A prior to including the reduced version of the transpose of the V matrix 519A in the bitstream 517. For this reason, the soundfield component extraction unit 520 of the audio encoding device 510E is denoted as the "soundfield component extraction unit 520E."

In the example of FIG. 40E, the order reduction unit 528, rather than forward the reduced background spherical harmonic coefficients 529' to the audio encoding unit 514, returns the reduced background spherical harmonic coefficients 529' to the math unit 526. As noted above, these reduced background spherical harmonic coefficients 529' may have been reduced by removing those of the coefficients corresponding to spherical basis functions having one or more identified orders and/or sub-orders. The reduced order of the reduced background spherical harmonic coefficients 529' may be denoted by the variable $N_{BG}$.

Given that the soundfield component extraction unit 520E may not perform order reduction with respect to the reordered one or more $U_{DIST}*S_{DIST}$ vectors 533', the order of this decomposition of the spherical harmonic coefficients describing distinct components of the soundfield (which may be denoted by the variable $N_{DIST}$) may be greater than the background order, $N_{BG}$. In other words, $N_{BG}$ may commonly be less than $N_{DIST}$. One possible reason that $N_{BG}$ may be less than $N_{DIST}$ is that it is assumed that the background components do not have much directionality such that higher order spherical basis functions are not required, thereby enabling the order reduction and resulting in $N_{BG}$ being less than $N_{DIST}$.

Given that the reordered one or more $V^T_{Q\_DIST}$ vectors 539 were previously sent openly, without audio encoding these vectors 539 in the bitstream 517, as shown in the examples of FIGS. 40A-40D, the reordered one or more $V^T_{Q\_DIST}$ vectors 539 may consume considerable bandwidth. As one example, each of the reordered one or more $V^T_{Q\_DIST}$ vectors 539, when quantized to 16-bit scalar values, may consume approximately 20 Kbps for fourth order Ambisonics audio data (where each vector has 25 coefficients) and 40 Kbps for sixth order Ambisonics audio data (where each vector has 49 coefficients).

In accordance with various aspects of the techniques described in this disclosure, the soundfield component extraction unit 520E may reduce the amount of bits that need to be specified for spherical harmonic coefficients or decompositions thereof, such as the reordered one or more $V^T_{Q\_DIST}$ vectors 539. In some examples, the math unit 526 may determine, based on the order reduced spherical harmonic coefficients 529', those of the reordered $V^T_{Q\_DIST}$ vectors 539 that are to be removed and recombined with the order reduced spherical harmonic coefficients 529' and those of the reordered $V^T_{Q\_DIST}$ vectors 539 that are to form the $V^T_{SMALL}$ vectors 521. That is, the math unit 526 may determine an order of the order reduced spherical harmonic coefficients 529', where this order may be denoted $N_{BG}$. The reordered $V^T_{Q\_DIST}$ vectors 539 may be of an order denoted by the variable $N_{DIST}$, where $N_{DIST}$ is greater than the order $N_{BG}$.

The math unit 526 may then parse the first $N_{BG}$ orders of the reordered $V^T_{Q\_DIST}$ vectors 539, removing those vectors specifying decomposed spherical harmonic coefficients corresponding to spherical basis functions having an order less than or equal to $N_{BG}$. These removed reordered $V^T_{Q\_DIST}$ vectors 539 may then be used to form intermediate spherical harmonic coefficients by multiplying those of the reordered $U_{DIST}*S_{DIST}$ vectors 533' representative of decomposed versions of the spherical harmonic coefficients 511 corresponding to spherical basis functions having an order less than or equal to $N_{BG}$ by the removed reordered $V^T_{Q\_DIST}$ vectors 539 to form the intermediate distinct spherical harmonic coefficients. The math unit 526 may then generate modified background spherical harmonic coefficients 537 by adding the intermediate distinct spherical harmonic coefficients to the order reduced spherical harmonic coefficients 529'. The math unit 526 may then pass this modified background spherical harmonic coefficients 537 to the audio encoding unit 514, which audio encodes these coefficients 537 to form audio encoded modified background spherical harmonic coefficients 515B'.

The math unit 526 may then pass the one or more $V^T_{SMALL}$ vectors 521, which may represent those vectors 539 representative of a decomposed form of the spherical harmonic coefficients 511 corresponding to spherical basis functions having an order greater than $N_{BG}$ and less than or equal to $N_{DIST}$. In this respect, the math unit 526 may perform operations similar to the coefficient reduction unit 46 of the audio encoding device 20 shown in the example of FIG. 4. The math unit 526 may pass the one or more $V^T_{SMALL}$ vectors 521 to the bitstream generation unit 516, which may generate the bitstream 517 to include the $V^T_{SMALL}$ vectors 521 often in their original non-audio encoded form. Given that $V^T_{SMALL}$ vectors 521 includes less vectors than the reordered $V^T_{Q\_DIST}$ vectors 539, the techniques may facilitate allocation of less bits to the reordered $V^T_{Q\_DIST}$ vectors 539 by only specifying the $V^T_{SMALL}$ vectors 521 in the bitstream 517.

While shown as not being quantized, in some instances, the audio encoding device 510E may quantize $V^T_{BG}$ vectors 525F. In some instances, such as when audio encoding unit 514 is not used to compress background spherical harmonic coefficients, the audio encoding device 510E may quantize the $V^T_{BG}$ vectors 525F.

In this way, the techniques may enable the audio encoding device 510E to determine at least one of one or more vectors decomposed from spherical harmonic coefficients to be recombined with background spherical harmonic coefficients to reduce an amount of bits required to be allocated to the one or more vectors in a bitstream, wherein the spherical harmonic coefficients describe a soundfield, and wherein the background spherical harmonic coefficients described one or more background components of the same soundfield.

That is, the techniques may enable the audio encoding device 510E to be configured in a manner indicated by the following clauses.

Clause 133149-1A. A device, such as the audio encoding device 510E, comprising: one or more processors configured to determine at least one of one or more vectors decomposed from spherical harmonic coefficients to be recombined with background spherical harmonic coefficients to reduce an amount of bits required to be allocated to the one or more vectors in a bitstream, wherein the spherical harmonic coefficients describe a sound field, and wherein the background spherical harmonic coefficients described one or more background components of the same sound field.

Clause 133149-2A. The device of clause 133149-1A, wherein the one or more processors are further configured to generate a reduced set of the one or more vectors by removing the determined at least one of the one or more vectors from the one or more vectors.

Clause 133149-3A. The device of clause 133149-1A, wherein the one or more processors are further configured to generate a reduced set of the one or more vectors by removing the determined at least one of the one or more vectors from the one or more vectors, recombine the removed at least one of the one or more vectors with the background spherical harmonic coefficients to generate modified background spherical harmonic coefficients, and generate the bitstream to include the reduced set of the one or more vectors and the modified background spherical harmonic coefficients.

Clause 133149-4A. The device of clause 133149-3A, wherein the reduced set of the one or more vectors is included in the bitstream without first being audio encoded.

Clause 133149-5A. The device of clause 133149-1A, wherein the one or more processors are further configured to generate a reduced set of the one or more vectors by removing the determined at least one of the one or more vectors from the one or more vectors, recombine the removed at least one of the one or more vectors with the background spherical harmonic coefficients to generate modified background spherical harmonic coefficients, audio encoding the modified background spherical harmonic coefficients, and generate the bitstream to include the reduced set of the one or more vectors and the audio encoded modified background spherical harmonic coefficients.

Clause 133149-6A. The device of clause 133149-1A, wherein the one or more vectors comprise vectors representative of at least some aspect of one or more distinct components of the sound field.

Clause 133149-7A. The device of clause 133149-1A, wherein the one or more vectors comprise one or more vectors from a transpose of a V matrix generated at least in part by performing a singular value decomposition with respect to the plurality of spherical harmonic coefficients that describe the sound field.

Clause 133149-8A. The device of clause 133149-1A, wherein the one or more processors are further configured to perform a singular value decomposition with respect to the plurality of spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and wherein the one or more vectors comprises one or more vectors from a transpose of the V matrix.

Clause 133149-9A. The device of clause 133149-1A, wherein the one or more processors are further configured to perform an order reduction with respect to the background spherical harmonic coefficients so as to remove those of the background spherical harmonic coefficients corresponding to spherical basis functions having an identified order and/or sub-order, wherein the background spherical harmonic coefficients correspond to an order $N_{BG}$.

Clause 133149-10A. The device of clause 133149-1A, wherein the one or more processors are further configured to perform an order reduction with respect to the background spherical harmonic coefficients so as to remove those of the background spherical harmonic coefficients corresponding to spherical basis functions having an identified order and/or sub-order, wherein the background spherical harmonic coefficients correspond to an order $N_{BG}$ that is less than the order of distinct spherical harmonic coefficients, $N_{DIST}$, and wherein the distinct spherical harmonic coefficients represent distinct components of the sound field.

Clause 133149-11A. The device of clause 133149-1A, wherein the one or more processors are further configured to perform an order reduction with respect to the background spherical harmonic coefficients so as to remove those of the background spherical harmonic coefficients corresponding to spherical basis functions having an identified order and/or sub-order, wherein the background spherical harmonic coefficients correspond to an order $N_{BG}$ that is less than the order of distinct spherical harmonic coefficients, $N_{DIST}$, and wherein the distinct spherical harmonic coefficients represent distinct components of the sound field and are not subject to the order reduction.

Clause 133149-12A. The device of clause 133149-1A, wherein the one or more processors are further configured to perform a singular value decomposition with respect to the plurality of spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and determine one or more $V^T_{DIST}$ vectors and one or more $V^T_{BG}$ of a transpose of the V matrix, the one or more $V^T_{DIST}$ vectors describe one or more distinct components of the sound field and the one or more $V^T_{BG}$ vectors describe one or more background components of the sound field, and wherein the one or more vectors includes the one or more $V^T_{DIST}$ vectors.

Clause 133149-13A. The device of clause 133149-1A, wherein the one or more processors are further configured to perform a singular value decomposition with respect to the plurality of spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $V^T_{DIST}$ vectors and one or more $V^T_{BG}$ of a transpose of the V matrix, the one or more $V_{DIST}$ vectors describe one or more distinct components of the sound field and the one or more $V_{BG}$ vectors describe one or more background components of the sound field, and quantize the one or more $V^T_{DIST}$ vectors to generate one or more $V^T_{Q\_DIST}$ vectors, and wherein the one or more vectors includes the one or more $V^T_{Q\_DIST}$ vectors.

Clause 133149-14A. The device of either of clause 133149-12A or clause 133149-13A, wherein the one or more processors are further configured to determine one or more $U_{DIST}$ vectors and one or more $U_{BG}$ vectors of the U matrix, the one or more $U_{DIST}$ vectors describe the one or more distinct components of the sound field and the one or more $U_{BG}$ vectors describe the one or more background components of the sound field, and determine one or more $S_{DIST}$ Vectors and one or more $S_{BG}$ vectors of the S matrix, the one or more $S_{DIST}$ vectors describe the one or more distinct components of the sound field and the one or more $S_{BG}$ vectors describe the one or more background components of the sound field.

Clause 133149-15A. The device of clause 133149-14A, wherein the one or more processors are further configured to determine the background spherical harmonic coefficients as a function of the one or more $U_{BG}$ vectors, the one or more $S_{BG}$ vectors, and the one or more $V^T_{BG}$, perform order reduction with respect to the background spherical harmonic coefficients to generate reduced background spherical harmonic coefficients having an order equal to $N_{BG}$, multiply the one or more $U_{DIST}$ by the one or more $S_{DIST}$ vectors to generate one or more $U_{DIST}*S_{DIST}$ vectors, remove the determined at least one of the one or more vectors from the one or more vectors to generate a reduced set of the one or more vectors, multiply the one or more $U_{DIST}*S_{DIST}$ vectors by the removed at least one of the one or more $V^T_{DIST}$ vectors or the one or more $V^T_{Q\_DST}$ vectors to generate intermediate distinct spherical harmonic coefficients, and add the intermediate distinct spherical harmonic coefficients to the background spherical harmonic coefficient to recombine the removed at least one of the one or more $V^T_{DIST}$ vectors or the one or more $V^T_{Q\_DIST}$ vectors with the background spherical harmonic coefficients.

Clause 133149-16A. The device of clause 133149-14A, wherein the one or more processors are further configured to determine the background spherical harmonic coefficients as a function of the one or more $U_{BG}$ vectors, the one or more $S_{BG}$ vectors, and the one or more $V^T_{BG}$, perform order reduction with respect to the background spherical harmonic coefficients to generate reduced background spherical harmonic coefficients having an order equal to $N_{BG}$, multiply the one or more $U_{DIST}$ by the one or more $S_{DIST}$ vectors to generate one or more $U_{DIST}*S_{DIST}$ vectors, reorder the one or more $U_{DIST}*S_{DIST}$ vectors to generate reordered one or more $U_{DIST}*S_{DIST}$ vectors, remove the determined at least one of the one or more vectors from the one or more vectors to generate a reduced set of the one or more vectors, multiply the reordered one or more $U_{DIST}*S_{DIST}$ vectors by the removed at least one of the one or more $V^T_{DIST}$ vectors or the one or more $V^T_{Q\_DIST}$ vectors to generate intermediate distinct spherical harmonic coefficients, and add the intermediate distinct spherical harmonic coefficients to the background spherical harmonic coefficient to recombine the removed at least one of the one or more $V^T_{DIST}$ vectors or the one or more $V^T_{Q\_DIST}$ vectors with the background spherical harmonic coefficients.

Clause 133149-17A. The device of either of clause 133149-15A or clause 133149-16A, wherein the one or more processors are further configured to audio encode the background spherical harmonic coefficients after adding the intermediate distinct spherical harmonic coefficients to the background spherical harmonic coefficients, and generate the bitstream to include the audio encoded background spherical harmonic coefficients.

Clause 133149-18A. The device of clause 133149-1A, wherein the one or more processors are further configured to perform a singular value decomposition with respect to the plurality of spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, determine one or more $V^T_{DIST}$ vectors and one or more $V^T_{BG}$ of a transpose of the V matrix, the one or more $V_{DIST}$ vectors describe one or more distinct components of the sound field and the one or more $V_{BG}$ vectors describe one or more background components of the sound field, quantize the one or more $V^T_{DIST}$ vectors to generate one or more $V^T_{Q\_DIST}$ vectors, and reorder the one or more $V^T_{Q\_DIST}$ vectors to generate reordered one or more $V^T_{Q\_DIST}$ vectors, and wherein the one or more vectors includes the reordered one or more $V^T_{Q\_DIST}$ vectors.

Figure 40F:
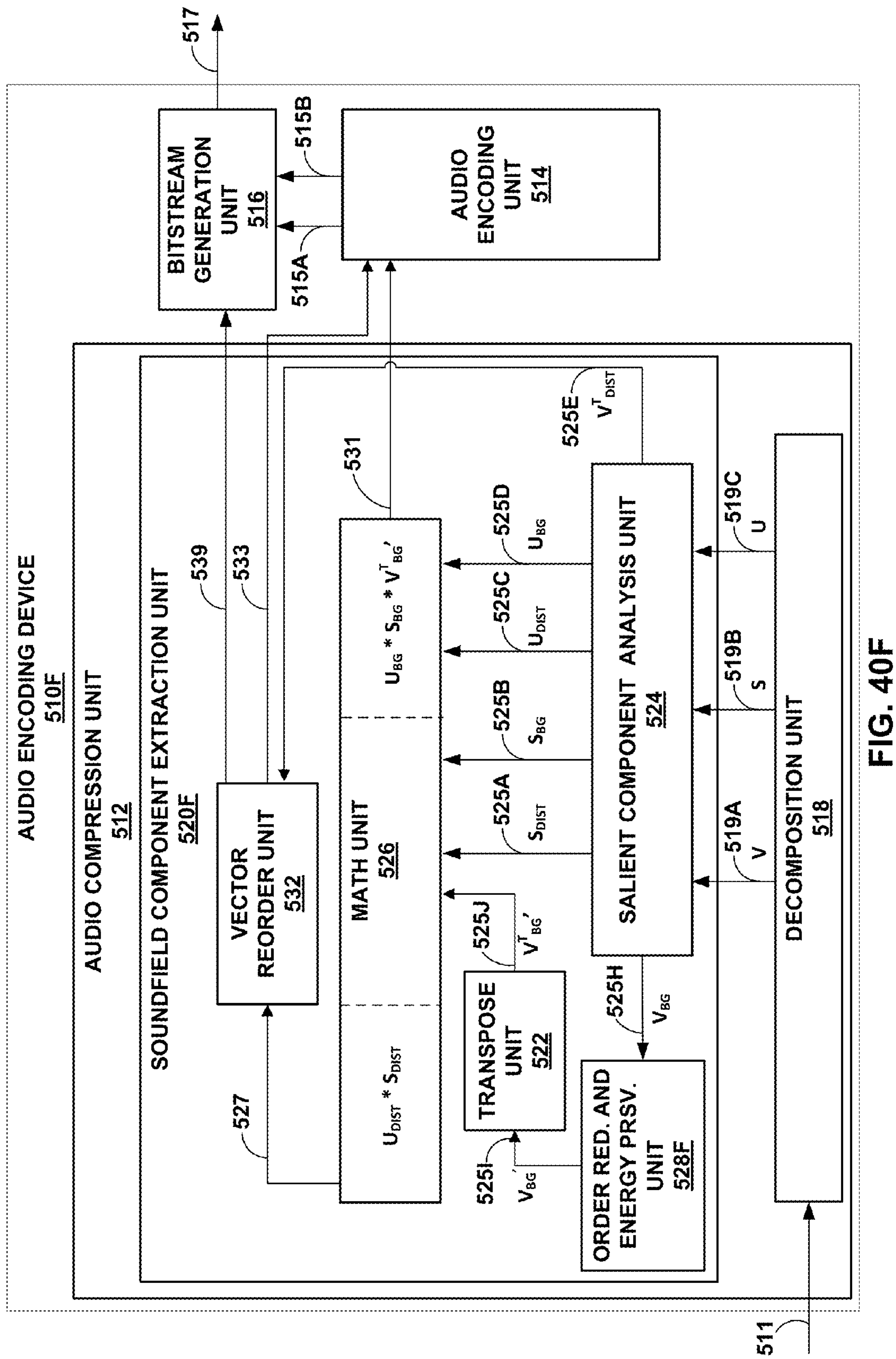

FIG. 40F is a block diagram illustrating example audio encoding device 510F that may perform various aspects of the techniques described in this disclosure to compress spherical harmonic coefficients describing two or three dimensional soundfields. The audio encoding device 510F may be similar to audio encoding device 510C in that audio encoding device 510F includes an audio compression unit 512, an audio encoding unit 514 and a bitstream generation unit 516. Moreover, the audio compression unit 512 of the audio encoding device 510F may be similar to that of the audio encoding device 510C in that the audio compression unit 512 includes a decomposition unit 518 and a vector reorder unit 532, which may operate similarly to like units of the audio encoding device 510C. In some examples, audio encoding device 510F may include a quantization unit 534, as described with respect to FIGS. 40D and 40E, to quantize one or more vectors of any of the $U_{DIST}$ vectors 525C, the $U_{BG}$ vectors 525D, the $V^T_{DIST}$ vectors 525E, and the $V^T_{BG}$ vectors 525J.

The audio compression unit 512 of the audio encoding device 510F may, however, differ from the audio compression unit 512 of the audio encoding device 510C in that the salient component analysis unit 524 of the soundfield component extraction unit 520 may perform a content analysis to select the number of foreground components, denoted as D in the context of FIGS. 40A-40J. In other words, the salient component analysis unit 524 may operate with respect to the U, S and V matrixes 519 in the manner described above to identify whether the decomposed versions of the spherical harmonic coefficients were generated from synthetic audio objects or from a natural recording with a microphone. The salient component analysis unit 524 may then determine D based on this synthetic determination.

Moreover, the audio compression unit 512 of the audio encoding device 510F may differ from the audio compression unit 512 of the audio encoding device 510C in that the soundfield component extraction unit 520 may include an additional unit, an order reduction and energy preservation unit 528F (illustrated as "order red, and energy prsv, unit 528F"). For these reasons, the soundfield component extraction unit 520 of the audio encoding device 510F is denoted as the "soundfield component extraction unit 520F".

The order reduction and energy preservation unit 528F represents a unit configured to perform order reduction of the background components of $V_{BG}$ matrix 525H representative of the right-singular vectors of the plurality of spherical harmonic coefficients 511 while preserving the overall energy (and concomitant sound pressure) of the soundfield described in part by the full $V_{BG}$ matrix 525H. In this respect, the order reduction and energy preservation unit 528F may perform operations similar to those described above with respect to the background selection unit 48 and the energy compensation unit 38 of the audio encoding device 20 shown in the example of FIG. 4.

The full $V_{BG}$ matrix 525H has dimensionality $(N+1)^2 \times (N+1)^2-D$, where D represents a number of principal components or, in other words, singular values that are determined to be salient in terms of being distinct audio components of the soundfield. That is, the full $V_{BG}$ matrix 525H includes those singular values that are determined to be background (BG) or, in other words, ambient or non-distinct-audio components of the soundfield.

As described above with respect to, e.g., order reduction unit 524 of FIGS. 40B-40E, the order reduction and energy preservation unit 528F may remove, eliminate or otherwise delete (often by zeroing out) those of the background singular values of the $V_{BG}$ matrix 525H corresponding to higher order spherical basis functions. The order reduction and energy preservation unit 528F may output a reduced version of the $V_{BG}$ matrix 525H (denoted as "$V_{BG}'$ matrix 525I" and referred to hereinafter as "reduced $V_{BG}'$ matrix 525I") to transpose unit 522. The reduced $V_{BG}'$ matrix 525I may have dimensionality $(\tilde{\eta}+1)^2 \times (N+1)^2-D$, with $\tilde{\eta}<N$. Transpose unit 522 applies a transpose operation to the reduced $V_{BG}'$ matrix 525I to generate and output a transposed reduced $V^T_{BG}'$ matrix 525J to math unit 526, which may operate to reconstruct the background sound components of the soundfield by computing $U_{BG}*S_{BG}*V^T_{BG}$ using the $U_{BG}$ matrix 525D, the $S_{BG}$ matrix 525B, and transposed reduced $V^T_{BG}'$ matrix 525J.

In accordance with techniques described herein, the order reduction and energy preservation unit 528F is further configured to compensate for possible reductions in the overall energy of the background sound components of the soundfield caused by reducing the order of the full $V_{BG}$ matrix 525H to generate the reduced $V_{BG'}$ matrix 525I. In some examples, the order reduction and energy preservation unit 528F compensates by determining a compensation gain in the form of amplification values to apply to each of the $(N+1)^2-D$ columns of reduced $V_{BG}'$ matrix 525I in order to increase the root mean-squared (RMS) energy of reduced $V_{BG}'$ matrix 525I to equal or at least more nearly approximate the RMS of the full $V_{BG}$ matrix 525H, prior to outputting reduced $V_{BG}'$ matrix 525I to transpose unit 522.

In some instances, order reduction and energy preservation unit 528F may determine the RMS energy of each column of the full $V_{BG}$ matrix 525H and the RMS energy of each column of the reduced $V_{BG}'$ matrix 525I, then determine the amplification value for the column as the ratio of the former to the latter, as indicated in the following equation:

$$\propto = v_{BG}/v_{BG}',$$

where $\propto$ is the amplification value for a column, $v_{BG}$ represents a single column of the $V_{BG}$ matrix 525H, and $v_{BG}'$ represents the corresponding single column of the $V_{BG}'$ matrix 525I. This may be represented in matrix notation as:

$$A = V_{BG}^{RMS}/V_{BG}'^{RMS},$$
$$A = [\propto_1 \ldots \propto_{(N+1)^2-D}],$$

where $V_{BG}^{RMS}$ is an RMS vector having elements denoting the RMS of each column of $V_{BG}$ matrix 525H, $V_{BG}'^{RMS}$ is an RMS vector having elements denoting the RMS of each column of reduced $V_{BG}'$ matrix 525I, and A is an amplification value vector having elements for each column of $V_{BG}$ matrix 525H. The order reduction and energy preservation unit 528F applies a scalar multiplication to each column of reduced $V_{BG}$ matrix 525I using the corresponding amplification value, $\propto$, or in vector form:

$$V''_{BG} = V_{BG}' A^T,$$

where $V''_{BG}$ represents a reduced $V_{BG}'$ matrix 525I including energy compensation. The order reduction and energy preservation unit 528F may output reduced $V_{BG}'$ matrix 525I including energy compensation to transpose unit 522 to equalize (or nearly equalize) the RMS of reduced $V_{BG}'$ matrix 525I with that of full $V_{BG}$ matrix 525H. The output dimensionality of reduced $V_{BG}'$ matrix 525I including energy compensation may be $(\tilde{\eta}+1)^2 \times (N+1)^2-D$.

In some examples, to determine each RMS of respective columns of reduced $V_{BG}'$ matrix 525I and full $V_{BG}$ matrix 525H, the order reduction and energy preservation unit 528F may first apply a reference spherical harmonics coefficients (SHC) renderer to the columns. Application of the reference SHC renderer by the order reduction and energy preservation unit 528F allows for determination of RMS in the SHC domain to determine the energy of the overall soundfield described by each column of the frame represented by reduced $V_{BG}'$ matrix 525I and full $V_{BG}$ matrix 525H. Thus, in such examples, the order reduction and energy preservation unit 528F may apply the reference SHC renderer to each column of the full $V_{BG}$ matrix 525H and to each reduced column of the reduced $V_{BG}'$ matrix 525I, determine respective RMS values for the column and the reduced column, and determine the amplification value for the column as the ratio of the RMS value for the column to the RMS value to the reduced column. In some examples, order reduction to reduced $V_{BG}'$ matrix 525I proceeds column-wise coincident to energy preservation. This may be expressed in pseudocode as follows:

```
R = ReferenceRenderer;
for m = numDist+1 : numChannels
   fullV = V(:,m); //takes one column of V => fullV
   reducedV =[fullV(1:numBG); zeros(numChannels-numBG,1)];
   alpha=sqrt( sum((fullV'*R).^2)/sum((reducedV'*R).^2) );
   if isnan(alpha) || isinf(alpha), alpha = 1; end;
   V_out(:,m) = reducedV * alpha;
end
```

In the above pseudocode, numChannels may represent $(N+1)^2-D$, numBG may represent $(\tilde{\eta}+1)^2$, V may represent $V_{BG}$ matrix 525H, and V_out may represent reduced $V_{BG}'$ matrix 525I, and R may represent the reference SHC renderer of the order reduction and energy preservation unit 528F. The dimensionality of V may be $(N+1)^2 \times (N+1)^2-D$ and the dimensionality of V_out may be $(\tilde{\eta}+1)^2 \times (N+1)^2-D$.

As a result, the audio encoding device 510F may, when representing the plurality of spherical harmonic coefficients 511, reconstruct the background sound components using an order-reduced $V_{BG}'$ matrix 525I that includes compensation for energy that may be lost as a result to the order reduction process.

Figure 40G:
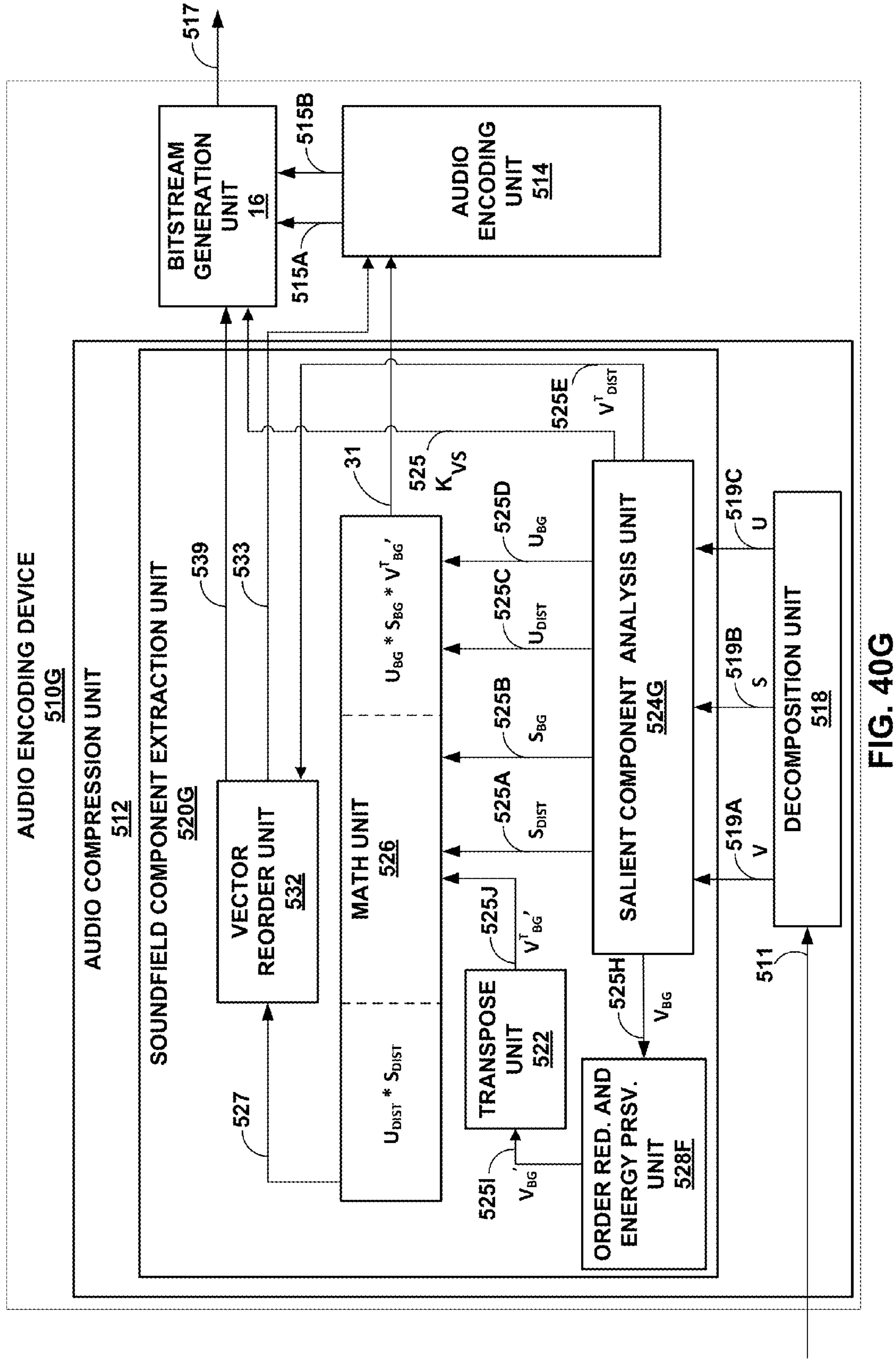

FIG. 40G is a block diagram illustrating example audio encoding device 510G that may perform various aspects of the techniques described in this disclosure to compress spherical harmonic coefficients describing two or three dimensional soundfields. In the example of FIG. 40G, the audio encoding device 510G includes a soundfield component extraction unit 520F. In turn, the soundfield component extraction unit 520F includes a salient component analysis unit 524G.

The audio compression unit 512 of the audio encoding device 510G may, however, differ from the audio compression unit 512 of the audio encoding device 10F in that the audio compression unit 512 of the audio encoding device 510G includes a salient component analysis unit 524G. The salient component analysis unit 524G may represent a unit configured to determine saliency or distinctness of audio data representing a soundfield, using directionality-based information associated with the audio data.

While energy-based determinations may improve rendering of a soundfield decomposed by SVD to identify distinct audio components of the soundfield, energy-based determinations may also cause a device to erroneously identify background audio components as distinct audio components, in cases where the background audio components exhibit a high energy level. That is, a solely energy-based separation of distinct and background audio components may not be robust, as energetic (e.g., louder) background audio components may be incorrectly identified as being distinct audio components. To more robustly distinguish between distinct and background audio components of the soundfield, various aspects of the techniques described in this disclosure may enable the salient component analysis unit 524G to perform a directionality-based analysis of the SHC 511 to separate distinct and background audio components from decomposed versions of the SHC 511.

Figure 40H:
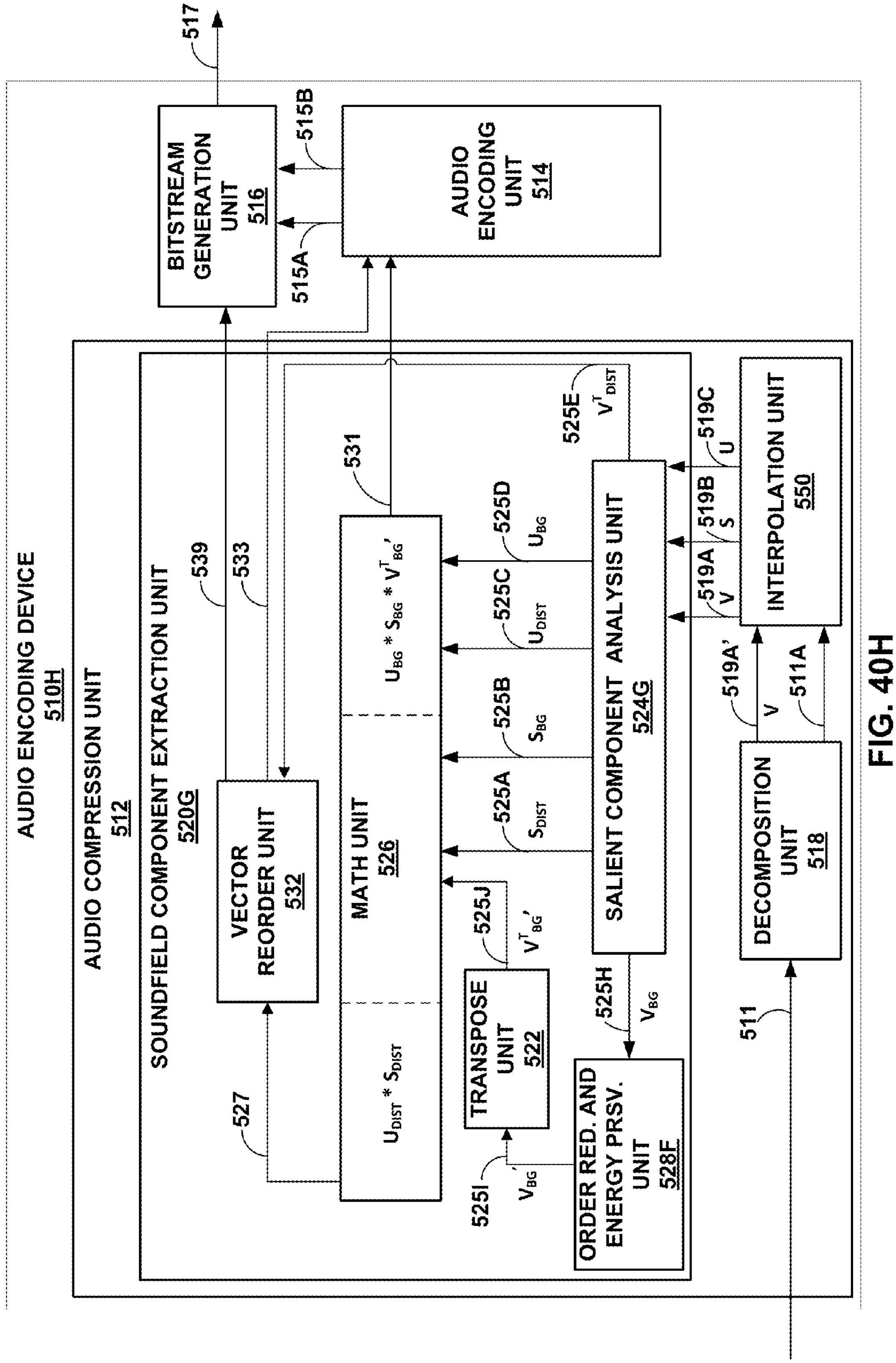

The salient component analysis unit 524G may, in the example of FIG. 40H, represent a unit configured or otherwise operable to separate distinct (or foreground) elements from background elements included in one or more of the V matrix 519, the S matrix 519B, and the U matrix 519C, similar to the salient component analysis units 524 of previously described audio encoding devices 510-510F. According to some SVD-based techniques, the most energetic components (e.g., the first few vectors of one or more of the V, S and U matrices 519-519C or a matrix derived therefrom) may be treated as distinct components. However, the most energetic components (which are represented by vectors) of one or more of the matrices 519-519C may not, in all scenarios, represent the components/signals that are the most directional.

Unlike the previously described salient component analysis units 524, the salient component analysis unit 524G may implement one or more aspects of the techniques described herein to identify foreground elements based on the directionality of the vectors of one or more of the matrices 519-519C or a matrix derived therefrom. In some examples, the salient component analysis unit 524G may identify or select as distinct audio components (where the components may also be referred to as "objects"), one or more vectors based on both energy and directionality of the vectors. For instance, the salient component analysis unit 524G may identify those vectors of one or more of the matrices 519-519C (or a matrix derived therefrom) that display both high energy and high directionality (e.g., represented as a directionality quotient) as distinct audio components. As a result, if the salient component analysis unit 524G determines that a particular vector is relatively less directional when compared to other vectors of one or more of the matrices 519-519C (or a matrix derived therefrom), then regardless of the energy level associated with the particular vector, the salient component analysis unit 524G may determine that the particular vector represents background (or ambient) audio components of the soundfield represented by the SHC 511. In this respect, the salient component analysis unit 524G may perform operations similar to those described above with respect to the soundfield analysis unit 44 of the audio encoding device 20 shown in the example of FIG. 4.

In some implementations, the salient component analysis unit 524G may identify distinct audio objects (which, as noted above, may also be referred to as "components") based on directionality, by performing the following operations. The salient component analysis unit 524G may multiply (e.g., using one or more matrix multiplication processes) the V matrix 519A by the S matrix 519B. By multiplying the V matrix 519A and the S matrix 519B, the salient component analysis unit 524G may obtain a VS matrix. Additionally, the salient component analysis unit 524G may square (i.e., exponentiate by a power of two) at least some of the entries of each of the vectors (which may be a row) of the VS matrix. In some instances, the salient component analysis unit 524G may sum those squared entries of each vector that are associated with an order greater than 1. As one example, if each vector of the matrix includes 25 entries, the salient component analysis unit 524G may, with respect to each vector, square the entries of each vector beginning at the fifth entry and ending at the twenty-fifth entry, summing the squared entries to determine a directionality quotient (or a directionality indicator). Each summing operation may result in a directionality quotient for a corresponding vector. In this example, the salient component analysis unit 524G may determine that those entries of each row that are associated with an order less than or equal to 1, namely, the first through fourth entries, are more generally directed to the amount of energy and less to the directionality of those entries. That is, the lower order ambisonics associated with an order of zero or one correspond to spherical basis functions that, as illustrated in FIG. 1 and FIG. 2, do not provide much in terms of the direction of the pressure wave, but rather provide some volume (which is representative of energy).

The operations described in the example above may also be expressed according to the following pseudo-code. The pseudo-code below includes annotations, in the form of comment statements that are included within consecutive instances of the character strings "/*" and "*/" (without quotes).

```
[U,S,V] = svd(audioframe,'ecom');
VS = V*S;
```

/* The next line is directed to analyzing each row independently, and summing the values in the first (as one example) row from the fifth entry to the twenty-fifth entry to determine a directionality quotient or directionality metric for a corresponding vector. Square the entries before summing. The entries in each row that are associated with an order greater than 1 are associated with higher order ambisonics, and are thus more likely to be directional. */

```
sumVS=sum(VS(5:end,:).^2,1);
```

/* The next line is directed to sorting the sum of squares for the generated VS matrix, and selecting a set of the largest values (e.g., three or four of the largest values) */

```
[~,idxVS] = sort(sumVS,'descend');
U = U(:,idxVS);
V = V(:,idxVS);
S = S(idxVS,idxVS);
```

In other words, according to the above pseudo-code, the salient component analysis unit 524G may select entries of each vector of the VS matrix decomposed from those of the SHC 511 corresponding to a spherical basis function having an order greater than one. The salient component analysis unit 524G may then square these entries for each vector of the VS matrix, summing the squared entries to identify, compute or otherwise determine a directionality metric or quotient for each vector of the VS matrix. Next, the salient component analysis unit 524G may sort the vectors of the VS matrix based on the respective directionality metrics of each of the vectors. The salient component analysis unit 524G may sort these vectors in a descending order of directionality metrics, such that those vectors with the highest corresponding directionality are first and those vectors with the lowest corresponding directionality are last. The salient component analysis unit 524G may then select the a non-zero subset of the vectors having the highest relative directionality metric.

According to some aspects of the techniques described herein, the audio encoding device 510G, or one or more components thereof, may identify or otherwise use a predetermined number of the vectors of the VS matrix as distinct audio components. For instance, after selecting entries 5 through 25 of each row of the VS matrix and squaring and summing the selected entries to determine the relative directionality metric for each respective vector, the salient component analysis unit 524G may implement further selection among the vectors to identify vectors that represent distinct audio components. In some examples, the salient component analysis unit 524G may select a predetermined number of the vectors of the VS matrix, by comparing the directionality quotients of the vectors. As one example, the salient component analysis unit 524G may select the four vectors represented in the VS matrix that have the four highest directionality quotients (and which are the first four vectors of the sorted VS matrix). In turn, the salient component analysis unit 524G may determine that the four selected vectors represent the four most distinct audio objects associated with the corresponding SHC representation of the soundfield.

In some examples, the salient component analysis unit 524G may reorder the vectors derived from the VS matrix, to reflect the distinctness of the four selected vectors, as described above. In one example, the salient component analysis unit 524G may reorder the vectors such that the four selected entries are relocated to the top of the VS matrix. For instance, the salient component analysis unit 524G may modify the VS matrix such that all of the four selected entries are positioned in a first (or topmost) row of the resulting reordered VS matrix. Although described herein with respect to the salient component analysis unit 524G, in various implementations, other components of the audio encoding device 510G, such as the vector reorder unit 532, may perform the reordering.

The salient component analysis unit 524G may communicate the resulting matrix (i.e., the VS matrix, reordered or not, as the case may be) to the bitstream generation unit 516. In turn, the bitstream generation unit 516 may use the VS matrix 525K to generate the bitstream 517. For instance, if the salient component analysis unit 524G has reordered the VS matrix 525K, the bitstream generation unit 516 may use the top row of the reordered version of VS matrix 525K as distinct audio objects, such as by quantizing or discarding the remaining vectors of the reordered version of VS matrix 525K. By quantizing the remaining vectors of the reordered version of VS matrix 525K, the bitstream generation unit 16 may treat the remaining vectors as ambient or background audio data.

In examples where the salient component analysis unit 524G has not reordered the VS matrix 525K, the bitstream generation unit 516 may distinguish distinct audio data from background audio data, based on the particular entries (e.g., the $5^{th}$ through $25^{th}$ entries) of each row of the VS matrix 525K, as selected by the salient component analysis unit 524G. For instance, the bitstream generation unit 516 may generate the bitstream 517 by quantizing or discarding the first four entries of each row of the VS matrix 525K.

In this manner, the audio encoding device 510G and/or components thereof, such as the salient component analysis unit 524G, may implement techniques of this disclosure to determine or otherwise utilize the ratios of the energies of higher and lower coefficients of audio data, in order to distinguish between distinct audio objects and background audio data representative of the soundfield. For instance, as described, the salient component analysis unit 524G may utilize the energy ratios based on values of the various entries of the VS matrix 525K generated by the salient component analysis unit 524H. By combining data provided by the V matrix 519A and the S matrix 519B, the salient component analysis unit 524G may generate the VS matrix 525K to provide information on both the directionality and the overall energy of the various components of the audio data, in the form of vectors and related data (e.g., directionality quotients). More specifically, the V matrix 519A may provide information related to directionality determinations, while the S matrix 519B may provide information related to overall energy determinations for the components of the audio data.

In other examples, the salient component analysis unit 524G may generate the VS matrix 525K using the reordered $V^{T}_{DIST}$ vectors 539. In these examples, the salient component analysis unit 524G may determine distinctness based on the V matrix 519, prior to any modification based on the S matrix 519B. In other words, according to these examples, the salient component analysis unit 524G may determine directionality using only the V matrix 519, without performing the step of generating the VS matrix 525K. More specifically, the V matrix 519A may provide information on the manner in which components (e.g., vectors of the V matrix 519) of the audio data are mixed, and potentially, information on various synergistic effects of the data conveyed by the vectors. For instance, the V matrix 519A may provide information on the "direction of arrival" of various audio components represented by the vectors, such as the direction of arrival of each audio component, as relayed to the audio encoding device 510G by an EigenMike®. As used herein, the term "component of audio data" may be used interchangeably with "entry" of any of the matrices 519 or any matrices derived therefrom.

According to some implementations of the techniques of this disclosure, the salient component analysis unit 524G may supplement or augment the SHC representations with extraneous information to make various determinations described herein. As one example, the salient component analysis unit 524G may augment the SHC with extraneous information in order to determine saliency of various audio components represented in the matrixes 519-519C. As another example, the salient component analysis unit 524G and/or the vector reorder unit 532 may augment the HOA with extraneous data to distinguish between distinct audio objects and background audio data.

In some examples, the salient component analysis unit 524G may detect that portions (e.g., distinct audio objects) of the audio data display Keynesian energy. An example of such distinct objects may be associated with a human voice that modulates. In the case of voice-based audio data that modulates, the salient component analysis unit 524G may determine that the energy of the modulating data, as a ratio to the energies of the remaining components, remains approximately constant (e.g., constant within a threshold range) or approximately stationary over time. Traditionally, if the energy characteristics of distinct audio components with Keynesian energy (e.g. those associated with the modulating voice) change from one audio frame to another, a device may not be able to identify the series of audio components as a single signal. However, the salient component analysis unit 524G may implement techniques of this disclosure to determine a directionality or an aperture of the distance object represented as a vector in the various matrices.

More specifically, the salient component analysis unit 524G may determine that characteristics such as directionality and/or aperture are unlikely to change substantially across audio frames. As used herein, the aperture represents a ratio of the higher order coefficients to lower order coefficients, within the audio data. Each row of the V matrix 519A may include vectors that correspond to particular SHC. The salient component analysis unit 524G may determine that the lower order SHC (e.g., associated with an order less than or equal to 1) tend to represent ambient data, while the higher order entries tend to represent distinct data. Additionally, the salient component analysis unit 524G may determine that, in many instances, the higher order SHC (e.g., associated with an order greater than 1) display greater energy, and that the energy ratio of the higher order to lower order SHC remains substantially similar (or approximately constant) from audio frame to audio frame.

One or more components of the salient component analysis unit 524G may determine characteristics of the audio data such as directionality and aperture, using the V matrix 519. In this manner, components of the audio encoding device 510G, such as the salient component analysis unit 524G, may implement the techniques described herein to determine saliency and/or distinguish distinct audio objects from background audio, using directionality-based information. By using directionality to determine saliency and/or distinctness, the salient component analysis unit 524G may arrive at more robust determinations than in cases of a device configured to determine saliency and/or distinctness using only energy-based data. Although described above with respect to directionality-based determinations of saliency and/or distinctness, the salient component analysis unit 524G may implement the techniques of this disclosure to use directionality in addition to other characteristics, such as energy, to determine saliency and/or distinctness of particular components of the audio data, as represented by vectors of one or more of the matrices 519-519C (or any matrix derived therefrom).

In some examples, a method includes identifying one or more distinct audio objects from one or more spherical harmonic coefficients (SHC) associated with the audio objects based on a directionality determined for one or more of the audio objects. In one example, the method further includes determining the directionality of the one or more audio objects based on the spherical harmonic coefficients associated with the audio objects. In some examples, the method further includes performing a singular value decomposition with respect to the spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients; and representing the plurality of spherical harmonic coefficients as a function of at least a portion of one or more of the U matrix, the S matrix and the V matrix, wherein determining the respective directionality of the one or more audio objects is based at least in part on the V matrix.

In one example, the method further includes reordering one or more vectors of the V matrix such that vectors having a greater directionality quotient are positioned above vectors having a lesser directionality quotient in the reordered V matrix. In one example, the method further includes determining that the vectors having the greater directionality quotient include greater directional information than the vectors having the lesser directionality quotient. In one example, the method further includes multiplying the V matrix by the S matrix to generate a VS matrix, the VS matrix including one or more vectors. In one example, the method further includes selecting entries of each row of the VS matrix that are associated with an order greater than 1, squaring each of the selected entries to form corresponding squared entries, and for each row of the VS matrix, summing all of the squared entries to determine a directionality quotient for a corresponding vector.

In some examples, each row of the VS matrix includes 25 entries. In one example, selecting the entries of each row of the VS matrix associated with the order greater than 1 includes selecting all entries beginning at a 5th entry of each row of the VS matrix and ending at a 25th entry of each row of the VS matrix. In one example, the method further includes selecting a subset of the vectors of the VS matrix to represent the distinct audio objects. In some examples, selecting the subset includes selecting four vectors of the VS matrix, and the selected four vectors have the four greatest directionality quotients of all of the vectors of the VS matrix. In one example, determining that the selected subset of the vectors represent the distinct audio objects is based on both the directionality and an energy of each vector.

In some examples, a method includes identifying one or more distinct audio objects from one or more spherical harmonic coefficients associated with the audio objects, based on a directionality and an energy determined for one or more of the audio objects. In one example, the method further includes determining one or both of the directionality and the energy of the one or more audio objects based on the spherical harmonic coefficients associated with the audio objects. In some examples, the method further includes performing a singular value decomposition with respect to the spherical harmonic coefficients representative of the soundfield to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and representing the plurality of spherical harmonic coefficients as a function of at least a portion of one or more of the U matrix, the S matrix and the V matrix, wherein determining the respective directionality of the one or more audio objects is based at least in part on the V matrix, and wherein determining the respective energy of the one or more audio objects is based at least in part on the S matrix.

In one example, the method further includes multiplying the V matrix by the S matrix to generate a VS matrix, the VS matrix including one or more vectors. In some examples, the method further includes selecting entries of each row of the VS matrix that are associated with an order greater than 1, squaring each of the selected entries to form corresponding squared entries, and for each row of the VS matrix, summing all of the squared entries to generate a directionality quotient for a corresponding vector of the VS matrix. In some examples, each row of the VS matrix includes 25 entries. In one example, selecting the entries of each row of the VS matrix associated with the order greater than 1 comprises selecting all entries beginning at a 5th entry of each row of the VS matrix and ending at a 25th entry of each row of the VS matrix. In some examples, the method further includes selecting a subset of the vectors to represent distinct audio objects. In one example, selecting the subset comprises selecting four vectors of the VS matrix, and the selected four vectors have the four greatest directionality quotients of all of the vectors of the VS matrix. In some examples, determining that the selected subset of the vectors represent the distinct audio objects is based on both the directionality and an energy of each vector.

In some examples, a method includes determining, using directionality-based information, one or more first vectors describing distinct components of the soundfield and one or more second vectors describing background components of the soundfield, both the one or more first vectors and the one or more second vectors generated at least by performing a transformation with respect to the plurality of spherical harmonic coefficients. In one example, the transformation comprises a singular value decomposition that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients. In one example, the transformation comprises a principal component analysis to identify the distinct components of the soundfield and the background components of the soundfield.

In some examples, a device is configured or otherwise operable to perform any of the techniques described herein or any combination of the techniques. In some examples, a computer-readable storage medium is encoded with instructions that, when executed, cause one or more processors to perform any of the techniques described herein or any combination of the techniques. In some examples, a device includes means to perform any of the techniques described herein or any combination of the techniques.

That is, the foregoing aspects of the techniques may enable the audio encoding device 510G to be configured to operate in accordance with the following clauses.

Clause 134954-1B. A device, such as the audio encoding device 510G, comprising: one or more processors configured to identify one or more distinct audio objects from one or more spherical harmonic coefficients associated with the audio objects, based on a directionality and an energy determined for one or more of the audio objects.

Clause 134954-2B. The device of clause 134954-1B, wherein the one or more processors are further configured to determine one or both of the directionality and the energy of the one or more audio objects based on the spherical harmonic coefficients associated with the audio objects.

Clause 134954-3B. The device of any of claims 1B or 2B or combination thereof, wherein the one or more processors are further configured to perform a singular value decomposition with respect to the spherical harmonic coefficients representative of the sound field to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients, and represent the plurality of spherical harmonic coefficients as a function of at least a portion of one or more of the U matrix, the S matrix and the V matrix, wherein the one or more processors are configured to determine the respective directionality of the one or more audio objects based at least in part on the V matrix, and wherein the one or more processors are configured to determine the respective energy of the one or more audio objects is based at least in part on the S matrix.

Clause 134954-4B. The device of clause 134954-3B, wherein the one or more processors are further configured to multiply the V matrix by the S matrix to generate a VS matrix, the VS matrix including one or more vectors.

Clause 134954-5B. The device of clause 134954-4B, wherein the one or more processors are further configured to select entries of each row of the VS matrix that are associated with an order greater than 1, square each of the selected entries to form corresponding squared entries, and for each row of the VS matrix, sum all of the squared entries to generate a directionality quotient for a corresponding vector of the VS matrix.

Clause 134954-6B. The device of any of claims 5B and 6B or combination thereof, wherein each row of the VS matrix includes 25 entries.

Clause 134954-7B. The device of clause 134954-6B, wherein the one or more processors are configured to select all entries beginning at a 5th entry of each row of the VS matrix and ending at a 25th entry of each row of the VS matrix.

Clause 134954-8B. The device of any of clause 134954-6B and clause 134954-7B or combination thereof, wherein the one or more processors are further configured to select a subset of the vectors to represent distinct audio objects.

Clause 134954-9B. The device of clause 134954-8B, wherein the one or more processors are configured to select four vectors of the VS matrix, and wherein the selected four vectors have the four greatest directionality quotients of all of the vectors of the VS matrix.

Clause 134954-10B. The device of any of clause 134954-8B and clause 134954-9B or combination thereof, wherein the one or more processors are further configured to determine that the selected subset of the vectors represent the distinct audio objects is based on both the directionality and an energy of each vector.

Clause 134954-1C. A device, such as the audio encoding device 510G, comprising: one or more processors configured to determine, using directionality-based information, one or more first vectors describing distinct components of the sound field and one or more second vectors describing background components of the sound field, both the one or more first vectors and the one or more second vectors generated at least by performing a transformation with respect to the plurality of spherical harmonic coefficients.

Clause 134954-2C. The method of clause 134954-1C, wherein the transformation comprises a singular value decomposition that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients.

Clause 134954-3C. The method of clause 134954-2C, further comprising the operations recited by any combination of the clause 134954-1A through clause 134954-12A and clause 134954-1B through clause 134954-9B.

Clause 134954-4C. The method of clause 134954-1C, wherein the transformation comprises a principal component analysis to identify the distinct components of the sound field and the background components of the sound field.

FIG. 40H is a block diagram illustrating example audio encoding device 510H that may perform various aspects of the techniques described in this disclosure to compress spherical harmonic coefficients describing two or three dimensional soundfields. The audio encoding device 510H may be similar to audio encoding device 510G in that audio encoding device 510H includes an audio compression unit 512, an audio encoding unit 514 and a bitstream generation unit 516. Moreover, the audio compression unit 512 of the audio encoding device 510H may be similar to that of the audio encoding device 510G in that the audio compression unit 512 includes a decomposition unit 518 and a soundfield component extraction unit 520G, which may operate similarly to like units of the audio encoding device 510G. In some examples, audio encoding device 510H may include a quantization unit 534, as described with respect to FIGS. 40D-40E, to quantize one or more vectors of any of the $U_{DIST}$ vectors 525C, the $U_{BG}$ vectors 525D, the $V^{T}_{DIST}$ vectors 525E, and the $V^{T}_{BG}$ vectors 525J.

The audio compression unit 512 of the audio encoding device 510H may, however, differ from the audio compression unit 512 of the audio encoding device 510G in that the audio compression unit 512 of the audio encoding device 510H includes an additional unit denoted as interpolation unit 550. The interpolation unit 550 may represent a unit that interpolates sub-frames of a first audio frame from the sub-frames of the first audio frame and a second temporally subsequent or preceding audio frame, as described in more detail below with respect to FIGS. 45 and 45B. The interpolation unit 550 may, in performing this interpolation, reduce computational complexity (in terms of processing cycles and/or memory consumption) by potentially reducing the extent to which the decomposition unit 518 is required to decompose SHC 511. In this respect, the interpolation unit 550 may perform operations similar to those described above with respect to the spatio-temporal interpolation unit 50 of the audio encoding device 24 shown in the example of FIG. 4.

That is, the singular value decomposition performed by the decomposition unit 518 is potentially very processor and/or memory intensive, while also, in some examples, taking extensive amounts of time to decompose the SHC 511, especially as the order of the SHC 511 increases. In order to reduce the amount of time and make compression of the SHC 511 more efficient (in terms of processing cycles and/or memory consumption), the techniques described in this disclosure may provide for interpolation of one or more sub-frames of the first audio frame, where each of the sub-frames may represent decomposed versions of the SHC 511. Rather than perform the SVD with respect to the entire frame, the techniques may enable the decomposition unit 518 to decompose a first sub-frame of a first audio frame, generating a V matrix 519'.

The decomposition unit 518 may also decompose a second sub-frame of a second audio frame, where this second audio frame may be temporally subsequent to or temporally preceding the first audio frame. The decomposition unit 518 may output a V matrix 519' for this sub-frame of the second audio frame. The interpolation unit 550 may then interpolate the remaining sub-frames of the first audio frame based on the V matrices 519' decomposed from the first and second sub-frames, outputting V matrix 519, S matrix 519B and U matrix 519C, where the decompositions for the remaining sub-frames may be computed based on the SHC 511, the V matrix 519A for the first audio frame and the interpolated V matrices 519 for the remaining sub-frames of the first audio frame. The interpolation may therefore avoid computation of the decompositions for the remaining sub-frames of the first audio frame.

Moreover, as noted above, the U matrix 519C may not be continuous from frame to frame, where distinct components of the U matrix 519C decomposed from a first audio frame of the SHC 511 may be specified in different rows and/or columns than in the U matrix 519C decomposed from a second audio frame of the SHC 511. By performing this interpolation, the discontinuity may be reduced given that a linear interpolation may have a smoothing effect that may reduce any artifacts introduced due to frame boundaries (or, in other words, segmentation of the SHC 511 into frames). Using the V matrix 519' to perform this interpolation and then recovering the U matrixes 519C based on the interpolated V matrix 519' from the SHC 511 may smooth any effects from reordering the U matrix 519C.

In operation, the interpolation unit 550 may interpolate one or more sub-frames of a first audio frame from a first decomposition, e.g., the V matrix 519', of a portion of a first plurality of spherical harmonic coefficients 511 included in the first frame and a second decomposition, e.g., V matrix 519', of a portion of a second plurality of spherical harmonic coefficients 511 included in a second frame to generate decomposed interpolated spherical harmonic coefficients for the one or more sub-frames.

In some examples, the first decomposition comprises the first V matrix 519' representative of right-singular vectors of the portion of the first plurality of spherical harmonic coefficients 511. Likewise, in some examples, the second decomposition comprises the second V matrix 519' representative of right-singular vectors of the portion of the second plurality of spherical harmonic coefficients.

The interpolation unit 550 may perform a temporal interpolation with respect to the one or more sub-frames based on the first V matrix 519' and the second V matrix 519'. That is, the interpolation unit 550 may temporally interpolate, for example, the second, third and fourth sub-frames out of four total sub-frames for the first audio frame based on a V matrix 519' decomposed from the first sub-frame of the first audio frame and the V matrix 519' decomposed from the first sub-frame of the second audio frame. In some examples, this temporal interpolation is a linear temporal interpolation, where the V matrix 519' decomposed from the first sub-frame of the first audio frame is weighted more heavily when interpolating the second sub-frame of the first audio frame than when interpolating the fourth sub-frame of the first audio frame. When interpolating the third sub-frame, the V matrices 519' may be weighted evenly. When interpolating the fourth sub-frame, the V matrix 519' decomposed from the first sub-frame of the second audio frame may be more heavily weighted than the V matrix 519' decomposed from the first sub-frame of the first audio frame.

In other words, the linear temporal interpolation may weight the V matrices 519' given the proximity of the one of the sub-frames of the first audio frame to be interpolated. For the second sub-frame to be interpolated, the V matrix 519' decomposed from the first sub-frame of the first audio frame is weighted more heavily given its proximity to the second sub-frame to be interpolated than the V matrix 519' decomposed from the first sub-frame of the second audio frame. The weights may be equivalent for this reason when interpolating the third sub-frame based on the V matrices 519'. The weight applied to the V matrix 519' decomposed from the first sub-frame of the second audio frame may be greater than that applied to the V matrix 519' decomposed from the first sub-frame of the first audio frame given that the fourth sub-frame to be interpolated is more proximate to the first sub-frame of the second audio frame than the first sub-frame of the first audio frame.

Although, in some examples, only a first sub-frame of each audio frame is used to perform the interpolation, the portion of the first plurality of spherical harmonic coefficients may comprise two of four sub-frames of the first plurality of spherical harmonic coefficients 511. In these and other examples, the portion of the second plurality of spherical harmonic coefficients 511 comprises two of four sub-frames of the second plurality of spherical harmonic coefficients 511.

As noted above, a single device, e.g., audio encoding device 510H, may perform the interpolation while also decomposing the portion of the first plurality of spherical harmonic coefficients to generate the first decompositions of the portion of the first plurality of spherical harmonic coefficients. In these and other examples, the decomposition unit 518 may decompose the portion of the second plurality of spherical harmonic coefficients to generate the second decompositions of the portion of the second plurality of spherical harmonic coefficients. While described with respect to a single device, two or more devices may perform the techniques described in this disclosure, where one of the two devices performs the decomposition and another one of the devices performs the interpolation in accordance with the techniques described in this disclosure.

In other words, spherical harmonics-based 3D audio may be a parametric representation of the 3D pressure field in terms of orthogonal basis functions on a sphere. The higher the order N of the representation, the potentially higher the spatial resolution, and often the larger the number of spherical harmonics (SH) coefficients (for a total of $(N+1)^2$ coefficients). For many applications, a bandwidth compression of the coefficients may be required for being able to transmit and store the coefficients efficiently. This techniques directed in this disclosure may provide a frame-based, dimensionality reduction process using Singular Value Decomposition (SVD). The SVD analysis may decompose each frame of coefficients into three matrices U, S and V. In some examples, the techniques may handle some of the vectors in U as directional components of the underlying soundfield. However, when handled in this manner, these vectors (in U) are discontinuous from frame to frame—even though they represent the same distinct audio component. These discontinuities may lead to significant artifacts when the components are fed through transform-audio-coders.

The techniques described in this disclosure may address this discontinuity. That is, the techniques may be based on the observation that the V matrix can be interpreted as orthogonal spatial axes in the Spherical Harmonics domain. The U matrix may represent a projection of the Spherical Harmonics (HOA) data in terms of those basis functions, where the discontinuity can be attributed to basis functions (V) that change every frame—and are therefore discontinuous themselves. This is unlike similar decomposition, such as the Fourier Transform, where the basis functions are, in some examples, constant from frame to frame. In these terms, the SVD may be considered of as a matching pursuit algorithm. The techniques described in this disclosure may enable the interpolation unit 550 to maintain the continuity between the basis functions (V) from frame to frame—by interpolating between them.

In some examples, the techniques enable the interpolation unit 550 to divide the frame of SH data into four subframes, as described above and further described below with respect to FIGS. 45 and 45B. The interpolation unit 550 may then compute the SVD for the first sub-frame. Similarly we compute the SVD for the first sub-frame of the second frame. For each of the first frame and the second frame, the interpolation unit 550 may convert the vectors in V to a spatial map by projecting the vectors onto a sphere (using a projection matrix such as a T-design matrix). The interpolation unit 550 may then interpret the vectors in V as shapes on a sphere. To interpolate the V matrices for the three sub-frames in between the first sub-frame of the first frame the first sub-frame of the next frame, the interpolation unit 550 may then interpolate these spatial shapes—and then transform them back to the SH vectors via the inverse of the projection matrix. The techniques of this disclosure may, in this manner, provide a smooth transition between V matrices.

In this way, the audio encoding device 510H may be configured to perform various aspects of the techniques set forth below with respect to the following clauses.

Clause 135054-1A. A device, such as the audio encoding device 510H, comprising: one or more processors configured to interpolate one or more sub-frames of a first frame from a first decomposition of a portion of a first plurality of spherical harmonic coefficients included in the first frame and a second decomposition of a portion of a second plurality of spherical harmonic coefficients included in a second frame to generate decomposed interpolated spherical harmonic coefficients for the one or more sub-frames.

Clause 135054-2A. The device of clause 135054-1A, wherein the first decomposition comprises a first V matrix representative of right-singular vectors of the portion of the first plurality of spherical harmonic coefficients.

Clause 135054-3A. The device of clause 135054-1A, wherein the second decomposition comprises a second V matrix representative of right-singular vectors of the portion of the second plurality of spherical harmonic coefficients.

Clause 135054-4A. The device of clause 135054-1A, wherein the first decomposition comprises a first V matrix representative of right-singular vectors of the portion of the first plurality of spherical harmonic coefficients, and wherein the second decomposition comprises a second V matrix representative of right-singular vectors of the portion of the second plurality of spherical harmonic coefficients.

Clause 135054-5A. The device of clause 135054-1A, wherein the one or more processors are further configured to, when interpolating the one or more sub-frames, temporally interpolate the one or more sub-frames based on the first decomposition and the second decomposition.

Clause 135054-6A. The device of clause 135054-1A, wherein the one or more processors are further configured to, when interpolating the one or more sub-frames, project the first decomposition into a spatial domain to generate first projected decompositions, project the second decomposition into the spatial domain to generate second projected decompositions, spatially interpolate the first projected decompositions and the second projected decompositions to generate a first spatially interpolated projected decomposition and a second spatially interpolated projected decomposition, and temporally interpolate the one or more sub-frames based on the first spatially interpolated projected decomposition and the second spatially interpolated projected decomposition.

Clause 135054-7A. The device of clause 135054-6A, wherein the one or more processors are further configured to project the temporally interpolated spherical harmonic coefficients resulting from interpolating the one or more sub-frames back to a spherical harmonic domain.

Clause 135054-8A. The device of clause 135054-1A, wherein the portion of the first plurality of spherical harmonic coefficients comprises a single sub-frame of the first plurality of spherical harmonic coefficients.

Clause 135054-9A. The device of clause 135054-1A, wherein the portion of the second plurality of spherical harmonic coefficients comprises a single sub-frame of the second plurality of spherical harmonic coefficients.

Clause 135054-10A. The device of clause 135054-1A, wherein the first frame is divided into four sub-frames, and wherein the portion of the first plurality of spherical harmonic coefficients comprises only the first sub-frame of the first plurality of spherical harmonic coefficients.

Clause 135054-11A. The device of clause 135054-1A, wherein the second frame is divided into four sub-frames, and wherein the portion of the second plurality of spherical harmonic coefficients comprises only the first sub-frame of the second plurality of spherical harmonic coefficients.

Clause 135054-12A. The device of clause 135054-1A, wherein the portion of the first plurality of spherical harmonic coefficients comprises two of four sub-frames of the first plurality of spherical harmonic coefficients.

Clause 135054-13A. The device of clause 135054-1A, wherein the portion of the second plurality of spherical harmonic coefficients comprises two of four sub-frames of the second plurality of spherical harmonic coefficients.

Clause 135054-14A. The device of clause 135054-1A, wherein the one or more processors are further configured to decompose the portion of the first plurality of spherical harmonic coefficients to generate the first decompositions of the portion of the first plurality of spherical harmonic coefficients.

Clause 135054-15A. The device of clause 135054-1A, wherein the one or more processors are further configured to decompose the portion of the second plurality of spherical harmonic coefficients to generate the second decompositions of the portion of the second plurality of spherical harmonic coefficients.

Clause 135054-16A. The device of clause 135054-1A, wherein the one or more processors are further configured to perform a singular value decomposition with respect to the portion of the first plurality of spherical harmonic coefficients to generate a U matrix representative of left-singular vectors of the first plurality of spherical harmonic coefficients, an S matrix representative of singular values of the first plurality of spherical harmonic coefficients and a V matrix representative of right-singular vectors of the first plurality of spherical harmonic coefficients.

Clause 135054-17A. The device of clause 135054-1A, wherein the one or more processors are further configured to performing a singular value decomposition with respect to the portion of the second plurality of spherical harmonic coefficients to generate a U matrix representative of left-singular vectors of the second plurality of spherical harmonic coefficients, an S matrix representative of singular values of the second plurality of spherical harmonic coefficients and a V matrix representative of right-singular vectors of the second plurality of spherical harmonic coefficients.

Clause 135054-18A. The device of clause 135054-1A, wherein the first and second plurality of spherical harmonic coefficients each represent a planar wave representation of the sound field.

Clause 135054-19A. The device of clause 135054-1A, wherein the first and second plurality of spherical harmonic coefficients each represent one or more mono-audio objects mixed together.

Clause 135054-20A. The device of clause 135054-1A, wherein the first and second plurality of spherical harmonic coefficients each comprise respective first and second spherical harmonic coefficients that represent a three dimensional sound field.

Clause 135054-21A. The device of clause 135054-1A, wherein the first and second plurality of spherical harmonic coefficients are each associated with at least one spherical basis function having an order greater than one.

Clause 135054-22A. The device of clause 135054-1A, wherein the first and second plurality of spherical harmonic coefficients are each associated with at least one spherical basis function having an order equal to four.

Although described above as being performed by the audio encoding device 510H, the various audio decoding devices 24 and 540 may also perform any of the various aspects of the techniques set forth above with respect to clauses 135054-1A through 135054-22A.

Figure 40I:
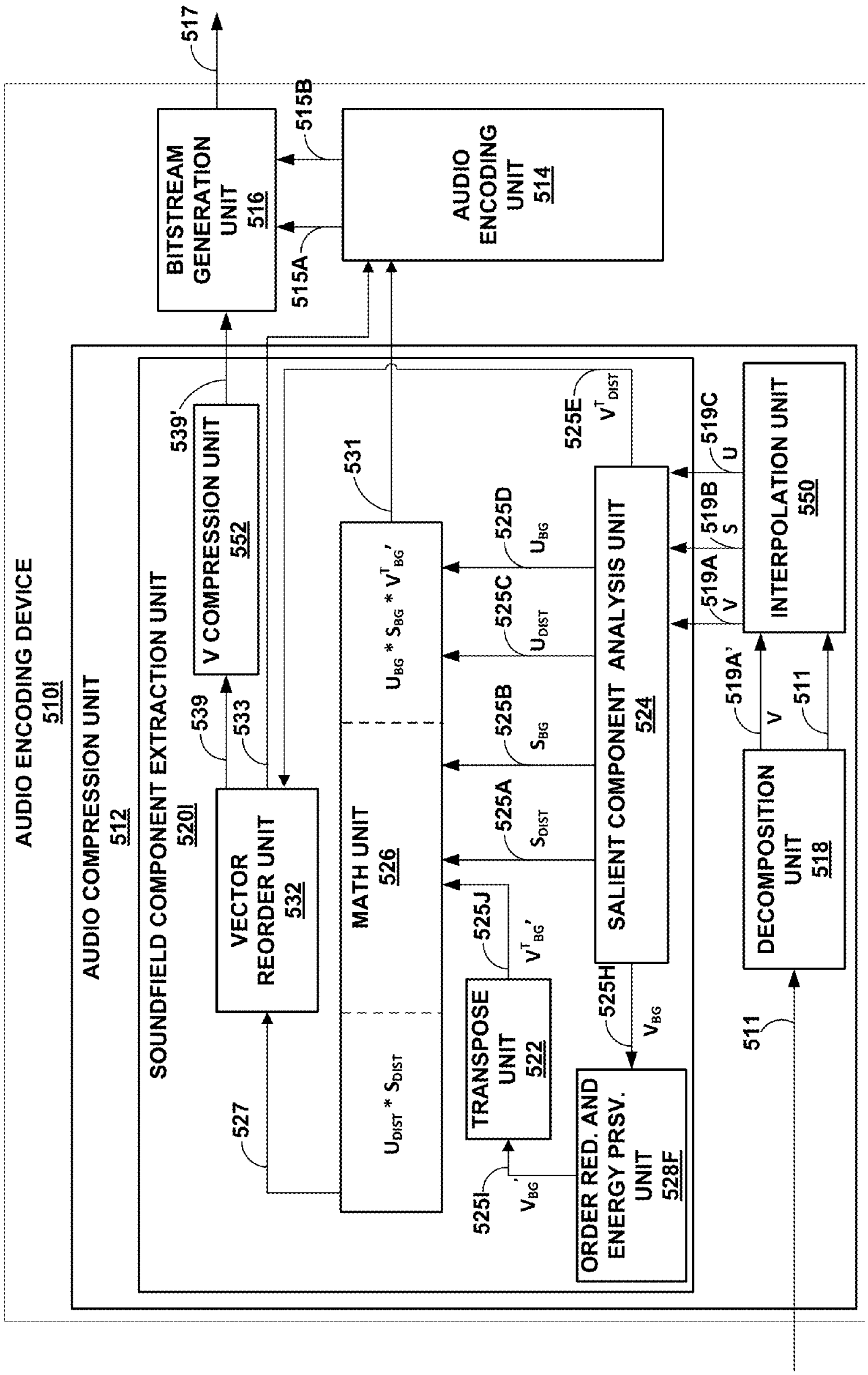

FIG. 40I is a block diagram illustrating example audio encoding device 510I that may perform various aspects of the techniques described in this disclosure to compress spherical harmonic coefficients describing two or three dimensional soundfields. The audio encoding device 510I may be similar to audio encoding device 510H in that audio encoding device 510I includes an audio compression unit 512, an audio encoding unit 514 and a bitstream generation unit 516. Moreover, the audio compression unit 512 of the audio encoding device 510I may be similar to that of the audio encoding device 510H in that the audio compression unit 512 includes a decomposition unit 518 and a soundfield component extraction unit 520, which may operate similarly to like units of the audio encoding device 510H. In some examples, audio encoding device 10I may include a quantization unit 34, as described with respect to FIGS. 3D-3E, to quantize one or more vectors of any of $U_{DIST}$ 25C, $U_{BG}$ 25D, $V^T_{DIST}$ 25E, and $V^T_{BG}$ 25J.

However, while both of the audio compression unit 512 of the audio encoding device 510I and the audio compression unit 512 of the audio encoding device 10H include a soundfield component extraction unit, the soundfield component extraction unit 520I of the audio encoding device 510I may include an additional module referred to as V compression unit 552. The V compression unit 552 may represent a unit configured to compress a spatial component of the soundfield, i.e., one or more of the $V^T_{DIST}$ vectors 539 in this example. That is, the singular value decomposition performed with respect to the SHC may decompose the SHC (which is representative of the soundfield) into energy components represented by vectors of the S matrix, time components represented by the U matrix and spatial components represented by the V matrix. The V compression unit 552 may perform operations similar to those described above with respect to the quantization unit 52.

For purposes of example, the $V^T_{DIST}$ vectors 539 are assumed to comprise two row vectors having 25 elements each (which implies a fourth order HOA representation of the soundfield). Although described with respect to two row vectors, any number of vectors may be included in the $V^T_{DIST}$ vectors 539 up to $(n+1)^2$, where n denotes the order of the HOA representation of the soundfield.

The V compression unit 552 may receive the $V^T_{DIST}$ vectors 539 and perform a compression scheme to generate compressed $V^T_{DIST}$ vector representations 539'. This compression scheme may involve any conceivable compression scheme for compressing elements of a vector or data generally, and should not be limited to the example described below in more detail.

V compression unit 552 may perform, as an example, a compression scheme that includes one or more of transforming floating point representations of each element of the $V^T_{DIST}$ vectors 539 to integer representations of each element of the $V^T_{DIST}$ vectors 539, uniform quantization of the integer representations of the $V^T_{DIST}$ vectors 539 and categorization and coding of the quantized integer representations of the $V^T_{DIST}$ vectors 539. Various of the one or more processes of this compression scheme may be dynamically controlled by parameters to achieve or nearly achieve, as one example, a target bitrate for the resulting bitstream 517.

Given that each of the $V^T_{DIST}$ vectors 539 are orthonormal to one another, each of the $V^T_{DIST}$ vectors 539 may be coded independently. In some examples, as described in more detail below, each element of each $V^T_{DIST}$ vector 539 may be coded using the same coding mode (defined by various sub-modes).

In any event, as noted above, this coding scheme may first involve transforming the floating point representations of each element (which is, in some examples, a 32-bit floating point number) of each of the $V^T_{DIST}$ vectors 539 to a 16-bit integer representation. The V compression unit 552 may perform this floating-point-to-integer-transformation by multiplying each element of a given one of the $V^T_{DIST}$ vectors 539 by $2^{15}$, which is, in some examples, performed by a right shift by 15.

The V compression unit 552 may then perform uniform quantization with respect to all of the elements of the given one of the $V^T_{DIST}$ Vectors 539. The V compression unit 552 may identify a quantization step size based on a value, which may be denoted as an nbits parameter. The V compression unit 552 may dynamically determine this nbits parameter based on a target bit rate. The V compression unit 552 may determining the quantization step size as a function of this nbits parameter. As one example, the V compression unit 552 may determine the quantization step size (denoted as "delta" or "Δ" in this disclosure) as equal to $2^{16-nbits}$. In this example, if nbits equals six, delta equals $2^{10}$ and there are $2^6$ quantization levels. In this respect, for a vector element v, the quantized vector element $v_q$ equals $[v/\Delta]$ and $-2^{nbits-1}<v_q<2^{nbits-1}$.

The V compression unit 552 may then perform categorization and residual coding of the quantized vector elements. As one example, the V compression unit 552 may, for a given quantized vector element $v_q$ identify a category (by determining a category identifier cid) to which this element corresponds using the following equation:

$$\text{cid} = \begin{cases} 0, & \text{if } v_q = 0 \\ \lfloor \log_2 |v_q| \rfloor + 1, & \text{if } v_q \neq 0 \end{cases}$$

The V compression unit 552 may then Huffman code this category index cid, while also identifying a sign bit that indicates whether $v_q$ is a positive value or a negative value. The V compression unit 552 may next identify a residual in this category. As one example, the V compression unit 552 may determine this residual in accordance with the following equation:

$$\text{residual} = |v_q| - 2^{cid-1}$$

The V compression unit 552 may then block code this residual with cid-1 bits.

The following example illustrates a simplified example of this categorization and residual coding process. First, assume nbits equals six so that $v_q \in [-31, 31]$. Next, assume the following:

| cid | vq | Huffman Code for cid |
|---|---|---|
| 0 | 0 | '1' |
| 1 | −1, 1 | '01' |
| 2 | −3, −2, 2, 3 | '000' |
| 3 | −7, −6, −5, −4, 4, 5, 6, 7 | '0010' |
| 4 | −15, −14, . . . , −8, 8, . . . , 14, 15 | '00110' |
| 5 | −31, −30, . . . , −16, 16, . . . , 30, 31 | '00111' |

Also, assume the following:

| cid | Block Code for Residual |
|---|---|
| 0 | N/A |
| 1 | 0, 1 |
| 2 | 01, 00, 10, 11 |
| 3 | 011, 010, 001, 000, 100, 101, 110, 111 |
| 4 | 0111, 0110 . . . , 0000, 1000, . . . , 1110, 1111 |
| 5 | 01111, . . . , 00000, 10000, . . . , 11111 |

Thus, for a $v_q=[6, -17, 0, 0, 3]$, the following may be determined:

cid=3,5,0,0,2
sign=1,0,x,x,1
residual=2,1,x,x,1
Bits for 6=[0010]+[1]+'10'
Bits for −17=[00111]+[0]+'0001'
Bits for 0='0'
Bits for 0='0'
Bits for 3='000'+'1'+'1'
Total bits=7+10+1+1+5=24
Average bits=24/5=4.8

While not shown in the foregoing simplified example, the V compression unit 552 may select different Huffman code books for different values of nbits when coding the cid. In some examples, the V compression unit 552 may provide a different Huffman coding table for nbits values 6, . . . , 15. Moreover, the V compression unit 552 may include five different Huffman code books for each of the different nbits values ranging from 6, . . . , 15 for a total of 50 Huffman code books. In this respect, the V compression unit 552 may include a plurality of different Huffman code books to accommodate coding of the cid in a number of different statistical contexts.

To illustrate, the V compression unit 552 may, for each of the nbits values, include a first Huffman code book for coding vector elements one through four, a second Huffman code book for coding vector elements five through nine, a third Huffman code book for coding vector elements nine and above. These first three Huffman code books may be used when the one of the $V^T_{DIST}$ vectors 539 to be compressed is not predicted from a temporally subsequent corresponding one of $V^T_{DIST}$ vectors 539 and is not representative of spatial information of a synthetic audio object (one defined, for example, originally by a pulse code modulated (PCM) audio object). The V compression unit 552 may additionally include, for each of the nbits values, a fourth Huffman code book for coding the one of the $V^T_{DIST}$ vectors 539 when this one of the $V^T_{DIST}$ vectors 539 is predicted from a temporally subsequent corresponding one of the $V^T_{DIST}$ vectors 539. The V compression unit 552 may also include, for each of the nbits values, a fifth Huffman code book for coding the one of the $V^T_{DIST}$' vectors 539 when this one of the $V^T_{DIST}$ vectors 539 is representative of a synthetic audio object. The various Huffman code books may be developed for each of these different statistical contexts, i.e., the non-predicted and non-synthetic context, the predicted context and the synthetic context in this example.

The following table illustrates the Huffman table selection and the bits to be specified in the bitstream to enable the decompression unit to select the appropriate Huffman table:

| Pred mode | HT info | HT table |
|---|---|---|
| 0 | 0 | HT5 |
| 0 | 1 | HT{1, 2, 3} |
| 1 | 0 | HT4 |
| 1 | 1 | HT5 |

In the foregoing table, the prediction mode ("Pred mode") indicates whether prediction was performed for the current vector, while the Huffman Table ("HT info") indicates additional Huffman code book (or table) information used to select one of Huffman tables one through five.

The following table further illustrates this Huffman table selection process given various statistical contexts or scenarios.

| | Recording | Synthetic |
|---|---|---|
| W/O Pred | HT{1, 2, 3} | HT5 |
| With Pred | HT4 | HT5 |

In the foregoing table, the "Recording" column indicates the coding context when the vector is representative of an audio object that was recorded while the "Synthetic" column indicates a coding context for when the vector is representative of a synthetic audio object. The "W/O Pred" row indicates the coding context when prediction is not performed with respect to the vector elements, while the "With Pred" row indicates the coding context when prediction is performed with respect to the vector elements. As shown in this table, the V compression unit 552 selects HT {1, 2, 3} when the vector is representative of a recorded audio object and prediction is not performed with respect to the vector elements. The V compression unit 552 selects HT5 when the audio object is representative of a synthetic audio object and prediction is not performed with respect to the vector elements. The V compression unit 552 selects HT4 when the vector is representative of a recorded audio object and prediction is performed with respect to the vector elements. The V compression unit 552 selects HT5 when the audio object is representative of a synthetic audio object and prediction is performed with respect to the vector elements.

In this way, the techniques may enable an audio compression device to compress a spatial component of a soundfield, where the spatial component generated by performing a vector based synthesis with respect to a plurality of spherical harmonic coefficients.

Figure 43:
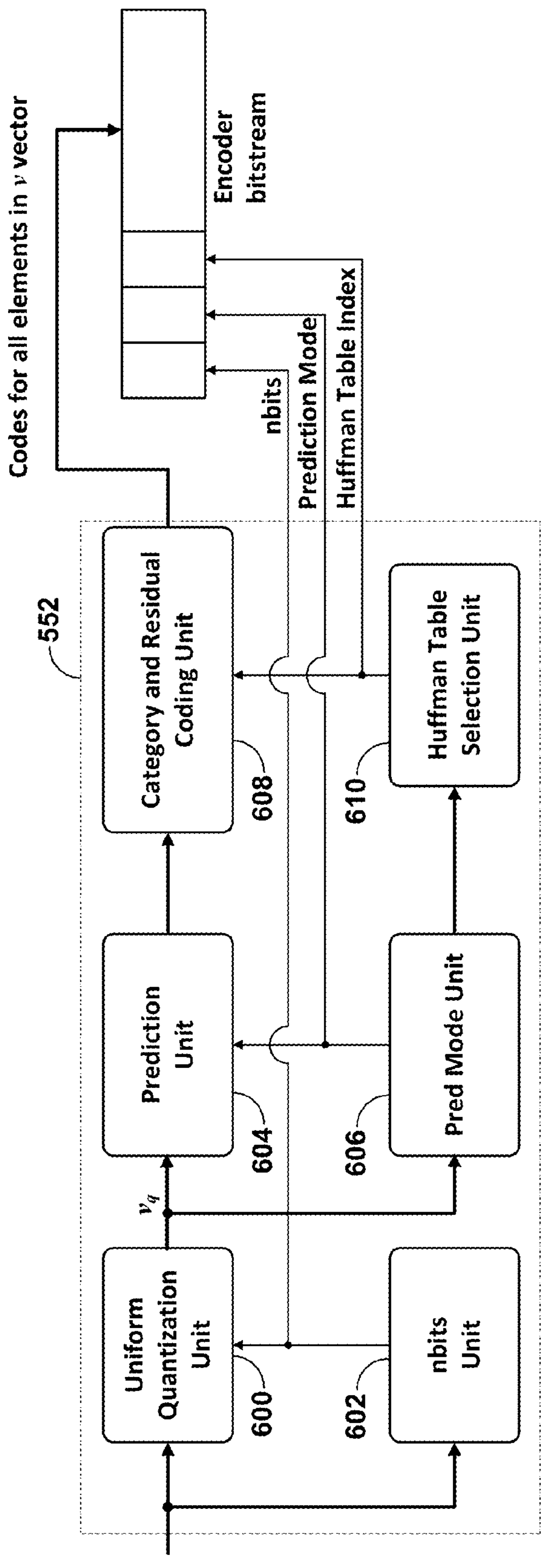
FIG. 43 is a diagram illustrating the V compression unit shown in FIG. 40I in more detail.

FIG. 43 is a diagram illustrating the V compression unit 552 shown in FIG. 40I in more detail. In the example of FIG. 43, the V compression unit 552 includes a uniform quantization unit 600, a nbits unit 602, a prediction unit 604, a prediction mode unit 606 ("Pred Mode Unit 606"), a category and residual coding unit 608, and a Huffman table selection unit 610. The uniform quantization unit 600 represents a unit configured to perform the uniform quantization described above with respect to one of the spatial components denoted as v in the example of FIG. 43 (which may represent any one of the $V^T_{DIST}$ vectors 539). The nbits unit 602 represents a unit configured to determine the nbits parameter or value.

The prediction unit 604 represents a unit configured to perform prediction with respect to the quantized spatial component denoted as $v_q$ in the example of FIG. 43. The prediction unit 604 may perform prediction by performing an element-wise subtraction of the current one of the $V^T_{DIST}$ vectors 539 by a temporally subsequent corresponding one of the $V^T_{DIST}$ vectors 539. The result of this prediction may be referred to as a predicted spatial component.

The prediction mode unit 606 may represent a unit configured to select the prediction mode. The Huffman table selection unit 610 may represent a unit configured to select an appropriate Huffman table for coding of the cid. The prediction mode unit 606 and the Huffman table selection unit 610 may operate, as one example, in accordance with the following pseudo-code:

```
For a given nbits, retrieve all the Huffman Tables having nbits
B00 = 0; B01 = 0; B10 = 0; B11 = 0; // initialize to compute
expected bits per coding mode
for m = 1:(# elements in the vector)
   // calculate expected number of bits for a vector element v(m)
   // without prediction and using Huffman Table 5
   B00 = B00 + calculate_bits(v(m), HT5);
   // without prediction and using Huffman Table {1,2,3}
   B01 = B01 + calculate_bits(v(m), HTq); q in {1,2,3}
   // calculate expected number of bits for prediction residual e(m)
   e(m) = v(m) - vp(m); // vp(m): previous frame vector element
   // with prediction and using Huffman Table 4
   B10 = B10 + calculate_bits(e(m), HT4);
   // with prediction and using Huffman Table 5
   B11 = B11 + calculate_bits(e(m), HT5);
end
// find a best prediction mode and Huffman table that yield minimum
// bits best prediction mode and Huffman table are flagged by pflag
and Htflag, respectively
[Be, id] = min( [B00 B01 B10 B11] );
Switch id
   case 1: pflag = 0; HTflag = 0;
   case 2: pflag = 0; HTflag = 1;
   case 3: pflag = 1; HTflag = 0;
   case 4: pflag = 1; HTflag = 1;
end
```

Category and residual coding unit 608 may represent a unit configured to perform the categorization and residual coding of a predicted spatial component or the quantized spatial component (when prediction is disabled) in the manner described in more detail above.

As shown in the example of FIG. 43, the V compression unit 552 may output various parameters or values for inclusion either in the bitstream 517 or side information (which may itself be a bitstream separate from the bitstream 517). Assuming the information is specified in the bitstream 517, the V compression unit 552 may output the nbits value, the prediction mode and the Huffman table information to bitstream generation unit 516 along with the compressed version of the spatial component (shown as compressed spatial component 539' in the example of FIG. 40I), which in this example may refer to the Huffman code selected to encode the cid, the sign bit, and the block coded residual. The nbits value may be specified once in the bitstream 517 for all of the $V^T_{DIST}$ vectors 539, while the prediction mode and the Huffman table information may be specified for each one of the $V^T_{DIST}$ vectors 539. The portion of the bitstream that specifies the compressed version of the spatial component is shown in the example of FIGS. 10B and 100C.

In this way, the audio encoding device 510H may perform various aspects of the techniques set forth below with respect to the following clauses.

Clause 141541-1A. A device, such as the audio encoding device 510H, comprising: one or more processors configured to obtain a bitstream comprising a compressed version of a spatial component of a sound field, the spatial component generated by performing a vector based synthesis with respect to a plurality of spherical harmonic coefficients.

Clause 141541-2A. The device of clauses 141541-1A, wherein the compressed version of the spatial component is represented in the bitstream using, at least in part, a field specifying a prediction mode used when compressing the spatial component.

Clause 141541-3A. The device of any combination of clause 141541-1A and clause 141541-2A, wherein the compressed version of the spatial component is represented in the bitstream using, at least in part, Huffman table information specifying a Huffman table used when compressing the spatial component.

Clause 141541-4A. The device of any combination of clause 141541-1A through clause 141541-3A, wherein the compressed version of the spatial component is represented in the bitstream using, at least in part, a field indicating a value that expresses a quantization step size or a variable thereof used when compressing the spatial component.

Clause 141541-5A. The device of clause 141541-4A, wherein the value comprises an nbits value.

Clause 141541-6A. The device of any combination of clause 141541-4A and clause 141541-5A, wherein the bitstream comprises a compressed version of a plurality of spatial components of the sound field of which the compressed version of the spatial component is included, and wherein the value expresses the quantization step size or a variable thereof used when compressing the plurality of spatial components.

Clause 141541-7A. The device of any combination of clause 141541-1A through clause 141541-6A, wherein the compressed version of the spatial component is represented in the bitstream using, at least in part, a Huffman code to represent a category identifier that identifies a compression category to which the spatial component corresponds.

Clause 141541-8A. The device of any combination of clause 141541-1A through clause 141541-7A, wherein the compressed version of the spatial component is represented in the bitstream using, at least in part, a sign bit identifying whether the spatial component is a positive value or a negative value.

Clause 141541-9A. The device of any combination of clause 141541-1A through clause 141541-8A, wherein the compressed version of the spatial component is represented in the bitstream using, at least in part, a Huffman code to represent a residual value of the spatial component.

Clause 141541-10A. The device of any combination of clause 141541-1A through clause 141541-9A, wherein the device comprises an audio encoding device a bitstream generation device.

Clause 141541-12A. The device of any combination of clause 141541-1A through clause 141541-11A, wherein the vector based synthesis comprises a singular value decomposition.

While described as being performed by the audio encoding device 510H, the techniques may also be performed by any of the audio decoding devices 24 and/or 540.

In this way, the audio encoding device 510H may additionally perform various aspects of the techniques set forth below with respect to the following clauses.

Clause 141541-1D. A device, such as the audio encoding device 510H, comprising: one or more processors configured to generate a bitstream comprising a compressed version of a spatial component of a sound field, the spatial component generated by performing a vector based synthesis with respect to a plurality of spherical harmonic coefficients.

Clause 141541-2D. The device of clause 141541-1D, wherein the one or more processors are further configured to, when generating the bitstream, generate the bitstream to include a field specifying a prediction mode used when compressing the spatial component.

Clause 141541-3D. The device of any combination of clause 141541-1D and clause 141541-2D, wherein the one or more processors are further configured to, when generating the bitstream, generate the bitstream to include Huffman table information specifying a Huffman table used when compressing the spatial component.

Clause 141541-4D. The device of any combination of clause 141541-1D through clause 141541-3D, wherein the one or more processors are further configured to, when generating the bitstream, generate the bitstream to include a field indicating a value that expresses a quantization step size or a variable thereof used when compressing the spatial component.

Clause 141541-5D. The device of clause 141541-4D, wherein the value comprises an nbits value.

Clause 141541-6D. The device of any combination of clause 141541-4D and clause 141541-5D, wherein the one or more processors are further configured to, when generating the bitstream, generate the bitstream to include a compressed version of a plurality of spatial components of the sound field of which the compressed version of the spatial component is included, and wherein the value expresses the quantization step size or a variable thereof used when compressing the plurality of spatial components.

Clause 141541-7D. The device of any combination of clause 141541-1D through clause 141541-6D, wherein the one or more processors are further configured to, when generating the bitstream, generate the bitstream to include a Huffman code to represent a category identifier that identifies a compression category to which the spatial component corresponds.

Clause 141541-8D. The device of any combination of clause 141541-1D through clause 141541-7D, wherein the one or more processors are further configured to, when generating the bitstream, generate the bitstream to include a sign bit identifying whether the spatial component is a positive value or a negative value.

Clause 141541-9D. The device of any combination of clause 141541-1D through clause 141541-8D, wherein the one or more processors are further configured to, when generating the bitstream, generate the bitstream to include a Huffman code to represent a residual value of the spatial component.

Clause 141541-10D. The device of any combination of clause 141541-1D through clause 141541-10D, wherein the vector based synthesis comprises a singular value decomposition.

The audio encoding device 510H may further be configured to implement various aspects of the techniques as set forth in the following clauses.

Clause 141541-1E. A device, such as the audio encoding device 510H, comprising: one or more processors configured to compress a spatial component of a sound field, the spatial component generated by performing a vector based synthesis with respect to a plurality of spherical harmonic coefficients.

Clause 141541-2E. The device of clause 141541-1E, wherein the one or more processors are further configured to, when compressing the spatial component, convert the spatial component from a floating point representation to an integer representation.

Clause 141541-3E. The device of any combination of clause 141541-1E and clause 141541-2E, wherein the one or more processors are further configured to, when compressing the spatial component, dynamically determine a value indicative of a quantization step size, and quantizing the spatial component based on the value to generate a quantized spatial component.

Clause 141541-4E. The device of any combination of claims 1E-3E, wherein the one or more processors are further configured to, when compressing the spatial component, identify a category to which the spatial component corresponds.

Clause 141541-5E. The device of any combination of clause 141541-1E through clause 141541-4E, wherein the one or more processors are further configured to, when compressing the spatial component, identify a residual value for the spatial component.

Clause 141541-6E. The device of any combination of clause 141541-1E through clause 141541-5E, wherein the one or more processors are further configured to, when compressing the spatial component, perform a prediction with respect to the spatial component and a subsequent spatial component to generate a predicted spatial component.

Clause 141541-7E. The device of any combination of clause 141541-1E, wherein the one or more processors are further configured to, when compressing the spatial component, convert the spatial component from a floating point representation to an integer representation, dynamically determine a value indicative of a quantization step size, quantize the integer representation of the spatial component based on the value to generate a quantized spatial component, identify a category to which the spatial component corresponds based on the quantized spatial component to generate a category identifier, determine a sign of the spatial component, identify a residual value for the spatial component based on the quantized spatial component and the category identifier, and generate a compressed version of the spatial component based on the category identifier, the sign and the residual value.

Clause 141541-8E. The device of any combination of clause 141541-1E, wherein the one or more processors are further configured to, when compressing the spatial component, convert the spatial component from a floating point representation to an integer representation, dynamically determine a value indicative of a quantization step size, quantize the integer representation of the spatial component based on the value to generate a quantized spatial component, perform a prediction with respect to the spatial component and a subsequent spatial component to generate a predicted spatial component, identify a category to which the predicted spatial component corresponds based on the quantized spatial component to generate a category identifier, determine a sign of the spatial component, identify a residual value for the spatial component based on the quantized spatial component and the category identifier, and generate a compressed version of the spatial component based on the category identifier, the sign and the residual value.

Clause 141541-9E. The device of any combination of clause 141541-1E through clause 141541-8E, wherein the vector based synthesis comprises a singular value decomposition.

Various aspects of the techniques may furthermore enable the audio encoding device 510H to be configured to operate as set forth in the following clauses.

Clause 141541-1F. A device, such as the audio encoding device 510H, comprising: one or more processors configured to identify a Huffman codebook to use when compressing a current spatial component of a plurality of spatial components based on an order of the current spatial component relative to remaining ones of the plurality of spatial components, the spatial component generated by performing a vector based synthesis with respect to a plurality of spherical harmonic coefficients.

Clause 141541-2F. The device of clause 141541-3F, wherein the one or more processors are further configured to perform any combination of the steps recited in clause 141541-1A through clause 141541-12A, clause 141541-1B through clause 141541-10B, and clause 141541-1C through clause 141541-9C.

Various aspects of the techniques may furthermore enable the audio encoding device 510H to be configured to operate as set forth in the following clauses.

Clause 141541-1H. A device, such as the audio encoding device 510H, comprising: one or more processors configured to determine a quantization step size to be used when compressing a spatial component of a sound field, the spatial component generated by performing a vector based synthesis with respect to a plurality of spherical harmonic coefficients.

Clause 141541-2H. The device of clause 141541-1H, wherein the one or more processors are further configured to, when determining the quantization step size, determine the quantization step size based on a target bit rate.

Clause 141541-3H. The device of clause 141541-1H, wherein the one or more processors are further configured to, when selecting one of the plurality of quantization step sizes, determine an estimate of a number of bits used to represent the spatial component, and determine the quantization step size based on a difference between the estimate and a target bit rate.

Clause 141541-4H. The device of clause 141541-1H, wherein the one or more processors are further configured to, when selecting one of the plurality of quantization step sizes, determine an estimate of a number of bits used to represent the spatial component, determine a difference between the estimate and a target bit rate, and determine the quantization step size by adding the difference to the target bit rate.

Clause 141541-5H. The device of clause 141541-3H or clause 141541-4H, wherein the one or more processors are further configured to, when determining the estimate of the number of bits, calculate the estimated of the number of bits that are to be generated for the spatial component given a code book corresponding to the target bit rate.

Clause 141541-6H. The device of clause 141541-3H or clause 141541-4H, wherein the one or more processors are further configured to, when determining the estimate of the number of bits, calculate the estimated of the number of bits that are to be generated for the spatial component given a coding mode used when compressing the spatial component.

Clause 141541-7H. The device of clause 141541-3H or clause 141541-4H, wherein the one or more processors are further configured to, when determining the estimate of the number of bits, calculate a first estimate of the number of bits that are to be generated for the spatial component given a first coding mode to be used when compressing the spatial component, calculate a second estimate of the number of bits that are to be generated for the spatial component given a second coding mode to be used when compressing the spatial component, select the one of the first estimate and the second estimate having a least number of bits to be used as the determined estimate of the number of bits.

Clause 141541-8H. The device of clause 141541-3H or clause 141541-4H, wherein the one or more processors are further configured to, when determine the estimate of the number of bits, identify a category identifier identifying a category to which the spatial component corresponds, identify a bit length of a residual value for the spatial component that would result when compressing the spatial component corresponding to the category, and determine the estimate of the number of bits by, at least in part, adding a number of bits used to represent the category identifier to the bit length of the residual value.

Clause 141541-9H. The device of any combination of clause 141541-1H through clause 141541-8H, wherein the vector based synthesis comprises a singular value decomposition.

Although described as being performed by the audio encoding device 510H, the techniques set forth in the above clauses clause 141541-1H through clause 141541-9H may also be performed by the audio decoding device 540D.

Additionally, various aspects of the techniques may enable the audio encoding device 510H to be configured to operate as set forth in the following clauses.

Clause 141541-1J. A device, such as the audio encoding device 510J, comprising: one or more processors configured to select one of a plurality of code books to be used when compressing a spatial component of a sound field, the spatial component generated by performing a vector based synthesis with respect to a plurality of spherical harmonic coefficients.

Clause 141541-2J. The device of clause 141541-1J, wherein the one or more processors are further configured to, when selecting one of the plurality of code books, determine an estimate of a number of bits used to represent the spatial component using each of the plurality of code books, and select the one of the plurality of code books that resulted in the determined estimate having the least number of bits.

Clause 141541-3J. The device of clause 141541-1J, wherein the one or more processors are further configured to, when selecting one of the plurality of code books, determine an estimate of a number of bits used to represent the spatial component using one or more of the plurality of code books, the one or more of the plurality of code books selected based on an order of elements of the spatial component to be compressed relative to other elements of the spatial component.

Clause 141541-4J. The device of clause 141541-1J, wherein the one or more processors are further configured to, when selecting one of the plurality of code books, determine an estimate of a number of bits used to represent the spatial component using one of the plurality of code books designed to be used when the spatial component is not predicted from a subsequent spatial component.

Clause 141541-5J. The device of clause 141541-1J, wherein the one or more processors are further configured to, when selecting one of the plurality of code books, determine an estimate of a number of bits used to represent the spatial component using one of the plurality of code books designed to be used when the spatial component is predicted from a subsequent spatial component.

Clause 141541-6J. The device of clause 141541-1J, wherein the one or more processors are further configured to, when selecting one of the plurality of code books, determine an estimate of a number of bits used to represent the spatial component using one of the plurality of code books designed to be used when the spatial component is representative of a synthetic audio object in the sound field.

Clause 141541-7J. The device of clause 141541-1J, wherein the synthetic audio object comprises a pulse code modulated (PCM) audio object.

Clause 141541-8J. The device of clause 141541-1J, wherein the one or more processors are further configured to, when selecting one of the plurality of code books, determine an estimate of a number of bits used to represent the spatial component using one of the plurality of code books designed to be used when the spatial component is representative of a recorded audio object in the sound field.

Clause 141541-9J. The device of any combination of claims 1J-8J, wherein the vector based synthesis comprises a singular value decomposition.

In each of the various instances described above, it should be understood that the audio encoding device 510 may perform a method or otherwise comprise means to perform each step of the method for which the audio encoding device 510 is configured to perform In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 510 has been configured to perform.

Figure 40J:
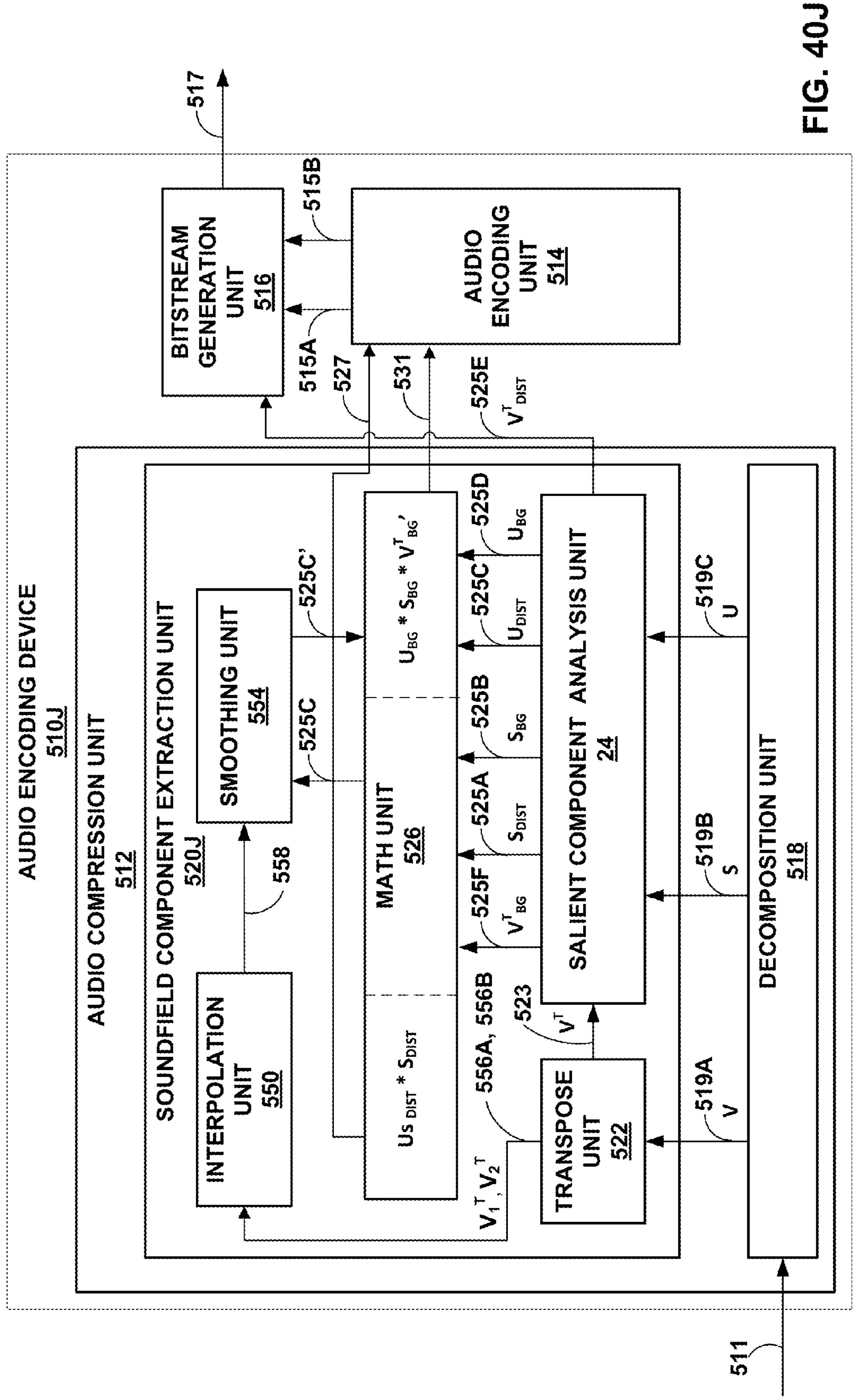

FIG. 40J is a block diagram illustrating example audio encoding device 510J that may perform various aspects of the techniques described in this disclosure to compress spherical harmonic coefficients describing two or three dimensional soundfields. The audio encoding device 510J may be similar to audio encoding device 510G in that audio encoding device 510J includes an audio compression unit 512, an audio encoding unit 514 and a bitstream generation unit 516. Moreover, the audio compression unit 512 of the audio encoding device 510J may be similar to that of the audio encoding device 510G in that the audio compression unit 512 includes a decomposition unit 518 and a soundfield component extraction unit 520, which may operate similarly to like units of the audio encoding device 510I. In some examples, audio encoding device 510J may include a quantization unit 534, as described with respect to FIGS. 40D-40E, to quantize one or more vectors of any of the $U_{DIST}$ vectors 525C, the $U_{BG}$ vectors 525D, the $V^T_{DIST}$ vectors 525E, and the $V^T_{BG}$ vectors 525J.

The audio compression unit 512 of the audio encoding device 510J may, however, differ from the audio compression unit 512 of the audio encoding device 510G in that the audio compression unit 512 of the audio encoding device 510J includes an additional unit denoted as interpolation unit 550. The interpolation unit 550 may represent a unit that interpolates sub-frames of a first audio frame from the sub-frames of the first audio frame and a second temporally subsequent or preceding audio frame, as described in more detail below with respect to FIGS. 45 and 45B. The interpolation unit 550 may, in performing this interpolation, reduce computational complexity (in terms of processing cycles and/or memory consumption) by potentially reducing the extent to which the decomposition unit 518 is required to decompose SHC 511. The interpolation unit 550 may operate in a manner similar to that described above with respect to the interpolation unit 550 of the audio encoding devices 510H and 510I shown in the examples of FIGS. 40H and 40I.

In operation, the interpolation unit 200 may interpolate one or more sub-frames of a first audio frame from a first decomposition, e.g., the V matrix 19', of a portion of a first plurality of spherical harmonic coefficients 11 included in the first frame and a second decomposition, e.g., V matrix 19', of a portion of a second plurality of spherical harmonic coefficients 11 included in a second frame to generate decomposed interpolated spherical harmonic coefficients for the one or more sub-frames.

Interpolation unit 550 may obtain decomposed interpolated spherical harmonic coefficients for a time segment by, at least in part, performing an interpolation with respect to a first decomposition of a first plurality of spherical harmonic coefficients and a second decomposition of a second plurality of spherical harmonic coefficients. Smoothing unit 554 may apply the decomposed interpolated spherical harmonic coefficients to smooth at least one of spatial components and time components of the first plurality of spherical harmonic coefficients and the second plurality of spherical harmonic coefficients. Smoothing unit 554 may generate smoothed UDis matrices 525C' as described above with respect to FIGS. 37-39. The first and second decompositions may refer to $V_1^T$ 556, $V_2^T$ 556B in FIG. 40J.

In some cases, $V^T$ or other V-vectors or V-matrices may be output in a quantized version for interpolation. In this way, the V vectors for the interpolation may be identical to the V vectors at the decoder, which also performs the V vector interpolation, e.g., to recover the multi-dimensional signal.

In some examples, the first decomposition comprises the first V matrix 519' representative of right-singular vectors of the portion of the first plurality of spherical harmonic coefficients 511. Likewise, in some examples, the second decomposition comprises the second V matrix 519' representative of right-singular vectors of the portion of the second plurality of spherical harmonic coefficients.

The interpolation unit 550 may perform a temporal interpolation with respect to the one or more sub-frames based on the first V matrix 519' and the second V matrix 19'. That is, the interpolation unit 550 may temporally interpolate, for example, the second, third and fourth sub-frames out of four total sub-frames for the first audio frame based on a V matrix 519' decomposed from the first sub-frame of the first audio frame and the V matrix 519' decomposed from the first sub-frame of the second audio frame. In some examples, this temporal interpolation is a linear temporal interpolation, where the V matrix 519' decomposed from the first sub-frame of the first audio frame is weighted more heavily when interpolating the second sub-frame of the first audio frame than when interpolating the fourth sub-frame of the first audio frame. When interpolating the third sub-frame, the V matrices 519' may be weighted evenly. When interpolating the fourth sub-frame, the V matrix 519' decomposed from the first sub-frame of the second audio frame may be more heavily weighted than the V matrix 519' decomposed from the first sub-frame of the first audio frame.

In other words, the linear temporal interpolation may weight the V matrices 519' given the proximity of the one of the sub-frames of the first audio frame to be interpolated. For the second sub-frame to be interpolated, the V matrix 519' decomposed from the first sub-frame of the first audio frame is weighted more heavily given its proximity to the second sub-frame to be interpolated than the V matrix 519' decomposed from the first sub-frame of the second audio frame. The weights may be equivalent for this reason when interpolating the third sub-frame based on the V matrices 519'. The weight applied to the V matrix 519' decomposed from the first sub-frame of the second audio frame may be greater than that applied to the V matrix 519' decomposed from the first sub-frame of the first audio frame given that the fourth sub-frame to be interpolated is more proximate to the first sub-frame of the second audio frame than the first sub-frame of the first audio frame.

In some examples, the interpolation unit 550 may project the first V matrix 519' decomposed form the first sub-frame of the first audio frame into a spatial domain to generate first projected decompositions. In some examples, this projection includes a projection into a sphere (e.g., using a projection matrix, such as a T-design matrix). The interpolation unit 550 may then project the second V matrix 519' decomposed from the first sub-frame of the second audio frame into the spatial domain to generate second projected decompositions. The interpolation unit 550 may then spatially interpolate (which again may be a linear interpolation) the first projected decompositions and the second projected decompositions to generate a first spatially interpolated projected decomposition and a second spatially interpolated projected decomposition. The interpolation unit 550 may then temporally interpolate the one or more sub-frames based on the first spatially interpolated projected decomposition and the second spatially interpolated projected decomposition.

In those examples where the interpolation unit 550 spatially and then temporally projects the V matrices 519', the interpolation unit 550 may project the temporally interpolated spherical harmonic coefficients resulting from interpolating the one or more sub-frames back to a spherical harmonic domain, thereby generating the V matrix 519, the S matrix 519B and the U matrix 519C.

In some examples, the portion of the first plurality of spherical harmonic coefficients comprises a single sub-frame of the first plurality of spherical harmonic coefficients 511. In some examples, the portion of the second plurality of spherical harmonic coefficients comprises a single sub-frame of the second plurality of spherical harmonic coefficients 511. In some examples, this single sub-frame from which the V matrices 19' are decomposed is the first sub-frame.

In some examples, the first frame is divided into four sub-frames. In these and other examples, the portion of the first plurality of spherical harmonic coefficients comprises only the first sub-frame of the plurality of spherical harmonic coefficients 511. In these and other examples, the second frame is divided into four sub-frames, and the portion of the second plurality of spherical harmonic coefficients 511 comprises only the first sub-frame of the second plurality of spherical harmonic coefficients 511.

Although, in some examples, only a first sub-frame of each audio frame is used to perform the interpolation, the portion of the first plurality of spherical harmonic coefficients may comprise two of four sub-frames of the first plurality of spherical harmonic coefficients 511. In these and other examples, the portion of the second plurality of spherical harmonic coefficients 511 comprises two of four sub-frames of the second plurality of spherical harmonic coefficients 511.

As noted above, a single device, e.g., audio encoding device 510J, may perform the interpolation while also decomposing the portion of the first plurality of spherical harmonic coefficients to generate the first decompositions of the portion of the first plurality of spherical harmonic coefficients. In these and other examples, the decomposition unit 518 may decompose the portion of the second plurality of spherical harmonic coefficients to generate the second decompositions of the portion of the second plurality of spherical harmonic coefficients. While described with respect to a single device, two or more devices may perform the techniques described in this disclosure, where one of the two devices performs the decomposition and another one of the devices performs the interpolation in accordance with the techniques described in this disclosure.

In some examples, the decomposition unit 518 may perform a singular value decomposition with respect to the portion of the first plurality of spherical harmonic coefficients 511 to generate a V matrix 519' (as well as an S matrix 519B' and a U matrix 519C', which are not shown for ease of illustration purposes) representative of right-singular vectors of the first plurality of spherical harmonic coefficients 511. In these and other examples, the decomposition unit 518 may perform the singular value decomposition with respect to the portion of the second plurality of spherical harmonic coefficients 511 to generate a V matrix 519' (as well as an S matrix 519B' and a U matrix 519C', which are not shown for ease of illustration purposes) representative of right-singular vectors of the second plurality of spherical harmonic coefficients.

In some examples, as noted above, the first and second plurality of spherical harmonic coefficients each represent a planar wave representation of the soundfield. In these and other examples, the first and second plurality of spherical harmonic coefficients 511 each represent one or more mono-audio objects mixed together.

In other words, spherical harmonics-based 3D audio may be a parametric representation of the 3D pressure field in terms of orthogonal basis functions on a sphere. The higher the order N of the representation, the potentially higher the spatial resolution, and often the larger the number of spherical harmonics (SH) coefficients (for a total of $(N+1)^2$ coefficients). For many applications, a bandwidth compression of the coefficients may be required for being able to transmit and store the coefficients efficiently. This techniques directed in this disclosure may provide a frame-based, dimensionality reduction process using Singular Value Decomposition (SVD). The SVD analysis may decompose each frame of coefficients into three matrices U, S and V. In some examples, the techniques may handle some of the vectors in U as directional components of the underlying soundfield. However, when handled in this manner, these vectors (in U) are discontinuous from frame to frame—even though they represent the same distinct audio component. These discontinuities may lead to significant artifacts when the components are fed through transform-audio-coders.

The techniques described in this disclosure may address this discontinuity. That is, the techniques may be based on the observation that the V matrix can be interpreted as orthogonal spatial axes in the Spherical Harmonics domain. The U matrix may represent a projection of the Spherical Harmonics (HOA) data in terms of those basis functions, where the discontinuity can be attributed to basis functions (V) that change every frame—and are therefore discontinuous themselves. This is unlike similar decomposition, such as the Fourier Transform, where the basis functions are, in some examples, constant from frame to frame. In these terms, the SVD may be considered of as a matching pursuit algorithm. The techniques described in this disclosure may enable the interpolation unit 550 to maintain the continuity between the basis functions (V) from frame to frame—by interpolating between them.

In some examples, the techniques enable the interpolation unit 550 to divide the frame of SH data into four subframes, as described above and further described below with respect to FIGS. 45 and 45B. The interpolation unit 550 may then compute the SVD for the first sub-frame. Similarly we compute the SVD for the first sub-frame of the second frame. For each of the first frame and the second frame, the interpolation unit 550 may convert the vectors in V to a spatial map by projecting the vectors onto a sphere (using a projection matrix such as a T-design matrix). The interpolation unit 550 may then interpret the vectors in V as shapes on a sphere. To interpolate the V matrices for the three sub-frames in between the first sub-frame of the first frame the first sub-frame of the next frame, the interpolation unit 550 may then interpolate these spatial shapes—and then transform them back to the SH vectors via the inverse of the projection matrix. The techniques of this disclosure may, in this manner, provide a smooth transition between V matrices.

Figure 41A:
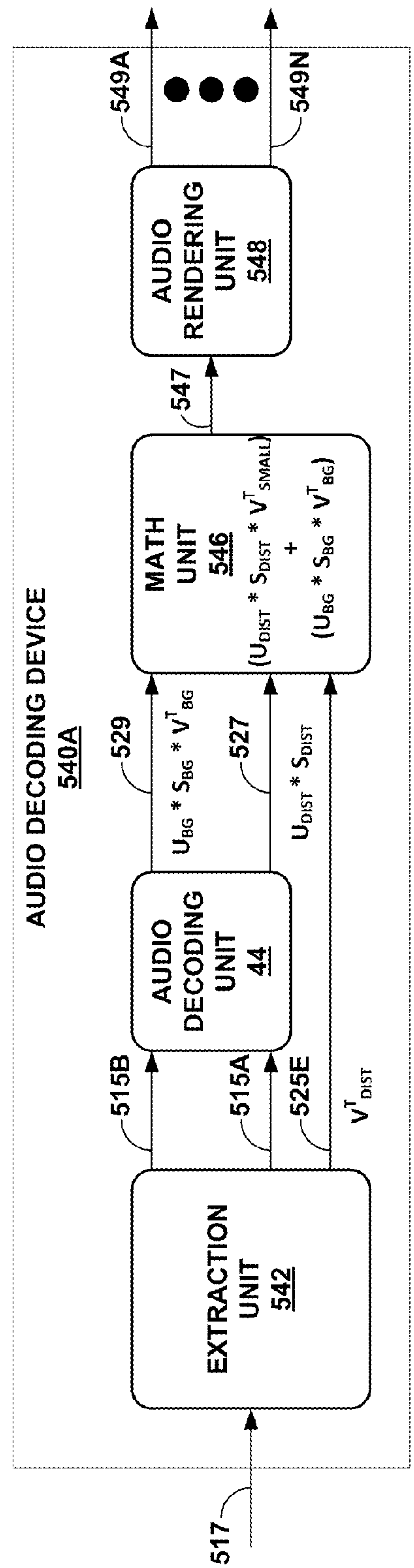
FIG. 41A-41D are block diagrams each illustrating an example audio decoding device that may perform various aspects of the techniques described in this disclosure to decode spherical harmonic coefficients describing two or three dimensional soundfields.
Figure 41B:
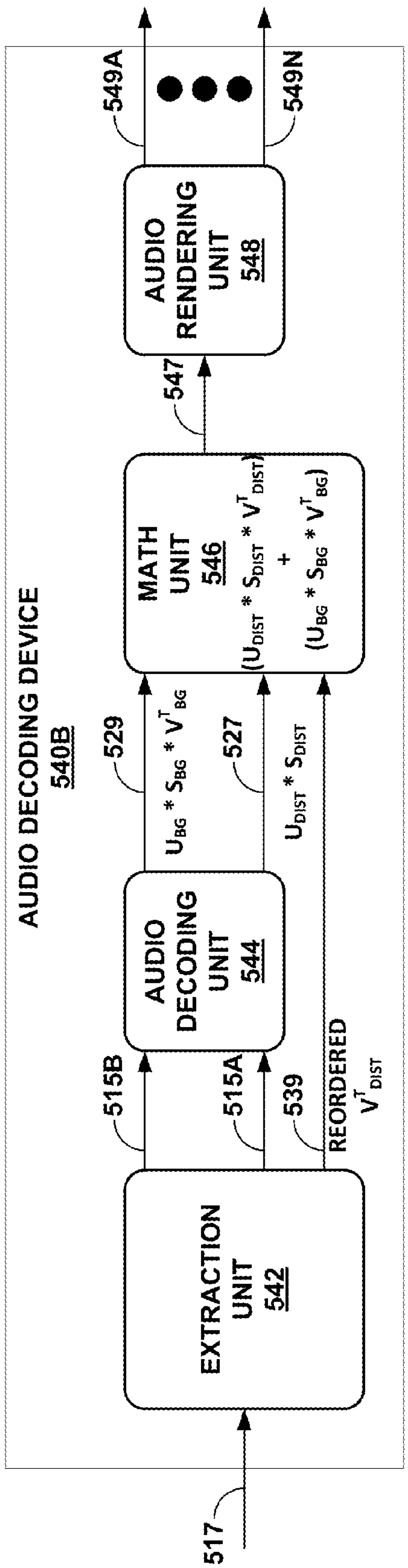
Figure 41C:
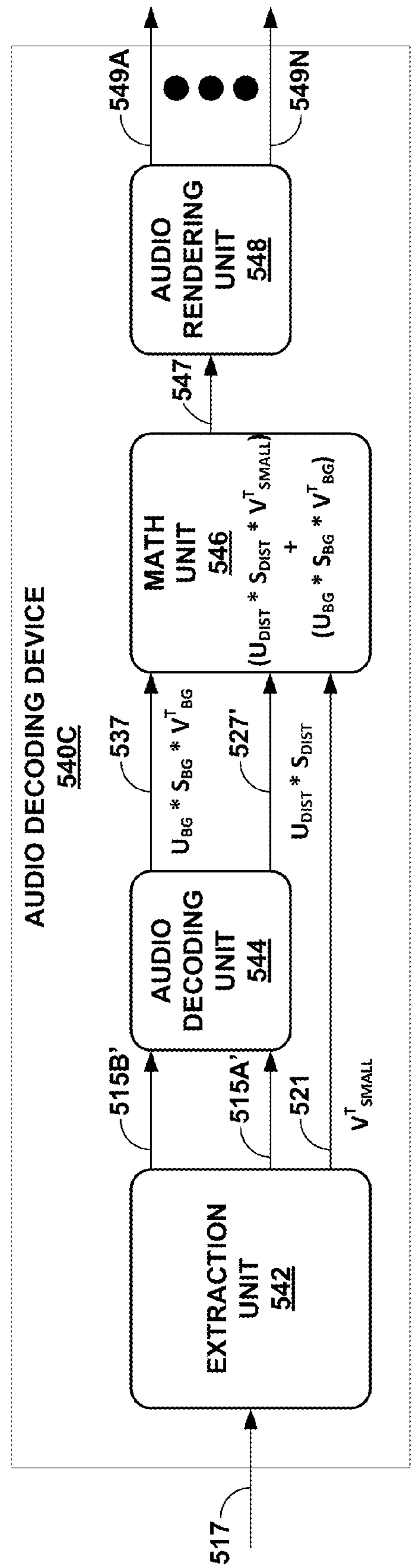
Figure 41D:
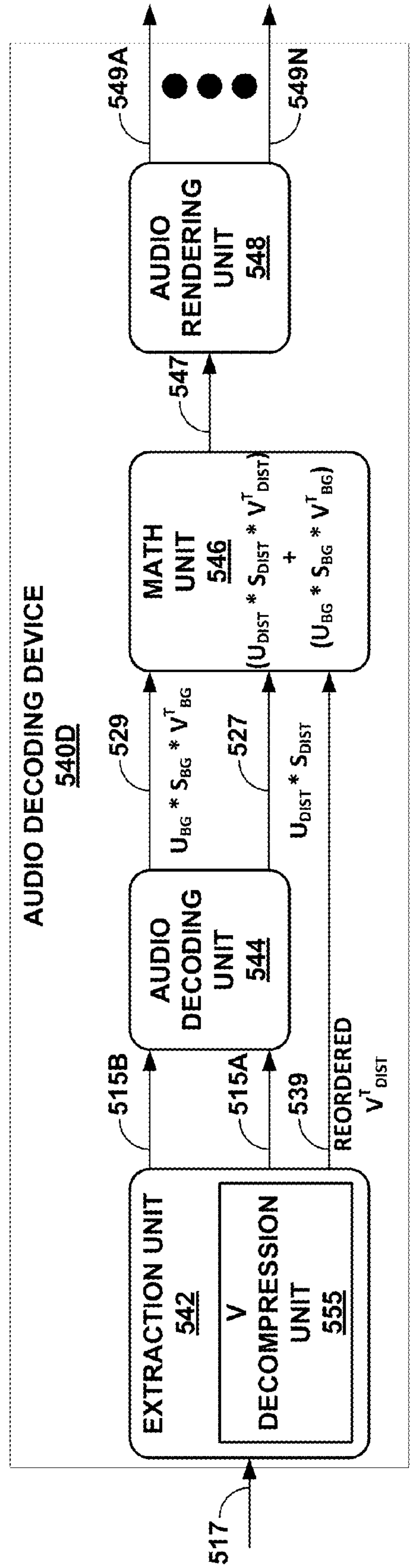

FIG. 41-41D are block diagrams each illustrating an example audio decoding device 540A-540D that may perform various aspects of the techniques described in this disclosure to decode spherical harmonic coefficients describing two or three dimensional soundfields. The audio decoding device 540A may represents any device capable of decoding audio data, such as a desktop computer, a laptop computer, a workstation, a tablet or slate computer, a dedicated audio recording device, a cellular phone (including so-called "smart phones"), a personal media player device, a personal gaming device, or any other type of device capable of decoding audio data.

In some examples, the audio decoding device 540A performs an audio decoding process that is reciprocal to the audio encoding process performed by any of the audio encoding devices 510 or 510B with the exception of performing the order reduction (as described above with respect to the examples of FIGS. 40B-40J), which is, in some examples, used by the audio encoding devices 510B-510J to facilitate the removal of extraneous irrelevant data.

While shown as a single device, i.e., the device 540A in the example of FIG. 41, the various components or units referenced below as being included within the device 540A may form separate devices that are external from the device 540. In other words, while described in this disclosure as being performed by a single device, i.e., the device 540A in the example of FIG. 41, the techniques may be implemented or otherwise performed by a system comprising multiple devices, where each of these devices may each include one or more of the various components or units described in more detail below. Accordingly, the techniques should not be limited in this respect to the example of FIG. 41.

As shown in the example of FIG. 41, the audio decoding device 540A comprises an extraction unit 542, an audio decoding unit 544, a math unit 546, and an audio rendering unit 548. The extraction unit 542 represents a unit configured to extract the encoded reduced background spherical harmonic coefficients 515B, the encoded $U_{DIST}*S_{DIST}$ vectors 515A and the $V^T_{DIST}$ vectors 525E from the bitstream 517. The extraction unit 542 outputs the encoded reduced background spherical harmonic coefficients 515B and the encoded $U_{DIST}*S_{DIST}$ vectors 515A to audio decoding unit 544, while also outputting and the $V^T_{DIST}$ matrix 525E to the math unit 546. In this respect, the extraction unit 542 may operate in a manner similar to the extraction unit 72 of the audio decoding device 24 shown in the example of FIG. 5.

The audio decoding unit 544 represents a unit to decode the encoded audio data (often in accordance with a reciprocal audio decoding scheme, such as an AAC decoding scheme) so as to recover the $U_{DIST}*S_{DIST}$ vectors 527 and the reduced background spherical harmonic coefficients 529. The audio decoding unit 544 outputs the $U_{DIST}*S_{DIST}$ Vectors 527 and the reduced background spherical harmonic coefficients 529 to the math unit 546. In this respect, the audio decoding unit 544 may operate in a manner similar to the psychoacoustic decoding unit 80 of the audio decoding device 24 shown in the example of FIG. 5.

The math unit 546 may represent a unit configured to perform matrix multiplication and addition (as well as, in some examples, any other matrix math operation). The math unit 546 may first perform a matrix multiplication of the $U_{DIST}*S_{DIST}$ vectors 527 by the $V^T_{DIST}$ matrix 525E. The math unit 546 may then add the result of the multiplication of the $U_{DIST}*S_{DIST}$ vectors 527 by the $V^T_{DIST}$ matrix 525E by the reduced background spherical harmonic coefficients 529 (which, again, may refer to the result of the multiplication of the $U_{BG}$ matrix 525D by the $S_{BG}$ matrix 525B and then by the $V^T_{BG}$ matrix 525F) to the result of the matrix multiplication of the $U_{DIST}*S_{DIST}$ vectors 527 by the $V^T_{DIST}$ matrix 525E to generate the reduced version of the original spherical harmonic coefficients 11, which is denoted as recovered spherical harmonic coefficients 547. The math unit 546 may output the recovered spherical harmonic coefficients 547 to the audio rendering unit 548. In this respect, the math unit 546 may operate in a manner similar to the foreground formulation unit 78 and the HOA coefficient formulation unit 82 of the audio decoding device 24 shown in the example of FIG. 5.

The audio rendering unit 548 represents a unit configured to render the channels 549A-549N (the "channels 549," which may also be generally referred to as the "multi-channel audio data 549" or as the "loudspeaker feeds 549"). The audio rendering unit 548 may apply a transform (often expressed in the form of a matrix) to the recovered spherical harmonic coefficients 547. Because the recovered spherical harmonic coefficients 547 describe the soundfield in three dimensions, the recovered spherical harmonic coefficients 547 represent an audio format that facilitates rendering of the multichannel audio data 549A in a manner that is capable of accommodating most decoder-local speaker geometries (which may refer to the geometry of the speakers that will playback multi-channel audio data 549). More information regarding the rendering of the multi-channel audio data 549A is described above with respect to FIG. 48.

While described in the context of the multi-channel audio data 549A being surround sound multi-channel audio data 549, the audio rendering unit 48 may also perform a form of binauralization to binauralize the recovered spherical harmonic coefficients 549A and thereby generate two binaurally rendered channels 549. Accordingly, the techniques should not be limited to surround sound forms of multi-channel audio data, but may include binauralized multi-channel audio data.

The various clauses listed below may present various aspects of the techniques described in this disclosure.

Clause 132567-1B. A device, such as the audio decoding device 540, comprising: one or more processors configured to determine one or more first vectors describing distinct components of the sound field and one or more second vectors describing background components of the sound field, both the one or more first vectors and the one or more second vectors generated at least by performing a singular value decomposition with respect to the plurality of spherical harmonic coefficients.

Clause 132567-2B. The device of clause 132567-1B, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, wherein the U matrix and the S matrix are generated at least by performing the singular value decomposition with respect to the plurality of spherical harmonic coefficients, and wherein the one or more processors are further configured to audio decode the one or more audio encoded $U_{DIST}*S_{DIST}$ vectors to generate an audio decoded version of the one or more audio encoded $U_{DIST}*S_{DIST}$ vectors.

Clause 132567-3B. The device of clause 132567-1B, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix and the S matrix and the V matrix are generated at least by performing the singular value decomposition with respect to the plurality of spherical harmonic coefficients, and wherein the one or more processors are further configured to audio decode the one or more audio encoded $U_{DIST}*S_{DIST}$ vectors to generate an audio decoded version of the one or more audio encoded $U_{DIST}*S_{DIST}$ vectors.

Clause 132567-4B. The device of clause 132567-3B, wherein the one or more processors are further configured to multiply the $U_{DIST}*S_{DIST}$ vectors by the $V^T_{DIST}$ vectors to recover those of the plurality of spherical harmonics representative of the distinct components of the sound field.

Clause 132567-5B. The device of clause 132567-1B, wherein the one or more second vectors comprise one or more audio encoded $U_{BG}*S_{BG}*V^T_{BG}$ vectors that, prior to audio encoding, were generating by multiplying $U_{BG}$ vectors included within a U matrix by $S_{BG}$ vectors included within an S matrix and then by $V^T_{BG}$ vectors included within a transpose of a V matrix, and wherein the S matrix, the U matrix and the V matrix were each generated at least by performing the singular value decomposition with respect to the plurality of spherical harmonic coefficients.

Clause 132567-6B. The device of clause 132567-1B, wherein the one or more second vectors comprise one or more audio encoded $U_{BG}*S_{BG}*V^T_{BG}$ vectors that, prior to audio encoding, were generating by multiplying $U_{BG}$ vectors included within a U matrix by $S_{BG}$ vectors included within an S matrix and then by $V^T_{BG}$ vectors included within a transpose of a V matrix, and wherein the S matrix, the U matrix and the V matrix were generated at least by performing the singular value decomposition with respect to the plurality of spherical harmonic coefficients, and wherein the one or more processors are further configured to audio decode the one or more audio encoded $U_{BG}*S_{BG}*V^T_{BG}$ vectors to generate one or more audio decoded $U_{BG}*S_{BG}*V^T_{BG}$ vectors.

Clause 132567-7B. The device of clause 132567-1B, wherein the one or more first vectors comprise one or more audio encoded $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the one or more processors are further configured to audio decode the one or more audio encoded $U_{DIST}*S_{DIST}$ vectors to generate the one or more $U_{DIST}*S_{DIST}$ vectors, and multiply the $U_{DIST}*S_{DIST}$ vectors by the $V^T_{DIST}$ vectors to recover those of the plurality of spherical harmonic coefficients that describe the distinct components of the sound field, wherein the one or more second vectors comprise one or more audio encoded $U_{BG}*S_{BG}*V^T_{BG}$; vectors that, prior to audio encoding, were generating by multiplying $U_{BG}$ vectors included within the U matrix by $S_{BG}$ vectors included within the S matrix and then by $V^T_{BG}$ vectors included within the transpose of the V matrix, and wherein the one or more processors are further configured to audio decode the one or more audio encoded $U_{BG}*S_{BG}*V^T_{BG}$ vectors to recover at least a portion of the plurality of the spherical harmonic coefficients that describe background components of the sound field, and add the plurality of spherical harmonic coefficients that describe the distinct components of the sound field to the at least portion of the plurality of the spherical harmonic coefficients that describe background components of the sound field to generate a reconstructed version of the plurality of spherical harmonic coefficients.

Clause 132567-8B. The device of clause 132567-1B, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the one or more processors are further configured to determine a value D indicating the number of vectors to be extracted from a bitstream to form the one or more $U_{DIST}*S_{DIST}$ vectors and the one or more $V^T_{DIST}$ vectors.

Clause 132567-9B. The device of clause 132567-101, wherein the one or more first vectors comprise one or more $U_{DIST}*S_{DIST}$ vectors that, prior to audio encoding, were generated by multiplying one or more audio encoded $U_{DIST}$ vectors of a U matrix by one or more $S_{DIST}$ vectors of an S matrix, and one or more $V^T_{DIST}$ vectors of a transpose of a V matrix, wherein the U matrix, the S matrix and the V matrix were generated at least by performing the singular value decomposition with respect to the plurality of spherical harmonic coefficients, and wherein the one or more processors are further configured to determine a value D on an audio-frame-by-audio-frame basis that indicates the number of vectors to be extracted from a bitstream to form the one or more $U_{DIST}*S_{DIST}$ vectors and the one or more $V^T_{DIST}$ vectors.

Clause 132567-1G. A device, such as the audio decoding device 540, comprising: one or more processors configured to determine one or more first vectors describing distinct components of a sound field and one or more second vectors describing background components of the sound field, both the one or more first vectors and the one or more second vectors generated at least by performing a singular value decomposition with respect to multi-channel audio data representative of at least a portion of the sound field.

Clause 132567-2G. The device of clause 132567-1G, wherein the multi-channel audio data comprises a plurality of spherical harmonic coefficients.

Clause 132567-3G. The device of clause 132567-2G, wherein the one or more processors are further configured to perform any combination of the clause 132567-2B through clause 132567-9B.

From each of the various clauses described above, it should be understood that any of the audio decoding devices 540A-540D may perform a method or otherwise comprise means to perform each step of the method for which the audio decoding devices 540A-540D is configured to perform In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding devices 540A-540D has been configured to perform.

For example, a clause 132567-10B may be derived from the foregoing clause 132567-1B to be a method comprising A method comprising: determining one or more first vectors describing distinct components of a sound field and one or more second vectors describing background components of the sound field, both the one or more first vectors and the one or more second vectors generated at least by performing a singular value decomposition with respect to a plurality of spherical harmonic coefficients that represent the sound field.

As another example, a clause 132567-11B may be derived from the foregoing clause 132567-1B to be a device, such as the audio decoding device 540, comprising means for determining one or more first vectors describing distinct components of the sound field and one or more second vectors describing background components of the sound field, both the one or more first vectors and the one or more second vectors generated at least by performing a singular value decomposition with respect to the plurality of spherical harmonic coefficients; and means for storing the one or more first vectors and the one or more second vectors.

As yet another example, a clause 132567-12B may be derived from the foregoing clause 132567-1B to be a non-transitory computer-readable storage medium having stored thereon instructions that, when executed, cause one or more processor to determine one or more first vectors describing distinct components of a sound field and one or more second vectors describing background components of the sound field, both the one or more first vectors and the one or more second vectors generated at least by performing a singular value decomposition with respect to a plurality of spherical harmonic coefficients included within higher order ambisonics audio data that describe the sound filed.

Various clauses may likewise be derived from clauses 132567-2B through 132567-9B for the various devices, methods and non-transitory computer-readable storage mediums derived as exemplified above. The same may be performed for the various other clauses listed throughout this disclosure.

FIG. 41B is a block diagram illustrating an example audio decoding device 540B that may perform various aspects of the techniques described in this disclosure to decode spherical harmonic coefficients describing two or three dimensional soundfields. The audio decoding device 540B may be similar to the audio decoding device 540, except that, in some examples, the extraction unit 542 may extract reordered $V^T_{DIST}$ vectors 539 rather than $V^T_{DIST}$ vectors 525E. In other examples, the extraction unit 542 may extract the $V^T_{DIST}$ vectors 525E and then reorder these $V^T_{DIST}$ vectors 525E based on reorder information specified in the bitstream or inferred (through analysis of other vectors) to determine the reordered $V^T_{DIST}$ vectors 539. In this respect, the extraction unit 542 may operate in a manner similar to the extraction unit 72 of the audio decoding device 24 shown in the example of FIG. 5. In any event, the extraction unit 542 may output the reordered $V^T_{DIST}$ vectors 539 to the math unit 546, where the process described above with respect to recovering the spherical harmonic coefficients may be performed with respect to these reordered $V^T_{DIST}$ vectors 539.

In this way, the techniques may enable the audio decoding device 540B to audio decode reordered one or more vectors representative of distinct components of a soundfield, the reordered one or more vectors having been reordered to facilitate compressing the one or more vectors. In these and other examples, the audio decoding device 540B may recombine the reordered one or more vectors with reordered one or more additional vectors to recover spherical harmonic coefficients representative of distinct components of the soundfield. In these and other examples, the audio decoding device 540B may then recover a plurality of spherical harmonic coefficients based on the spherical harmonic coefficients representative of distinct components of the soundfield and spherical harmonic coefficients representative of background components of the soundfield.

That is, various aspects of the techniques may provide for the audio decoding device 540B to be configured to decode reordered one or more vectors according to the following clauses.

Clause 133146-1F. A device, such as the audio encoding device 540B, comprising: one or more processors configured to determine a number of vectors corresponding to components in the sound field.

Clause 133146-2F. The device of clause 133146-1F, wherein the one or more processors are configured to determine the number of vectors after performing order reduction in accordance with any combination of the instances described above.

Clause 133146-3F. The device of clause 133146-1F, wherein the one or more processors are further configured to perform order reduction in accordance with any combination of the instances described above.

Clause 133146-4F. The device of clause 133146-1F. wherein the one or more processors are configured to determine the number of vectors from a value specified in a bitstream, and wherein the one or more processors are further configured to parse the bitstream based on the determined number of vectors to identify one or more vectors in the bitstream that represent distinct components of the sound field.

Clause 133146-5F. The device of clause 133146-1F, wherein the one or more processors are configured to determine the number of vectors from a value specified in a bitstream, and wherein the one or more processors are further configured to parse the bitstream based on the determined number of vectors to identify one or more vectors in the bitstream that represent background components of the sound field.

Clause 133143-1C. A device, such as the audio decoding device 540B, comprising: one or more processors configured to reorder reordered one or more vectors representative of distinct components of a sound field.

Clause 133143-2C. The device of clause 133143-1C, wherein the one or more processors are further configured to determine the reordered one or more vectors, and determine reorder information describing how the reordered one or more vectors were reordered, wherein the one or more processors are further configured to, when reordering the reordered one or more vectors, reorder the reordered one or more vectors based on the determined reorder information.

Clause 133143-3C. The device of 1C, wherein the reordered one or more vectors comprise the one or more reordered first vectors recited by any combination of claims 1A-18A or any combination of claims 1B-19B, and wherein the one or more first vectors are determined in accordance with the method recited by any combination of claims 1A-18A or any combination of claims 1B-19B.

Clause 133143-4D. A device, such as the audio decoding device 540B, comprising: one or more processors configured to audio decode reordered one or more vectors representative of distinct components of a sound field, the reordered one or more vectors having been reordered to facilitate compressing the one or more vectors.

Clause 133143-5D. The device of clause 133143-4D, wherein the one or more processors are further configured to recombine the reordered one or more vectors with reordered one or more additional vectors to recover spherical harmonic coefficients representative of distinct components of the sound field.

Clause 133143-6D. The device of clause 133143-5D, wherein the one or more processors are further configured to recover a plurality of spherical harmonic coefficients based on the spherical harmonic coefficients representative of distinct components of the sound field and spherical harmonic coefficients representative of background components of the sound field.

Clause 133143-1E. A device, such as the audio decoding device 540B, comprising: one or more processors configured to reorder one or more vectors to generate reordered one or more first vectors and thereby facilitate encoding by a legacy audio encoder, wherein the one or more vectors describe represent distinct components of a sound field, and audio encode the reordered one or more vectors using the legacy audio encoder to generate an encoded version of the reordered one or more vectors.

Clause 133143-2E. The device of 1E, wherein the reordered one or more vectors comprise the one or more reordered first vectors recited by any combination of claims 1A-18A or any combination of claims 1B-19B, and wherein the one or more first vectors are determined in accordance with the method recited by any combination of claims 1A-18A or any combination of claims 1B-19B.

FIG. 41C is a block diagram illustrating another exemplary audio encoding device 540C. The audio decoding device 540C may represent any device capable of decoding audio data, such as a desktop computer, a laptop computer, a workstation, a tablet or slate computer, a dedicated audio recording device, a cellular phone (including so-called "smart phones"), a personal media player device, a personal gaming device, or any other type of device capable of decoding audio data.

In the example of FIG. 41C, the audio decoding device 540C performs an audio decoding process that is reciprocal to the audio encoding process performed by any of the audio encoding devices 510B-510E with the exception of performing the order reduction (as described above with respect to the examples of FIGS. 40B-40J), which is, in some examples, used by the audio encoding device 510B-510J to facilitate the removal of extraneous irrelevant data.

While shown as a single device, i.e., the device 540C in the example of FIG. 41C, the various components or units referenced below as being included within the device 540C may form separate devices that are external from the device 540C. In other words, while described in this disclosure as being performed by a single device, i.e., the device 540C in the example of FIG. 41C, the techniques may be implemented or otherwise performed by a system comprising multiple devices, where each of these devices may each include one or more of the various components or units described in more detail below. Accordingly, the techniques should not be limited in this respect to the example of FIG. 41C.

Moreover, the audio encoding device 540C may be similar to the audio encoding device 540B. However, the extraction unit 542 may determine the one or more $V^T_{SMALL}$ vectors 521 from the bitstream 517 rather than reordered $V^T_{Q\_DIST}$ vectors 539 or $V^T_{DIST}$ vectors 525E (as is the case described with respect to the audio encoding device 510 of FIG. 40). As a result, the extraction unit 542 may pass the $V^T_{SMAALL}$ vectors 521 to the math unit 546.

In addition, the extraction unit 542 may determine audio encoded modified background spherical harmonic coefficients 515B' from the bitstream 517, passing these coefficients 515B' to the audio decoding unit 544, which may audio decode the encoded modified background spherical harmonic coefficients 515B to recover the modified background spherical harmonic coefficients 537. The audio decoding unit 544 may pass these modified background spherical harmonic coefficients 537 to the math unit 546.

The math unit 546 may then multiply the audio decoded (and possibly unordered) $U_{DIST}*S_{DIST}$ vectors 527' by the one or more $V^T_{SMALL}$ vectors 521 to recover the higher order distinct spherical harmonic coefficients. The math unit 546 may then add the higher-order distinct spherical harmonic coefficients to the modified background spherical harmonic coefficients 537 to recover the plurality of the spherical harmonic coefficients 511 or some derivative thereof (which may be a derivative due to order reduction performed at the encoder unit 510E).

In this way, the techniques may enable the audio decoding device 540C to determine, from a bitstream, at least one of one or more vectors decomposed from spherical harmonic coefficients that were recombined with background spherical harmonic coefficients to reduce an amount of bits required to be allocated to the one or more vectors in the bitstream, wherein the spherical harmonic coefficients describe a soundfield, and wherein the background spherical harmonic coefficients described one or more background components of the same soundfield.

Various aspects of the techniques may in this respect enable the audio decoding device 540C to, in some instances, be configured to determine, from a bitstream, at least one of one or more vectors decomposed from spherical harmonic coefficients that were recombined with background spherical harmonic coefficients, wherein the spherical harmonic coefficients describe a sound field, and wherein the background spherical harmonic coefficients described one or more background components of the same sound field.

In these and other instances, the audio decoding device 540C is configured to obtain, from the bitstream, a first portion the spherical harmonic coefficients having an order equal to $N_{BG}$.

In these and other instances, the audio decoding device 540C is further configured to obtain, from the bitstream, a first audio encoded portion the spherical harmonic coefficients having an order equal to $N_{BG}$, and audio decode the audio encoded first portion of the spherical harmonic coefficients to generate a first portion of the spherical harmonic coefficients.

In these and other instances, the at least one of the one or more vectors comprise one or more $V^T_{SMALL}$ vectors, the one or more $V^T_{SMALL}$ vectors having been determined from a transpose of a V matrix generated by performing a singular value decomposition with respect to the plurality of spherical harmonic coefficients.

In these and other instances, the at least one of the one or more vectors comprise one or more $V^T_{SMALL}$ vectors, the one or more $V^T_{SMALL}$ vectors having been determined from a transpose of a V matrix generated by performing a singular value decomposition with respect to the plurality of spherical harmonic coefficients, and the audio decoding device 540C is further configured to obtain, from the bitstream, one or more $U_{DIST}*S_{DIST}$ Vectors having been derived from a U matrix and an S matrix, both of which were generated by performing the singular value decomposition with respect to the plurality of spherical harmonic coefficients, and multiply the $U_{DIST}*S_{DIST}$ vectors by the $V^T_{SMALL}$ vectors.

In these and other instances, the at least one of the one or more vectors comprise one or more $V^T_{SMALL}$ vectors, the one or more $V^T_{SMALL}$ vectors having been determined from a transpose of a V matrix generated by performing a singular value decomposition with respect to the plurality of spherical harmonic coefficients, and the audio decoding device 540C is further configured to obtain, from the bitstream, one or more $U_{DIST}*S_{DIST}$ vectors having been derived from a U matrix and an S matrix, both of which were generated by performing the singular value decomposition with respect to the plurality of spherical harmonic coefficients, multiply the $U_{DIST}*S_{DIST}$ vectors by the $V^T_{SMALL}$ vectors to recover higher-order distinct background spherical harmonic coefficients, and add the background spherical harmonic coefficients that include the lower-order distinct background spherical harmonic coefficients to the higher-order distinct background spherical harmonic coefficients to recover, at least in part, the plurality of spherical harmonic coefficients.

In these and other instances, the at least one of the one or more vectors comprise one or more $V^T_{SMALL}$ Vectors, the one or more $V^T_{SMALL}$ vectors having been determined from a transpose of a V matrix generated by performing a singular value decomposition with respect to the plurality of spherical harmonic coefficients, and the audio decoding device 540C is further configured to obtain, from the bitstream, one or more $U_{DIST}*S_{DIST}$ vectors having been derived from a U matrix and an S matrix, both of which were generated by performing the singular value decomposition with respect to the plurality of spherical harmonic coefficients, multiply the $U_{DIST}*S_{DIST}$ vectors by the $V^T_{SMALL}$ vectors to recover higher-order distinct background spherical harmonic coefficients, add the background spherical harmonic coefficients that include the lower-order distinct background spherical harmonic coefficients to the higher-order distinct background spherical harmonic coefficients to recover, at least in part, the plurality of spherical harmonic coefficients, and render the recovered plurality of spherical harmonic coefficients.

FIG. 41D is a block diagram illustrating another exemplary audio encoding device 540D. The audio decoding device 540D may represent any device capable of decoding audio data, such as a desktop computer, a laptop computer, a workstation, a tablet or slate computer, a dedicated audio recording device, a cellular phone (including so-called "smart phones"), a personal media player device, a personal gaming device, or any other type of device capable of decoding audio data.

In the example of FIG. 41D, the audio decoding device 540D performs an audio decoding process that is reciprocal to the audio encoding process performed by any of the audio encoding devices 510B-510J with the exception of performing the order reduction (as described above with respect to the examples of FIGS. 40B-40J), which is, in some examples, used by the audio encoding devices 510B-510J to facilitate the removal of extraneous irrelevant data.

While shown as a single device, i.e., the device 540D in the example of FIG. 41D, the various components or units referenced below as being included within the device 540D may form separate devices that are external from the device 540D. In other words, while described in this disclosure as being performed by a single device, i.e., the device 540D in the example of FIG. 41D, the techniques may be implemented or otherwise performed by a system comprising multiple devices, where each of these devices may each include one or more of the various components or units described in more detail below. Accordingly, the techniques should not be limited in this respect to the example of FIG. 41D.

Moreover, the audio decoding device 540D may be similar to the audio decoding device 540B, except that the audio decoding device 540D performs an additional V decompression that is generally reciprocal to the compression performed by V compression unit 552 described above with respect to FIG. 40I. In the example of FIG. 41D, extraction unit 542 includes a V decompression unit 555 that performs this V decompression of the compressed spatial components 539' included in the bitstream 517 (and generally specified in accordance with the example shown in one of FIGS. 10B and 10C). The V decompression unit 555 may decompress $V^T_{DIST}$ vectors 539 based on the following equation:

$$\hat{v}_q = \begin{cases} 0, & \text{if cid} = 0 \\ \text{sgn} * (2^{cid-1} + \text{residual}), & \text{if cid} \neq 0 \end{cases}$$

In other words, the V decompression unit 555 may first parse the nbits value from the bitstream 517 and identify the appropriate set of five Huffman code tables to use when decoding the Huffman code representative of the cid. Based on the prediction mode and the Huffman coding information specified in the bitstream 517 and possibly the order of the element of the spatial component relative to the other elements of the spatial component, the V decompression unit 555 may identify the correct one of the five Huffman tables defined for the parsed nbits value. Using this Huffman table, the V decompression unit 555 may decode the cid value from the Huffman code. The V decompression unit 555 may then parse the sign bit and the residual block code, decoding the residual block code to identify the residual. In accordance with the above equation, the V decompression unit 555 may decode one of the $V^T_{DIST}$ vectors 539.

The foregoing may be summarized in the following syntax table:

TABLE

Decoded Vectors

| Syntax | No. of bits | Mnemonic |
|---|---|---|

```
decodeVVec(i)
{
 switch codedVVecLength {
  case 0: //complete Vector
   VVecLength = NumOfHoaCoeffs;
   for (m=0; m< VVecLength; ++m) { VecCoeff[m] = m+1; }
   break;
  case 1: //lower orders are removed
   VVecLength = NumOfHoaCoeffs −
MinNumOfCoeffsForAmbHOA;
   for (m=0; m< VVecLength; ++m) {
    VecCoeff[m] = m + MinNumOfCoeffsForAmbHOA +
1;
   }
   break;
  case 2:
   VVecLength = NumOfHoaCoeffs −
MinNumOfCoeffsForAmbHOA − NumOfAddAmbHoaChan;
   n = 0;
   for(m=0;m<NumOfHoaCoeffs−
MinNumOfCoeffsForAmbHOA; ++m) {
    c = m + MinNumOfCoeffsForAmbHOA + 1;
    if ( ismember(c, AmbCoeffIdx) == 0) {
     VecCoeff[n] = c;
     n++;
    }
   }
   break;
```

TABLE-continued

| Decoded Vectors | | |
|---|---|---|
| Syntax | No. of bits | Mnemonic |
| case 3: | | |
| VVecLength = NumOfHoaCoeffs − NumOfAddAmbHoaChan; | | |
| n = 0; | | |
| for(m=0; m<NumOfHoaCoeffs; ++m) { | | |
| c = m + 1; | | |
| if ( ismember(c, AmbCoeffIdx) == 0) { | | |
| VecCoeff[n] = c; | | |
| n++; | | |
| } | | |
| } | | |
| } | | |
| if (NbitsQ[i] == 5) { /* uniform quantizer */ | | |
| for (m=0; m< VVecLength; ++m) { | | |
| VVec(k)[i][m] = (VecValue / 128.0) − 1.0; | 8 | uimsbf |
| } | | |
| } | | |
| else { /* Huffman decoding */ | | |
| for (m=0; m< VVecLength; ++m) { | | |
| Idx = 5; | | |
| If (CbFlag[i] == 1) { | | |
| idx = (min(3, max(1, ceil(sqrt(VecCoeff[m]) − 1))); | | |
| } | | |
| else if (PFlag[i] == 1) {idx = 4;} | | |
| cid = huffDecode(huffmannTable[NbitsQ].codebook[idx]; huffVal); | dynamic | huffDecode |
| if( cid > 0 ) { | | |
| aVal = sgn = (sgnVal * 2) − 1; | 1 | bslbf |
| if (cid > 1) { | | |
| aVal = sgn * (2.0^(cid −1 ) + intAddVal); | cid − 1 | uimsbf |
| } | | |
| } else {aVal = 0.0;} | | |
| } | | |
| } | | |
| } | | |

NOTE:
The encoder function for the uniform quantizer is min(255, round((x + 1.0) * 128.0))
The No. of bits for the Mnemonic huffDecode is dynamic In the foregoing syntax table, the first switch statement with the four cases (case 0-3) provides for a way by which to determine the $V_{DIST}$ vector length in terms of the number of coefficients. The first case, case 0, indicates that all of the coefficients for the $V^T_{DIST}$ vectors are specified. The second case, case 1, indicates that only those coefficients of the $V^T_{DIST}$ vector corresponding to an order greater than a MinNumOfCoeffsForAmbHOA are specified, which may denote what is referred to as $(N_{DIST}+1)-(N_{BG}+1)$ above. The third case, case 2, is similar to the second case but further subtracts coefficients identified by NumOfAddAmbHoaChan, which denotes a variable for specifying additional channels (where "channels" refer to a particular coefficient corresponding to a certain order, sub-order combination) corresponding to an order that exceeds the order $N_{BG}$. The fourth case, case 3, indicates that only those coefficients of the $V^T_{DIST}$ vector left after removing coefficients identified by NumOfAddAmbHoaChan are specified.

After this switch statement, the decision of whether to perform unified dequantization is controlled by NbitsQ (or, as denoted above, nbits), which if not equal to 5, results in application of Huffman decoding. The cid value referred to above is equal to the two least significant bits of the NbitsQ value. The prediction mode discussed above is denoted as the PFlag in the above syntax table, while the HT info bit is denoted as the CbFlag in the above syntax table. The remaining syntax specifies how the decoding occurs in a manner substantially similar to that described above.

In this way, the techniques of this disclosure may enable the audio decoding device 540D to obtain a bitstream comprising a compressed version of a spatial component of a soundfield, the spatial component generated by performing a vector based synthesis with respect to a plurality of spherical harmonic coefficients, and decompress the compressed version of the spatial component to obtain the spatial component.

Moreover, the techniques may enable the audio decoding device 540D to decompress a compressed version of a spatial component of a soundfield, the spatial component generated by performing a vector based synthesis with respect to a plurality of spherical harmonic coefficients.

In this way, the audio encoding device 540D may perform various aspects of the techniques set forth below with respect to the following clauses.

Clause 141541-1B. A device comprising:

one or more processors configured to obtain a bitstream comprising a compressed version of a spatial component of a sound field, the spatial component generated by performing a vector based synthesis with respect to a plurality of spherical harmonic coefficients, and decompress the compressed version of the spatial component to obtain the spatial component.

Clause 141541-2B. The device of clause 141541-1B, wherein the compressed version of the spatial component is represented in the bitstream using, at least in part, a field specifying a prediction mode used when compressing the spatial component, and wherein the one or more processors are further configured to, when decompressing the compressed version of the spatial component, decompress the compressed version of the spatial component based, at least in part, on the prediction mode to obtain the spatial component.

Clause 141541-3B. The device of any combination of clause 141541-1B and clause 141541-2B, wherein the compressed version of the spatial component is represented in the bitstream using, at least in part, Huffman table information specifying a Huffman table used when compressing the spatial component, and wherein the one or more processors are further configured to, when decompressing the compressed version of the spatial component, decompress the compressed version of the spatial component based, at least in part, on the Huffman table information.

Clause 141541-4B. The device of any combination of clause 141541-1B through clause 141541-3B, wherein the compressed version of the spatial component is represented in the bitstream using, at least in part, a field indicating a value that expresses a quantization step size or a variable thereof used when compressing the spatial component, and wherein the one or more processors are further configured to, when decompressing the compressed version of the spatial component, decompress the compressed version of the spatial component based, at least in part, on the value.

Clause 141541-5B. The device of clause 141541-4B, wherein the value comprises an nbits value.

Clause 141541-6B. The device of any combination of clause 141541-4B and clause 141541-58B, wherein the bitstream comprises a compressed version of a plurality of spatial components of the sound field of which the compressed version of the spatial component is included, wherein the value expresses the quantization step size or a variable thereof used when compressing the plurality of spatial components and wherein the one or more processors are further configured to, when decompressing the compressed version of the spatial component, decompress the plurality of compressed version of the spatial component based, at least in part, on the value.

Clause 141541-7B. The device of any combination of clause 141541-18B through clause 141541-6B, wherein the compressed version of the spatial component is represented in the bitstream using, at least in part, a Huffman code to represent a category identifier that identifies a compression category to which the spatial component corresponds, and wherein the one or more processors are further configured to, when decompressing the compressed version of the spatial component, decompress the compressed version of the spatial component based, at least in part, on the Huffman code.

Clause 141541-8B. The device of any combination of clause 141541-1B through clause 141541-7B, wherein the compressed version of the spatial component is represented in the bitstream using, at least in part, a sign bit identifying whether the spatial component is a positive value or a negative value, and wherein the one or more processors are further configured to, when decompressing the compressed version of the spatial component, decompress the compressed version of the spatial component based, at least in part, on the sign bit.

Clause 141541-9B. The device of any combination of clause 141541-1B through clause 141541-8B, wherein the compressed version of the spatial component is represented in the bitstream using, at least in part, a Huffman code to represent a residual value of the spatial component, and wherein the one or more processors are further configured to, when decompressing the compressed version of the spatial component, decompress the compressed version of the spatial component based, at least in part, on the Huffman code.

Clause 141541-10B. The device of any combination of clause 141541-1B through clause 141541-10B, wherein the vector based synthesis comprises a singular value decomposition.

Furthermore, the audio decoding device 540D may be configured to perform various aspects of the techniques set forth below with respect to the following clauses.

Clause 141541-1C. A device, such as the audio decoding device 540D, comprising: one or more processors configured to decompress a compressed version of a spatial component of a sound field, the spatial component generated by performing a vector based synthesis with respect to a plurality of spherical harmonic coefficients.

Clause 141541-2C. The device of any combination of clause 141541-1C and clause 141541-2C, wherein the one or more processors are further configured to, when decompressing the compressed version of the spatial component, obtain a category identifier identifying a category to which the spatial component was categorized when compressed, obtain a sign identifying whether the spatial component is a positive or a negative value, obtain a residual value associated with the compressed version of the spatial component, and decompress the compressed version of the spatial component based on the category identifier, the sign and the residual value.

Clause 141541-3C. The device of clause 141541-2C, wherein the one or more processors are further configured to, when obtaining the category identifier, obtain a Huffman code representative of the category identifier, and decode the Huffman code to obtain the category identifier.

Clause 141541-4C. The device of clause 141541-3C, wherein the one or more processors are further configured to, when decoding the Huffman code, identify a Huffman table used to decode the Huffman code based on, at least in part, a relative position of the spatial component in a vector specifying a plurality of spatial components.

Clause 141541-5C. The device of any combination of clause 141541-3C and clause 141541-4C, wherein the one or more processors are further configured to, when decoding the Huffman code, identify a Huffman table used to decode the Huffman code based on, at least in part, a prediction mode used when compressing the spatial component.

Clause 141541-6C. The device of any combination of clause 141541-3C through clause 141541-5C, wherein the one or more processors are further configured to, when decoding the Huffman code, identify a Huffman table used to decode the Huffman code based on, at least in part, Huffman table information associated with the compressed version of the spatial component.

Clause 141541-7C. The device of clause 141541-3C, wherein the one or more processors are further configured to, when decoding the Huffman code, identify a Huffman table used to decode the Huffman code based on, at least in part, a relative position of the spatial component in a vector specifying a plurality of spatial components, a prediction mode used when compressing the spatial component, and Huffman table information associated with the compressed version of the spatial component.

Clause 141541-8C. The device of clause 141541-2C, wherein the one or more processors are further configured to, when obtaining the residual value, decode a block code representative of the residual value to obtain the residual value.

Clause 141541-9C. The device of any combination of clause 141541-1C through clause 141541-8C, wherein the vector based synthesis comprises a singular value decomposition.

Furthermore, the audio decoding device 540D may be configured to perform various aspects of the techniques set forth below with respect to the following clauses.

Clause 141541-1G. A device, such as the audio decoding device 540D comprising: one or more processors configured to identify a Huffman codebook to use when decompressing a compressed version of a current spatial component of a plurality of compressed spatial components based on an order of the compressed version of the current spatial component relative to remaining ones of the plurality of compressed spatial components, the spatial component generated by performing a vector based synthesis with respect to a plurality of spherical harmonic coefficients.

Clause 141541-2G. The device of clause 141541-1G wherein the one or more processors are further configured to perform any combination of the steps recited in the clause 141541-1D through clause 141541-10D, and clause 141541-1E through clause 141541-9E.

Figure 42A:
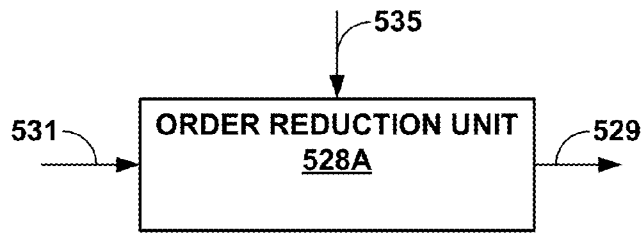
FIGS. 42A-42C are each block diagrams illustrating the order reduction unit shown in the examples of FIGS. 40B-40J in more detail.
Figure 42B:
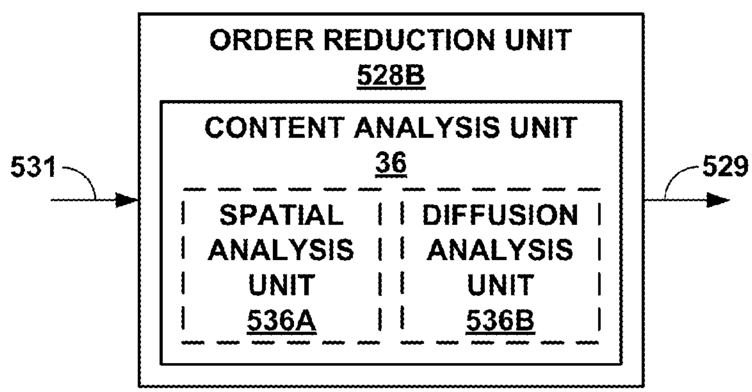
Figure 42C:
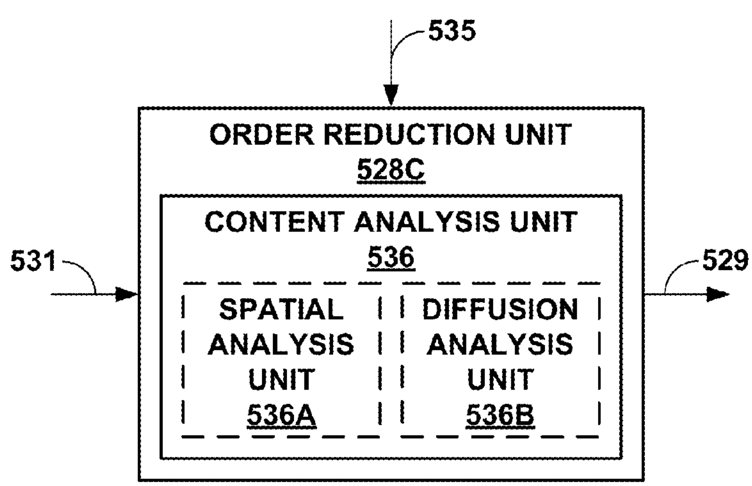

FIGS. 42-42C are each block diagrams illustrating the order reduction unit 528A shown in the examples of FIGS. 40B-40J in more detail. FIG. 42 is a block diagram illustrating an order reduction unit 528, which may represent one example of the order reduction unit 528A of FIGS. 40B-40J. The order reduction unit 528A may receive or otherwise determine a target bitrate 535 and perform order reduction with respect to the background spherical harmonic coefficients 531 based only on this target bitrate 535. In some examples, the order reduction unit 528A may access a table or other data structure using the target bitrate 535 to identify those orders and/or suborders that are to be removed from the background spherical harmonic coefficients 531 to generate reduced background spherical harmonic coefficients 529.

In this way, the techniques may enable an audio encoding device, such as audio encoding devices 510B-410J, to perform, based on a target bitrate 535, order reduction with respect to a plurality of spherical harmonic coefficients or decompositions thereof, such as background spherical harmonic coefficients 531, to generate reduced spherical harmonic coefficients 529 or the reduced decompositions thereof, wherein the plurality of spherical harmonic coefficients represent a soundfield.

In each of the various instances described above, it should be understood that the audio decoding device 540 may perform a method or otherwise comprise means to perform each step of the method for which the audio decoding device 540 is configured to perform In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 540 has been configured to perform.

FIG. 42B is a block diagram illustrating an order reduction unit 528B, which may represent one example of the order reduction unit 528A of FIGS. 40B-40J. In the example of FIG. 42B, rather than perform order reduction based only on a target bitrate 535, the order reduction unit 528B may perform order reduction based on a content analysis of the background spherical harmonic coefficients 531. The order reduction unit 528B may include a content analysis unit 536A that performs this content analysis.

In some examples, the content analysis unit 536A may include a spatial analysis unit 536A that performs a form of content analysis referred to spatial analysis. Spatial analysis may involve analyzing the background spherical harmonic coefficients 531 to identify spatial information describing the shape or other spatial properties of the background components of the soundfield. Based on this spatial information, the order reduction unit 528B may identify those orders and/or suborders that are to be removed from the background spherical harmonic coefficients 531 to generate reduced background spherical harmonic coefficients 529.

In some examples, the content analysis unit 536A may include a diffusion analysis unit 536B that performs a form of content analysis referred to diffusion analysis. Diffusion analysis may involve analyzing the background spherical harmonic coefficients 531 to identify diffusion information describing the diffusivity of the background components of the soundfield. Based on this diffusion information, the order reduction unit 528B may identify those orders and/or suborders that are to be removed from the background spherical harmonic coefficients 531 to generate reduced background spherical harmonic coefficients 529.

While shown as including both the spatial analysis unit 536A and the diffusion analysis unit 36B, the content analysis unit 536A may include only the spatial analysis unit 536, only the diffusion analysis unit 536B or both the spatial analysis unit 536A and the diffusion analysis unit 536B. In some examples, the content analysis unit 536A may perform other forms of content analysis in addition to or as an alternative to one or both of the spatial analysis and the diffusion analysis. Accordingly, the techniques described in this disclosure should not be limited in this respect.

In this way, the techniques may enable an audio encoding device, such as audio encoding devices 510B-510J, to perform, based on a content analysis of a plurality of spherical harmonic coefficients or decompositions thereof that describe a soundfield, order reduction with respect to the plurality of spherical harmonic coefficients or the decompositions thereof to generate reduced spherical harmonic coefficients or reduced decompositions thereof.

In other words, the techniques may enable a device, such as the audio encoding devices 510B-510J, to be configured in accordance with the following clauses.

Clause 133146-1E. A device, such as any of the audio encoding devices 510B-510J, comprising one or more processors configured to perform, based on a content analysis of a plurality of spherical harmonic coefficients or decompositions thereof that describe a sound field, order reduction with respect to the plurality of spherical harmonic coefficients or the decompositions thereof to generate reduced spherical harmonic coefficients or reduced decompositions thereof.

Clause 133146-2E. The device of clause 133146-1E, wherein the one or more processors are further configured to, prior to performing the order reduction, perform a singular value decomposition with respect to the plurality of spherical harmonic coefficients to identify one or more first vectors that describe distinct components of the sound field and one or more second vectors that identify background components of the sound field, and wherein the one or more processors are configured to perform the order reduction with respect to the one or more first vectors, the one or more second vectors or both the one or more first vectors and the one or more second vectors.

Clause 133146-3E. The device of clause 133146-1E, wherein the one or more processors are further configured to perform the content analysis with respect to the plurality of spherical harmonic coefficients or the decompositions thereof.

Clause 133146-4E. The device of clause 133146-3E, wherein the one or more processors are configured to perform a spatial analysis with respect to the plurality of spherical harmonic coefficients or the decompositions thereof.

Clause 133146-5E. The device of clause 133146-3E, wherein performing the content analysis comprises performing a diffusion analysis with respect to the plurality of spherical harmonic coefficients or the decompositions thereof.

Clause 133146-6E. The device of clause 133146-3E, wherein the one or more processors are configured to perform a spatial analysis and a diffusion analysis with respect to the plurality of spherical harmonic coefficients or the decompositions thereof.

Clause 133146-7E. The device of claim 1, wherein the one or more processors are configured to perform, based on the content analysis of the plurality of spherical harmonic coefficients or the decompositions thereof and a target bitrate, the order reduction with respect to the plurality of spherical harmonic coefficients or the decompositions thereof to generate the reduced spherical harmonic coefficients or the reduced decompositions thereof.

Clause 133146-8E. The device of clause 133146-1E, wherein the one or more processors are further configured to audio encode the reduced spherical harmonic coefficients or decompositions thereof.

Clause 133146-9E. The device of clause 133146-1E, wherein the one or more processors are further configured to audio encode the reduced spherical harmonic coefficients or the reduced decompositions thereof, and generate a bitstream to include the reduced spherical harmonic coefficients or the reduced decompositions thereof.

Clause 133146-10E. The device of clause 133146-1E, wherein the one or more processors are further configured to specify one or more orders and/or one or more sub-orders of spherical basis functions to which those of the reduced spherical harmonic coefficients or the reduced decompositions thereof correspond in a bitstream that includes the reduced spherical harmonic coefficients or the reduced decompositions thereof.

Clause 133146-11E. The device of clause 133146-1E, wherein the reduced spherical harmonic coefficients or the reduced decompositions thereof have less values than the plurality of spherical harmonic coefficients or the decompositions thereof.

Clause 133146-12E. The device of clause 133146-1E, wherein the one or more processors are further configured to remove those of the plurality of spherical harmonic coefficients or vectors of the decompositions thereof having a specified order and/or sub-order to generate the reduced spherical harmonic coefficients or the reduced decompositions thereof.

Clause 133146-13E. The device of clause 133146-1E, wherein the one or more processors are configured to zero out those of the plurality of spherical harmonic coefficients or those vectors of the decomposition thereof having a specified order and/or sub-order to generate the reduced spherical harmonic coefficients or the reduced decompositions thereof.

FIG. 42C is a block diagram illustrating an order reduction unit 528C, which may represent one example of the order reduction unit 528A of FIGS. 40B-40J. The order reduction unit 528C of FIG. 42B is substantially the same as order reduction unit 528B but may receive or otherwise determine a target bitrate 535 in the manner described above with respect to the order reduction unit 528A of FIG. 42, while also performing the content analysis in the manner described above with respect to the order reduction unit 528B of FIG. 42B. The order reduction unit 528C may then perform order reduction with respect to the background spherical harmonic coefficients 531 based on this target bitrate 535 and the content analysis.

In this way, the techniques may enable an audio encoding device, such as audio encoding devices 510B-510J, to perform a content analysis with respect to the plurality of spherical harmonic coefficients or the decompositions thereof. When performing the order reduction, the audio encoding devices 510B-510J may perform, based on the target bitrate 535 and the content analysis, the order reduction with respect to the plurality of spherical harmonic coefficients or the decompositions thereof to generate the reduced spherical harmonic coefficients or the reduced decompositions thereof.

Given that one or more vectors are removed, the audio encoding devices 510B-510J may specify the number of vectors in the bitstream as control data. The audio encoding devices 510B-510J may specify this number of vectors in the bitstream to facilitate extraction of the vectors from the bitstream by the audio decoding device.

Figure 44:
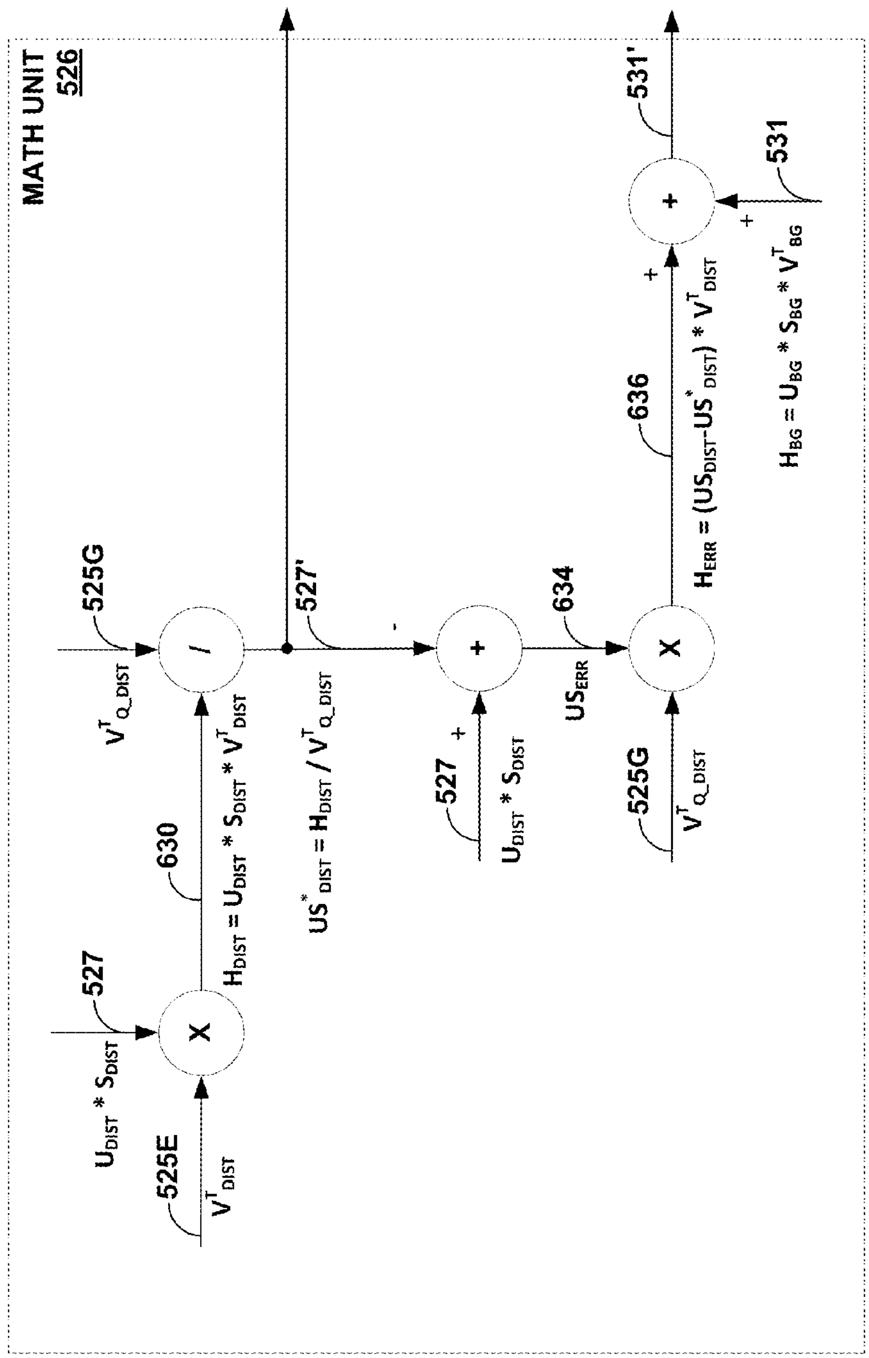
FIG. 44 is a diagram illustration exemplary operations performed by the audio encoding device to compensate for quantization error in accordance with various aspects of the techniques described in this disclosure.

FIG. 44 is a diagram illustration exemplary operations performed by the audio encoding device 410D to compensate for quantization error in accordance with various aspects of the techniques described in this disclosure. In the example of FIG. 44, the math unit 526 of the audio encoding device 510D is shown as a dashed block to denote that the mathematical operations may be performed by the math unit 526 of the audio decoding device 510D.

As shown in the example of FIG. 44, the math unit 526 may first multiply the $U_{DIST}*S_{DIST}$ vectors 527 by the $V^T_{DIST}$ vectors 525E to generate distinct spherical harmonic coefficients (denoted as "$H_{DIST}$ vectors 630"). The math unit 526 may then divide the $H_{DIST}$ vectors 630 by the quantized version of the $V^T_{DIST}$ vectors 525E (which are denoted, again, as "$V^T_{Q\_DIST}$ vectors 525G"). The math unit 526 may perform this division by determining a pseudo inverse of the $V^T_{Q\_DIST}$ vectors 525G and then multiplying the $H_{DIST}$ vectors by the pseudo inverse of the $V^T_{Q\_DIST}$ vectors 525G, outputting an error compensated version of $U_{DIST}*S_{DIST}$ (which may be abbreviated as "$US_{DIST}$" or "$US_{DIST}$ vectors"). The error compensated version of $US_{DIST}$ may be denoted as $US*_{DIST}$ vectors 527' in the example of FIG. 44. In this way, the techniques may effectively project the quantization error, at least in part, to the $US_{DIST}$ vectors 527, generating the $US*_{DIST}$ vectors 527'.

The math unit 526 may then subtract the $US*_{DIST}$ vectors 527' from the $U_{DIST}*S_{DIST}$ vectors 527 to determine $US_{ERR}$ vectors 634 (which may represent at least a portion of the error due to quantization projected into the $U_{DIST}*S_{DIST}$ vectors 527). The math unit 526 may then multiply the $US_{ERR}$ vectors 634 by the $V^T_{Q\_DIST}$ vectors 525G to determine $H_{ERR}$ vectors 636. Mathematically, the $H_{ERR}$ vectors 636 may be equivalent to $US_{DIST}$ vectors 527-$US*_{DIST}$ vectors 527', the result of which is then multiplied by $V^T_{DIST}$ vectors 525E. The math unit 526 may then add the $H_{ERR}$ vectors 636 to the background spherical harmonic coefficients 531 (denoted as $H_B$; vectors 531 in the example of FIG. 44) computed by multiplying the $U_{BG}$ vectors 525D by the $S_{BG}$ vectors 525B and then by the $V^T_{BG}$ vectors 525F.

The math unit 526 may add the $H_{ERR}$ vectors 636 to the $H_{BG}$ vectors 531, effectively projecting at least a portion of the quantization error into the $H_{BG}$ vectors 531 to generate compensated $H_B$; vectors 531'. In this manner, the techniques may project at least a portion of the quantization error into the $H_{BG}$ vectors 531.

Figure 45A:
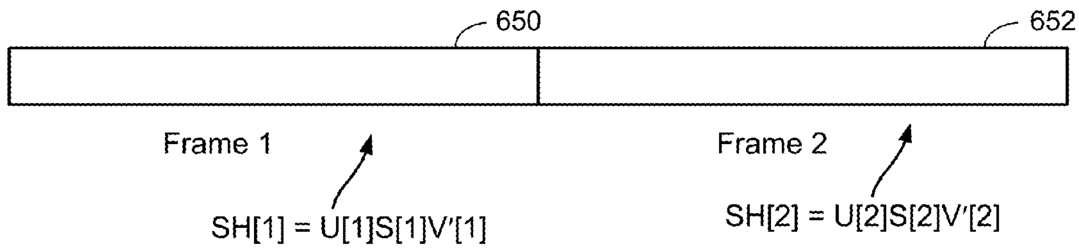
FIGS. 45A and 45B are diagrams illustrating interpolation of sub-frames from portions of two frames in accordance with various aspects of the techniques described in this disclosure.
Figure 45B:
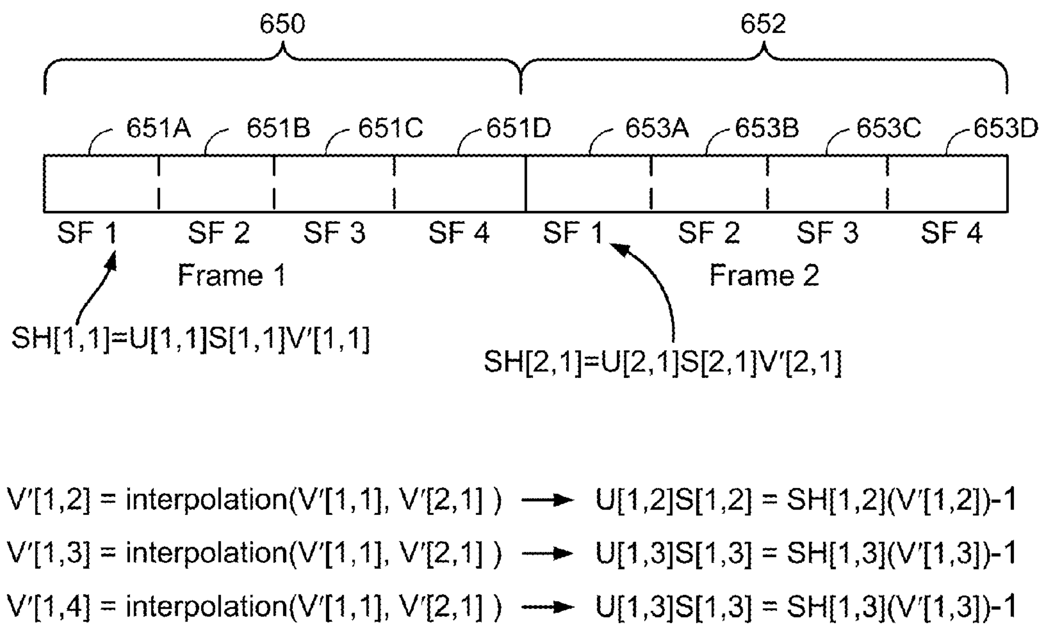

FIGS. 45 and 45B are diagrams illustrating interpolation of sub-frames from portions of two frames in accordance with various aspects of the techniques described in this disclosure. In the example of FIG. 45, a first frame 650 and a second frame 652 are shown. The first frame 650 may include spherical harmonic coefficients ("SH[1]") that may be decomposed into U[1]. S[1] and V[1] matrices. The second frame 652 may include spherical harmonic coefficients ("SH[2]"). These SH[1] and SH[2] may identify different frames of the SHC 511 described above.

In the example of FIG. 45B, the decomposition unit 518 of the audio encoding device 510H shown in the example of FIG. 40H may separate each of frames 650 and 652 into four respective sub-frames 651A-651D and 653A-653D. The decomposition unit 518 may then decompose the first sub-frame 651A (denoted as "SH[1,1]") of the frame 650 into a U[1, 1], S[1, 1] and V[1, 1] matrices, outputting the V[1, 1] matrix 519' to the interpolation unit 550. The decomposition unit 518 may then decompose the second sub-frame 653A (denoted as "SH[2,1]") of the frame 652 into a U[1, 1], S[1, 1] and V[1, 1] matrices, outputting the V[2, 1] matrix 519' to the interpolation unit 550. The decomposition unit 518 may also output SH[1, 1], SH[1, 2], SH[1, 3] and SH[1, 4] of the SHC 11 and SH[2, 1], SH[2, 2], SH[2, 3] and SH[2, 4] of the SHC 511 to the interpolation unit 550.

The interpolation unit 550 may then perform the interpolations identified at the bottom of the illustration shown in the example of FIG. 45B. That is, the interpolation unit 550 may interpolate V[1, 2] based on V[1, 1] and V[2, 1]. The interpolation unit 550 may also interpolate V[1, 3] based on V[1, 1] and V[2, 1]. Further, the interpolation unit 550 may also interpolate V[1, 4] based on V[1, 1] and V[2, 1]. These interpolations may involve a projection of the V[1, 1] and the V[2, 1] into the spatial domain, as shown in the example of FIGS. 46-46E, followed by a temporal interpolation and then a projection back into the spherical harmonic domain.

The interpolation unit 550 may next derive U[1, 2]S[1, 2] by multiplying SH[1, 2] by $(V[1, 2])^{-1}$, U[1, 3]S[1, 3] by multiplying SH[1, 3] by $(V[1, 3])^{-1}$, and U[1, 4]S[1, 4] by multiplying SH[1, 4] by $(V[1, 4])^{-1}$. The interpolation unit 550 may then reform the frame in decomposed form outputting the V matrix 519, the S matrix 519B and the U matrix 519C.

Figure 46A:
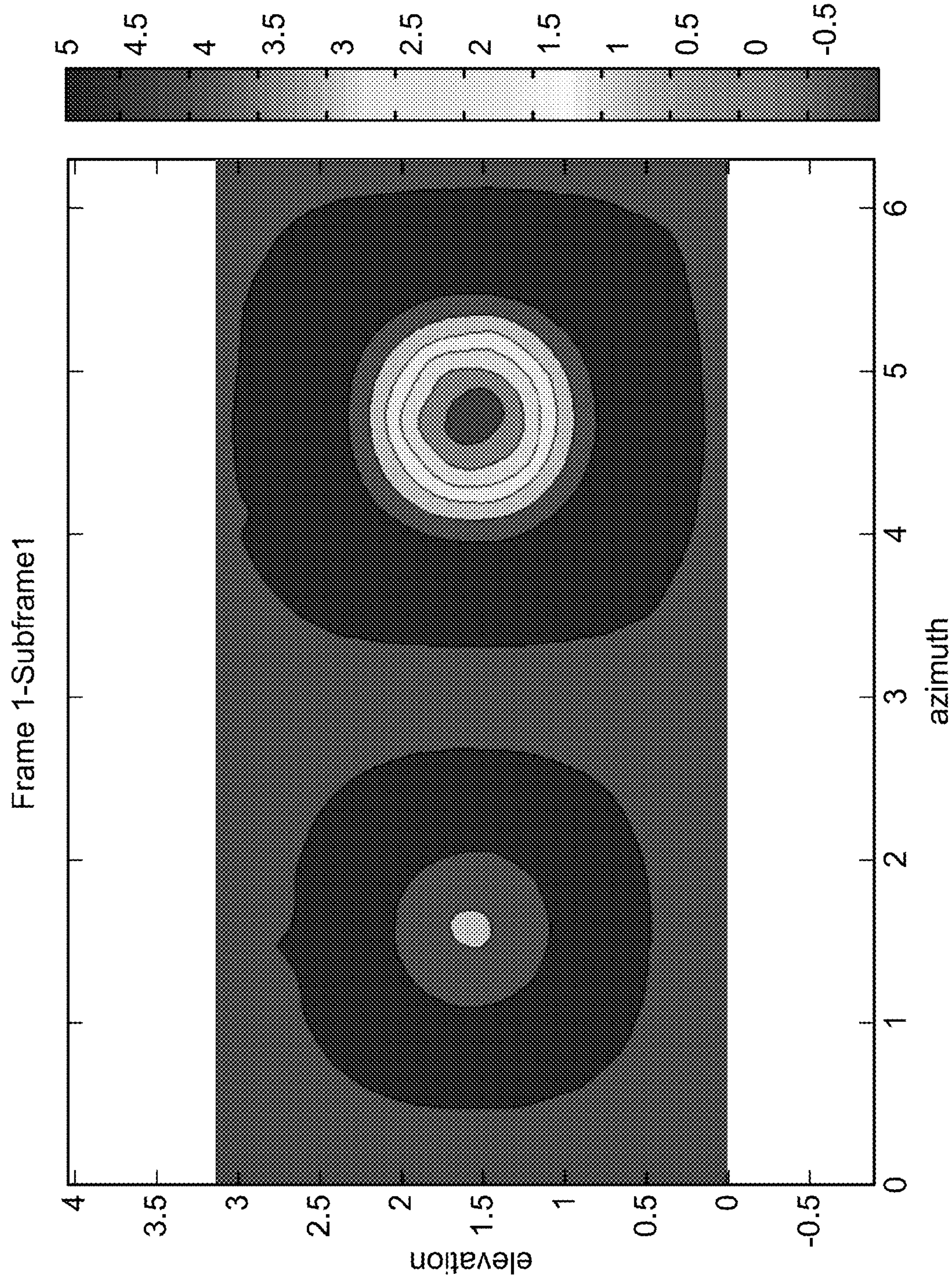
FIGS. 46A-46E are diagrams illustrating a cross section of a projection of one or more vectors of a decomposed version of a plurality of spherical harmonic coefficients having been interpolated in accordance with the techniques described in this disclosure.
Figure 46B:
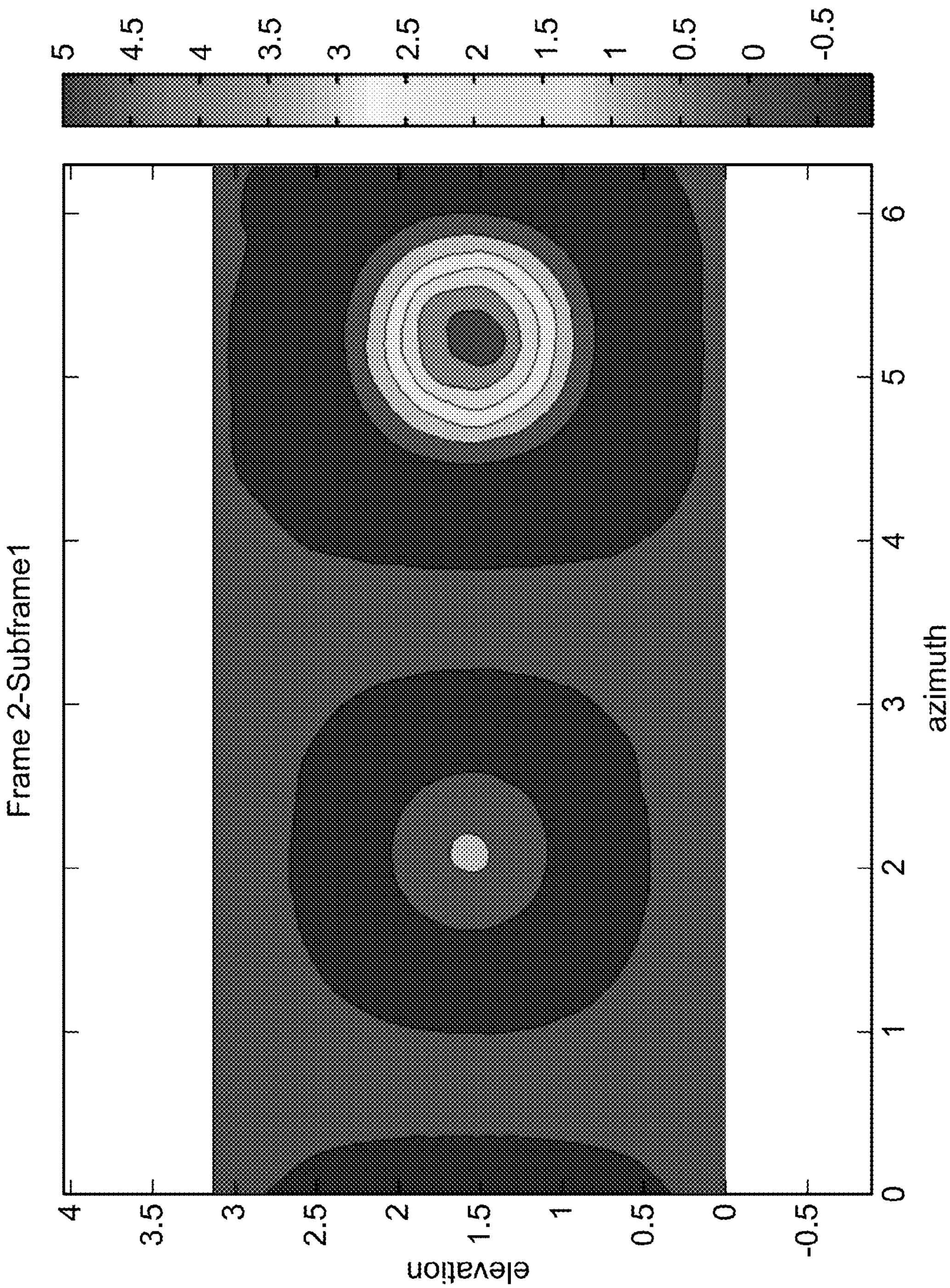
Figure 46C:
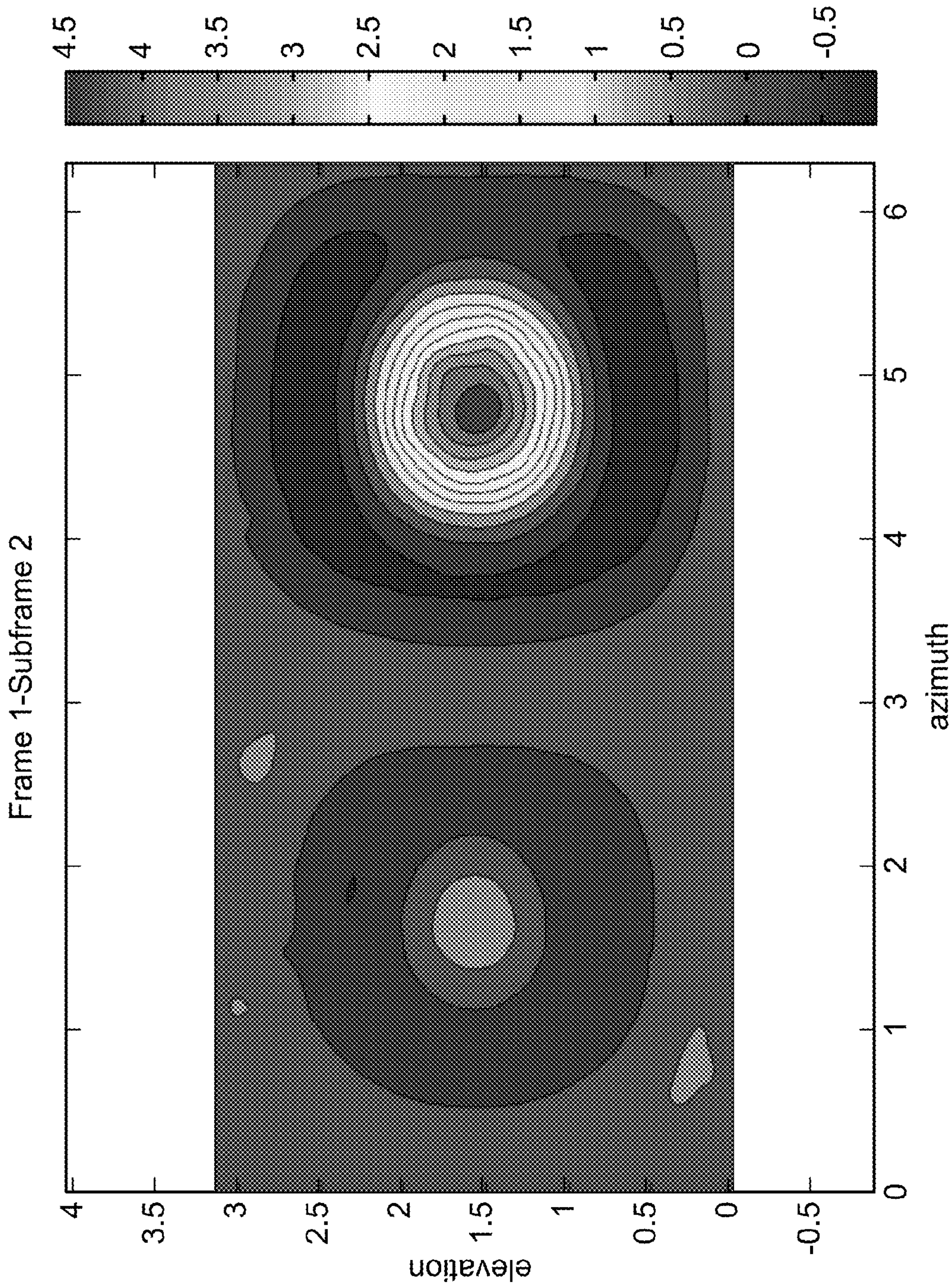
Figure 46D:
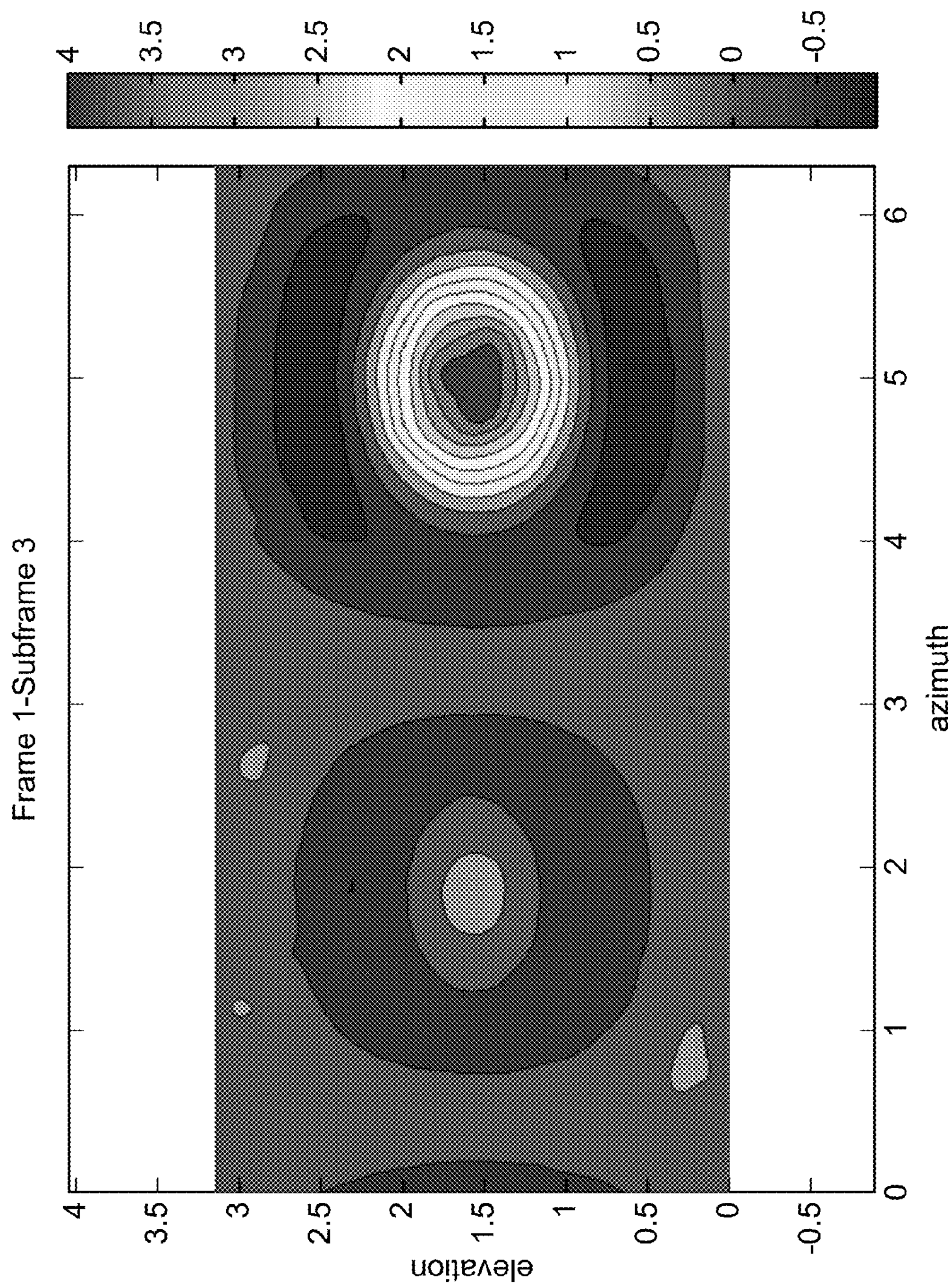
Figure 46E:
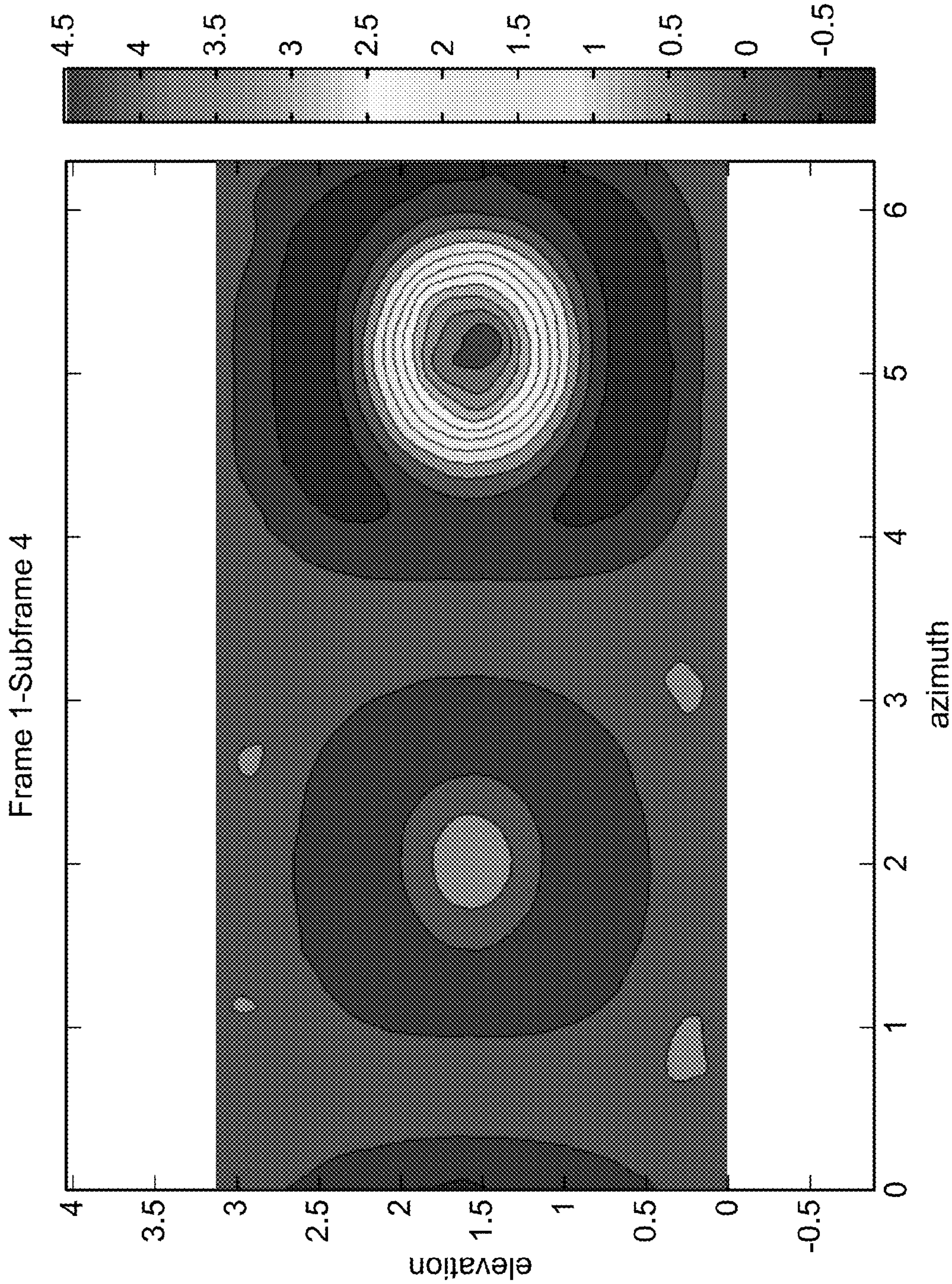

FIGS. 46A-46E are diagrams illustrating a cross section of a projection of one or more vectors of a decomposed version of a plurality of spherical harmonic coefficients having been interpolated in accordance with the techniques described in this disclosure. FIG. 46A illustrates a cross section of a projection of one or more first vectors of a first V matrix 19' having been decomposed from SHC 511 of a first sub-frame from a first frame through an SVD process. FIG. 46B illustrates a cross section of a projection of one or more second vectors of a second V matrix 519' having been decomposed from SHC 511 of a first sub-frame from a second frame through an SVD process.

FIG. 46C illustrates a cross section of a projection of one or more interpolated vectors for a V matrix 519A representative of a second sub-frame from the first frame, these vectors having been interpolated in accordance with the techniques described in this disclosure from the V matrix 519' decomposed from the first sub-frame of the first frame of the SHC 511 (i.e., the one or more vectors of the V matrix 519' shown in the example of FIG. 46 in this example) and the first sub-frame of the second frame of the SHC 511 (i.e., the one or more vectors of the V matrix 519' shown in the example of FIG. 46B in this example).

FIG. 46D illustrates a cross section of a projection of one or more interpolated vectors for a V matrix 519A representative of a third sub-frame from the first frame, these vectors having been interpolated in accordance with the techniques described in this disclosure from the V matrix 519' decomposed from the first sub-frame of the first frame of the SHC 511 (i.e., the one or more vectors of the V matrix 519' shown in the example of FIG. 46 in this example) and the first sub-frame of the second frame of the SHC 511 (i.e., the one or more vectors of the V matrix 519' shown in the example of FIG. 46B in this example).

FIG. 46E illustrates a cross section of a projection of one or more interpolated vectors for a V matrix 519A representative of a fourth sub-frame from the first frame, these vectors having been interpolated in accordance with the techniques described in this disclosure from the V matrix 519' decomposed from the first sub-frame of the first frame of the SHC 511 (i.e., the one or more vectors of the V matrix 519' shown in the example of FIG. 46 in this example) and the first sub-frame of the second frame of the SHC 511 (i.e., the one or more vectors of the V matrix 519' shown in the example of FIG. 46B in this example).

Figure 47:
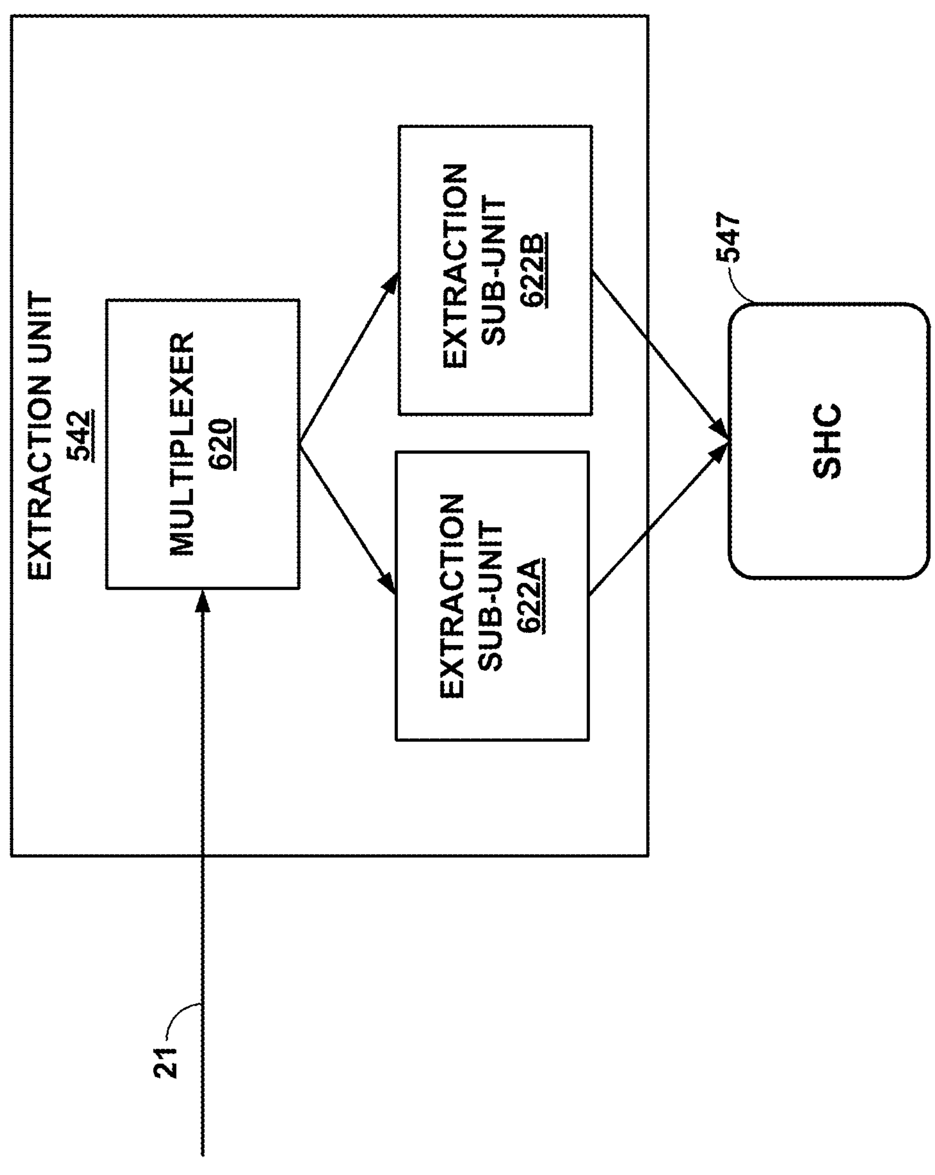
FIG. 47 is a block diagram illustrating, in more detail, the extraction unit of the audio decoding devices shown in the examples FIGS. 41A-41D.

FIG. 47 is a block diagram illustrating, in more detail, the extraction unit 542 of the audio decoding devices 540A-540D shown in the examples FIGS. 41-41D. In some examples, the extraction unit 542 may represent a front end to what may be referred to as "integrated decoder," which may perform two or more decoding schemes (where by performing these two or more schemes the decoder may be considered to "integrate" the two or more schemes). As shown in the example of FIG. 44, the extraction unit 542 includes a multiplexer 620 and extraction sub-units 622A and 622B ("extraction sub-units 622"). The multiplexer 620 identifies those of encoded framed SHC matrices 547-547N to be sent to the extraction sub-unit 622A and the extraction sub-unit 622B based on the corresponding indication of whether the associated encoded framed SHC matrices 547-547N are generated from a synthetic audio object or a recording. Each of the extraction sub-units 622A may perform a different decoding (which may be referred to as "decompression") scheme that is, in some examples, tailored either to SHC generated from a synthetic audio object or SHC generated from a recording. Each of extraction sub-units 622A may perform a respective one of these decompression schemes in order to generate frames of SHC 547, which are output to SHC 547.

For example, the extraction unit 622A may perform a decompression scheme to reconstruct the SA from a predominant signal (PS) using the following formula:

$$HOA=DirV\times PS,$$

where DirV is a directional-vector (representative of various directions and widths), which may be transmitted through a side channel. The extraction unit 622B may, in this example, perform a decompression scheme that reconstructs the HOA matrix from the PS using the following formula:

$$HOA=sqrt(4\pi)*Ynm(theta,phi)*PS,$$

where Ynm is the spherical harmonic function and theta and phi information may be sent through the side channel.

In this respect, the techniques enable the extraction unit 538 to select one of a plurality of decompression schemes based on the indication of whether an compressed version of spherical harmonic coefficients representative of a soundfield are generated from a synthetic audio object, and decompress the compressed version of the spherical harmonic coefficients using the selected one of the plurality of decompression schemes. In some examples, the device comprises an integrated decoder.

Figure 48:
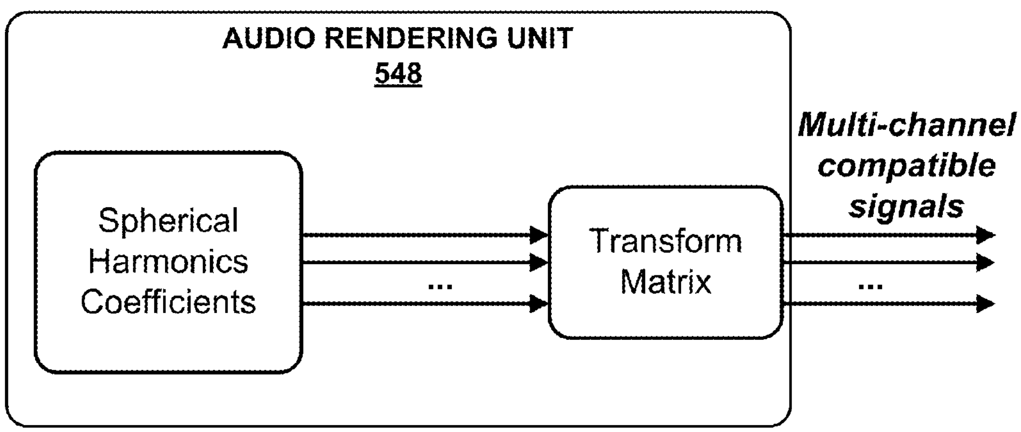
FIG. 48 is a block diagram illustrating the audio rendering unit of the audio decoding device shown in the examples of FIGS. 41A-41D in more detail.

FIG. 48 is a block diagram illustrating the audio rendering unit 48 of the audio decoding device 540A-540D shown in the examples of FIGS. 41A-41D in more detail. FIG. 48 illustrates a conversion from the recovered spherical harmonic coefficients 547 to the multi-channel audio data 549A that is compatible with a decoder-local speaker geometry. For some local speaker geometries (which, again, may refer to a speaker geometry at the decoder), some transforms that ensure invertibility may result in less-than-desirable audio-image quality. That is, the sound reproduction may not always result in a correct localization of sounds when compared to the audio being captured. In order to correct for this less-than-desirable image quality, the techniques may be further augmented to introduce a concept that may be referred to as "virtual speakers."

Rather than require that one or more loudspeakers be repositioned or positioned in particular or defined regions of space having certain angular tolerances specified by a standard, such as the above noted ITU-R BS.775-1, the above framework may be modified to include some form of panning, such as vector base amplitude panning (VBAP), distance based amplitude panning, or other forms of panning. Focusing on VBAP for purposes of illustration, VBAP may effectively introduce what may be characterized as "virtual speakers." VBAP may modify a feed to one or more loudspeakers so that these one or more loudspeakers effectively output sound that appears to originate from a virtual speaker at one or more of a location and angle different than at least one of the location and/or angle of the one or more loudspeakers that supports the virtual speaker.

To illustrate, the following equation for determining the loudspeaker feeds in terms of the SHC may be as follows:

$$\begin{bmatrix} A_0^0(\omega) \\ A_1^1(\omega) \\ A_1^{-1}(\omega) \\ \cdots \\ A_{(Order+1)(Order+1)}^{-(Order+1)(Order+1)}(\omega) \end{bmatrix} = -ik \begin{bmatrix} VBAP \\ MATRIX \\ M \times N \end{bmatrix} \left[ \begin{bmatrix} D \\ N \times (\text{Order}+1)^2 \end{bmatrix} \right] \begin{bmatrix} g_1(\omega) \\ g_2(\omega) \\ g_3(\omega) \\ \cdots \\ g_M(\omega) \end{bmatrix}.$$

In the above equation, the VBAP matrix is of size M rows by N columns, where M denotes the number of speakers (and would be equal to five in the equation above) and N denotes the number of virtual speakers. The VBAP matrix may be computed as a function of the vectors from the defined location of the listener to each of the positions of the speakers and the vectors from the defined location of the listener to each of the positions of the virtual speakers. The D matrix in the above equation may be of size N rows by $(\text{order}+1)^2$ columns, where the order may refer to the order of the SH functions. The D matrix may represent the following matrix:

$$\begin{bmatrix} h_0^{(2)}(kr_1)Y_0^{0*}(\theta_1, \varphi_1) & h_0^{(2)}(kr_2)Y_0^{0*}(\theta_2, \varphi_2) & \cdots & \cdots & \cdots \\ h_1^{(2)}(kr_1)Y_1^{1*}(\theta_1, \varphi_1). & \cdots & \cdots & \cdots & \cdots \\ \cdots & \cdots & \cdots & \cdots & \cdots \\ \cdots & \cdots & \cdots & \cdots & \cdots \\ \cdots & \cdots & \cdots & \cdots & \cdots \end{bmatrix}.$$

The g matrix (or vector, given that there is only a single column) may represent the gain for speaker feeds for the speakers arranged in the decoder-local geometry. In the equation, the g matrix is of size M. The A matrix (or vector, given that there is only a single column) may denote the SHC 520, and is of size (Order+1)(Order+1), which may also be denoted as $(\text{Order}+1)^2$.

In effect, the VBAP matrix is an M×N matrix providing what may be referred to as a "gain adjustment" that factors in the location of the speakers and the position of the virtual speakers. Introducing panning in this manner may result in better reproduction of the multi-channel audio that results in a better quality image when reproduced by the local speaker geometry. Moreover, by incorporating VBAP into this equation, the techniques may overcome poor speaker geometries that do not align with those specified in various standards.

In practice, the equation may be inverted and employed to transform the SHC back to the multi-channel feeds for a particular geometry or configuration of loudspeakers, which again may be referred to as the decoder-local geometry in this disclosure. That is, the equation may be inverted to solve for the g matrix. The inverted equation may be as follows:

$$\begin{bmatrix} g_1(\omega) \\ g_2(\omega) \\ g_3(\omega) \\ \cdots \\ g_M(\omega) \end{bmatrix} = -ik \begin{bmatrix} VBAP \\ MATRIX^{-1} \\ M \times N \end{bmatrix} \left[ \begin{bmatrix} D^{-1} \\ N \times (Order+1)^2 \end{bmatrix} \right] \begin{bmatrix} A_0^0(\omega) \\ A_1^1(\omega) \\ A_1^{-1}(\omega) \\ \cdots \\ A_{(Order+1)(Order+1)}^{-(Order+1)(Order+1)}(\omega) \end{bmatrix}.$$

The g matrix may represent speaker gain for, m this example, each of the five loudspeakers in a 5.1 speaker configuration. The virtual speakers locations used in this configuration may correspond to the locations defined in a 5.1 multichannel format specification or standard. The location of the loudspeakers that may support each of these virtual speakers may be determined using any number of known audio localization techniques, many of which involve playing a tone having a particular frequency to determine a location of each loudspeaker with respect to a headend unit (such as an audio/video receiver (A/V receiver), television, gaming system, digital video disc system, or other types of headend systems). Alternatively, a user of the headend unit may manually specify the location of each of the loudspeakers. In any event, given these known locations and possible angles, the headend unit may solve for the gains, assuming an ideal configuration of virtual loudspeakers by way of VBAP.

In this respect, a device or apparatus may perform a vector base amplitude panning or other form of panning on the plurality of virtual channels to produce a plurality of channels that drive speakers in a decoder-local geometry to emit sounds that appear to originate form virtual speakers configured in a different local geometry. The techniques may therefore enable the audio decoding device 40 to perform a transform on the plurality of spherical harmonic coefficients, such as the recovered spherical harmonic coefficients 47, to produce a plurality of channels. Each of the plurality of channels may be associated with a corresponding different region of space. Moreover, each of the plurality of channels may comprise a plurality of virtual channels, where the plurality of virtual channels may be associated with the corresponding different region of space. A device may, therefore, perform vector base amplitude panning on the virtual channels to produce the plurality of channel of the multi-channel audio data 49.

Figure 49A:
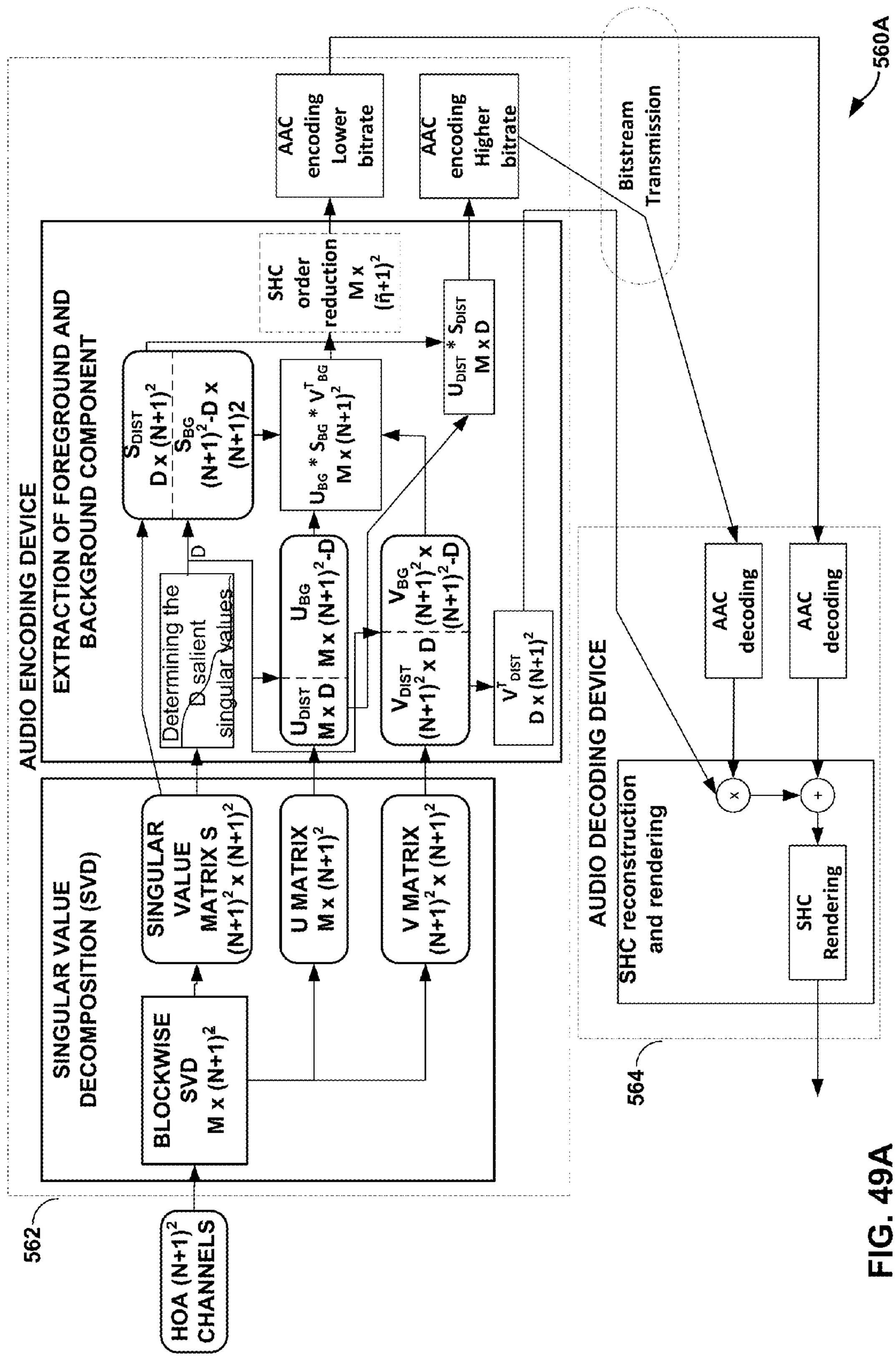
FIGS. 49A-49E(ii) are diagrams illustrating respective audio coding systems that may implement various aspects of the techniques described in this disclosure.

FIGS. 49A-49E(ii) are diagrams illustrating respective audio coding systems 560A-560C, 567D, 569D, 571E and 573E that may implement various aspects of the techniques described in this disclosure. As shown in the example of FIG. 49A, the audio coding system 560A may include an audio encoding device 562 and an audio decoding device 564. Audio encoding device 562 may be similar to any one of audio encoding devices 20 and 510A-510D shown in the example of FIGS. 4 and 40A-40D, respectively. Audio decoding device 564 may be similar to audio decoding device 24 and 40 shown in the example of FIGS. 5 and 41.

As described above, higher-order ambisonics (HOA) is a way by which to describe all directional information of a sound-field based on a spatial Fourier transform. In some examples, the higher the ambisonics order, N, the higher the spatial resolution and the larger the number of spherical harmonics (SH) coefficients $(N+1)^2$. Thus, the higher the ambisonics order N, in some examples, results in larger bandwidth requirements for transmitting and storing the coefficients. Because the bandwidth requirements of HOA are rather high in comparison, for example, to 5.1 or 7.1 surround sound audio data, a bandwidth reduction may be desired for many applications.

In accordance with the techniques described in this disclosure, the audio coding system 560A may perform a method based on separating the distinct (foreground) from the non-distinct (background or ambient) elements in a spatial sound scene. This separation may allow the audio coding system 560A to process foreground and background elements independently from each other. In this example, the audio coding system 560A exploits the property that foreground elements may draw more attention (by the listener) and may be easier to localize (again, by the listener) compared to background elements. As a result, the audio coding system 560A may store or transmit HOA content more efficiently.

In some examples, the audio coding system 560A may achieve this separation by employing the Singular Value Decomposition (SVD) process. The SVD process may separate a frame of HOA coefficients into 3 matrices (U, S, V). The matrix U contains the left-singular vectors and the V matrix contains the right-singular vectors. The Diagonal matrix S contains the non-negative, sorted singular values in its diagonal. A generally good (or, in some instances, perfect assuming unlimited precision in representing the HOA coefficients) reconstruction of the HOA coefficients would be given by U*S*V'. By only reconstructing the subspace with the D largest singular values: U(:,1:D)*S(:D,:)*V', the audio coding system 560A may extract the most salient spatial information from this HOA frame i.e., foreground sound elements (and maybe some strong early room reflections). The remainder U(:.D+1:end)*S(D+1:end,:)*V' may reconstructs background elements and reverberation from the content.

The audio coding system 560A may determine the value D, which separates the two subspaces, by analyzing the slope of the curve created by the descending diagonal values of S: the large singular values represent foreground sounds, low singular values represent background values. The audio coding system 560A may use a first and a second derivative of the singular value curve. The audio coding system 560A may also limit the number D to be between one and five. Alternatively, the audio coding system 560A may pre-define the number D, such as to a value of four. In any event, once the number D is estimated, the audio coding system 560A extracts the foreground and background subspace from the matrices U, and S.

The audio coding system 560A may then reconstruct the HOA coefficients of the background scene via U(:,D+1:end)*S(D+1:end,:)*V', resulting in $(N+1)^2$ channels of HOA coefficients. Since it is known that background elements are, in some examples, not as salient and not as localizable relative to the foreground elements, the audio coding system 560A may truncate the order of the HOA channels. Furthermore, the audio coding system 560A may compress these channels with lossy or lossless audio codecs, such as AAC, or optionally with a more aggressive audio codec compared to the one used to compress the salient foreground elements. In some instances, to save bandwidth, the audio coding system 560A may transmit the foreground elements differently. That is, the audio coding system may transmit the left-singular vectors U(:,1:D) after being compressed with lossy or lossless audio codecs (such as AAC) and transmit these compressed left-singular values together with the reconstruction matrix R=S(1:D,:)*V'. R may represent a $D\times(N+1)^2$ matrix, which may differ across frames.

At the receiver side of the audio coding system 560, the audio coding system may multiply these two matrices to reconstruct a frame of $(N+1)^2$ HOA channels. Once the background and foreground HOA channels are summed together, the audio coding system 560A may render to any loudspeaker setup using any appropriate Ambisonics renderer. Since the techniques provide for the separation of foreground elements (direct or distinct sound) from the background elements, a hearing impaired person could control the mix of foreground to background elements to increase the intelligibility. Also, other audio effects may be also applicable, e.g. a dynamic compressor on just the foreground elements.

Figure 49B:
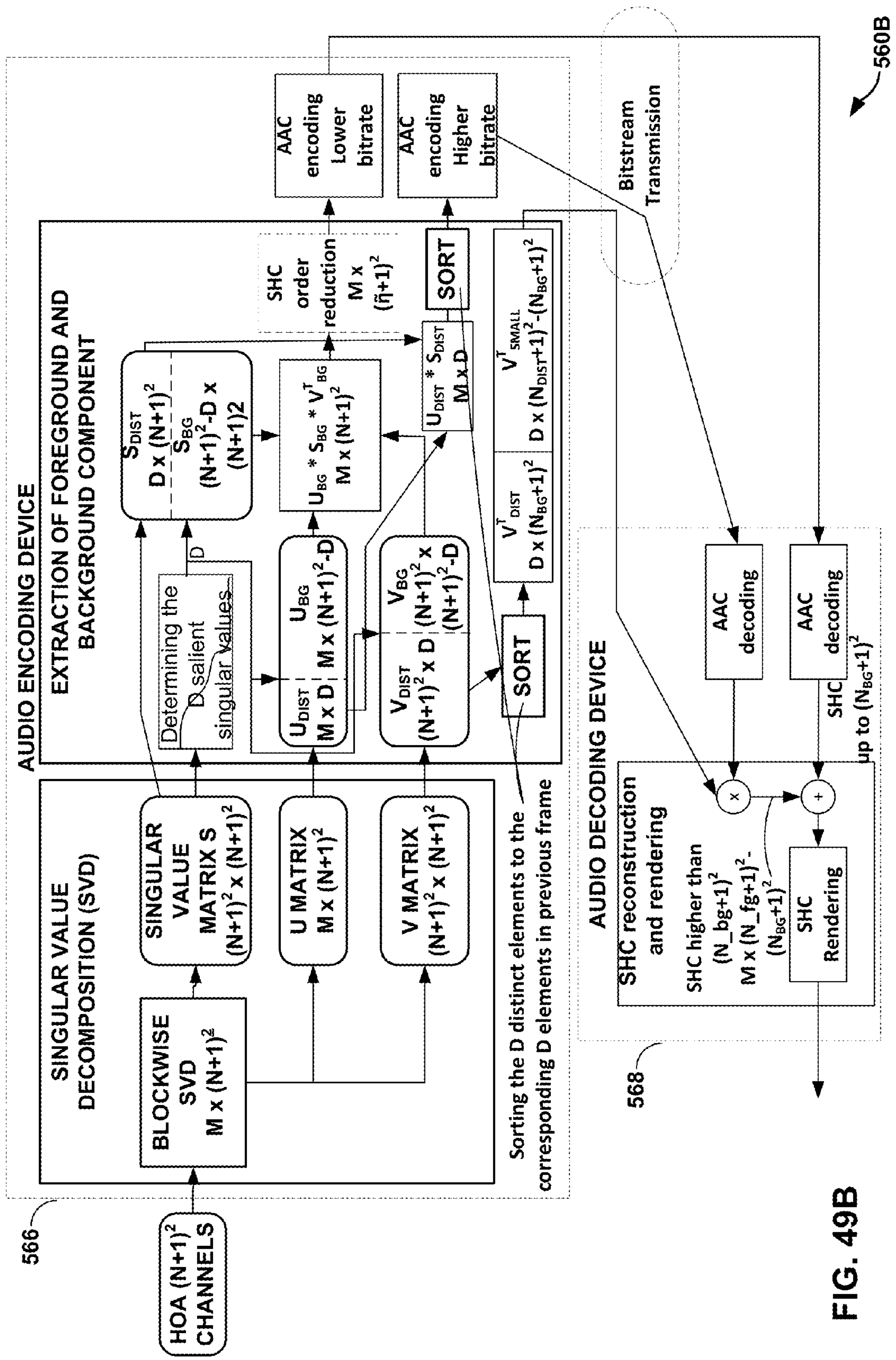

FIG. 49B is a block diagram illustrating the audio encoding system 560B in more detail. As shown in the example of FIG. 49B, the audio coding system 560B may include an audio encoding device 566 and an audio decoding device 568. The audio encoding device 566 may be similar to the audio encoding devices 24 and 510E shown in the example of FIGS. 4 and 40E. The audio decoding device 568 may be similar to audio decoding device 24 and 540B shown in the example of FIGS. 5 and 41B.

In accordance with the techniques described in this disclosure, when using frame based SVD (or related methods such as KLT & PCA) decomposition on HoA signals, for the purpose of bandwidth reduction, the audio encoding device 66 may quantize the first few vectors of the U matrix (multiplied by the corresponding singular values of the S matrix) as well as the corresponding vectors of the $V^T$ vector. This will comprise the [foreground] components of the soundfield. The techniques may enable the audio encoding device 566 to code the $U_{DIST}*S_{DIST}$ vector using a [black-box] audio-coding engine. The V vector may either be scalar or vector quantized. In addition, some or all of the remaining vectors in the U matrix may be multiplied with the corresponding singular values of the S matrix and V matrix and also coded using a [black-box] audio-coding engine. These will comprise the [background] components of the soundfield.

Since the loudest auditory components are decomposed into the [foreground components], the audio encoding device 566 may reduce the Ambisonics order of the [background] components prior the using a [black-box] audio-coding engine, because (we assume) that the background don't contain important localizable content. Depending on the ambisonics order of the foreground components, the audio encoding unit 566 may transmit the corresponding V-vector(s), which may be rather large. For example, a simple 16 bit scalar quantization of the V vectors will result in approximately 20 kbps overhead for 4th order (25 coefficients) and 40 kbps for 6th order (49 coefficients) per foreground component. The techniques described in this disclosure may provide a method to reduce this overhead of the V-Vector.

To illustrate, assume the ambisonics order of the foreground elements is $N_{DIST}$ and the ambisonics order of the background elements Ne, as described above. Since the audio encoding device 566 may reduce the Ambisonics order of the background elements as described above, $N_{BG}$ may be less than $N_{DIST}$. The length of the foreground V-vector that needs to be transmitted to reconstruct the foreground elements at the receiver side, has the length of $(N_{DIST}+1)^2$ per foreground element, whereas the first $((N_{DIST}+1)^2)-((N_{BG}+1)^2)$ coefficients may be used to reconstruct the foreground or distinct components up to the order $N_{BG}$. Using the techniques described in this disclosure, the audio encoding device 566 may reconstruct the foreground up to the order $N_{BG}$ and merge the resulting $(N_{BG}+1)^2$ channels with the background channels, resulting in a complete sound-field up to the order $N_{BG}$. The audio encoding device 566 may then reduce the V-vector to those coefficients with the index higher than $(N_{BG}+1)^2$ for transmission, (where these vectors may be referred to as "$V^T_{SMALL}$"). At the receiver side, the audio decoding unit 568 may reconstruct the foreground audio-channels for the ambisonics order larger than $N_{BG}$ by multiplying the foreground elements by the $V^T_{SMALL}$ Vectors.

Figure 49C:
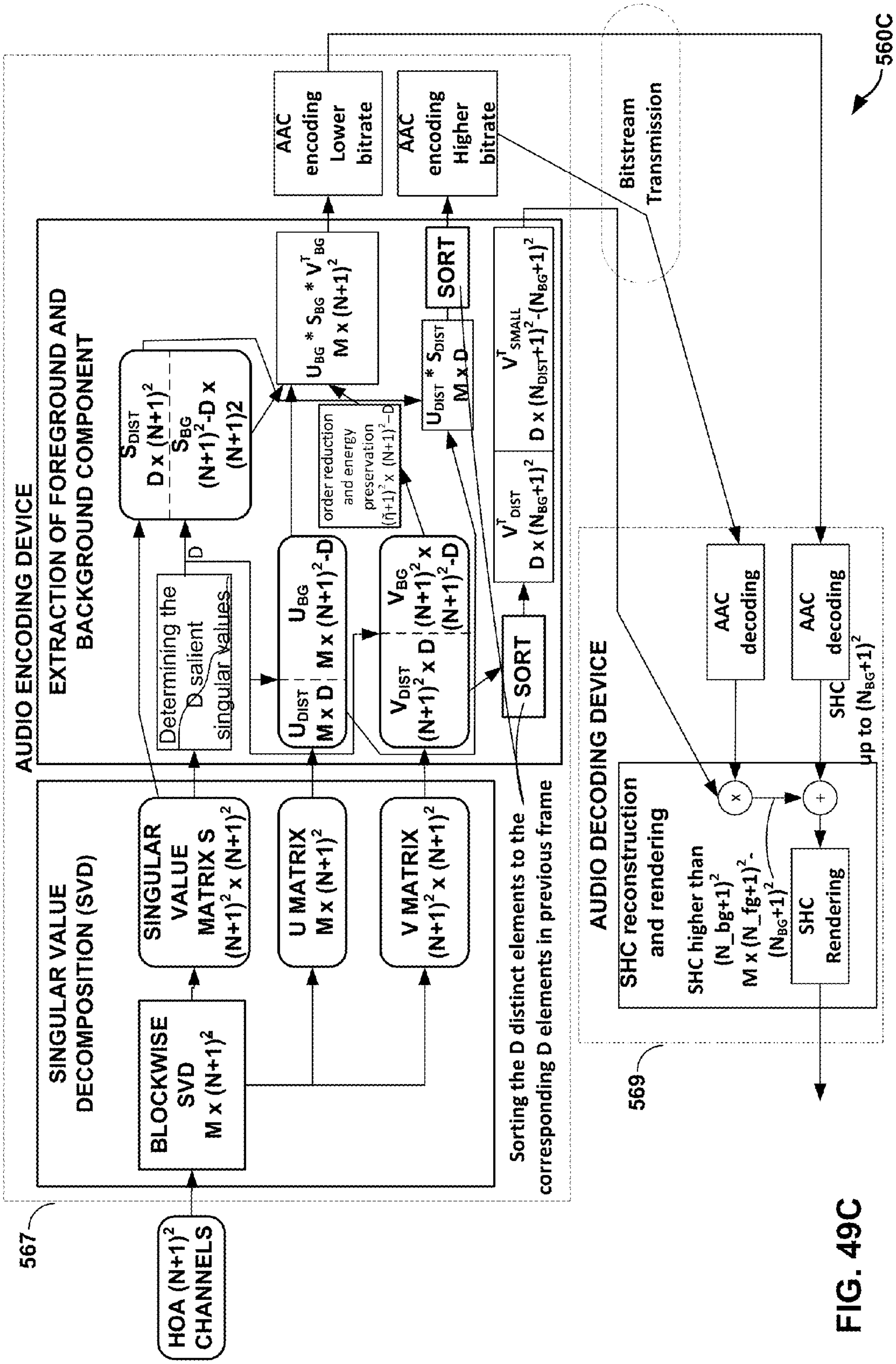

FIG. 49C is a block diagram illustrating the audio encoding system 560C in more detail. As shown in the example of FIG. 49C, the audio coding system 560B may include an audio encoding device 567 and an audio decoding device 569. Audio encoding device 567 may be similar to the audio encoding devices 20 and 510F shown in the example of FIGS. 4 and 40F. The audio decoding device 569 may be similar to the audio decoding devices 24 and 540B shown in the example of FIGS. 5 and 41B.

In accordance with the techniques described in this disclosure, when using frame based SVD (or related methods such as KLT & PCA) decomposition on HoA signals, for the purpose of bandwidth reduction, the audio encoding device 567 may quantize the first few vectors of the U matrix (multiplied by the corresponding singular values of the S matrix) as well as the corresponding vectors of the $V^T$ vector. This will comprise the [foreground] components of the soundfield. The techniques may enable the audio encoding device 567 to code the $U_{DIST}*S_{DIST}$ vector using a [black-box] audio-coding engine. The V vector may either be scalar or vector quantized. In addition, some or all of the remaining vectors in the U matrix may be multiplied with the corresponding singular values of the S matrix and V matrix and also coded using a [black-box] audio-coding engine. These will comprise the [background] components of the soundfield.

Since the loudest auditory components are decomposed into the [foreground components], the audio encoding device 567 may reduce the Ambisonics order of the [background] components prior to using a [black-box] audio-coding engine, because (we assume) that the background don't contain important localizable content. Audio encoding device 567 may reduce the order in such a way as preserve the overall energy of the soundfield according to techniques described herein. Depending on the Ambisonics order of the foreground components, the audio encoding unit 567 may transmit the corresponding V-vector(s), which may be rather large. For example, a simple 16 bit scalar quantization of the V vectors will result in approximately 20 kbps overhead for 4th order (25 coefficients) and 40 kbps for 6th order (49 coefficients) per foreground component. The techniques described in this disclosure may provide a method to reduce this overhead of the V-vector(s).

To illustrate, assume the Ambisonics order of the foreground elements and of the background elements is N. The audio encoding device 567 may reduce the Ambisonics order of the background elements of the V-vector(s) from N to $\tilde{\eta}$ such that $\tilde{\eta}$<N. The audio encoding device 67 further applies compensation to increase the values of the background elements of the V-vector(s) to preserve the overall energy of the soundfield described by the SHCs. Example techniques for applying compensation is described above with respect to FIG. 40F. At the receiver side, the audio decoding unit 569 may reconstruct the background audio-channels for the ambisonics order.

Figure 49D:
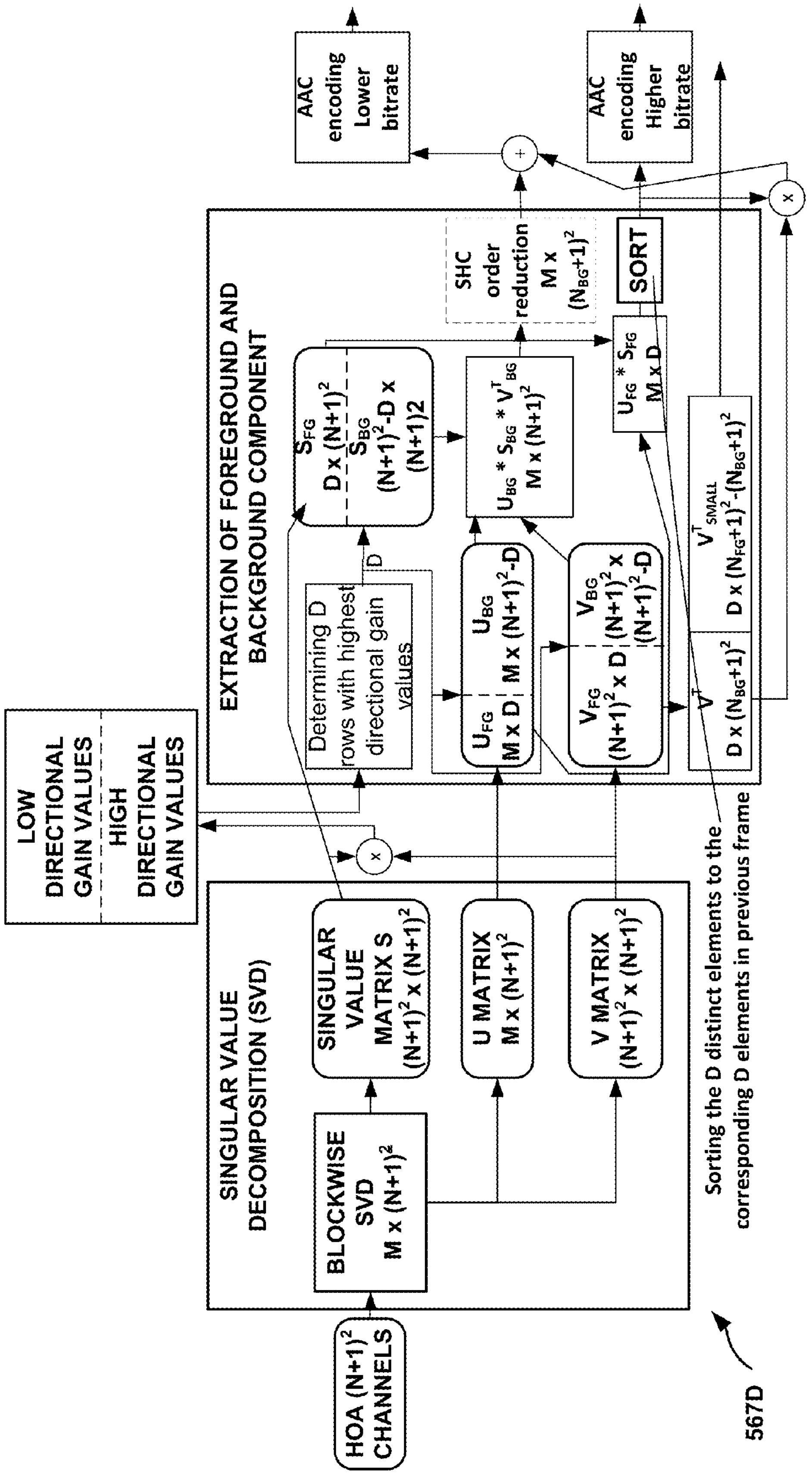

FIGS. 49D(i) and 49D(ii) illustrate an audio encoding device 567D and an audio decoding device 569D respectively. The audio encoding device 567D and the audio decoding device 569D may be configured to perform one or more directionality-based distinctness determinations, in accordance with aspects of this disclosure. Higher-Order Ambisonics (HOA) is a method to describe all directional information of a sound-field based on the spatial Fourier transform. The higher the Ambisonics order N, the higher the spatial resolution, the larger the number of spherical harmonics (SH) coefficients (N+1)^2, the larger the required bandwidth for transmitting and storing the data. Because the bandwidth requirements of HOA are rather high, for many applications a bandwidth reduction is desired.

Previous descriptions have described how the SVD (singular value decomposition) or related processes can be used for spatial audio compression. Techniques described herein present an improved algorithm for selecting the salient elements a.k.a. the foreground elements. After an SVD-based decomposition of a HOA audio frame into its U, S, and V matrix, the techniques base the selection of the K salient elements exclusively on the first K channels of the U matrix [U(:,1:K)*S(1:K,1:K)]. This results in selecting the audio elements with the highest energy. However, it is not guaranteed that those elements are also directional. Therefore, the techniques are directed to finding the sound elements that have high energy and are also directional. This is potentially achieved by weighting the V matrix with the S matrix. Then, for each row of this resulting matrix the higher indexed elements (which are associated with the higher order HOA coefficients) are squared and summed, resulting in one value per row [sumVS in the pseudo-code described with respect to FIG. 40H]. In accordance with workflow represented in the pseudo-code, the higher order Ambisonics coefficients starting at the 5th index are considered. These values are sorted according to their size and the sorting index is used to re-arrange the original U, S, and V matrix accordingly. The SVD-based compression algorithm described earlier in this disclosure can then be applied without further modification.

Figure 49E:
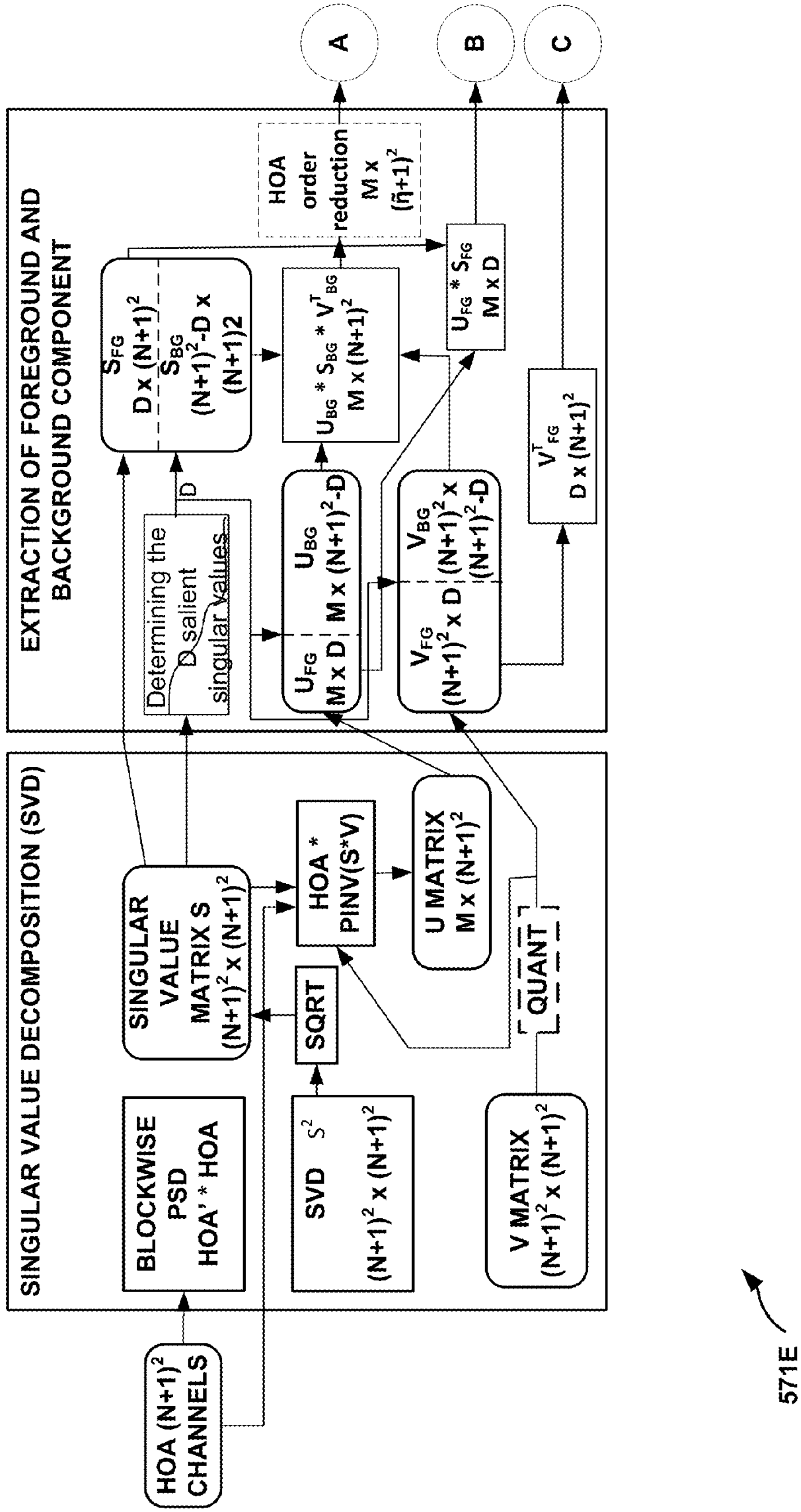

FIGS. 49E(i) and 49E(ii) are block diagram illustrating an audio encoding device 571E and an audio decoding device 573E respectively. The audio encoding device 571E and the audio decoding device 573E may perform various aspects of the techniques described above with respect to the examples of FIGS. 49-49D(ii), except that the audio encoding device 571E may perform the singular value decomposition with respect to a power spectral density matrix (PDS) of the HOA coefficients to generate an $S^2$ matrix and a V matrix. The $S^2$ matrix may denote a squared S matrix, whereupon $S^2$ matrix may undergo a square root operation to obtain the S matrix. The audio encoding device 571E may, in some instances, perform quantization with respect to the V matrix to obtain a quantized V matrix (which may be denoted as V' matrix).

The audio encoding device 571E may obtain the U matrix by first multiplying the S matrix by the quantized V' matrix to generate an SV' matrix. The audio encoding device 571E may next obtain the pseudo-inverse of the SV' matrix and then multiply HOA coefficients by the pseudo-inverse of the SV' matrix to obtain the U matrix. By performing SVD with respect to the power spectral density of the HOA coefficients rather than the coefficients themselves, the audio encoding device 571E may potentially reduce the computational complexity of performing the SVD in terms of one or more of processor cycles and storage space, while achieving the same source audio encoding efficiency as if the SVD were applied directly to the HOA coefficients.

The audio decoding device 573E may be similar to those audio decoding devices described above, except that the audio decoding device 573 may reconstruct the HOA coefficients from decompositions of the HOA coefficients achieved through application of the SVD to the power spectral density of the HOA coefficients rather than the HOA coefficients directly.

Figure 50A:
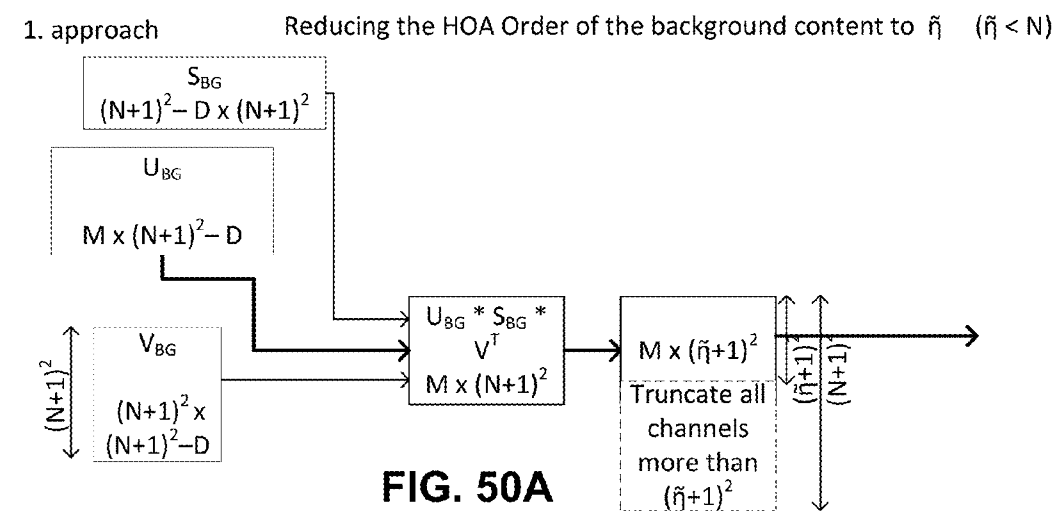
FIGS. 50A and 50B are block diagrams each illustrating one of two different approaches to potentially reduce the order of background content in accordance with the techniques described in this disclosure.
Figure 50B:
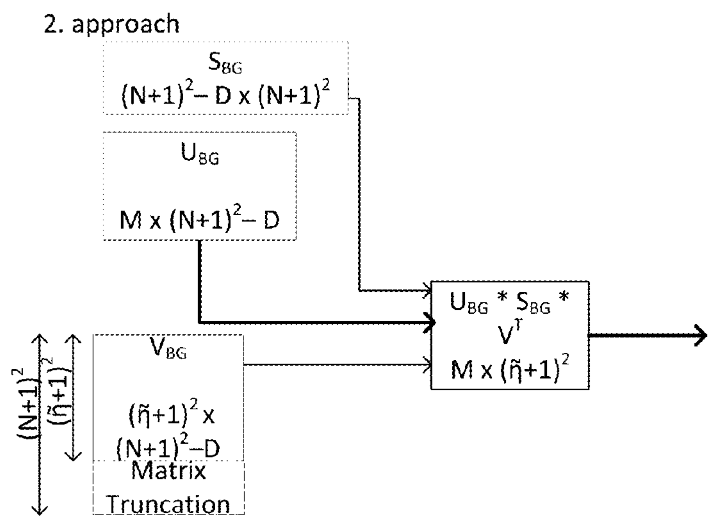

FIGS. 50A and 50B are block diagrams each illustrating one of two different approaches to potentially reduce the order of background content in accordance with the techniques described in this disclosure. As shown in the example of FIG. 50, the first approach may employ order-reduction with respect to the $U_{BG}*S_{BG}*V^T$ vectors to reduce the order from N to $\tilde{\eta}$, where $\tilde{\eta}$ is less than (<) N. That is, the order reduction unit 528A shown in the examples of FIG. 40B-40J may perform order-reduction to truncate or otherwise reduce the order N of the $U_{BG}*S_G*V^T$ vectors to $\tilde{\eta}$ where $\tilde{\eta}$ is less than (<) N.

As an alternative approach, the order reduction unit 528A may, as shown in the example of FIG. 50B, perform this truncation with respect to the $V^T$ eliminating the rows to be $(\tilde{\eta}+1)^2$, which is not illustrated in the example of FIG. 40B for ease of illustration purposes. In other words, the order reduction unit 528A may remove one or more orders of the $V^T$ matrix to effectively generate a $VB_G$ matrix. The size of this $V_{BG}$ matrix is $(\tilde{\eta}+1)^2\times(N+1)^2-D$, where this $V^{BG}$ matrix is then used in place of the $V^T$ matrix when generating the $U_{BG}*S_{BG}*V^T$ vectors, effectively performing the truncation to generate $U_{BG}*S_{BG}*V^T$ vectors of size $M\times(\tilde{\eta}+1)^2$.

Figure 51:
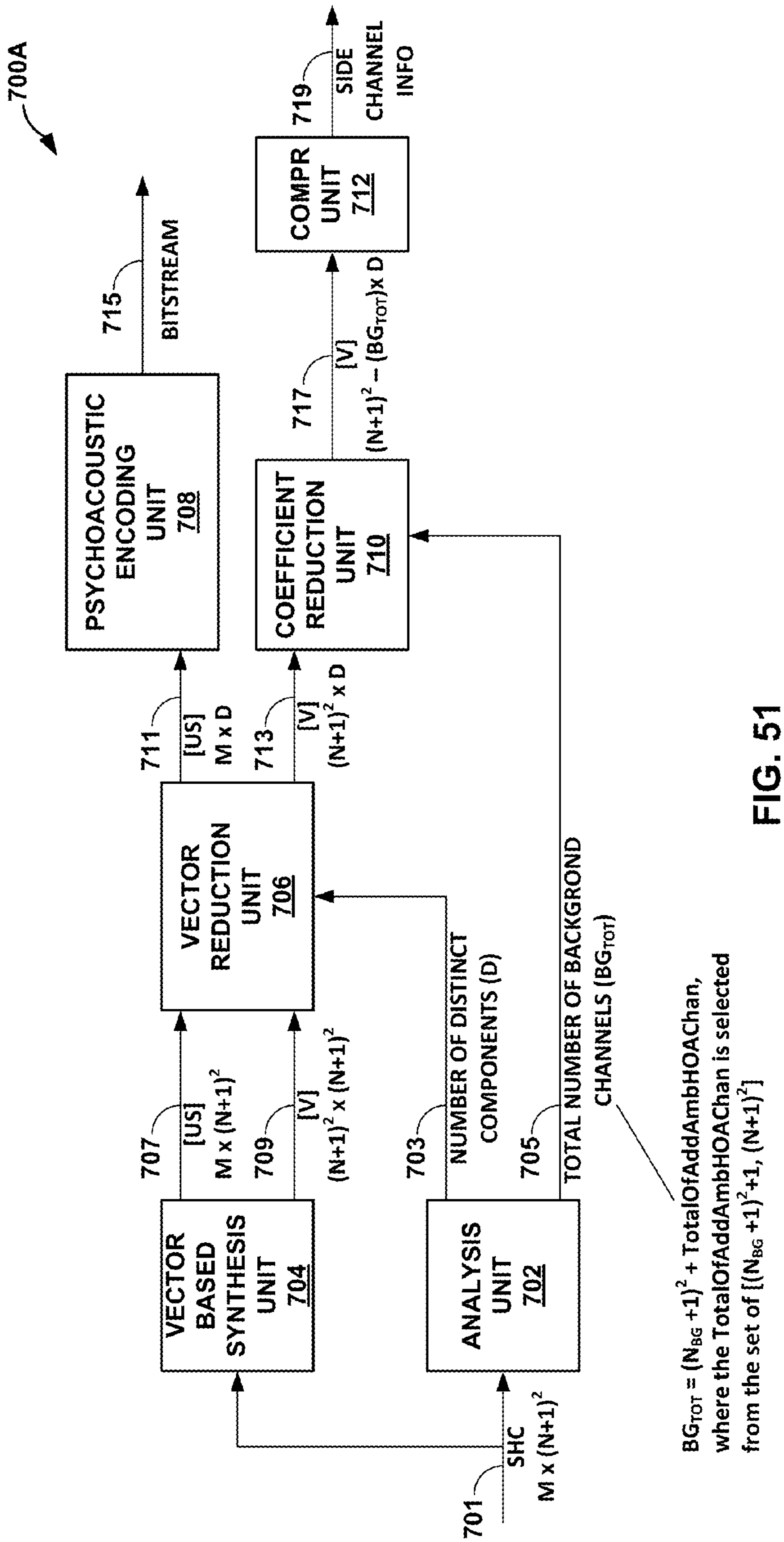
FIG. 51 is a block diagram illustrating examples of a distinct component compression path of an audio encoding device that may implement various aspects of the techniques described in this disclosure to compress spherical harmonic coefficients.

FIG. 51 is a block diagram illustrating examples of a distinct component compression path of an audio encoding device 700A that may implement various aspects of the techniques described in this disclosure to compress spherical harmonic coefficients 701. In the example of FIG. 51, the distinct component compression path may refer to a processing path of the audio encoding device 700A that compresses the distinct components of the soundfield represented by the SHC 701. Another path, which may be referred to as the background component compression path, may represent a processing path of the audio encoding device 700A that compresses the background components of the SHC 701.

Although not shown for ease of illustration purposes, the background component compression path may operate with respect to the SHC 701 directly rather than the decompositions of the SHC 701. This is similar to that described above with respect to FIGS. 49-49C, except that rather than recompose the background components from the $U_{BG}$, $S_{BG}$ and $V_{BG}$ matrixes and then perform some form of psychoacoustic encoding (e.g., using an AAC encoder) of these recomposed background components, the background component processing path may operate with respect to the SHC 701 directly (as described above with respect to the audio encoding device 20 shown in the example of FIG. 4), compressing these background components using the psychoacoustic encoder. By performing psychoacoustic encoding with respect to the SHC 701 directly, discontinuities may be reduced while also reducing computation complexity (in terms of operations required to compress the background components) in comparison to performing psychoacoustic encoding with respect to the recomposed background components. Although referred to in terms of a distinct and background, the term "prominent" may be used in place of "distinct" and the term "ambient" may be used in place of "background" in this disclosure.

In any event, the spherical harmonic coefficients 701 ("SHC 701") may comprise a matrix of coefficients having a size of $M\times(N+1)^2$, where M denotes the number of samples (and is, in some examples, 1024) in an audio frame and N denotes the highest order of the basis function to which the coefficients correspond. As noted above, N is commonly set to four (4) for a total of 1024×25 coefficients. Each of the SHC 701 corresponding to a particular order, sub-order combination may be referred to as a channel. For example, all of the M sample coefficients corresponding to a first order, zero sub-order basis function may represent a channel, while coefficients corresponding to the zero order, zero sub-order basis function may represent another channel, etc. The SHC 701 may also be referred to in this disclosure as higher-order ambisonics (HOA) content 701 or as an SH signal 701.

As shown in the example of FIG. 51, the audio encoding device 700A includes an analysis unit 702, a vector based synthesis unit 704, a vector reduction unit 706, a psychoacoustic encoding unit 708, a coefficient reduction unit 710 and a compression unit 712 ("compr unit 712"). The analysis unit 702 may represent a unit configured to perform an analysis with respect to the SHC 701 so as to identify distinct components of the soundfield (D) 703 and a total number of background components (BGmr) 705. In comparison to audio encoding devices described above, the audio encoding device 700A does not perform this determination with respect to the decompositions of the SHC 701, but directly with respect to the SHC 701.

The vector based synthesis unit 704 represents a unit configured to perform some form of vector based synthesis with respect to the SHC 701, such as SVD, KLT, PCA or any other vector based synthesis, to generate, in the instances of SVD, a [US] matrix 707 having a size of $M\times(N+1)^2$ and a [V] matrix 709 having a size of $(N+1)^2\times(N+1)^2$. The [US] matrix 707 may represent a matrix resulting from a matrix multiplication of the [U] matrix and the [S] matrix generated through application of SVD to the SHC 701.

The vector reduction unit 706 may represent a unit configured to reduce the number of vectors of the [US] matrix 707 and the [V] matrix 709 such that each of the remaining vectors of the [US} matrix 707 and the [V] matrix 709 identify a distinct or prominent component of the soundfield. The vector reduction unit 706 may perform this reduction based on the number of distinct components D 703. The number of distinct components D 703 may, in effect, represent an array of numbers, where each number identifies different distinct vectors of the matrices 707 and 709. The vector reduction unit 706 may output a reduced [US] matrix 711 of size M×D and a reduced [V] matrix 713 of size $(N+1)^2$×D.

Although not shown for ease of illustration purposes, interpolation of the [V] matrix 709 may occur prior to reduction of the [V] matrix 709 in manner similar to that described in more detail above. Moreover, although not shown for ease of illustration purposes, reordering of the reduced [US] matrix 711 and/or the reduced [V] matrix 712 in the manner described in more detail above. Accordingly, the techniques should not be limited in these and other respects (such as error projection or any other aspect of the foregoing techniques described above but not shown in the example of FIG. 51).

Psychoacoustic encoding unit 708 represents a unit configured to perform psychoacoustic encoding with respect to [US] matrix 711 to generate a bitstream 715. The coefficient reduction unit 710 may represent a unit configured to reduce the number of channels of the reduced [V] matrix 713. In other words, coefficient reduction unit 710 may represent a unit configured to eliminate those coefficients of the distinct V vectors (that form the reduced [V] matrix 713) having little to no directional information. As described above, in some examples, those coefficients of the distinct V vectors corresponding to a first and zero order basis functions (denoted as $Na_G$ above) provide little directional information and therefore can be removed from the distinct V vectors (through what is referred to as "order reduction" above). In this example, greater flexibility may be provided to not only identify these coefficients that correspond $N_{BG}$ but to identify additional HOA channels (which may be denoted by the variable TotalOfAddAmbHOAChan) from the set of $[(N_{BG}+1)^2+1, (N+1)^2]$. The analysis unit 702 may analyze the SHC 701 to determine $BG_{TOT}$, which may identify not only the $(N_{BG}+1)^2$ but the TotalOfAddAmbHOAChan. The coefficient reduction unit 710 may then remove those coefficients corresponding to the $(N_{BG}+1)^2$ and the TotalOfAddAmbHOAChan from the reduced [V] matrix 713 to generate a small [V] matrix 717 of size $((N+1)^2-(BG_{TOT})$×D.

The compression unit 712 may then perform the above noted scalar quantization and/or Huffman encoding to compress the small [V] matrix 717, outputting the compressed small [V] matrix 717 as side channel information 719 ("side channel info 719"). The compression unit 712 may output the side channel information 719 in a manner similar to that shown in the example of FIGS. 10-10O(ii). In some examples, a bitstream generation unit similar to those described above may incorporate the side channel information 719 into the bitstream 715. Moreover, while referred to as the bitstream 715, the audio encoding device 700A may, as noted above, include a background component processing path that results in another bitstream, where a bitstream generation unit similar to those described above may generate a bitstream similar to bitstream 17 described above that includes the bitstream 715 and the bitstream output by the background component processing path.

In accordance with the techniques described in this disclosure, the analysis unit 702 may be configured to determine a first non-zero set of coefficients of a vector, i.e., the vectors of the reduced [V] matrix 713 in this example, to be used to represent the distinct component of the soundfield. In some examples, the analysis unit 702 may determine that all of the coefficients of every vector forming the reduced [V] matrix 713 are to be included in the side channel information 719. The analysis unit 702 may therefore set $BG_{TOT}$ equal to zero.

The audio encoding device 700A may therefore effectively act in a reciprocal manner to that described above with respect to Table denoted as "Decoded Vectors." In addition, the audio encoding device 700A may specify a syntax element in a header of an access unit (which may include one or more frames) which of the plurality of configuration modes was selected. Although described as being specified on a per access unit basis, the analysis unit 702 may specify this syntax element on a per frame basis or any other periodic basis or non-periodic basis (such as once for the entire bitstream). In any event, this syntax element may comprise two bits indicating which of the four configuration modes were selected for specifying the non-zero set of coefficients of the reduced [V] matrix 713 to represent the directional aspects of this distinct component. The syntax element may be denoted as "codedVVecLength." In this manner, the audio encoding device 700A may signal or otherwise specify in the bitstream which of the four configuration modes were used to specify the small [V] matrix 717 in the bitstream. Although described with respect to four configuration modes, the techniques should not be limited to four configuration modes but to any number of configuration modes, including a single configuration mode or a plurality of configuration modes.

Various aspects of the techniques may therefore enable the audio encoding device 700A to be configured to operate in accordance with the following clauses.

Clause 133149-1F. A device comprising: one or more processors configured to select one of a plurality of configuration modes by which to specify a non-zero set of coefficients of a vector, the vector having been decomposed from a plurality of spherical harmonic coefficients describing a sound field and representing a distinct component of the sound field, and specify the non-zero set of the coefficients of the vector based on the selected one of the plurality of configuration modes.

Clause 133149-2F. The device of clause 133149-1F, wherein the one of the plurality of configuration modes indicates that the non-zero set of the coefficients includes all of the coefficients.

Clause 133149-3F. The device of clause 133149-1F, wherein the one of the plurality of configuration modes indicates that the non-zero set of coefficients include those of the coefficients corresponding to an order greater than an order of a basis function to which one or more of the plurality of spherical harmonic coefficients correspond.

Clause 133149-4F. The device of clause 133149-1F, wherein the one of the plurality of configuration modes indicates that the non-zero set of the coefficients include those of the coefficients corresponding to an order greater than an order of a basis function to which one or more of the plurality of spherical harmonic coefficients correspond and exclude at least one of the coefficients corresponding to an order greater than the order of the basis function to which the one or more of the plurality of spherical harmonic coefficients correspond, Clause 133149-5F. The device of clause 133149-1F, wherein the one of the plurality of configuration modes indicates that the non-zero set of coefficients include all of the coefficients except for at least one of the coefficients.

Clause 133149-6F. The device of clause 133149-1F, wherein the one or more processors are further configured to specify the selected one of the plurality of configuration modes in a bitstream.

Clause 133149-1G. A device comprising: one or more processors configured to determine one of a plurality of configuration modes by which to extract a non-zero set of coefficients of a vector in accordance with one of a plurality of configuration modes, the vector having been decomposed from a plurality of spherical harmonic coefficients describing a sound field and representing a distinct component of the sound field, and extract the non-zero set of the coefficients of the vector based on the obtained one of the plurality of configuration modes.

Clause 133149-2G. The device of clause 133149-1G, wherein the one of the plurality of configuration modes indicates that the non-zero set of the coefficients includes all of the coefficients.

Clause 133149-3G. The device of clause 133149-1G, wherein the one of the plurality of configuration modes indicates that the non-zero set of coefficients include those of the coefficients corresponding to an order greater than an order of a basis function to which one or more of the plurality of spherical harmonic coefficients correspond.

Clause 133149-4G. The device of clause 133149-1G, wherein the one of the plurality of configuration modes indicates that the non-zero set of the coefficients include those of the coefficients corresponding to an order greater than an order of a basis function to which one or more of the plurality of spherical harmonic coefficients correspond and exclude at least one of the coefficients corresponding to an order greater than the order of the basis function to which the one or more of the plurality of spherical harmonic coefficients correspond, Clause 133149-5G. The device of clause 133149-1G, wherein the one of the plurality of configuration modes indicates that the non-zero set of coefficients include all of the coefficients except for at least one of the coefficients.

Clause 133149-6G. The device of clause 133149-1G, wherein the one or more processors are further configured to, when determining the one of the plurality of configuration modes, determine the one of the plurality of configuration modes based on a value signaled in a bitstream.

Figure 52:
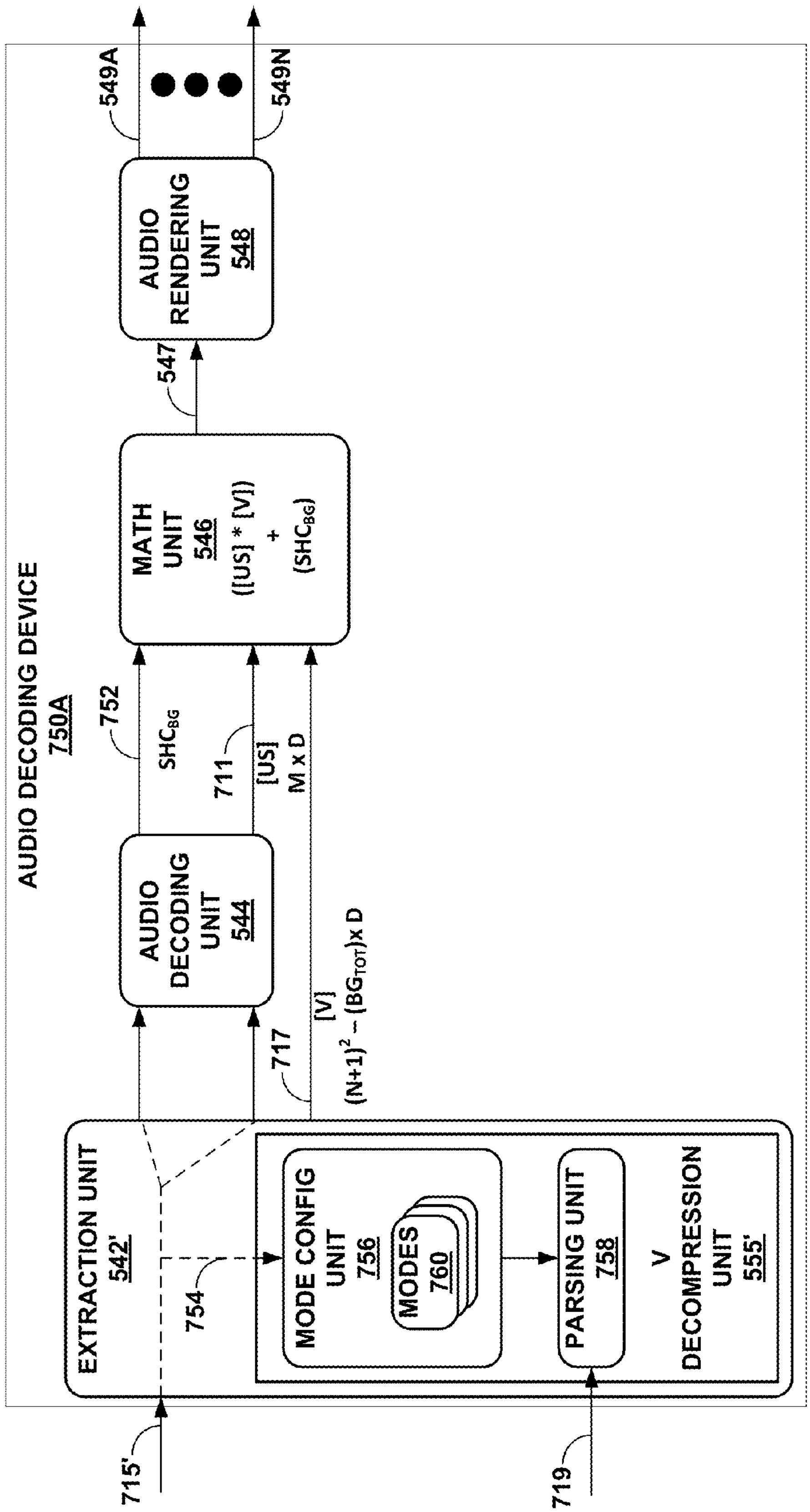
FIG. 52 is a block diagram illustrating another example of an audio decoding device that may implement various aspects of the techniques described in this disclosure to reconstruct or nearly reconstruct spherical harmonic coefficients (SHC).

FIG. 52 is a block diagram illustrating another example of an audio decoding device 750A that may implement various aspects of the techniques described in this disclosure to reconstruct or nearly reconstruct SHC 701. In the example of FIG. 52, audio decoding device 750A is similar to audio decoding device 540D shown in the example of FIG. 41D, except that the extraction unit 542 receives bitstream 715' (which is similar to the bitstream 715 described above with respect to the example of FIG. 51, except that the bitstream 715' also includes audio encoded version of $SHC_{BG}$ 752) and side channel information 719. For this reason, the extraction unit is denoted as "extraction unit 542'."

Moreover, the extraction unit 542' differs from the extraction unit 542 in that the extraction unit 542' includes a modified form of the V decompression unit 555 (which is shown as "V decompression unit 555'" in the example of FIG. 52). V decompression unit 555' receives the side channel information 719 and the syntax element denoted codedVVecLength 754. The extraction unit 542' parses the codedVVecLength 754 from the bitstream 715' (and, in one example, from the access unit header included within the bitstream 715'). The V decompression unit 555' includes a mode configuration unit 756 ("mode config unit 756") and a parsing unit 758 configurable to operate in accordance with any one of the foregoing described configuration modes 760.

The mode configuration unit 756 receives the syntax element 754 and selects one of configuration modes 760. The mode configuration unit 756 then configures the parsing unit 758 with the selected one of the configuration modes 760. The parsing unit 758 represents a unit configured to operate in accordance with any one of configuration modes 760 to parse a compressed form of the small [V] vectors 717 from the side channel information 719. The parsing unit 758 may operate in accordance with the switch statement presented in the following Table.

TABLE

Decoded Vectors

| Syntax | No. of bits | Mnemonic |
|---|---|---|
| decodeVVec(i) | | |
| { | | |
| switch codedVVecLength { | | |
| case 0: //complete Vector | | |
| VVecLength = NumOfHoaCoeffs; | | |
| for (m=0; m< VVecLength; ++m) { VecCoeff[m] = m+1; } | | |
| break; | | |
| case 1: //lower orders are removed | | |
| VVecLength = NumOfHoaCoeffs − MinNumOfCoeffsForAmbHOA; | | |
| for (m=0; m< VVecLength; ++m) { | | |
| VecCoeff[m] = m + MinNumOfCoeffsForAmbHOA + 1; | | |
| } | | |
| break; | | |
| case 2: | | |
| VVecLength = NumOfHoaCoeffs − MinNumOfCoeffsForAmbHOA − NumOfAddAmbHoaChan; | | |
| n = 0; | | |
| for(m=0;m<NumOfHoaCoeffs− MinNumOfCoeffsForAmbHOA; ++m) { | | |
| c = m + MinNumOfCoeffsForAmbHOA + 1; | | |

TABLE-continued

| Decoded Vectors | | |
|---|---|---|
| Syntax | No. of bits | Mnemonic |
| if ( ismember(c, AmbCoeffIdx) == 0) { | | |
| VecCoeff[n] = c; | | |
| n++; | | |
| } | | |
| } | | |
| break; | | |
| case 3; | | |
| VVecLength = NumOfHoaCoeffs − NumOfAddAmbHoaChan; | | |
| n = 0; | | |
| for(m=0; m<NumOfHoaCoeffs; ++m) { | | |
| c = m + 1; | | |
| if ( ismember(c, AmbCoeffIdx) == 0) { | | |
| VecCoeff[n] = c; | | |
| n++; | | |
| } | | |
| } | | |
| } | | |
| if (NbitsQ[i] == 5) { /* uniform quantizer */ | | |
| for (m=0; m< VVecLength; ++m) { | | |
| VVec(k)[i][in] = (VecValue / 128.0) − 1.0; | 8 | uimsbf |
| } | | |
| } | | |
| else { /* Huffman decoding */ | | |
| for (m=0; m< VVecLength: ++m) { | | |
| Idx = 5; | | |
| if (CbFlag[i] == 1) { | | |
| idx = (min(3, max(1, ceil(sqrt(VecCoeff[m]) − 1))); | | |
| } | | |
| else if (PFlag[i] == 1) {idx = 4;} | | |
| cid = huffDecode(huffmannTable[NbitsQ].codebook[idx]; huffVal); | dynamic | huffDecode |
| if( cid > 0) { | | |
| aVal = sgn = (sgnVal * 2) − 1; | 1 | bslbf |
| if (cid > 1) { | | |
| aVal = sgn * (2.0^(cid −1 ) + intAddVal); | cid − 1 | uimsbf |
| } | | |
| } else {aVal = 0.0;} | | |
| P12 } | | |
| } | | |
| } | | |

NOTE:
The encoder function for the uniform quantizer is min(255, round((x + 1.0) * 128.0))
The No. of bits for the Mnemonic huffDecode is dynamic In the foregoing syntax table, the first switch statement with the four cases (case 0-3) provides for a way by which to determine the lengths of each vector of the small [V] matrix 717 in terms of the number of coefficients. The first case, case 0, indicates that all of the coefficients for the $V^T_{DIST}$ vectors are specified. The second case, case 1, indicates that only those coefficients of the $V^T_{DIST}$ vector corresponding to an order greater than a MinNumOfCoeffsForAmbHOA are specified, which may denote what is referred to as $(N_{DIST}+1)-(N_{BG}+1)$ above. The third case, case 2, is similar to the second case but further subtracts coefficients identified by NumOfAddAmbHoaChan, which denotes a variable for specifying additional channels (where "channels" refer to a particular coefficient corresponding to a certain order, sub-order combination) corresponding to an order that exceeds the order $N_{BG}$. The fourth case, case 3, indicates that only those coefficients of the $V^T_{DIST}$ vector left after removing coefficients identified by NumOfAddAmbHoaChan are specified.

In this respect, the audio decoding device 750A may operate in accordance with the techniques described in this disclosure to determine a first non-zero set of coefficients of a vector that represent a distinct component of the soundfield, the vector having been decomposed from a plurality of spherical harmonic coefficients that describe a soundfield.

Moreover, the audio decoding device 750A may be configured to operate in accordance with the techniques described in this disclosure to determine one of a plurality of configuration modes by which to extract a non-zero set of coefficients of a vector in accordance with one of a plurality of configuration modes, the vector having been decomposed from a plurality of spherical harmonic coefficients describing a soundfield and representing a distinct component of the soundfield, and extract the non-zero set of the coefficients of the vector based on the obtained one of the plurality of configuration modes.

Figure 53:
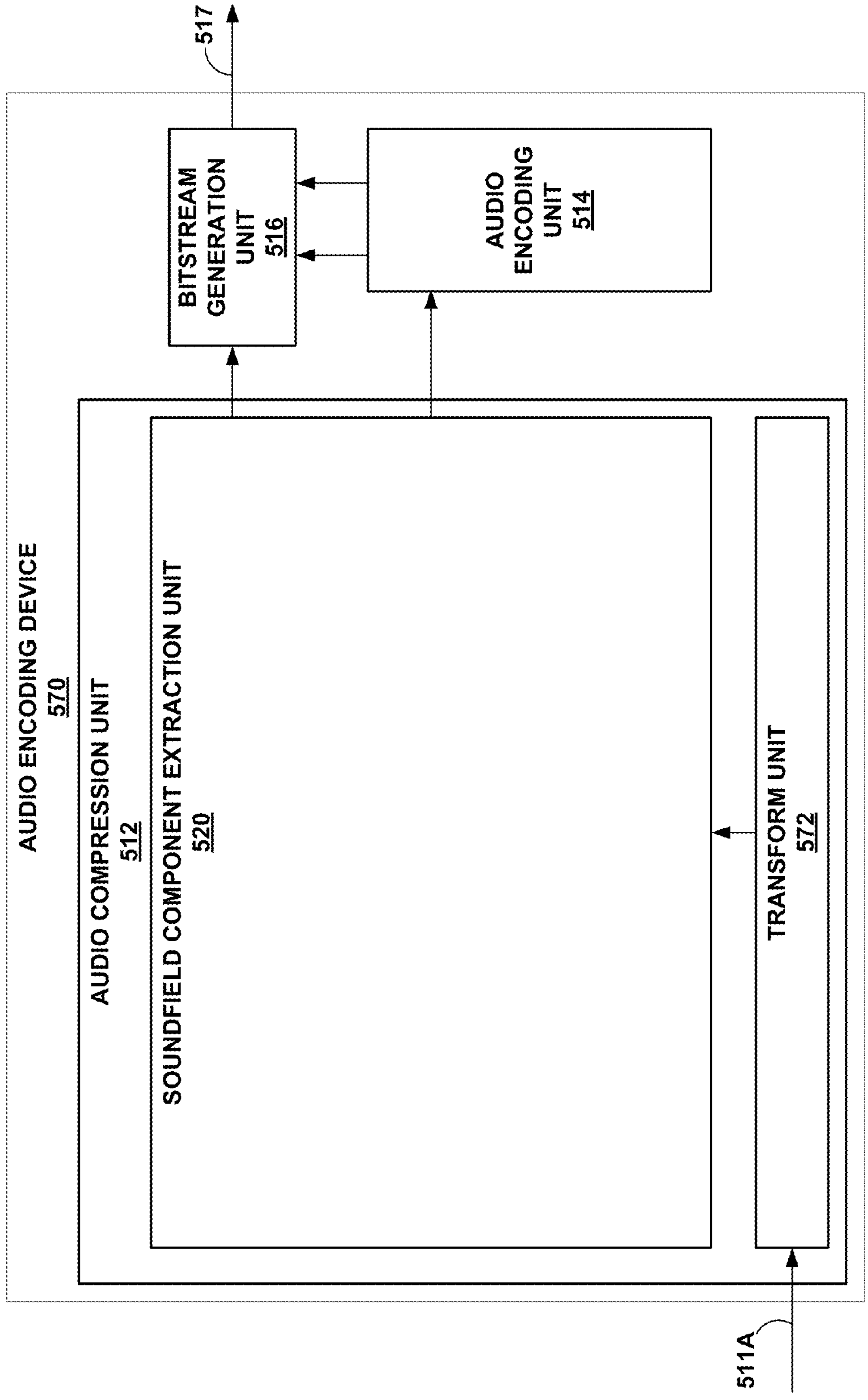
FIG. 53 is a block diagram illustrating another example of an audio encoding device that may perform various aspects of the techniques described in this disclosure.

FIG. 53 is a block diagram illustrating another example of an audio encoding device 570 that may perform various aspects of the techniques described in this disclosure. In the example of FIG. 53, the audio encoding device 570 may be similar to one or more of the audio encoding devices 510A-510J (where the order reduction unit 528A is assumed to be included within soundfield component extraction unit 20 but not shown for ease of illustration purposes). However, the audio encoding device 570 may include a more general transformation unit 572 that may comprise decomposition unit 518 in some examples.

Figure 54:
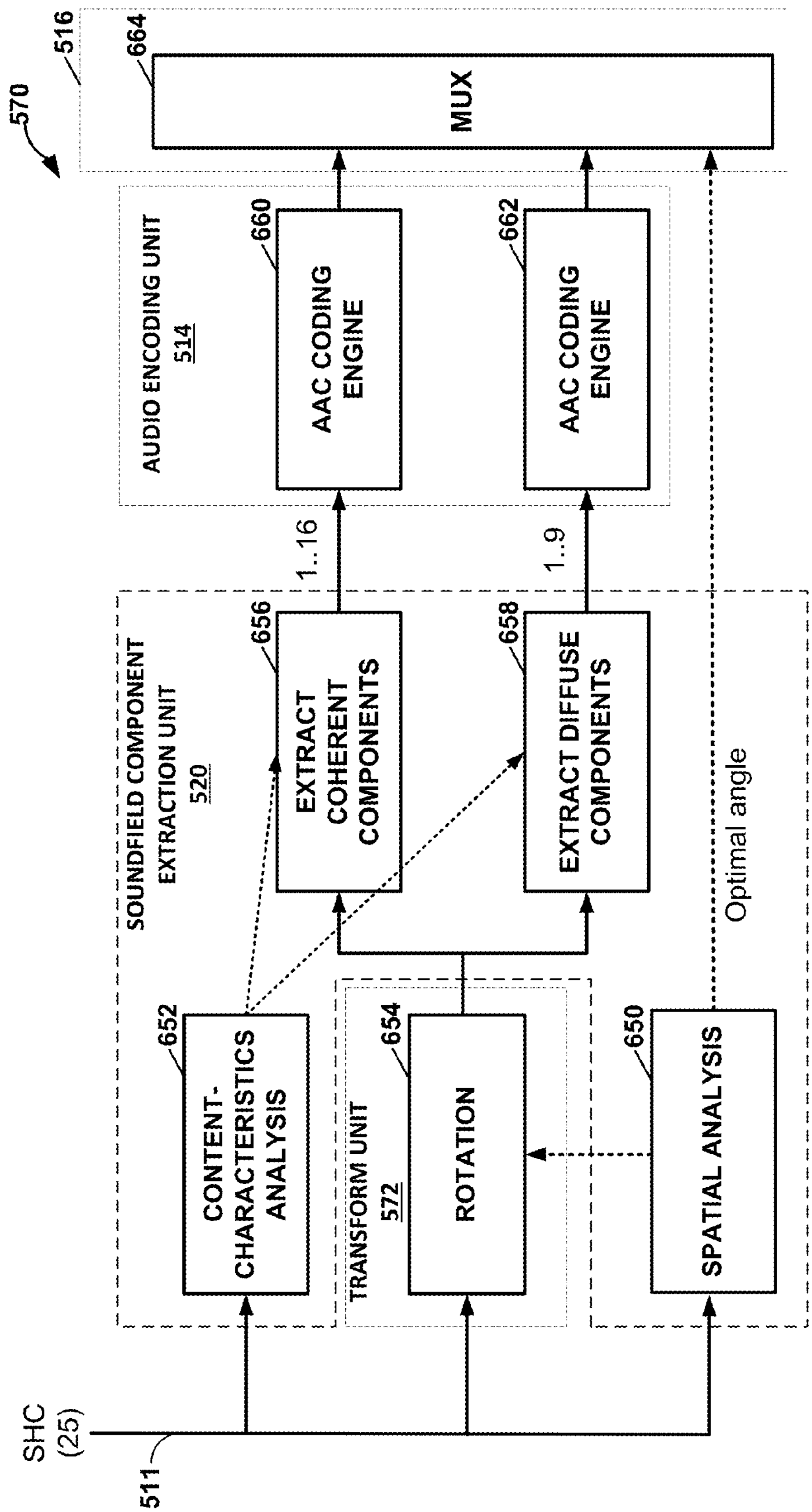
FIG. 54 is a block diagram illustrating, in more detail, an example implementation of the audio encoding device shown in the example of FIG. 53.

FIG. 54 is a block diagram illustrating, in more detail, an example implementation of the audio encoding device 570 shown in the example of FIG. 53. As illustrated in the example of FIG. 54, the transform unit 572 of the audio encoding device 570 includes a rotation unit 654. The soundfield component extraction unit 520 of the audio encoding device 570 includes a spatial analysis unit 650, a content-characteristics analysis unit 652, an extract coherent components unit 656, and an extract diffuse components unit 658. The audio encoding unit 514 of the audio encoding device 570 includes an AAC coding engine 660 and an AAC coding engine 162. The bitstream generation unit 516 of the audio encoding device 570 includes a multiplexer (MUX) 164.

The bandwidth—in terms of bits/second—required to represent 3D audio data in the form of SHC may make it prohibitive in terms of consumer use. For example, when using a sampling rate of 48 kHz, and with 32 bits/same resolution—a fourth order SHC representation represents a bandwidth of 36 Mbits/second (25×48000×32 bps). When compared to the state-of-the-art audio coding for stereo signals, which is typically about 100 kbits/second, this is a large figure. Techniques implemented in the example of FIG. 54 may reduce the bandwidth of 3D audio representations.

The spatial analysis unit 650, the content-characteristics analysis unit 652, and the rotation unit 654 may receive SHC 511. As described elsewhere in this disclosure, the SHC 511 may be representative of a soundfield. In the example of FIG. 54, the spatial analysis unit 650, the content-characteristics analysis unit 652, and the rotation unit 654 may receive twenty-five SHC for a fourth order (n=4) representation of the soundfield.

The spatial analysis unit 650 may analyze the soundfield represented by the SHC 511 to identify distinct components of the soundfield and diffuse components of the soundfield. The distinct components of the soundfield are sounds that are perceived to come from an identifiable direction or that are otherwise distinct from background or diffuse components of the soundfield. For instance, the sound generated by an individual musical instrument may be perceived to come from an identifiable direction. In contrast, diffuse or background components of the soundfield are not perceived to come from an identifiable direction. For instance, the sound of wind through a forest may be a diffuse component of a soundfield.

The spatial analysis unit 650 may identify one or more distinct components attempting to identify an optimal angle by which to rotate the soundfield to align those of the distinct components having the most energy with the vertical and/or horizontal axis (relative to a presumed microphone that recorded this soundfield). The spatial analysis unit 650 may identify this optimal angle so that the soundfield may be rotated such that these distinct components better align with the underlying spherical basis functions shown in the examples of FIGS. 1 and 2.

In some examples, the spatial analysis unit 650 may represent a unit configured to perform a form of diffusion analysis to identify a percentage of the soundfield represented by the SHC 511 that includes diffuse sounds (which may refer to sounds having low levels of direction or lower order SHC, meaning those of SHC 511 having an order less than or equal to one). As one example, the spatial analysis unit 650 may perform diffusion analysis in a manner similar to that described in a paper by Ville Pulkki, entitled "Spatial Sound Reproduction with Directional Audio Coding," published in the J. Audio Eng. Soc., Vol. 55, No. 6, dated June 2007. In some instances, the spatial analysis unit 650 may only analyze a non-zero subset of the HOA coefficients, such as the zero and first order ones of the SHC 511, when performing the diffusion analysis to determine the diffusion percentage.

The content-characteristics analysis unit 652 may determine, based at least in part on the SHC 511, whether the SHC 511 were generated via a natural recording of a soundfield or produced artificially (i.e., synthetically) from, as one example, an audio object, such as a PCM object. Furthermore, the content-characteristics analysis unit 652 may then determine, based at least in part on whether SHC 511 were generated via an actual recording of a soundfield or from an artificial audio object, the total number of channels to include in the bitstream 517. For example, the content-characteristics analysis unit 652 may determine, based at least in part on whether the SHC 511 were generated from a recording of an actual soundfield or from an artificial audio object, that the bitstream 517 is to include sixteen channels. Each of the channels may be a mono channel. The content-characteristics analysis unit 652 may further perform the determination of the total number of channels to include in the bitstream 517 based on an output bitrate of the bitstream 517, e.g., 1.2 Mbps.

In addition, the content-characteristics analysis unit 652 may determine, based at least in part on whether the SHC 511 were generated from a recording of an actual soundfield or from an artificial audio object, how many of the channels to allocate to coherent or, in other words, distinct components of the soundfield and how many of the channels to allocate to diffuse or, in other words, background components of the soundfield. For example, when the SHC 511 were generated from a recording of an actual soundfield using, as one example, an Eigenmic, the content-characteristics analysis unit 652 may allocate three of the channels to coherent components of the soundfield and may allocate the remaining channels to diffuse components of the soundfield. In this example, when the SHC 511 were generated from an artificial audio object, the content-characteristics analysis unit 652 may allocate five of the channels to coherent components of the soundfield and may allocate the remaining channels to diffuse components of the soundfield. In this way, the content analysis block (i.e., content-characteristics analysis unit 652) may determine the type of soundfield (e.g., diffuse/directional, etc.) and in turn determine the number of coherent/diffuse components to extract.

The target bit rate may influence the number of components and the bitrate of the individual AAC coding engines (e.g., AAC coding engines 660, 662). In other words, the content-characteristics analysis unit 652 may further perform the determination of how many channels to allocate to coherent components and how many channels to allocate to diffuse components based on an output bitrate of the bitstream 517, e.g., 1.2 Mbps.

In some examples, the channels allocated to coherent components of the soundfield may have greater bit rates than the channels allocated to diffuse components of the soundfield. For example, a maximum bitrate of the bitstream 517 may be 1.2 Mb/sec. In this example, there may be four channels allocated to coherent components and 16 channels allocated to diffuse components. Furthermore, in this example, each of the channels allocated to the coherent components may have a maximum bitrate of 64 kb/sec. In this example, each of the channels allocated to the diffuse components may have a maximum bitrate of 48 kb/sec.

As indicated above, the content-characteristics analysis unit 652 may determine whether the SHC 511 were generated from a recording of an actual soundfield or from an artificial audio object. The content-characteristics analysis unit 652 may make this determination in various ways. For example, the audio encoding device 570 may use $4^{th}$ order SHC. In this example, the content-characteristics analysis unit 652 may code 24 channels and predict a 25 channel (which may be represented as a vector). The content-characteristics analysis unit 652 may apply scalars to at least some of the 24 channels and add the resulting values to determine the $25^{th}$ vector. Furthermore, in this example, the content-characteristics analysis unit 652 may determine an accuracy of the predicted $25^{th}$ channel. In this example, if the accuracy of the predicted $25^{th}$ channel is relatively high (e.g., the accuracy exceeds a particular threshold), the SHC 511 is likely to be generated from a synthetic audio object. In contrast, if the accuracy of the predicted $25^{th}$ channel is relatively low (e.g. the accuracy is below the particular threshold), the SHC 511 is more likely to represent a recorded soundfield. For instance, in this example, if a signal-to-noise ratio (SNR) of the $25^{th}$ channel is over 100 decibels (dbs), the SHC 511 are more likely to represent a soundfield generated from a synthetic audio object. In contrast, the SNR of a soundfield recorded using an eigen microphone may be 5 to 20 dbs. Thus, there may be an apparent demarcation in SNR ratios between soundfield represented by the SHC 511 generated from an actual direct recording and from a synthetic audio object.

Furthermore, the content-characteristics analysis unit 652 may select, based at least in part on whether the SHC 511 were generated from a recording of an actual soundfield or from an artificial audio object, codebooks for quantizing the V vector. In other words, the content-characteristics analysis unit 652 may select different codebooks for use in quantizing the V vector, depending on whether the soundfield represented by the HOA coefficients is recorded or synthetic.

In some examples, the content-characteristics analysis unit 652 may determine, on a recurring basis, whether the SHC 511 were generated from a recording of an actual soundfield or from an artificial audio object. In some such examples, the recurring basis may be every frame. In other examples, the content-characteristics analysis unit 652 may perform this determination once. Furthermore, the content-characteristics analysis unit 652 may determine, on a recurring basis, the total number of channels and the allocation of coherent component channels and diffuse component channels. In some such examples, the recurring basis may be every frame. In other examples, the content-characteristics analysis unit 652 may perform this determination once. In some examples, the content-characteristics analysis unit 652 may select, on a recurring basis, codebooks for use in quantizing the V vector. In some such examples, the recurring basis may be every frame. In other examples, the content-characteristics analysis unit 652 may perform this determination once.

The rotation unit 654 may perform a rotation operation of the HOA coefficients. As discussed elsewhere in this disclosure (e.g., with respect to FIGS. 55 and 55B), performing the rotation operation may reduce the number of bits required to represent the SHC 511. In some examples, the rotation analysis performed by the rotation unit 652 is an instance of a singular value decomposition ("SVD") analysis. Principal component analysis ("PCA"), independent component analysis ("ICA"), and Karhunen-Loeve Transform ("KLT") are related techniques that may be applicable.

In the example of FIG. 54, the extract coherent components unit 656 receives rotated SHC 511 from rotation unit 654. Furthermore, the extract coherent components unit 656 extracts, from the rotated SHC 511, those of the rotated SHC 511 associated with the coherent components of the soundfield.

In addition, the extract coherent components unit 656 generates one or more coherent component channels. Each of the coherent component channels may include a different subset of the rotated SHC 511 associated with the coherent coefficients of the soundfield. In the example of FIG. 54, the extract coherent components unit 656 may generate from one to 16 coherent component channels. The number of coherent component channels generated by the extract coherent components unit 656 may be determined by the number of channels allocated by the content-characteristics analysis unit 652 to the coherent components of the soundfield. The bitrates of the coherent component channels generated by the extract coherent components unit 656 may be the determined by the content-characteristics analysis unit 652.

Similarly, in the example of FIG. 54, extract diffuse components unit 658 receives rotated SHC 511 from rotation unit 654. Furthermore, the extract diffuse components unit 658 extracts, from the rotated SHC 511, those of the rotated SHC 511 associated with diffuse components of the soundfield.

In addition, the extract diffuse components unit 658 generates one or more diffuse component channels. Each of the diffuse component channels may include a different subset of the rotated SHC 511 associated with the diffuse coefficients of the soundfield. In the example of FIG. 54, the extract diffuse components unit 658 may generate from one to 9 diffuse component channels. The number of diffuse component channels generated by the extract diffuse components unit 658 may be determined by the number of channels allocated by the content-characteristics analysis unit 652 to the diffuse components of the soundfield. The bitrates of the diffuse component channels generated by the extract diffuse components unit 658 may be the determined by the content-characteristics analysis unit 652.

In the example of FIG. 54, AAC coding unit 660 may use an AAC codec to encode the coherent component channels generated by extract coherent components unit 656. Similarly, AAC coding unit 662 may use an AAC codec to encode the diffuse component channels generated by extract diffuse components unit 658. The multiplexer 664 ("MUX 664") may multiplex the encoded coherent component channels and the encoded diffuse component channels, along with side data (e.g., an optimal angle determined by spatial analysis unit 650), to generate the bitstream 517.

In this way, the techniques may enable the audio encoding device 570 to determine whether spherical harmonic coefficients representative of a soundfield are generated from a synthetic audio object.

In some examples, the audio encoding device 570 may determine, based on whether the spherical harmonic coefficients are generated from a synthetic audio object, a subset of the spherical harmonic coefficients representative of distinct components of the soundfield. In these and other examples, the audio encoding device 570 may generate a bitstream to include the subset of the spherical harmonic coefficients. The audio encoding device 570 may, in some instances, audio encode the subset of the spherical harmonic coefficients, and generate a bitstream to include the audio encoded subset of the spherical harmonic coefficients.

In some examples, the audio encoding device 570 may determine, based on whether the spherical harmonic coefficients are generated from a synthetic audio object, a subset of the spherical harmonic coefficients representative of background components of the soundfield. In these and other examples, the audio encoding device 570 may generate a bitstream to include the subset of the spherical harmonic coefficients. In these and other examples, the audio encoding device 570 may audio encode the subset of the spherical harmonic coefficients, and generate a bitstream to include the audio encoded subset of the spherical harmonic coefficients.

In some examples, the audio encoding device 570 may perform a spatial analysis with respect to the spherical harmonic coefficients to identify an angle by which to rotate the soundfield represented by the spherical harmonic coefficients and perform a rotation operation to rotate the soundfield by the identified angle to generate rotated spherical harmonic coefficients.

In some examples, the audio encoding device 570 may determine, based on whether the spherical harmonic coefficients are generated from a synthetic audio object, a first subset of the spherical harmonic coefficients representative of distinct components of the soundfield, and determine, based on whether the spherical harmonic coefficients are generated from a synthetic audio object, a second subset of the spherical harmonic coefficients representative of background components of the soundfield. In these and other examples, the audio encoding device 570 may audio encode the first subset of the spherical harmonic coefficients having a higher target bitrate than that used to audio encode the second subject of the spherical harmonic coefficients.

In this way, various aspects of the techniques may enable the audio encoding device 570 to determine whether SCH 511 are generated from a synthetic audio object in accordance with the following clauses.

Clause 132512-1. A device, such as the audio encoding device 570, comprising: wherein the one or more processors are further configured to determine whether spherical harmonic coefficients representative of a sound field are generated from a synthetic audio object.

Clause 132512-2. The device of clause 132512-1, wherein the one or more processors are further configured to, when determining whether the spherical harmonic coefficients representative of the sound field are generated from the synthetic audio object, exclude a first vector from a framed spherical harmonic coefficient matrix storing at least a portion of the spherical harmonic coefficients representative of the sound field to obtain a reduced framed spherical harmonic coefficient matrix.

Clause 132512-3. The device of clause 132512-1, wherein the one or more processors are further configured to, when determining whether the spherical harmonic coefficients representative of the sound field are generated from the synthetic audio object, exclude a first vector from a framed spherical harmonic coefficient matrix storing at least a portion of the spherical harmonic coefficients representative of the sound field to obtain a reduced framed spherical harmonic coefficient matrix, and predict a vector of the reduced framed spherical harmonic coefficient matrix based on remaining vectors of the reduced framed spherical harmonic coefficient matrix.

Clause 132512-4. The device of clause 132512-1, wherein the one or more processors are further configured to, when determining whether the spherical harmonic coefficients representative of the sound field are generated from the synthetic audio object, exclude a first vector from a framed spherical harmonic coefficient matrix storing at least a portion of the spherical harmonic coefficients representative of the sound field to obtain a reduced framed spherical harmonic coefficient matrix, and predict a vector of the reduced framed spherical harmonic coefficient matrix based, at least in part, on a sum of remaining vectors of the reduced framed spherical harmonic coefficient matrix.

Clause 132512-5. The device of clause 132512-1, wherein the one or more processors are further configured to, when determining whether the spherical harmonic coefficients representative of the sound field are generated from the synthetic audio object, predict a vector of a framed spherical harmonic coefficient matrix storing at least a portion of the spherical harmonic coefficients based, at least in part, on a sum of remaining vectors of the framed spherical harmonic coefficient matrix.

Clause 132512-6. The device of clause 132512-1, wherein the one or more processors are further configured to, when determining whether the spherical harmonic coefficients representative of the sound field are generated from the synthetic audio object, predict a vector of a framed spherical harmonic coefficient matrix storing at least a portion of the spherical harmonic coefficients based, at least in part, on a sum of remaining vectors of the framed spherical harmonic coefficient matrix, and compute an error based on the predicted vector.

Clause 132512-7. The device of clause 132512-1, wherein the one or more processors are further configured to, when determining whether the spherical harmonic coefficients representative of the sound field are generated from the synthetic audio object, predict a vector of a framed spherical harmonic coefficient matrix storing at least a portion of the spherical harmonic coefficients based, at least in part, on a sum of remaining vectors of the framed spherical harmonic coefficient matrix, and compute an error based on the predicted vector and the corresponding vector of the framed spherical harmonic coefficient matrix.

Clause 132512-8. The device of clause 132512-1, wherein the one or more processors are further configured to, when determining whether the spherical harmonic coefficients representative of the sound field are generated from the synthetic audio object, predict a vector of a framed spherical harmonic coefficient matrix storing at least a portion of the spherical harmonic coefficients based, at least in part, on a sum of remaining vectors of the framed spherical harmonic coefficient matrix, and compute an error as a sum of the absolute value of the difference of the predicted vector and the corresponding vector of the framed spherical harmonic coefficient matrix.

Clause 132512-9. The device of clause 132512-1, wherein the one or more processors are further configured to, when determining whether the spherical harmonic coefficients representative of the sound field are generated from the synthetic audio object, predict a vector of a framed spherical harmonic coefficient matrix storing at least a portion of the spherical harmonic coefficients based, at least in part, on a sum of remaining vectors of the framed spherical harmonic coefficient matrix, compute an error based on the predicted vector and the corresponding vector of the framed spherical harmonic coefficient matrix, compute a ratio based on an energy of the corresponding vector of the framed spherical harmonic coefficient matrix and the error, and compare the ratio to a threshold to determine whether the spherical harmonic coefficients representative of the sound field are generated from the synthetic audio object.

Clause 132512-10. The device of any of claims 4-9, wherein the one or more processors are further configured to, when predicting the vector, predict a first non-zero vector of the framed spherical harmonic coefficient matrix storing at least the portion of the spherical harmonic coefficients.

Clause 132512-11. The device of any of claims 1-10, wherein the one or more processors are further configured to specify an indication of whether the spherical harmonic coefficients are generated from the synthetic audio object in a bitstream that stores a compressed version of the spherical harmonic coefficients.

Clause 132512-12. The device of clause 132512-11, wherein the indication is a single bit.

Clause 132512-13. The device of clause 132512-1, wherein the one or more processors are further configured to determine, based on whether the spherical harmonic coefficients are generated from a synthetic audio object, a subset of the spherical harmonic coefficients representative of distinct components of the sound field.

Clause 132512-14. The device of clause 132512-13, wherein the one or more processors are further configured to generate a bitstream to include the subset of the spherical harmonic coefficients.

Clause 132512-15. The device of clause 132512-13, wherein the one or more processors are further configured to audio encode the subset of the spherical harmonic coefficients, and generate a bitstream to include the audio encoded subset of the spherical harmonic coefficients.

Clause 132512-16. The device of clause 132512-1, wherein the one or more processors are further configured to determine, based on whether the spherical harmonic coefficients are generated from a synthetic audio object, a subset of the spherical harmonic coefficients representative of background components of the sound field.

Clause 132512-17. The device of clause 132512-16, wherein the one or more processors are further configured to generate a bitstream to include the subset of the spherical harmonic coefficients.

Clause 132512-18. The device of clause 132512-15, wherein the one or more processors are further configured to audio encode the subset of the spherical harmonic coefficients, and generate a bitstream to include the audio encoded subset of the spherical harmonic coefficients.

Clause 132512-18. The device of clause 132512-1, wherein the one or more processors are further configured to perform a spatial analysis with respect to the spherical harmonic coefficients to identify an angle by which to rotate the sound field represented by the spherical harmonic coefficients, and perform a rotation operation to rotate the sound field by the identified angle to generate rotated spherical harmonic coefficients.

Clause 132512-20. The device of clause 132512-1, wherein the one or more processors are further configured to determine, based on whether the spherical harmonic coefficients are generated from a synthetic audio object, a first subset of the spherical harmonic coefficients representative of distinct components of the sound field, and determine, based on whether the spherical harmonic coefficients are generated from a synthetic audio object, a second subset of the spherical harmonic coefficients representative of background components of the sound field.

Clause 132512-21. The device of clause 132512-20, wherein the one or more processors are further configured to audio encode the first subset of the spherical harmonic coefficients having a higher target bitrate than that used to audio encode the second subject of the spherical harmonic coefficients.

Clause 132512-22. The device of clause 132512-1, wherein the one or more processors are further configured to perform a singular value decomposition with respect to the spherical harmonic coefficients to generate a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients.

Clause 132512-23. The device of clause 132512-22, wherein the one or more processors are further configured to determine, based on whether the spherical harmonic coefficients are generated from a synthetic audio object, those portions of one or more of the U matrix, the S matrix and the V matrix representative of distinct components of the sound field.

Clause 132512-24. The device of clause 132512-22, wherein the one or more processors are further configured to determine, based on whether the spherical harmonic coefficients are generated from a synthetic audio object, those portions of one or more of the U matrix, the S matrix and the V matrix representative of background components of the sound field.

Clause 132512-1C. A device, such as the audio encoding device 570, comprising: one or more processors configured to determine whether spherical harmonic coefficients representative of a sound field are generated from a synthetic audio object based on a ratio computed as a function of, at least, an energy of a vector of the spherical harmonic coefficients and an error derived based on a predicted version of the vector of the spherical harmonic coefficients and the vector of the spherical harmonic coefficients.

In each of the various instances described above, it should be understood that the audio encoding device 570 may perform a method or otherwise comprise means to perform each step of the method for which the audio encoding device 570 is configured to perform In some instances, these means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 570 has been configured to perform.

Figure 55A:
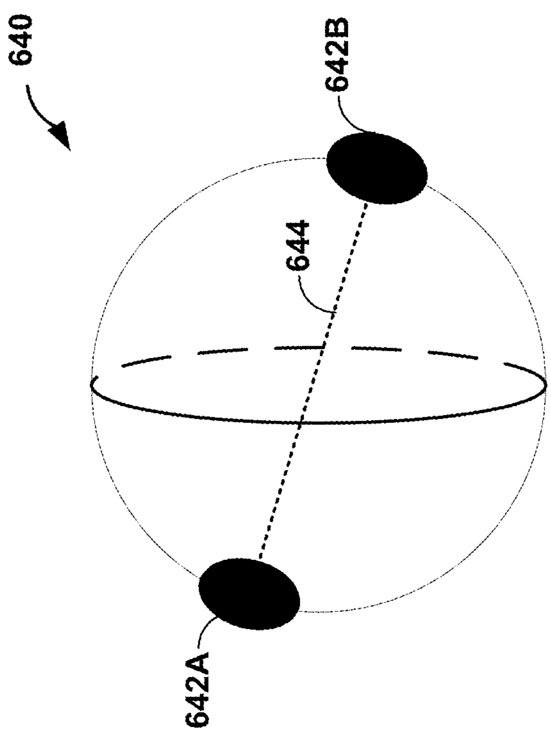
FIGS. 55A and 55B are diagrams illustrating an example of performing various aspects of the techniques described in this disclosure to rotate a soundfield.
Figure 55B:
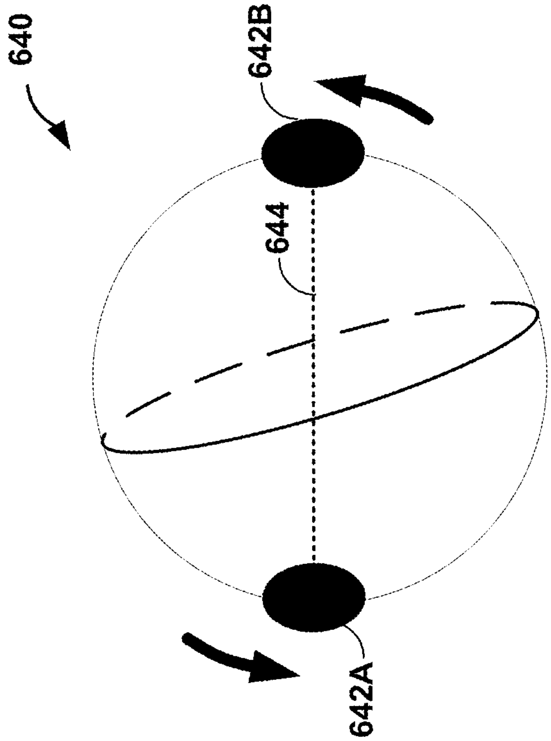

FIGS. 55 and 55B are diagrams illustrating an example of performing various aspects of the techniques described in this disclosure to rotate a soundfield 640. FIG. 55 is a diagram illustrating soundfield 640 prior to rotation in accordance with the various aspects of the techniques described in this disclosure. In the example of FIG. 55, the soundfield 640 includes two locations of high pressure, denoted as location 642A and 642B. These location 642A and 642B ("locations 642") reside along a line 644 that has a non-zero slope (which is another way of referring to a line that is not horizontal, as horizontal lines have a slope of zero). Given that the locations 642 have a z coordinate in addition to x and y coordinates, higher-order spherical basis functions may be required to correctly represent this soundfield 640 (as these higher-order spherical basis functions describe the upper and lower or non-horizontal portions of the soundfield. Rather than reduce the soundfield 640 directly to SHCs 511, the audio encoding device 570 may rotate the soundfield 640 until the line 644 connecting the locations 642 is horizontal.

FIG. 55B is a diagram illustrating the soundfield 640 after being rotated until the line 644 connecting the locations 642 is horizontal. As a result of rotating the soundfield 640 in this manner, the SHC 511 may be derived such that higher-order ones of SHC 511 are specified as zeros given that the rotated soundfield 640 no longer has any locations of pressure (or energy) with z coordinates. In this way, the audio encoding device 570 may rotate, translate or more generally adjust the soundfield 640 to reduce the number of SHC 511 having non-zero values. In conjunction with various other aspects of the techniques, the audio encoding device 570 may then, rather than signal a 32-bit signed number identifying that these higher order ones of SHC 511 have zero values, signal in a field of the bitstream 517 that these higher order ones of SHC 511 are not signaled. The audio encoding device 570 may also specify rotation information in the bitstream 517 indicating how the soundfield 640 was rotated, often by way of expressing an azimuth and elevation in the manner described above. An extraction device, such as the audio encoding device, may then imply that these non-signaled ones of SHC 511 have a zero value and, when reproducing the soundfield 640 based on SHC 511, perform the rotation to rotate the soundfield 640 so that the soundfield 640 resembles soundfield 640 shown in the example of FIG. 55. In this way, the audio encoding device 570 may reduce the number of SHC 511 required to be specified in the bitstream 517 in accordance with the techniques described in this disclosure.

A [spatial compaction] algorithm may be used to determine the optimal rotation of the soundfield. In one embodiment, audio encoding device 570 may perform the algorithm to iterate through all of the possible azimuth and elevation combinations (i.e., 1024×512 combinations in the above example), rotating the soundfield for each combination, and calculating the number of SHC 511 that are above the threshold value. The azimuth/elevation candidate combination which produces the least number of SHC 511 above the threshold value may be considered to be what may be referred to as the “optimum rotation.” In this rotated form, the soundfield may require the least number of SHC 511 for representing the soundfield and can may then be considered compacted. In some instances, the adjustment may comprise this optimal rotation and the adjustment information described above may include this rotation (which may be termed “optimal rotation”) information (in terms of the azimuth and elevation angles).

In some instances, rather than only specify the azimuth angle and the elevation angle, the audio encoding device 570 may specify additional angles in the form, as one example, of Euler angles. Euler angles specify the angle of rotation about the z-axis, the former x-axis and the former z-axis. While described in this disclosure with respect to combinations of azimuth and elevation angles, the techniques of this disclosure should not be limited to specifying only the azimuth and elevation angles, but may include specifying any number of angles, including the three Euler angles noted above. In this sense, the audio encoding device 570 may rotate the soundfield to reduce a number of the plurality of hierarchical elements that provide information relevant in describing the soundfield and specify Euler angles as rotation information in the bitstream. The Euler angles, as noted above, may describe how the soundfield was rotated. When using Euler angles, the bitstream extraction device may parse the bitstream to determine rotation information that includes the Euler angles and, when reproducing the soundfield based on those of the plurality of hierarchical elements that provide information relevant in describing the soundfield, rotating the soundfield based on the Euler angles.

Moreover, in some instances, rather than explicitly specify these angles in the bitstream 517, the audio encoding device 570 may specify an index (which may be referred to as a “rotation index”) associated with pre-defined combinations of the one or more angles specifying the rotation. In other words, the rotation information may, in some instances, include the rotation index. In these instances, a given value of the rotation index, such as a value of zero, may indicate that no rotation was performed. This rotation index may be used in relation to a rotation table. That is, the audio encoding device 570 may include a rotation table comprising an entry for each of the combinations of the azimuth angle and the elevation angle.

Alternatively, the rotation table may include an entry for each matrix transforms representative of each combination of the azimuth angle and the elevation angle. That is, the audio encoding device 570 may store a rotation table having an entry for each matrix transformation for rotating the soundfield by each of the combinations of azimuth and elevation angles. Typically, the audio encoding device 570 receives SHC 511 and derives SHC 511', when rotation is performed, according to the following equation:

$$\begin{bmatrix} SHC \\ 27' \end{bmatrix} = \begin{bmatrix} EncMat_2 \\ (25 \times 32) \end{bmatrix} \begin{bmatrix} InvMat_1 \\ (32 \times 25) \end{bmatrix} \begin{bmatrix} SHC \\ 27 \end{bmatrix}$$

In the equation above, SHC 511' are computed as a function of an encoding matrix for encoding a soundfield in terms of a second frame of reference ($EncMat_2$), an inversion matrix for reverting SHC 511 back to a soundfield in terms of a first frame of reference ($InvMat_1$), and SHC 511. $EncAMat_2$ is of size 25×32, while $InvMat_2$ is of size 32×25. Both of SHC 511' and SHC 511 are of size 25, where SHC 511' may be further reduced due to removal of those that do not specify salient audio information. $EncMat_2$ may vary for each azimuth and elevation angle combination, while $InvMat_1$ may remain static with respect to each azimuth and elevation angle combination. The rotation table may include an entry storing the result of multiplying each different $EncMat_2$ to $InvMat_1$.

Figure 56:
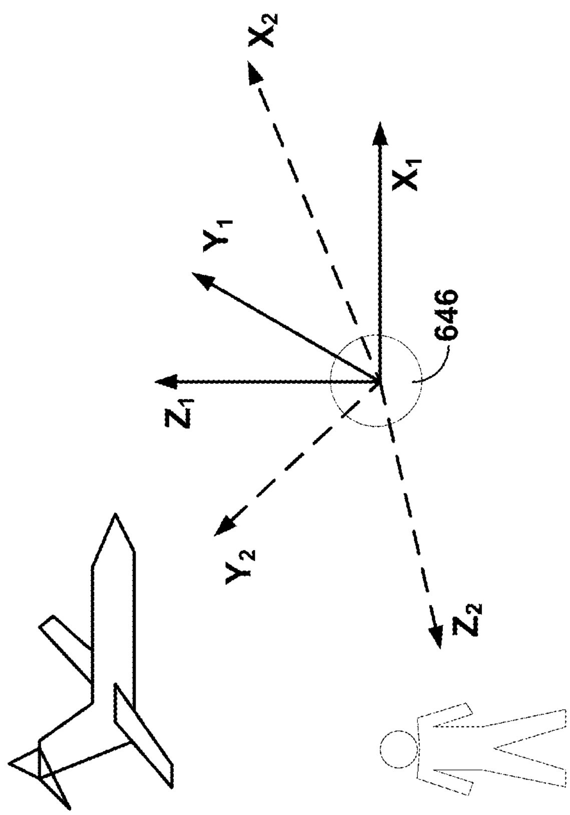
FIG. 56 is a diagram illustrating an example soundfield captured according to a first frame of reference that is then rotated in accordance with the techniques described in this disclosure to express the soundfield in terms of a second frame of reference.

FIG. 56 is a diagram illustrating an example soundfield captured according to a first frame of reference that is then rotated in accordance with the techniques described in this disclosure to express the soundfield in terms of a second frame of reference. In the example of FIG. 56, the soundfield surrounding an Eigen-microphone 646 is captured assuming a first frame of reference, which is denoted by the $X_1$, $Y_1$, and $Z_1$ axes in the example of FIG. 56. SHC 511 describe the soundfield in terms of this first frame of reference. The $InvMat_1$ transforms SHC 511 back to the soundfield, enabling the soundfield to be rotated to the second frame of reference denoted by the $X_2$, $Y_2$, and $Z_2$ axes in the example of FIG. 56. The $EncMat_2$ described above may rotate the soundfield and generate SHC 511' describing this rotated soundfield in terms of the second frame of reference.

In any event, the above equation may be derived as follows. Given that the soundfield is recorded with a certain coordinate system, such that the front is considered the direction of the x-axis, the 32 microphone positions of an Eigen microphone (or other microphone configurations) are defined from this reference coordinate system. Rotation of the soundfield may then be considered as a rotation of this frame of reference. For the assumed frame of reference, SHC 511 may be calculated as follows:

$$\begin{bmatrix} SHC \\ 27 \end{bmatrix} = \begin{bmatrix} Y_0^0(Pos_1) & Y_0^0(Pos_2) & \ldots & Y_0^0(Pos_{32}) \\ Y_1^{-1}(Pos_1) & \ldots & & Y_1^{-1}(Pos_{32}) \\ \vdots & \ddots & & \\ Y_4^4(Pos_1) & & & Y_4^4(Pos_{32}) \end{bmatrix} \begin{bmatrix} mic_1(t) \\ mic_2(t) \\ \vdots \\ mic_{32}(t) \end{bmatrix}$$

In the above equation, the $Y_n^m$ represent the spherical basis functions at the position ($Pos_i$) of the $i^{th}$ microphone (where i may be 1-32 in this example). The $mic_i$ vector denotes the microphone signal for the $i^{th}$ microphone for a time t. The positions ($Pos_i$) refer to the position of the microphone in the first frame of reference (i.e., the frame of reference prior to rotation in this example).

The above equation may be expressed alternatively in terms of the mathematical expressions denoted above as:

$$[SHC\_27]=[E_s(\theta,\varphi)][m_i(t)].$$

To rotate the soundfield (or in the second frame of reference), the position ($Pos_i$) would be calculated in the second frame of reference. As long as the original microphone signals are present, the soundfield may be arbitrarily rotated. However, the original microphone signals ($mic_i(t)$) are often not available. The problem then may be how to retrieve the microphone signals ($mic_i(t)$) from SHC 511. If a T-design is used (as in a 32 microphone Eigen microphone), the solution to this problem may be achieved by solving the following equation:

$$\begin{bmatrix} mic_1(t) \\ mic_2(t) \\ \vdots \\ mic_{32}(t) \end{bmatrix} = [InvMat_1] \begin{bmatrix} SHC \\ 27 \end{bmatrix}$$

This $InvMat_1$ may specify the spherical harmonic basis functions computed according to the position of the microphones as specified relative to the first frame of reference. This equation may also be expressed as $[m_i(t)]=[E_s(\theta,\varphi)]^{-1}[SHC]$, as noted above.

Once the microphone signals ($mic_i(t)$) are retrieved in accordance with the equation above, the microphone signals ($mic_i(t)$) describing the soundfield may be rotated to compute SHC 511' corresponding to the second frame of reference, resulting in the following equation:

$$\begin{bmatrix} SHC \\ 27' \end{bmatrix} = \begin{bmatrix} EncMat_2 \\ (25\times 32) \end{bmatrix} \begin{bmatrix} InvMat_1 \\ (32\times 25) \end{bmatrix} \begin{bmatrix} SHC \\ 27 \end{bmatrix}$$

The $EncMat_2$ specifies the spherical harmonic basis functions from a rotated position ($Pos_i'$). In this way, the $EncMat_2$ may effectively specify a combination of the azimuth and elevation angle. Thus, when the rotation table stores the result of $$\begin{bmatrix} EncMat_2 \\ (25\times 32) \end{bmatrix} \begin{bmatrix} InvMat_1 \\ (32\times 25) \end{bmatrix}$$

for each combination of the azimuth and elevation angles, the rotation table effectively specifies each combination of the azimuth and elevation angles. The above equation may also be expressed as:

$$[SHC\ 27']=[E_s(\theta_2,\varphi_2)][E_s(\theta_1,\varphi_1)]^{-1}[SHC\ 27],$$

where $\theta_2$, $\varphi_2$ represent a second azimuth angle and a second elevation angle different form the first azimuth angle and elevation angle represented by $\theta_1$, $\varphi_1$. The $\theta_1$, $\varphi_1$ correspond to the first frame of reference while the $\theta_2$, $\varphi_2$ correspond to the second frame of reference. The $InvMat_1$ may therefore correspond to $[E_s(\theta_1, \varphi_2)]^{-1}$, while the $EncMat_2$ may correspond to $[E_s(\theta_2, \varphi_2)]$.

The above may represent a more simplified version of the computation that does not consider the filtering operation, represented above in various equations denoting the derivation of SHC 511 in the frequency domain by the $j_n(\bullet)$ function, which refers to the spherical Bessel function of order n. In the time domain, this $j_n(\bullet)$ function represents a filtering operations that is specific to a particular order, n. With filtering, rotation may be performed per order. To illustrate, consider the following equations:

$$a_n^k(t)\quad b_n(t)*\langle[Y_n^m][m_i(t)]\rangle$$

$$a_n^k(t)\quad \langle[Y_n^m]b_n(t)*[m_i(t)]\rangle$$

From these equations, the rotated SHC 511' for orders are done separately since the $b_n(t)$ are different for each order. As a result, the above equation may be altered as follows for computing the first order ones of the rotated SHC 511':

$$\begin{bmatrix} 1^{st} \\ \text{Order} \\ SHC \\ 27' \end{bmatrix} = \begin{bmatrix} EncMat_2 \\ (3\times 32) \end{bmatrix} \begin{bmatrix} InvMat_1 \\ (32\times 3) \end{bmatrix} \begin{bmatrix} 1^{st} \\ \text{Order} \\ SHC \\ 27 \end{bmatrix}$$

Given that there are three first order ones of SHC 511, each of the SHC 511' and 511 vectors are of size three in the above equation. Likewise, for the second order, the following equation may be applied:

$$\begin{bmatrix} 2^{nd} \\ \text{Order} \\ SHC \\ 27' \end{bmatrix} = \begin{bmatrix} EncMat_2 \\ (5\times 32) \end{bmatrix} \begin{bmatrix} InvMat_1 \\ (32\times 5) \end{bmatrix} \begin{bmatrix} 2^{nd} \\ \text{Order} \\ SHC \\ 27 \end{bmatrix}$$

Again, given that there are five second order ones of SHC 511, each of the SHC 511' and 511 vectors are of size five in the above equation. The remaining equations for the other orders, i.e., the third and fourth orders, may be similar to that described above, following the same pattern with regard to the sizes of the matrixes (in that the number of rows of $EncMat_2$, the number of columns of $InvMat_1$ and the sizes of the third and fourth order SHC 511 and SHC 511' vectors is equal to the number of sub-orders (m times two plus 1) of each of the third and fourth order spherical harmonic basis functions.

The audio encoding device 570 may therefore perform this rotation operation with respect to every combination of azimuth and elevation angle in an attempt to identify the so-called optimal rotation. The audio encoding device 570 may, after performing this rotation operation, compute the number of SHC 511' above the threshold value. In some instances, the audio encoding device 570 may perform this rotation to derive a series of SHC 511' that represent the soundfield over a duration of time, such as an audio frame. By performing this rotation to derive the series of the SHC 511' that represent the soundfield over this time duration, the audio encoding device 570 may reduce the number of rotation operations that have to be performed in comparison for doing this for each set of the SHC 511 describing the soundfield for time durations less than a frame or other length. In any event, the audio encoding device 570 may save, throughout this process, those of SHC 511' having the least number of the SHC 511' greater than the threshold value.

However, performing this rotation operation with respect to every combination of azimuth and elevation angle may be processor intensive or time-consuming. As a result, the audio encoding device 570 may not perform what may be characterized as this "brute force" implementation of the rotation algorithm. Instead, the audio encoding device 570 may perform rotations with respect to a subset of possibly known (statistically-wise) combinations of azimuth and elevation angle that offer generally good compaction, performing further rotations with regard to combinations around those of this subset providing better compaction compared to other combinations in the subset.

As another alternative, the audio encoding device 570 may perform this rotation with respect to only the known subset of combinations. As another alternative, the audio encoding device 570 may follow a trajectory (spatially) of combinations, performing the rotations with respect to this trajectory of combinations. As another alternative, the audio encoding device 570 may specify a compaction threshold that defines a maximum number of SHC 511' having non-zero values above the threshold value. This compaction threshold may effectively set a stopping point to the search, such that, when the audio encoding device 570 performs a rotation and determines that the number of SHC 511' having a value above the set threshold is less than or equal to (or less than in some instances) than the compaction threshold, the audio encoding device 570 stops performing any additional rotation operations with respect to remaining combinations. As yet another alternative, the audio encoding device 570 may traverse a hierarchically arranged tree (or other data structure) of combinations, performing the rotation operations with respect to the current combination and traversing the tree to the right or left (e.g., for binary trees) depending on the number of SHC 511' having a non-zero value greater than the threshold value.

In this sense, each of these alternatives involve performing a first and second rotation operation and comparing the result of performing the first and second rotation operation to identify one of the first and second rotation operations that results in the least number of the SHC 511' having a non-zero value greater than the threshold value. Accordingly, the audio encoding device 570 may perform a first rotation operation on the soundfield to rotate the soundfield in accordance with a first azimuth angle and a first elevation angle and determine a first number of the plurality of hierarchical elements representative of the soundfield rotated in accordance with the first azimuth angle and the first elevation angle that provide information relevant in describing the soundfield. The audio encoding device 570 may also perform a second rotation operation on the soundfield to rotate the soundfield in accordance with a second azimuth angle and a second elevation angle and determine a second number of the plurality of hierarchical elements representative of the soundfield rotated in accordance with the second azimuth angle and the second elevation angle that provide information relevant in describing the soundfield. Furthermore, the audio encoding device 570 may select the first rotation operation or the second rotation operation based on a comparison of the first number of the plurality of hierarchical elements and the second number of the plurality of hierarchical elements.

In some instances, the rotation algorithm may be performed with respect to a duration of time, where subsequent invocations of the rotation algorithm may perform rotation operations based on past invocations of the rotation algorithm. In other words, the rotation algorithm may be adaptive based on past rotation information determined when rotating the soundfield for a previous duration of time. For example, the audio encoding device 570 may rotate the soundfield for a first duration of time, e.g., an audio frame, to identify SHC 511' for this first duration of time. The audio encoding device 570 may specify the rotation information and the SHC 511' in the bitstream 517 in any of the ways described above. This rotation information may be referred to as first rotation information in that it describes the rotation of the soundfield for the first duration of time. The audio encoding device 570 may then, based on this first rotation information, rotate the soundfield for a second duration of time, e.g., a second audio frame, to identify SHC 511' for this second duration of time. The audio encoding device 570 may utilize this first rotation information when performing the second rotation operation over the second duration of time to initialize a search for the "optimal" combination of azimuth and elevation angles, as one example. The audio encoding device 570 may then specify the SHC 511' and corresponding rotation information for the second duration of time (which may be referred to as "second rotation information") in the bitstream 517.

While described above with respect to a number of different ways by which to implement the rotation algorithm to reduce processing time and/or consumption, the techniques may be performed with respect to any algorithm that may reduce or otherwise speed the identification of what may be referred to as the "optimal rotation." Moreover, the techniques may be performed with respect to any algorithm that identifying non-optimal rotations but that may improve performance in other aspects, often measured in terms of speed or processor or other resource utilization.

Figure 57A:
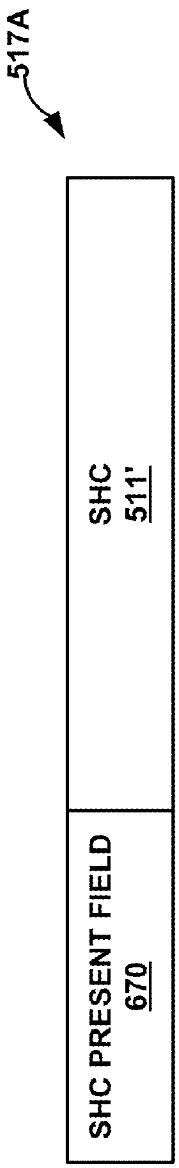
FIGS. 57A-57E are each a diagram illustrating bitstreams formed in accordance with the techniques described in this disclosure.
Figure 57B:
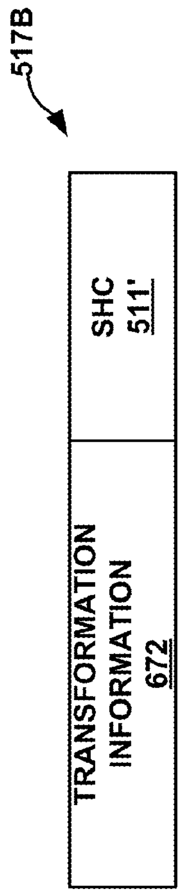
Figure 57C:
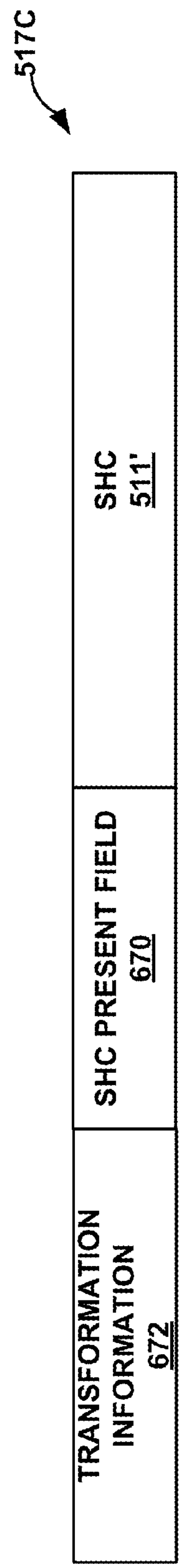
Figure 57D:
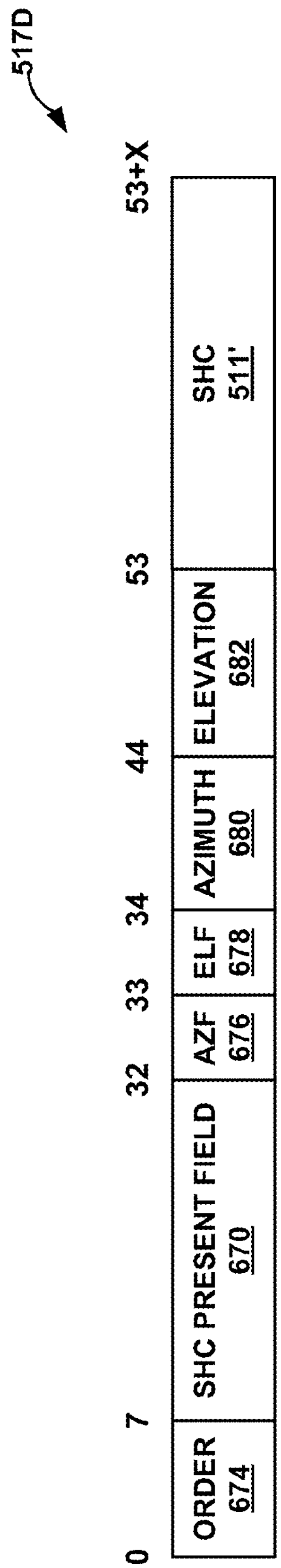
Figure 57E:
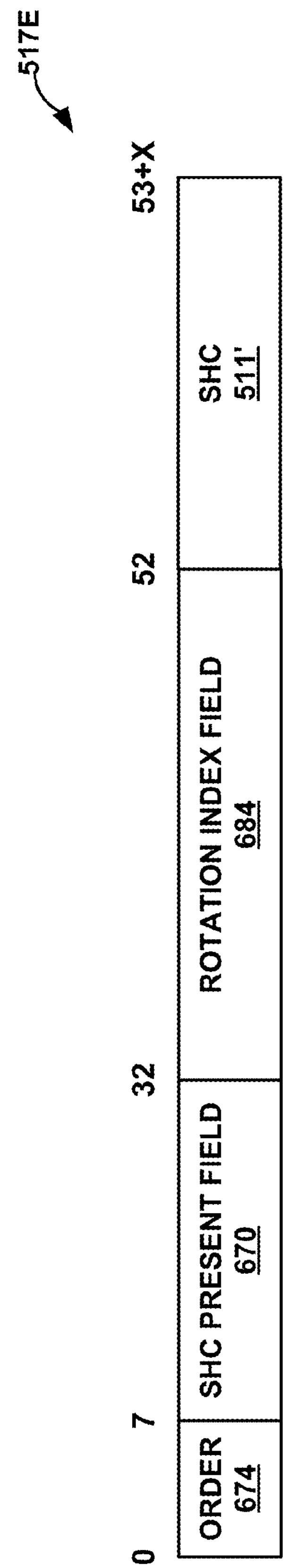

FIGS. 57-57E are each a diagram illustrating bitstreams 517A-517E formed in accordance with the techniques described in this disclosure. In the example of FIG. 57A, the bitstream 517A may represent one example of the bitstream 517 shown in FIG. 53 above. The bitstream 517A includes an SHC present field 670 and a field that stores SHC 511' (where the field is denoted "SHC 511'"). The SHC present field 670 may include a bit corresponding to each of SHC 511. The SHC 511' may represent those of SHC 511 that are specified in the bitstream, which may be less in number than the number of the SHC 511. Typically, each of SHC 511' are those of SHC 511 having non-zero values. As noted above, for a fourth-order representation of any given soundfield, $(1+4)^2$ or 25 SHC are required. Eliminating one or more of these SHC and replacing these zero valued SHC with a single bit may save 31 bits, which may be allocated to expressing other portions of the soundfield in more detail or otherwise removed to facilitate efficient bandwidth utilization.

In the example of FIG. 57B, the bitstream 517B may represent one example of the bitstream 517 shown in FIG. 53 above. The bitstream 517B includes an transformation information field 672 ("transformation information 672") and a field that stores SHC 511' (where the field is denoted "SHC 511'"). The transformation information 672, as noted above, may comprise translation information, rotation information, and/or any other form of information denoting an adjustment to a soundfield. In some instances, the transformation information 672 may also specify a highest order of SHC 511 that are specified in the bitstream 517B as SHC 511'. That is, the transformation information 672 may indicate an order of three, which the extraction device may understand as indicating that SHC 511' includes those of SHC 511 up to and including those of SHC 511 having an order of three. The extraction device may then be configured to set SHC 511 having an order of four or higher to zero, thereby potentially removing the explicit signaling of SHC 511 of order four or higher in the bitstream.

In the example of FIG. 57C, the bitstream 517C may represent one example of the bitstream 517 shown in FIG. 53 above. The bitstream 517C includes the transformation information field 672 ("transformation information 672"), the SHC present field 670 and a field that stores SHC 511' (where the field is denoted "SHC 511'"). Rather than be configured to understand which order of SHC 511 are not signaled as described above with respect to FIG. 57B, the SHC present field 670 may explicitly signal which of the SHC 511 are specified in the bitstream 517C as SHC 511'.

In the example of FIG. 57D, the bitstream 517D may represent one example of the bitstream 517 shown in FIG. 53 above. The bitstream 517D includes an order field 674 ("order 60"), the SHC present field 670, an azimuth flag 676 ("AZF 676"), an elevation flag 678 ("ELF 678"), an azimuth angle field 680 ("azimuth 680"), an elevation angle field 682 ("elevation 682") and a field that stores SHC 511' (where, again, the field is denoted "SHC 511'"). The order field 674 specifies the order of SHC 511', i.e., the order denoted by n above for the highest order of the spherical basis function used to represent the soundfield. The order field 674 is shown as being an 8-bit field, but may be of other various bit sizes, such as three (which is the number of bits required to specify the forth order). The SHC present field 670 is shown as a 25-bit field. Again, however, the SHC present field 670 may be of other various bit sizes. The SHC present field 670 is shown as 25 bits to indicate that the SHC present field 670 may include one bit for each of the spherical harmonic coefficients corresponding to a fourth order representation of the soundfield.

The azimuth flag 676 represents a one-bit flag that specifies whether the azimuth field 680 is present in the bitstream 517D. When the azimuth flag 676 is set to one, the azimuth field 680 for SHC 511' is present in the bitstream 517D. When the azimuth flag 676 is set to zero, the azimuth field 680 for SHC 511' is not present or otherwise specified in the bitstream 517D. Likewise, the elevation flag 678 represents a one-bit flag that specifies whether the elevation field 682 is present in the bitstream 517D. When the elevation flag 678 is set to one, the elevation field 682 for SHC 511' is present in the bitstream 517D. When the elevation flag 678 is set to zero, the elevation field 682 for SHC 511' is not present or otherwise specified in the bitstream 517D. While described as one signaling that the corresponding field is present and zero signaling that the corresponding field is not present, the convention may be reversed such that a zero specifies that the corresponding field is specified in the bitstream 517D and a one specifies that the corresponding field is not specified in the bitstream 517D. The techniques described in this disclosure should therefore not be limited in this respect.

The azimuth field 680 represents a 10-bit field that specifies, when present in the bitstream 517D, the azimuth angle. While shown as a 10-bit field, the azimuth field 680 may be of other bit sizes. The elevation field 682 represents a 9-bit field that specifies, when present in the bitstream 517D, the elevation angle. The azimuth angle and the elevation angle specified in fields 680 and 682, respectively, may in conjunction with the flags 676 and 678 represent the rotation information described above. This rotation information may be used to rotate the soundfield so as to recover SHC 511 in the original frame of reference.

The SHC 511' field is shown as a variable field that is of size X. The SHC 511' field may vary due to the number of SHC 511' specified in the bitstream as denoted by the SHC present field 670. The size X may be derived as a function of the number of ones in SHC present field 670 times 32-bits (which is the size of each SHC 511').

In the example of FIG. 57E, the bitstream 517E may represent another example of the bitstream 517 shown in FIG. 53 above. The bitstream 517E includes an order field 674 ("order 60"), an SHC present field 670, and a rotation index field 684, and a field that stores SHC 511' (where, again, the field is denoted "SHC 511'"). The order field 674, the SHC present field 670 and the SHC 511' field may be substantially similar to those described above. The rotation index field 684 may represent a 20-bit field used to specify one of the 1024×512 (or, in other words, 524288) combinations of the elevation and azimuth angles. In some instances, only 19-bits may be used to specify this rotation index field 684, and the audio encoding device 570 may specify an additional flag in the bitstream to indicate whether a rotation operation was performed (and, therefore, whether the rotation index field 684 is present in the bitstream). This rotation index field 684 specifies the rotation index noted above, which may refer to an entry in a rotation table common to both the audio encoding device 570 and the bitstream extraction device. This rotation table may, in some instances, store the different combinations of the azimuth and elevation angles. Alternatively, the rotation table may store the matrix described above, which effectively stores the different combinations of the azimuth and elevation angles in matrix form.

Figure 58:
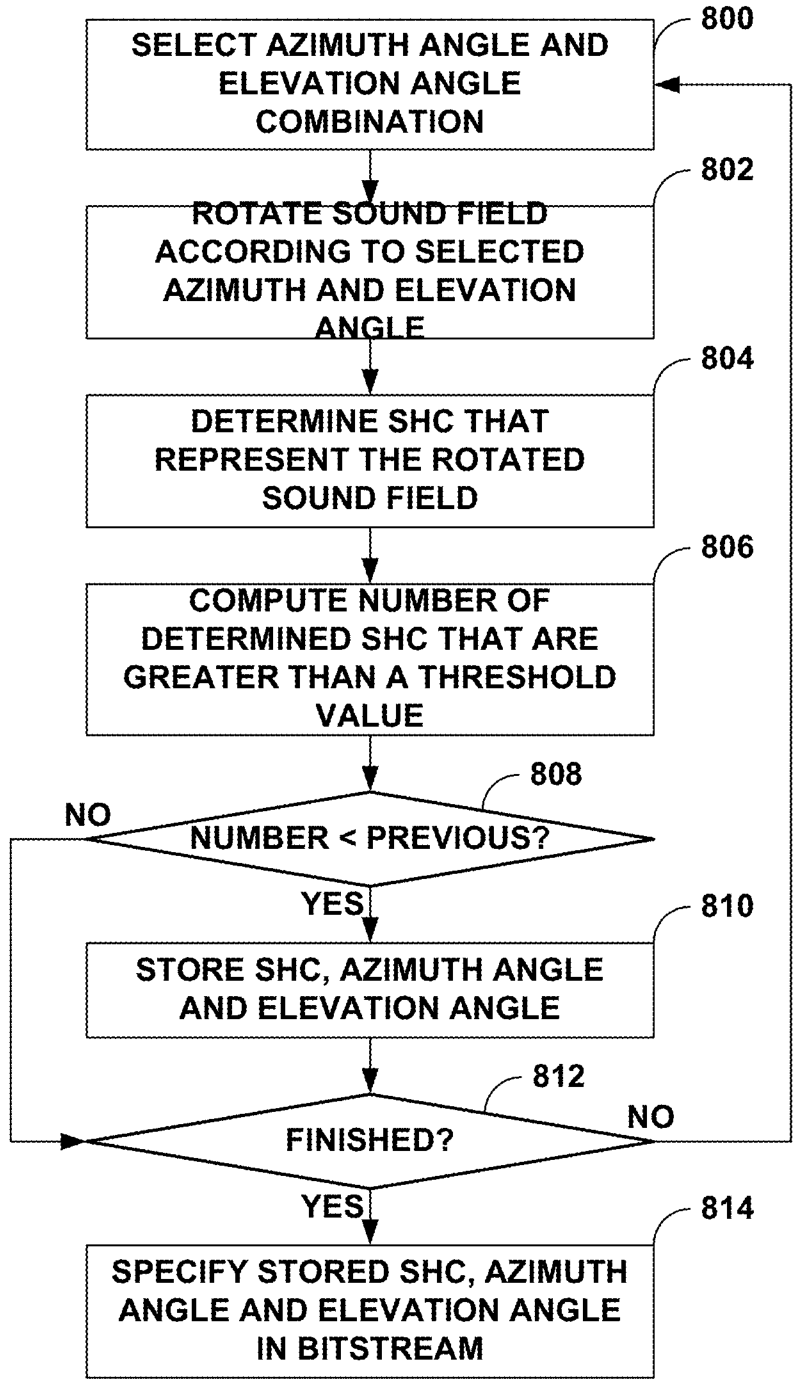
FIG. 58 is a flowchart illustrating example operation of the audio encoding device shown in the example of FIG. 53 in implementing the rotation aspects of the techniques described in this disclosure.

FIG. 58 is a flowchart illustrating example operation of the audio encoding device 570 shown in the example of FIG. 53 in implementing the rotation aspects of the techniques described in this disclosure. Initially, the audio encoding device 570 may select an azimuth angle and elevation angle combination in accordance with one or more of the various rotation algorithms described above (800). The audio encoding device 570 may then rotate the soundfield according to the selected azimuth and elevation angle (802). As described above, the audio encoding device 570 may first derive the soundfield from SHC 511 using the $InvMat_1$ noted above. The audio encoding device 570 may also determine SHC 511' that represent the rotated soundfield (804). While described as being separate steps or operations, the audio encoding device 570 may apply a transform (which may represent the result of $[EncMat_2][InvMat_1]$) that represents the selection of the azimuth angle and the elevation angle combination, deriving the soundfield from the SHC 511, rotating the soundfield and determining the SHC 511' that represent the rotated soundfield.

In any event, the audio encoding device 570 may then compute a number of the determined SHC 511' that are greater than a threshold value, comparing this number to a number computed for a previous iteration with respect to a previous azimuth angle and elevation angle combination (806, 808). In the first iteration with respect to the first azimuth angle and elevation angle combination, this comparison may be to a predefined previous number (which may set to zero). In any event, if the determined number of the SHC 511' is less than the previous number ("YES" 808), the audio encoding device 570 stores the SHC 511', the azimuth angle and the elevation angle, often replacing the previous SHC 511', azimuth angle and elevation angle stored from a previous iteration of the rotation algorithm (810).

If the determined number of the SHC 511' is not less than the previous number ("NO" 808) or after storing the SHC 511', azimuth angle and elevation angle in place of the previously stored SHC 511', azimuth angle and elevation angle, the audio encoding device 570 may determine whether the rotation algorithm has finished (812). That is, the audio encoding device 570 may, as one example, determine whether all available combination of azimuth angle and elevation angle have been evaluated. In other examples, the audio encoding device 570 may determine whether other criteria are met (such as that all of a defined subset of combination have been performed, whether a given trajectory has been traversed, whether a hierarchical tree has been traversed to a leaf node, etc.) such that the audio encoding device 570 has finished performing the rotation algorithm. If not finished ("NO" 812), the audio encoding device 570 may perform the above process with respect to another selected combination (800-812). If finished ("YES" 812), the audio encoding device 570 may specify the stored SHC 511', azimuth angle and elevation angle in the bitstream 517 in one of the various ways described above (814).

Figure 59:
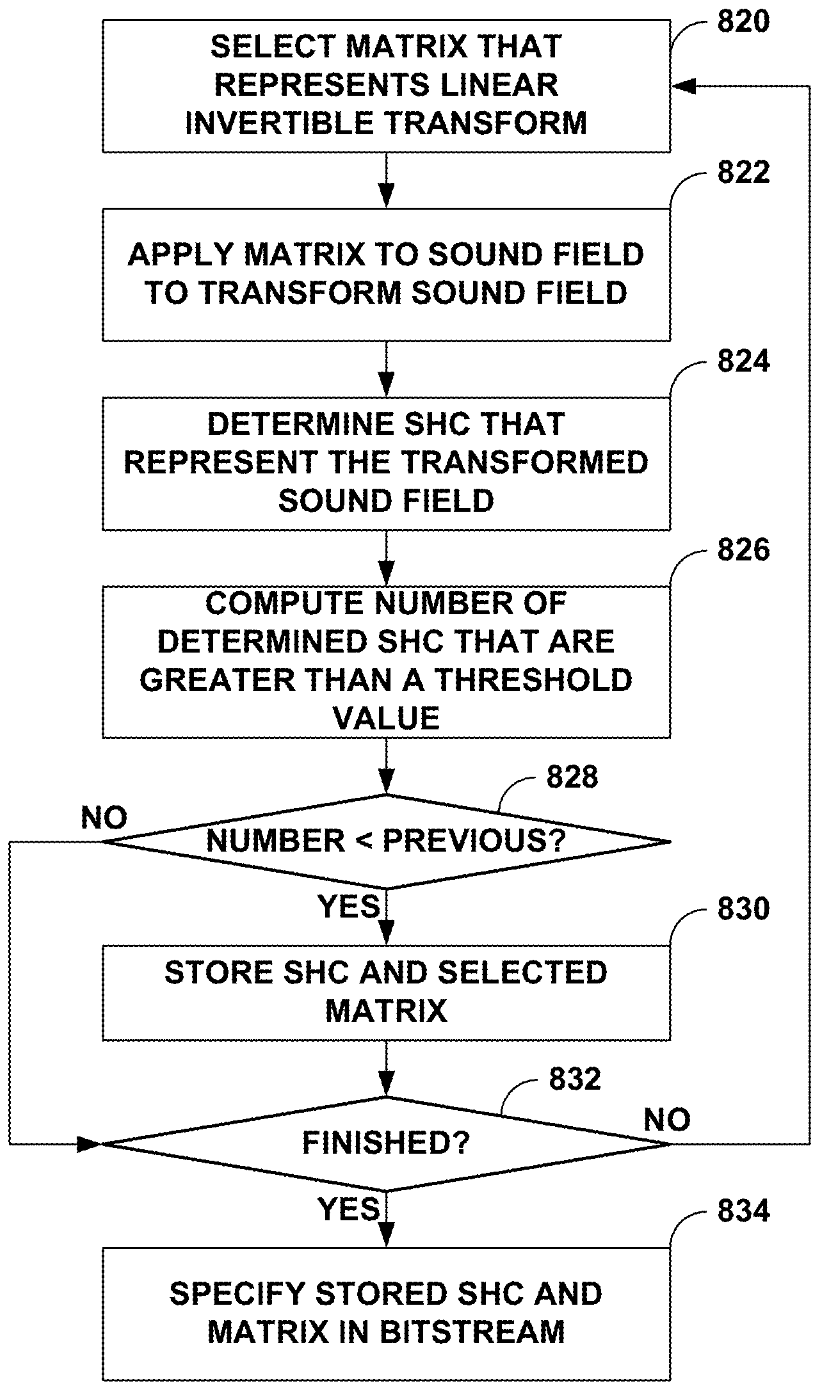
FIG. 59 is a flowchart illustrating example operation of the audio encoding device shown in the example of FIG. 53 in performing the transformation aspects of the techniques described in this disclosure.

FIG. 59 is a flowchart illustrating example operation of the audio encoding device 570 shown in the example of FIG. 53 in performing the transformation aspects of the techniques described in this disclosure. Initially, the audio encoding device 570 may select a matrix that represents a linear invertible transform (820). One example of a matrix that represents a linear invertible transform may be the above shown matrix that is the result of [$EncMat_1$][$IncMat_1$]. The audio encoding device 570 may then apply the matrix to the soundfield to transform the soundfield (822). The audio encoding device 570 may also determine SHC 511' that represent the rotated soundfield (824). While described as being separate steps or operations, the audio encoding device 570 may apply a transform (which may represent the result of [$EncMat_2$][$InvMat_1$]), deriving the soundfield from the SHC 511, transform the soundfield and determining the SHC 511' that represent the transform soundfield.

In any event, the audio encoding device 570 may then compute a number of the determined SHC 511' that are greater than a threshold value, comparing this number to a number computed for a previous iteration with respect to a previous application of a transform matrix (826, 828). If the determined number of the SHC 511' is less than the previous number ("YES" 828), the audio encoding device 570 stores the SHC 511' and the matrix (or some derivative thereof, such as an index associated with the matrix), often replacing the previous SHC 511' and matrix (or derivative thereof) stored from a previous iteration of the rotation algorithm (830).

If the determined number of the SHC 511' is not less than the previous number ("NO" 828) or after storing the SHC 511' and matrix in place of the previously stored SHC 511' and matrix, the audio encoding device 570 may determine whether the transform algorithm has finished (832). That is, the audio encoding device 570 may, as one example, determine whether all available transform matrixes have been evaluated. In other examples, the audio encoding device 570 may determine whether other criteria are met (such as that all of a defined subset of the available transform matrixes have been performed, whether a given trajectory has been traversed, whether a hierarchical tree has been traversed to a leaf node, etc.) such that the audio encoding device 570 has finished performing the transform algorithm. If not finished ("NO" 832), the audio encoding device 570 may perform the above process with respect to another selected transform matrix (820-832). If finished ("YES" 832), the audio encoding device 570 may specify the stored SHC 511' and the matrix in the bitstream 517 in one of the various ways described above (834).

In some examples, the transform algorithm may perform a single iteration, evaluating a single transform matrix. That is, the transform matrix may comprise any matrix that represents a linear invertible transform. In some instances, the linear invertible transform may transform the soundfield from the spatial domain to the frequency domain. Examples of such a linear invertible transform may include a discrete Fourier transform (DFT). Application of the DFT may only involve a single iteration and therefore would not necessarily include steps to determine whether the transform algorithm is finished. Accordingly, the techniques should not be limited to the example of FIG. 59.

In other words, one example of a linear invertible transform is a discrete Fourier transform (DFT). The twenty-five SHC 511' could be operated on by the DFT to form a set of twenty-five complex coefficients. The audio encoding device 570 may also zero-pad The twenty five SHCs 511' to be an integer multiple of 2, so as to potentially increase the resolution of the bin size of the DFT, and potentially have a more efficient implementation of the DFT, e.g. through applying a fast Fourier transform (FFT). In some instances, increasing the resolution of the DFT beyond 25 points is not necessarily required. In the transform domain, the audio encoding device 570 may apply a threshold to determine whether there is any spectral energy in a particular bin. The audio encoding device 570, in this context, may then discard or zero-out spectral coefficient energy that is below this threshold, and the audio encoding device 570 may apply an inverse transform to recover SHC 511' having one or more of the SHC 511' discarded or zeroed-out. That is, after the inverse transform is applied, the coefficients below the threshold are not present, and as a result, less bits may be used to encode the soundfield.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor." as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the techniques have been described. These and other aspects of the techniques are within the scope of the following claims.

The invention claimed is:

1. A method comprising:

obtaining, by an audio decoding device, one or more first vectors describing distinct components of a soundfield and one or more second vectors describing background components of the soundfield, both the one or more first vectors and the one or more second vectors representative of a plurality of spherical harmonic coefficients descriptive of the soundfield, and generated at least by performing a transformation with respect to the plurality of spherical harmonic coefficients;

rendering, by the audio decoding device, one or more loudspeaker feeds based on the one or more first vectors and the one or more second vectors; and outputting, by the audio decoding device, the loudspeaker feeds.

2. The method of claim 1, wherein the one or more first vectors and the one or more second vectors are generated at least by performing a transformation that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients.

3. The method of claim 2, wherein the one or more first vectors comprise one or more audio encoded $U_{DIST}*S_{DIST}$ vectors that, prior to audio encoding, were generated by multiplying one or more audio encoded $U_{DIST}$ vectors of the U matrix by one or more $S_{DIST}$ vectors of the S matrix.

4. The method of claim 3, further comprising audio decoding the one or more audio encoded $U_{DIST}*S_{DIST}$ vectors to generate an audio decoded version of the one or more audio encoded $U_{DIST}*S_{DIST}$ vectors.

5. The method of claim 2, wherein the one or more first vectors comprise one or more audio encoded $U_{DIST}*S_{DIST}$ vectors that, prior to audio encoding, were generated by multiplying one or more audio encoded $U_{DIST}$ vectors of the U matrix by one or more $S_{DIST}$ vectors of the S matrix.

6. The method of claim 5, further comprising audio decoding the one or more audio encoded $U_{DIST}*S_{DIST}$ vectors to generate an audio decoded version of the one or more audio encoded $U_{DIST}*S_{DIST}$ vectors.

7. The method of claim 6, further comprising multiplying the audio decoded version of the one or more audio encoded $U_{DIST}*S_{DIST}$ vectors by the $V^T_{DIST}$ vectors to recover those of the plurality of spherical harmonics representative of the distinct components of the soundfield.

8. The method of claim 2, wherein the one or more second vectors comprise one or more audio encoded $U_{BG}*S_{BG}*V^T_{BG}$ vectors that, prior to audio encoding, were generating by multiplying $U_{BG}$ vectors included within the U matrix by $S_{BG}$ vectors included within the S matrix and then by $V^T_{BG}$ vectors included within a transpose of the V matrix.

9. The method of claim 2, wherein the one or more second vectors comprise one or more audio encoded $U_{BG}*S_{BG}*V^T_{BG}$ vectors that, prior to audio encoding, were generating by multiplying $U_{BG}$ vectors included within the U matrix by $S_{BG}$ vectors included within the S matrix and then by $V^T_{BG}$ vectors included within a transpose of the V matrix, and wherein the method further comprises audio decoding the one or more audio encoded $U_{BG}*S_{BG}*V^T_{BG}$ vectors to generate one or more audio decoded $U_{BG}*S_{BG}*V^T_{BG}$ vectors.

10. The method of claim 2, wherein the transformation comprises either a singular value decomposition or a principal component analysis to identify the distinct components of the soundfield and the background components of the soundfield.

11. The method of claim 1, further comprising reconstructing the plurality of spherical harmonic coefficients based on the one or more first vectors and the one or more second vectors, wherein rendering the one or more loudspeaker feeds comprises rendering, based on the plurality of spherical harmonic coefficients, the loudspeaker feeds.

12. The method of claim 1, further comprising multiplying the one or more first vectors by one or more spatial vectors to recover the plurality of spherical harmonics representative of the distinct components of the soundfield, the one or more spatial vectors representative of a spatial component of the one or more first vectors, wherein rendering the one or more loudspeaker feeds comprises rendering the one or more loudspeaker feeds based on the plurality of spherical harmonics representative of the distinct components of the soundfield.

13. The method of claim 1, further comprising obtaining one or more spatial vectors describing a spatial component of the one or more first vectors, wherein rendering the one or more loudspeaker feeds comprises rendering the one or more loudspeaker feeds based on the one or more first vectors, the one or more second vectors, and the one or more spatial vectors.

14. The method of claim 1, wherein the one or more first vectors comprise audio encoded versions of the one or more first vectors, wherein the one or more second vectors comprise audio encoded versions of the one or more second vectors, wherein the method further comprises:

audio decoding the audio encoded versions of the one or more first vectors to obtain audio decoded versions of the one or more first vectors; and audio decoding the audio encoded versions of the one or more second vectors to obtain audio decoded versions of the one or more second vectors, and wherein rendering the one or more loudspeaker feeds comprises rendering the one or more loudspeaker feeds based on the audio decoded versions of the one or more first vectors and the audio decoded versions of the one or more second vectors.

15. A device comprising:

one or more processors configured to:

determine one or more first vectors describing distinct components of a soundfield and one or more second vectors describing background components of the soundfield, both the one or more first vectors and the one or more second vectors representative of a plurality of spherical harmonic coefficients descriptive of the soundfield, and generated at least by performing a transformation with respect to the plurality of spherical harmonic coefficients;

render one or more loudspeaker feeds based on the one or more first vectors and the one or more second vectors; and output the one or more loudspeaker feeds.

16. The device of claim 15, wherein the one or more first vectors and the one or more second vectors are generated at least by performing a transformation that generates a U matrix representative of left-singular vectors of the plurality of spherical harmonic coefficients, an S matrix representative of singular values of the plurality of spherical harmonic coefficients and a V matrix representative of right-singular vectors of the plurality of spherical harmonic coefficients.

17. The device of claim 16, wherein the one or more first vectors comprise one or more audio encoded $U_{DIST}*S_{DIST}$ vectors that, prior to audio encoding, were generated by multiplying one or more audio encoded $U_{DIST}$ vectors of the U matrix by one or more $S_{DIST}$ vectors of the S matrix.

18. The device of claim 17, wherein the one or more processors are further configured to audio decode the one or more audio encoded $U_{DIST}*S_{DIST}$ vectors to generate an audio decoded version of the one or more audio encoded $U_{DIST}*S_{DIST}$ vectors.

19. The device of claim 16, wherein the one or more first vectors comprise one or more audio encoded $U_{DIST}*S_{DIST}$ vectors that, prior to audio encoding, were generated by multiplying one or more audio encoded $U_{DIST}$ vectors of the U matrix by one or more $S_{DIST}$ vectors of the S matrix.

20. The device of claim 18, wherein the one or more processors are further configured to audio decode the one or more audio encoded $U_{DIST}*S_{DIST}$ vectors to generate an audio decoded version of the one or more audio encoded $U_{DIST}*S_{DIST}$ vectors.

21. The device of claim 19, further comprising multiplying the audio decoded version of the one or more audio encoded $U_{DIST}*S_{DIST}$ vectors by the $V^T_{DIST}$ vectors to recover those of the plurality of spherical harmonics representative of the distinct components of the soundfield.

22. The device of claim 16, wherein the one or more second vectors comprise one or more audio encoded $U_{BG}*S_{BG}*V^T_{BG}$ vectors that, prior to audio encoding, were generating by multiplying $U_{BG}$ vectors included within the U matrix by $S_{BG}$ vectors included within the S matrix and then by $V^T_{BG}$ vectors included within a transpose of the V matrix.

23. The device of claim 16, wherein the one or more second vectors comprise one or more audio encoded $U_{BG}*S_{BG}*V^T_{BG}$ vectors that, prior to audio encoding, were generating by multiplying $U_{BG}$ vectors included within the U matrix by $S_{BG}$ vectors included within the S matrix and then by $V^T_{BG}$ vectors included within a transpose of the V matrix, and wherein the one or more processors are further configured to audio decode the one or more audio encoded $U_{BG}*S_{BG}*V^T_{BG}$ vectors to generate one or more audio decoded $U_{BG}*S_{BG}*V^T_{BG}$ vectors.

24. The device of claim 16, wherein the transformation comprises either a singular value decomposition or a principal component analysis to identify the distinct components of the soundfield and the background components of the soundfield.

25. The device of claim 15, wherein the one or more processors are further configured to reconstruct the plurality of spherical harmonic coefficients based on the one or more first vectors and the one or more second vectors, and wherein the one or more processors are configured to render, based on the plurality of spherical harmonic coefficients, the loudspeaker feeds.

26. The device of claim 15, wherein the processor is further configured to multiply the one or more first vectors by one or more spatial vectors to recover the plurality of spherical harmonics representative of the distinct components of the soundfield, the one or more spatial vectors representative of a spatial component of the one or more first vectors, and wherein the processor is configured to render the one or more loudspeaker feeds based on the plurality of spherical harmonics representative of the distinct components of the soundfield.

27. The device of claim 15, wherein the processor is further configured to obtain one or more spatial vectors describing a spatial component of the one or more first vectors, wherein the processor is configured to render the one or more loudspeaker feeds based on the one or more first vectors, the one or more second vectors, and the one or more spatial vectors.

28. The device of claim 15, wherein the one or more first vectors comprise audio encoded versions of the one or more first vectors, wherein the one or more second vectors comprise audio encoded versions of the one or more second vectors, wherein the processor is further configured to:

audio decode the audio encoded versions of the one or more first vectors to obtain audio decoded versions of the one or more first vectors; and audio decode the audio encoded versions of the one or more second vectors to obtain audio decoded versions of the one or more second vectors, and wherein the processor is configured to render the one or more loudspeaker feeds based on the audio decoded versions of the one or more first vectors and the audio decoded versions of the one or more second vectors.

29. A device comprising:

means for obtaining one or more first vectors describing distinct components of a soundfield and one or more second vectors describing background components of the soundfield, both the one or more first vectors and the one or more second vectors representative of a plurality of spherical harmonic coefficients descriptive of the soundfield, and generated at least by performing a transformation with respect to the plurality of spherical harmonic coefficients; and means for storing the one or more first vectors;

means for rendering one or more loudspeaker feeds based on the one or more first vectors and the one or more second vectors; and means for outputting the loudspeaker feeds.

30. A non-transitory computer-readable storage medium having stored thereon instructions that, when executed, cause one or more processors of an audio decoding device to:

obtain one or more first vectors describing distinct components of a soundfield and one or more second vectors describing background components of the soundfield, both the one or more first vectors and the one or more second vectors representative of a plurality of spherical harmonic coefficients descriptive of the soundfield, and generated at least by performing a transformation with respect to the plurality of spherical harmonic coefficients;

render one or more loudspeaker feeds based on the one or more first vectors and the one or more second vectors; and output, to one or more loudspeakers, the loudspeaker feeds.

* * * * *